US012258672B2

(12) United States Patent
Allanore et al.

(10) Patent No.: US 12,258,672 B2
(45) Date of Patent: Mar. 25, 2025

(54) SELECTIVE SULFIDATION AND DESULFIDATION

(71) Applicant: Massachusetts Institute of Technology, Cambridge, MA (US)

(72) Inventors: Antoine Allanore, Brentwood, NH (US); Caspar R. Stinn, Magnolia, TX (US)

(73) Assignee: Massachusetts Institute of Technology, Cambridge, MA (US)

(*) Notice: Subject to any disclaimer, the term of this patent is extended or adjusted under 35 U.S.C. 154(b) by 943 days.

(21) Appl. No.: 17/134,429

(22) Filed: Dec. 27, 2020

(65) Prior Publication Data
US 2021/0277531 A1    Sep. 9, 2021

Related U.S. Application Data

(60) Provisional application No. 62/982,373, filed on Feb. 27, 2020.

(51) Int. Cl.
| | |
|---|---|
| *C22B 1/06* | (2006.01) |
| *C22B 1/11* | (2006.01) |
| *C22B 26/20* | (2006.01) |
| *C22B 59/00* | (2006.01) |
| *C25C 3/02* | (2006.01) |
| *C25C 3/34* | (2006.01) |

(52) U.S. Cl.
CPC .................. *C25C 3/02* (2013.01); *C22B 1/06* (2013.01); *C22B 1/11* (2013.01); *C22B 26/20* (2013.01); *C22B 59/00* (2013.01); *C25C 3/34* (2013.01)

(58) Field of Classification Search
CPC .... C25C 3/02; C25C 3/34; C22B 1/06; C22B 1/11; C22B 26/20; C22B 59/00
See application file for complete search history.

(56) References Cited

U.S. PATENT DOCUMENTS

| | | | |
|---|---|---|---|
| 4,419,127 A | 12/1983 | Tanson | |
| 4,735,654 A | 4/1988 | Cochran et al. | |
| 5,037,608 A | 8/1991 | Tarcy et al. | |
| 5,152,830 A | 10/1992 | Kobayashi et al. | |
| 5,421,857 A | 6/1995 | Marteanenko et al. | |
| 8,864,873 B2 | 10/2014 | Chen et al. | |
| 2006/0226026 A1* | 10/2006 | Van Der Plas | C22B 21/0007 204/246 |
| 2012/0304823 A1 | 12/2012 | Chen et al. | |
| 2013/0165317 A1* | 6/2013 | Gabrielov | B01J 37/0201 502/167 |
| 2018/0202024 A1 | 7/2018 | Feng et al. | |
| 2021/0277531 A1 | 9/2021 | Allanore et al. | |
| 2024/0052456 A1 | 2/2024 | Allanore et al. | |

OTHER PUBLICATIONS

Ahmad, S., et al., "Sulfidation Kinetics of Natural Chromite Ore Using H2S Gas," Metallurgical and Materials Transactions B, vol. 46B, Apr. 2015, pp. 557-567 (11 pages).
Ahmadi, E., et al., "An Innovative Process for Production of Ti Metal Powder via TiSx from TiN," Metallurgical and Materials Transactions B, vol. 51B, Feb. 2020, pp. 140-148 (9 pages).
Akhgar, B.N., et al., "Mechanochemical Reduction of Natural Pyrite by Aluminum and Magnesium," Journal of Alloys and Compounds, vol. 657 (2016) 144-151 (8 pages).
Ali, S., et al., "Mineral Supply for Sustainable Development Requires Resource Governance," Nature, vol. 543, Mar. 2017, 7 pages.
Allanore, A., "Contribution of Electricity to Materials Processing: Historical and Current Perspectives," Journal of the Minerals, Metals & Materials Society, vol. 65, No. 2 (2013) pp. 130-135 (6 pages).
Biswas, A., et al., "Iron- and Steel-Making Process," Introduction to Refractories for Iron- and Steelmaking, Springer Nature Switzerland AG 2020, pp. 99-145 (47 pages).
Biswas, A., et al., "Synthesis of Neodymium Aluminide by Aluminothermic Reduction of Neodymium Oxide," Metallurgical and Materials Transactions B, vol. 29B, Apr. 1998, pp. 309-315 (7 pages).
Brinkmann, F., et al., "Metallothermic Al—Sc Co-Reduction by Vacuum Induction Melting Using Ca," MDPI Metals, 2019 (12 pages).
Capuzzi, S., et al., "Preparation and Melting of Scrap in Aluminum Recycling: A Review," MDPI, Metals (2018) 24 pages.
Chen, G.Z., et al., "Cathodic Refining in Molten Salts: Removal of Oxygen, Sulfur and Selenium from Static and Flowing Molten Copper," Journal of Applied Electrochemistry, vol. 31, 155-164, (2001), 10 pages.
Chung, D.Y., et al., "Complex Bismuth Chalcogenides as Thermoelectrics," 16th International Conference on Thermoelectrics (1997), pp. 459-462 (4 pages).
Ciez, R., et al., "Examining Different Recycling Processes for Lithium-ion Batteries," Nature Sustainability, vol. 2, Feb. 2019, pp. 148-156 (9 pages).
Cleaver, B., et al., "Properties of Fused Polysulphides-VII. The Phase Diagram Li2S/Na2S/S," Electrochimica Acta, vol. 36, No. 3/4, pp. 673-677, 1991 (5 pages).

(Continued)

*Primary Examiner* — Zulmariam Mendez
(74) *Attorney, Agent, or Firm* — Nutter, McClennen & Fish, LLP

(57) ABSTRACT

Various embodiments utilize selective sulfidation and/or desulfidation for such things as ore and concentrate cracking, metal separation, compound production, and recycling. Selective sulfidation can be used to selectively convert an oxide or other material in a feedstock to a sulfide or other sulfur-containing material, and selective desulfidation can be used to selectively convert a sulfide or other sulfur-containing material in a feedstock to an oxide or other material. In some cases, the material produced by such selective sulfidation/desulfidation of the feedstock can itself be novel and/or commercially valuable, while in other cases, such selective sulfidation/desulfidation can be followed by one or more processes to extract, isolate, or concentrate the converted material.

20 Claims, 233 Drawing Sheets
(189 of 233 Drawing Sheet(s) Filed in Color)

(56) References Cited

OTHER PUBLICATIONS

Crundwell, F., et al., "Extractive Metallurgy of Nickel, Cobalt and Platinum-Group Metals," Elsevier Publishing, 583 pages.
De Souza, O., et al., "Mining, Ore Preparation and Ferroniobium Production at CBMM," 1981, pp. 113-132 (20 pages).
Dietl, J., "Aluminothermic Reduction of Quartz Sand," Commission of the European Communities, Fourth E.C. Photovoltaic Solar Energy Conference ECSC, EEC, EAEC, Brussels and Luxembourg, 1982, pp. 941-945 (5 pages).
Gao, H., et al., "Preparation of Mo Nanopowders through Electroreduction of Solid MoS2 in Molten KCl—NaCl," Physical Chemistry Chemical Physics, 2014, vol. 16, 19514-19521, (8 pages).
Ge, X., et al., "Copper Extraction from Copper Ore by Electro-Reduction in Molten CaCl2—NaCl," Electrochimica Acta 54 (2009) 4397-4402 (6 pages).
Ge, X.L., et al., "The Salt Extraction Process—a Novel Route for Metal Extraction Part 2—Cu/Fe extraction from Copper Oxide and Sulphides," Mineral Processing and Extractive Metallurgy, 93-100 (Jul. 18, 2013) 9 pages.
Gibbard, K., et al., "Kinetics of Thermal Synthesis of Cerium Sulfides," Journal of Nuclear Materials, vol. 378 (2008) pp. 291-298 (8 pages).
Han, J., et al., Selective Sulfidation of Lead Smelter Slag with Sulfur, The Minerals, Metals & Materials Society and ASM International 2015, vol. 47B, Feb. 2016, pp. 344-354 (11 pages).
Harris, C.T., et al., Selective Sulphidation of a Nickeliferous Lateritic Ore, Minerals Engineering, vol. 24, (2011) pp. 651-660 (10 pages).
Hendricks, T., et al., "Engineering Scoping Study of Thermoelectric Generator Systems for Industrial Waste Heat Recovery," U.S. Department of Energy, Industrial Technologies Program, Nov. 2006, 74 pages.
Hosseinpouri, M., "Production of Al—Ti Master Alloy by Aluminothermic Reduction Technique," Canadian Metallurgical Quarterly, vol. 46 No. 2 (2007) pp. 139-144 (7 pages).
International Search Report and Written Opinion for International Application No. PCT/US22/35296, mailed Nov. 15, 2022 (11 pages).
Jones, T., "Manganese," Manganese (1998), 17 pages.
Kaneko, T., et al., "Synthesis of Sc Sulfides by CS2 Sulfurization," Journal of Solid State Chemistry, vol. 285 (2020) pp. 1-8 (8 pages).
Kanibolotsky, D.S., et al., "Thermodynamic Properties of Liquid Al—Si and Al—Cu Alloys," Journal of Thermal Analysis and Calorimetry, vol. 70 (2002) pp. 975-983 (9 pages).
Kellogg, H.H., "Vaporization Chemistry in Extractive Metallurgy," 1966 Extractive Metallurgy Lecture (1966) 16 pages.
Lan, Z., et al., "Recovery of Zn, Pb, Fe and Si from a Low-Grade Mining Ore by Sulfidation Roasting-Beneficiation-Leaching Processes," Springer Nature 2020, pp. 37-51 (15 pages).
Lee, J., et al., "Pathways for Greening the Supply of Rare Earth Elements in China," Nature Sustainability, vol. 1, Oct. 2018, pp. 598-605, 8 pages.
Li, G., et al., "Electrolysis of Solid MoS2 in molten CaCl2 for Mo Extraction without Co2 Emission," Electrochemistry Communications 9 (2007) 1951-1957 (7 pages).
Li, L., et al., "Research Progress on the Preparation of Al—Sc Master Alloy by Molten Salt Electrolysis Method," (2018) pp. 3768-3773 (6 pages).
Lindberg, D., et al., "Thermodynamic Evaluation and Optimization of the (Na + K + S) System," J. Chem. Thermodynamics 38 (2006) 900-915 (16 pages).
Liu, W., et al., "Sulfidation Mechanism of ZnO Roasted with Pyrite," Scientific Reports (2018) pp. 1-12 (12 pages).
Liu, X., et al., "Thermodynamic Assessment of the Aluminum-Manganese (Al—Mn) Binary Phase Diagram," Journal of Phase Equilibria (1999) vol. 20 No. 1, pp. 45-56 (12 pages).
Lytvynenko, Y., et al., "Aluminothermic Reduction of Metal Oxides by Concentrated Solar Irradiation," Alternative Energy in Materials Processing, JOM, pp. 46-48 Sep. 2010 (3 pages).
Martirosyan, V., et al., "Sulfur Dioxide Utilization by the Treatment of Pyrite-Chalcopyrite Sulfide Consentrates, Combing Mechanical and Metallothermic Processes," Food and Environmental Safety—Journal of Faculty of Food Engineering, Stefan cel MareUniversity—Suceava vol. X, Issue 4—2011, pp. 24-29 (6 pages).
Mohammadi, A., et al., "Design and analysis of a Suction Mechanism for the Vacuum Degassing Process," Ironmaking and Steelmaking: Processes, Products and Applications, 2021, vol. 48, No. 4, 457-465 (10 pages).
Mukherjee, T.K., et al., "Molybdenum Extraction from Molysulfide," Metallurgical Transaction, vol. 5, Mar. 1974, pp. 707-713 (7 pages).
Nassar, N., "By-product Metals are Technology Essential but have Problematic Supply," Sci. Adv., Apr. 3, 2015, pp. 1-10 (11 pages).
Neronov, V., et al., Preparation and Properties of Aluminum Borides, Institute of Problems of the Study of Materials, Academy of Sciences, Ukrainian SSR, No. 7 (31), Jul. 1965, pp. 571-575 (5 pages).
Neusser, G., et al., "Experimental Na/K Exchange between Alkali Feldspar and an NaCl—KCl Salt Melt: Chemically Induced Fracturing and Element Partitioning," Contrib Mineral Petrol (2012) 164:341-358 (18 pages).
Nunes, R., et al., "Properties and Selection: Nonferrous Alloys and Special-Purpose Materials," ASM Handbook (1990), vol. 2, 3470 pages.
Oyamada, H., et al., "Activity Measurement of the Constituents in Liquid Cu—Al Alloy with Mass-Spectrometry," Materials Transactions, JIM, vol. 39, No. 12 (1998) pp. 1225-1229 (5 pages).
Rasheed, M., et al., "Review of the Liquid Metal Extraction Process for the Recovery of Nd and Dy from Permanent Magnets," The Minerals, Metals & Materials Society and ASM International 2021, pp. 1213-1227 (15 pages).
Rinzler, C., et al., "A Thermodynamic Basis for the Electronic Properties of Molten Semiconductors: The Role of Electronic Entropy," Philosophical Magazine 97, 8 (Dec. 2016) 561-571, 21 pages.
Rinzler, C., et al., "Connecting Electronic Entropy to Empirically Accessible Electronic Properties in High Temperature Systems," Philosophical Magazine 96, 29 (Sep. 2016) 3041-3053 (32 pages).
Royset, J., et al., "Scandium in Aluminum Alloys," International Materials Reviews, 2005, vol. 50, No. 1, pp. 19-44 (27 pages).
Sahu, S., et al., "Electrolytic Extraction of Copper, Molybdenum and Rhenium from Molten Sulfide Electrolyte," Electrochimica Acta 243 (2017) pp. 382-389 (8 pages).
Australian Examination Report No. 1 for Standard Patent Application No. 2022304902, dated Jan. 17, 2024 (3 Pages).
Scheel, H.J., "Crystallization of Sulfides from Alkali Polysulfide Fluxes," Journal of Crystal Growth 24/25 (1974) pp. 669-673 (5 pages).
Setoudeh, N., et al., "Metallothermic Reduction of Zinc Induced by Ball Milling," J. Mater Sci (2017) pp. 6388-6400 (13 pages).
Shoemaker, D., et al., "Understanding Fluxes as Media for Directed Synthesis: In Situ Local Structure of Molten Potassium Polysulfides," Journal of the American Chemical Society (2012), vol. 134, 9456-9463, 8 pages.
Sklyarchuk, V., et al., "Semiconductor-Metal Transition in Semiconductor Melts with 3d Metal Admixtures," IOP Publishing, 13th International Conference on Liquid and Amorphous Metals, Journal of Physics: Conference Series 98 (2008), 6 pages.
Skylarchuk, V., et al., "Thermophysical Properties of Liquid Ternary Chalcogenides," High Temperatures—High Pressures, 2002, vol. 34, pp. 29-34, 6 pages.
Sokhanvaran, S., et al., "Electrochemistry of Molten Sulfides: Copper Extraction from BaS—Cu2S," Journal of the Electrochemical Society, 163 (3) D115-D120 (2016), 6 pages.
Stinn, C., et al. "Selective Sulfidation and Electrowinning of Nickel and Cobalt for Lithium Ion Battery Recycling," The Minerals, Metals & Materials Services, (2021) pp. 99-110 (12 pages).
Stinn, C., et al., "Estimating the Capital Costs of Electrowinning Processes," Electrochem Soc. Interface (Summer 2020), 8 pages.
Stinn, C., et al., "Selective Sulfidation of Metal Compounds," Nature, https://doi.org/10.1038/s41586-021-04321-5, 25 pages (2021).
Suzdaltsev, A.V., et al., "Review-Synthesis of Aluminum Master Alloys in Oxide Fluoride Melts: A Review," J. Electrochem. Soc., 2020, vol. 167 (23 pages).

(56) References Cited

OTHER PUBLICATIONS

Suzuki, N., et al., "Calcium Reduction of TiS2 in CaCl2 Melt," Material Transactions, vol. 58, No. 3 (2017) pp. 367-370 (4 pages).

Tan, M., et al., "Electrochemical Sulfur Removal from Chalcopyrite in Molten NaCl—KCl," Electrochimica Acta 213 (2016) 148-154, 7 pages.

Vivian, R., et al., "The Electrolysis of Molten Antimony Sulfide," Presented at Sixty-ninth General Meeting, held at Cincinnati, Ohio, Apr. 25, 1936 (4 pages).

Vogel, H., et al., "An Estimation of PFC Emission by Rare Earth Electrolysis," The Minerals, Metals & Materials Society 2018, Light Metals 2018, pp. 1507-1517 (11 pages).

Wan, H., "A Novel Method of AlV55 Alloy Production by UtilizingAlV65 Alloy Scrap," Vacuum 155 (2018) 127-133 (7 pages).

Wang, J., et al., "Mechanical Sulfidization of Nonferrous Metal Oxides by Grinding with Sulfur and Iron," Ind. Eng. Chem. Res., 2003, 42, pp. 5813-5818 (6 pages).

Wang, T., et al., "Electrolysis of Solid Metal Sulfide to Metal and Sulfur in Molten NaCl—KCl," Electrochemistry Communications 13 (2011) 1492-1495 (4 pages).

Waudby, P.E., "Rare Earth Additions to Steel," International Metals Reviews, vol. 23, 1978, pp. 74-98 (28 pages).

Yang, J., et al., "Behavior of Magnesium in the Desulfurization Process of Molten Iron with Magnesium Vapor Produced In-situ by Aluminothermic Reduction of Magnesium Oxide," ISIJ International, vol. 42 (2002), No. 7 pp. 685-693 (9 pages).

Yang, J., et. al., Simultaneous Desulfurization and Deoxidation of Molten Steel with in Situ Produced Magnesium Vapor, ISIJ International, vol. 47 (2007), No. 3, pp. 418-426 (9 pages).

Yucel, O., et al., "The Preparation of Ferroboron and Ferrovanadium by Aluminothermic Reduction," High Temperature Materials and Processes, vol. 15, Nos. 1-2, 1996, pp. 103-109 (8 pages).

Zhang, L., et al., "Removal of Impurity Elements from Molten Aluminum: A Review," Mineral Processing & Extractive Metallurgy Review (2011), pp. 150-228 (80 pages).

Zhao, K., et al., Cleaner Production of Ti Powder by a Two-Stage Aluminothermic Reduction Process, The Minerals, Metals & Materials Society (2017), pp. 1795-1800 (6 pages).

\* cited by examiner

*Aluminum*

*Barium*

*Calcium*

*Cerium*

*Cobalt*

*Chromium*

*Dysprosium*

*Erbium*

*Europium*

*Iron*

*Gallium*

*Gadolinium*

*Hafnium*

*Holmium*

*Indium*

*Lanthanum*

*Lithium*

*Magnesium*

*Manganese*

*Molybdenum*

*Niobium*

*Neodymium*

*Nickel*

*Praseodymium*

*Scandium*

*Silicon*

*Samarium*

*Tin*

*Strontium*

*Tantalum*

*Terbium*

*Thorium*

*Titanium*

*Thulium*

*Uranium*

*Vanadium*

*Tungsten*

*Yttrium*

*Zinc*

*Zirconium*

*Aluminum*

*Barium*

*Calcium*

*Cerium*

*Cobalt*

*Chromium*

*Dysprosium*

*Erbium*

*Europium*

*Iron*

*Gallium*

*Gadolinium*

*Hafnium*

*Holmium*

*Indium*

*Lanthanum*

*Lithium*

*Magnesium*

*Manganese*

*Molybdenum*

*Niobium*

*Neodymium*

*Nickel*

*Praseodymium*

*Scandium*

*Silicon*

*Samarium*

*Tin*

*Strontium*

*Tantalum*

*Terbium*

*Thorium*

*Titanium*

*Thulium*

*Uranium*

*Vanadium*

Tungsten

*Yttrium*

*Zinc*

*Zirconium*

*Aluminum*

*Barium*

*Calcium*

*Cerium*

*Cobalt*

*Chromium*

*Dysprosium*

*Erbium*

*Europium*

*Iron*

*Gallium*

*Gadolinium*

*Hafnium*

*Holmium*

*Indium*

*Lanthanum*

*Lithium*

*Magnesium*

*Manganese*

*Molybdenum*

*Niobium*

*Neodymium*

*Nickel*

*Praseodymium*

*Scandium*

*Silicon*

*Samarium*

*Tin*

*Strontium*

*Tantalum*

*Terbium*

*Thorium*

*Titanium*

*Thulium*

*Uranium*

*Vanadium*

*Tungsten*

*Yttrium*

*Zinc*

*Zirconium*

MSE 1500°C

| | Ce | Pr | Nd | Sm | Eu | Gd | Tb | Dy | Ho | Er | Tm | Yb | Lu | Y |
|---|---|---|---|---|---|---|---|---|---|---|---|---|---|---|
| La | 24.36 | 408.8 | 52.66 | 18.80 | - | 1.384 | 1.019 | 2.401 | 2.491 | 8.513 | 7.258 | 88.25 | 22.41 | 20.47 |
| Ce | | 16.79 | 2.163 | 1.295 | - | 17.60 | 24.80 | 58.46 | 60.66 | 207.3 | 176.7 | 3.625 | 545.7 | 498.5 |
| Pr | | | 7.763 | 21.75 | - | 295.5 | 416.5 | 981.6 | 1019 | 3480 | 2967 | 4.633 | 9163 | 8370 |
| Nd | | | | 2.801 | - | 38.06 | 53.65 | 126.5 | 131.2 | 448.3 | 382.3 | 1.676 | 1180 | 1078 |
| Sm | | | | | - | 13.59 | 19.15 | 45.14 | 46.84 | 160.1 | 136.5 | 4.694 | 421.4 | 384.9 |
| Eu | | | | | | - | - | - | - | - | - | - | - | - |
| Gd | | | | | | | 1.410 | 3.322 | 3.447 | 11.78 | 10.04 | 63.78 | 31.01 | 28.33 |
| Tb | | | | | | | | 2.357 | 2.446 | 8.3567 | 7.125 | 89.90 | 22.00 | 20.10 |
| Dy | | | | | | | | | 1.038 | 3.545 | 3.023 | 211.9 | 9.334 | 8.527 |
| Ho | | | | | | | | | | 3.417 | 2.913 | 219.8 | 8.996 | 8.218 |
| Er | | | | | | | | | | | 1.173 | 751.2 | 2.633 | 2.405 |
| Tm | | | | | | | | | | | | 640.5 | 3.088 | 2.821 |
| Yb | | | | | | | | | | | | | 1978 | 1807 |
| Lu | | | | | | | | | | | | | | 1.095 |

*FIG. 22A* - Table IIIb: Separation Factors for rare earth

MOE 1500°C

| | Ce | Pr | Nd | Sm | Eu | Gd | Tb | Dy | Ho | Er | Tm | Yb | Lu | Y |
|---|---|---|---|---|---|---|---|---|---|---|---|---|---|---|
| La | 2.462 | 2.458 | 3.480 | 2.975 | - | 9.346 | 217.0 | 128.960 | 472.0 | 1093 | 153.5 | 7.692 | 232.6 | 1672 |
| Ce | | 1.002 | 1.413 | 1.208 | - | 3.796 | 88.16 | 52.383 | 191.7 | 443.9 | 62.35 | 18.92 | 94.50 | 679.0 |
| Pr | | | 1.416 | 1.211 | - | 3.803 | 88.32 | 52.476 | 192.1 | 444.6 | 62.46 | 18.89 | 94.66 | 680.2 |
| Nd | | | | 1.167 | - | 2.686 | 62.37 | 37.06 | 135.7 | 314.0 | 44.12 | 26.74 | 66.86 | 480.4 |
| Sm | | | | | - | 3.142 | 72.96 | 43.35 | 158.7 | 367.3 | 51.60 | 22.86 | 78.20 | 561.9 |
| Eu | | | | | | - | - | - | - | - | - | - | - | - |
| Gd | | | | | | | 23.22 | 13.80 | 50.504 | 116.9 | 16.43 | 71.82 | 24.89 | 178.9 |
| Tb | | | | | | | | 1.683 | 2.175 | 5.035 | 1.414 | 1668 | 1.072 | 7.702 |
| Dy | | | | | | | | | 3.660 | 8.473 | 1.190 | 9910 | 1.804 | 12.96 |
| Ho | | | | | | | | | | 2.315 | 3.075 | 3627 | 2.029 | 3.542 |
| Er | | | | | | | | | | | 9.051 | 8396 | 4.697 | 1.530 |
| Tm | | | | | | | | | | | | 1180 | 1.516 | 10.89 |
| Yb | | | | | | | | | | | | | 1788 | 12850 |
| Lu | | | | | | | | | | | | | | 7.186 |

*FIG. 22B* - Table IIIc: Separation Factors for rare earth

FIG. 22C - Table IIId: Separation Factors for rare earth metals using HDEHP-HCl

| HDEHP-HCl | Ce | Pr | Nd | Sm | Eu | Gd | Tb | Dy | Ho | Er | Tm | Yb | Lu | Y |
|---|---|---|---|---|---|---|---|---|---|---|---|---|---|---|
| La | 2.17 |  | 2.07 | 3.99 | 2.76 | 7.6 | 8.37 | 9.03 | 12.07 | 16.37 | 19.78 | - | - | 18.1 |
| Ce |  | 1.05263 | 1.84 | 2.66 | 3.5 | 3.86 | 4.16 | 5.56 | 7.55 | 9.12 |  | - | - | 8.34 |
| Pr |  |  | 1.93 | 2.79 | 3.68 | 4.05 | 4.37 | 5.84 | 7.92 | 9.57 |  | - | - | 8.76 |
| Nd |  |  |  | 1.44 | 1.9 | 2.1 | 2.26 | 3.02 | 4.1 | 4.96 |  | - | - | 4.54 |
| Sm |  |  |  |  | 1.32 | 1.45 | 2.09 | 2.84 | 3.43 |  |  | - | - | 3.14 |
| Eu |  |  |  |  |  | 1.1 | 1.19 | 1.57 | 2.15 | 2.6 |  | - | - | 2.38 |
| Gd |  |  |  |  |  |  | 1.08 | 1.44 | 1.95 | 2.36 |  | - | - | 2.16 |
| Tb |  |  |  |  |  |  |  | 1.34 | 1.81 | 2.19 |  | - | - | 2 |
| Dy |  |  |  |  |  |  |  |  | 1.36 | 1.64 |  | - | - | 1.5 |
| Ho |  |  |  |  |  |  |  |  |  | 1.21 |  | - | - | 1.11 |
| Er |  |  |  |  |  |  |  |  |  |  |  |  |  | 1.0989 |
| Tm |  |  |  |  |  |  |  |  |  |  |  |  |  |  |
| Yb |  |  |  |  |  |  |  |  |  |  |  |  |  |  |
| Lu |  |  |  |  |  |  |  |  |  |  |  |  |  |  |

FIG. 22D - Table IIIe: Separation Factors for rare earth metals using HBTMPP.

| HBTMPP | Ce | Pr | Nd | Sm | Eu | Gd | Tb | Dy | Ho | Er | Tm | Yb | Lu | Y |
|---|---|---|---|---|---|---|---|---|---|---|---|---|---|---|
| La | 11.7 | 39.7 | 51.4 | 679 | 910 | 1052 | 3389 | 6515 | 14525 | 28056 | 74655 | 179077 | 236073 | 23388 |
| Ce |  | 3.39 | 4.3 | 58 | 77.8 | 89.9 | 290 | 557 | 1241 | 2397 | 6379 | 15301 | 20171 | 1998 |
| Pr |  |  | 1.3 | 17.1 | 23 | 26.5 | 85.4 | 164 | 366 | 707 | 1882 | 4515 | 552 | 590 |
| Nd |  |  |  | 13.2 | 17.7 | 20.5 | 66 | 127 | 283 | 546 | 1453 | 3486 | 4596 | 455 |
| Sm |  |  |  |  | 1.34 |  | 4.99 | 9.59 | 21.4 | 41.3 | 110 | 264 | 347 | 34.4 |
| Eu |  |  |  |  |  | 1.16 | 3.72 | 7.16 | 16 | 30.8 | 8 | 197 | 259 | 25.7 |
| Gd |  |  |  |  |  |  | 3.22 | 6.19 | 13.8 | 26.7 | 71 | 170 | 224 | 22.2 |
| Tb |  |  |  |  |  |  |  | 1.92 | 4.29 | 8.28 | 22 | 52.8 | 69.7 | 6.9 |
| Dy |  |  |  |  |  |  |  |  | 2.23 | 4.31 | 11.4 | 27.5 | 36.2 | 3.59 |
| Ho |  |  |  |  |  |  |  |  |  | 1.93 | 5.14 | 12.3 | 16.2 | 1.61 |
| Er |  |  |  |  |  |  |  |  |  |  | 2.66 | 6.38 | 8.41 | 1.2 |
| Tm |  |  |  |  |  |  |  |  |  |  |  | 2.4 | 3.16 | 3.19 |
| Yb |  |  |  |  |  |  |  |  |  |  |  |  | 1.32 | 7.66 |
| Lu |  |  |  |  |  |  |  |  |  |  |  |  |  | 10.1 |

| P507-kerosene-HCl-RECl3 | Ce | Pr | Nd | Sm | Eu | Gd | Tb | Dy | Ho | Er | Tm | Yb | Lu | Y |
|---|---|---|---|---|---|---|---|---|---|---|---|---|---|---|
| La | 1.089 | 1.116 | 1.226 | 2.158 | 2.349 | 2.534 | 3.370 | 4.240 | 4.993 | 5.068 | 5.425 | 6.767 | 7.021 | 4.562 |
| Ce | | 1.025 | 1.126 | 1.981 | 2.157 | 2.327 | 3.094 | 4.585 | 4.654 | 4.654 | 4.981 | 6.214 | 6.447 | 4.189 |
| Pr | | | 1.098 | 1.933 | 1.933 | 2.270 | 3.018 | 3.798 | 4.472 | 4.540 | 4.859 | 6.061 | 6.288 | 4.086 |
| Nd | | | | 1.760 | 1.916 | 2.067 | 2.749 | 3.458 | 4.073 | 4.134 | 4.425 | 5.520 | 5.726 | 3.721 |
| Sm | | | | | 1.089 | 1.175 | 1.562 | 1.965 | 2.314 | 2.349 | 2.514 | 3.137 | 3.254 | 2.114 |
| Eu | | | | | | 1.079 | 1.434 | 1.805 | 2.125 | 2.157 | 2.309 | 2.880 | 2.988 | 1.942 |
| Gd | | | | | | | 1.330 | 1.673 | 1.970 | 2.000 | 2.141 | 2.670 | 2.770 | 1.800 |
| Tb | | | | | | | | 1.258 | 1.482 | 1.504 | 1.610 | 2.008 | 2.083 | 1.354 |
| Dy | | | | | | | | | 1.178 | 1.195 | 1.279 | 1.596 | 1.656 | 1.076 |
| Ho | | | | | | | | | | 1.015 | 1.086 | 1.355 | 1.406 | 1.095 |
| Er | | | | | | | | | | | 1.070 | 1.335 | 1.385 | 0.900 |
| Tm | | | | | | | | | | | | 1.247 | 1.294 | 1.189 |
| Yb | | | | | | | | | | | | | 1.037 | 1.483 |
| Lu | | | | | | | | | | | | | | 1.539 |

***FIG. 22E* - Table IIIf**: Separation Factors for rare earth metals using P507.

| Cyanex 923 | Ce | Pr | Nd | Sm | Eu | Gd | Tb | Dy | Ho | Er | Tm | Yb | Lu | Y |
|---|---|---|---|---|---|---|---|---|---|---|---|---|---|---|
| La | 1.982 | 2.716 | 3.381 | 4.519 | 4.842 | 3.954 | 4.909 | 4.764 | 4.236 | 4.217 | 4.732 | 4.898 | 4.355 | 2.78 |
| Ce | | 1.371 | 1.706 | 2.2 | 2.443 | 1.995 | 2.477 | 2.404 | 2.138 | 2.128 | 2.388 | 2.472 | 2.198 | 1.403 |
| Pr | | | 1.245 | 1.663 | 1.782 | 1.455 | 1.807 | 1.754 | 1.56 | 1.552 | 1.742 | 1.803 | 1.603 | 1.024 |
| Nd | | | | 1.337 | 1.432 | 1.169 | 1.452 | 1.409 | 1.253 | 1.247 | 1.4 | 1.449 | 1.288 | 1.217 |
| Sm | | | | | 1.072 | 1.143 | 1.086 | 1.054 | 1.066 | 1.072 | 1.047 | 1.084 | 1.037 | 1.626 |
| Eu | | | | | | 1.224 | 1.014 | 1.016 | 1.143 | 1.148 | 1.024 | 1.012 | 1.112 | 1.742 |
| Gd | | | | | | | 1.242 | 1.205 | 1.072 | 1.067 | 1.197 | 1.239 | 1.102 | 1.422 |
| Tb | | | | | | | | 1.03 | 1.159 | 1.164 | 1.037 | 1.002 | 1.14 | 1.767 |
| Dy | | | | | | | | | 1.125 | 1.13 | 1.007 | 1.028 | 1.094 | 1.715 |
| Ho | | | | | | | | | | 1.042 | 1.169 | 1.211 | 1.076 | 1.456 |
| Er | | | | | | | | | | | 1.122 | 1.161 | 1.033 | 1.517 |
| Tm | | | | | | | | | | | | 1.035 | 1.057 | 1.704 |
| Yb | | | | | | | | | | | | | 1.125 | 1.76 |
| Lu | | | | | | | | | | | | | | 1.567 |

***FIG. 22F* - Table IIIg**: Separation Factors for rare earth metals using Cyanex 923.

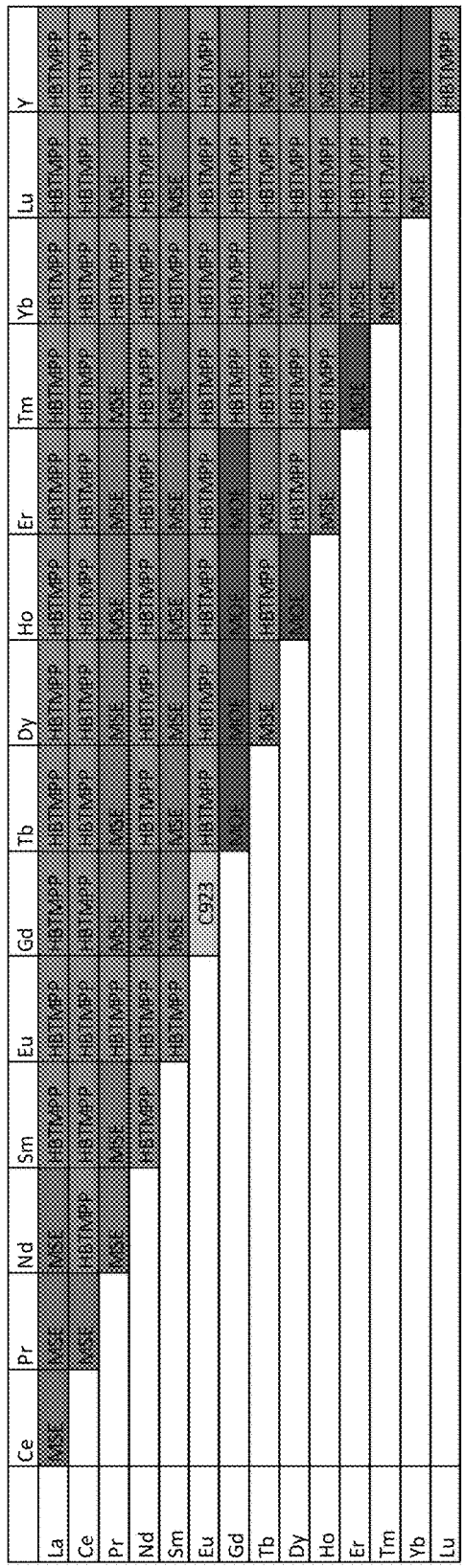

*FIG. 22G* - Table IIIh: Presentation of technologies with highest separation factor for each rare earth metal pairing.

| | Light | | | | | | Heavy | | | | | | Averages | |
|---|---|---|---|---|---|---|---|---|---|---|---|---|---|---|
| | La-Ce | Ce-Pr | Pr-Nd | Nd-Sm | Sm-Eu | Eu-Gd | Gd-Tb | Tb-Dy | Dy-Ho | Ho-Er | Er-Tm | Tm-Yb | Yb-Lu | Light | Heavy |
| MSE 1500°C | 24.36 | 16.79 | 7.763 | 2.801 | - | - | 1.410 | 2.357 | 1.038 | 3.417 | 1.173 | 640.5 | 1980 | 12.93 | 375.7 |
| MOE 1500°C | 2.462 | 1.002 | 1.416 | 1.167 | - | - | 23.22 | 1.683 | 3.660 | 2.315 | 9.051 | 1180 | 1788 | 1.51 | 429.6 |
| HDEHP-HCl | 2.17 | 1.05 | 1.93 | 1.44 | 1.32 | 1.1 | 1.08 | 1.34 | 1.36 | 1.21 | - | - | - | 1.65 | 1.25 |
| HBTMPP | 11.7 | 3.39 | 1.3 | 13.2 | 1.34 | 1.16 | 3.22 | 1.92 | 2.23 | 1.93 | 2.66 | 2.4 | 1.32 | 7.40 | 2.24 |
| P507-kerosene-HCl-REcl3 | 1.089 | 1.025 | 1.098 | 1.760 | 1.089 | 1.079 | 1.330 | 1.258 | 1.178 | 1.015 | 1.070 | 1.247 | 1.037 | 1.243 | 1.162 |
| Cyanex 923 | 1.982 | 1.371 | 1.245 | 1.337 | 1.072 | 1.224 | 1.242 | 1.03 | 1.125 | 1.042 | 1.122 | 1.035 | 1.125 | 1.484 | 1.103 |

*FIG. 22H* - Table IIIi: Comparison of separation factors for light, heavy, and nearest neighbor rare earth metals.

SELECTIVE SULFIDATION AND DESULFIDATION

CROSS-REFERENCE TO RELATED APPLICATION(S)

This patent application claims the benefit of U.S. Provisional Patent Application No. 62/982,373 entitled SELECTIVE SULFIDATION AND DESULFIDATION filed Feb. 27, 2020, which is hereby incorporated herein by reference in its entirety.

As described herein, certain exemplary embodiments can be used to prepare materials for use in conjunction with molten sulfide electrolysis such as described in U.S. patent application Ser. No. 16/726,137 entitled "SULFIDES ELECTROLYTE FOR METAL PROCESSING AND EXTRACTION" filed Dec. 23, 2019 corresponding to U.S. Patent Application Publication No. US 2020/0247670 published Aug. 6, 2020, which is a continuation of U.S. patent application Ser. No. 16/302,684 entitled "SULFIDES ELECTROLYTE FOR METAL PROCESSING AND EXTRACTION" filed on Nov. 19, 2018 corresponding to U.S. Patent Application Publication No. US 2019/0127221 published May 2, 2019, which is the national phase entry under 35 U.S.C. 371 of International Patent Application No. PCT/US2017/033602 having an International Filing Date of 19 May 2017, which claims priority to U.S. Application No. 62/338,950, filed May 19, 2016, entitled "SULFIDES ELECTROLYTE FOR METAL PROCESSING AND EXTRACTION," and U.S. Provisional Application No. 62/415,129, filed Oct. 31, 2016, entitled "SULFIDES ELECTROLYTE FOR METAL PROCESSING AND EXTRADITION," each of which is hereby incorporated herein by reference in their entirety.

STATEMENT REGARDING FEDERALLY SPONSORED RESEARCH

This invention was made with Government support under Grant No. DE-EE0008316 awarded by the Department of Energy. The Government has certain rights in the invention.

STATEMENT REGARDING PRIOR DISCLOSURES BY THE INVENTOR OR A JOINT INVENTOR UNDER 37 C.F.R. 1.77(b)(6)

N/A.

FIELD OF THE INVENTION

The invention generally relates to selective sulfidation and desulfidation such as for ore and concentrate cracking, metal separation, compound production, and recycling.

BACKGROUND OF THE INVENTION

Difficult metal separation challenges often employ hydrometallurgy for metal separation via solvent extraction. FIG. 1A is a schematic diagram showing some of the types of processes typically involved in hydrometallurgy processes as known in the art. Such hydrometallurgy processes can be employed for isolating difficult to separate oxides such as rare earths, nickel-cobalt, niobium-tantalum, scandium-iron, and in NMC (nickel manganese cobalt) recycling (e.g., lithium-ion batteries with nickel-manganese-cobalt-oxide cathodes).

Generally speaking, compound isolation processes such as solvent extraction, ion exchange, precipitation, etc. are considered to be commercially-expensive from one perspective or another, e.g., implementation cost (e.g., capital, time, process effectiveness/efficiency, process selectivity, etc.), environmental impact, etc. For example, solvent extraction generally exhibits high selectivity and is capitally-comparable to other processing steps but shows an outsized environmental impact, whereas ion exchange often can be performed in an environmentally-friendly manner but can be inefficient (and therefore commercially-costly) due to many factors such as the concentration of target material in the feedstock and the types of competing materials in the feedstock that can reduce the purity of the resulting product and can reduce or even halt the ion exchange process. Therefore, to reduce or eliminate the burdens compound isolation processes such as solvent extraction and ion exchange, significant research has been directed to improving selectivity in alternative roasting, leaching, or electrowinning processes including molten oxide electrolysis for separating rare earths, carbochlorination for separating rare earths and niobium-tantalum (although selectivity remains low, and iron can co-chlorinate), and acid roasting/leaching for rare earths, NMC cathodes, and scandium-iron (although many similar environmental challenges exist).

SUMMARY OF VARIOUS EMBODIMENTS

In accordance with one embodiment of the invention, a process for selective sulfidation of a target metal compound of a feedstock material comprises introducing a feedstock material into a reactor, the feedstock material containing a target metal compound consisting of a metal oxide, oxysulfide, carbonate, sulfate, or sulfide; producing a flow of sulfur-containing gas within the reactor; and passing the flow of sulfur-containing gas through the feedstock material while controlling a roasting atmosphere in the reactor about the feedstock material including at least a process temperature and a ratio of sulfur to sulfur dioxide chosen for selective sulfidation of the target component to produce selectively sulfidized compound including a sulfate, oxysulfide, or sulfide of the target metal, the ratio of sulfur to sulfur dioxide being maintained above a predetermined critical ratio for such selective sulfidation of the target metal compound.

In various alternative embodiments, the selective sulfidation may be run as a continuous or semi-continuous process. The selective sulfidation may include high temperature selective sulfidation of an individual metal oxide, sulfate, carbonate, oxysulfide, or sulfide from a mixture of highly chemically-similar metal compounds in the feedstock material. Controlling the roasting atmosphere may include implementation of a carbothermically-driven sulfur reflux system by back-reacting product sulfur dioxide to control sulfide product selectivity and valency. Implementing the carbothermically-driven sulfur reflux system may include introducing a carbon species into the reactor during selective sulfidation to remove sulfur dioxide from the reactor and reflux it back into sulfur while producing carbon monoxide or carbon dioxide. The selective sulfidation may include crystallization of the target metal compound from a mixed amorphous or semi-amorphous metal compound and/or spontaneous separation of the selectively sulfidized compound upon sulfidation from a mixed metal compound due to differences in phase stability of the selectively sulfidized compound compared to the original target metal compound. The process may further include extracting the selectively sulfidized compound from the feedstock material. The process may further include using at least the selectively sulfidized compound in a subsequent molten sulfide electrolysis process, wherein the selectively sulfidized compound may include at least one of barium sulfide or a rare earth sulfide. Controlling the roasting atmosphere may include controlling a ratio of carbon monoxide to carbon dioxide within the reactor to stabilize or react the target metal compound. Controlling the roasting atmosphere may include controlling porosity change of the feedstock material within the reactor to stabilize or react the target metal compound. The process may further include pre-treating the feedstock material prior to introducing the feedstock material into the reactor including at least one of calcination, dehalogenation, dephosphorization, or sulfidative sintering.

In accordance with one embodiment of the invention, a reactor for selective sulfidation of a target metal compound of a feedstock material comprises a receptacle for receiving a feedstock material containing a target metal compound consisting of a metal oxide, oxysulfide, carbonate, sulfate, or sulfide; a source of sulfur-containing gas; and a process controller configured to control a roasting atmosphere in the reactor about the feedstock material while a flow of the sulfur-containing gas passes through the feedstock material including at least a process temperature and a ratio of sulfur to sulfur dioxide chosen for selective sulfidation of the target component to produce selectively sulfidized compound including a sulfate, oxysulfide, or sulfide of the target metal, the ratio of sulfur to sulfur dioxide being maintained above a predetermined critical ratio for such selective sulfidation of the target metal compound.

In various alternative embodiments, the reactor may be configured to run selective sulfidation as a continuous or semi-continuous process. The selective sulfidation may include high temperature selective sulfidation of an individual metal oxide, sulfate, carbonate, oxysulfide, or sulfide from a mixture of highly chemically-similar metal compounds in the feedstock material. Controlling the roasting atmosphere may include implementation of a carbothermically-driven sulfur reflux system that back-reacts product sulfur dioxide to control sulfide product selectivity and valency. The reactor may further include a carbon source that introduces a carbon species into the reactor during selective sulfidation to remove sulfur dioxide from the reactor and reflux it back into sulfur while producing carbon monoxide or carbon dioxide. The selective sulfidation may include crystallization of the target metal compound from a mixed amorphous or semi-amorphous metal compound and/or spontaneous separation of the selectively sulfidized compound upon sulfidation from a mixed metal compound due to differences in phase stability of the selectively sulfidized compound compared to the original target metal compound. Controlling the roasting atmosphere may include controlling a ratio of carbon monoxide to carbon dioxide within the reactor to stabilize or react the target metal compound. Controlling the roasting atmosphere may include controlling porosity change of the feedstock material within the reactor to stabilize or react the target metal compound.

Additional embodiments may be disclosed and claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Those skilled in the art should more fully appreciate advantages of various embodiments of the invention from the following "Description of Illustrative Embodiments," discussed with reference to the drawings summarized immediately below.

FIGS. 22A-22B show thermodynamic separation factors for liquid rare earth sulfides.

FIG. 22C depicts the separation factors of industrially-employed hydrometallurgical solvent extraction and acid leaching technology HDEHP-HCL.

FIG. 22D depicts the separation factors of industrially-employed hydrometallurgical solvent extraction and acid leaching technology HBTMPP.

FIG. 22E depicts the separation factors of industrially-employed hydrometallurgical solvent extraction and acid leaching technology P507.

FIG. 22F depicts the separation factors of industrially-employed hydrometallurgical solvent extraction and acid leaching technology Cyanex 923.

FIG. 22G depicts a comparison of the chemistry with the highest selectivity for each rare earth metal.

FIG. 22H reports nearest neighbor selectivities.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Figure 1A:
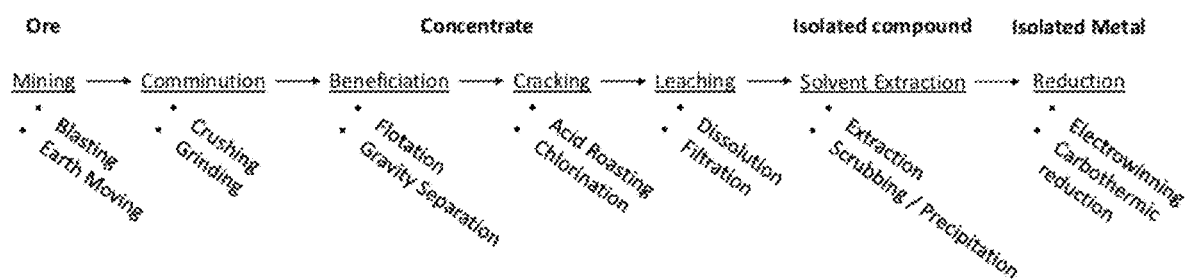
FIG. 1A is a schematic diagram showing some of the types of processes typically involved in hydrometallurgy processes as known in the art.

Various embodiments utilize selective sulfidation and/or desulfidation for such things as ore and concentrate cracking, metal separation, compound production, and recycling. Selective sulfidation can be used to selectively convert an oxide or other material in a feedstock to a sulfide or other sulfur-containing material, and selective desulfidation can be used to selectively convert a sulfide or other sulfur-containing material in a feedstock to an oxide or other material. In some cases, the material produced by such selective sulfidation/desulfidation of the feedstock can itself be novel and/or commercially valuable, while in other cases, such selective sulfidation/desulfidation can be followed by one or more processes to extract, isolate, or concentrate the converted material. In certain exemplary embodiments, a sulfidation or desulfidation process is added into a feedstock processing workflow at an early stage, e.g., between comminution and beneficiation, so that materials can be separated without the need for later-stage solvent extraction or other processes that can be environmentally harmful and/or economically expensive or impractical. A key aspect of exemplary embodiments is in controlling the operating parameters and chemical processes occurring inside of the reactor, as discussed in greater detail below.

Selective sulfidation is a promising technology for moving the burden of solvent extraction upstream to environmentally and capitally sustainable processes such as flotation and magnetic separation, and also for facilitating new technologies such as molten sulfide electrolysis. Selective sulfidation has been successfully demonstrated for ore-upgrading and sulfidation of key commodity metals such as copper, nickel, zinc, lead, and tin. Oxides and sulfides are easy to separate utilizing technologies such as flotation, magnetic separation, and leaching (aqueous and molten-state), moving the burden of selectivity upstream from solvent extraction to more environmentally-benign processes. By controlling the sulfur to sulfur dioxide ratio and other process parameters within the reactor (e.g., carbon content, temperature, gas residence time, particle size, etc.), a metal oxide can be stabilized or reacted to form a sulfate, oxysulfide, or sulfide. In principle any metal oxide, sulfate, carbonate, etc. can be sulfidized. Meanwhile, in principle, any sulfide can be desulfidized through similar reactions. Control of the roasting atmosphere within the reactor facilitates selectivity. Thermodynamic models help inform the $S_2/SO_2$ ratio and $CO/CO_2$ ratio required for a particular sulfidation or desulfidation reaction.

Herein thermodynamic, kinetic, and transport phenomena models and experimental data demonstrate a new path to industrially-scalable, continuous, selective sulfidation processes utilizing elemental sulfur. The sulfidized products support solid-solid or solid-liquid separation of difficult to isolate rare earth and transition metals, with an opportunity to significantly reduce both process capital cost and environmental impact over conventional liquid-liquid hydrometallurgy. Previous attempts at selective sulfidation proved sulfidation is intrinsically feasible, but did not support scalability, in part due to unexplored reaction kinetics and ill-characterized limiting transport phenomena. Most selective sulfidation studies for transition metal separations and ore upgrading used condensed sulfur sources, not readily amenable to continuous operations, that masked the role of sulfidation kinetics and mass transport, such as solid metal sulfides or sulfur/oxide briquettes. Indeed, sulfur gas mass transport and kinetic limitations can readily restrict sulfidation reaction conversion, requiring the use of more powerful—yet toxic—sulfidizing agents such as $H_2S$ or $CS_2$. However, $H_2S$ and $CS_2$ are well-known in catalysis to facilitate complete sulfidation of mixed metal oxides, raising doubts around their suitability for selective sulfidation.

We therefore propose a thermodynamic framework for selective sulfidation of the oxides of different metals. We also demonstrate the role of carbon in selective sulfidation and define carbon to metal oxide feed ratios for difficult to separate mixed oxides. We validate effective selective sulfidation and separation for scandium-iron oxides, neodymium-praseodymium-dysprosium oxides, and nickel-manganese-cobalt oxide (NMC) lithium ion battery cathodes, and others. Those separations are chosen as representative of ongoing challenges in critical metals extraction or recycling and highlight the utility of selective sulfidation for a sustainable future.

The ease of separation of metal compounds in the thermodynamic limit is generally viewed as the difference between their relative stabilities, described for oxides and sulfides by the oxygen and sulfur partial pressures necessary for reduction of the metal to occur, $[P_{O2}]_{crit}$ and $[P_{S2}]_{crit}$ respectively. Values of $[P_{O2}]_{crit}$ and $[P_{S2}]_{crit}$ are tabulated in FIG. 1B. $P_{O2}$ is conventionally set through either the $CO/CO_2$ ratio in the furnace when carbon is used as a reductant, or the $H_2/H_2O$ ratio when hydrogen is used as a reductant. However, both ratios are difficult to control in conventional pyrometallurgical operations, hindering selective reduction and recovery of metals, such as cobalt and nickel from iron in lithium ion battery recycling. Reductive separation is further complicated by undesirable carbide formation in highly-stable oxides, such as for scandium recovery from iron or in rare earth carbothermic reduction. Similar challenges exist for the pyrometallurgical processing of sulfides, resulting in the use of liquid-liquid hydrometallurgy for challenging metal oxide and metal sulfide separations.

However, partial sulfidation of a mixed oxide facilitates separation that is not reductive in nature, leveraging physical property differences between oxides and sulfides for separation. The sulfidation of an oxide is thermodynamically defined by the $S_2$, $O_2$, and $SO_2$ partial pressures, sometimes referred to herein as $P_{S2}$, $P_{O2}$, and $P_{SO2}$ respectively. Pyrometallurgical roasting controls $P_{S2}$ and $P_{O2}$ to stabilize oxides, sulfides, oxysulfides, or sulfates, meanwhile, by Le Chatelier's principle, a critical $P_{S2}/P_{SO2}$ ratio, $[P_{S2}/P_{SO2}]_{crit}$ can be determined for a given sulfidation reaction to become thermodynamically spontaneous, presented in FIG. 1B for 56 metals. Unlike $P_{O2}$ for oxide reduction and $P_{S2}$ for sulfide reduction, the $P_{S2}/P_{SO2}$ ratio for sulfidation of an oxide can be precisely controlled due to additional degrees of freedom in operation compared to simple metal reduction, enabling selective sulfidation of metal oxides.

$[P_{S2}/P_{SO2}]_{crit}$, while defining the thermodynamic landscape of sulfidation, also delineates the permissible $S_2$ inlet and $SO_2$ accumulation for sulfidation to occur within a reactor, allowing for transport and kinetic effects to be considered. Without limitation, three possibilities to control $P_{S2}$ and $P_{SO2}$ within the reactor are: i) the rate of the sulfidation reaction itself, ii) the gas space time and velocity in and out of the reactor, and iii) the chemical reaction of $S_2$ and $SO_2$ with other species within the reactor. Addition of carbon can provide yet another degree of operation freedom, previously proposed as a means to increase the $P_{S2}/P_{SO2}$ ratio during sulfidation by reducing $SO_2$ into elemental sulfur, facilitating a carbothermically-driven sulfur reflux of $SO_2$. However, in the presence of carbon, selectivity is lost for many transition metals due to co-sulfidation. For example, the sulfidation of $Fe_2O_3$ to FeS becomes thermodynamically unavoidable at $P_{S2}$ above 0.05 atm in the presence of carbon, with many critical metals including Co, In, Mn, Ni, Sn, W, and Zn showing similar sulfidation behavior. This result justifies the selectivity challenges encountered in previous approaches that used carbon for the selective sulfidation of mixed-transition metals such Fe—Ni and Fe—Zn, with kinetic effects further contributing to selectivity.

We also show that selective sulfidation and selective desulfidation operate in essentially the same ways. Thus, for example, the same reactor and reactor parameters can be used to selectively sulfidize one material or to selectively desulfidize another material such as in preparation for later comminution and physical separation steps.

The drawings, including the text in the drawings, are incorporated herein physically and by reference and form part of the specification and disclosure of this patent application.

CHAPTER I—INTRODUCTION

This chapter provides an introduction to selective sulfidation relative to other extraction methods. Numbers shown in brackets are citations to references listed at the end of this chapter.

Specialized and strategically significant metals such as the rare earths, cobalt, and nickel remain critical for advanced electronics, metallurgical, and consumer applications ranging from super alloys to electric vehicle batteries to computer hard drives. However, primary production and subsequent recycling of these metals embodies significant challenges in metals extraction, separation, and recovery. Due to the chemical similarity of rare earth metals and the fact that they always found together in nature, separating individual rare earth metals is technologically challenging [1], requires significant capital investment [1], and remains a significant source of environmental pollution and degradation [2-5]. Other difficult to separate metals such as cobalt and nickel face similar separation challenges [6], hindering recycling in applications where they are used together, such as in lithium ion batteries [7]. The economic and environmental burden of existing solvent extraction methods of metal separation motivates continued research both in the primary production and recycling of difficult to separate metals.

Conventional hydrometallurgical primary production begins with extraction via mining, followed by comminution to reduce the size of the ore via crushing and grinding, beneficiation to remove low-value gangue materials via flotation and magnetic separation to produce a concentrate, cracking of the concentrate via acid roasting or chlorination, leaching of the metal ions from the cracked concentrate, and solvent extraction to separate and precipitate individual metals as oxides [1]. Throughout the processing stream for rare earth metal production, typically the largest individual process contribution to environmental degradation[7] and capital cost [8-11] is solvent extraction. Meanwhile, the largest increase in product value along the processing stream also occurs upon solvent extraction to separate and precipitate the individual metal oxides [12]. The primary separation of nickel and cobalt is less tedious than the rare earth metals, yet the hydrometallurgical processing pathway of nickel and cobalt follows a similar processing route [6]. Meanwhile for the recycling of difficult to separate metals from e-waste such as lithium ion batteries, the typical hydrometallurgical process follows a familiar pattern to primary extraction, consisting of battery collection, size reduction, cracking via roasting, then solvent-based leaching and extraction [7].

Due to the simultaneous high product value attained and the large environmental and capital cost associated with solvent extraction, significant research has been directed towards improvements, pretreatments, and substitutions for solvent extraction in primary production and recycling of difficult to separate metals. For rare earth separation in recycling and primary production, alternative processing technologies ranging from molten oxide [12] or halide [13,14] electrolysis to vapor phase extraction with carbochlorination [15-19] have been studied as means to match the highly-selective nature of solvent extraction, with promising levels of success. However, these technologies remain in their infancy, far removed from well-studied and established hydrometallurgical methods. Technologies based on established ore/concentrate cracking methods have recently been given significant attention in metal separation as a means to move the burden of selectivity upstream from solvent extraction to less expensive and more environmentally-friendly beneficiation or leaching processes. Selective sulfation of a target metal oxide to a sulfate via acid roasting and subsequent leaching has seen significant progress in isolating and separating rare earth metals [13, 20-25], and has also been applied to recovery of valuable metals from lithium ion battery waste [26]. However, established acid roasting technology presents many similar environmental complications to solvent extraction such as freshwater ecotoxicity and eutrophication [3]. Direct roasting with sulfur dioxide has also been studied as a means to produce metal sulfates for metal recovery via leaching, yet currently shows low rates of target metal recovery [27]. For transition metals, well-established carbochlorination technology for ore cracking of transition metals has seen continued improvements to selectivity since its introduction [28-32]. However, carbochlorination for rare earth metal production at an industrial scale is not currently practiced due to high rates of iron co-chlorination [1].

Meanwhile, a promising technology for rare earth and transition metal recovery and extraction is the selective sulfidation of oxides to sulfides. Selective sulfidation has thus far been demonstrated as a feasible means of separation or ore upgrading for a range of commodity metals including nickel [33,34], zinc [35,36], lead [37], manganese [38], and copper [39]. Methods of selective sulfidation have included roasting with sulfur or sulfur gasses [33, 35, 38, 40], mechanochemical reaction [39, 41, 42] during comminution, co-roasting with other sulfides [36,43], or hydrometallurgical methods [44-46]. Sulfidation of individual oxides has also been demonstrated for a large range of elements including the alkaline [47] and rare earths [48-50]. Following selective sulfidation, sulfides can be easily separated from oxides at industrially-relevant scales through economical and environmentally-sustainable technologies such as froth flotation [33, 39, 43, 44] or magnetic separation [39,51], suggesting that selective sulfidation is a promising technology for more sustainable and economic metal separation in minerals, concentrates, or e-wastes.

The thermodynamics of selective sulfidation have been modeled for nickeliferous laterite [34], yet a broader thermodynamic study of the potential selectivity of sulfidation for other metal oxides, to the inventors' knowledge, has not been conducted.

Furthermore, the kinetics of high-temperature sulfidation of metal oxides via sulfur gas roasting remains largely unexplored. Indeed, the lack of thermodynamic and kinetic data surrounding selective sulfidation greatly hinders the design of novel, environmentally-friendly, and capitally-efficient metal separation technologies.

Herein, we propose selective sulfidation applied to difficult to separate metal and metal oxide primary ores and waste as a means to vastly improve conventional separation technology while facilitating novel separation methods. We present a thermodynamic model for sulfur to sulfur dioxide ratios to selectively sulfidize oxides via controlled atmosphere roasting and exhibit kinetics measurements for the sulfidation reaction of lanthanum oxide to lanthanum sulfide via reaction with gaseous elemental sulfur.

Following, we demonstrate experimentally that sulfidation can be performed selectively on individual metals within difficult to separate metal oxides, presenting selective sulfidation within NMC cathodes, rare earth magnet materials, and mixed rare earth/transition metal oxides. We proceed to show that upon selective sulfidation of individual components of difficult to separate metals, oxides, and metal ore concentrates, vastly improved separation criteria and performance is achieved. promising significant savings in environmental and capital footprints.

CHAPTER 1 REFERENCES

1. Zhao, B., Zhang, J. & Schreiner, B. Separation Hydrometallurgy of Rare Earth Elements. (Springer International Publishing AG Switzerland, 2016).
2. Zhang, X., Gao, F., Gong, X., Wang, Z. & Liu, Y. Life Cycle Assessment of Erbium Oxide and Scandium Oxide. Mater. Sci. Forum 944, 1130-1136 (2019).
3. Bailey, G. et al. Review and new life cycle assessment for rare earth production from bastnäsite, ion adsorption clays and lateritic monazite. Resour. Conserv. Recycl. (2020). doi:10.1016/j.resconrec.2019.104675
4. Sprecher, B. et al. Life cycle inventory of the production of rare earths and the subsequent production of NdFeB rare earth permanent magnets. Environ. Sci. Technol. 48, 3951-3958 (2014).
5. Vahidi, E. & Zhao, F. Environmental life cycle assessment on the separation of rare earth oxides through solvent extraction. J. Environ. Manage. (2017). doi:10.1016/j.jenvman.2017.07.076
6. Flett, D. S. Solvent extraction in hydrometallurgy: the role of organophosphorus extractants. J. Organomet. Chem. 690, 2426-2438 (2005).
7. Ciez, R. E. & Whitacre, J. F. Examining different recycling processes for lithium-ion batteries. Nat. Sustain. 2, 148-156 (2019).
8. Hall, L. C. O. N. & Kelley, S. Yangibana Project. Definitive Feasibility Study (2015).
9. Limited, N. M. Browns Range Project. Preliminary Feasibility Study (2014).
10. Ciuculescu, T. et al. Nechalacho Rare Earth Elements Project. Feasibility Study (2013). doi:10.1017/CB09781107415324.004
11. Limited, P. R. Ngualla Rare Earth Project. Q. Rep. (2012).
12. Nakanishi, B. R. & Allanore, A. Electrochemical Investigation of Molten Lanthanum-Yttrium Oxide for Selective Liquid Rare-Earth Metal Extraction. J. Electrochemical Soc. 166, 420-428 (2019).
13. Yang, Y. et al. Recovery of rare-earth element from rare-earth permanent magnet waste by electro-refining in molten fluorides. Sep. Purif. Technol. 233, 116030 (2020).
14. Hua, Z. S. et al. Extraction of rare earth elements from NdFeB scrap by AlF<inf>3</inf>-NaF melts. Mater. Sci. Technol. (United Kingdom) 31, 1007-1010 (2015).
15. Wang, Z. C., Zhang, L. Q., Lei, P. X. & Chi, M. Y. Rare earth extraction and separation from mixed bastnaesite-monazite concentrate by stepwise carbochlorination-chemical vapor transport. Metall. Mater. Trans. B Process Metall. Mater. Process. Sci. 33, 661-668 (2002).
16. Lyons, K. M., Downey, J. P., Chorney, J. L. & Schumacher, K. J. Selective separation of rare earth chlorides utilizing vapor phase extraction. in Minerals, Metals and Materials Series Part F3, 55-63 (Springer International Publishing, 2017).
17. Mochizuki, Y., Tsubouchi, N. & Sugawara, K. Selective recovery of rare earth elements from Dy containing NdFeB magnets by chlorination. ACS Sustain. Chem. Eng. 1, 655-662 (2013).
18. Zhang, L. Q., Wang, Z. C., Tong, S. X., Lei, P. X. & Zou, W. Rare earth extraction from bastnaesite concentrate by stepwise carbochlorination-chemical vapor transport-oxidation. Metall. Mater. Trans. B Process Metall. Mater. Process. Sci. 35, 217-221 (2004).
19. Sun, Y. H., Zhang, L. Q., Lei, P. X., Wang, Z. C. & Guo, L. Stepwise chlorination-chemical vapor transport reaction for rare earth oxide mixtures Gd 2 O 3-Tb 4 O 7, Tb 4 O 7-Dy 2 O 3 and Dy 2 O 3-Ho 2 O 3. J. Alloys Compd. 335, 196-199 (2002).
20. Ali, M., Onal, R. & Binnemans, K. Recovery of rare earths from waste cathode ray tube (CRT) phosphor powder by selective sulfation roasting and water leaching. Hydrometallurgy 183, 60-70 (2019).
21. Narayanan, R. P., Kazantzis, N. K. & Emmert, M. H. Selective Process Steps for the Recovery of Scandium from Jamaican Bauxite Residue (Red Mud). ACS Sustain. Chem. Eng. 6, 1478-1488 (2018).
22. Onghena, B., Borra, C. R., Gerven, T. Van & Binnemans, K. Recovery of scandium from sulfation-roasted leachates of bauxite residue by solvent extraction with the ionic liquid betainium bis(trifluoromethylsulfonyl)imid. Sep. Purif. Technol. 176, 208-219 (2017).
23. Liu, Z., Zong, Y., Li, H., Jia, D. & Zhao, Z. Selectively recovering scandium from high alkali Bayer red mud without impurities of iron, titanium and gallium. J. Rare Earths 35, 896-905 (2017).
24. Carlson, B. N. & Taylor, P. R. Selective sulfation roasting of rare earths from NdFeB magnet scrap. in Minerals, Metals and Materials Series 293-299 (Springer International Publishing, 2017). doi:10.1007/978-3-319-51091-0_27
25. Borra, C. R. et al. Selective recovery of rare earths from bauxite residue by combination of sulfation, roasting and leaching. Miner. Eng. 92, 151-159 (2016).
26. Korkmaz, K., Alemrajabi, M., Rasmuson, A. & Forsberg, K. Recoveries of Valuable Metals from Spent Nickel Metal Hydride Vehicle Batteries via Sulfation, Selective Roasting, and Water Leaching. J. Sustain. Metall. 4, 313-325 (2018).
27. Shi, J. et al. Sulfation Roasting Mechanism for Spent Lithium-Ion Battery Metal Oxides Under SO2-O2-Ar Atmosphere. JOM 71, 4473-4481 (2019).
28. Du, G., Fan, C., Yang, H. & Zhu, Q. Selective extraction of vanadium from pre-oxidized vanadium slag by carbo- 29. Rhee, K. I. & Sohn, H. Y. The selective carbochlorination of iron from titanlferous magnetite ore in a fluidized bed. Metall. Trans. B 21, 341-347 (1990).
30. Sohn, H. Y. & Zhou, L. The kinetics of carbochlorination of titania slag. Can. J. Chem. Eng. 76, 1078-1082 (1998).
31. Gaballah, I. & Djona, M. Recovery of Co, Ni, Mo, and V from unroasted spent hydrorefining catalysts by selective chlorination. Metall. Mater. Trans. B 26, 41-50 (1995).
32. Gonzalez, J., Bohé, A., Pasquevich, D., Del, & M. & Ruiz, C.) β-Ta 2 O 5 Carbochlorination with Different Types of Carbon. Can. Metall. Q. 41, 29-40 (2002).
33. Harris, C. T., Peacey, J. G. & Pickles, C. A. Selective sulphidation and flotation of nickel from a nickeliferous laterite ore. Miner. Eng. 54, 21-31 (2013).
34. Pickles, C. A., Harris, C. T., Peacey, J. & Forster, J. Thermodynamic analysis of the Fe—Ni—Co—Mg—Si—O—H—S—C—Cl system for selective sulphidation of a nickeliferous limonitic laterite ore. Miner. Eng. 54, 52-62 (2013).
35. Han, J. et al. Mechanism study on the sulfidation of ZnO with sulfur and iron oxide at high temperature. Sci. Rep. 7, 1-12 (2017).
36. Han, J. et al. Selective Sulfidation of Lead Smelter Slag with Pyrite and Flotation Behavior of Synthetic ZnS. Metall. Mater. Trans. B Process Metall. Mater. Process. Sci. 47, 2400-2410 (2016).
37. Han, J., Liu, W., Wang, D., Jiao, F. & Qin, W. Selective Sulfidation of Lead Smelter Slag with Sulfur. Metall. Mater. Trans. B Process Metall. Mater. Process. Sci. 47, 344-354 (2016).
38. You, Z. et al. Reductive roasting of iron-rich manganese oxide ore with elemental sulfur for selective manganese extraction. J. Min. Metall. Sect. B Metall. 53, 115-122 (2017).
39. Wang, J., Lu, J., Zhang, Q. & Saito, F. Mechanochemical Sulfidization of Nonferrous Metal Oxides by Grinding with Sulfur and Iron. Ind. Eng. Chem. Res. 42, 5813-5818 (2003).
40. Harris, C. T., Peacey, J. G. & Pickles, C. A. Selective sulphidation of a nickeliferous laterite ore. Miner. Eng. 24, 651-660 (2011).
41. Masdarian, M., Azizi, A. & Bahri, Z. Mechanochemical Sulfidization of a Mixed Oxide-Sulphide Copper Ore by Co-grinding with Sulfur and Its Effect on the Flotation Efficiency. Chinese J. Chem. Eng. (2019).
42. Yuan, W., Li, J., Zhang, Q. & Saito, F. Mechanochemical sulfidization of lead oxides by grinding with sulfur. Powder Technol. 230, 63-66 (2012).
43. Liu, W., Zhu, L., Han, J., Jiao, F. & Qin, W. Sulfidation mechanism of ZnO roasted with pyrite. Sci. Rep. 8, 1-12 (2018).
44. Li, C.-X. et al. Hydrothermal Sulfidation and Flotation of Oxidized Zinc-Lead Ore. Metall. Mater. Trans. B 45B, 833-838 (2014).
45. Liang, Y. J. et al. Hydrothermal sulfidation and floatation treatment of heavy-metal-containing sludge for recovery and stabilization. J. Hazard. Mater. 217-218, 307-314 (2012).
46. Ke, Y. et al. Behavior and effect of calcium during hydrothermal sulfidation and flotation of zinc-calcium-based neutralization sludge. Miner. Eng. 74, 68-78 (2015).
47. Zhang, W., Zhou, Y., Zhu, J. & Pan, Y. New clean process for barium sulfide preparation by barite reduction with elemental sulfur. Ind. Eng. Chem. Res. 53, 5646-5651 (2014).
48. Heindl, R. & Loriers, J. Synthese d'oxysulfures de lanthanides (LnO)2S et de thorium ThOS, par action de la vapeur de soufre sur les oxydes, oxalates, et oxycarbonates. Soc. Chim. Fr. Bull. 3-4, 377-378 (1974).
49. Flahaut, J., Domange, L., Guittard, M. & Loriers, J. Les sulfures d'ytterbium. Memiors Present. A La Soc. Chim. 7, 102-105 (1961).
50. Flahaut, J., Guittard, M., Loriers, J. & Patrie, M. Les sulfures et oxysulfures de gadolinium, dysprosium et erbium. Chemie Miner. 2291-2293 (1957). doi:10.1080/10643389.2012.728825
51. Ji, J.-H. et al. Magnetic separation of metal sulfides/oxides by Fe 304 at room temperature and atmospheric pressure. Rare Met. 38, 379-389 (2019).

CHAPTER 2—DERIVATION OF CRITICAL GAS RATIOS AND FLOWRATES FOR SELECTIVE SULFIDATION

This chapter describes a general framework that can be used to derive critical gas ratios and flowrates for selective sulfidation. As discussed herein, process parameters for any given selective sulfidation regime, such as gas ratios (e.g., $S_2/SO_2$, $CO/CO_2$) and gas flow rates, are difficult to calculate exactly due to the complexity of chemical processes and interactions, but this framework can be helpful in estimating process parameters such as for developing and fine-tuning a selective sulfidation process.

For derivation of critical gas ratios, a generalized sulfidation or desulfidation reaction of a condensed metal oxide, oxysulfide, sulfate, or sulfide reactant ($M_\beta O_\gamma S_\delta$) with diatomic, elemental sulfur gas ($S_2$) to form a condensed metal oxide, oxysulfide, sulfate, or sulfide product ($M_\epsilon O_\zeta S_\eta$) and gaseous sulfur dioxide ($SO_2$) can be described by Eq. 1, where β, γ, δ, ϵ, ζ, and η are stoichiometric factors.

$$\frac{4\epsilon}{2\beta\eta + \gamma\epsilon - 2\delta\epsilon - \beta\zeta} M_\beta O_\gamma S_\delta + S_2 = \frac{4\beta}{2\beta\eta + \gamma\epsilon - 2\delta\epsilon - \beta\zeta} M_\epsilon O_\zeta S_\eta + \frac{2(\gamma\epsilon - \beta\zeta)}{2\beta\eta + \gamma\epsilon - 2\delta\epsilon - \beta\zeta} SO_2 \quad (1)$$

At thermodynamic equilibrium, the relation between the standard Gibbs energy of reaction ($\Delta_r G°$), activity of the sulfidation reactant ($a_{M_\beta O_\gamma S_\delta}$), partial pressure of sulfur ($P_{S_2}$), activity of the sulfidation product ($a_{M_\epsilon O_\zeta S_\eta}$), and partial pressure of sulfur dioxide ($P_{SO_2}$) is described by Eq. 2, where R is the gas constant and T is the absolute temperature.

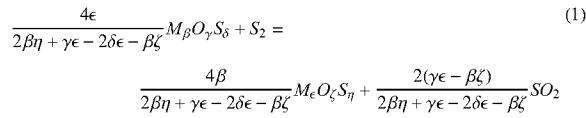

(2)

Taking the logarithm of Eq. 2 allows for gas partial pressures, collected into a term defined as ψ, to be isolated from condensed phase activities (Eq. 3):

$$\log_{10}\left(e^{\frac{-\Delta_r G^\circ}{RT}}\right) + \log_{10}\left(\frac{a_{M_\epsilon O_\zeta S_\eta}^{\frac{4\beta}{2\beta\eta+\gamma\epsilon-2\delta\epsilon-\beta\zeta}}}{a_{M_\beta O_\gamma S_\delta}^{\frac{4\epsilon}{2\beta\eta+\gamma\epsilon-2\delta\epsilon-\beta\zeta}}}\right) = \log_{10}\left(\frac{P_{S_2}}{P_{SO_2}^{\frac{2(\gamma\epsilon-\beta\zeta)}{2\beta\eta+\gamma\epsilon-2\delta\epsilon-\beta\zeta}}}\right) \quad (3)$$

$$\log_{10}\left(\frac{P_{S_2}}{P_{SO_2}^{\frac{2(\gamma\epsilon-\beta\zeta)}{2\beta\eta+\gamma\epsilon-2\delta\epsilon-\beta\zeta}}}\right) \equiv \psi \quad (4)$$

$\psi$ may be viewed as an equivalent $P_{S_2}$ to $P_{SO_2}$ ratio that accounts for the thermodynamic driving forces of product and reactant gases for reactions of different stoichiometries, which in turn dictates the equilibrium extent of reaction following Le Chatelier's principle. Thereby for a given gas atmosphere, $\psi$ will vary based on the valency of species within $M_\beta O_\gamma S_\delta$ and $M_\epsilon O_\zeta S_\eta$. $\psi$ is the sum of two components, corresponding to reaction ($\psi_{rxn}$) and solution ($\psi_{sol}$) effects respectively (Eqs. 5-7).

$$\psi = \psi_{rxn} + \psi_{sol} \quad (5)$$

$$\log_{10}\left(e^{\frac{-\Delta_r G^\circ}{RT}}\right) = \psi_{rxn} \quad (6)$$

$$\log_{10}\left(\frac{a_{M_\epsilon O_\zeta S_\eta}^{\frac{4\beta}{2\beta\eta+\gamma\epsilon-2\delta\epsilon-\beta\zeta}}}{a_{M_\beta O_\gamma S_\delta}^{\frac{4\epsilon}{2\beta\eta+\gamma\epsilon-2\delta\epsilon-\beta\zeta}}}\right) = = \psi_{sol} \quad (7)$$

Figure 21A:
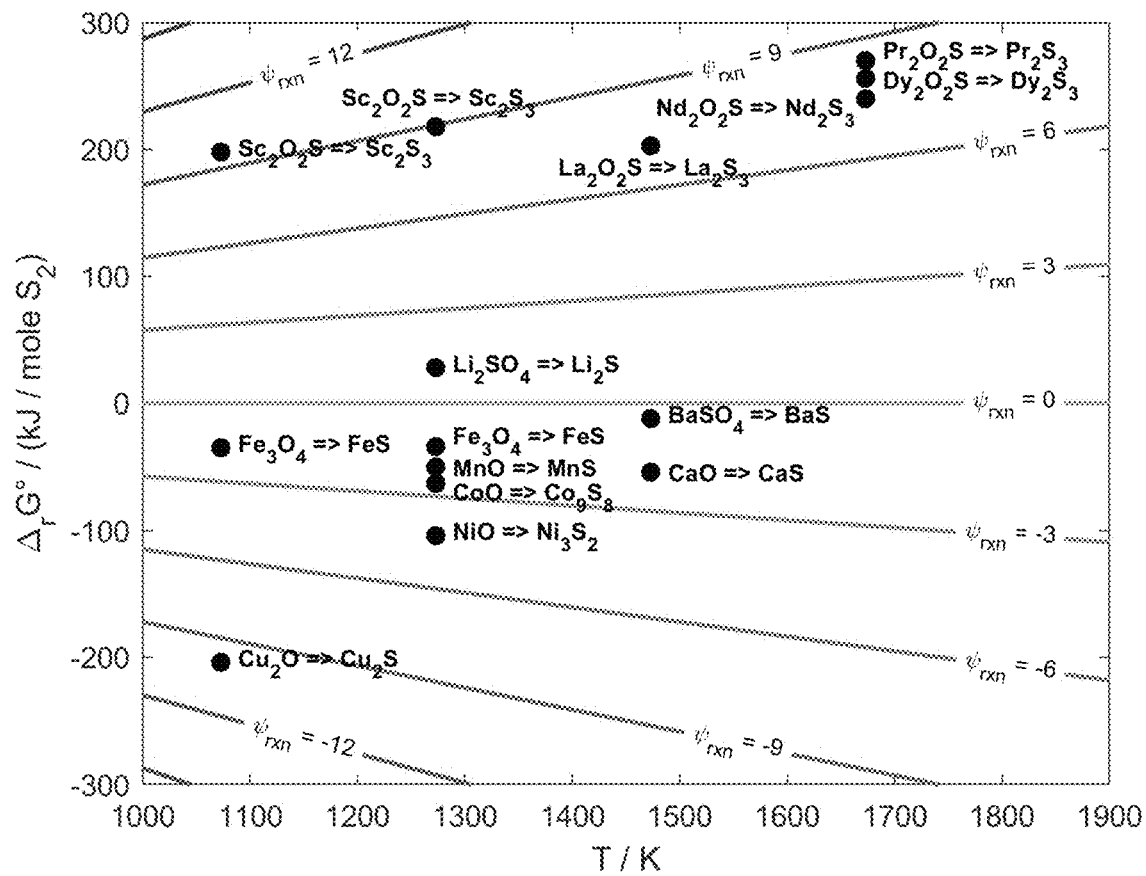
FIG. 21A shows a plot of $\psi_{rxn}$ at equilibrium versus $\Delta_r G°$ versus T for some systems for which selective sulfidation has been experimentally demonstrated herein.

The contribution of $\psi_{rxn}$ to $\psi$ is the result of the entropic and enthalpic differences between the pure state sulfidation reactants and products and is a constant for a defined temperature and pressure. $\psi_{rxn}$ is independent of the relative abundance and nature of target metal elements of the feed, and therefore is universally transferable to all sulfidation applications. $\psi_{rxn}$ is readily found from the standard Gibbs energy of the relevant reaction (Eq. 1) via Eq. 6 and is tabulated in FIG. 21A for the selective sulfidation of some pure oxides, sulfates, and oxysulfides experimentally explored in our studies. Specifically, FIG. 21A shows $\psi_{rxn}$ at equilibrium versus $\Delta_r G^\circ$ versus T for some systems for which selective sulfidation has been experimentally demonstrated herein. $\psi_{rxn}$ is determined via Eq. 6. Equivalent desulfidation reactions correspond to a reversal of the sign of $\Delta_r G^\circ$.

Meanwhile, the contribution of $\psi_{sol}$ to $\psi$ is the result of the relative entropic and enthalpic differences between the solution behavior of the oxide, oxysulfide, sulfate, or sulfide reactants and products. It is these solution thermodynamic differences, captured in the activities $a_{M_\beta O_\gamma S_\delta}$ and $a_{M_\epsilon O_\zeta S_\eta}$, that distinguish the sulfidation behavior of a compound in one feed from that same compound in another feed. For multicomponent systems of mixed anion chemistry, such as in the case of selective sulfidation, solution behavior is non-obvious, with existing thermodynamic models and modelling techniques providing inconclusive insight into $a_{M_\beta O_\gamma S_\delta}$ and $a_{M_\epsilon O_\zeta S_\eta}$, in particular for dilute and trace elements at a prevalence of less than 10% within the system. Therefore, accurate determination of activities in multicomponent systems typically requires an experimental effort, utilizing common technique for someone familiar with the relevant art. $\psi_{sol}$, calculated via Eq. 7 as a function of $a_{M_\beta O_\gamma S_\delta}$ and $a_{M_\epsilon O_\zeta S_\eta}$, is presented in FIG. 21B.

Figure 21B:
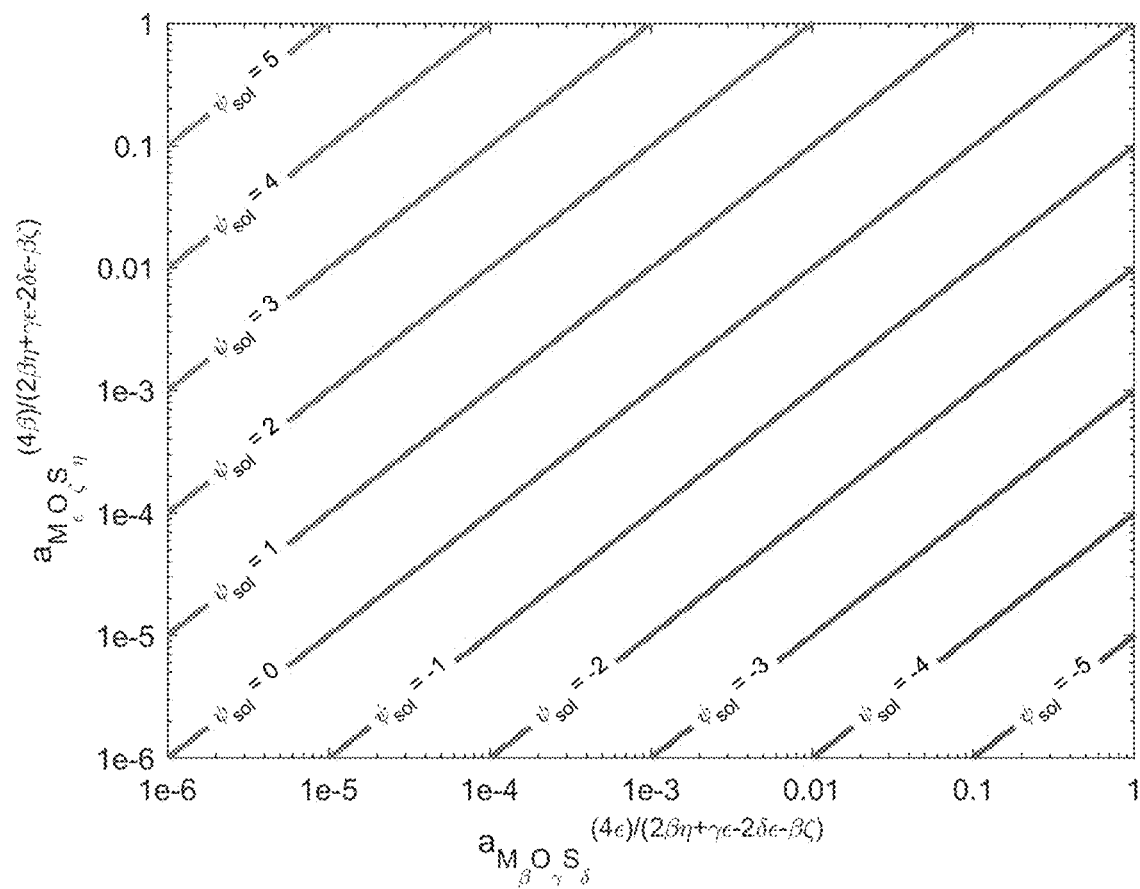
FIG. 21B shows a plot of $\psi_{sol}$ versus $a_{M_\epsilon O_\zeta S_\eta}$ versus $a_{M_\beta O_\gamma S_\delta}$.

As shown in Eq. 4, $\psi$ serves as an effective $P_{S_2}$ to $P_{SO_2}$ ratio that is dependent on the stoichiometry of the sulfidation reaction. Therefore, for sulfidation reactions at different stoichiometries from one another, $\psi$ is an inconsistent comparison, and sulfidation must be defined in the context of the actual $P_{S_2}$ to $P_{SO_2}$ ratio within the gas phase of the sulfidation reactor. The critical $P_{S_2}$ to $P_{SO_2}$ ratio for a sulfidation reaction to proceed to a given conversion is defined as $$\left[\frac{P_{S_2}}{P_{SO_2}}\right]_{crit},$$

and is determined from the gas phase thermodynamics of the system as follows. FIG. 21B shows $\psi_{sol}$ versus $a_{M_\epsilon O_\zeta S_\eta}$ versus $a_{M_\beta O_\gamma S_\delta}$. $\psi_{sol}$ is determined via Eq. 7 and is strongly dependent on the nuances of system chemistry.

The number of degrees of freedom for intensive variables (F) describing the equilibrium gas phase is dictated via the Gibbs phase rule (Eq. 8), where F is a function of the number of chemical components (C) and number of phases present (P).

$$F = C - P + 2 \quad (8)$$

At a given temperature and pressure, for a single gas phase consisting exclusively of sulfur and oxygen-containing species when $M_\beta O_\gamma S_\delta$ and $M_\epsilon O_\zeta S_\eta$ are assumed to be non-volatile, one free intensive variable exists. Therefore, $P_{SO_2}$ exists as a function of $P_{S_2}$, as are ratios of $P_{S_2}$ and $P_{SO_2}$ such as $\psi$, $\psi_{rxn}$, $\psi_{sol}$, and $$\left[\frac{P_{S_2}}{P_{SO_2}}\right]_{crit}.$$

Figure 21C:
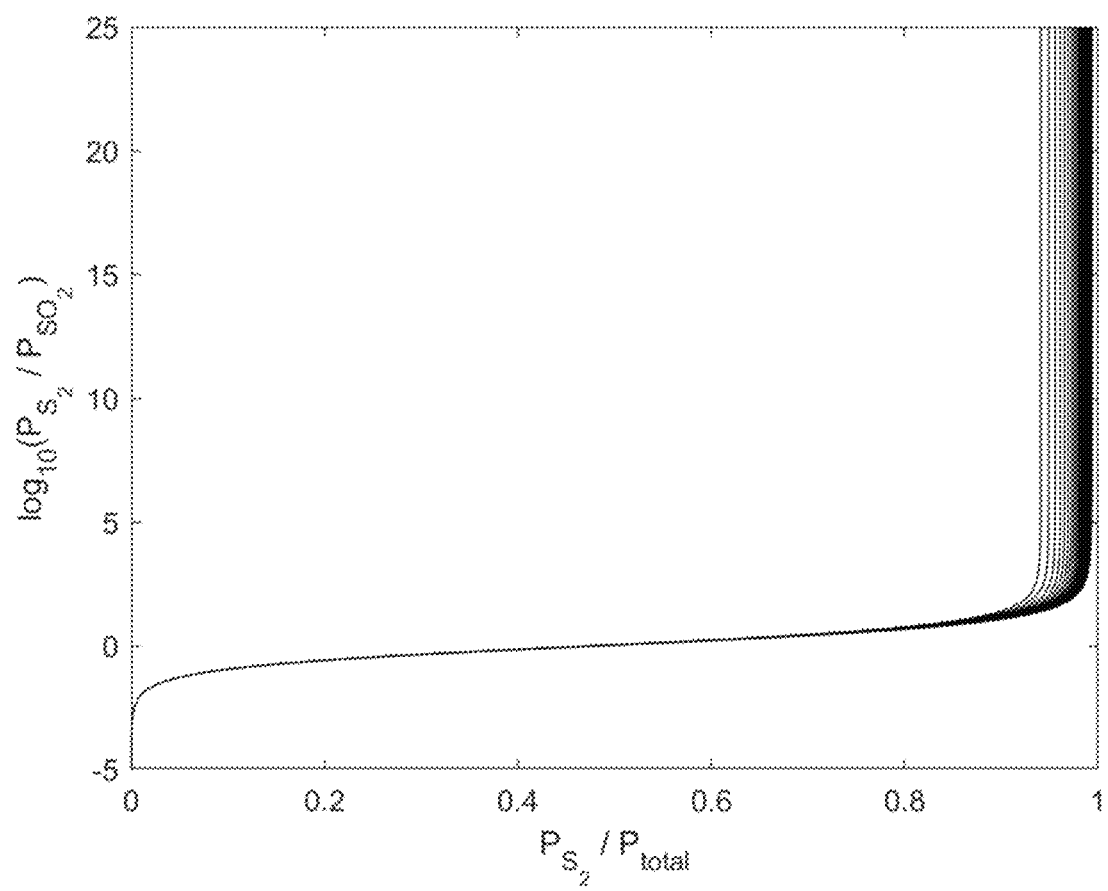
FIGS. 21C and 21D show sulfur to sulfur dioxide ratio as a function of sulfur partial pressure and temperature at 1 atm for a gas consisting exclusively of sulfur-oxygen-containing species at equilibrium.
Figure 21D:
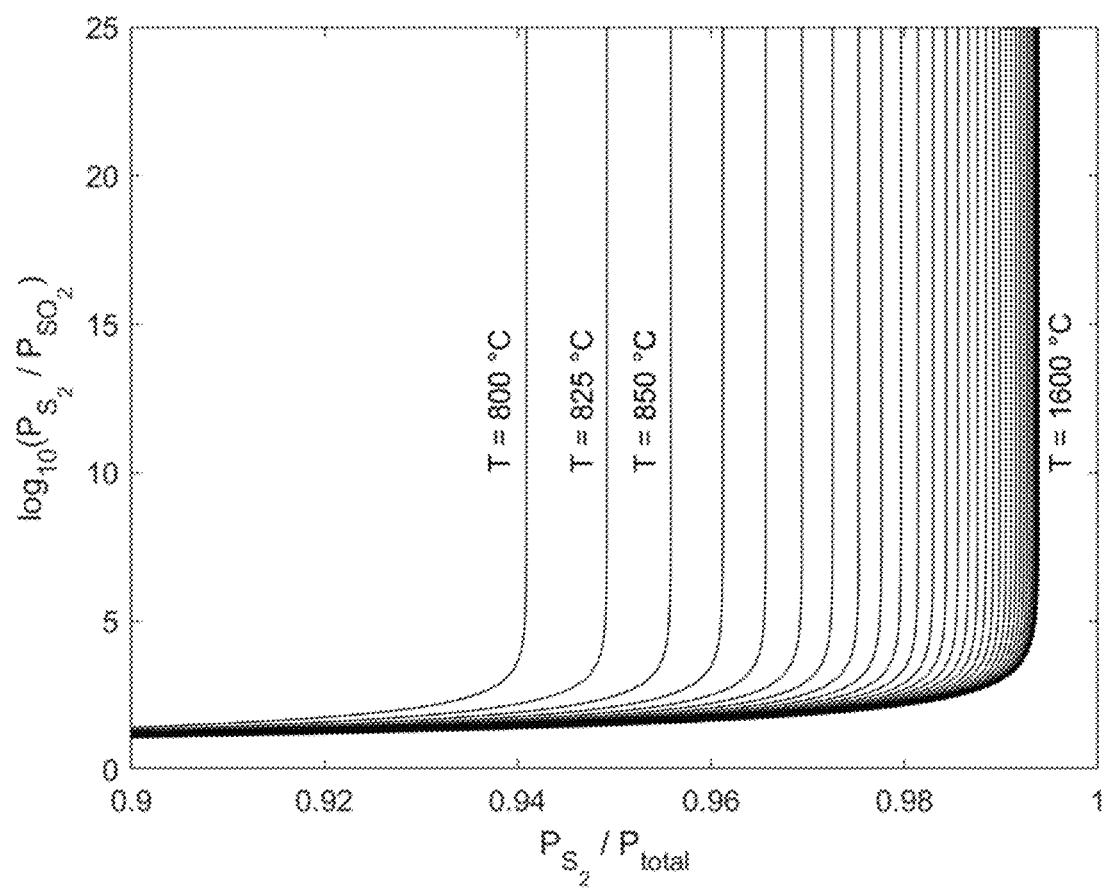

Assuming the gas phase is at equilibrium, minimization of the system Gibb's energy may then be used to determine the thermodynamically allowable $P_{SO_2}$ as a function of $P_{S_2}$, shown in FIGS. 21C-21D at 1 atmosphere of pressure at temperatures between 800° C. and 1600° C. The thermodynamically allowable $P_{SO_2}$ to $P_{S_2}$ ratio that satisfies $\psi$ in Eq. 4 corresponds to $$\left[\frac{P_{S_2}}{P_{SO_2}}\right]_{crit}.$$

Specifically, FIG. 21C and FIG. 21D show sulfur to sulfur dioxide ratio as a function of sulfur partial pressure and temperature at 1 atm for a gas consisting exclusively of sulfur-oxygen-containing species at equilibrium.

Even for gas phases with additional components, such as carbon-containing compounds, compounds of other elements, and/or volatile $M_\beta O_\gamma S_\delta$ and/or $M_\epsilon O_\zeta S_\eta$, $P_{SO_2}$, $\psi$, $\psi_{rxn}$, and $\psi_{sol}$ may still in principle be described as functions of $P_{S_2}$, so long as an appropriate number of intensive system variables are defined following Eq. 8. For systems with carbon addition, again when an appropriate number of intensive system variables are fulfilling the Gibbs phase rule, the ratio of the partial pressures of carbon monoxide ($P_{CO}$) and carbon dioxide ($P_{CO_2}$) required for a sulfidation reaction to proceed to a given conversion, defined as $$\left[\frac{P_{CO}}{P_{CO_2}}\right]_{crit},$$

can in principle be determined as a function of gas phase components or ratios.

In the limit where $M_\beta O_\gamma S_\delta$ and $M_\epsilon O_\zeta S_\eta$ are non-volatile and insoluble with unit activity ($\psi_{sol}$ is equal to 0), a Kellogg diagram formalism may be used to graphically represent a critical gas ratio, such as $$\left[\frac{Ps_2}{Pso_2}\right]_{crit} \text{ or } \left[\frac{Pco}{Pco_2}\right]_{crit},$$

as the intersection of $\psi$, often referred to as phase domain boundaries, with the function of allowable gas partial pressures, often referred to as the isobar line. Comparison of critical gas ratios such as $$\left[\frac{Ps_2}{Pso_2}\right]_{crit} \text{ or } \left[\frac{Pco}{Pco_2}\right]_{crit}$$

for different elements facilitates the construction of sulfidation series that describe the relative separation window for selective sulfidation of different components.

As described above, critical gas ratios such as $$\left[\frac{Ps_2}{Pso_2}\right]_{crit} \text{ or } \left[\frac{Pco}{Pco_2}\right]_{crit}$$

contain contributions from both $\psi_{rxn}$ and $\psi_{sol}$. Due to the variations in thermodynamic solution behavior between different materials and chemistries, $\psi_{sol}$ will vary across systems, with corresponding variation in critical gas ratios such as $$\left[\frac{Ps_2}{Pso_2}\right]_{crit} \text{ or } \left[\frac{Pco}{Pco_2}\right]_{crit}$$

Meanwhile, the degree of separation difficulty between the same elements varies between material systems, pretreatments, and operating conditions. The unique separation criteria for the same elements in different material systems may therefore require different methods to meet a critical gas ratio for sulfidation/desulfidation, such as control the rate of the sulfidation reaction itself, the gas space time and velocity in and out of the reactor, and/or the chemical reaction of $S_2$ and $SO_2$ with other species within the reactor. As a result, sulfidation or desulfidation series tabulated from $$\left[\frac{Ps_2}{Pso_2}\right]_{crit} \text{ or } \left[\frac{Pco}{Pco_2}\right]_{crit}$$

are dependent on the system chemistry.

In practice, industrial reactions are rarely at equilibrium. While non-equilibrium chemical behavior in the sulfidation reaction or condensed phases solution thermodynamics changes the exact value predicted for critical gas ratios such as $$\left[\frac{Ps_2}{Pso_2}\right]_{crit} \text{ or } \left[\frac{Pco}{Pco_2}\right]_{crit},$$

non-equilibrium behavior may be captured by modifying Eq. 2 as follows, where $\Delta G^+$ denotes the energetic deviation from thermodynamic equilibrium for the sulfidation/desulfidation reaction:

$$e^{\frac{\Delta G^+ - \Delta_r G^\circ}{RT}} = \frac{P_{SO_2}^{\frac{2(\gamma\epsilon - \beta\zeta)}{2\beta\eta + \gamma\epsilon - 2\delta\epsilon - \beta\zeta}} a}{Ps_2 a \frac{4\epsilon}{M_\beta O_\gamma S_\delta^{\frac{4\epsilon}{2\beta\eta + \gamma\epsilon - 2\delta\epsilon - \beta\zeta}}}} M_\epsilon O_\zeta S_\eta^{\frac{4\beta}{2\beta\eta + \gamma\epsilon - 2\delta\epsilon - \beta\zeta}} \quad (9)$$

Non-equilibrium $\psi$, $\psi_{rxn}$, $\psi_{sol}$, may then be derived following the methodology of Eqs. 3-8 as above in the equilibrium scenario. Meanwhile, deviations from equilibrium are also commonplace in the gas phase due to kinetic and mass transport limitations and other process-scale phenomena. For example, we observe gaseous carbon disulfide ($CS_2$) formation from the reaction between solid carbon and $S_2$ to be kinetically suppressed, however other, system-dependent deviations from thermodynamic ideality may also exist. For determination of non-equilibrium, thermodynamically-allowable gas ratios, changes must be made to the Gibbs energy minimization procedure, such as the exclusion of kinetically-limited reactions. The determination of the extent of deviation from thermodynamic equilibrium during process-scale operation is a common technique for someone familiar with the relevant art.

It should be noted that the above framework describes the generalized creation of the Kellogg plots presented for each element in FIGS. 9-12, while the sulfidation series described correspond to FIGS. 1B, 5A-5E, 5L-5M, 17A, 18-20.

For derivation of critical gas flowrates (which relate to reactor residence times), the role of solid carbon on the carbothermically-driven sulfur reflux of $SO_2$ back into $S_2$ was modelled to determine the $P_{S2}/P_{SO2}$ ratio in the active volume of the reactor ($[P_{S2}/P_{SO2}]$reactor). A similar methodology may be followed to model the role of other carbon-containing species on the carbothermically-driven sulfur reflux. Steady state reactor conditions, a well-mixed ideal gas phase, and a fixed reactor bed such as discussed with reference to FIG. 3M and FIG. 4A were assumed. Carbon-disulfide ($CS_2$) formation was taken to be kinetically-suppressed, with other C—S—O reactions taken to be fast compared to the sulfidation reaction, existing at quasi-equilibrium. For other sources of carbon, $CS_2$ formation may not be kinetically suppressed, however the same general methodology may still be used to model critical gas flowrates. The amount of $SO_2$ entering the active volume of the reactor ($N_{SO2}$) is a function of the rate of introduction of $SO_2$ from the gas inlet itself ($U_{SO2}$), the rate of $SO_2$ generation from sulfidation of a metal compound behind the reaction front ($r_{SO2}$), and the reactor volume. Mass transfer limitations, including the effects of sintering, can be captured by scaling the rate constant (k) by a kinetic effectiveness factor $\eta$, derived from the non-dimensional ratio of chemical reaction rates to pore diffusion rates as done from the Theile modulus of heterogeneous catalysis:

$$N_{SO_2} = r_{SO_2}V + U_{SO_2} = \lambda\eta k\left(\frac{P_{S_2}}{RT}\right)^n V + U_{SO_2}[\ =\ ]\frac{\text{mol}}{s}$$

where k is the rate constant, R is the ideal gas constant, T is the absolute temperature, n is the reaction order, $PS_2$ is the sulfur partial pressure, $\lambda$ is a stoichiometric factor, and V is the reactor volume.

Meanwhile, the amount of $S_2$ entering the active volume of the reactor ($N_{S_2}$) is a function of the rate of introduction of $S_2$ from the gas inlet itself ($U_{S_2}$), the rate of $S_2$ consumption during sulfidation ($r_{S_2}$), and the reactor volume:

$$N_{S_2} = U_{S_2} - r_{S_2} V = U_{S_2} - \varsigma \eta k \left(\frac{P_{S_2}}{RT}\right)^n V [=] \frac{\text{mol}}{s}$$

where $\varsigma$ is a stoichiometric factor.

In the absence of any carbothermic refluxing of $SO_2$ to $S_2$ or any gas phase reactions between $S_2$ and $SO_2$, assuming an ideal gas mixture the $P_{S_2}/P_{SO_2}$ ratio entering the active volume of the reactor ($[P_{S_2}/P_{SO_2}]_{inlet}$) is calculated as follows:

$$\left[\frac{P_{S_2}}{P_{SO_2}}\right]_{inlet} = \frac{N_{S_2}}{N_{SO_2}} = \frac{U_{S_2} - \varsigma \eta k \left(\frac{P_{S_2}}{RT}\right)^n V}{\lambda \eta k \left(\frac{P_{S_2}}{RT}\right)^n V + U_{SO_2}}$$

The $P_{S_2}/P_{SO_2}$ ratio in the active volume of the reactor ($[P_{S_2}/P_{SO_2}]_{reactor}$) is a function of $[P_{S_2}/P_{SO_2}]_{inlet}$, the carbon (if present) content described as a molar carbon to metal compound feed ratio ($N_C/N_{M2O3}$ in the case of a metal oxide feed of stoichiometry $M_2O_3$), and the corresponding, temperature-dependent interactions between carbon/carbon gasses, S—O gasses, and any other gasses within the system, dictated by thermodynamics if the gas phase is at a quasi-equilibrium compared to the rate of sulfidation and gas inlet:

$$\left[\frac{P_{S_2}}{P_{SO_2}}\right]_{reactor} = f\left(\left[\frac{P_{S_2}}{P_{SO_2}}\right]_{inlet}, \frac{N_C}{N_{M_2O_3}}\right)$$

Figure 21E:
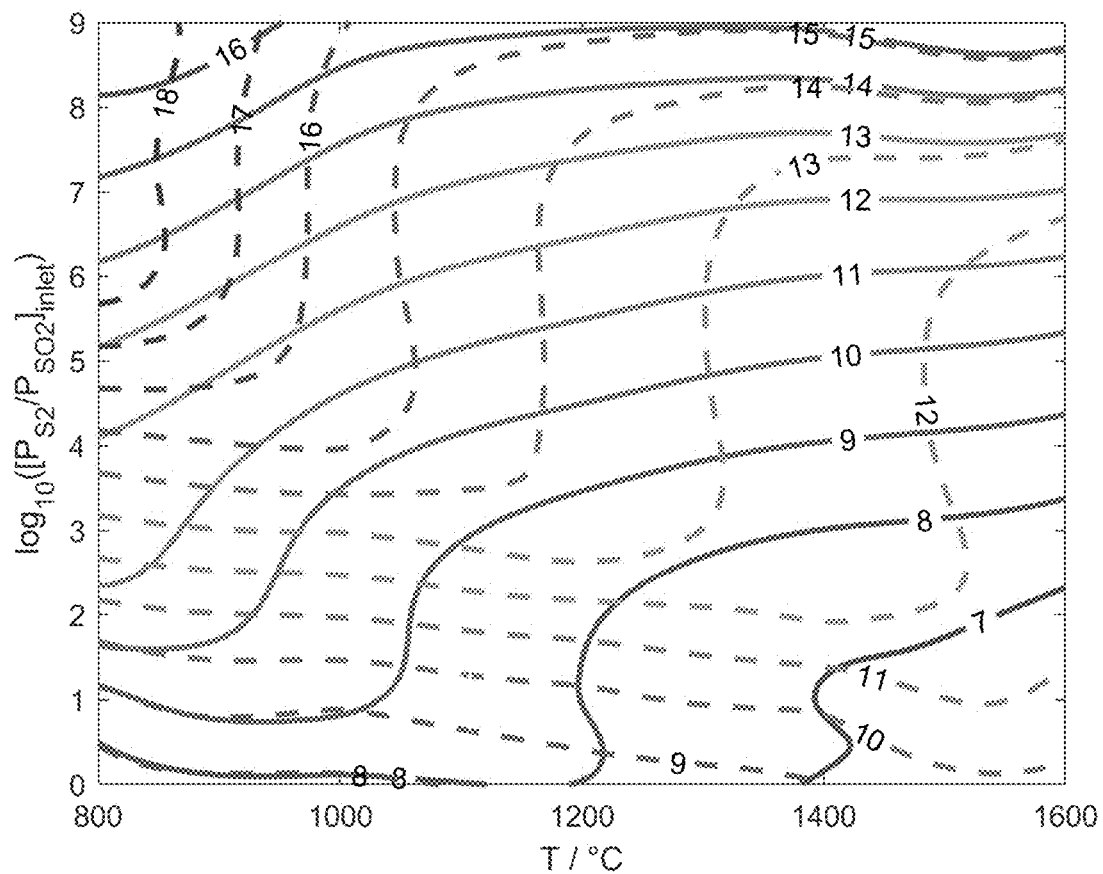
FIG. 21E is an example of $[PS2/PSO2]_{reactor}$ as a function of NC/NM2O3, $[PS2/PSO2]_{inlet}$, and temperature.

Values of $[P_{S_2}/P_{SO_2}]_{reactor}$ were calculated for $[P_{S_2}/P_{SO_2}]_{inlet}$ between 1 and $10^9$ and $N_C/N_{M2O3}$ between 0 and 10 at temperatures ranging from 800° C. to 1600° C. FIG. 21E is an example of $[P_{S_2}/P_{SO_2}]_{reactor}$ as a function of $N_C/N_{M2O3}$, $[P_{S_2}/P_{SO_2}]_{inlet}$, and temperature, modelled following the above assumptions, which may be relaxed as necessary based on the requirements of the system chemistry. For the ratio of the flow rate of $S_2$ into a sulfidation reactor and the rate of $SO_2$ generation from metal oxide ($M_2O_3$) sulfidation ($[P_{S_2}/P_{SO_2}]_{inlet}$), carbon addition increases the steady-state $P_{S_2}/P_{SO_2}$ ratio within the reactor ($[P_{S_2}/P_{SO_2}]_{reactor}$) by chemically reducing $SO_2$ to $S_2$ via a carbothermically-driven sulfur reflux, with a higher $C/M_2O_3$ feed ratios resulting in lower $SO_2$ levels. Shown in FIG. 21E are isobars for $\log_{10}([P_{S_2}/P_{SO_2}]_{reactor})$ at a total pressure of 1 atm, with solid lines corresponding to $C/M_2O_3=3$ and dashed lines corresponding to $C/M_2O_3=5$.

For sulfidation to occur, $[P_{S_2}/P_{SO_2}]_{reactor}$ must exceed $[P_{S_2}/P_{SO_2}]_{crit}$. Employing the above equations and assuming an ideal gas phase, the minimum total gas volumetric flowrate ($\dot{V}_{min}$) may be found for sulfidation to occur as a function of temperature, $[P_{S_2}/P_{SO_2}]_{crit}$, $N_C/N_{M2O3}$, inlet gas partial ($P_x$) and total (P) pressures, and sulfidation rate constant k:

$$\dot{V}_{min} = f\left(T, \left[\frac{P_{S_2}}{P_{SO_2}}\right]_{inlet}, \frac{N_C}{N_{M_2O_3}}, P_X, P, k\right) [=] \frac{m^3}{s}$$

The maximum average gas residence time, referred to as the space time ($\tau^{max}_{space}$), and its inverse, referred to as the minimum space velocity ($v^{min}_{space}$) are determined from $\dot{V}_{min}$ and the reactor volume, V, as follows:

$$\tau^{max}_{space} = \frac{1}{v^{min}_{space}} = \frac{v}{v_{min}} [=] s$$

Figure 21F:
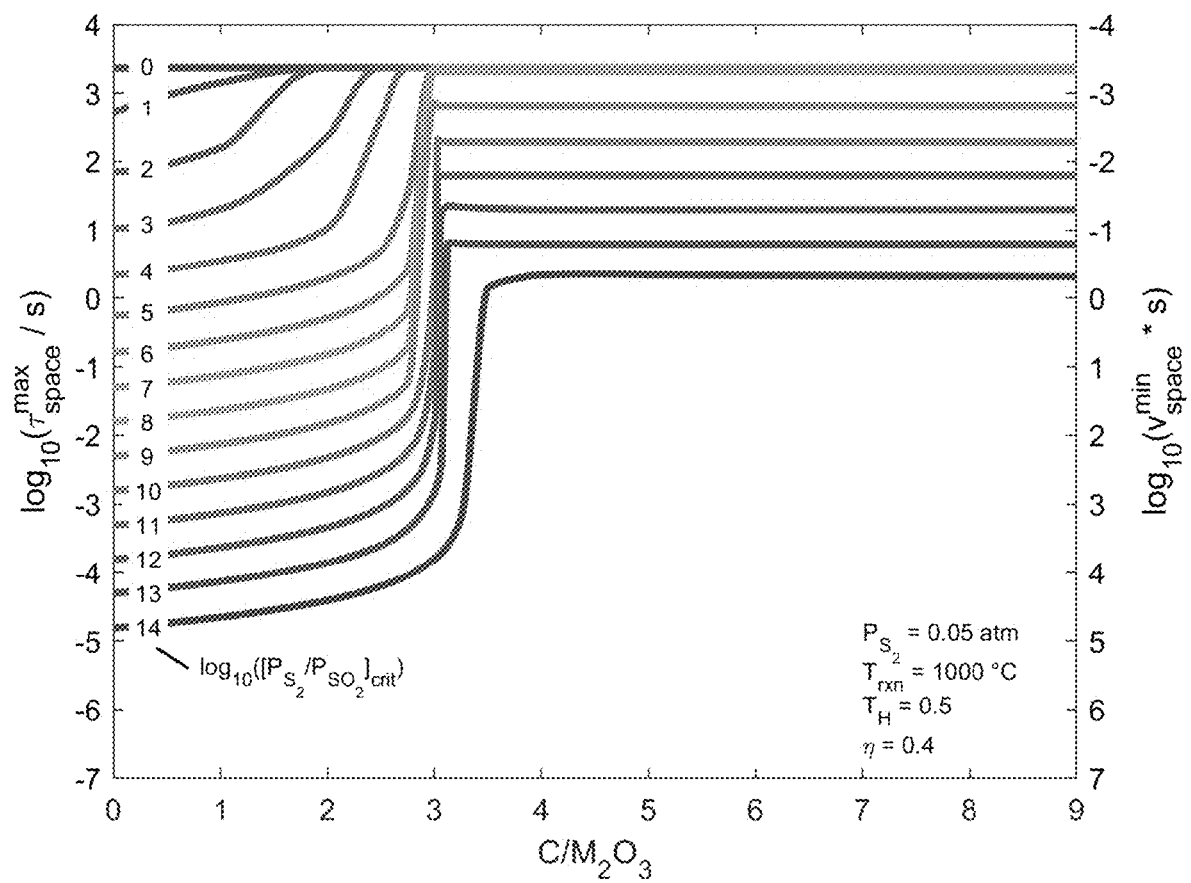
FIGS. 21F-21G provide examples in which $\tau^{max}_{space}$ and $v^{min}_{space}$ are presented as a function of operating conditions for $[P_{S2}/P_{SO2}]_{crit}$ ranging from 0 to 14.
Figure 21G:
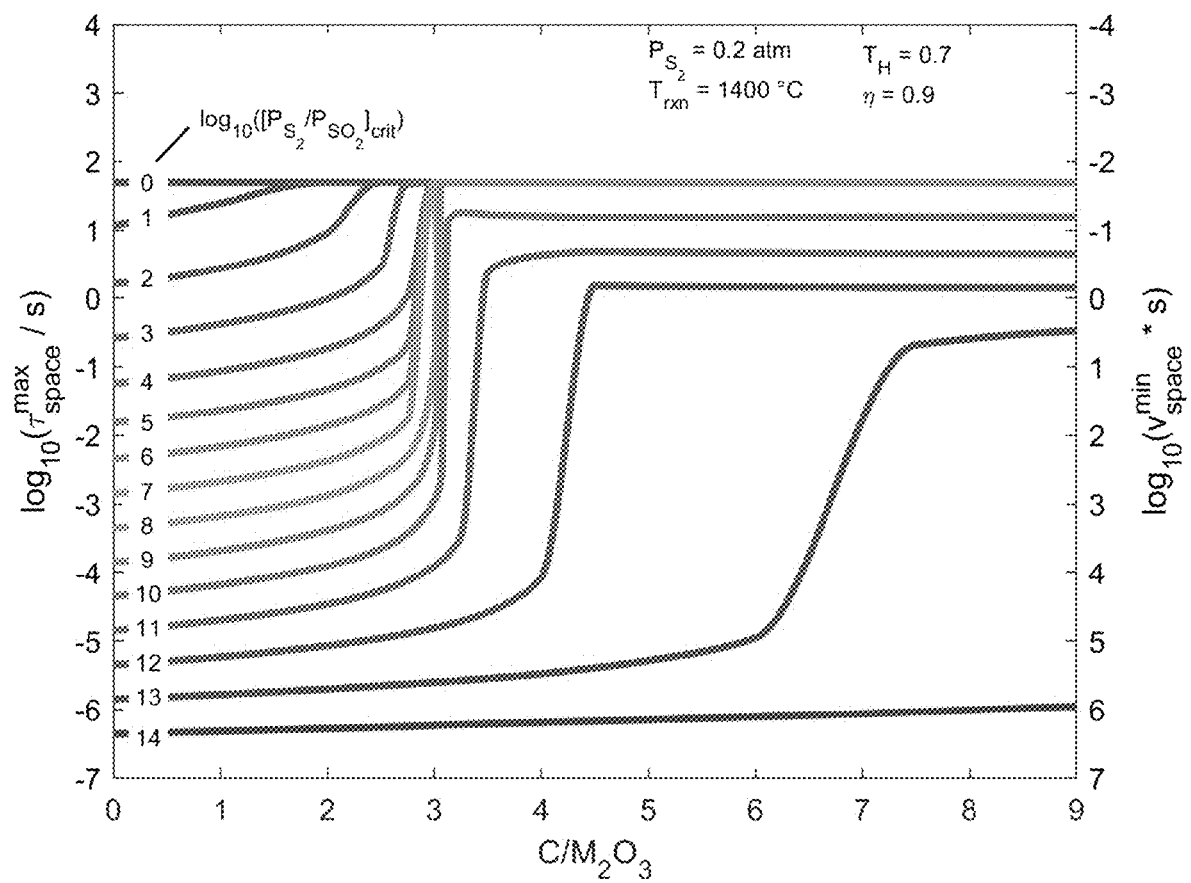

Assuming thermal activation of reaction kinetics similar to those of lanthanum oxide sulfidation, $\tau^{max}_{space}$ and $v^{min}_{space}$ may be tabulated for $[P_{S_2}/P_{SO_2}]_{reactor}$ to exceed $[P_{S_2}/P_{SO_2}]_{crit}$. FIGS. 21F-21G provide an example in which $\tau^{max}_{space}$ and $v^{min}_{space}$ are presented as a function of operating conditions for $[P_{S_2}/P_{SO_2}]_{crit}$ ranging from 0 to 14. Based on the target element in the system, $\tau^{max}_{space}$ and $v^{min}_{space}$ may be tabulated directly for a given element as a function of chemistry, mass transport, and kinetic considerations as described above. It should be noted that FIGS. 21F-21G provide a general depiction of $\tau^{max}_{space}$ and $v^{min}_{space}$ as a function of critical gas ratios. $\tau^{max}_{space}$ and $v^{min}_{space}$ in FIGS. 13-16 are derived utilizing the critical gas ratios determined from the reaction thermodynamics alone ignoring solution thermodynamics (following a Kellogg formalism as described above with reference to gas ratios). In addition to showing the variation of $\tau^{max}_{space}$ with carbon content, the kinetic effectiveness factor $\eta$ is also a parameter in FIGS. 13-16 to illustrate how mass transport effects, as are to be expected in real-world deployment of the technology, can impact $\tau^{max}_{space}$.

CHAPTER 3—SELECTIVE SULFIDATION FOR ORE AND CONCENTRATE CRACKING, METAL SEPARATION, AND COMPOUND PRODUCTION

This chapter provides a detailed description of various exemplary embodiments demonstrating selective sulfidation. Numbers shown in brackets are citations to references listed at the end of this chapter.

Executive Summary

For the first time, difficult to separate metal oxides can be selectively sulfidized, facilitating more effective metal separation and recovery. We present operating conditions and constraints for a novel process for sulfidation of most metal oxides using elemental sulfur via a fluid-solid reaction, employing a novel carbothermically-driven sulfur reflux that allows for selective control of metal-sulfide valency and sulfidation selectivity in a mixed oxide feed. We experimentally demonstrate selective sulfidation technology herein for selective valency control in the sulfidation of lanthanum oxide, as well as for selective sulfidation of an individual rare earth oxide, praseodymium oxide, from a mixed rare earth oxide of neodymium, lanthanum, and praseodymium. We show that selective sulfidation can cause crystallization of the product sulfide out of an amorphous oxide, facilitating the application of a variety of metal separation techniques. The selectivity of sulfidation rivals other ore/concentrate cracking technologies such as carbochlorination, lessening the burden of metal separation on expensive downstream hydrometallurgical processes.

We believe that our invention of selective sulfidation technology is a useful, novel, and non-obvious contribution to mining, metallurgy, and recycling industries. We highlight several key innovations:

The high temperature selective sulfidation of an individual metal oxide from a mixture of highly chemically-similar metal oxides, such as rare earth oxides, tantalum-niobium oxide, hafnium-zirconium oxide, uranium-thorium oxides, nickel-cobalt oxides, etc.

The implementation of a carbothermically-driven sulfur reflux stream by back-reacting product sulfur dioxide, facilitating control of sulfide product selectivity and valency.

The crystallization of a metal sulfide from a mixed metal oxide via selective sulfidation The spontaneous separation of a metal sulfide upon sulfidation from a mixed metal oxide due to differences in phase stability of the product sulfide compared to its starting oxide.

I. Introduction

The separation of metal compounds remains a key materials processing challenge in the rare earth and strategically-significant metals industries. Difficulty in the separation of metals stems from the similar chemistries of metals found within ores or mining concentrates—for instance tantalum and niobium have parallel oxide chemistries, hindering the selective removal of one oxide from the other. For rare earth metals—the lanthanides along with yttrium and scandium—this effort is further exasperated, where a single ore may contain a dozen or more valuable rare earth compounds that must be subsequently separated into their individual oxides and reduced to their base metals. For concentrates containing many components of similar chemistries such as rare earth metals, the largest increase in metal value throughout processing arises from the separation of the oxides, where the metal value increases upon separation of a rare earth oxide from the mixed concentrate on the order of 10× to 100,000× [1]. However, significant economic and technological drawbacks exist for current metal compound separation techniques.

Most current separation techniques for compounds of similar chemistries rely on hydrometallurgical techniques such as solvent extraction or acid leaching. However, due to similarities in target metal compound chemistry, hydrometallurgical reactions to remove a single product must be repeated many times over to achieve sufficient product purity—on the order of 5 cycles [2] for a single transition metal component such as cobalt or nickel and on the order of 100 cycles for a single rare earth metal such as lanthanum or neodymium [3]. A reaction cycle, known as a stage, typically lasts 3-5 minutes each for separation and subsequent extraction of the product [2,3]. In the case of rare earth elements, where a dozen or more valuable components can be found in a single concentrate, this can equate to thousands of stages, necessitating residence times of days to months in many dedicated reactors. Residence time can be treated as the amount of time a given amount of product is tied up within the operations of a facility—higher residence times equate to higher operation costs and more stored value within the process reactor. With individual reaction circuits containing anywhere from 10 to 100 m$^3$ of solvents and acids, hydrometallurgical facilities require significant capital investment to provision banks of large reactors and the necessary supportive equipment for chemical handling.

Hydrometallurgical separation works because of a change in chemistry—selectivity is higher in the room-temperature aqueous phase for an individual metal than in the room temperature oxide phase. At elevated temperatures (>800° C.), an even more effective change in chemistry can be performed by selective sulfidation of the oxide. Sulfidation can be viewed in the context of ore cracking, where technologies such as carbochlorination are employed to split mixed oxides. Currently employed ore cracking technologies lack the selectivity to separate oxides of similar chemistry from one another, such as rare earth metals. This lack of selectivity exhibited by current ore and concentrate cracking technologies places the burden of separation on hydrometallurgical processes. Highly selective concentrate cracking, such as selective sulfidation of individual concentrate metal oxides, would significantly decrease the intensity of hydrometallurgical processing for difficult to separate metal oxides.

This section begins with a review of prior art in the fields of metal separations and metal sulfide production. Trends in patents are presented, highlighting the ongoing demand for technologies related to sulfidation and metal separation. Next, thermodynamic considerations for the sulfidation of a metal oxide are presented, demonstrating that most metal oxides can be sulfidized and that sulfidation often provides improved selectivity over hydrometallurgical methods for difficult to separate metals. Following, laboratory-scale sulfidation is demonstrated for valency control of lanthanum sulfide, utilizing a novel, non-obvious method of carbothermically refluxing waste sulfur containing gasses back into elemental sulfur. Inventive concepts and applications of this chemically-driven sulfur reflux are described in detail, with their applications to control sulfide product stoichiometry and selectivity of one metal sulfide over another highlighted. Synthesizing this understanding, selective sulfidation operating conditions for temperature, pressure, reactor residence time, and internal gas concentrations are presented. Selective sulfidation of an individual rare earth oxide from a mixed rare earth oxide is demonstrated at a laboratory scale. Finally, separation techniques facilitated by selective sulfidation are presented for metals and mineral handling and processing.

II. Prior Art

Figure 2A:
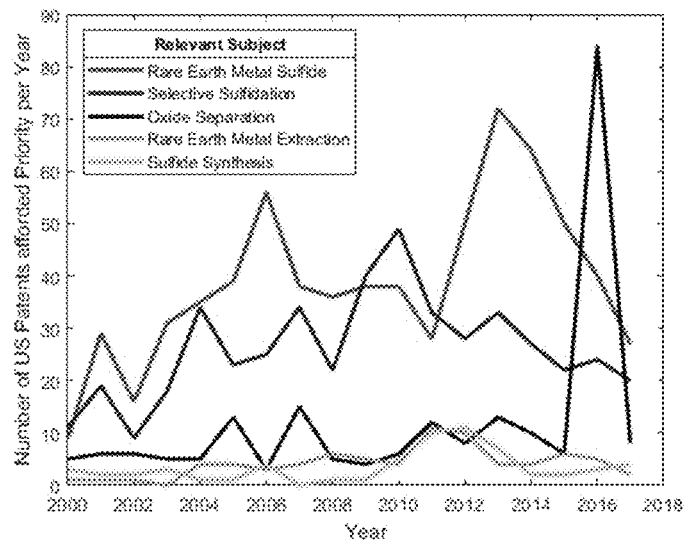
FIG. 2A shows trends in the patent rate of subjects relevant to our selective sulfidation technology.

Sulfidation chemistry remains an active area of research and intellectual property generation. Trends in the yearly (priority date) patent rate of topics relevant to our selective sulfidation technology are presented in FIG. 2A. Our selective sulfidation technology is particularly pertinent to metals, catalysts, and electronics industries. Concurrently, significant prior art for our technology exists in the fields of metallurgical extraction and catalysis. In this section, prior art in the context of metals separation, mineral and concentrate cracking, catalysis, and metal compound production are discussed.

II-I. Metals Separation

Sulfidation in one form or another has been known as a viable metallurgical processing route for the last century (U.S. Pat. No. 1,159,942A) [4]. Many of these metallurgical extraction methods have focused on low temperature, aqueous sulfidation of difficult to separate metals such as cobalt and nickel (U.S. Pat. No. 10,125,408B2) [5] or recovery of a heavy metal such as zinc (U.S. Pat. No. 7,018,605B2) [6]. While in some cases (U.S. Pat. No. 10,125,408B2) these sulfidation processes are designed to be selective for one metal verses another, these processes are hydrometallurgical in nature, making them very different in scope, design, and operating conditions from the high-temperature selective sulfidation process we have invented presented herein, and intend to disclose.

Other processes have employed gas-solid reactions at elevated temperatures, such as sulfation for rare earth separation from non-rare earth metals in the case of magnetic material recycling (US20180237887A1) [7]. While sulfation is a high temperature roasting/cracking processes employing sulfur chemistry, as described in Chapter 1, it is counter to the goal of selective sulfidation, as selective sulfation promotes and facilitates the hydrometallurgical processing of materials and environmental degradation that selective sulfidation moves away from.

Elsewhere, high temperature sulfidation has been applied to sulfidize a single metal oxide, such as titania or titanium carbonitride [8,9], or sulfate such as barite [10]. These processes are designed with complete sulfidation of an already purified metal oxide in mind, with little regard to selectivity. For easy to isolate metal compounds such as titania or barite such a process is tenable, however for difficult to separate oxide solutions such as rare earths, zirconia and hafnia, or niobium oxide and tantalum oxide these simplified, non-selective sulfidations are not applicable. Therefore, while high temperature sulfidation has been performed in the past for metal recovery, it has not ever been explored in the industrially-critical realm of difficult to separate oxides. Meanwhile, our novel selective sulfidation technology fills this unoccupied niche, facilitating sulfidation and separation of metal oxides previously pinned to hydrometallurgical processing. In essence, selective sulfidation allows for far greater selectivity in mineral and concentrate cracking, enabling less of the burden of selectivity to fall on downstream metals separation technologies.

II-II. Mineral and Concentrate Cracking

A high-temperature, gas-solid reaction metallurgical technology that has been applied to selective oxide separation is carbochlorination, used for mineral and concentrate cracking. Carbochlorination has been explored for a variety of metal oxide separation and recovery methods, including rare earths in industry—(U.S. Pat. No. 5,039,336A) [11], (U.S. Pat. No. 5,049,363A) [12], (US20180202025A1) [13], (US20180209015A1) [14], (WO2004073021A2) [15]—and academia [16-22], other strategic metals such as zirconium, hafnium, or uranium (U.S. Pat. No. 4,913,884A) [23], precious metals (U.S. Pat. No. 9,982,320B2) [24], and ferroalloys [25]. Carbochlorination is relevant prior art to our selective sulfidation invention for several reasons—it successfully reacts highly chemically similar oxides into more chemically dissimilar chlorides and utilizes differences in phase stability to separate chlorinated species from non-chlorinated species. Also, like selective sulfidation, carbochlorination is employed in the cracking stage of metallurgical production—treatment applied to ores or concentrates to selectively break up difficult to separate oxides or solid solutions. However, carbochlorination differs from our selective sulfidation invention in its reliance on carbon. For carbochlorination, carbon, serving as a reductant, is a necessary reactant like the chlorine source [26-29]. Meanwhile in our selective sulfidation process, carbon is an optional addition that can be utilized to tune the selectivity of the sulfidation. Whereas carbochlorination derives selectivity from changes in chemistry upon co-chlorination of similar oxides with carbothermic reduction, such as in chemical vapor transport processes for rare earth separation [20,21], our process can optionally employ carbon to fine-tune the selective sulfidation of one out of a group of similar oxides, adding further selectivity than what is achieved by total sulfidation alone or existing processes like carbochlorination.

During our selective sulfidation process, gas atmosphere control and considerations are of key concern, as for every metallurgical process. Within our selective sulfidation reactor, the carbon monoxide to carbon dioxide ratio is of interest to aid in the chemical reflux of reacted sulfur dioxide back into elemental sulfur, described later in Section V. The criticality of control of the carbon monoxide to carbon dioxide ratio is known in the carbochlorination process, where the chlorination selectivity for titanium versus iron can be tuned using suitable carbon monoxide to carbon dioxide ratios [30]. However, the role of carbon Sohn's process is very different from selective sulfidation. In carbochlorination, the carbon is a reactant for the chlorination step—therefore control of the carbon monoxide to carbon dioxide is control of the chlorination itself. Meanwhile, in selective sulfidation, carbon serves the role of a sulfur refluxing agent—instead controlling the sulfidation reaction's reactant concentration (sulfur), not controlling the sulfidation itself. Whereas carbochlorination will not proceed at a reasonable rate without a carbon source, selective sulfidation can proceed without carbon with sufficiently small gas resident times within the reactor (see Section VI). Similar arguments can be made for controlling the chlorine to oxygen ratio or chlorine to carbon monoxide role for selective carbochlorination of other transition metals [25, 31]—atmospheric control is inherent to most metal extraction, refining, and recovery processes. Selective sulfidation differs from carbochlorination in the optional nature of carbon in selective sulfidation, and the role that carbon plays as refluxing agent in selective sulfidation as opposed to an oxide reduction agent or reactant to form a stronger chlorinating agent (phosgene) in carbochlorination.

II-III. Catalysis

Two other fields that have dedicated significant attention to sulfidation of oxides are the petrochemical and specialty chemical industries, where sulfides such as those of the rare earths are utilized for catalysts, and oxide catalysts metals are recycled via sulfidation. Several examples of catalyst metals recovered via sulfidation are highlighted in patents (US20100199807A1) [32], (U.S. Pat. No. 8,936,770B2) [33], (U.S. Pat. No. 9,267,188B2) [34], (US20190160394A1) [35], (US20120039777A1) [36], (U.S. Pat. No. 7,658,895B2) [37], (U.S. Pat. No. 7,837,960B2) [38], (U.S. Pat. No. 8,628,735B2) [39], (US20140323291A1) [40], (US20160101410A1) [41], (U.S. Pat. No. 10,227,268B2) [42]. While these sulfidation processes employ a variety of sulfur sources, other gases including carbon species, and varied operating conditions, a major difference between metal recovery from a catalyst and metal oxide separation in an ore or concentrate is due to the physical nature of the material. Catalysts are engineered structures, typically designed to demonstrate highly-favorable surface areas that cannot be expected nor is in any way representative when dealing with natural ores or concentrates. As is described later in Section VI, the constraints and conditions of sulfidizing a catalyst lead to fundamentally-different materials chemistry and processing from metallurgical extraction and recovery.

Therefore, sulfidation operating conditions reported and predicted for catalyst reforming and recycling are not relevant for natural concentrate processing, where the reaction will be governed by different phenomena as result of working with a natural versus an engineered material. Furthermore, sulfidation in catalyst recycling is often not offering any improved degree of selectivity due to the chemical makeup of the catalyst itself. As with neodymium rare earth magnet recycling via sulfidation (US20180237887A1), the sulfidized species, often a rare earth metal, has very different chemistry than other metal species in the catalyst—ergo chemical selectivity is derived from the natural, inherent, obvious chemical nature of the metals themselves in these catalysis sulfidation processes, not from any aspect of the process design. Similar arguments are relevant for sulfide catalyst production from metal oxides, as in (U.S. Pat. No. 6,562,752B2) [43], (U.S. Pat. No. 6,316,382B1) [44], (U.S. Pat. No. 6,432,867B1) [45], and U.S. Pat. No. 6,242,378B1 [46]. Despite the fact that similar sulfur or carbon sources may be used, the fundamental nature of the engineered catalyst starting material is distinctly different from that of a naturally occurring oxide mixture, as our invention is designed to deal with. Furthermore, catalyst sulfidation selectivity is obvious based on the drastically different chemistry of the metal oxides within the catalyst, whereas our process is designed to deal with oxides that are chemically very similar to one another and difficult to separate, such as elements from the same periodic groups.

The petrochemical and specialty chemical industries have also worked on the reaction of sulfur dioxide back to elemental sulfur in the context of pollution control. The catalytic reduction of sulfur dioxide using rare earth oxide and oxysulfide catalysts has been a key avenue of research in academia [47-51] and industry—(U.S. Pat. No. 8,011, 181B2) [52], (CA1080441A) [53], (CN101912721B) [54]. These processes, operating from about 500° C. to about 1000° C., employ a rare earth oxide or oxysulfide in the presence of carbon monoxide to reduce sulfur dioxide back to elemental sulfur. While an oxysulfide may be one intermediate of our rare earth selective sulfidation reaction, selective sulfidation of rare earth occurs at higher temperatures than the sulfur dioxide reduction is practiced at. This temperature change is critical, because at higher temperatures sintering occurs in catalysts, reducing their catalytic effect. Therefore, it is not reasonable to assume that the oxide's or oxysulfide's behavior in a lower temperature catalyst (an engineered structure) will be the same as the oxide's or oxysulfide's behavior as an intermediate in the selective sulfidation of a natural concentrate. Furthermore, the buildup of solid carbon—coking or ashing—in the catalyst is highly detrimental to catalyst performance. Meanwhile, in an operating mode where selective sulfidation is utilizing carbon (optional in nature), the deposition and removal of carbon is inherent to the process where a chemical equilibrium is formed (see Section V). Ergo, one can reasonably determine that the carbothermically-driven sulfur reflux is a novel and distinctly different technology than sulfur dioxide scrubbing or catalytic reduction.

II-IV. Metal Compound Production

Significant effort has been dedicated to the production of strategically significant metal sulfides, such as the rare earths, for technologies ranging from optics [55-60], super conductors [61], super capacitors [61-63], photocatalysts [64], pigments [58, 65, 66], phosphors [67,68], refractories [69], thermoelectrics [58, 66, 68, 70, 71], and extractive metallurgy [72]. However, these end-product rare earth sulfides remain challenging to synthesize, with minimal considerations made for production beyond a laboratory scale until now. In general, for most metals, including rare earths, previously-proposed metal sulfidation techniques are not scalable or economical enough to be applied to industrial synthesis. Most sulfide synthesis techniques thus far have focused on direct reaction of a metal with gaseous elemental sulfur, or sulfurization of an oxide or salt with carbon disulfide ($CS_2$) or hydrogen sulfide ($H_2S$). However, these approaches face dubious scalability in industrial settings due to uneconomical and difficult to handle starting materials. A novel, scalable, safer, and more economical approach for sulfide synthesis is to take the best part from each of the previous methods and perform direct sulfidation of a rare earth oxide via gaseous, elemental sulfur, as we propose to do for our selective sulfidation process. Because of high toxicity and difficulty in shipping or storing in industrial quantitates [73], $H_2S$ recovered during natural gas production is almost exclusively converted to sulfur via the Claus process, and has not been tracked as a commodity chemical since the early 2000's [74]. Meanwhile, despite showing a drop in consumption in recent years, $CS_2$ remains a major chemical feedstock [74], yet requires considerable environmental safeguards where utilized both in the US [75] and abroad [76] due to its toxicity and pollution footprint. When employed in industry, both $H_2S$ and $CS_2$ are produced from environmentally-benign elemental sulfur, suggesting that direct utilization of elemental sulfur as the sulfidizing agent for sulfide production could show significant savings in materials, capital, and pollution-control costs. Reported industrial prices of previously explored oxide sulfurizing agents $H_2S$ and $CS_2$ historically are on the order of 100 times more expensive than elemental sulfur to procure. Meanwhile to produce $H_2S$ or $CS_2$ on-site for use requires significant capital expenditure and high operating costs. The utilization of elemental sulfur directly in sulfidation reactions presents a major cost saving opportunity by eliminating the processing steps and equipment surrounding $H_2S$ and $CS_2$ use, with added safety and environmental benefits. With regards to the starting material, the oxide is far cheaper than the metal, as it excludes the conversion costs of metal oxide reduction to metal.

Sulfidation of rare earth oxides directly by elemental sulfur at any scale has seen minimal attention. While rare earth sulfide impurities were present in the direct sulfidation of rare earths oxides to oxysulfides to elemental sulfur, characterization of the conversion process from oxysulfide to sulfide was dubious and never further explored [77]. No attention was afforded to the residence time of gas through the reactor or the partial pressure of reacting sulfur, criteria that we which we show in Section VI to be of critical concern for any practical process. Therefore, while our selective sulfidation processes is designed with materials separation in mind, the highly selective nature for sulfide product valency also afforded by our technology (see Section IV) has the potential to innovate production of strategic metal sulfide end products.

III. Thermodynamics of Sulfidation of Oxides

In order for a sulfidation process to be feasible, the reaction must be thermodynamically favorable. Thermodynamic favorability is described by the Gibbs energy of the reaction, $\Delta G$. If the Gibbs energy of an oxide sulfidation reaction is negative, the reaction is considered spontaneous and the target sulfide product will be produced. A typical sulfidation reaction is described by the following, where M denotes a metal, O denotes oxygen, S denotes sulfur, and x and y are stoichiometric coefficients:

$$M_xO_y + \frac{y}{2}S_2 \rightarrow M_xS_y + \frac{y}{2}O_2$$

This sulfidation equation describes the reaction of a single metal to a single sulfide. In practice, elemental sulfur also reacts with oxygen to produce sulfur dioxide. A summary of the sulfidation of some individual metal oxides to metal sulfides and sulfur dioxide is described in Table IIIa, with reaction temperatures of 0° C. to 2000° C. considered. Nevertheless, this table is not enough to fully predict whether or not a sulfidation can be performed. The addition of other materials, such as carbon facilitating a chemically-reaction driven sulfur reflux and described in detail in subsequent sections, can increase the favorability of individual sulfidation reactions with respect to one another. Furthermore, this data is reflective of the equilibrium state of the reaction—reactors almost never reach equilibrium. Running a reactor outside of thermodynamic equilibrium can show significant improvements in product selectivity over what thermodynamics predicts.

If one aspires to use sulfidation to separate mixed metal oxides, the effectiveness of performing one sulfidation reaction over another must be explored. The effectiveness of a chemical process in recovering metal compounds is defined as follows by the distribution factor [3], D, where $S_{(o)}$ is the concentration of the target metal compound solute in the isolated product solution and $S_{(a)}$ is the initial concentration of the target metal compound in the solution from which it is being extracted:

$$D = \frac{S_{(o)}}{S_{(a)}}$$

The selectivity of a hydrometallurgical process in separating one metal compound from another is defined using the separation factor β, which is the ratio of the distribution coefficients of each compound [3]:

$$\beta = \frac{D_1}{D_2}$$

For two liquid metals or metal compounds, the separation factor is synonymous with the thermodynamic equilibrium constant, K, for the interaction between the two liquids [1]. Metal and metal compound separation processes that show higher separation factors are attributed to be technoeconomically favorable [1,3]. The separation factor is directly related to the similarity of the chemistry between compounds to be separated. To increase separation factors, mixed metallurgical compounds can be reacted to change the anion species of some or all of the contained metals, such as the sulfidation reaction described above. Case study models for the comparison of metal oxide sulfidation and separation are presented below for rare earth metals and for transition metals niobium and tantalum. Both of these case studies are selected due to the difficulty of the metal separation via conventional hydrometallurgical methods, and the improvement in thermodynamically predicted separation effectiveness afforded by sulfidation.

Following, modelling results for the effects of added carbon on selectivity in sulfidation are presented. In the cases presented here, carbon is not being employed as an oxide reductant—changes in selectivity due to carbon addition are the result of the complex equilibrium between carbon, sulfur, and oxygen species, elaborated on in Section V.

TABLE IIIa

Sulfidation Thermodynamics of some metal oxides between 0° C. and 2000° C.

| Element | Oxide to Sulfide Reaction | Spontaneous Temperature Range |
|---|---|---|
| Alkaline Metals | | |
| Li | Li2O + 1.5S → Li2S + 0.5SO2 | spontaneous |
| Na | Na2O + 1.5S → Na2S + 0.5SO2 | spontaneous |
| K | K2O + 1.5S → K2S + 0.5SO2 | spontaneous |
| Rb | Rb2O + 1.5S → Rb2S + 0.5SO2 | spontaneous |
| Cs | Cs2O + 1.5S → Cs2S + 0.5SO2 | spontaneous |
| Alkali Earth Metals | | |
| Be | BeO + 1.5S → BeS + 0.5SO2 | non-spontaneous |
| Mg | MgO + 1.5S → MgS + 0.5SO2 | T >1107° C. |
| Ca | CaO + 1.5S → CaS + 0.5SO2 | spontaneous |
| Sr | SrO + 1.5S → SrS + 0.5SO2 | spontaneous |
| Ba | BaO + 1.5S → BaS + 0.5SO2 | spontaneous |
| Transition Metals | | |
| Sc | Sc2O3 + 4.5S → Sc2S3 + 1.5SO2 | spontaneous |
| Ti | Ti2O3 + 4.5S → Ti2S3 + 1.5SO2 | T >1728° C. |
| V | VO + 1.5S → VS + 0.5SO2 | T >1143° C. |
| Cr | Cr2O3 + 4.5S → Cr2S3 + 1.5SO2 | T >1258° C. |
| Mn | MnO + 1.5S → MnS + 0.5SO2 | spontaneous |
| Fe | FeO + 1.5S → FeS + 0.5SO2 | spontaneous |
| Co | CoO + 1.5S → CoS + 0.5SO2 | spontaneous |
| Ni | NiO + 1.5S → NiS + 0.5SO2 | spontaneous |
| Cu | CuO + 1.5S → CuS + 0.5SO2 | spontaneous |
| Zn | ZnO + 1.5S2 → ZnS + 0.5SO2 | spontaneous |
| Y | Y2O3 + 4.5S → Y2S3 + 1.5SO2 | T >632° C. |
| Zr | ZrO2 + 3S → Zr2S + SO2 | T >1508° C. |
| Nb | Nb2O5 + 4.5S → 2NbS + 2.5SO2 | Non-spontaneous |
| Mo | MoO3 + 4.5S → MoS3 + 1.5O2 | spontaneous |
| Ru | RuO2 + 3S → Ru2S + SO2 | spontaneous |
| Rh | Rh2O3 + 4.5S → Rh2S3 + 1.5SO2 | spontaneous |
| Cd | CdO + 1.5S → CdS + 0.5SO2 | spontaneous |
| Hf | HfO2 + 3S → Hf2S + SO2 | non-spontaneous |
| Ta | Ta2O5 + 6.5S → 2TaS2 + 2.5SO2 | T >1777° C. |
| W | WO3 + 4.5S → WS3 + 1.5O2 | T >200° C. |
| Re | ReO2 + 3S → Re2S + SO2 | spontaneous |
| Os | OsO2 + 3S → Os2S + SO2 | spontaneous |
| Ir | IrO2 + 3S → Ir2S + SO2 | spontaneous |
| Basic Metals | | |
| Al | Al2O3 + 4.5S → Al2S3 + 1.5SO2 | non-spontaneous |
| Ga | Ga2O3 + 4.5S → Ga2S3 + 1.5SO2 | T >187° C. |
| In | In2O3 + 4.5S → In2S3 + 1.5SO2 | T >166° C. |
| Sn | SnO2 + 3S → Sn2S + SO2 | T >481° C. |
| Pb | PbO + 1.5S → PbS + 0.5SO2 | spontaneous |
| Bi | Bi2O3 + 4.5S → Bi2S3 + 1.5SO2 | spontaneous |
| Lanthanides | | |
| La | La2O3 + 4.5S → La2S3 + 1.5SO2 | T >226° C. |
| Ce | Ce2O3 + 4.5S → Ce2S3 + 1.5SO2 | T >450° C. |
| Pr | Pr2O3 + 4.5S → Pr2S3 + 1.5SO2 | T >722° C. |
| Nd | Nd2O3 + 4.5S → Nd2S3 + 1.5SO2 | T >539° C. |
| Sm | Sm2O3 + 4.5S → Sm2S3 + 1.5SO2 | T >505° C. |
| Gd | Gd2O3 + 4.5S → Gd2S3 + 1.5SO2 | T >434° C. |
| Tb | Tb2O3 + 4.5S → Tb2S3 + 1.5SO2 | T >634° C. |
| Dy | Dy2O3 + 4.5S → Dy2S3 + 1.5SO2 | T >550° C. |
| Ho | Ho2O3 + 4.5S → Ho2S3 + 1.5SO2 | T >650° C. |
| Er | Er2O3 + 4.5S → Er2S3 + 1.5SO2 | T >682° C. |
| Tm | Tm2O3 + 4.5S → Tm2S3 + 1.5SO2 | T >553° C. |
| Yb | Yb2O3 + 4.5S → Yb2S3 + 1.5SO2 | T >524° C. |
| Lu | Lu2O3 + 4.5S → Lu2S3 + 1.5SO2 | T >502° C. |
| Actinides | | |
| Th | ThO2 + 3S → Th2S + SO2 | non-spontaneous |
| U | UO2 + 3S → U2S + SO2 | T >1952° C. |
| Metalloids | | |
| B | B2O3 + 4.5S → B2S3 + 1.5SO2 | non-spontaneous |
| Si | SiO2 + 3S → Si2S + SO2 | non-spontaneous |

TABLE IIIa-continued

Sulfidation Thermodynamics of some metal oxides between 0° C. and 2000° C.

| Element | Oxide to Sulfide Reaction | Spontaneous Temperature Range |
|---|---|---|
| Ge | $GeO_2 + 3S \rightarrow Ge_2S + SO_2$ | T >425° C. |
| As | $As_2O_3 + 4.5S \rightarrow As_2S_3 + 1.5SO_2$ | spontaneous |
| Sb | $Sb_2O_3 + 4.5S \rightarrow Sb_2S_3 + 1.5SO_2$ | spontaneous |

III-I. Rare Earth Metals

Figure 3A:
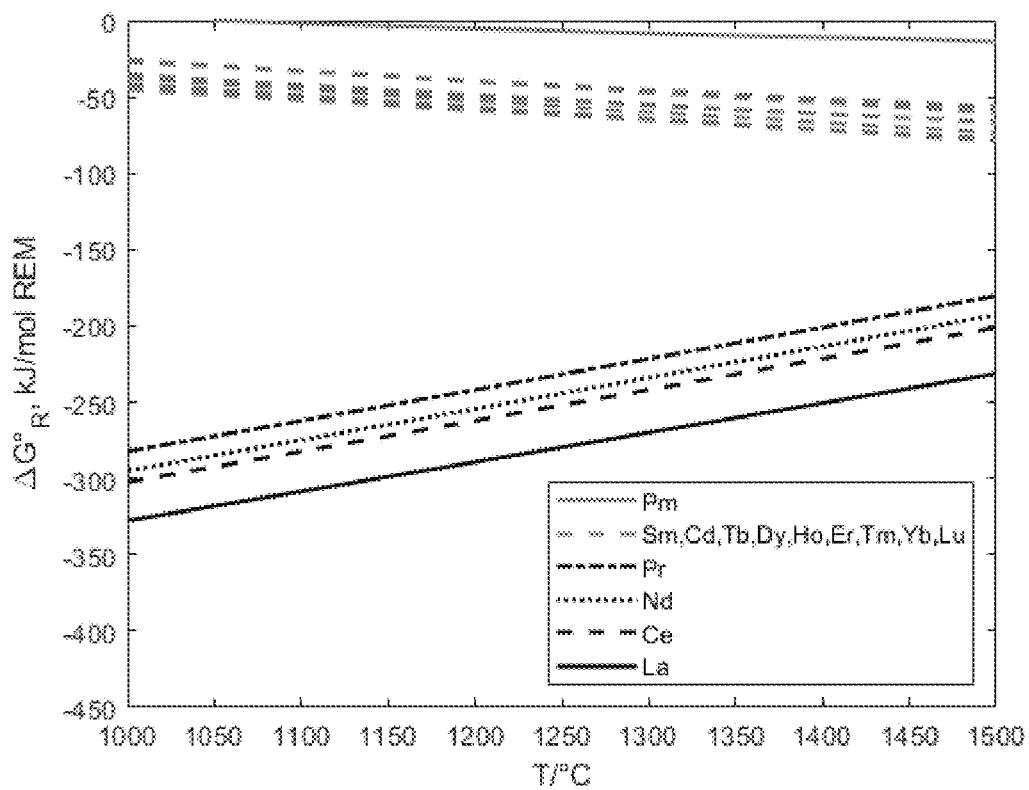
FIG. 3A shows thermodynamics of sulfide to oxide anionic exchange in rare earth oxide and sulfide compounds.

FIG. 3A shows thermodynamics of sulfide to oxide anionic exchange in rare earth oxide and sulfide compounds, depicting equilibrium reaction thermodynamics of rare earth oxides with elemental sulfur. The negative Gibb's energy values show that the sulfidation reaction is thermodynamically feasible. All rare earth oxides have the ability to be sulfidized with elemental sulfur, confirming that the notion of an anion exchange between oxygen and sulfur is thermodynamically feasible.

If the thermodynamic interactions of the metals sulfides with one another are found to be more different than that of the oxides, the process selectivity increases. An increase in selectivity reduces the number of reactors and reaction stages required, decreasing residence time, operating, and capital costs. A comparison of the thermodynamic selectivity is presented below in FIG. 3B, which constitutes an Ellingham diagram for rare earth oxides and sulfides, where the Gibbs Energy of reacting a metal with a gas is tabulated. Sulfidation and oxidation of the metal correspond to the following reactions:

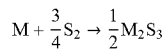
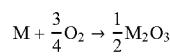

$$M + \frac{3}{4}S_2 \rightarrow \frac{1}{2}M_2S_3$$

$$M + \frac{3}{4}O_2 \rightarrow \frac{1}{2}M_2O_3$$

Figure 3B:
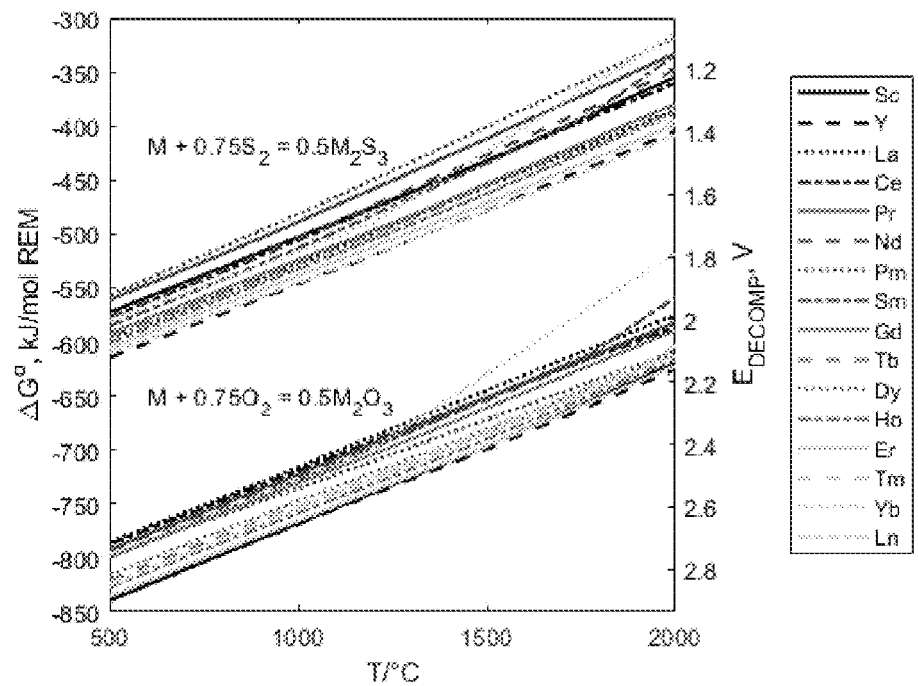
FIG. 3B shows an Ellingham diagram for rare earth oxides and sulfides.

Lines that are lower correspond to metal compounds that are more stable, and lines that are closer together denote greater difficulty in separating the metals. FIG. 3B shows an Ellingham diagram for rare earth oxides and sulfides. The increased spacing between lines for sulfidation reaction demonstrates increased selectivity in the separation of rare earth sulfides vs oxides. As shown in FIG. 3B, for rare earth metals, selectivity is higher for the sulfide than the oxide due to the greater energetic separation between the different sulfidizing reactions than the corresponding oxidation reactions. The oxides are shown to exist closely together in two groups, making separation within a group highly difficult. Meanwhile, the sulfides are more spread out, facilitating easier separation.

Figure 3C:
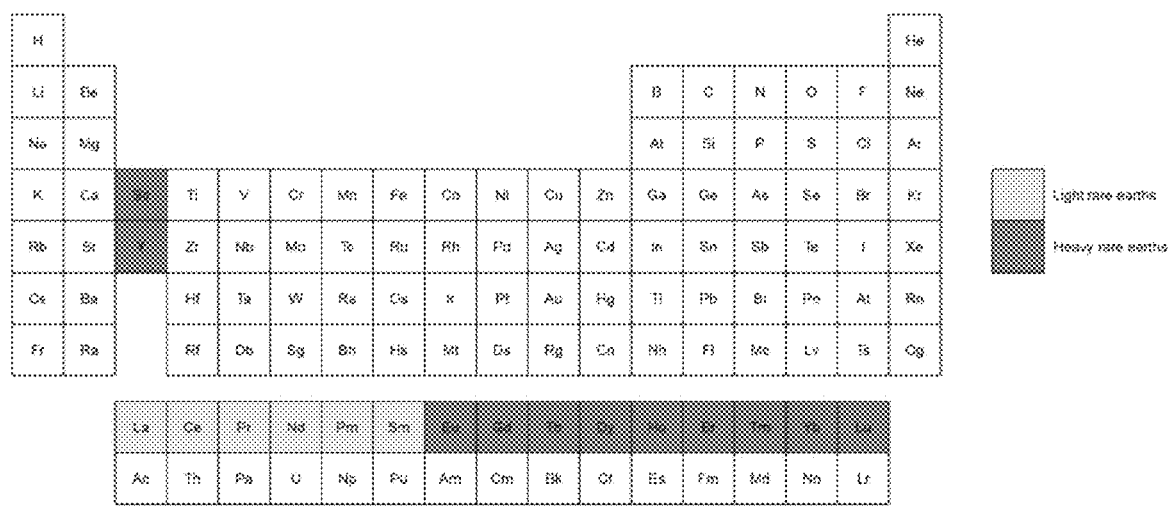
FIG. 3C shows classes of rare earth elements.

To quantify the selectivity of different chemistries for rare earth metals, the separation factor is employed. FIG. 3C shows classes of rare earth elements. The rare earth elements can be broken into two main groups based on prevalence in different ore grades: light and heavy. Industrially relevant metrics for rare earth metal separation include selectivity between different light metals (La, Ce, Pr, Nd, Sm), different heavy metals (Eu, Gd, Tb, Dy, Ho, Er, Tm, Yb, Lu, Y, and Sc), and adjacent neighbors (with respect to the period table). These subcategories are reflective of the main chemical breakdown of available rare earth concentrates. Tables IIIb (FIG. 22A) and IIIc (FIGS. 22B) show thermodynamic separation factors for liquid rare earth sulfides, while Tables IIId (FIG. 22C)-IIIg (FIG. 22F) depict the separation factors of industrially-employed hydrometallurgical solvent extraction and acid leaching technologies HDEHP-HCL, HBTMPP, P507, and Cyanex 923 [3]. Table IIIh (FIG. 22G) depicts a comparison of the chemistry with the highest selectivity for each rare earth metal, while Table IIIi (FIG. 22H) reports the nearest neighbor selectivities. Of currently employed hydrometallurgical methods, HBTMPP shows the highest selectivity for most rare earth metals. However, molten rare earth sulfides at 1500° C. have greatly improved selectivity over HBTMPP for many metals. In particular, rare earth sulfides show promise in the separation of nearest-neighbor and light rare earth elements, with a superior thermodynamic selectivity for light rare earths and half of the nearest neighbor combinations.

III-II. Transition Metals—Niobium and Tantalum

Transition metals within the same group of the periodic table exhibit similar chemistry to one another, facing comparable separation challenges to rare earth metals. One challenging separation of note is strategic metals niobium and tantalum. Currently, hydrometallurgical methods employing mineral acids mixed with hydrofluoric acid are employed for selective leaching of niobium and tantalum. However, hydrometallurgists are trying to shift away from the use of hydrofluoric acid due to advancing environmental and human health regulations limiting the use of fluoride ions [78]. Ergo, new methods of metal separation from materials concentrate must be explored. Selective sulfidation has the thermodynamic potential to show improved selectivity for niobium versus tantalum, with separation factors higher than currently employed mineral acid-hydrofluoric acid methods.

Figure 3D:
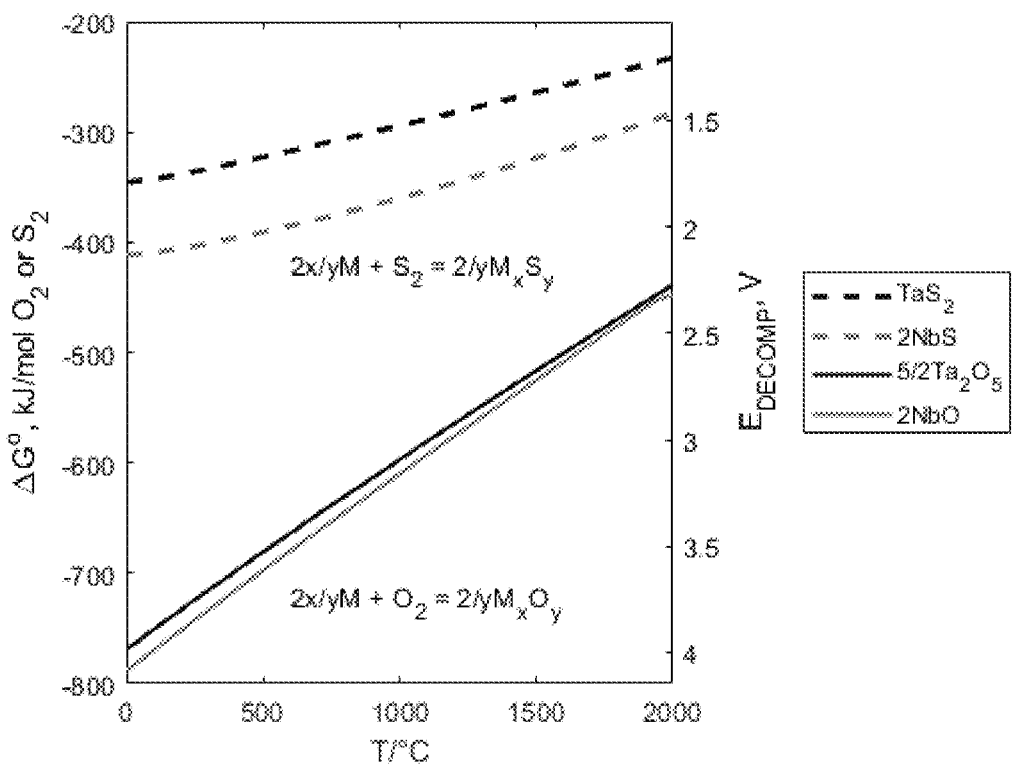
FIG. 3D shows an Ellingham diagram depicting oxidation and sulfidation of niobium and tantalum.
Figure 3E:
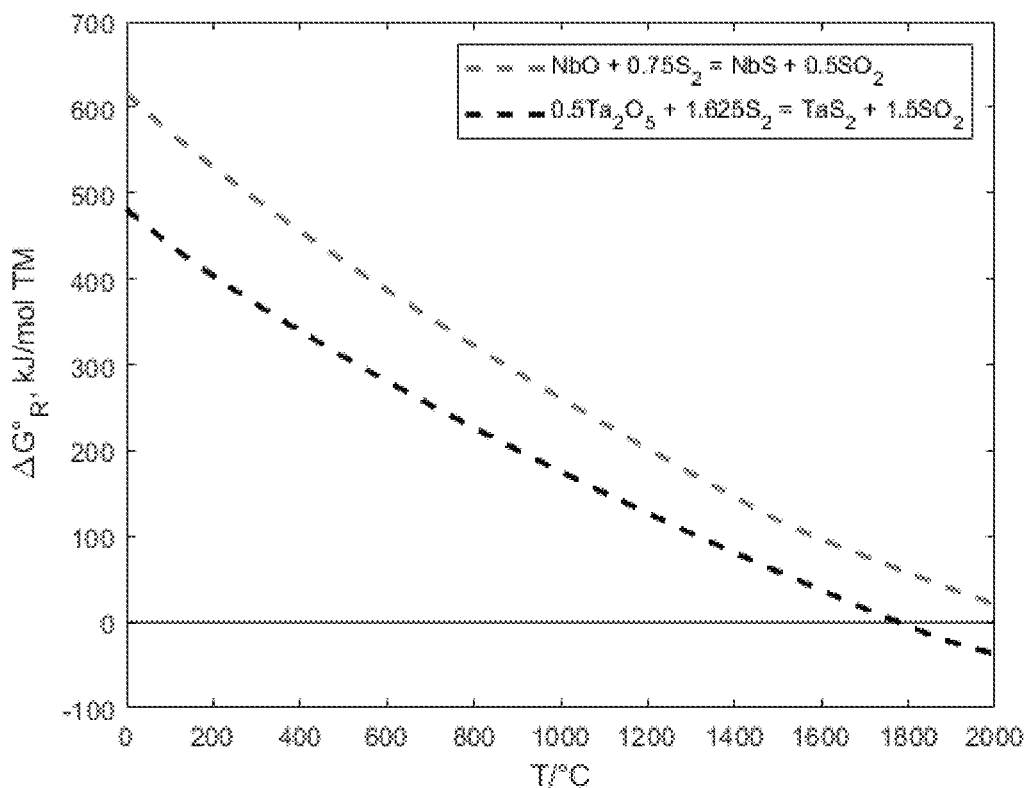
FIG. 3E shows a sulfidation equilibrium reaction of niobium and tantalum oxides.

Employing the same framework described for rare earth sulfidation, an Ellingham diagram for niobium and tantalum oxides and sulfides are shown in FIG. 3D. Selectivity for one metal over another in the sulfide is higher than in the oxide, as shown by the larger difference in Gibbs's energy of reaction. Despite the fact that the most stable oxides show different stoichiometry, they behave very similarly from a thermodynamic perspective. Nevertheless, upon sulfidation the thermodynamics of the two sulfides are very different, suggesting that a huge increase in separation factor can be achieved on complete sulfidation of a mixture of tantalum and niobium oxides. However, the sulfidation reaction becomes spontaneous at different temperatures (Gibbs energy of reaction less than 0), meaning that in principle tantalum or niobium can be sulfurized selectively. FIG. 3E shows a sulfidation equilibrium reaction of niobium and tantalum oxides. The sulfidation of tantalum oxide becomes favorable (Gibb's energy of reaction less than zero) at 1777° C., while the sulfidation of niobium oxide does not become favorable until above 2000° C. The high temperature at which the equilibrium reaction becomes spontaneous can be overcome by control of the gas atmosphere, described in Section VI. The separation factor of niobium oxide vs tantalum sulfide at equilibrium can be described by the equilibrium constant of the following reaction:

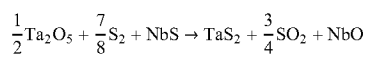

$$\frac{1}{2}Ta_2O_5 + \frac{7}{8}S_2 + NbS \rightarrow TaS_2 + \frac{3}{4}SO_2 + NbO$$

Figure 3F:
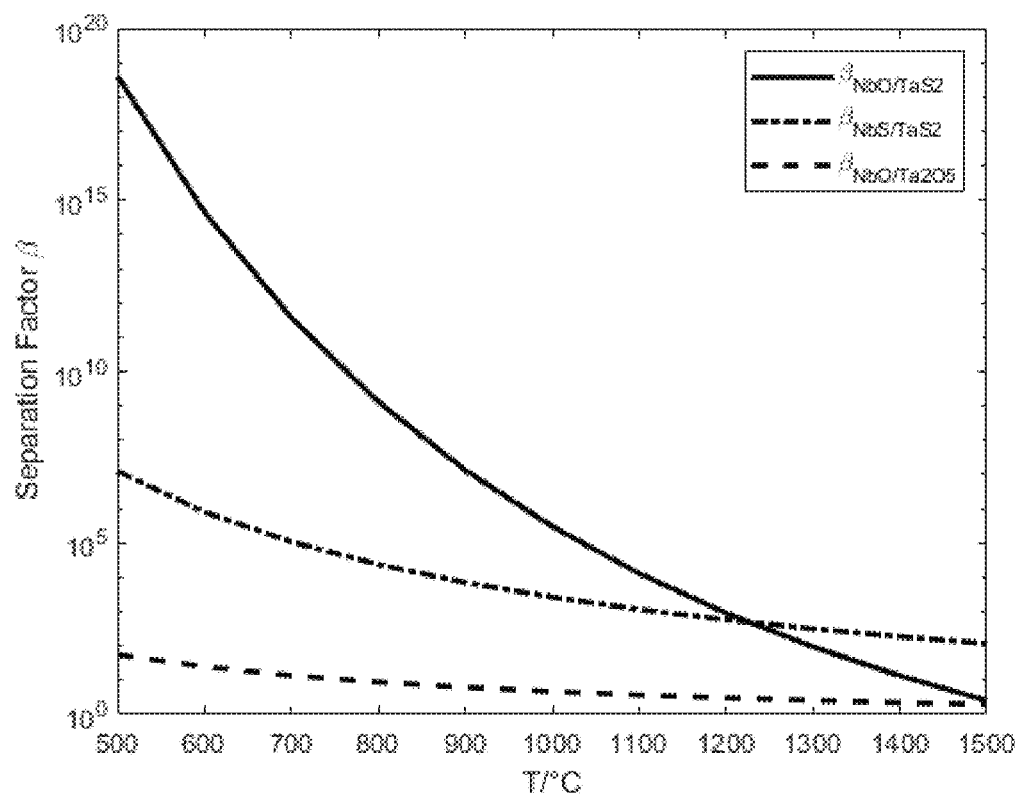
FIG. 3F shows separation factors of mixed niobium and tantalum oxides as well as tantalum sulfide and niobium oxide.
Figure 3G:
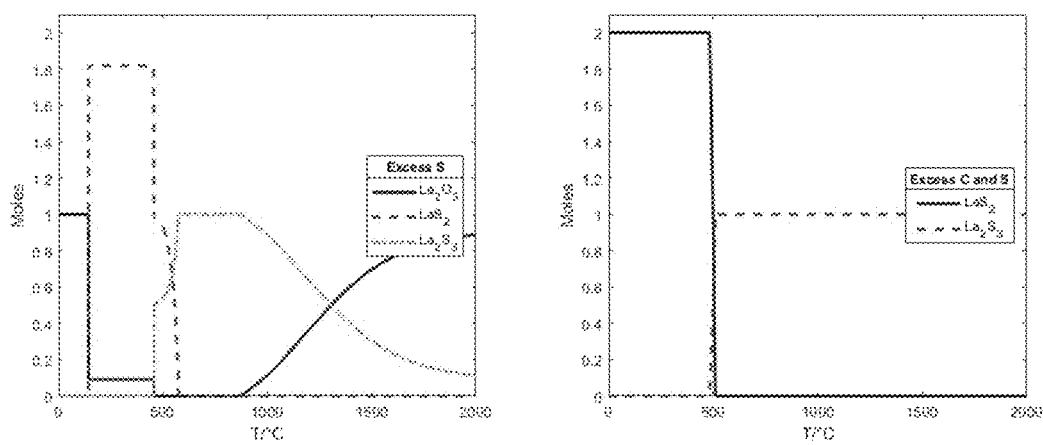
FIG. 3G shows a comparison of equilibrium sulfidation of lanthanum oxide with and without a saturation of carbon.
Figure 3H:
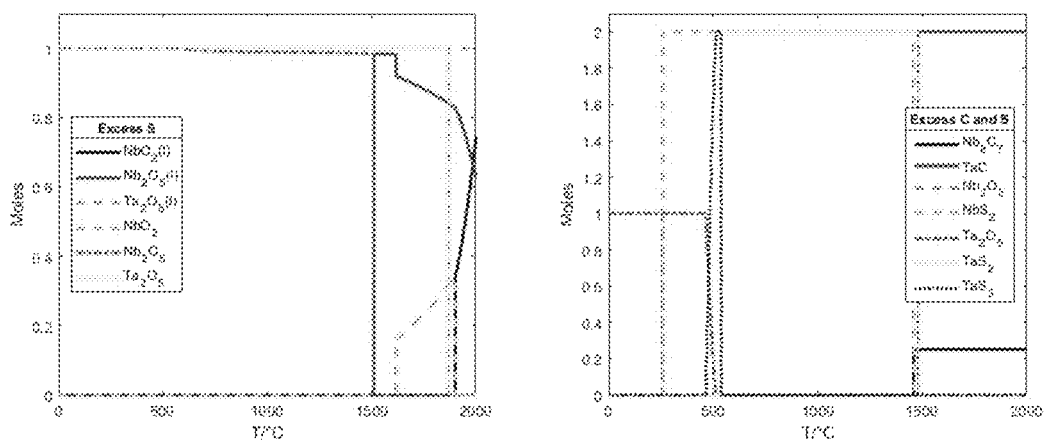
FIG. 3H shows a comparison of equilibrium sulfidation of niobium and tantalum oxides with and without a saturation of carbon.
Figure 3I:
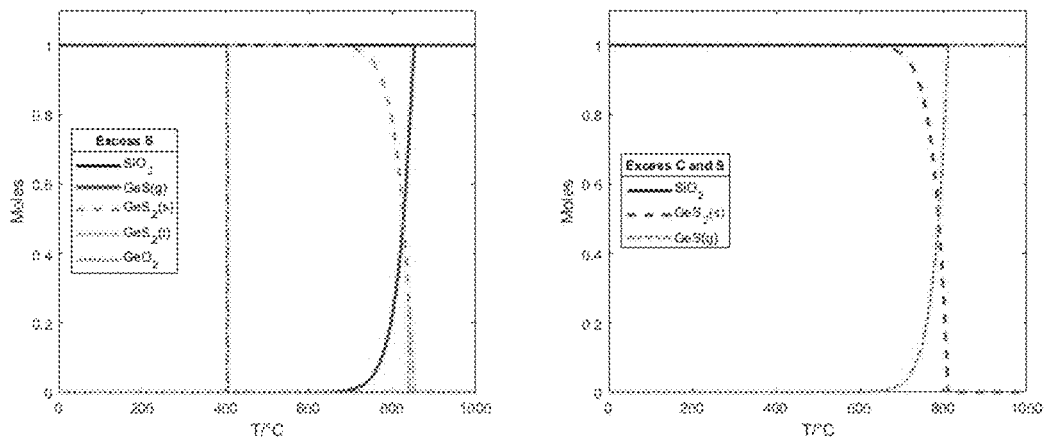
FIG. 3I shows a comparison of equilibrium sulfidation of silicon and germanium oxides with and without a saturation of carbon.
Figure 3J:
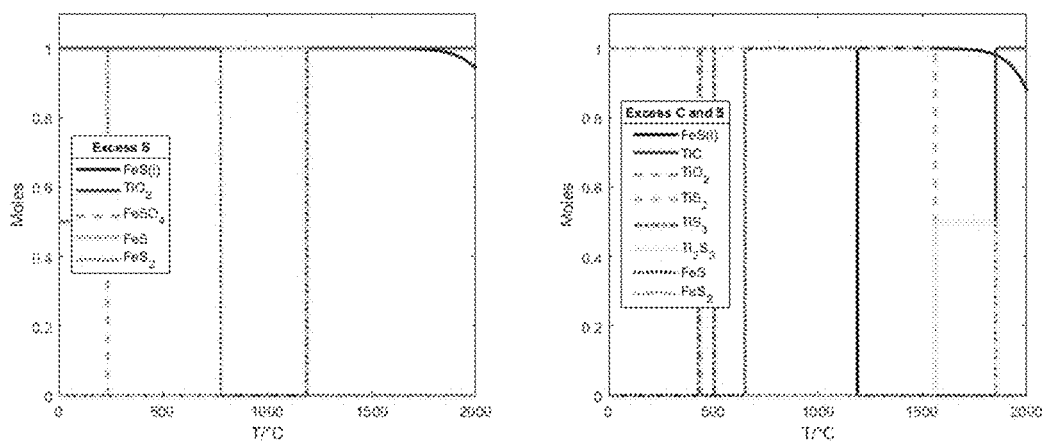
FIG. 3J shows a comparison of equilibrium sulfidation of iron and titanium oxides with and without a saturation of carbon.
Figure 3K:
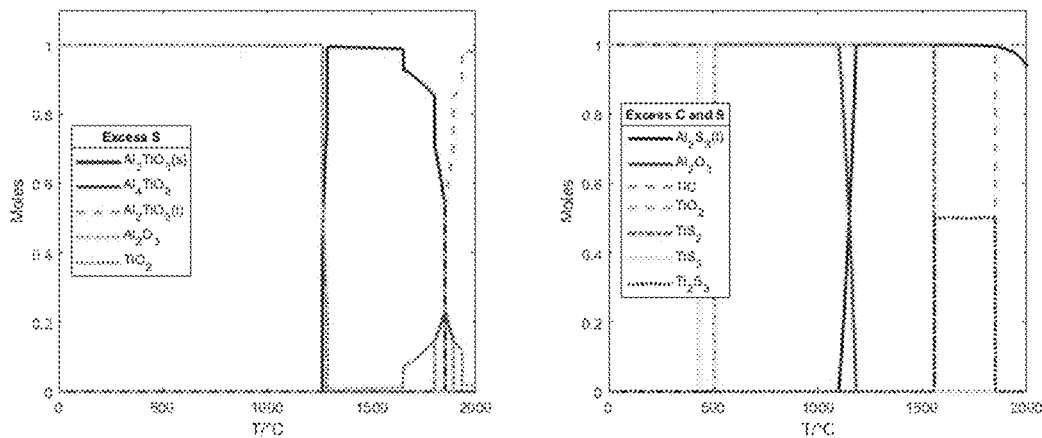
FIG. 3K shows a comparison of equilibrium sulfidation of aluminum and titanium oxides with and without a saturation of carbon.
Figure 3L:
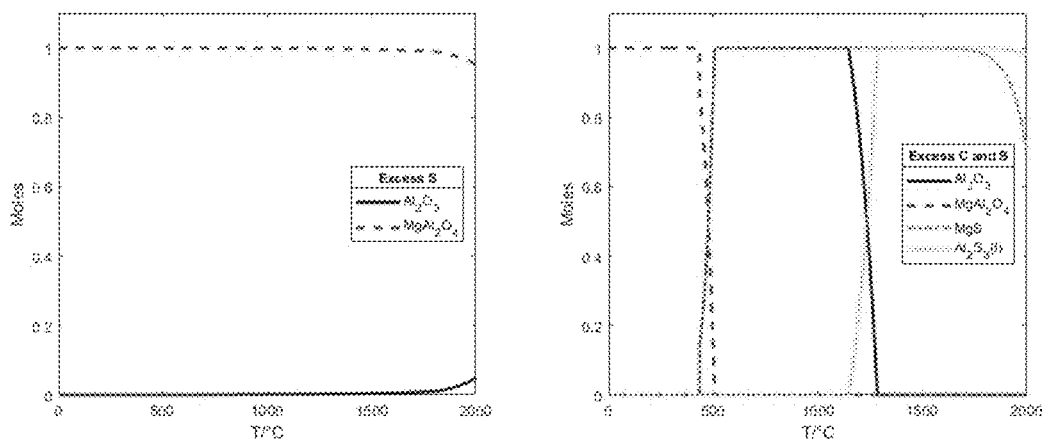
FIG. 3L shows a comparison of equilibrium sulfidation of aluminum and magnesium oxides with and without a saturation of carbon.

FIG. 3F shows a comparison of the separation factors of mixed niobium and tantalum oxides as well as tantalum sulfide and niobium oxide. Separation factor increases upon complete sulfidation but is highest on selective sulfidation of tantalum oxide to tantalum sulfide. Meanwhile, a table of separation factors for existing hydrometallurgical methods are included in Table IIIj. Selective or complete sulfidation of tantalum and niobium oxide show orders of magnitude higher thermodynamic separation factors for niobium and tantalum than existing hydrometallurgical methods. Coupled with the fact that existing hydrometallurgical methods of tantalum and niobium separation face increasing regulatory scrutiny for their use of hydrofluoric acid (employed by current technologies with the highest separation factors), separation of tantalum and niobium facilitated via selective sulfidation is a significant and much needed technological leap for separation.

TABLE IIIj

Comparison of Separation Factors for Niobium and Tantalum for Commercial Solvent Extraction [78]

| Extraction Technology | HF Concentration | $H_2SO_4$ Concentration | Separation Factor $\beta$ |
| --- | --- | --- | --- |
| MIBK | 3.0M | 2.0M | 1185 |
| TIMP | 1.28M | 0.71M | 217 |
| OCL-2 | — | 2.0M | 882 |
| TOA | — | 1.0M | 30.77 |
| TDA | — | 1.5M | 11.76 |
| TDDA | — | 1.0M | 14.00 |

III-III. Thermodynamic Motivation for a Carbothermic Pathway for Selectivity Control While sulfur is the main reacting gas species for the sulfidation reaction, other reactive media can be employed to aid in metal reduction and sulfidation. For this role, carbon is a strong candidate due to its well-known nature as a reductant in industries such as steel production. The presence of a reductant such as carbon will drastically change the chemistry of sulfidation and provides a possible means of sulfidation product selectivity and control.

To ascertain whether carbon has an effect on sulfidation, the thermodynamic effect of carbon on sulfidation can be modelled. For a hypothetical metal-oxide system, a comparison can be made between two nonphysical reaction conditions—one where a metal-oxide system is saturated with sulfur, and one where it is saturated with sulfur and carbon. This state is non-physical because it completely ignores the effects of chemical kinetics and mass transfer. Nevertheless, it can provide insight into what new chemical species could be formed based on equilibrium thermodynamics. From this analysis, one can gain a sense of qualitatively whether the addition of carbon in a system benefits sulfidation selectivity. This thermodynamic thought experiment is conducted for sulfidation with and without carbon for lanthanum oxide in FIG. 3G, which shows a comparison of equilibrium sulfidation of lanthanum oxide with and without a saturation of carbon, niobium and tantalum oxides in FIG. 3H, which shows a comparison of equilibrium sulfidation of niobium and tantalum oxides with and without a saturation of carbon, silicon and germanium oxides in FIG. 3I, which shows a comparison of equilibrium sulfidation of silicon and germanium oxides with and without a saturation of carbon, iron and titanium oxides in FIG. 3J, which shows a comparison of equilibrium sulfidation of iron and titanium oxides with and without a saturation of carbon, aluminum and titanium oxides in FIG. 3K, which shows a comparison of equilibrium sulfidation of aluminum and titanium oxides with and without a saturation of carbon, and aluminum and magnesium oxides in FIG. 3L, which shows a comparison of equilibrium sulfidation of aluminum and magnesium oxides with and without a saturation of carbon. As is shown in FIGS. 3G-3L, the number of sulfide species and valences that could thermodynamically exist changes when the sulfidation is performed under excess sulfur and excess carbon compared to excess sulfur alone.

Based on the changes in sulfidation of lanthanum oxide, niobium and tantalum oxides, silicon and germanium oxides, titanium and iron oxides, aluminum and titanium oxides, and aluminum and magnesium oxides, as shown in FIGS. 3G-3L there is a clear change in the sulfidation selectivity and valences present between running the reaction under excess sulfur with and without excess carbon. However, the way in which the thermodynamic equilibrium changes and to what degree carbon is helpful to sulfidation, is non-obvious and cannot be predicted from a materials agnostic scientific point of view. This is due to the fact that processes are not run at equilibrium, meaning that the predictions of equilibrium thermodynamics cannot be used in isolation to design a process. Other phenomena such as reaction kinetics and mass transfer also play significant roles in the behavior of an industrial process. It is clear, however, that effective control of the carbon content of the system is necessary for control of the sulfide product produced via sulfidation of an oxide with elemental sulfur.

III-IV. Thermodynamic Summary

Most metal oxides can be sulfidized by elemental sulfur, providing an alternate processing route to conventional hydrometallurgical separation of oxides. In the case of difficult to separate rare earth metals or same-group transition metals such as niobium and tantalum, sulfidation of the oxides differentiates the chemistry of the mixed compounds to allow for significantly improved thermodynamic separation factors. For oxide mixtures where one species can be sulfidized selectively, further improvements to separation factors can be expected due to drastically different chemistry between the selectively-sulfidized metal to the other metal oxides. The addition of carbon to the system has the potential to increase selectivity in sulfidation. Thermodynamic equilibrium however does not dictate the equilibrium behavior of a reactor. Reactors are often run outside of thermodynamic equilibrium to improve selectivity. Furthermore, thermodynamic equilibrium predictions can be found to be unachievable or overcome via mass transfer and reaction kinetics considerations.

IV. Demonstration of Sulfidation of Lanthanum Oxide

To demonstrate the feasibility of sulfidation of an oxide, lanthanum oxide was chosen as the starting material due to its industrially-relevant nature as a rare earth element and its chemical similarity to other difficult to separate oxides of interest. The net sulfidation reaction of lanthanum oxide with elemental sulfur to lanthanum sulfide and sulfur dioxide is as follows:

$$La_2O_3 + \frac{9}{4}S_2 \rightarrow La_2S_3 + \frac{3}{2}SO_2$$

IV-I. Experimental Apparatus

Figure 3M:
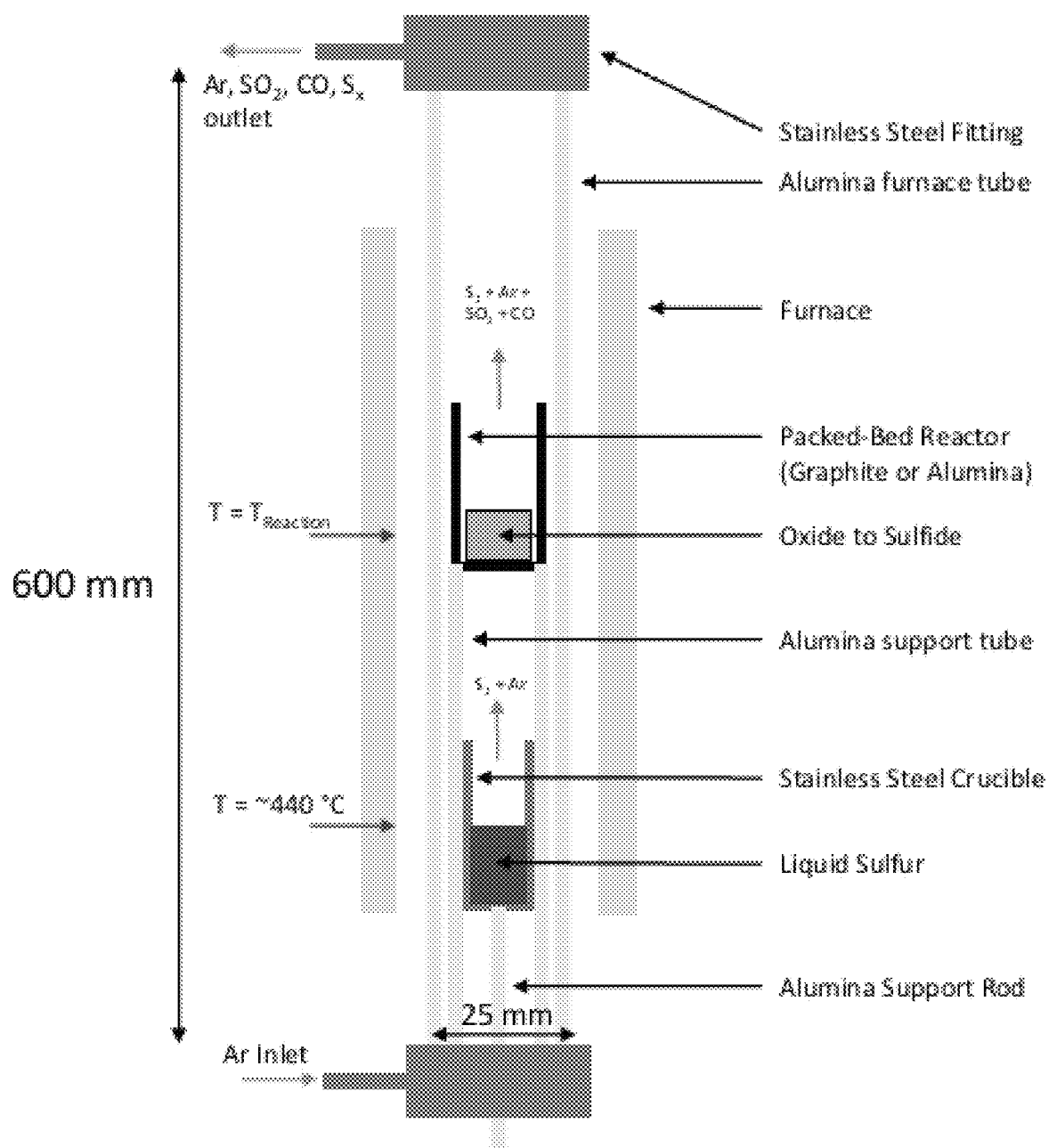
FIG. 3M is a schematic diagram of a laboratory-scale sulfide synthesis apparatus that can be used in various selective sulfidation processes described herein.

At an industrial scale, most fluid-solid reactions occur in a packed bed or fluidized bed reactors, for example, of the type shown in FIG. 3M. These reactors operate by flowing a fluid through a porous solid mixture. Typically, packed and fluidized bed reactors are utilized to produce a fluid product from a solid catalyst, necessitating that the catalyst and structure to support the catalyst remain inert. However, in the case of the proposed sulfidation reaction, the starting solid is the material to be reacted. This key difference opens up a new design space for non-obvious innovation in reactor design and chemical handling. The laboratory-scale sulfidation apparatus was designed with the notion that the reactor geometry would follow industrially well-known and scientifically characterized packed bed and fluidized bed reactors, with the caveat that novel, non-obvious techniques for chemical handling, process control, and reagent refluxing and recycling will be necessary, such as the proposed carbothermically-driven sulfur reflux system and resulting sulfide product metal-valence control described later.

Figure 4A:
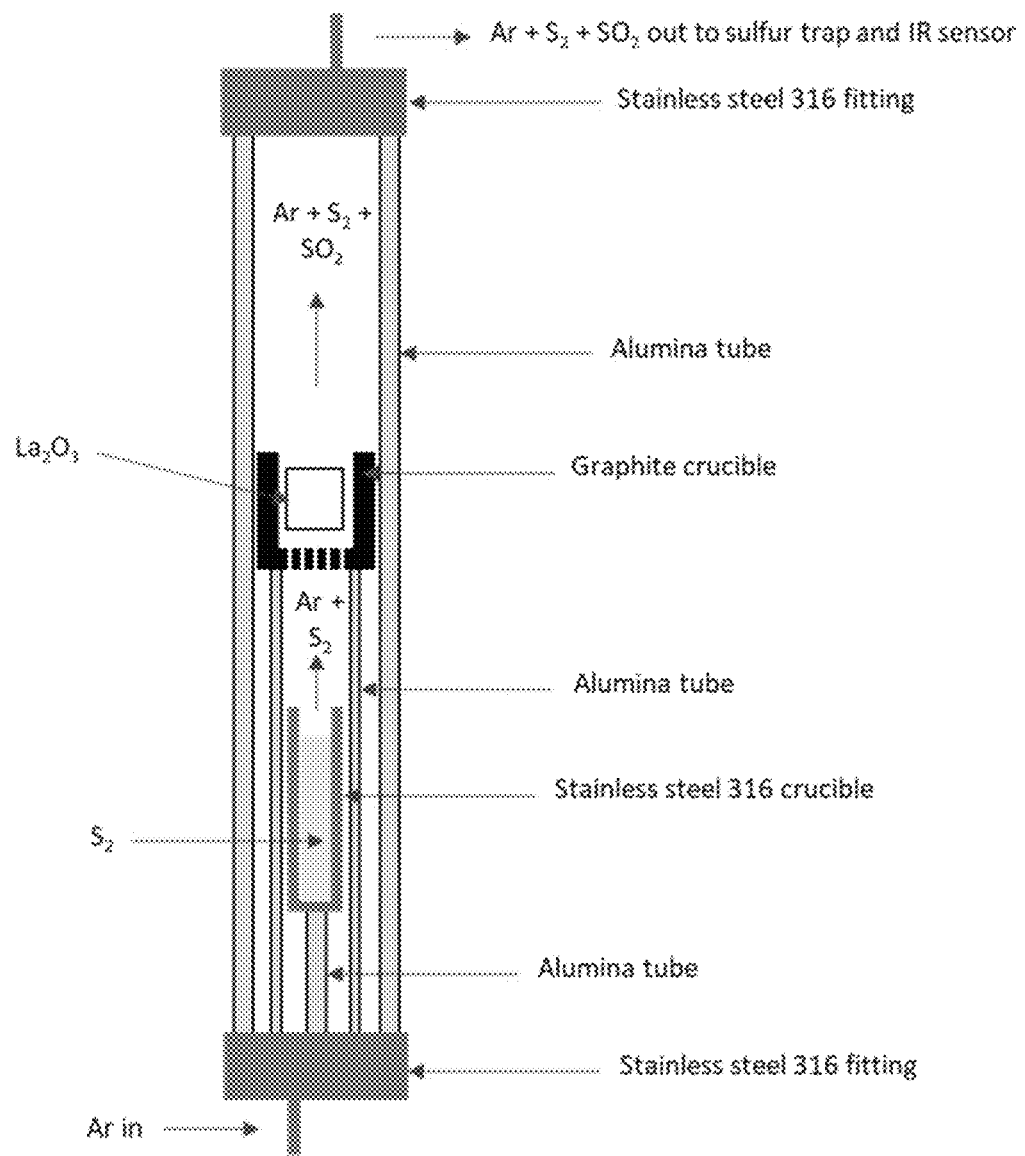
FIG. 4A shows a laboratory-scale sulfide synthesis apparatus used in the synthesis of lanthanum sulfide.
Figure 4B:
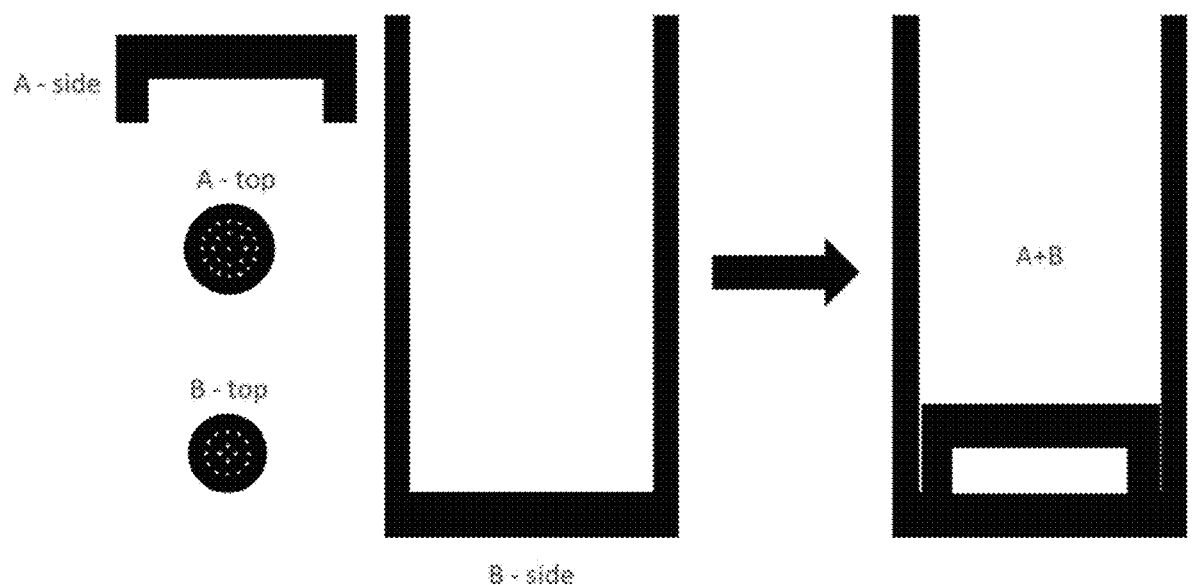
FIG. 4B shows a two-part graphite tray design to hold lanthanum oxide.

The laboratory-scale sulfidation apparatus used for lanthanum sulfide synthesis is presented in FIG. 4A, with a tube diameter of 25 mm supporting 2.5 g of lanthanum oxide. A larger, similarly-scaled apparatus was also utilized with a tube diameter of 63 mm supporting 50 grams of lanthanum oxide. A tube furnace with inert atmosphere control was employed as the heat source and coupled to an infrared gas analyzer. Lanthanum oxide at a porosity of 83% was held in a two-part graphite tray (FIG. 4B). This tray is fabricated in two cylindrical pieces that slide together, each with holes in the bottom. The holes are necessary so sulfur gas can flow into the apparatus, but small enough (with a diameter of 0.5 mm) and offset so that lanthanum oxide powder does not fall out of the bottom. The choice of graphite serves as a source of carbon for the carbothermically-driven sulfur reflux described in Section V. The graphite tray facilitated the carbothermically-driven sulfur reflux, described in detail in Section V. Elemental sulfur was evaporated from a stainless steel crucible held lower in the furnace, utilizing the thermal gradient of the furnace to heat the sulfur. The reaction was run under a flowing inert argon atmosphere—the only source of oxygen present in the gas stream was the result of sulfidation of the lanthanum oxide. The chemical kinetics over the course of the reaction were measured by a mass balance over the oxygen contained in sulfur dioxide and carbon monoxide. The rate of sulfur evaporation was measured using a hydrogen sulfide tracer.

Given that a sulfidation reaction is thermodynamically favorable, this laboratory-scale apparatus could be utilized with any starting solo or mixed metal oxide at a laboratory scale. Similarly, the design decisions and operating conditions proposed for industrial-scale lanthanum sulfide synthesis are applicable and necessary for both complete and selective sulfidation of other both single and mixed metal oxide feed streams at an industrial scale.

IV-II. Sulfidation Results and Effectiveness

Figure 4D:
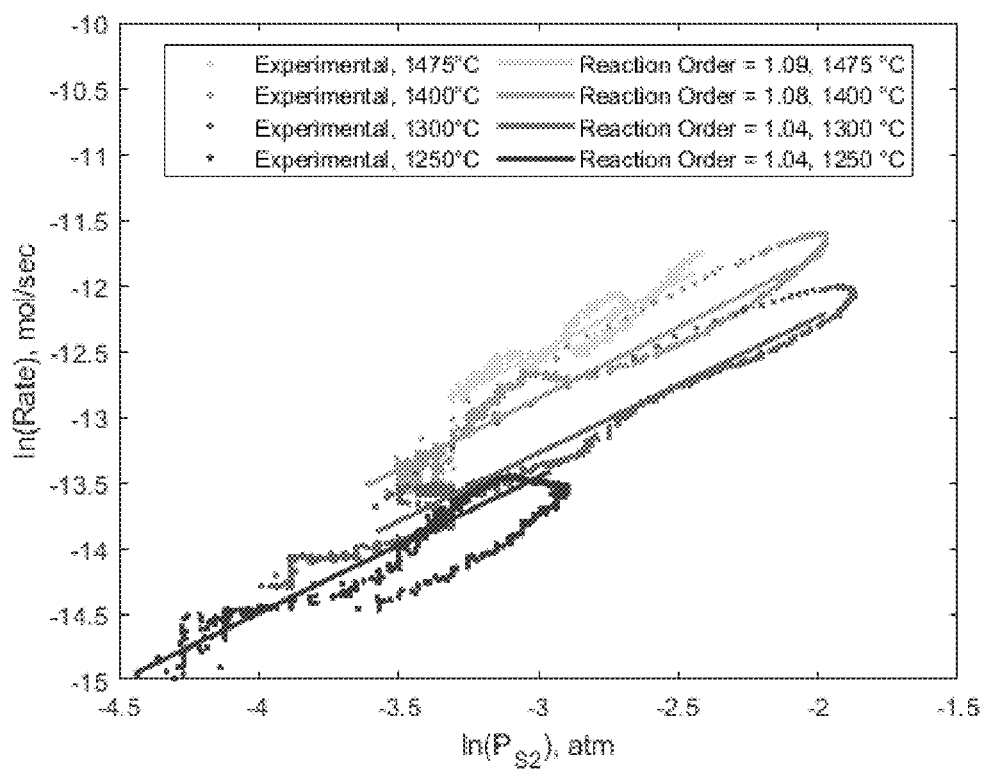
FIG. 4D shows a plot of the natural log of the reaction rate vs the natural log of the partial pressure of sulfur gas.
Figure 4C:
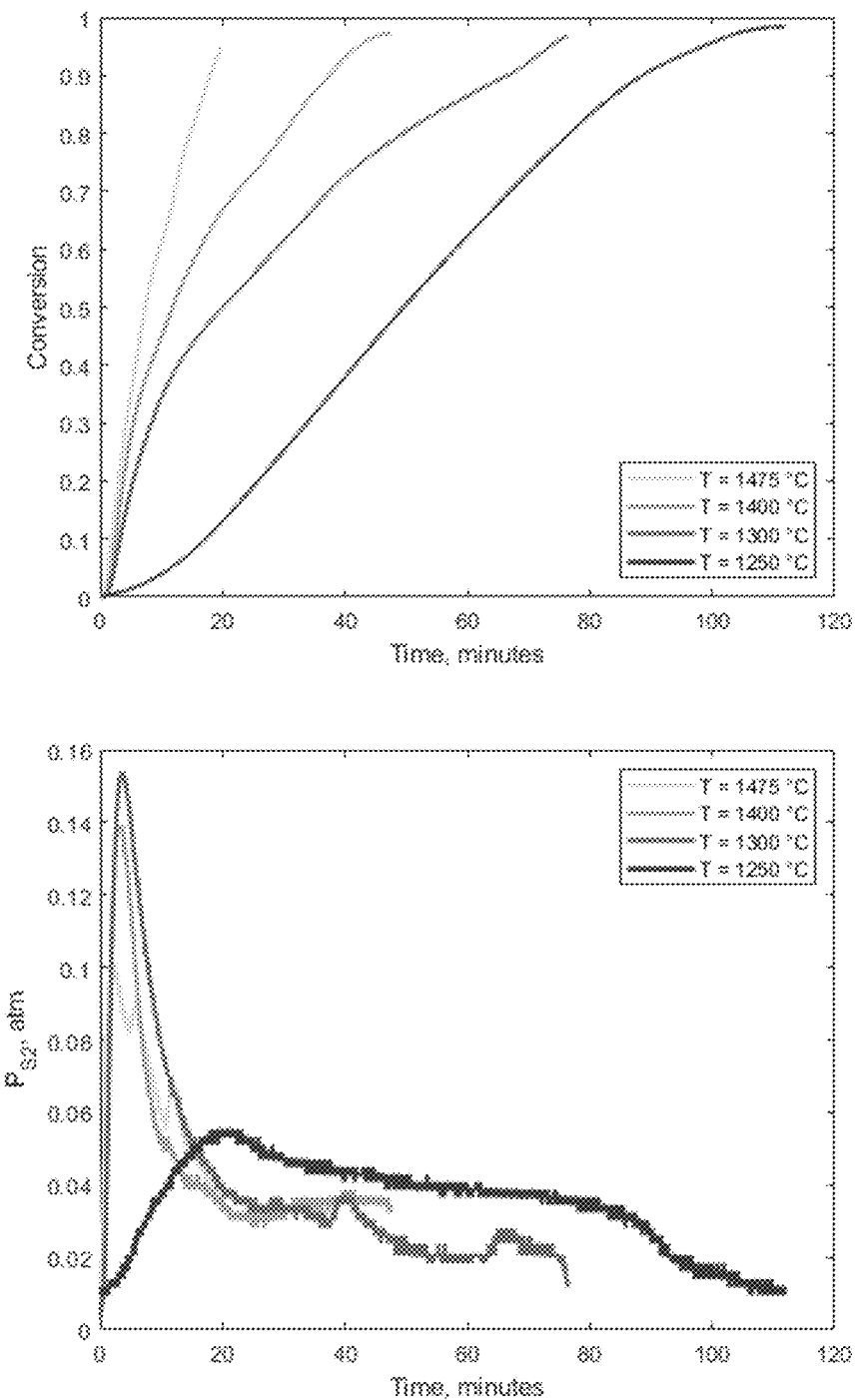
FIG. 4C shows conversion versus time with respect to sulfur partial pressure.

Sulfidation reactions of lanthanum sulfide were carried out in the 25 mm tube at temperatures ranging from 1200° C. to 1475° C. with sulfur partial pressures ranging from 0.02 atm to 0.15 atm of diatomic sulfur, with a net pressure of 1 atm maintained using an inert stream of argon gas. Sulfidation of lanthanum oxide using the larger-scale 63 mm tube was carried out at a temperature of 1350° C. and a 0.9 atm sulfur gas stream with argon dilution. Conversion curves with corresponding sulfur partial pressures are shown in FIG. 4C for results in the 25 mm apparatus reacting 2.5 g of lanthanum oxide. Conversion time is shown to decrease with increasing temperature with the reaction rate increasing with partial pressure of sulfur. Exact conversion times at an industrial scale are dependent on reactor design but are expected to be similar for the industrial scale reactor—with increasing oxide feeds, the reactor residence time remains the same while the physical size of the reactor increases.

In determining the lanthanum-sulfide product purity, there are two main metrics that can be used—chemical purity and absolute purity. Chemical purity, as is typically utilized, refers to the purity of the product with respect to other key elements; for instance, metals basis purity is the percent purity of the metal cation (here lanthanum) with respect to other metals while ignoring the purity of the anion (oxygen or sulfur). Meanwhile, absolute purity refers to the actual percentage of the target compound within the material. Industrially-pure compounds typically are on the order of 99% purity from a metals basis, while absolute purity may be far lower. The absolute purities achieved through our sulfidation processes are reported in Table IVa, as determined through a variety of chemical analysis methods. Our sulfidation product oxygen content is consistent with lanthanum sulfide purchased at 99.9% rare earth oxide metals purity.

TABLE IVa

Sulfide product characterization and purity determined using a variety of chemical methods.

| | Reaction Temperature | | | |
|---|---|---|---|---|
| | 1200° C. | 1300° C. | 1400° C. | 1475° C. |
| WDS Composition | | | | |
| La | 41.1 atomic % | 41.4 atomic % | 41.3 atomic % | 41.0 atomic % |
| S | 58.9 atomic % | 58.6 atomic % | 58.7 atomic % | 59.9 atomic % |
| LECO Composition | | | | |
| S | 24.8 mass % | 23.3 mass % | 24.6 mass % | 22.5 mass % |
| O | 0.72 mass % | 0.77 mass % | 0.42 mass % | 0.60 mass % |
| XRD composition | | | | |
| $La_2O_3$ | — | — | — | — |
| $La_2O_2S$ | — | — | 4.3 mass % | — |
| $La_3S_4$ | 13.4 mass % | 3.9 mass % | 11.2 mass % | 24.8 mass % |
| $La_2S_3$ | 86.6 mass % | 96.1 mass % | 84.5 mass % | 75.2 mass % |
| Sulfide Purity | | | | |
| Gas Flow (absolute) | 96.20% | 96.65% | 97.24% | 94.32% |
| WDS (absolute) | 99.9% | 99.9% | 99.9% | 99.9% |
| LECO (absolute) | 97.18% | 96.81% | 98.32% | 97.40% |

TABLE IVa-continued

Sulfide product characterization and purity determined using a variety of chemical methods.

| | Reaction Temperature | | | |
|---|---|---|---|---|
| | 1200° C. | 1300° C. | 1400° C. | 1475° C. |
| XRD (absolute) | 99.9% | 99.9% | 95.7% | 99.9% |
| Rare Earth Basis (relative) | 99.9% | 99.9% | 99.9% | 99.9% |

As can be seen, nearly complete conversion of oxide to sulfide was achieved using our sulfidation reactor. Furthermore, as suggested below, through control of temperature and sulfur partial pressure, high selectivity for metal valency can be achieved (e.g., see results for 1300° C.). As discussed above, pre-sulfidation porosity was 83.0%. Post-sulfidation porosity was 82.1%, 74.5%, 70.0%, and 70.0% for process temperatures of 1200° C., 1300° C., 1400° C., and 1475° C., respectively.

The employment of a conventional packed bed reactor allowed for reaction kinetics to be measured if mass transfer limitations were eliminated:

Eliminate external mass transfer limitation:

$$Sh' = \frac{k_c d_p}{D_E} > 30$$

Eliminate intergrain mass transfer limitation:

$$\hat{\sigma} = \frac{V_p}{A_p}\sqrt{\frac{(1-\epsilon)k'' P_{S_2}^{n-1} F_p A_g}{2 D_E F_g V_g}} < 0.1$$

Figure 4E:
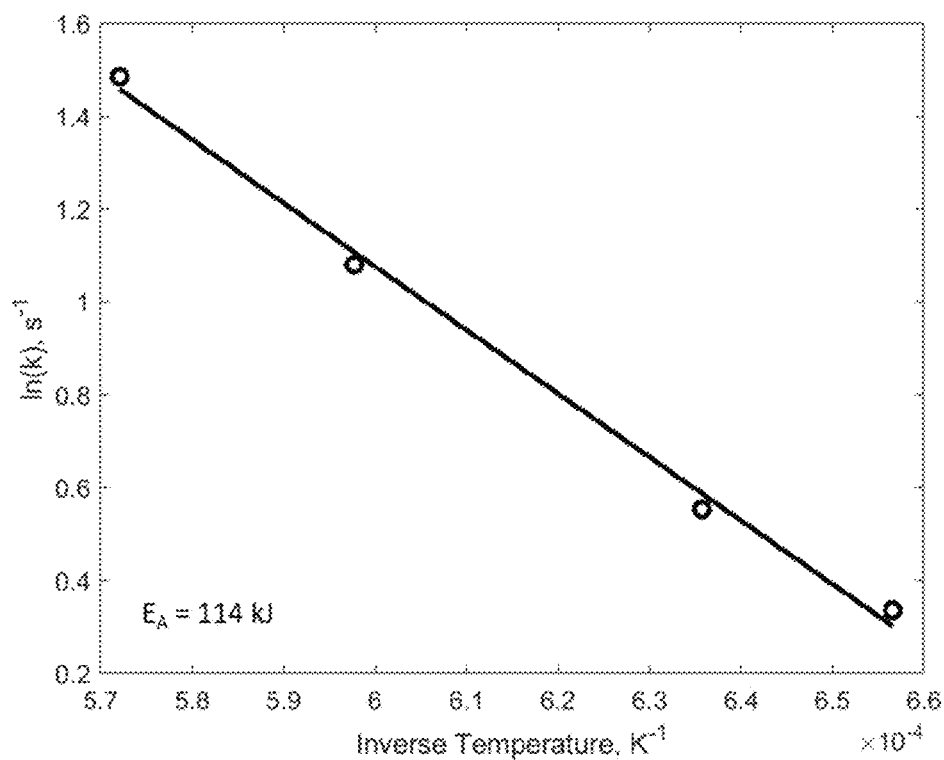
FIG. 4E shows an Arrhenius plot of the natural log the reaction rate constant versus inverse absolute temperature and plot of the spread of reaction rate constant data.

Eliminate intragrain mass transfer limitation:

$$\hat{\sigma}_g = \sqrt{\frac{k'' P_A^{n-1} V_g}{2 D_g A_g}} < 1$$

where:
- Sh'=modified Sherwood number
- $k_c$=convective mass transfer coefficient
- $D_E$=effective sulfur gas diffusivity
- $\hat{\sigma}$=fluid-solid reaction modulus
- $V_p$=pellet volume in reactor bed
- $A_p$=surface area of pellet in reactor bed
- $\epsilon$=bed porosity
- k" reaction rate constant
- $P_{S_2}$=sulfur partial pressure
- n=reaction order
- $F_p$=pellet geometry factor
- $A_g$=surface area of a grain
- $F_g$=grain geometry factor
- $V_g$=volume of a grain
- $\hat{\sigma}_g$=modified Biot number
- $D_g$=effective intragrain diffusivity for sulfur When mass transfer effects are eliminated, the reaction kinetics are successfully measured. As shown in FIGS. 4C-4E, sulfidation of oxides with elemental sulfur is shown to be sufficiently fast for industrial relevance.

IV-III Chemical Reaction Kinetics of Lanthanum Oxide Sulfidation

Analysis of the chemical reaction rate vs temperature and partial pressure of sulfur allows for determination of the reaction kinetics, a necessary requirement for industrial scale reactor design and more often than not excluded from scientific studies of other methods of sulfidation. The reaction is determined to be first order with sulfur partial pressure, as illustrated by the slopes in FIG. 4D, which shows a plot of the natural log of the reaction rate vs the natural log of the partial pressure of sulfur gas. The slope of this plot is equal to the reaction order, the exponent dependence relating sulfidation reaction rate to sulfur partial pressure. Therefore, the following reaction rate law is proposed, where r is the sulfidation rate, k is the temperature-dependent rate constant, and $P_{S2}$ is the partial pressure of sulfur gas the lanthanum oxide is exposed to:

$$r = k P_{S2}$$

The temperature dependence of the rate constant, k, is described by the Arrhenius equation, where A is a constant, T is the absolute temperature, R is the universal gas constant, and $E_A$ is the activation energy of the reaction:

$$k = A e^{-E_A/RT}$$

The activation energy, describing the thermal response of the reaction with temperature and essential to the safe design of a reactor, is depicted as the slope in FIG. 4E, which shows an Arrhenius plot of the natural log the reaction rate constant versus inverse absolute temperature and plot of the spread of reaction rate constant data. The slope of the relation is the activation energy of the reaction. This kinetics data, coupled with an understanding of mass transfer effects and limitations, is a necessary requirement for industrial scale reactor design, and illustrates that the reaction is sufficiently understood to be scaled up to an industrial scale. We believe that this sulfidation reaction of lanthanum oxide to lanthanum sulfide is representative of the kind of reaction expected both in solo sulfidation and a selective sulfidation from a mixed oxide feed.

IV-IV. Valency Control in Sulfide Product

Figure 4F:
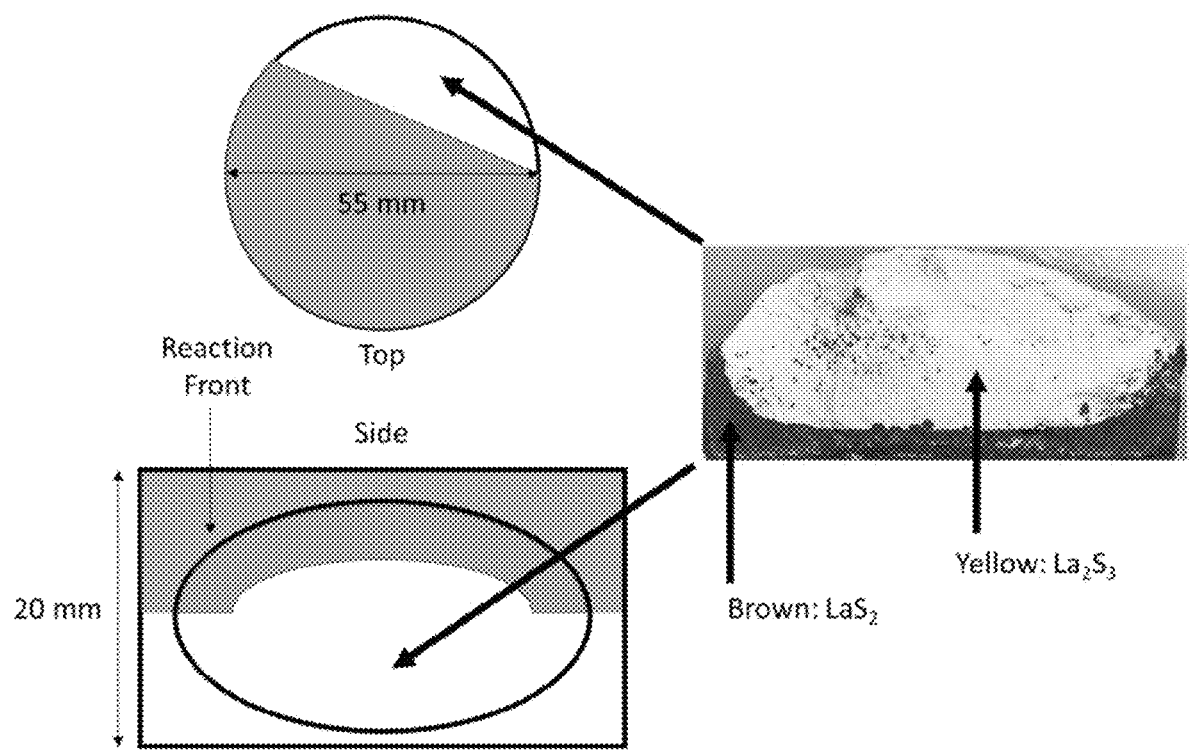
FIG. 4F shows the sulfidation of $La_2S_3$ to $LaS_2$ with elemental sulfur can occur at high sulfur partial pressures (0.9 atm).

While sulfur partial pressure is utilized to control the reaction rate, it can also be leveraged to control the resulting sulfide product valency. In the case of lanthanum sulfide, $La_2S_3$ is the most stable form of the sulfide, and is the sulfidation product when the operating sulfur partial pressure is on the order of 0.1 atm, as for the sulfidations presented in FIG. 4C. Those reactions did not progress past a sulfidation product of $La_2S_3$. However, at higher sulfur partial pressures, higher sulfides can be formed. In another sulfidation experiment of lanthanum oxide, an operating sulfur partial pressure of 0.9 atm was employed. The experiment did not run to completion, with a cross section of the partially-sulfidized product presented in FIG. 4F. FIG. 4F shows the sulfidation of $La_2S_3$ to $LaS_2$ with elemental sulfur can occur at high sulfur partial pressures (0.9 atm). The progression of the reaction front through the lanthanum oxide charge is clearly visible, with an outer, red region collapsing onto an inner yellow region. This is evidence that at high sulfur partial pressures, lanthanum oxide will react through $La_2S_3$ up to the higher sulfide $LaS_2$. This study is evidence that the operating partial pressure of sulfur is not only critical to the reaction rate, but also helps determine the valency of the terminal sulfidation product. Ergo, control of the operating partial pressure for sulfidation allows for control of the resulting sulfide product valency.

IV-V. Extension to Other Oxides

The kinetics measured for lanthanum oxide can be scaled to other oxides of interest. We believe the reaction activation energy to be representative of the sulfidation mechanism of our sulfide source and less dependent on the individual oxide, suggesting that sulfidation of other oxides would show similar activation energies. The reaction temperature of course will be different for other oxides. However, at a temperature a given percentage of the melting point (called a homologues temperature), oxides of different metals behave similarly. We propose that at a given homologous temperature of the oxide, the reaction rate should be fairly consistent. However, different metal oxides often contain a different number of oxygen atoms. We postulate that the sulfidation reaction proceeds one oxygen at a time, so the number of oxygens can be accounted for in the pre-exponential factor. Therefore, we propose the following equation to determine rate constants for different metal oxides other than lanthanum, where $n_{ox}$ is the number of oxygen atoms in the chemical formula for the oxide, $T_H$ is the homologous temperature of the oxide (a fraction of the melting point), and $T_r$ is a reference temperature, in this case the melting temperature of lanthanum oxide.

$$k = \frac{A}{n_{ox}} e^{\frac{-E_A}{RT_H T_r}}$$

IV-VI. Lanthanum Sulfide Synthesis Summary

Lanthanum sulfide at useful, competitive purities was successfully synthesized from industrially-tenable starting materials elemental sulfur and lanthanum oxide at a laboratory scale using an industrially-scalable reactor design. Chemical kinetics were determined, demonstrating that we sufficiently understand our sulfidation chemistry for industrial scale up. By varying the operating sulfur partial pressure, the valency of the resulting sulfidation product can be controlled. The chosen case study of lanthanum sulfide synthesis via lanthanum oxide sulfidation is representative of metal oxide compounds and mixtures of compounds for which sulfidation is useful. The knowledge of sulfidation chemistry acquired through this study helps to inform the invention of novel, useful reactor conditions and controls, as are discussed in the following section s.

V. Control of Sulfidation Reaction via a Carbothermically-Driven Sulfur Reflux Stream The sulfidation of a metal oxide is achievable in a scalable manner using elemental sulfur and has been demonstrated for lanthanum sulfide (see Section IV). While the notion of the industrial scale sulfidation reactor is based on well-known and scientifically characterized packed bed and fluidized bed reactors, novel, non-obvious design changes and techniques for chemical handling, process control, and reagent refluxing and recycling are necessary. These design inventions facilitate previously impossible control of metal oxide sulfidation selectivity and product stoichiometry.

V-I. Mass Transfer Motivations for a Sulfidation Reaction System

In a conventional packed-bed or fluidized-bed reactor, the product of interest is the fluid, whereas the solid present is a chemically-inert catalyst. Therefore, a conventional packed bed or fluidized bed reactor is designed with the goal of having the composition of the fluid stream change over time, with none of the reactant present at the outlet, having all been converted to product. Indeed, packed-bed and fluidized-bed reactors have historically been designed with this in mind—as long as the fluid reactant is depleted and converted to product as economically efficiently as possible, the reactor is operating successfully. However, for a sulfide synthesis reaction in which the important criterion is reaction in the solid with fewer constrains on the composition of the fluid stream, very different design principles are necessary than what has been conventionally employed for packed-bed and fluidized-bed reactors in the past.

For a fluid-solid reaction occurring in a packed-bed or fluidized bed reactor, there are three mass transfer limitations that must be considered: external mass transfer between the bulk fluid and the outer surface of the solid, internal mass transfer within pores of the solid, and diffusional mass transfer within the grains of the solid. A conventional packed-bed or fluidized bed reactor is designed with external mass transfer in mind—as much of the reactant must be used up as possible. Otherwise, what happens inside the catalyst particles is less critical (so long as they are preserved)—while the engineer wants to maximize the effectiveness and efficiency of the catalyst, ultimately the state of the fluid external to the catalyst is most important. In a conventional packed-bed or fluidized bed reactor, the design is mostly governed by external mass transfer limitations and less so by internal mass-transfer limitations due to the ultra-high surface area of the catalyst negating these limitations, with grain diffusion having no bearing on the operation of the reactor due to the high surface area of the catalyst. Meanwhile, a sulfidation reactor has very different transport phenomena restrictions.

For a metal-oxide sulfidation reactor, the most important mass transfer limitations are grain diffusion and internal mass transfer. This difference exists because whereas a solid catalyst surface is designed to remain active with a very high surface area, the outside surface of the metal oxide in a sulfidation reaction is immediately sulfidized, meaning the active surface of the solid oxide is on the inside of the solid, and ever moving farther from what happens in the bulk. Therefore, a sulfidation reaction is likely to face much higher internal and diffusional mass transfer limitations than in a conventional catalytic reactor, due to an ever increasing, essentially inert layer surrounding the solid reactant of interest.

V-II. Chemical Motivation for a Sulfur Recycling System

Whereas the depletion of the reactant in the fluid stream is what a typical fluidized bed reactor is designed to achieve, it is highly detrimental to a metal oxide sulfidation reaction. Because the reaction rate for sulfidation on a metal oxide such as lanthanum oxide is shown to be proportional to the sulfur partial pressure, a depletion of reactant stream has a detrimental effect on the reaction rate. While sulfur is required for the reaction to sulfide and will cause depletion accordingly, the sulfidation reaction also produces sulfur dioxide. For lanthanum oxide sulfidation the reaction is as follows:

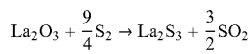

$$La_2O_3 + \frac{9}{4}S_2 \rightarrow La_2S_3 + \frac{3}{2}SO_2$$

For this reaction as written, a third of the sulfur is wasted going to make sulfur dioxide. This depletion can have a huge negative effect on the reaction rate due to the dependence on elemental sulfur. Furthermore, the buildup of sulfur dioxide within the reactor can cause the reaction to slow or halt altogether. Therefore, an internal means to recycle this sulfur dioxide back into reactive elemental sulfur near where the reaction is occurring is a practical necessity.

V-III. Invention of a Carbothermically-Driven Sulfur Reflux System

Three main challenges have been identified for a metal-oxide selective sulfidation reactor at operating at an industrial scale:
- Control of metal-oxide selectivity and product stoichiometry
- Greater internal and diffusional mass-transfer limitations than previously employed packed bed and fluidized bed reactors.
- The necessity of internal sulfur dioxide recycling within the reactor back into elemental sulfur We propose that these challenges can be solved by employment of our carbothermically-driven sulfur reflux system, utilizing a carbon source to aid in product selectivity and reaction rate via control of sulfur dioxide buildup within the reactor.

Carbon can be supplied using a variety of sources. In the case of elemental carbon or carbon monoxide, the following chemical reactions are relevant:

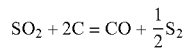
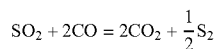
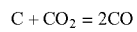

$$SO_2 + 2C = CO + \frac{1}{2}S_2$$
$$SO_2 + 2CO = 2CO_2 + \frac{1}{2}S_2$$
$$C + CO_2 = 2CO$$

Figure 5A:
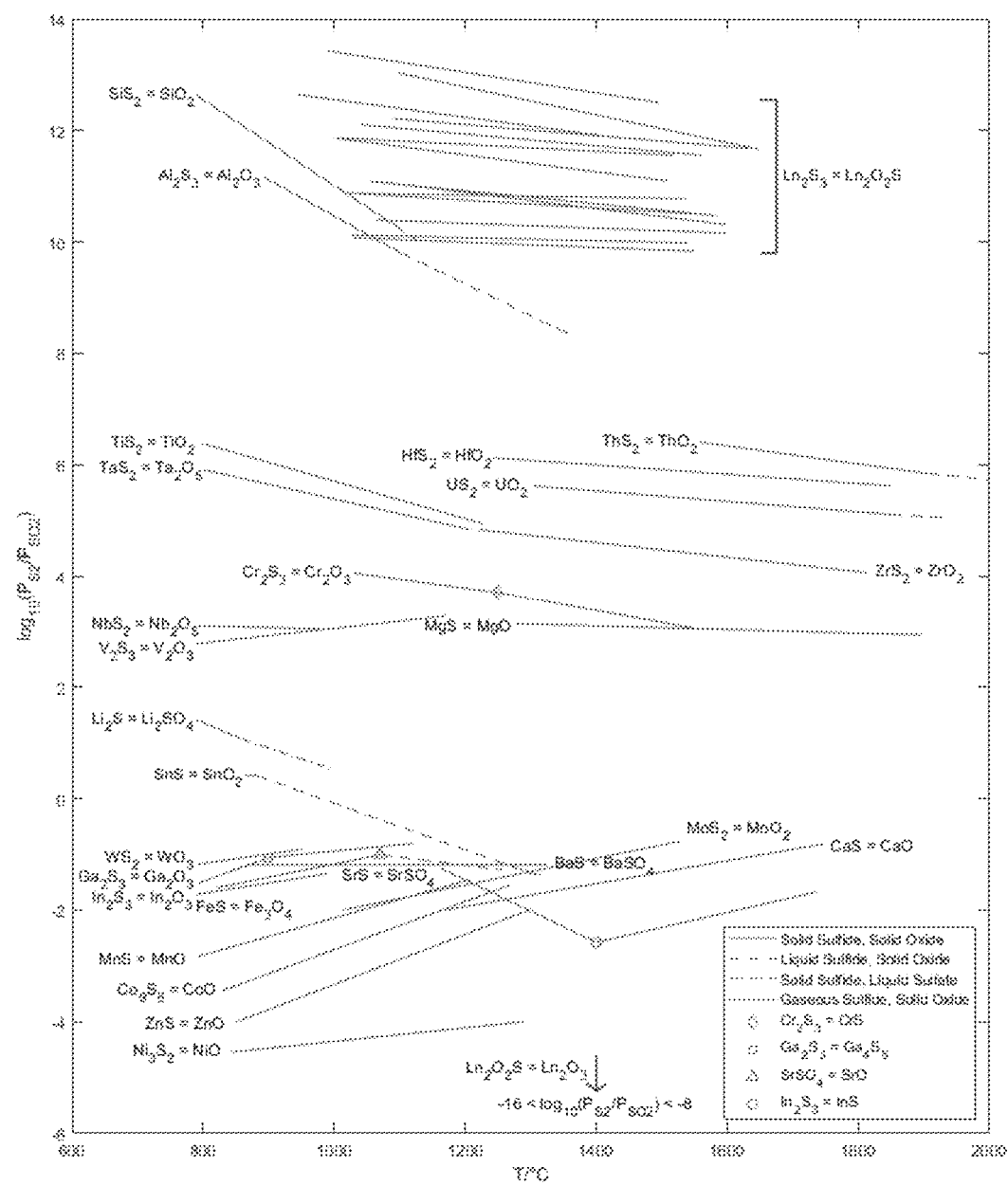
FIG. 5A shows a sulfidation series for selected oxides as a function of temperature.
Figure 5B:
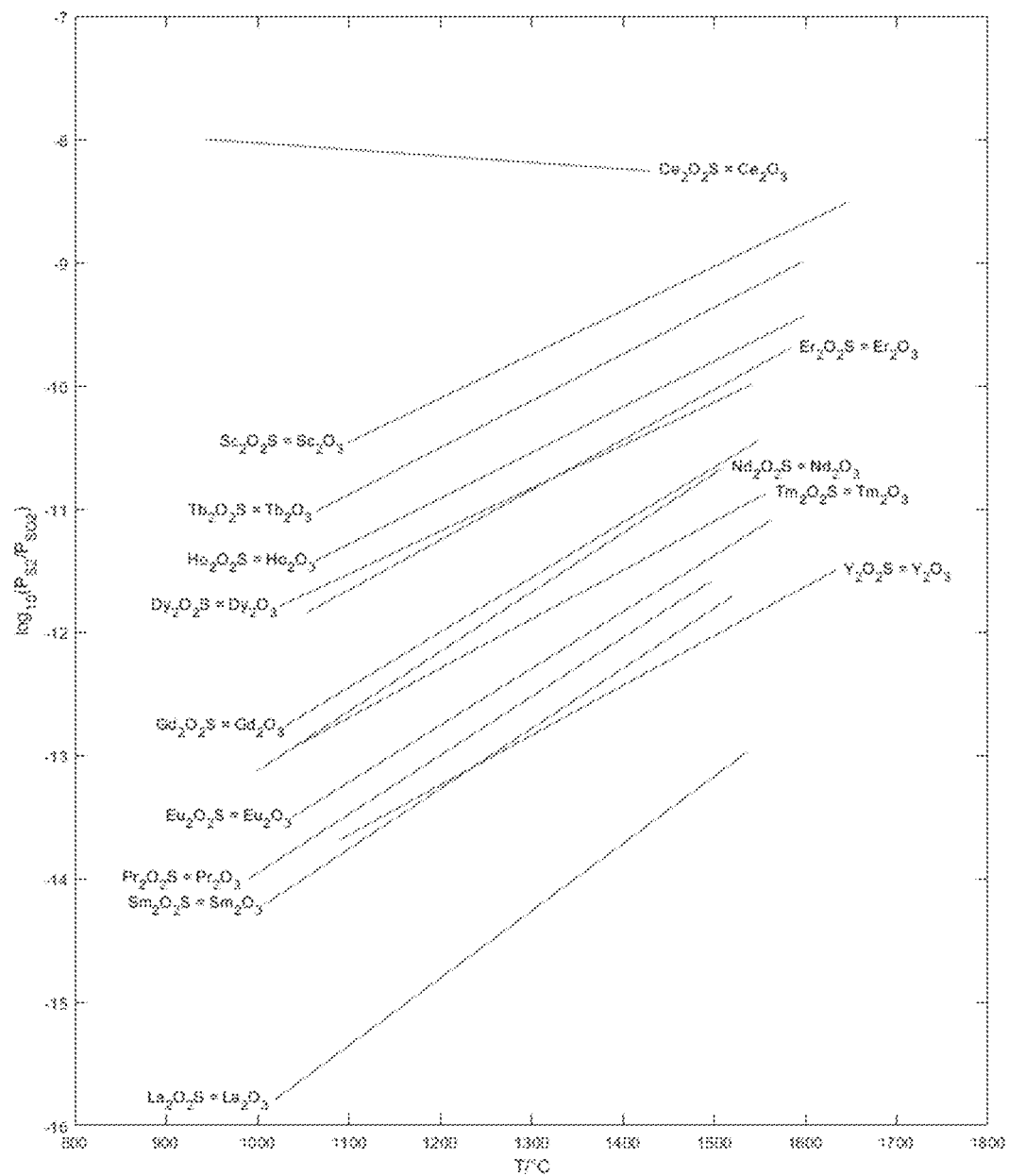
FIG. 5B shows a sulfidation series for selected oxysulfides as a function of temperature.
Figure 5C:
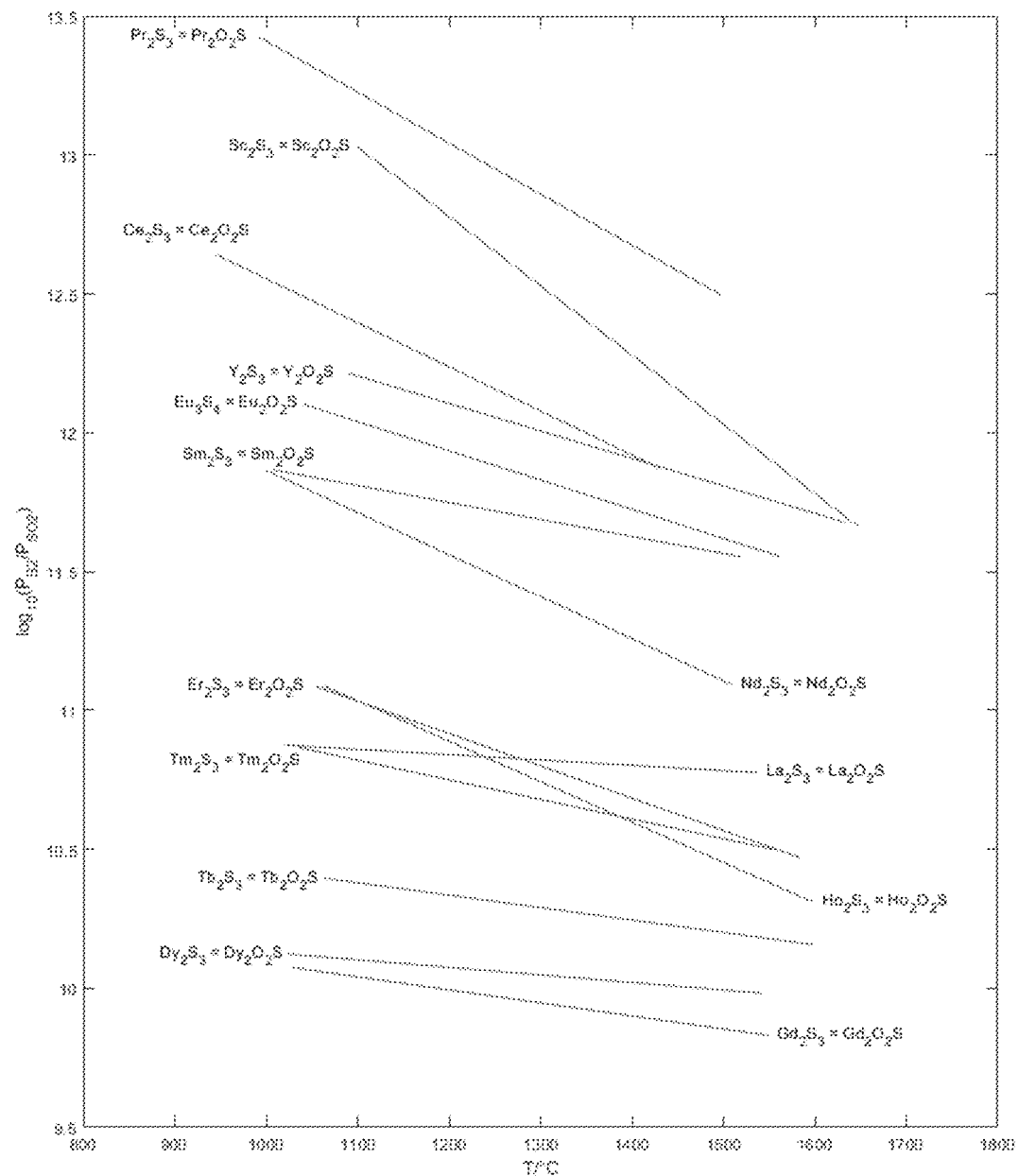
FIG. 5C shows a sulfidation series for selected rare earth sulfides as a function of temperature.
Figure 5D:
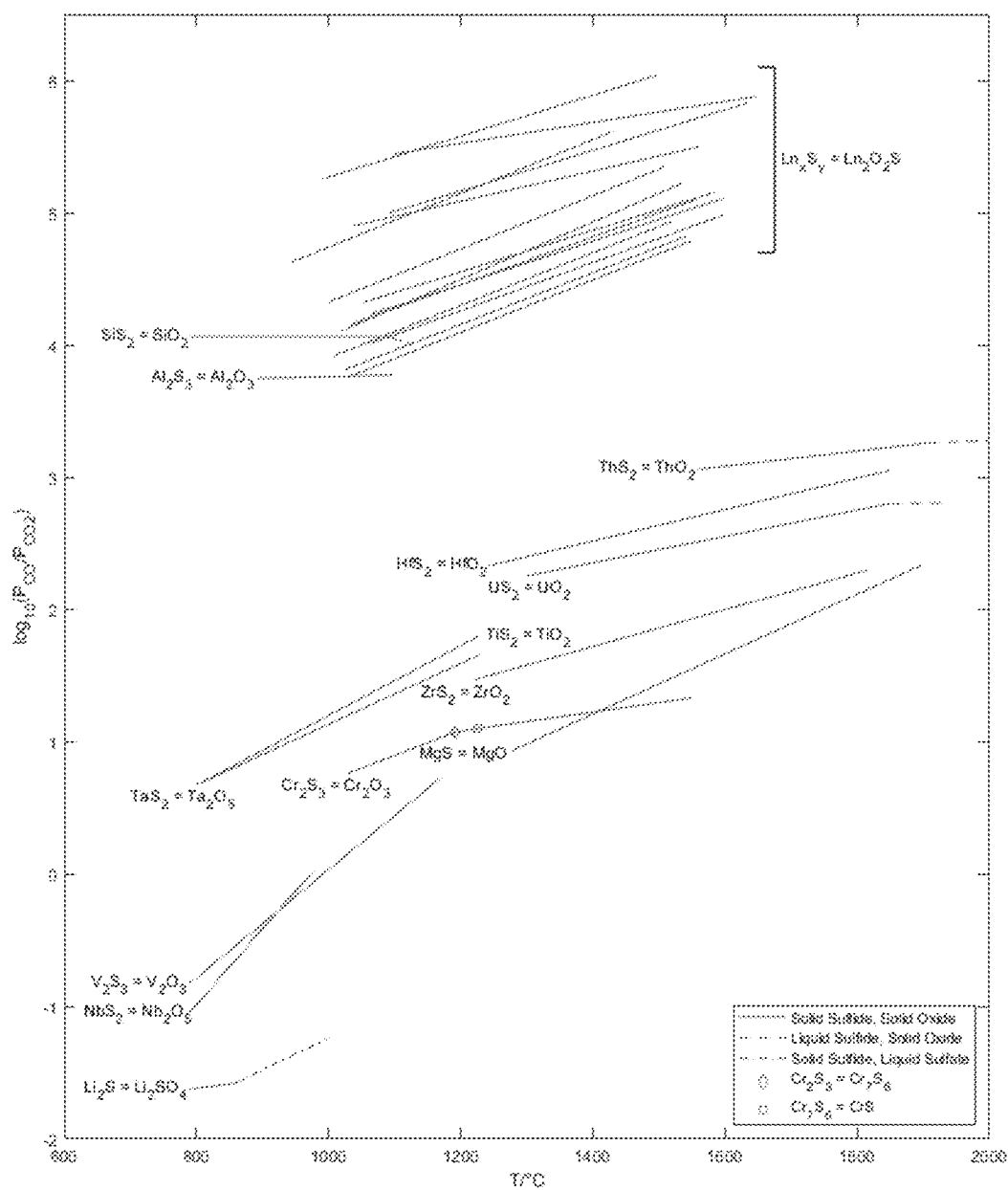
FIG. 5D shows a sulfidation series for selected oxides as a function of temperature in the presence of carbon.
Figure 5E:
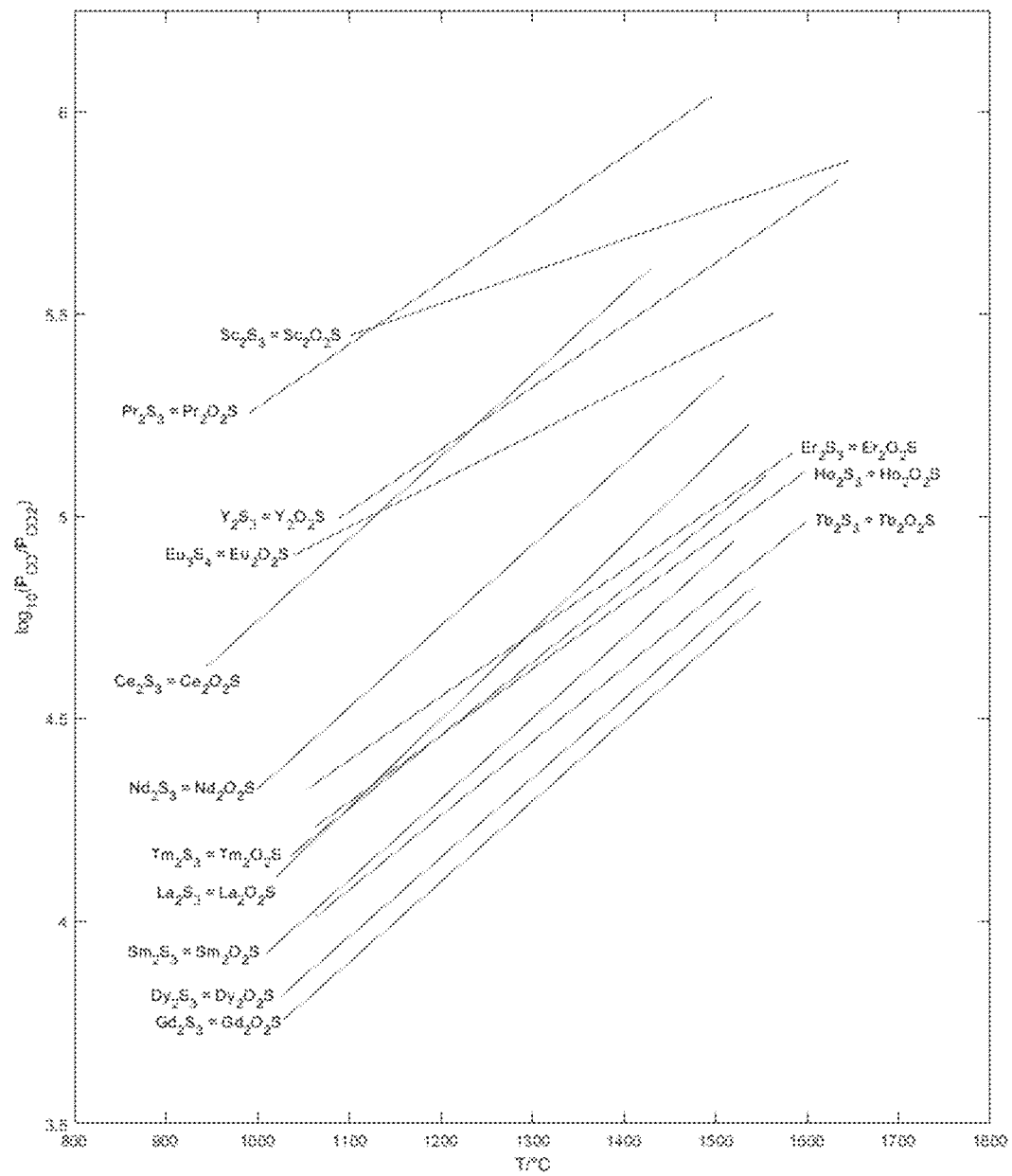
FIG. 5E shows a sulfidation series for selected rare earth sulfides as a function of temperature in the presence of carbon.

From these equations, two main gas ratios can be defined for controlling selectivity within the reactor: the sulfur to sulfur dioxide ratio and the carbon monoxide to carbon dioxide ratio. In general, more difficult to sulfidize oxides require a higher sulfur to sulfur dioxide ratio. For each oxide at a given operating temperature, a minimum sulfur to sulfur dioxide ratio can be defined. When carbon is added to the reactor in some form, a corresponding carbon monoxide to carbon dioxide ratio develops. As in the case of running the reactor carbon free, more difficult to sulfidize oxides require a higher sulfur to sulfur dioxide ratio. However, the sulfur to sulfur dioxide ratio is coupled to the carbon monoxide to carbon dioxide ratio—the existence of an additional carbon monoxide to carbon dioxide ratio affords greater control of the reaction than just the sulfur to sulfur dioxide ratio alone. Presented in FIGS. 5A-5E are critical sulfur to sulfur dioxide ratios for sulfidation of an oxide, as well as critical carbon monoxide to carbon dioxide ratios for sulfidation of an oxide in the presence of carbon. FIG. 5A shows a sulfidation series for selected oxides as a function of temperature. The $P_{S2}/P_{SO2}$ ratio plotted signifies the minimum ratio for the reaction to be thermodynamically favorable. FIG. 5B shows a sulfidation series for selected oxysulfides as a function of temperature. The $P_{S2}/P_{SO2}$ ratio plotted signifies the minimum ratio for the reaction to be thermodynamically favorable. FIG. 5C shows a sulfidation series for selected rare earth sulfides as a function of temperature. The $P_{S2}/P_{SO2}$ ratio plotted signifies the minimum ratio for the reaction to be thermodynamically favorable. FIG. 5D shows a sulfidation series for selected oxides as a function of temperature in the presence of carbon. The $P_{CO}/P_{CO2}$ ratio plotted signifies the minimum ratio for the reaction to be thermodynamically favorable. FIG. 5E shows a sulfidation series for selected rare earth sulfides as a function of temperature in the presence of carbon. The $P_{CO}/P_{CO2}$ ratio plotted signifies the minimum ratio for the reaction to be thermodynamically favorable.

As shown in FIGS. 5A-5C, rare earth oxysulfides are easy to form from rare earth oxides via sulfidation with elemental sulfur, as shown by the very low minimum sulfur to sulfur dioxide ratios on the order of $10^{-16}$ to $10^{-8}$. Transition metal sulfides such as those of cobalt and nickel are also easy to form via direct sulfidation of transition metal oxides, with minimum sulfur to sulfur dioxide ratios typically between $10^{-4}$ to $10^{4}$. However, refractory metal sulfides such as those of zirconium and hafnium are relatively difficult to form from their refractory oxides, requiring minimum sulfur to sulfur dioxide ratios on the order of $10^{4}$ to $10^{8}$. Rare earth sulfides are very difficult to form from their oxysulfides, necessitating minimum sulfur to sulfur dioxide ratios of $10^{10}$ to $10^{14}$. From a processing standpoint, the higher the minimum sulfur to sulfur dioxide ratio, the larger the inflow and outflow of gas required to sufficiently flush the system of sulfur dioxide as it is produced from the sulfidation reaction. Sulfur to sulfur dioxide ratios up to $10^{4}$ are fairly easy to achieve with sulfur alone, supporting maximum gas residence times within the reactor on the order of minutes or longer. However, higher minimum sulfur to sulfur dioxide ratios such as those required for rare earth or refractory oxide sulfidation require prohibitively short gas residence times to keep sulfur dioxide levels sufficiently low for sulfidation to occur, or some other method to remove sulfur dioxide products from the system such as the carbothermically-driven sulfur reflux system we propose herein.

The addition of carbon species during the reaction serves as a way to remove sulfur dioxide from the reactor, refluxing it back into sulfur while producing carbon monoxide or dioxide. By meeting a critical carbon monoxide to carbon dioxide ratio as shown in FIGS. 5D-5E, sulfur dioxide is being converted back into elemental sulfur in large enough amounts to minimize buildup of sulfur dioxide in the reactor. Many of the transition metal species do not have a minimum carbon monoxide to carbon dioxide ratio for the sulfidation to occur—for easy to sulfidize oxides, the presence of carbon monoxide or dioxide in any ratio ensures the sulfidation of the oxide.

Therefore, whether or not the addition of carbon species to the reactor is beneficial depends strongly on the nature of the sulfidation reaction to be undertaken. For selective sulfidation of difficult to separate transition metal oxides such as cobalt oxide and nickel oxide, the presence of carbon in the reactor would ensure that the sulfidation was not selective; indeed, the addition of carbon is not a guaranteed aid in sulfidation selectivity. Meanwhile, for more stable oxides requiring aggressive sulfur to sulfur dioxide ratios for sulfidation to occur, the controlled addition or presence to carbon in the reactor can be used to fine-tune selective sulfidation. An example of the role of carbon in residence times is discussed in greater detail in Section VI and FIGS. 13A-13Z, 14A-14Z, 15A-15Z, and 16A-16B, outlining considerations for operating conditions, where the control of carbon content in conjunction with sulfur flowrates is shown to provide a high degree of selectivity in sulfidation.

As stated previously, unlike in carbochlorination, carbon is not actually required for sulfidation to occur. The addition of carbon species serves as a way to preferentially remove sulfur dioxide from the gas stream and regenerate the sulfur reactant. In principle, any sulfur dioxide getting material could be employed. However, the use of carbon and control of the carbon monoxide to carbon dioxide ratio ensures that sulfur dioxide depletion can be accomplished in a controllable way, paving the way for selective sulfidation of difficult to separate oxides, such as those of the rare earths.

V-IV. When Carbon is or is not an Oxide Reductant

As with carbochlorination, the role of carbon as a reductant, or something else entirely, is strongly dependent on the operating temperature and chemistry. At very high operating temperatures or with unstable oxides, carbon or carbon gasses can reduce metal oxides into the base metal. In this case, the chlorine in carbochlorination or sulfur in selective sulfidation is reacting with a pure metal, instead of a metal oxide. When the goal is to produce a chloride or sulfide compound, this processing route is acceptable and can result in very high rates of chlorination or sulfidation. Meanwhile, if the processing goal is to selectively react a particular component, bulk chlorination or sulfidation may be less desirable.

However, the behavior of carbon in selective sulfidation and carbochlorination are very different in operating regimes where carbon or carbon-oxygen gasses do not reduce the oxide. In the case of carbochlorination, carbon catalyzes and is consumed in the conversion of chlorine gas to phosgene gas [26-28]. Phosgene gas then serves as the primary chlorination agent. Meanwhile, in selective sulfidation elemental sulfur remains the primary sulfidizing agent. The carbon serves as a refluxing agent to regenerate product sulfur dioxide back into elemental sulfur, not as a reaction catalyst. While there is some evidence to suggest that oxysulfide intermediates may aid in catalyzing sulfur dioxide break down back into sulfur in the presence of carbon monoxide [48-51], the transient and reactive nature of the oxysulfides in selective sulfidation make this notion difficult to prove. Furthermore, oxysulfide catalysts are engineered materials, designed to have a high active surface and to facilitate catalysis. Meanwhile, ore or concentrate materials are not engineered in such a way, putting the notion of their role as a catalyst into question.

V-V. Estimating the Effect of a Carbothermically-Driven Sulfur Reflux System on Gas Composition within a Sulfidation Reactor The actual effect on sulfidation or selectivity from the carbothermically-driven sulfur reflux system is impossible to calculate or intuitively determine due to the complicated interplay between reaction thermodynamics and reaction kinetics of the mix of carbon, oxygen, and sulfur gas species involved. Additionally, the interactions between unknown and difficult to determine sulfidation reaction oxide-sulfide intermediates and reactor gasses further erodes the basis for prediction or description of our carbothermically-driven reflux system. Nevertheless, we can attempt to estimate the role of a carbothermic reflux system on the reaction of sulfur dioxide back into elemental sulfur. The general reaction can be described as:

$$M_xO_y + \frac{3y}{2}S_2 = M_xS_y + \frac{y}{2}SO_2$$

To sulfidize stable oxides, the $SO_2$ concentration generally needs to be low within the reactor. In this case, carbon can serve as a chemically-driven sulfur refluxing agent. We postulate that there are two chemical methods in which sulfur dioxide is removed from within the reactor: reaction with carbon species to form elemental sulfur and reaction with sulfur to form disulfur monoxide.

$$SO_2 + 2C = 2CO + \frac{1}{2}S_2$$

$$SO_2 + \frac{3}{2}S_2 = 2S_2O$$

While we observe kinetics of sulfidation to be fairly rapid, we still expect a gas-solid reaction to be slower than a gas-gas reaction, such as sulfidation of sulfur dioxide to form disulfur monoxide. Therefore, we believe the gas species within the reactor to be fairly close to thermodynamic equilibrium. Again, the unknown nature and behavior of sulfidation intermediates make this equilibrium impossible to analytically determine. Thermodynamics would also suggest a reaction of sulfur with carbon to form carbon disulfide.

$$C+S_2=CS_2$$

$CS_2$ suppression is desirable because it is a non-selective sulfidizing agent, similar to the behavior of phosgene in carbochlorination as discussed herein.

Figure 5F:
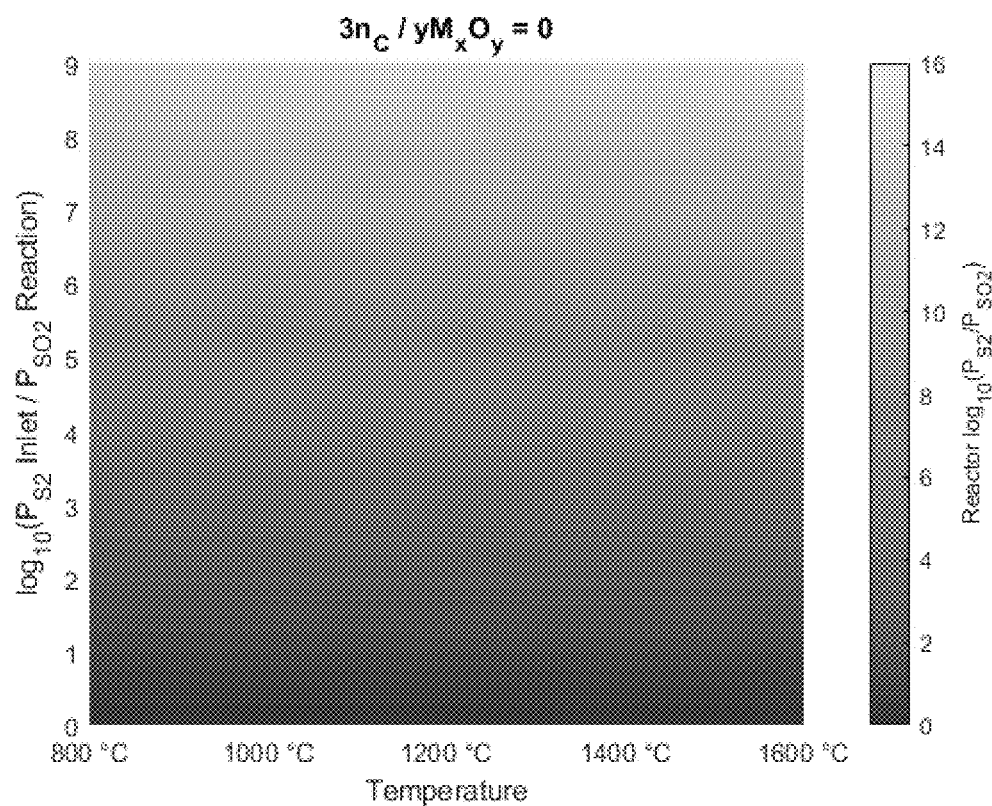
FIG. 5F shows the effect of carbothermically-driven sulfur reflux and disulfur monoxide reactions in the absence of metal oxide or sulfide effects on reactor sulfur to sulfur dioxide ratio.
Figure 5G:
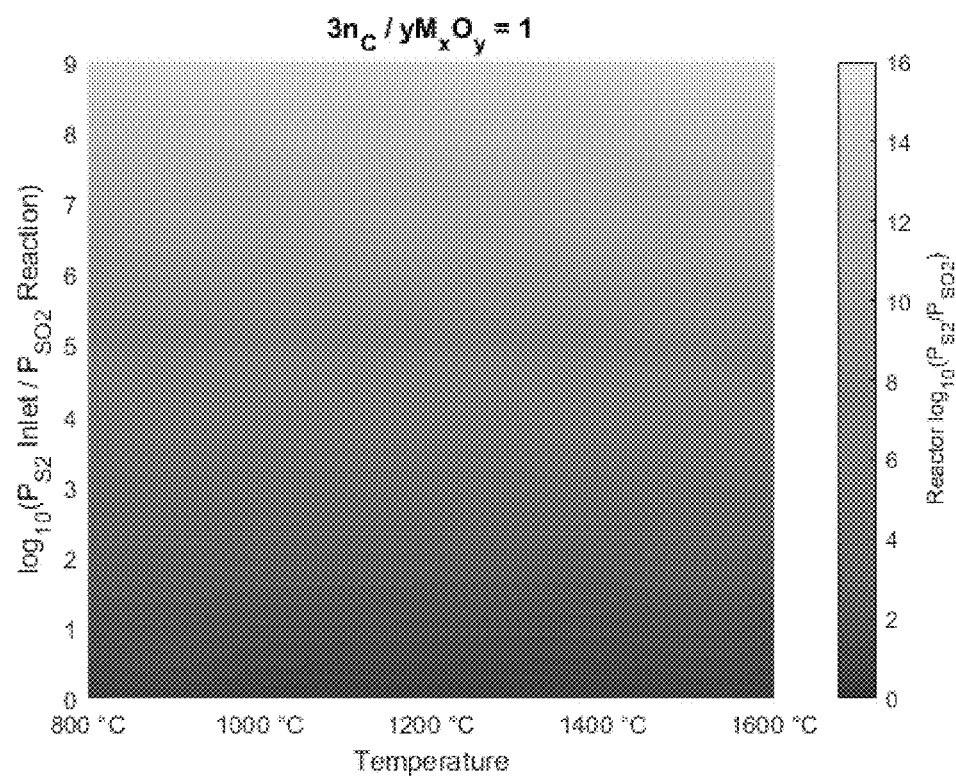
FIG. 5G shows the effect of carbothermically-driven sulfur reflux and disulfur monoxide reactions in the absence of metal oxide or sulfide effects on reactor sulfur to sulfur dioxide ratio.
Figure 5H:
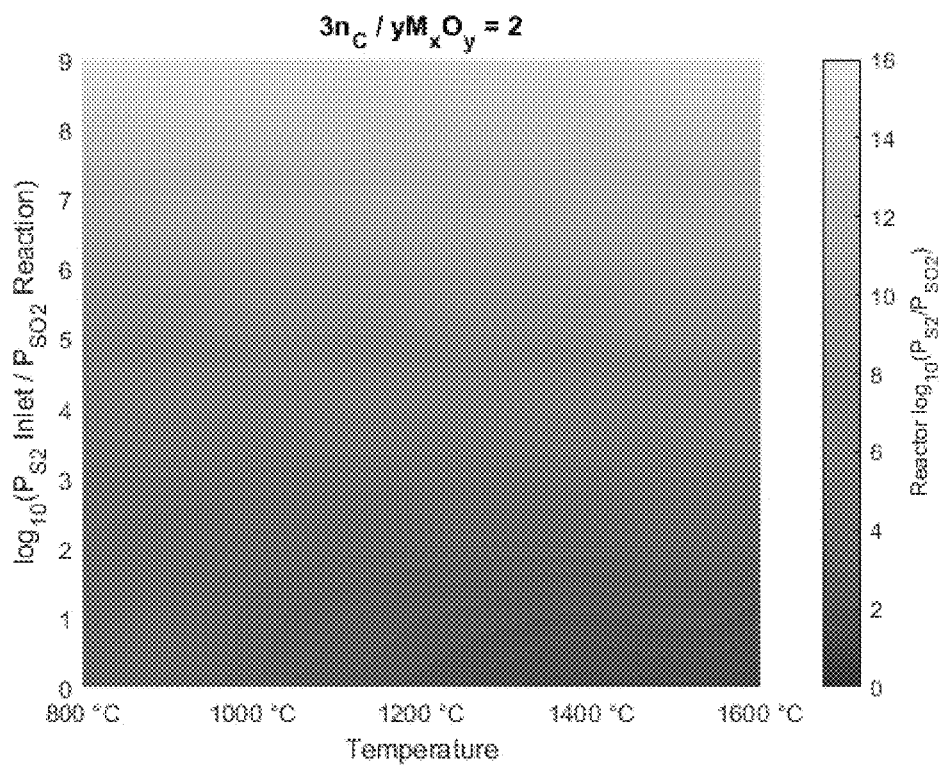
FIG. 5H shows the effect of carbothermically-driven sulfur reflux and disulfur monoxide reactions in the absence of metal oxide or sulfide effects on reactor sulfur to sulfur dioxide ratio.
Figure 5I:
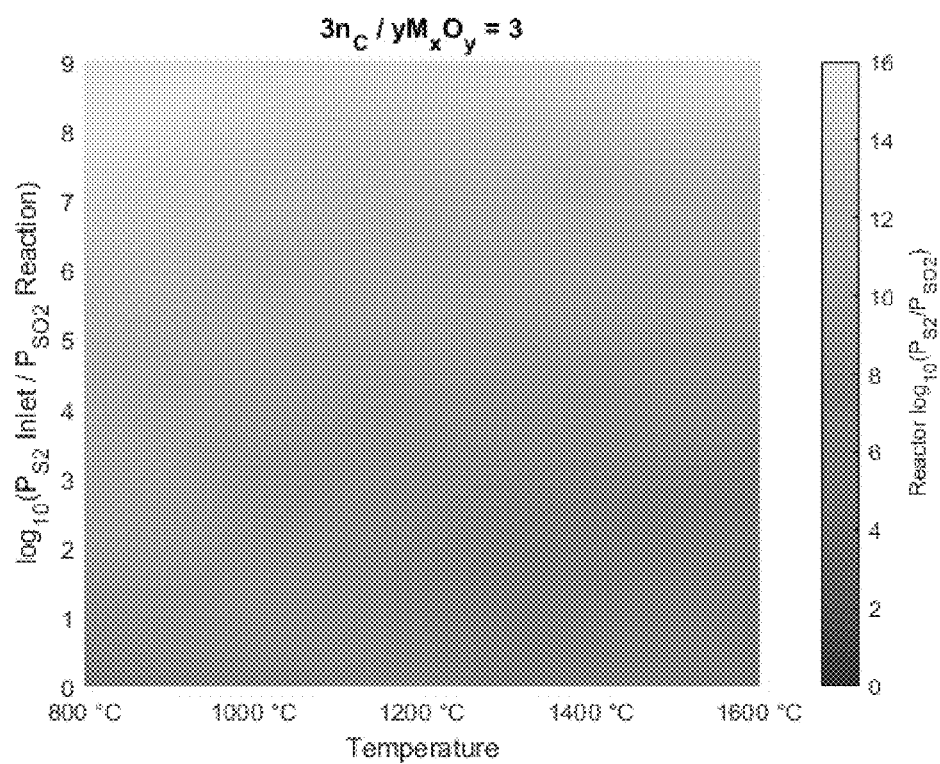
FIG. 5I shows the effect of carbothermically-driven sulfur reflux and disulfur monoxide reactions in the absence of metal oxide or sulfide effects on reactor sulfur to sulfur dioxide ratio.
Figure 5J:
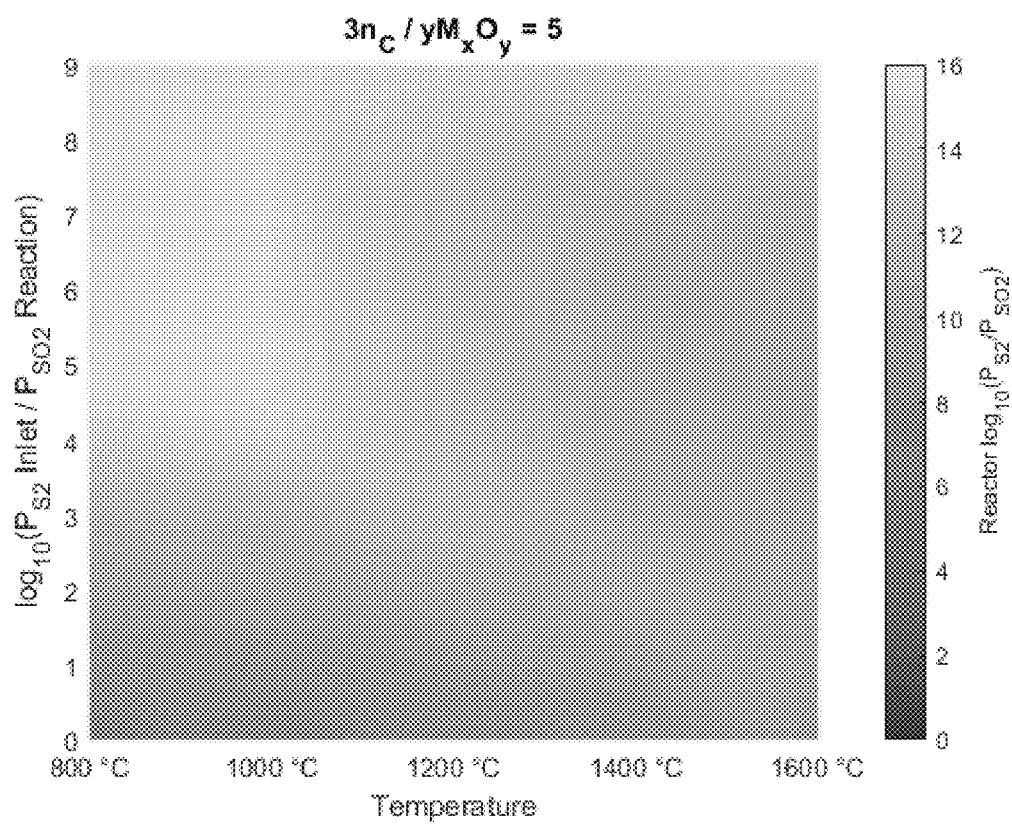
FIG. 5J shows the effect of carbothermically-driven sulfur reflux and disulfur monoxide reactions in the absence of metal oxide or sulfide effects on reactor sulfur to sulfur dioxide ratio.
Figure 5K:
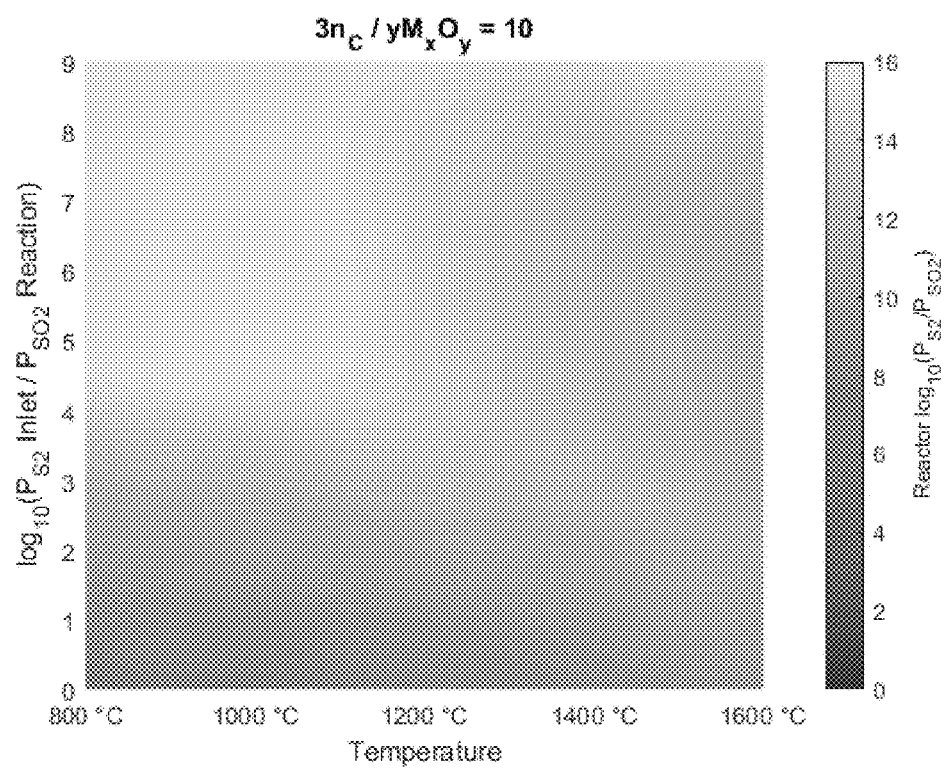
FIG. 5K shows the effect of carbothermically-driven sulfur reflux and disulfur monoxide reactions in the absence of metal oxide or sulfide effects on reactor sulfur to sulfur dioxide ratio.

This reaction, like sulfidation of the oxide, is also a gas-solid reaction. However, we believe this reaction to be kinetically limited due to the minimum degradation of the carbon components observed during the lanthanum oxide sulfidation tests. With these assumptions in mind, the actual sulfur to sulfur dioxide ratio in the reactor can be estimated as a function of the sulfur inlet and sulfur dioxide production rates, again ignoring the likely presence of unknown oxide-sulfide effects. FIGS. 5F-5K present the estimated reactor sulfur to sulfur dioxide ratios as a function of sulfur inlet, sulfur dioxide production rate, temperature and carbon to oxide feed ratio. FIG. 5F shows the effect of carbothermically-driven sulfur reflux and disulfur monoxide reactions in the absence of metal oxide or sulfide effects on reactor sulfur to sulfur dioxide ratio. FIG. 5G shows the effect of carbothermically-driven sulfur reflux and disulfur monoxide reactions in the absence of metal oxide or sulfide effects on reactor sulfur to sulfur dioxide ratio. FIG. 5H shows the effect of carbothermically-driven sulfur reflux and disulfur monoxide reactions in the absence of metal oxide or sulfide effects on reactor sulfur to sulfur dioxide ratio. FIG. 5I shows the effect of carbothermically-driven sulfur reflux and disulfur monoxide reactions in the absence of metal oxide or sulfide effects on reactor sulfur to sulfur dioxide ratio. FIG. 5J shows the effect of carbothermically-driven sulfur reflux and disulfur monoxide reactions in the absence of metal oxide or sulfide effects on reactor sulfur to sulfur dioxide ratio. FIG. 5K shows the effect of carbothermically-driven sulfur reflux and disulfur monoxide reactions in the absence of metal oxide or sulfide effects on reactor sulfur to sulfur dioxide ratio.

With an increasing carbon to metal oxide feed ratio, more carbon is present in the reactor, increasing the effect of the carbothermically-driven sulfur reflux rate. This trend is observed in the estimates shown across FIGS. 5F-5K. With no carbon in the reactor, the only chemical depletion method of sulfur dioxide is the reaction with sulfur to form disulfur monoxide. However, as carbon is added, more sulfur dioxide is reacted back into sulfur, having a large effect on the reactor steady-state gas stream composition. Even under conditions where sulfur and sulfur dioxide are entering the reactor in approximately equal amounts, with carbon to oxide molar feed ratios increasing up to 10, the actual sulfur to sulfur dioxide ratio is on the order of $10^8$-$10^{10}$. This allows for reactions that would have otherwise required slow reaction rates in order to avoid the buildup of product gasses to be ran much faster. Furthermore, while a 10-to-one molar feed ratio of carbon to oxide may seem like a large amount of carbon, on a mass basis for a rare earth oxide at 10 to 1 molar feed corresponds to 0.3 kg of carbon per kg of rare earth oxide, suggesting that these levels of carbon addition are well within the realm of practicality.

Figure 5L:
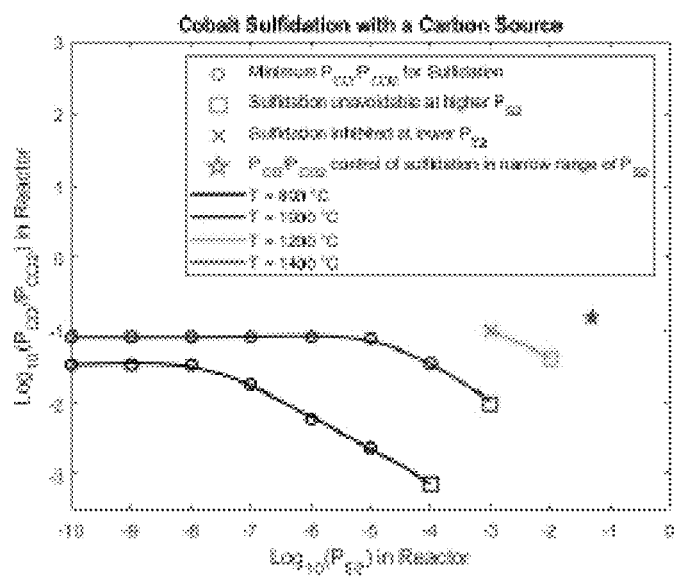
FIG. 5L shows an example of cobalt sulfidation with a carbon source.
Figure 5M:
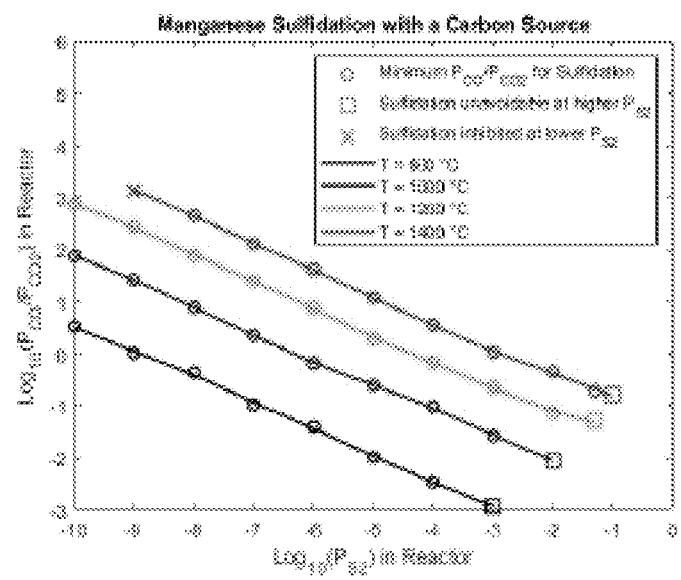
FIG. 5M shows an example of manganese sulfidation with a carbon source.
Figure 5N:
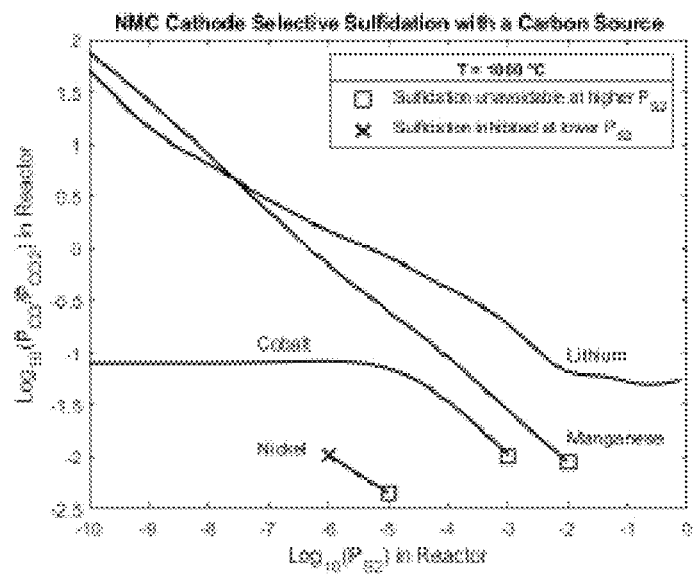
FIG. 5N shows an example of NMC cathode selective sulfidation with a carbon source.

Thus, control of the $CO/CO_2$ ratio can be used to tune sulfidation selectivity via carbothermically-driven sulfur reflux. FIG. 5L shows an example of cobalt sulfidation with a carbon source. FIG. 5M shows an example of manganese sulfidation with a carbon source. FIG. 5N shows an example of NMC cathode selective sulfidation with a carbon source.

V-IV. Summary of Carbothermic Sulfur Reflux System Considerations

We believe that at an industrially relevant operating scale, the following challenges to selective sulfidation can be solved with our carbothermically-driven reflux system:
  Control of metal-oxide selectivity and product stoichiometry
  Greater internal and diffusional mass-transfer limitations than previously employed packed bed and fluidized bed reactors.
  The necessity of internal sulfur dioxide recycling within the reactor back into elemental sulfur We show that a critical sulfur to sulfur dioxide ratio within the reactor is necessary in order for sulfidation to occur. The reactor conditions can be shifted favorably with regard to the critical sulfur to sulfur dioxide ratio through the addition of a carbon source. Unlike in carbochlorination where the carbon facilitates the reaction with the anion-exchange gas (chlorine) to produce a stronger chlorinating agent (phosgene), carbon in selective sulfidation serves to chemically reflux product sulfur dioxide back into sulfur, with sulfur remaining as the active sulfidizing agent. Even with the addition of carbon in masses less than the oxide, huge advances in sustainable reaction rate can be achieved while tuning the reactor's selectivity.

VI. Operating Conditions for Selective Sulfidation

To execute selective sulfidation, care towards selection of the operating conditions is required. Sulfidation of oxides via elemental sulfur requires high temperatures to ensure sufficiently fast reaction kinetics and mass transfer. However, performing the sulfidation at too high of temperature causes aggressive sintering of the solid oxide feed material, significantly slowing mass transfer and greatly increasing reaction times. Furthermore, sulfur gas is a complicated mixture of different sulfur species, necessitating particular operating pressures and temperatures. In the following section, operating parameters are approached in four parts: conditions necessitate by the behavior of the elemental sulfur reactant, conditions necessitated by the behavior of the reactant oxide, conditions necessitated by thermodynamic spontaneity, and conditions necessitated by the accumulation of sulfur dioxide within the reactor.

VI-I. Operating Conditions Based on Elemental Sulfur

Figure 6A:
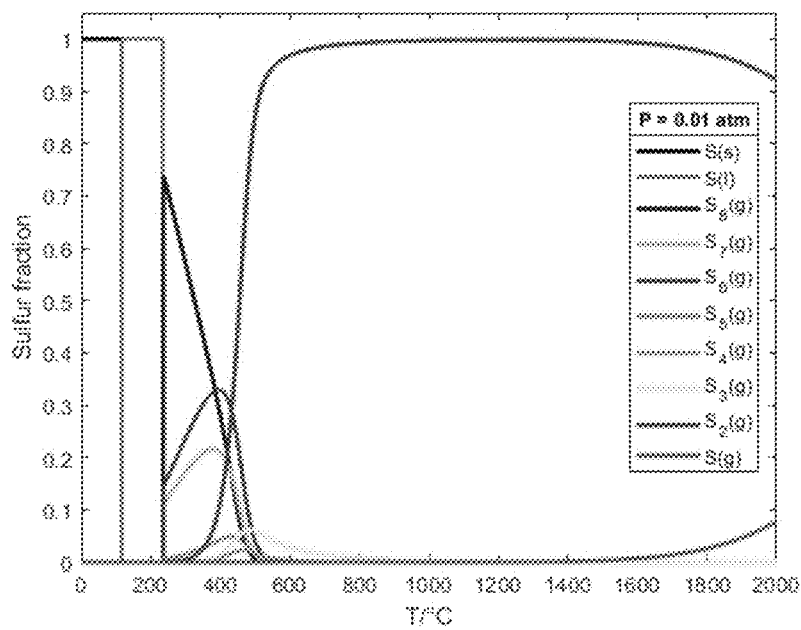
FIG. 6A shows the relative abundance of sulfur species as a function of temperature at a pressure of 0.01 atmospheres.
Figure 6B:
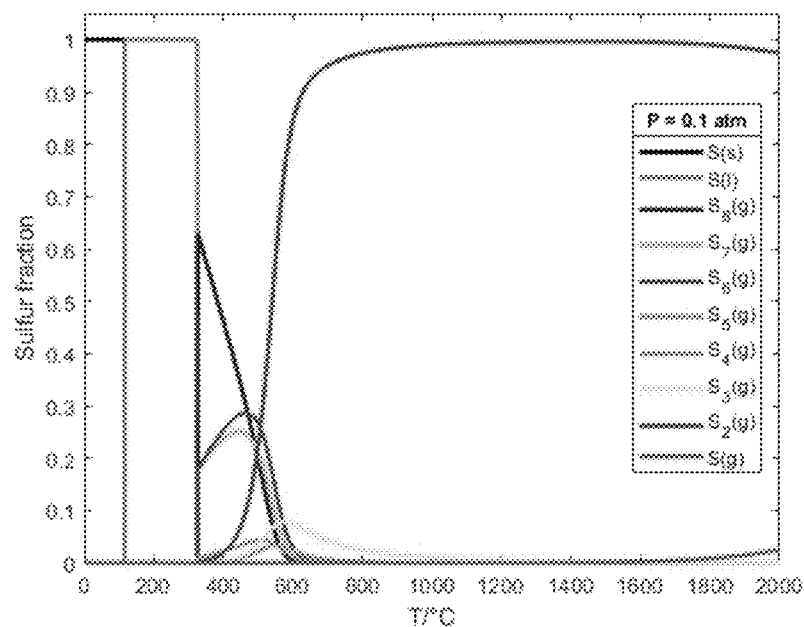
FIG. 6B shows the relative abundance of sulfur species as a function of temperature at a pressure of 0.1 atmospheres.
Figure 6C:
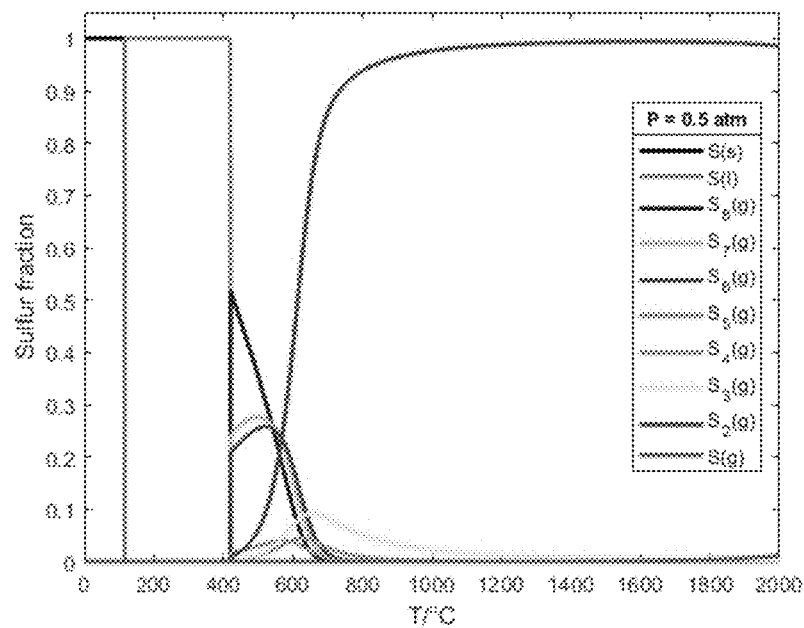
FIG. 6C shows the relative abundance of sulfur species as a function of temperature at a pressure of 0.5 atmospheres.
Figure 6D:
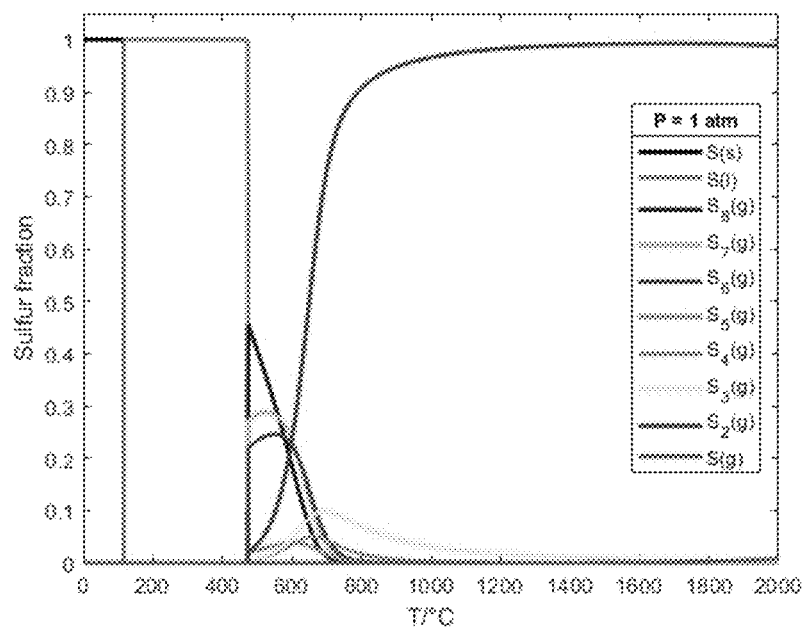
FIG. 6D shows the relative abundance of sulfur species as a function of temperature at a pressure of 1 atmosphere.
Figure 6E:
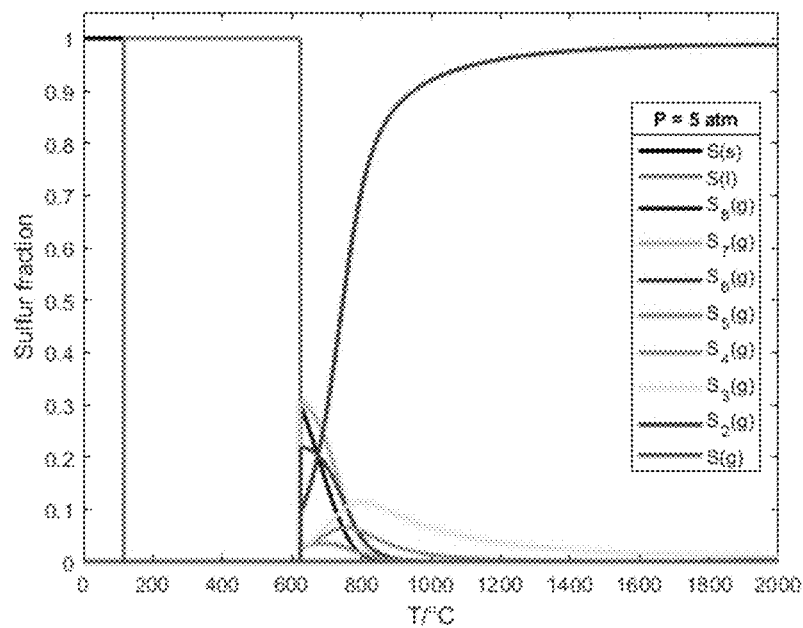
FIG. 6E shows the relative abundance of sulfur species as a function of temperature at a pressure of 5 atmospheres.
Figure 6F:
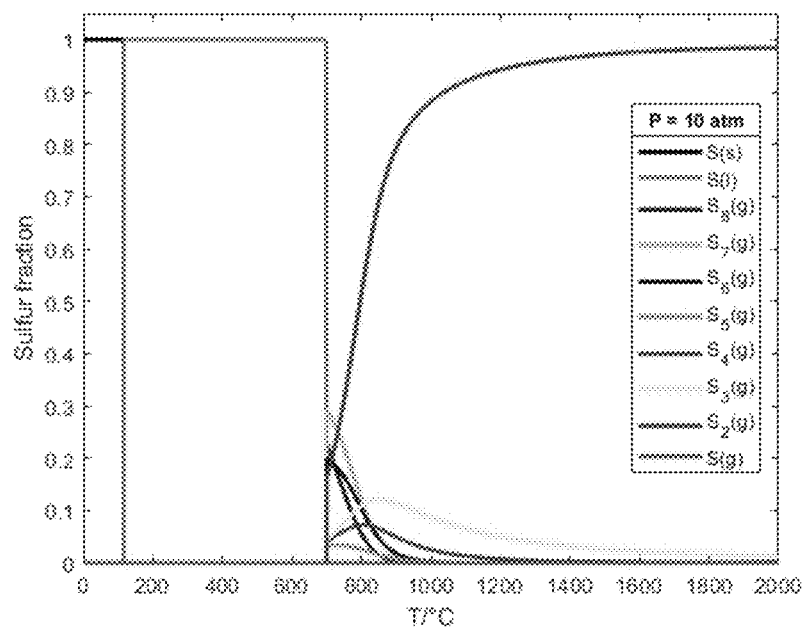
FIG. 6F shows the relative abundance of sulfur species as a function of temperature at a pressure of 10 atmospheres.
Figure 6G:
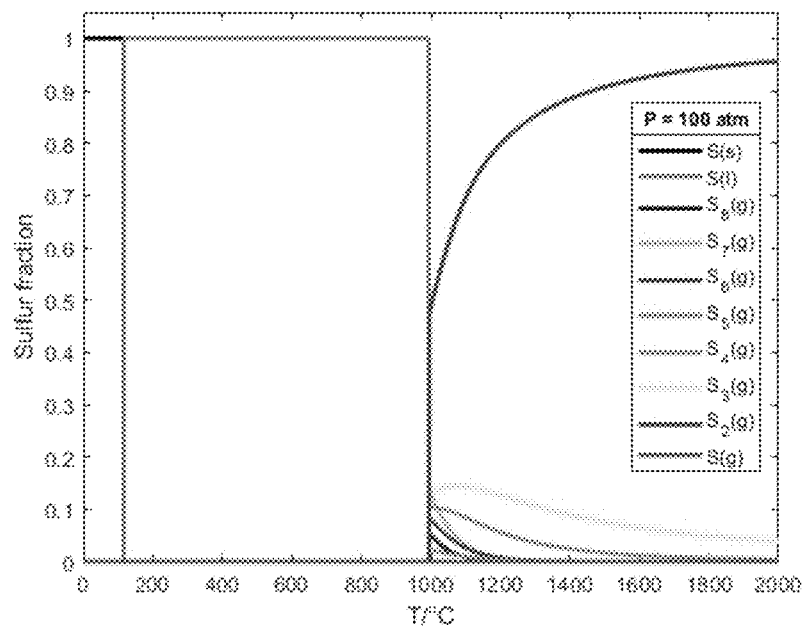
FIG. 6G shows the relative abundance of sulfur species as a function of temperature at a pressure of 100 atmospheres.

In the gas phase, sulfur is a complicated mixture of different sulfur species, ranging from small molecules of monatomic and diatomic sulfur up to large chains and rings containing up to eight atoms of sulfur each. The relative distribution of these species is strongly dependent on operating temperature and pressure. FIGS. 6A-6G present the relative abundance of different sulfur species as a function of temperature at different pressures. FIG. 6A shows the relative abundance of sulfur species as a function of temperature at a pressure of 0.01 atmospheres. FIG. 6B shows the relative abundance of sulfur species as a function of temperature at a pressure of 0.1 atmospheres. FIG. 6C shows the relative abundance of sulfur species as a function of temperature at a pressure of 0.5 atmospheres. FIG. 6D shows the relative abundance of sulfur species as a function of temperature at a pressure of 1 atmosphere. FIG. 6E shows the relative abundance of sulfur species as a function of temperature at a pressure of 5 atmospheres. FIG. 6F shows the relative abundance of sulfur species as a function of temperature at a pressure of 10 atmospheres. FIG. 6G shows the relative abundance of sulfur species as a function of temperature at a pressure of 100 atmospheres. Generally, in the case of sulfur, smaller molecules of sulfur have a higher relative abundance as temperature increases at a given pressure and pressure decreases at a given temperature.

Figure 6H:
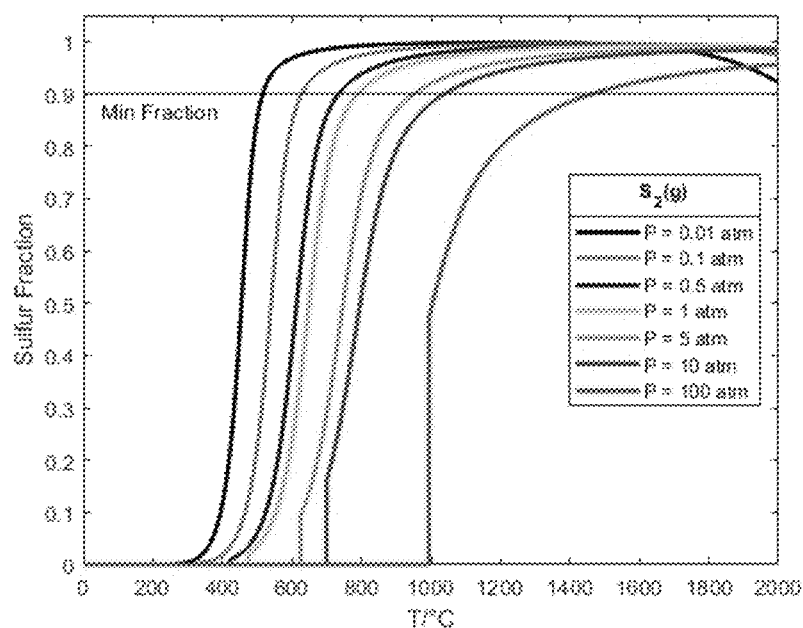
FIG. 6H shows the relative abundance of diatomic sulfur as a function of temperature at different pressures.

From a thermodynamic standpoint, the spontaneity of the sulfidation reaction is fairly resistant to the number of sulfur atoms in the reacting molecule. Indeed, less obvious however is the role the particular sulfur molecule on reaction kinetics. For sulfidation of a material engineered to have a high porosity and high surface area such as a catalyst, both large and small molecules of sulfur can reach and subsequently react with surface of the material. Meanwhile, for a natural material such as a metal concentrate, the surface area and porosity will likely be far less than that of an engineered catalyst. Lower surface areas and porosity cause mass transfer to be slower for small molecules and almost impossible for large molecules at reasonable operating time scales. Therefore, for selective sulfidation in a metal concentrate, operating conditions are necessary in which small molecules of sulfur have the highest relative abundance. For our selective sulfidation process, we generally require that the predominant sulfur species is diatomic sulfur or smaller. The relative ratio of diatomic sulfur to other species as a function of temperature and pressure is plotted in FIG. 6H.

In practice, at an operating pressure of about 1 atmosphere of total pressure, the minimum sulfur temperature to have a large majority of small sulfur species, and subsequent fast sulfur diffusion through the less porous natural concentrate, is about 790° C. At higher operating pressures, not uncommon due to pressure drops through the reactor and gas handling piping, the minimum operating temperature for rapid sulfur diffusion is even higher.

Thus, reaction kinetics suggest a sulfidation temperature range for the reaction to remain sufficiently fast. Sulfur phase equilibrium can be seen as providing an additional minimum reaction temperature:

$$T_H = T_{sulfidation} / T_{melting}.$$

In this example (e.g., with reference to FIG. 6D), for the oxide precursor, in rare earth sulfidation, $T_H=0.5$ is the effective minimum for the reaction to proceed at a reasonable rate due to reaction kinetics. We postulate that at $T_H=0.7$, the reaction slows due to sintering of the oxide precursor. For sulfur, $S_2$ does not become the dominant species until 790° C., setting another lower bound temperature.

As discussed in Chapter II, sulfidation of catalyst materials can take place at temperatures ranging from 500° C. to over 1000° C. These claims are able to overlook the changing nature of the sulfur gas species with temperature due to the high surface area and porosity of their starting material. This assumption cannot be made for separation of difficult to separate metal oxides, due to the fact that catalyst processing is fundamentally different than metallurgical extraction in terms of mass transfer, reaction kinetics, and materials chemistry. Therefore, we claim that our technology exists outside the scope of patent literature claims detailing catalyst processing.

VI-II. Operating Conditions Based on the Oxide

The oxide starting material for selective sulfidation for metal extraction and recovery will likely be a powder or sintered pellet. In terms of operating temperature, the nature of the oxide sets both a lower bound and an upper bound operating temperature. Since sulfidation of the oxide requires diffusion mass transfer through the particle, the temperature must be high enough to allow for rapid transport through the solid and for sufficiently fast reaction. However, the temperature must be low enough so that densifying mechanisms of sintering do not become rapid, causing the elimination of what little porosity does exist in the natural concentrate and causing the reaction to become prohibitively slow. In general, the temperature at which densifying mechanisms of sintering become relevant is about 70% of the oxide melting point, which we claim is an upper bound operating temperature.

In defining a lower bound operating temperature dictated by the oxide, the reaction rate decreases exponentially with temperature. Therefore, at some temperature the rate of reaction will become so slow that for the sake of materials processing it does not occur. Extrapolating the kinetic rate data obtained for sulfidation of lanthanum oxide suggests that the reaction becomes untenable at about 50% of the oxide melting point. Therefore, an operating temperature range for sulfidation to occur at an industrially relevant rate is between 50 and 70% of the oxide melting point.

Figure 6I:
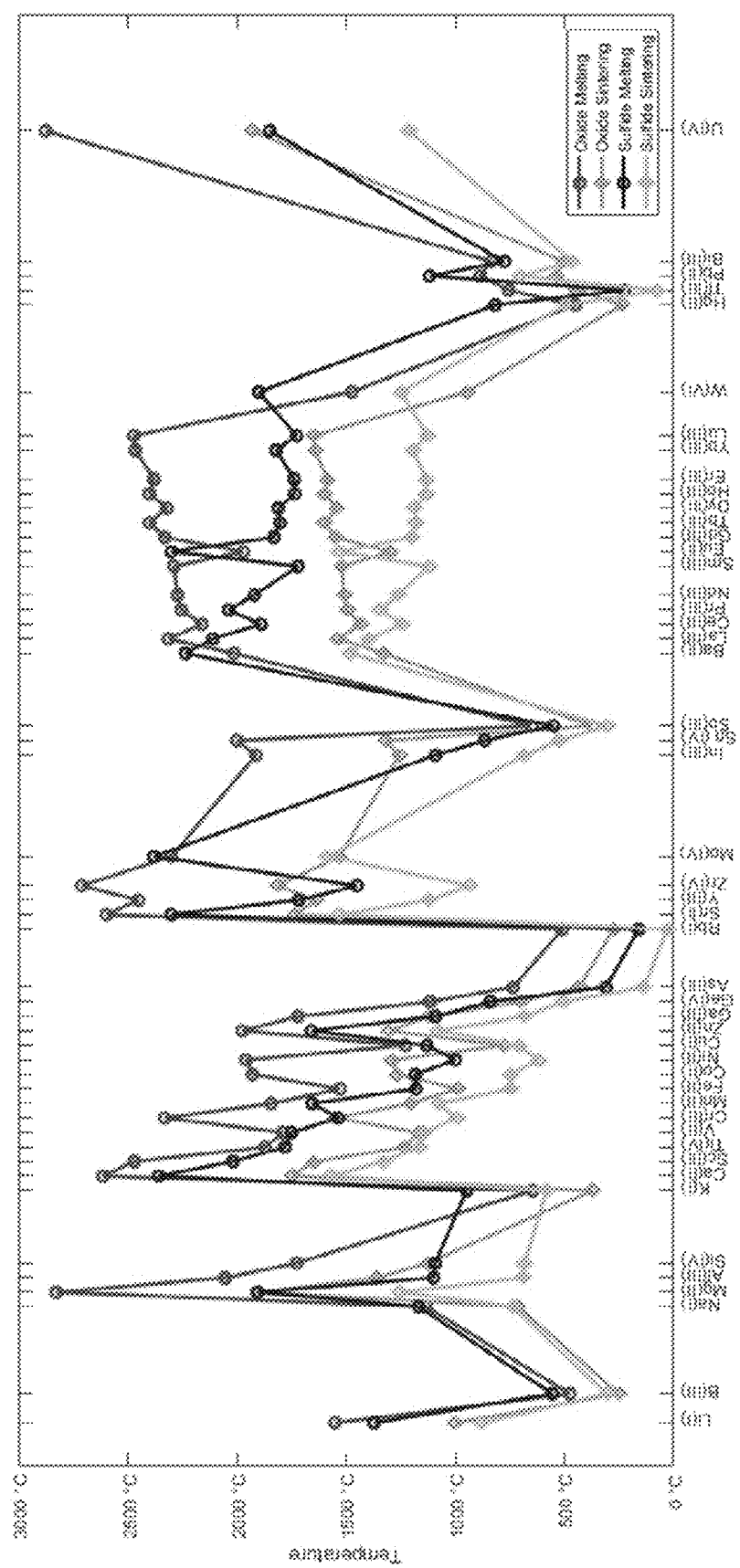
FIG. 6I shows a summary of melting points and sintering points for some metal oxide and sulfide compounds of consistent valency.

FIG. 6I shows a summary of melting points and sintering points for some metal oxide and sulfide compounds of consistent valency, taken from experimental data found throughout the literature [79-163]. Sintering temperature is taken to be 70% of the melting temperature.

In summary, the nature of our selective sulfidation process on particular metal oxides imposes restraints on the operating temperature and pressure. For the starting oxide reactant, the operating temperature of the sulfidation should be between 50 and 70% of the oxide's melting point. For the sulfur reactant, monatomic and diatomic sulfur should make up the majority of sulfur species. Therefore, based on the operating temperature restrictions imposed by the oxide, an operating pressure range can be specified. Together, this data is presented for a variety of metal oxides in FIG. 6J, which shows a summary of operating temperature ranges with maximum pressure isobars.

VI-III. Operating Conditions Based on Thermodynamic Spontaneity

For the sulfidation reaction to proceed, it of course must be thermodynamically spontaneous. For a reaction to occur, the ratio of reactants and products within the reactor must be suitable to drive the reaction toward production of the products. When a complicated mixture of gas species is present, such as in the case of selective sulfidation where the gasses are a mixture of carbon, oxygen, and sulfur containing species, in practice the thermodynamic behavior is impossible to fully describe even using current state of the art models. This challenge exists due to a lack of thermodynamic data for individual components at high temperatures and a lack of the mixing interactions of these components. Therefore, definitively determining operating conditions from our current understanding of thermodynamics is impossible. Nevertheless, based on our understanding of the art of selective sulfidation, operating conditions can be suggested. Necessary sulfur to sulfur dioxide and carbon monoxide to carbon dioxide ratios are presented in FIGS. 5A-5E of the proceeding section.

FIGS. 9A-9Z and 10A-10Y show sensitivity plots for sulfidation gas ratios in the absence of carbon. These Kellogg Diagrams show the effect of gas stream composition on the stability of different metal species in the presence of different ratios of sulfur and oxygen gasses. These diagrams can be viewed as a sensitivity analysis of the sulfidation processes. A transition between phases can be seen along the operating pressure isobar, corresponding to the "+" symbols in the diagrams. The transition between metal phases along this isobar occurs at a critical gas ratio. This gas ratio denotes the thermodynamic minimum diatomic sulfur to sulfur dioxide ratio for sulfidation to occur.

FIGS. 11A-11Z and 12A-12W show sensitivity plots for sulfidation gas ratios in the presence of carbon. These Kellogg Diagrams show the effect of gas stream composition on the stability of different metal species in the presence of different ratios of carbon, sulfur, and oxygen gasses. These diagrams can be viewed as a sensitivity analysis of the sulfidation processes. A transition between phases can be seen along the operating pressure isobar, corresponding to the "+" symbols in the diagrams. The transition between metal phases along this isobar occurs at a critical gas ratio. This gas ratio denotes the thermodynamic minimum carbon monoxide to carbon dioxide ratio for sulfidation to occur.

The necessary gas ratios along with temperature and pressure operating constraints within the reactor are tabulated below in Table VIa.

VI-IV. Operating Conditions Based on the Accumulation of Sulfur Dioxide within the Reactor Within the reactor, sulfur dioxide is produced as a result of the sulfidation reaction. The accumulation of sulfur dioxide and the steady state partial pressure is a function of the residence time of the gas stream within the reactor. The rate of sulfur dioxide production is a function of the amount of sulfur partial pressure, meanwhile the rate of sulfur dioxide removal is a function of the gas flowrate, manifesting in the residence time. However, if carbon is present, the carbothermically driven reflux of sulfur from sulfur dioxide is also a source of sulfur dioxide depletion. Therefore, the required residence time to selectively sulfidize an oxide is dependent on temperature, pressure, oxide physical characteristics (porosity, particle size, surface area), and the amount of carbon in the system. The nuances of this analysis can be appreciated following the methodology described below.

In a conventional packed bed catalysis reactor, the packing material is the catalyst, with reactant fluids flowing through to produce product fluids, with conversion increasing along the length of the reactor. Catalyst poisoning first occurs at the inlet of the bed, with a gradient in catalyst poisoning developing along the length of the bed to non-poisoned catalyst at the outlet. Meanwhile, in a conventional fluidized bed reactor the fluidization and continuous reshuffling of the catalyst medium results in a more even distribution of catalyst poisoning.

A packed or fluidized bed reaction with the intent to produce a solid product could be imagined as intentional catalyst poisoning, very distinct from a conventional catalytic process. Furthermore, in the production of solids, the surface area is likely not engineered as in the case of the catalyst—the surface is that of a natural ore or concentrate. As a result, sulfidation is fundamentally different than catalytic type processes, even if a rare earth oxide or oxysulfide is utilized in both cases. Instead of trying to fully convert the fluid stream to product by the end of the reactor as in a conventional catalytic process, when producing a solid product, the conversion of the fluid stream is far less important. In a packed or fluidized bed reactor where external mass transfer limitations are to be minimized, the composition of the fluid stream will remain approximately constant along the entire length of the reactor and through the bed around the packing media, in this case the solid reagent. Therefore, within a bed reactor with minimal external mass transfer limitations producing a solid product, each piece of packing will be exposed to a similar fluid composition containing a mixture of reactant and product fluids. Therefore, the reaction will begin at the surface of the solid, with an inward-moving reaction front developing from all surface sides of the pellet. This model of a contracting reaction front is known as the collapsing pore model.

In this reactor exhibiting a collapsing pore model of conversion within the solid media (pellet) with minimal external mass transfer limitations, at steady state the reactor fluid will converge to some composition of reactants and products based on the reaction rate. If this reactant to product ratio is above some critical value, the reaction will continue to progress. However, if the reactant to product ratio falls below thermodynamic criteria for reaction spontaneity, the reaction will cease to proceed. To maintain sufficient reactant vs product concentrations, inlet flow into the reactor must exceed a critical value to sufficiently dilute reactant product sulfur dioxide. Normalizing by reactor volume, analysis of minimum inlet flow rates results in a maximum average residence time for the inlet reagent. An attempt at determination of the maximum residence time for sulfidation reactions in both the absence and presence of rare earth oxides are presented below. However, definitive scientific analysis is impossible because of the unknown atomistic mechanism for sulfidation of a rare earth oxide and the unknown sulfidation and carbothermic behavior of sulfidation intermediates.

VI-V. Sulfidation of Rare Earth Oxides in the Absence of Carbon

The actual mechanism of sulfidation of rare earth oxides is unknown. However, the following reaction is taken to describe the net sulfidation of a rare earth oxide ($Ln_2O_3$) with gaseous diatomic sulfur ($S_2$) in the absence of carbon:

$$Ln_2O_3 + \frac{9}{4}S_2 = Ln_2S_3 + \frac{3}{2}SO_2$$

The reaction is taken to be zero order in the solid, resulting in a rate law of the following form on a per unit volume basis, where r is the reaction rate, k is the observed reaction rate constant, n is the reaction order in $S_2$, C is concentration, and P is the pressure:

$$r_{SO_2} = -\frac{2}{3}r_{S_2} = \frac{2}{3}kC_{S_2}^n = \frac{2}{3}k\left(\frac{P_{S_2}}{P}\right)^n [=]\left(\frac{mol}{m^3}\right)s^{-1}$$

$$k [=] \left(\frac{m^3}{mol}\right)^{n-1} s^{-1}$$

The reaction rate can also be described on a $Ln_2O_3$ mass basis with the following form, where $\beta_B$ is the bulk density of the solid bed, $\rho_{Ln_2O_3}$ is the density of the oxide, and E is the bed porosity:

$$r'_{SO_2} = \frac{2}{3}k'C_{S_2}^n = \frac{2}{3}\frac{k}{\rho_B}\left(\frac{P_{S_2}}{P}\right)^n [=]\left(\frac{mol}{kg}\right)s^{-1}$$

$$k' = \frac{k}{\rho_B} [=] \left(\frac{m^3}{mol}\right)^{n-1}\frac{m^3}{kg}s^{-1}$$

$$\rho_B = \rho_{Ln_2O_3}(1-\epsilon)$$

Furthermore, the reaction can be described on a $Ln_2O_3$ surface area basis with the following form, where S is the surface area:

$$r''_{SO_2} = \frac{2}{3}k''C_{S_2}^n = \frac{2}{3}\frac{k}{S_{Ln_2O_3}\rho_B}\left(\frac{P_{S_2}}{P}\right)^n [=]\left(\frac{mol}{m^2}\right)s^{-1}$$

$$k'' = \frac{k}{S_{Ln_2O_3}\rho_B} [=] \left(\frac{m^3}{mol}\right)^{n-1}\frac{m}{s}$$

Additionally, $SO_2$ can back react with $S_2$ to form $S_2O$ gas, which is thermodynamically stable at temperatures of interest for rare earth oxide sulfidation reactions. Therefore, the amount of $SO_2$ within the reactor is reduced due to the following reaction:

$$\frac{3}{2}S_2 + SO_2 = 2S_2O$$

This reaction is taken to be at equilibrium. Therefore, the depletion of $S_2$ and $SO_2$ due to formation of $S_2O$ can be calculated through the equilibrium constant of the reaction $K_{S_2O}$.

Through the reactor, the inlet molar flowrate U is chosen so that at the outlet the $S_2$ to $SO_2$ ratio exceeds the minimum $S_2$ to $SO_2$ ratio for sulfidation to occur:

$$\frac{P_{S_2}}{P_{SO_2}} \geq \left(\frac{P_{S_2}}{P_{SO_2}}\right)_{crit}$$

For the reaction to be performed selectively, the $S_2$ to $SO_2$ must be carefully controlled to avoid unwanted sulfidation in other oxides. This equilibrium is currently impossible to definitively determine from scientific principles due to the non-quantifiable nature of sulfidation intermediates and their unknown roll on sulfidation and $S_2$ to $SO_2$ ratio. Nevertheless, the partial pressures of $S_2$ and $SO_2$ are a function of the number of moles N per time, and the reactor volume V, and the operating temperature T, as defined by a suitable equation of state.

$$P_{S_2} = f(T, V, N_{S_2})$$

$$P_{SO_2} = f(T, V, N_{SO_2})$$

$$P = f(T, V, N)$$

Assuming an ideal mixture of gasses, the following approximation can be made:

$$P_{S_2} = \frac{N_{S_2}}{N} = \frac{U_{S_2} - \frac{3}{2}r_{SO_2}V - f(K_{S_2O})}{U_{inert} + U_{S_2} + U_{SO_2} - \frac{1}{2}r_{SO_2}V + f(K_{S_2O})}$$

$$P_{SO_2} = \frac{N_{SO_2}}{N} = \frac{U_{SO_2} + r_{SO_2}V - f(K_{S_2O})}{U_{inert} + U_{S_2} + U_{SO_2} - \frac{1}{2}r_{SO_2}V + f(K_{S_2O})}$$

Therefore, the $S_2$ to $SO_2$ ratio as a function of flowrate, reactor volume, surface area, and bed porosity is as follows:

$$\frac{P_{S_2}}{P_{SO_2}} = \frac{U_{S_2} - \frac{3}{2}r_{SO_2}V}{U_{SO_2} + r_{SO_2}V} =$$

$$\frac{U_{S_2} - k''S_{Ln_2O_3}\rho_{Ln_2O_3}(1-\epsilon)\left(\frac{P_{S_2}}{P}\right)^n V}{U_{SO_2} + \frac{2}{3}k''S_{Ln_2O_3}\rho_{Ln_2O_3}(1-\epsilon)\left(\frac{P_{S_2}}{P}\right)^n V} f(K_{S_2O}) \geq \left(\frac{P_{S_2}}{P_{SO_2}}\right)_{crit}$$

For a reactor with no $SO_2$ added at the inlet, $U_{SO_2}=0$. Upon normalization by reactor volume, the following relation for $U_{S_2}/V$ is obtained for the:

$$\left(\frac{U_{S_2}}{V}\right)_{min} \geq k''S_{Ln_2O_3}\rho_{Ln_2O_3}(1-\epsilon)\left(\frac{P_{S_2}}{P}\right)^n f(K_{S_2O}) +$$

$$\left(\frac{2}{3}k''S_{Ln_2O_3}\rho_{Ln_2O_3}(1-\epsilon)\left(\frac{P_{S_2}}{P}\right)^n\right)\left(\frac{P_{S_2}}{P_{SO_2}}\right)_{crit}$$

The minimum value of $U_{S_2}/V$ corresponds to the minimum $S_2$ flowrate to ensure that $SO_2$ buildup in the reactor will not create conditions where thermodynamics predicts the sulfidation reaction will not be spontaneous due to an excess of $SO_2$. The sulfur flowrate is assumed to remain approximately constant through the reactor, while the $SO_2$ flowrate is assumed to remain negligible. The volumetric flow of $S_2$, $\dot{V}_{S_2}$, can be calculated using a suitable equation of state:

$$\dot{V}_{S_2} = f(T,P,U_{S_2})$$

In practice the high number of gasses of difficult to define interactions make the rigorous derivation of an equation of state impossible, diminishing the predictive nature of these methods of analysis. The volumetric flow of an inert carrier gas is calculated using a similar approach:

$$\dot{V}_{inert} = f(T,P,U_{inert})$$

Therefore, the maximum $S_2$ residence time, $t_{res}$, within the reactor can be calculated as follows:

$$t_{res} = \frac{V}{\dot{V}_{S_2} + \dot{V}_{inert}}$$

Where $k''S_{Ln_2O_3}\rho_{Ln_2O_3}(1-\epsilon)=k_{intrinsic}$, the calculated minimum $U_{S_2}/V$ represents an upper bound of minimum velocity. However, when mass transfer limitations cause $k_{observed}<k_{intrinsic}$, the minimum $U_{S_2}/V$ to suppress the reverse reaction of the sulfidation will also be less than in the intrinsic case. The relation between $k_{observed}$ and $k_{intrinsic}$ is defined by the internal effectiveness factor $\eta$:

$$\eta = \frac{k_{observed}}{k_{intrinsic}} = \frac{k'_{observed}}{k'_{intrinsic}} = \frac{k''_{observed}}{k''_{intrinsic}}$$

The internal effectiveness factor can be calculated from Sohn and Szekely's generalized fluid-solid reaction modulus relating chemical reaction rates to pore diffusion rates, serving in a similar role to the Thiele modulus of heterogeneous catalysis. The generalized fluid-solid reaction modulus ($\hat{\sigma}$) is defined as follows, where $V_p$ and $V_g$ are the volumes of the pellet and a grain within the pellet respectively, $A_p$ and $A_g$ are the surface areas of the pellet and a grain within the pellet respectively, $C_A$ is the concentration of the reacting species in the fluid, $F_p$ and $F_g$ are geometric factors for the pellet and a grain within the pellet respectively, and $D_E$ is the effective diffusivity:

$$\hat{\sigma} = \frac{V_p}{A_p}\sqrt{\frac{(1-\epsilon)k''C_{S_2}^{n-1}F_pA_g}{2D_EF_gV_g}}$$

$$\eta = \frac{3}{\hat{\sigma}^2}(\hat{\sigma}\coth\hat{\sigma} - 1)$$

Therefore, the internal effectiveness factor can be viewed as a proxy for the effects of particle size, particle porosity, and surface area on reaction rate.

$$\eta = f(V_g, \epsilon, S_{Ln_2O_3})$$

However, this analysis ignores the effects of sulfidation intermediates on thermodynamic equilibrium equations. Ergo, selective sulfidation chemistry cannot be described in an obvious manner from thermodynamics alone.

VI-VI. Sulfidation of Rare Earth Oxides in the Presence of Carbon

As in the case of sulfidation in the absence of carbon, the following reaction describes the sulfidation of a rare earth oxide ($Ln_2O_3$) with gaseous diatomic sulfur ($S_2$):

$$Ln_2O_3 + \frac{9}{4}S_2 = Ln_2S_3 + \frac{3}{2}SO_2$$

However, in the presence of carbon $SO_2$ undergoes a series of reactions with carbon species, chemically recycling $SO_2$ back into $S_2$, forming a sulfur reflux loop within the reactor:

$$SO_2 + 2C = CO + \frac{1}{2}S_2$$

$$SO_2 + 2CO = 2CO_2 + \frac{1}{2}S_2$$

$$C + CO_2 = 2CO$$

While the following reaction between carbon and sulfur to form carbon disulfide is thermodynamically feasible, we believe it to be kinetically limited due to minimal evidence of occurrence in the sulfidation of lanthanum oxide. As a result, we postulate that $CS_2$ formation can be ignored.

$$C+S_2=CS_2$$

However, an unknown carbothermic equilibrium exists between sulfidation intermediates and carbon species. This unknown equilibrium makes the complete role of carbon in the reaction currently impossible to definitively describe from scientifically known principles.

During sulfidation, the reactions between sulfur species and carbon species are taken to be fast compared to oxide sulfidation. Therefore, within the reactor, the interactions between carbon, sulfur, and oxygen are expected to be at equilibrium. The carbon source can take a variety of forms. However, regardless of the carbon source, an equilibrium between solid carbon, carbon monoxide, and carbon dioxide will develop due to the Boudouard reaction. Ergo, in the presence of carbon, control of the $S_2$ to $SO_2$ ratio and control of carbothermic effects of the reaction can be executed by control of the CO to $CO_2$ ratio within the reactor. For sulfidation to occur, a critical ratio of CO to $CO_2$ must be met or exceeded:

$$\frac{P_{CO}}{P_{CO_2}} \geq \left(\frac{P_{CO}}{P_{CO_2}}\right)_{crit}$$

As with sulfidation in the absence of carbon, the $CO/CO_2$ ratio must be carefully controlled within a set region for selective sulfidation, otherwise unwanted sulfidation may occur in other species, resulting in a loss of selectivity. Using the equilibrium of the carbon, oxygen, and sulfur reactions described above, a depletion in $SO_2$ as a result of added carbon can be calculated as a function of the CO to $CO_2$ ratio. The exact nature of the functional dependence on the $CO/CO_2$ ratio is impossible to know due to the unknown nature of the interactions of sulfide intermediates and carbon-oxygen-sulfur species. The resulting relation for $U_{S_2}/V$ is as follows:

$$\left(\frac{U_{S_2}}{V}\right)_{min} \geq k'' S_{Ln_2O_3} \rho_{Ln_2O_3} (1-\epsilon)\left(\frac{P_{S_2}}{P}\right)^n f(K_{S_2O}) f\left(\frac{P_{CO}}{P_{CO_2}}\right) + \left(\frac{2}{3} k'' S_{Ln_2O_3} \rho_{Ln_2O_3} (1-\epsilon)\left(\frac{P_{S_2}}{P}\right)^n \right) \left(\frac{P_{S_2}}{P_{SO_2}}\right)_{crit}$$

Figure 6J:
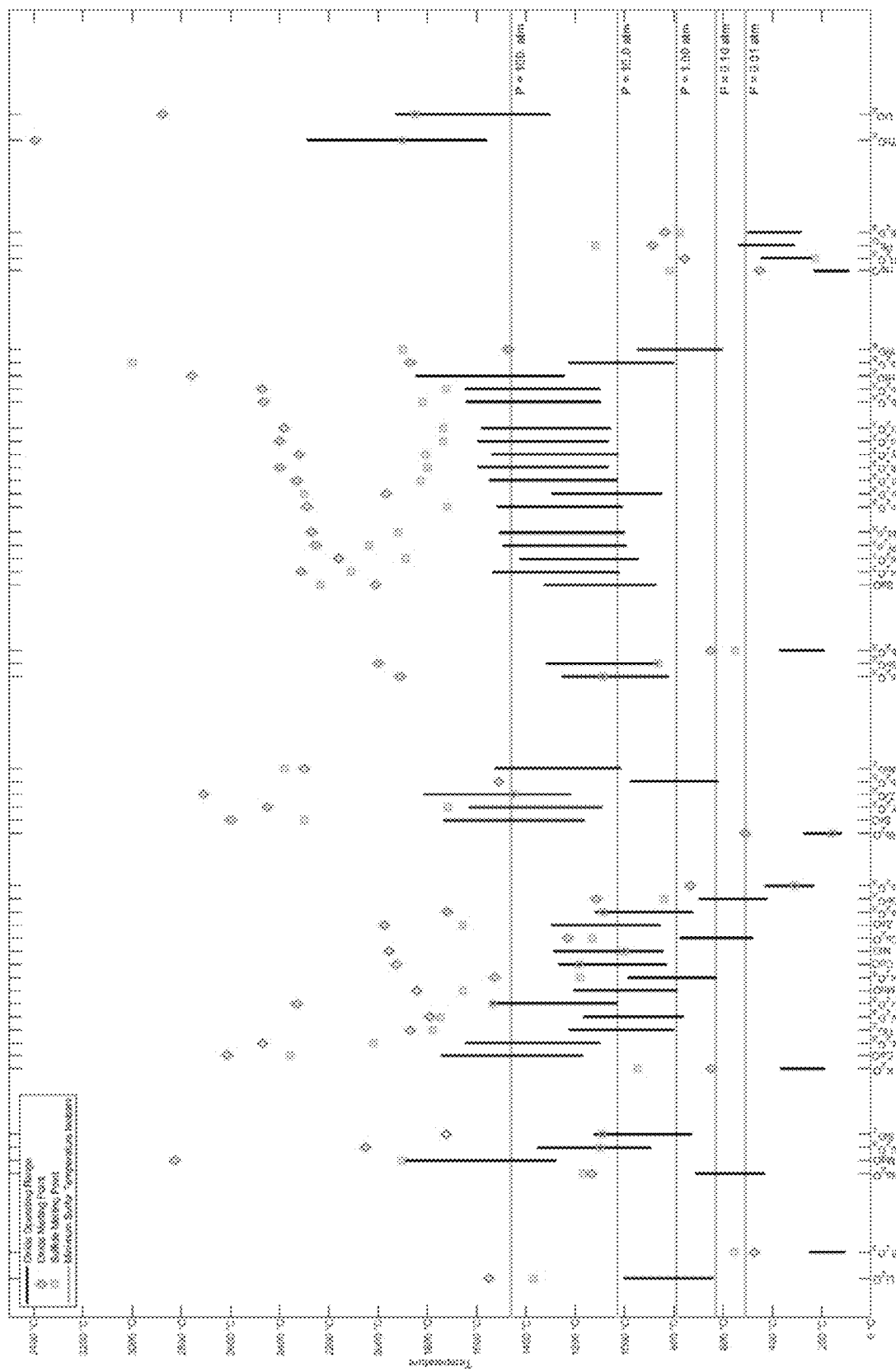
FIG. 6J shows a summary of operating temperature ranges with maximum pressure isobars.
Figure 6K:
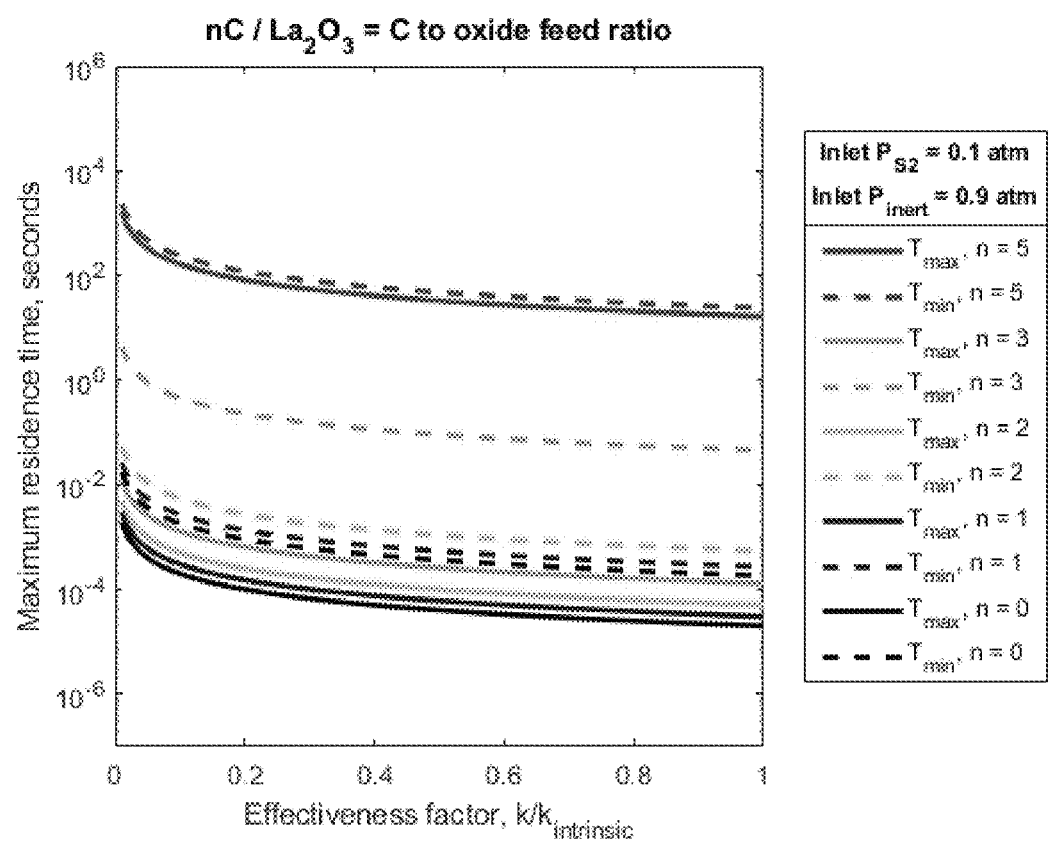
FIG. 6K shows the maximum residence time for gas in a sulfidation reactor producing lanthanum sulfide from lanthanum oxide to minimize kinetic effects of the buildup of sulfur dioxide.

As in the case of sulfidation without carbon, a maximum sulfur residence time for a target S2 to $SO_2$ ratio can be determined. The maximum residence time of the gas stream through the reactor is shown to increase with the addition of carbon, providing readily achievable operating conditions for the sulfidation of rare earth oxides. An average residence time chart for lanthanum oxide sulfidation is presented in FIG. 6K. FIG. 6K shows the maximum residence time for gas in a sulfidation reactor producing lanthanum sulfide from lanthanum oxide to minimize kinetic effects of the buildup of sulfur dioxide. For other metal oxides of interest at sulfur partial pressures of 0.05 atm, 0.1 atm, 0.25 atm, and 0.5 atm, residence time charts are presented in FIGS. 13A-13Z, 14A-14Z, 15A-15Z, and 16A-16B, which shows sensitivity plots for modeled sulfidation reactor residence times in the presence of carbon. These figures show modeled maximum residence times for the sulfidation reactor in order to mitigate the effects of sulfur dioxide accumulation in the reactor. Because of the fast reaction kinetics, sulfur dioxide is rapidly produced during sulfidation of a metal oxide. However, sulfur dioxide levels must be kept to a minimum to ensure the sulfidation reaction remains thermodynamically tenable. We propose two main ways to combat sulfur dioxide accumulation: the addition of carbon to facilitate a carbothermically-driven reflux of product sulfur dioxide back into reactant sulfur, coupled with sufficiently high gas flow rates to continuously purge the reactor of sulfur dioxide accumulation. These figures show how the maximum residence time of the gas stream in the reactor, corresponding to the minimum gas flow rate, is related to the addition of carbon to the system. In general, more difficult to sulfidize metal oxides require more carbon—some easy to sulfidize oxides such as those of cobalt and nickel require no carbon to have tenable gas residence times.

VI-VII. Summary of Operating Conditions for the Sulfidation of Metal Oxides with Elemental Sulfur Operating conditions for the sulfidation of metal oxides with elemental sulfur are described in this section. Considerations are made for thermodynamic criteria for reaction spontaneity, sulfidation reaction kinetics, and the equilibrium and kinetic behavior of carbon with sulfur and oxygen gasses. However, the complicated nature of the reaction coupled with the unknown behavior of sulfidation intermediates with carbon and sulfur/oxygen gasses make obvious thermodynamic, kinetic, or otherwise scientific insight into the true behavior of the system impossible. With this high degree of uncertainty in mind, Table VIa summarizes our understanding of temperature and gas composition operating conditions for the system.

TABLE VIa

Operating Conditions for sulfidation at a reactor outlet pressure of 1 atm.

| Number | Oxide | Oxide MP | Tmin | Tmax | log10(S2/SO2)_Tmin | log10(S2/SO2)_Tmax |
|---|---|---|---|---|---|---|
| 3 | Li_2O | 1550 | 790 | 1003 | 1.41137 | 0.51495 |
| 12 | MgO | 2827 | 1277 | 1897 | 3.13546 | 2.93123 |
| 13 | Al_2O_3 | 2054 | 891 | 1356 | 11.1734 | 8.3582 |
| 14 | SiO_2 | 1726 | 790 | 1126 | 12.6277 | 10.0393 |
| 20 | CaO | 2613 | 1170 | 1747 | −1.995778 | −0.8119 |
| 21 | Sc_2O_3 | 2470 | 1099 | 1647 | 13.0302 | 11.6638 |
| 22 | TiO_2 | 1870 | 799 | 1227 | 6.3796 | 4.9391 |
| 23 | V_2O_3 | 1790 | 790 | 1171 | 2.776 | 3.2748 |
| 24 | Cr_2O_3 | 2330 | 1029 | 1549 | 4.0537 | 3.0531 |
| 25 | MnO | 1843 | 790 | 1208 | −2.83578 | −1.44761 |
| 26 | Fe_3O_4 | 1528 | 790 | 988 | −1.71711 | −1.34825 |
| 27 | CoO | 1928 | 828 | 1268 | −3.44811 | −1.5513 |
| 28 | NiO | 1958 | 843 | 1289 | −4.54311 | −3.999 |
| 30 | ZnO | 1975 | 851 | 1301 | −3.9998 | −1.9807 |
| 31 | Ga_2O_3 | 1720 | 790 | 1122 | −1.52411 | −0.8018 |
| 38 | SrO | 2597 | 1162 | 1736 | −1.24497 | −1.6738 |
| 39 | Y_2O_3 | 2450 | 1089 | 1633 | 12.2152 | 11.6771 |
| 40 | ZrO_2 | 2710 | 1219 | 1815 | 4.8351 | 4.0576 |

TABLE VIa-continued

Operating Conditions for sulfidation at a reactor outlet pressure of 1 atm.

| Number | Oxide | Oxide MP | Tmin | Tmax | log10(S2/SO2)_Tmin | log10(S2/SO2)_Tmax |
|---|---|---|---|---|---|---|
| 41 | Nb_2O_5 | 1512 | 790 | 977 | 3.0967 | 3.0444 |
| 42 | MoO_2 | 2300 | 1014 | 1528 | −1.9944 | −0.7627 |
| 49 | In_2O_3 | 1912 | 820 | 1257 | −1.60111 | −1.2786 |
| 50 | SnO_2 | 2000 | 864 | 1318 | 0.4111 | 0.415 |
| 56 | BaO | 2013 | 870 | 1327 | −1.18877 | −1.1863 |
| 57 | La_2O_3 | 2313 | 1020 | 1537 | 10.874 | 10.7749 |
| 58 | Ce_2O_3 | 2160 | 944 | 1430 | 12.6436 | 11.8721 |
| 59 | Pr_2O_3 | 2254 | 991 | 1496 | 13.4268 | 12.4971 |
| 60 | Nd_2O_3 | 2272 | 1000 | 1509 | 11.8643 | 11.0909 |
| 62 | Sm_2O_3 | 2288 | 1008 | 1520 | 11.8662 | 11.5531 |
| 63 | Eu_2O_3 | 1970 | 849 | 1297 | 12.1042 | 11.5531 |
| 64 | Gd_2O_3 | 2330 | 1029 | 1549 | 10.0742 | 9.8304 |
| 65 | Tb_2O_3 | 2400 | 1064 | 1598 | 10.3952 | 10.1568 |
| 66 | Dy_2O_3 | 2320 | 1024 | 1542 | 10.1228 | 9.9822 |
| 67 | Ho_2O_3 | 2400 | 1064 | 1598 | 11.087 | 10.3096 |
| 68 | Er_2O_3 | 2380 | 1054 | 1584 | 11.085 | 10.4693 |
| 69 | Tm_2O_3 | 2341 | 1034 | 1557 | 10.8662 | 10.4971 |
| 72 | HfO_2 | 2758 | 1243 | 1849 | 6.1247 | 5.6201 |
| 73 | Ta_2O_5 | 1872 | 800 | 1229 | 5.9111 | 4.8284 |
| 74 | WO_6 | 1474 | 790 | 950 | −1.17911 | −0.9083 |
| 90 | ThO_2 | 3390 | 1559 | 2291 | 6.4034 | 5.39634 |
| 92 | UO_2 | 2876 | 1302 | 1931 | 5.6201 | 5.0488 |

VII. Selective Sulfidation Case Studies

Utilizing the methodology described herein for sulfidation of oxides, in this section we present three case studies: selective sulfidation of niobium and tantalum, zirconium and hafnium, and dephosphorized mozanite(Ce) concentrate containing cerium, lanthanum, neodymium, and thorium. In these case studies, proposed process modification, operating conditions for selective sulfidation, and thermodynamic separation factors are reported.

VII-I. Selective Sulfidation of Niobium and Tantalum

Due to their highly similar chemistries, the strategic metals niobium and tantalum are always found together in nature [164]. Their similar chemistries lead to significant challenges in separation. Carbochlorination has been explored for their separation, yet showed minimal selectivity [165], therefore hydrometallurgical methods are currently utilized for their separation [78]. Multiple tantalum and niobium ores exist [164], containing varied ratios of the two, and are summarized in Table VIIa.

Currently, niobium and tantalum are produced from a mixed ore via a series of digestion, filtration, and solvent extraction processes. Digestion and filtration remove most of the dirt and other residues, resulting in an aqueous stream ready for solvent extraction. The first series of solvent extraction steps removes the niobium and tantalum from the other metal impurities. Following, a series of intensive solvent extraction loops are conducted to separate the niobium from the tantalum. Due to the chemical similarity of niobium and tantalum, many loops must be conducted.

Figure 7A:
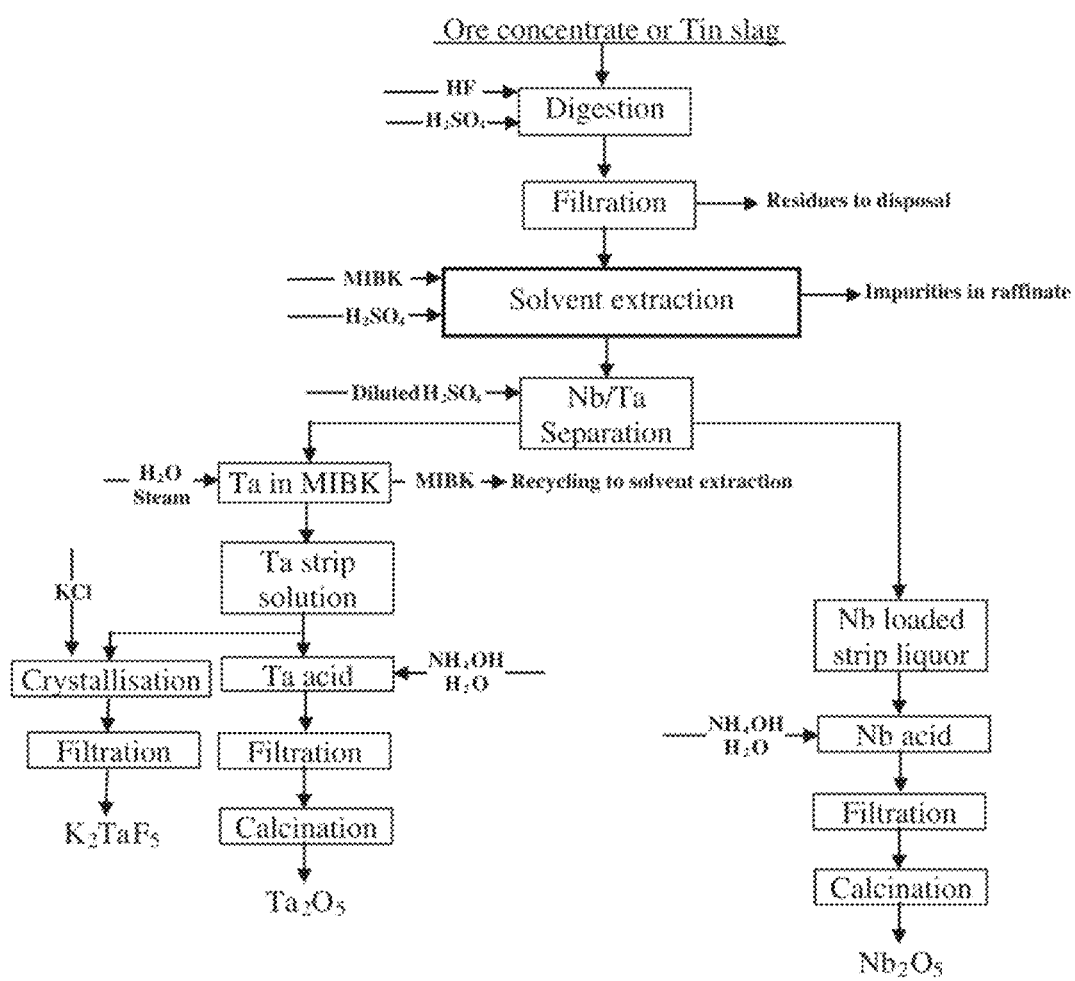
FIG. 7A shows a process Flow Diagram for Niobium and Tantalum Separation by Cheng and Zhu.

Following separation, the metals are precipitated and calcined into their oxides $Nb_2O_5$ and $Ta_2O_5$ or crystallized into a potassium fluoride salt. This process is summarized by Cheng and Zhu [78] in FIG. 7A.

Figure 7B:
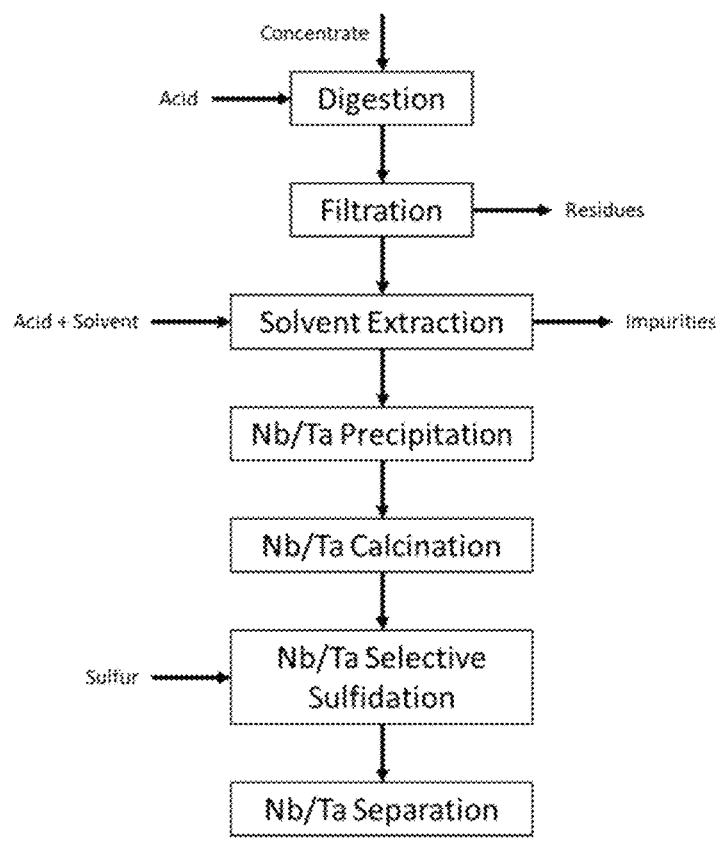
FIG. 7B shows a modified processing pathway for niobium/tantalum separation.

For niobium and tantalum separation, selective sulfidation would be employed directly after the primary solvent extraction of other metal impurities. The mixed niobium and tantalum would be precipitated and calcined into a mixed oxide. From there, the oxide would be selectively sulfidized into niobium sulfide and tantalum oxide. FIG. 7B shows a modified processing pathway for niobium/tantalum separa- TABLE VIIa

| Mineral name | Mineral Group | Chemical Formula | Nb2O5 percent | Ta2O5 percent |
|---|---|---|---|---|
| Columbite | Columbite-tantalite | $(Fe,Mn)(Nb,Ta)_2O_6$ | 46.8 to 81.2 | 5.3 to 31.2 |
| Tantalite | Columbite-tantalite | $(Fe,Mn)(Ta,)_2O_6$ | 0.3 to 26.8 | 56.5 to 86.2 |
| Pyrochlore | Pyrochlore | $(Na,Ca,Ce)_2(Nb,Ti,Ta)_2(O,OH,F)_7$ | 34.3 to 86.8 | Trace to 4.3 |
| Microlite | Pyrochlore | $(Na,Ca)_2(Ta,Nb,Ti)_2(O,OH,F)_7$ | Trace to 3.4 | 73.7 to 86.0 |
| Tapiolite | Tapiolite | $(Fe,Mn)(Ta,Nb)_2O_6$ | 0 to 35 | Up to 86 |
| Ixiolite | Ixiolite | $(Ta,Fe,Sn,Nb,Mn)_4O_8$ | 8.3 | 68.96 |
| Wodginite | Wodginite | $(Ta,Sn,Mn,Nb,Fe,Ti)O_2$ | 1.35 to 7.1 | 67.5 to 70.1 |
| Loparite | Perovskite | $(Ce,La,Na,Ca,Sr)(Ti,Nb)O_3$ | 9.7 to 15.1 | 0.8 to 1.0 |
| Lueshite | Perovskite | $NaNbO_3$ | 81.1 | Trace |
| Latrappite | Perovskite | $(Ca,Na)(Nb,Ti,Fe)O_3$ | 43.9 | Trace |
| Euxenite | Euxenite | $(Y,Ca,Ce,U,Th)(Nb,Ti,Ta)_2O_6$ | 21 to 34 6.5 | 1 to 22 |
| Strüverite | Rutile | $(Ti,Ta,Fe)O_2$ | 6.5 to 9.3 | 33.1 to 35.5 |
| Ilmenorutile | Rutile | $Fe_x(Nb,Ta)_{2x}4Ti_{1-x}O_2$ | Up to 33 | Up to 14 | tion. The separation of niobium sulfide from tantalum oxide could be performed utilizing a variety of solvent extraction, floatation/density separation, or other processes. While selective sulfidation adds additional upfront processing, it requires less downstream hydrometallurgical processing, with the potential to show significant reductions in capital and operating cost, residence time, and toxic waste production. This is of particular interest for tantalum and niobium producers due to low separation factors for niobium versus tantalum (Table VIIb) and the push to reduce hydrofluoric acid use due to health and environmental concerns. New processing opportunities afforded by having an oxide and a sulfide instead of two oxides are discussed in Section IX.

TABLE VIIb

Separation Factors of Niobium and Tantalum

| Separation Technology | HF Concentration | $H_2SO_4$ Concentration | Separation Factor $\beta$ |
|---|---|---|---|
| MIBK | 3.0M | 2.0M | 1185 |
| TIMP | 1.28M | 0.71M | 217 |
| OCL-2 | — | 2.0M | 882 |
| TOA | — | 1.0M | 30.77 |
| TDA | — | 1.5M | 11.76 |
| TDDA | — | 1.0M | 14 |

As a case study for selective sulfidation, we propose the following operating conditions (Table VIIc) for selectively sulfidation of niobium oxide from a mixed niobium and tantalum oxide.

TABLE VIIc

Operating conditions for selective sulfidation of niobium from tantalum.

| | |
|---|---|
| $P_{S_2}/P_{SO_2}$ (Reactor) | $10^4$ |
| $P_{CO}/P_{CO_2}$ (Reactor) | 1 |
| $P_{S_2}/P_{Ar}$ (Feed) | 0.11 |
| mol-C/mol-$(Nb,Ta)_2O_5$ (Feed) | 1 |
| mass-C/mass-$(Nb,Ta)_2O_5$ (Feed) | 0.03-0.05 |
| Reactor Pressure, atm (Outlet) | 1 |
| Reactor Temperature, ° C. | 1000 |
| Effectiveness Factor | 0.2 |
| Reactor Gas Residence Time, s | 20 |

Figure 7C:
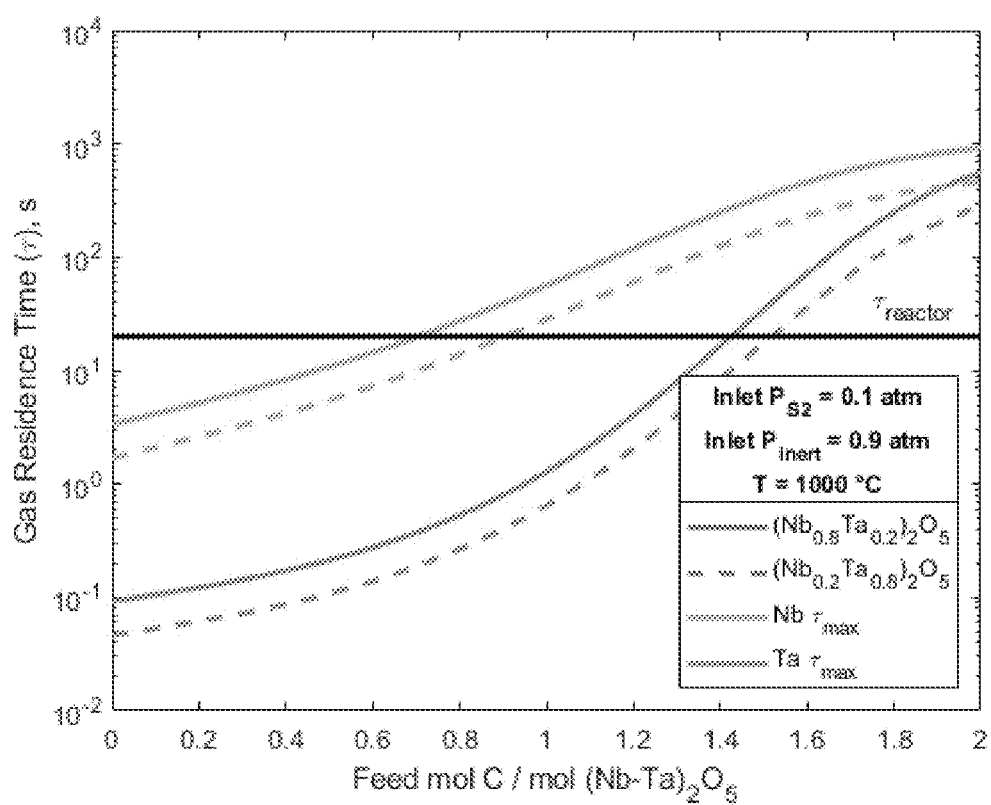
FIG. 7C shows a steady-state average residence time plot for the selective sulfidation of niobium from a mixed niobium and tantalum feed.

Utilizing these operating conditions, a residence time plot can be generated. FIG. 7C shows a steady-state average residence time plot for the selective sulfidation of niobium from a mixed niobium and tantalum feed. At these operating conditions with a solids feed of one mole of carbon to mole of oxide, niobium sulfide will form, and meanwhile tantalum will remain as an oxide due to insufficient gas flowrates in and out of the reactor. At a gas flowrate resulting in an average reactor residence time of 20 seconds, under these conditions niobium oxide will be sulfidized from niobium oxide, meanwhile tantalum will remain an oxide due to presence of a thermodynamically-unfavorable level of sulfur dioxide within the reactor. The difference in chemistry between oxides and sulfides allows for far easier separation than that of a mixed niobium and tantalum oxide or an aqueous stream containing both tantalum and niobium ions. The addition of a selective sulfidation step to the process of niobium and tantalum separation reduces the hydrometallurgical burden of separation, leading to a subsequent reduction in costs associated with large residence times, and highly-toxic solvent handling and disposal.

VII-I. Selective Sulfidation of Zirconium and Hafnium

Like tantalum and niobium, zirconium and hafnium are always found together in nature and also exhibit very similar chemistry, causing separation to be very difficult. The predominant ore of zirconium and hafnium is zircon, $(Zr,Hf)SiO_4$, where the hafnium to zirconium ratio is on the order of 1:25 [166]. Because the hafnium concentration in Hf—Zr metal is on the order of 5%, often time's separation is not necessary because of the similar physical and chemical properties of the metals. However, in nuclear applications zirconium is neutron transparent while hafnium is used as a nuclear absorber, therefore nuclear grade zirconium must have minimal hafnium impurities. The purification of hafnium-free nuclear-grade zirconium is the primary source of hafnium [166].

Figure 7D:
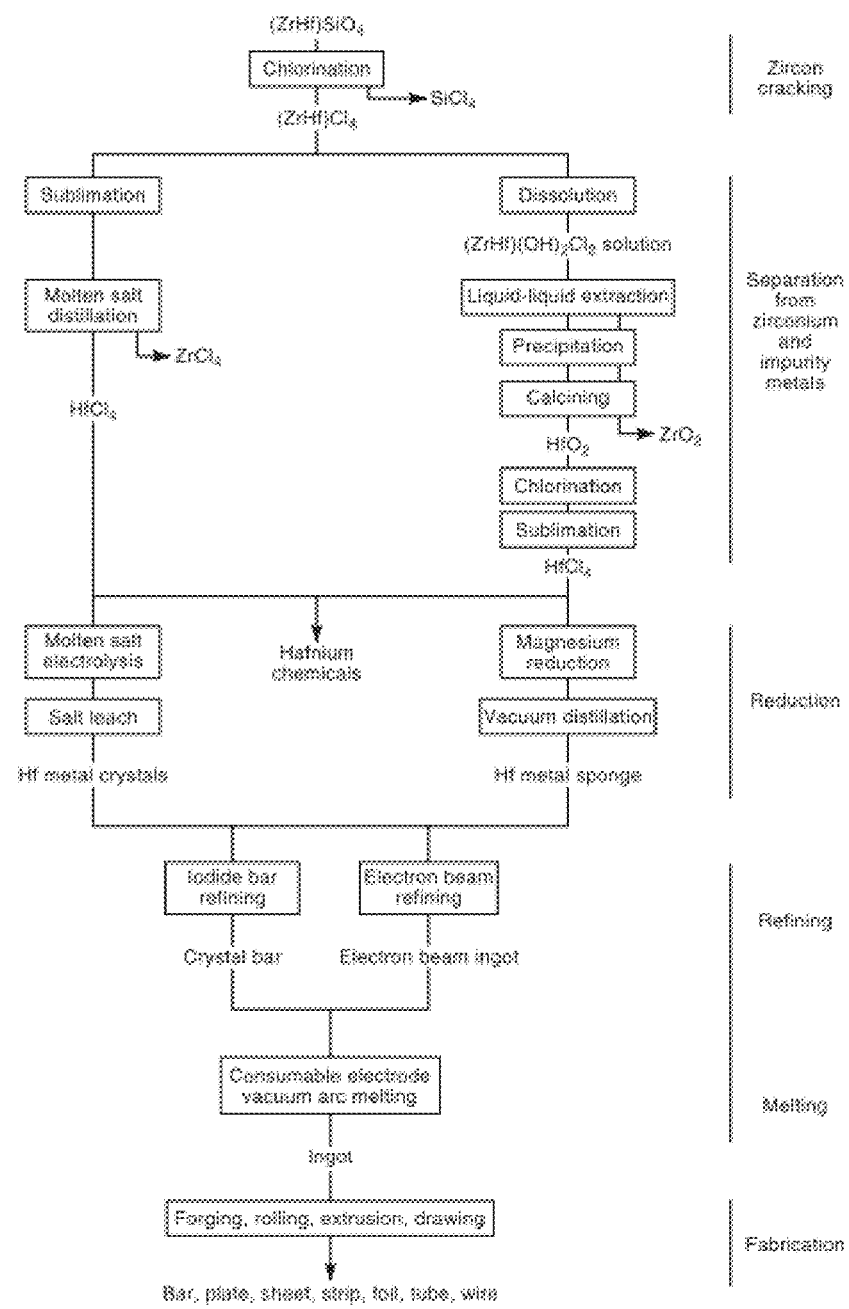
FIG. 7D shows a Process Flow Diagram for Zirconium and Hafnium Separation by Neilsen.

Production of hafnium and zirconium begins with the cracking of zircon concentrate via carbochlorination to allow for silicon removal. Following carbochlorination, hafnium and zirconium are separated using either solvent extraction, molten salt distillation, or fluorozirconate crystallization. FIG. 7D shows a Process Flow Diagram for Zirconium and Hafnium Separation by Neilsen [166]. While solvent extraction has largely replaced distillation and crystallization, the separation of zirconium and hafnium is capital intensive due to low separation factors (Table VIId).

TABLE VIId

Separation Factors for Hafnium and Zirconium

| Separation Technology | Zr/Hf Separation Factor $\beta$ |
|---|---|
| TBP/HNO3 | 12 |
| TBP/Cyanex 923 | 186 |
| Cyanex 925 | 37 |

Figure 7E:
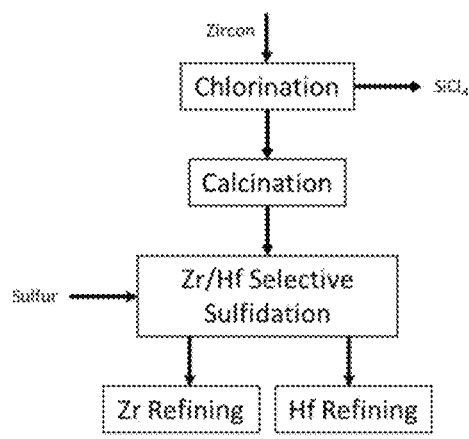
FIG. 7E shows a Modified Process for zirconium and hafnium separation utilizing selective sulfidation.

Selective sulfidation has the ability to selectively sulfidize zirconium in the presence of hafnium. While this process provides additional concentrate cracking steps, the adoption of selective sulfidation has the potential to drastically reduce or eliminate the capitally-intensive hydrometallurgical or distillation processes currently employed for zirconium purification and hafnium recovery. Due to the drastically-different melting points between oxides and sulfides of hafnium and zirconium, selective sulfidation of zirconium from zirconium-hafnium oxide occurs at a temperature in which liquid zirconium sulfide is produced (FIG. 6J). The liquid zirconium sulfide can be allowed to density separate from the hafnium oxide or be boiled away. FIG. 7E shows a Modified Process for zirconium and hafnium separation utilizing selective sulfidation.

As a case study for selective sulfidation, we propose the following operating conditions for selective sulfidation of zirconium oxide from a mixed zirconium-hafnium oxide (Table VIIe).

TABLE VIIe

Operating conditions for selective sulfidation of zirconium from hafnium.

| | |
|---|---|
| $P_{S_2}/P_{SO_2}$ (Reactor) | $10^5$ |
| $P_{CO}/P_{CO_2}$ (Reactor) | $10^{2.25}$ |
| $P_{S_2}/P_{Ar}$ (Feed) | 0.11 |
| mol-C/mol-$(Zr,Hf)O_2$ (Feed) | 1.5 |
| mass-C/mass-$(Zr,Hf)O_2$ (Feed) | 0.14 |
| Reactor Pressure, atm (Outlet) | 1 |
| Reactor Temperature, ° C. | 1600 |

TABLE VIIe-continued

Operating conditions for selective sulfidation of zirconium from hafnium.

| | |
|---|---|
| Effectiveness Factor | 0.2 |
| Reactor Gas Residence Time, s | 20 |

Figure 7F:
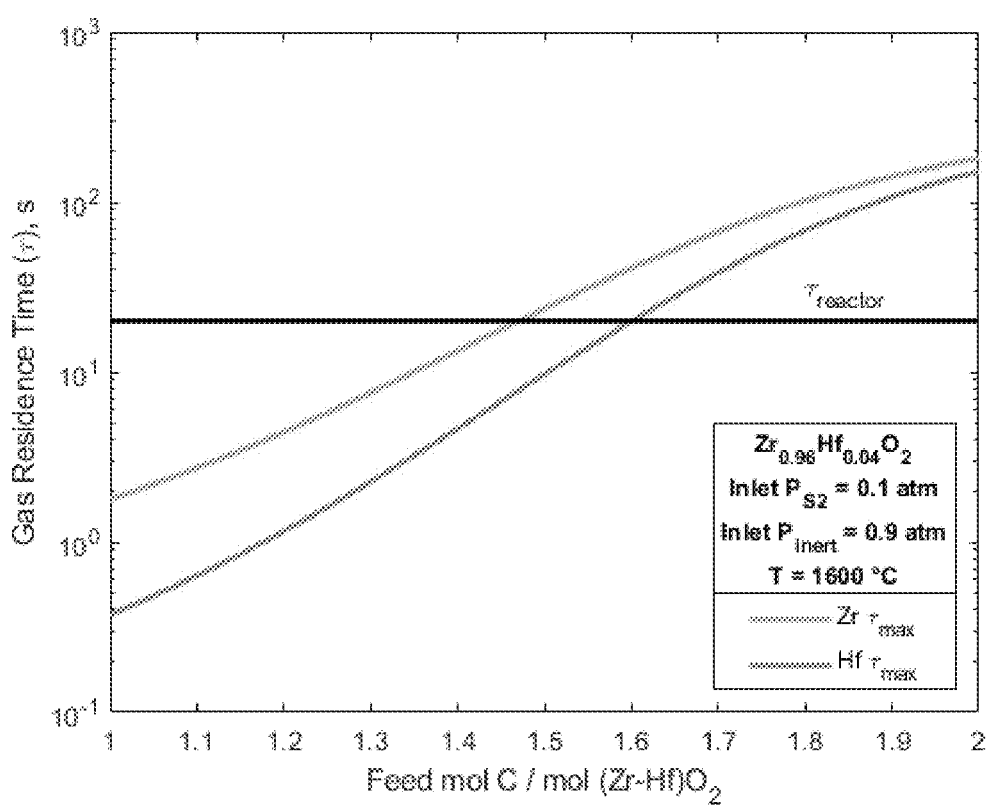
FIG. 7F shows a steady-state average residence time plot for the selective sulfidation of zirconium from a mixed zirconium and hafnium feed.

Utilizing these operating conditions, a residence time plot can be generated. FIG. 7F shows a steady-state average residence time plot for the selective sulfidation of zirconium from a mixed zirconium and hafnium feed. At these operating conditions with a solids feed of 1.5 moles of carbon to mole of oxide, zirconium sulfide will form, meanwhile hafnium will remain as an oxide due to insufficient gas flowrates in and out of the reactor. At these temperatures, zirconium sulfide will melt. Liquid zirconium sulfide can either be separated from hafnium oxide via density separation or due to vapor pressure. At a gas flowrate resulting in an average reactor residence time of 20 seconds, under these conditions zirconium will be sulfidized from zirconium oxide, meanwhile hafnium will remain an oxide due to presence of a thermodynamically-unfavorable level of sulfur dioxide within the reactor. The difference in chemistry between oxides and sulfides allows for far easier separation than that of a mixed zirconium or hafnium oxide or chloride or an aqueous stream containing both zirconium and hafnium ions. Due to the change in phase of the zirconium upon sulfidation, in the case of zirconium and hafnium separation selective sulfidation can also be used as the primary separation step. As liquid zirconium sulfide is formed during sulfidation, it will likely vaporize over the course of the reaction. In the gas mixture leaving the reactor, the zirconium sulfide vapor will condense downstream as a sulfide. The isolated zirconium sulfide can be processed as a pure, hafnium-free sulfide or calcined back into a pure, hafnium-free oxide. Selective sulfidation has the potential to provide significant cost savings in hafnium and zirconium separation due to the elimination of complicated and capital-intensive distillation or solvent separation processes.

VII-III. Selective Sulfidation of Mozanite Concentrate

One of the most difficult metal separations is that of the rare earth elements. In nature rare earth ores, and the resulting concentrates, contain a mixture of the lanthanides, scandium, yttrium, and actinides. With similar physical and chemical properties, separation of this cocktail of different metal compounds remains exceedingly challenging, requiring many different hydrometallurgical steps, resulting in very high costs. As shown in FIGS. 3D-3G, rare earth oxides exhibit very low separation factors, requiring many passes through a given separation circuit. Furthermore, since each element must be separated from all of the others, many different separation circuits exist, resulting in long residence times, requiring significant solvent handling infrastructure.

Starting from a cracking process such as hot acid, hot base, or carbochlorination, a rare earth concentrate is isolated. Current rare earth concentrate cracking processes are fail to show good selectivity for radioactive elements or individual rare earths; cracking primarily removes non-rare earth fluorites and calcites and phosphorous/halide anion impurities within the rare earth. Because radioactive actinides such as thorium are present in rare earth ores, they must be removed next, otherwise radioactive contamination will be carried throughout the entire hydrometallurgical processing chain. The removal and separation of thorium follows conventional hydrometallurgical methods involving solvent extraction. Subsequent solvent extraction is undertaken to step-wise separate the rare earths from one another.

TABLE VIIf

Composition of Mozanite(Ce) Ore

| Oxide | Concentration |
|---|---|
| $Ce_2O_3$ | 47% |
| $La_2O_3$ | 24% |
| $Nd_2O_3$ | 20% |
| $ThO_2$ | 9% |

One of the predominant light rare earth ores is mozanite, containing a mixture of cerium oxide, lanthanum oxide, neodymium oxide, and thorium oxide. In this case study, mozanite(Ce) is chosen, with Ce denoting that the most prevalent component is cerium. The chemistry of mozanite (Ce) is presented in Table VIIf. Selective Sulfidation has the ability to step-wise sulfidize the thorium, followed by the rare earth elements. After thorium is sulfidized, the difference between oxide and sulfide chemistry can be utilized remove the thorium prior to rare earth separation efforts. Methods to separate the sulfide from the oxide are discussed in Section IX. Subsequent stepwise sulfidation and sulfide removal from the other oxides can be performed through the rare earth sulfidation series, presented in a sulfur to sulfur dioxide ratio framework in FIGS. 5C and 5E.

As a case study for selective sulfidation, we propose the following operating conditions for stepwise sulfidation of a mozanite(Ce) ore containing a mixture of cerium oxide, lanthanum oxide, neodymium oxide, and thorium oxide (Table VIIg).

TABLE VIIg

Operating Conditions for Selective Sulfidation of Mozanite(Ce)

| | ThO2 | $La_2O_3$ | $Nd_2O_3$ | $Ce_2O_3$ |
|---|---|---|---|---|
| $P_{S_2}/P_{SO_2}$ (Reactor) | $10^8$ | $10^{11}$ | $10^{12}$ | $10^{13}$ |
| $P_{CO}/P_{CO_2}$ (Reactor) | $10^3$ | $10^{4.3}$ | $10^{4.5}$ | $10^5$ |
| $P_{S_2}/P_{Ar}$ (Feed) | 0.33 | 0.33 | 0.33 | 0.33 |
| mol-C/mol-(Zr,Hf)$O_2$ (Feed) | 2 | 3.3 | 3.6 | 4 |
| mass-C/mass-oxide (Feed) | 0.07 | 0.12 | 0.13 | 0.15 |
| Reactor Pressure, atm (Outlet) | 1 | 1 | 1 | 1 |
| Reactor Temperature, ° C. | 1200 | 1200 | 1200 | 1200 |
| Effectiveness Factor | 0.2 | 0.2 | 0.2 | 0.2 |
| Reactor Gas Residence Time, s | 20 | 20 | 20 | 20 |

Figure 7G:
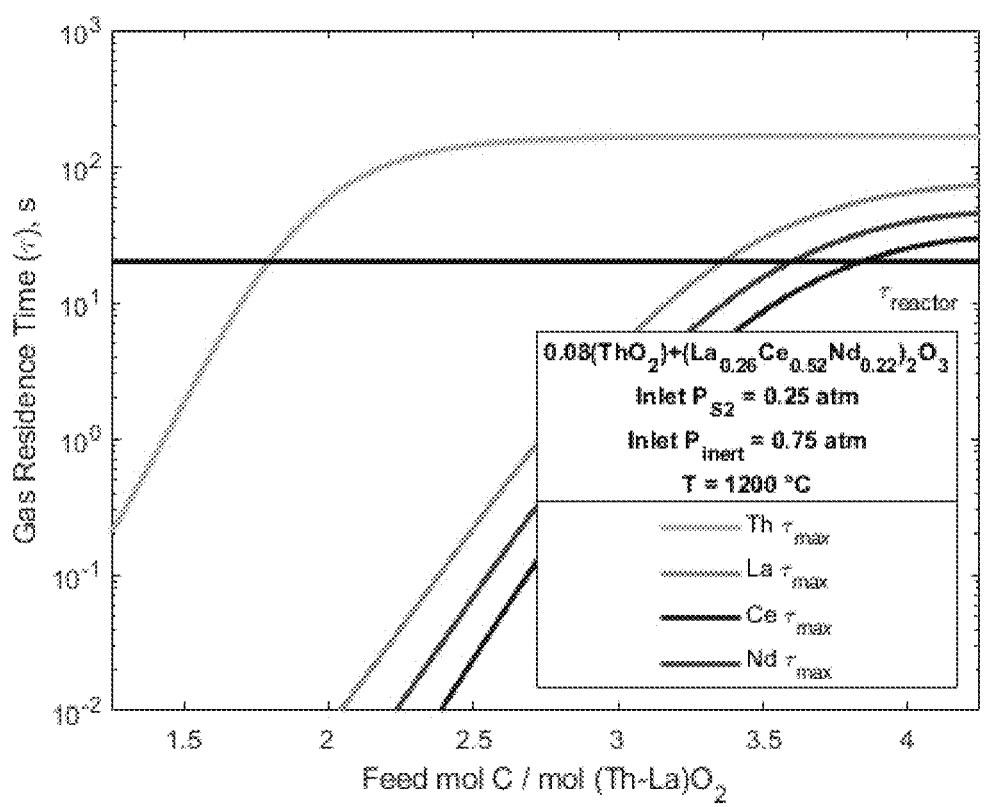
FIG. 7G shows a steady-state average residence time plot for the stepwise selective sulfidation of components of dephosphorized mozanite(Ce) concentrate.

Utilizing these operating conditions, a residence time plot can be generated. FIG. 7G shows a steady-state average residence time plot for the stepwise selective sulfidation of components of dephosphorized mozanite(Ce) concentrate. By varying the amount of carbon, an oxide can be selectively sulfidized while others will remain as oxides due to insufficient gas flowrates in and out of the reactor. At a gas flowrate resulting in an average reactor residence time of 20 seconds, under these conditions with varying amounts of carbon mozanite(Ce) component oxides can be selectively sulfidized with varying amounts of carbon. Metal oxides higher on the sulfidation series remain as oxides due to presence of a thermodynamically-unfavorable level of sulfur dioxide within the reactor. The difference in chemistry between oxides and sulfides allows for far easier separation than that of a rare earth oxide or chloride or an aqueous stream containing a mixture of rare earth ions. Thus, with stepwise selective sulfidation, radioactive elements can be selectively recovered, followed by rare earths, in the concentrate-cracking portion of the process, placing less of a burden on intensive hydrometallurgical methods. Selective sulfidation has the potential to provide significant cost savings in rare earth separation due to the less reliance on complicated and capital-intensive solvent separation processes.

VIII. Demonstration of Selective Sulfidation of a Mixed Rare Earth Oxide

To demonstrate the feasibility of selective sulfidation, a mixed rare earth oxide was chosen, with the intent of selectively sulfidizing a single rare earth from the mixture. For this purpose, a mixture of lanthanum oxide, neodymium oxide, and praseodymium oxide was chosen. Two versions of the experiment were performed utilizing as close to identical conditions as possible: one in which sulfidation was attempted in the absence of carbon, and one in which carbon powder was added to the mixed rare earth oxide feedstock. The sulfidation product was compared between the two experiments.

VIII-I. Experimental Design

For the sulfidation of a mixed rare earth oxide, a 3 gram oxide charge consisting of 1 gram of lanthanum oxide ($La_2O_3$), 1 gram of neodymium oxide ($Nd_2O_3$), and 1 gram of praseodymium oxide ($Pr_6O_{11}$) was used as the starting material. Two versions of the experiment were performed: one in which no carbon was added, and one in which a 2:1 mole ratio of carbon to rare earth oxide was utilized (corresponding to a 1:15 mass ratio of carbon to rare earth oxide). In the experiment with carbon, the carbon was ground to a fine powder and mixed in with the rare earth oxides.

The same apparatus and setup as for pure lanthanum oxide sulfidation was employed (FIG. 4A and FIG. 4B), with a key change. Since the amount of carbon in the system was of key concern, the crucible holding the oxide charge was instead made out of alumina instead of graphite. This ensured that the only source of carbon in the system was the carbon powder mixed in with the rare earth oxide. The two versions of the experiment were completed in as identical of way as possible, including temperature, crucible shape, sulfur feed rate, and inert gas flow.

VIII-II. Selective Sulfidation Results and Effectiveness

Figure 8:
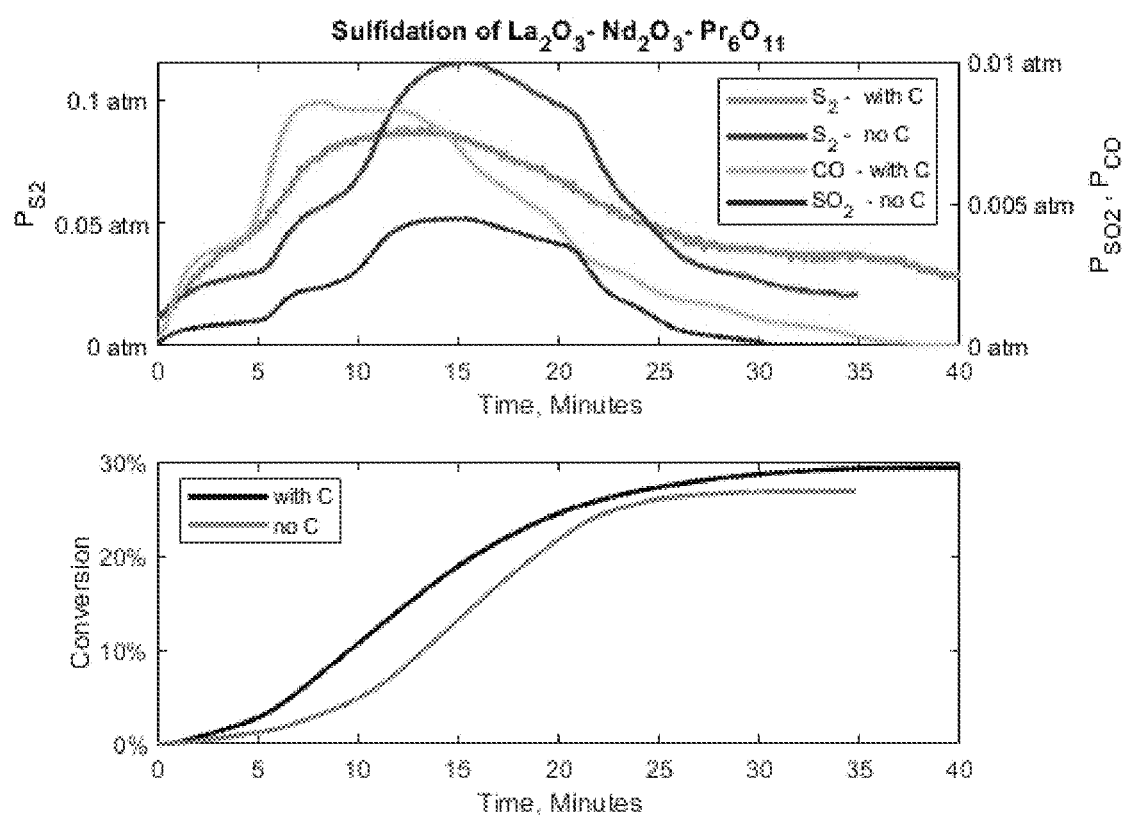
FIG. 8 shows a comparison of gas signals and conversion between mixed rare earth oxide sulfidation with and without added carbon.
Figure 9A:
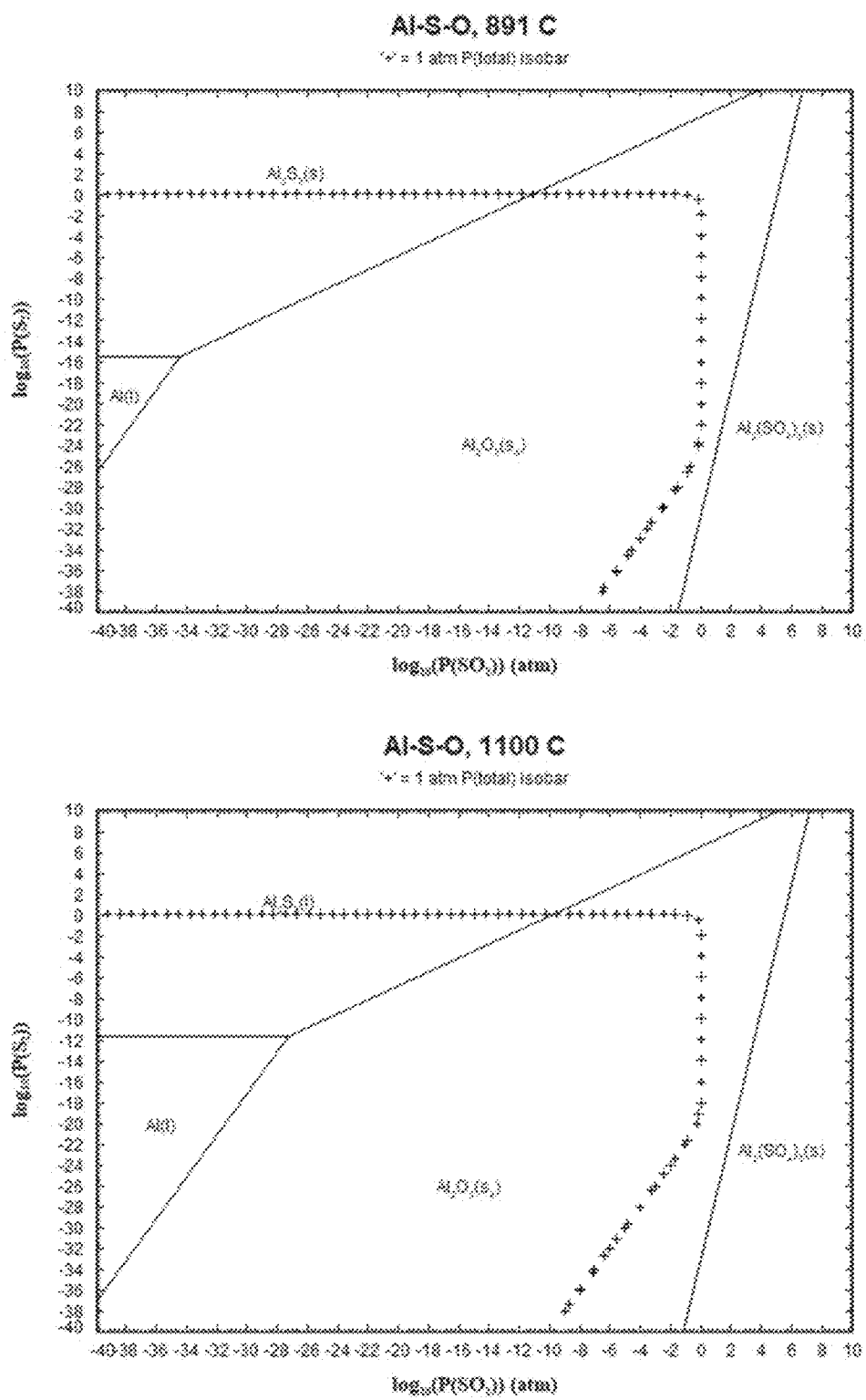
FIGS. 9A-9Z and 10A-10Y show sensitivity plots for sulfidation gas ratios in the absence of carbon.
Figure 9B:
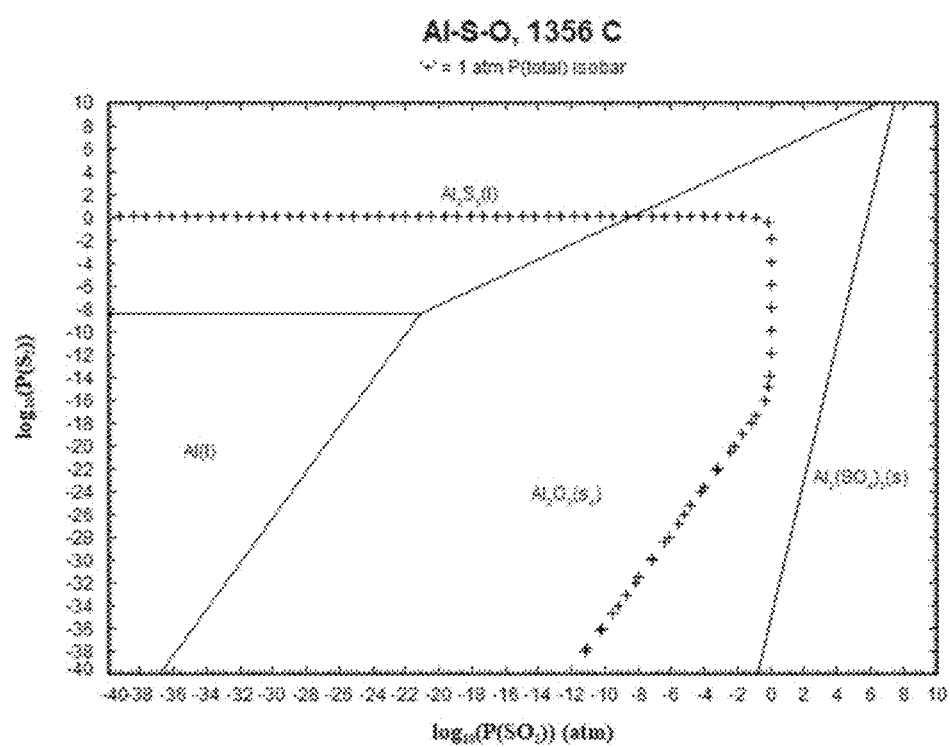
Figure 9C:
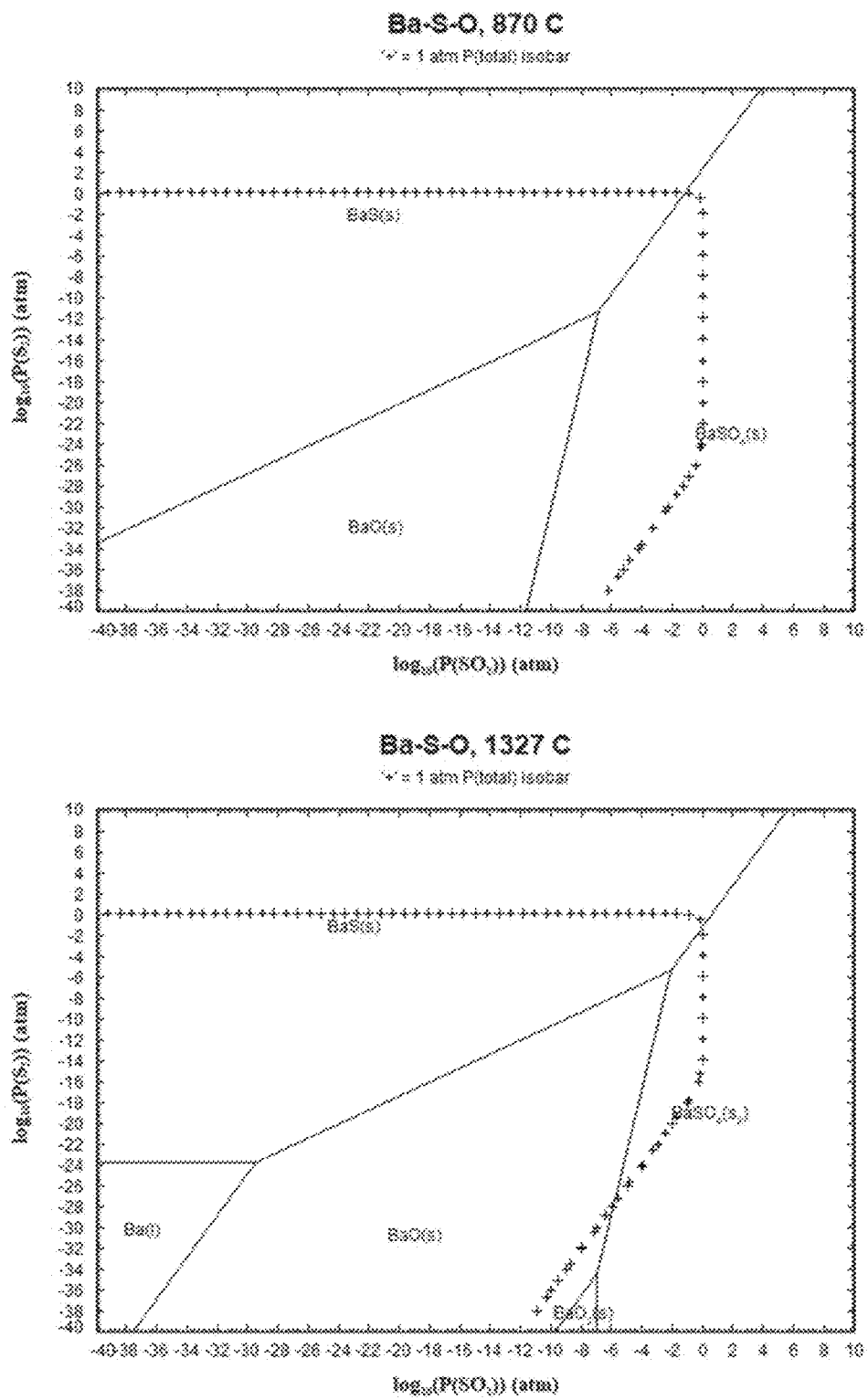
Figure 9D:
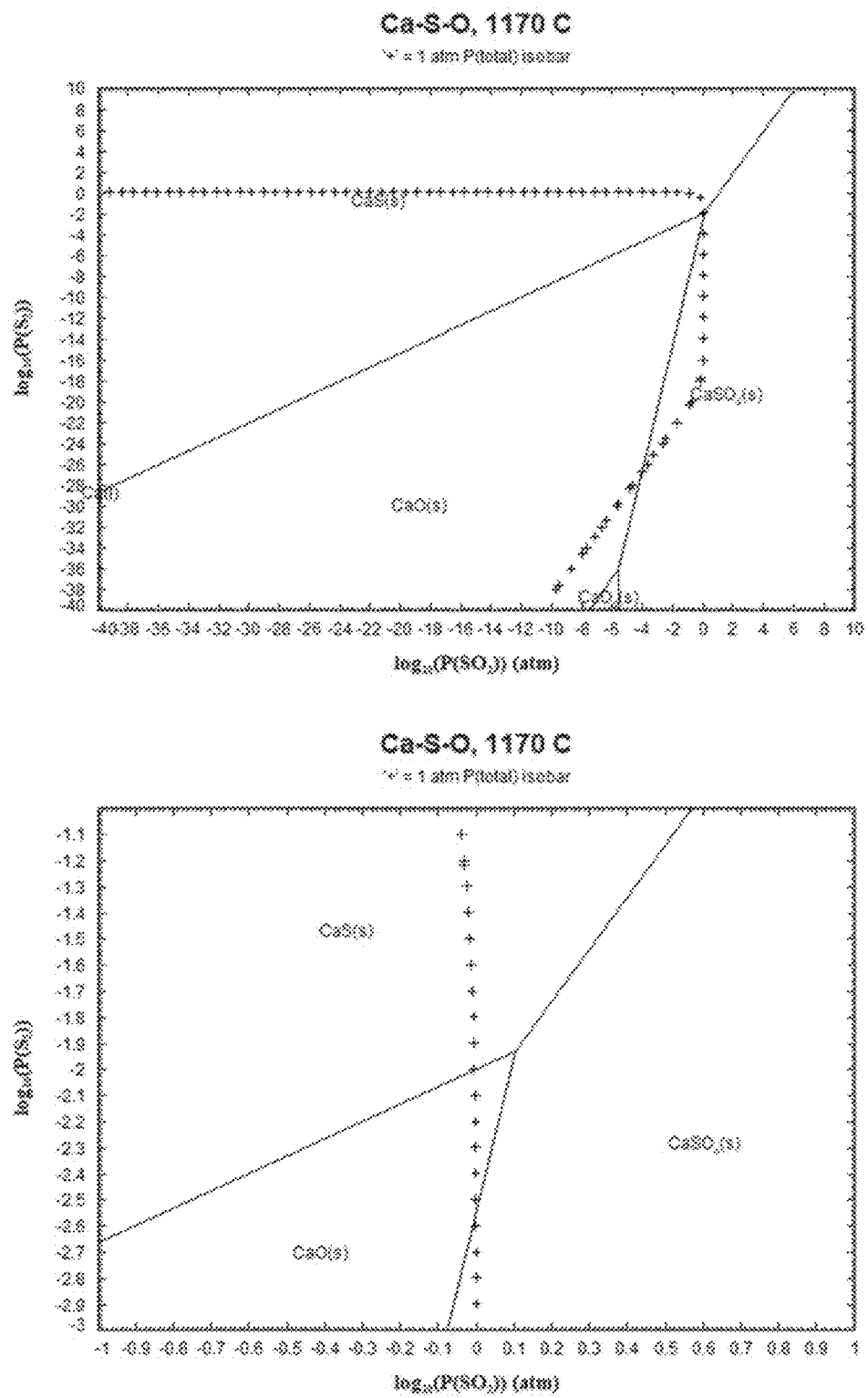
Figure 9E:
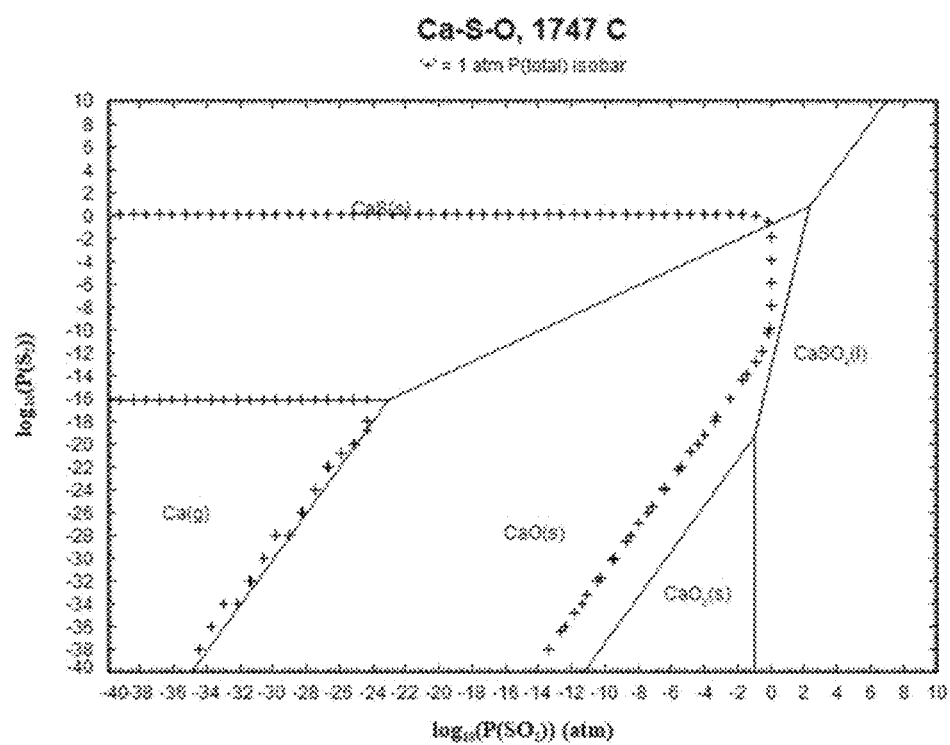
Figure 9F:
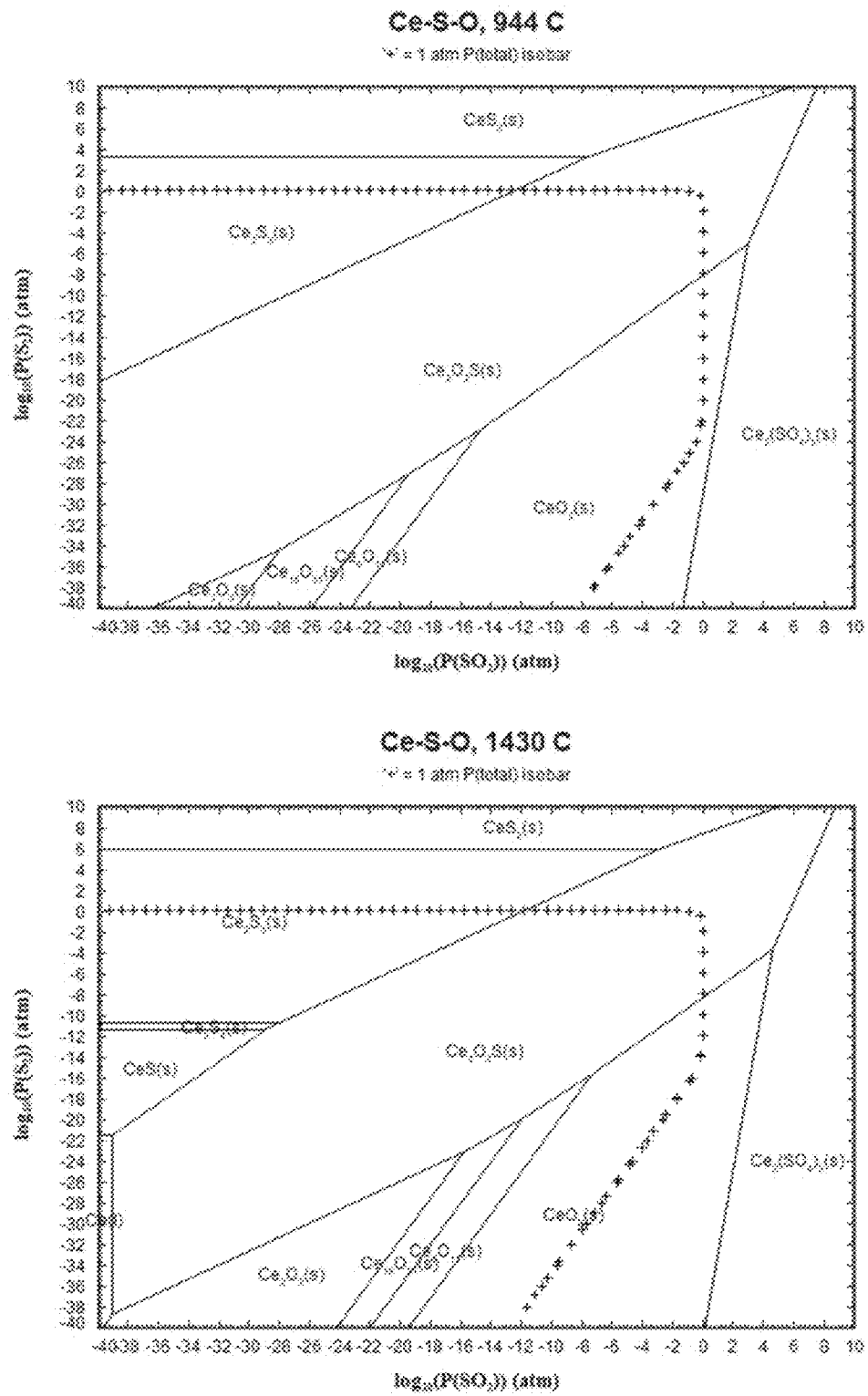
Figure 9G:
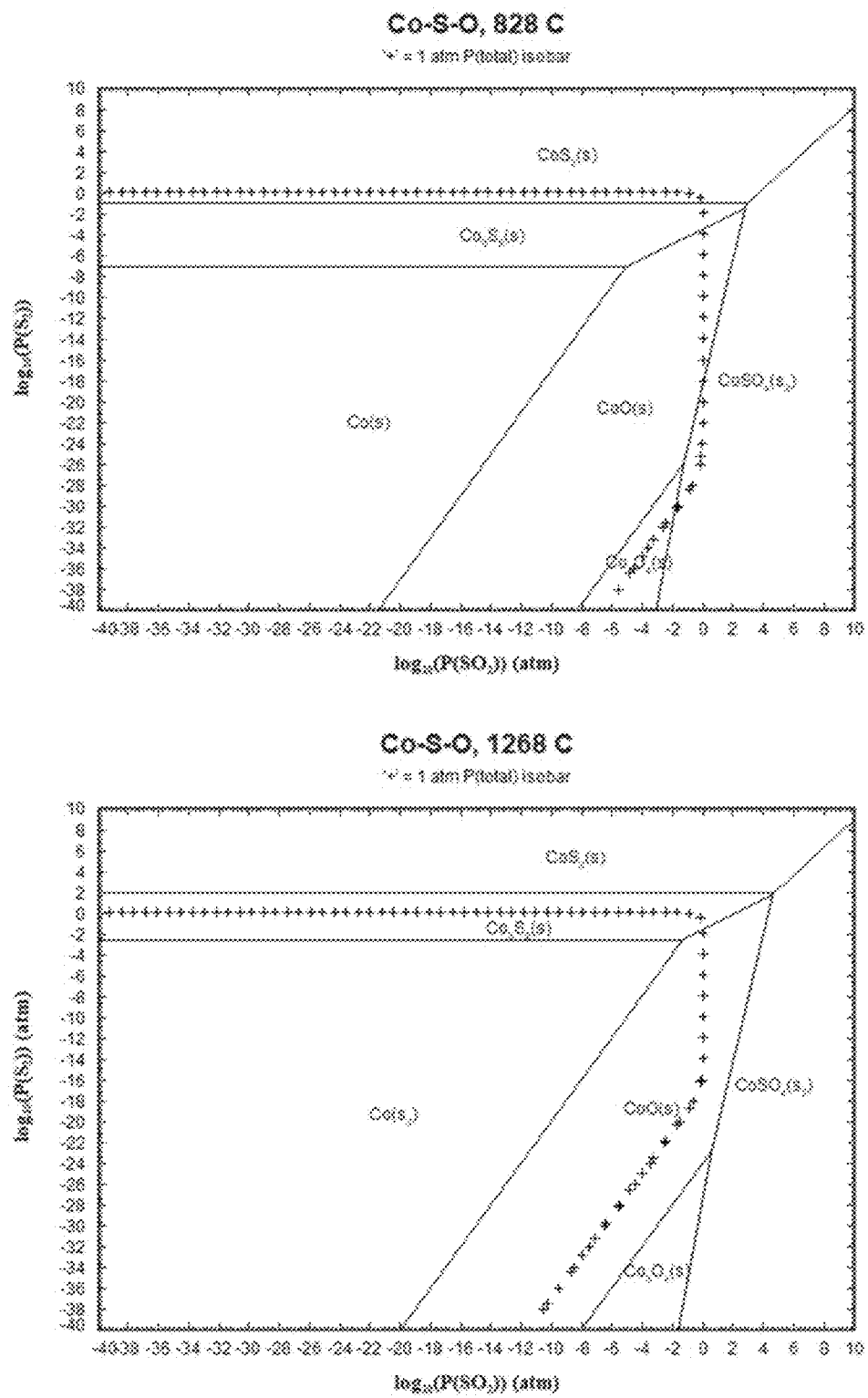
Figure 9H:
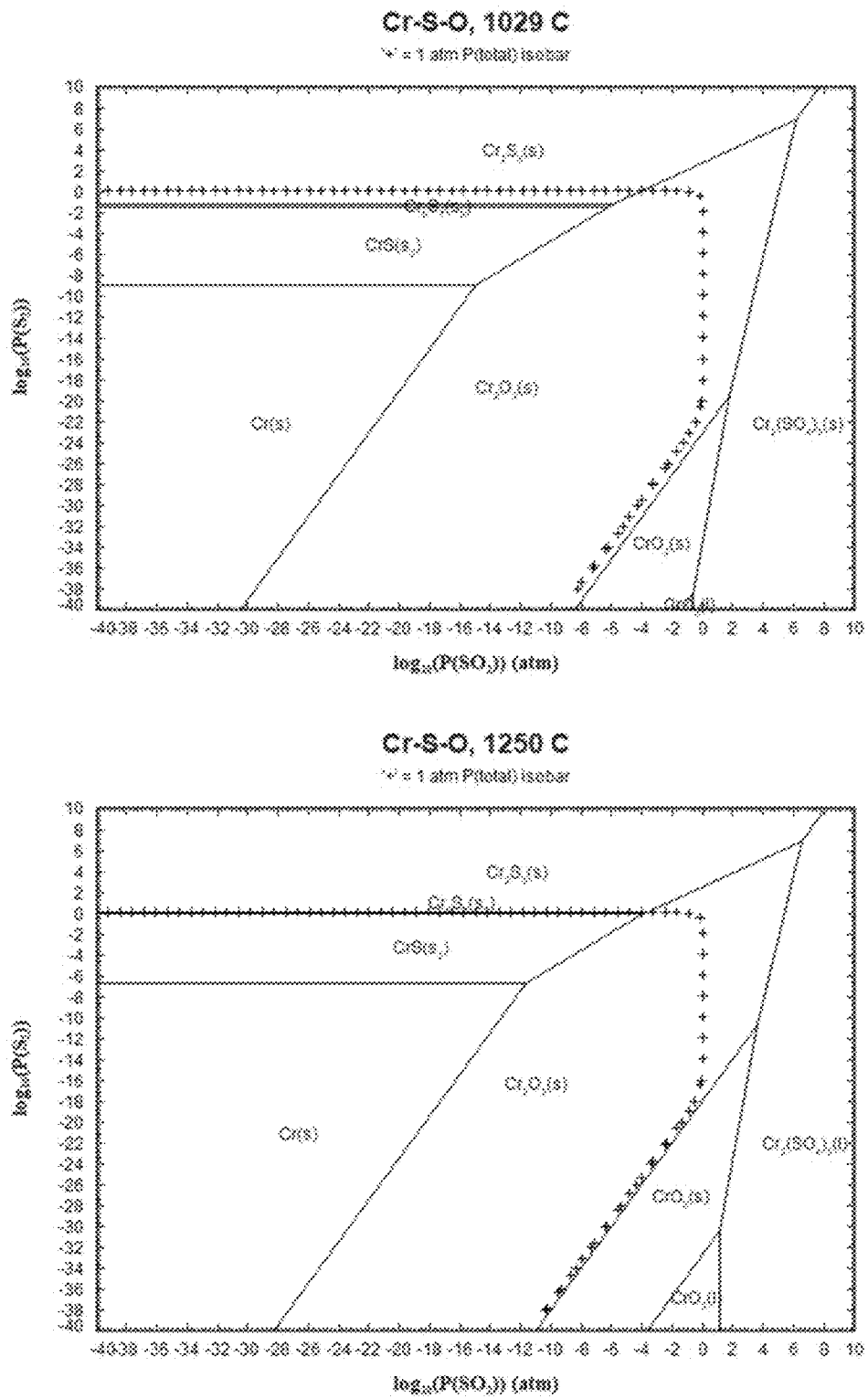
Figure 9I:
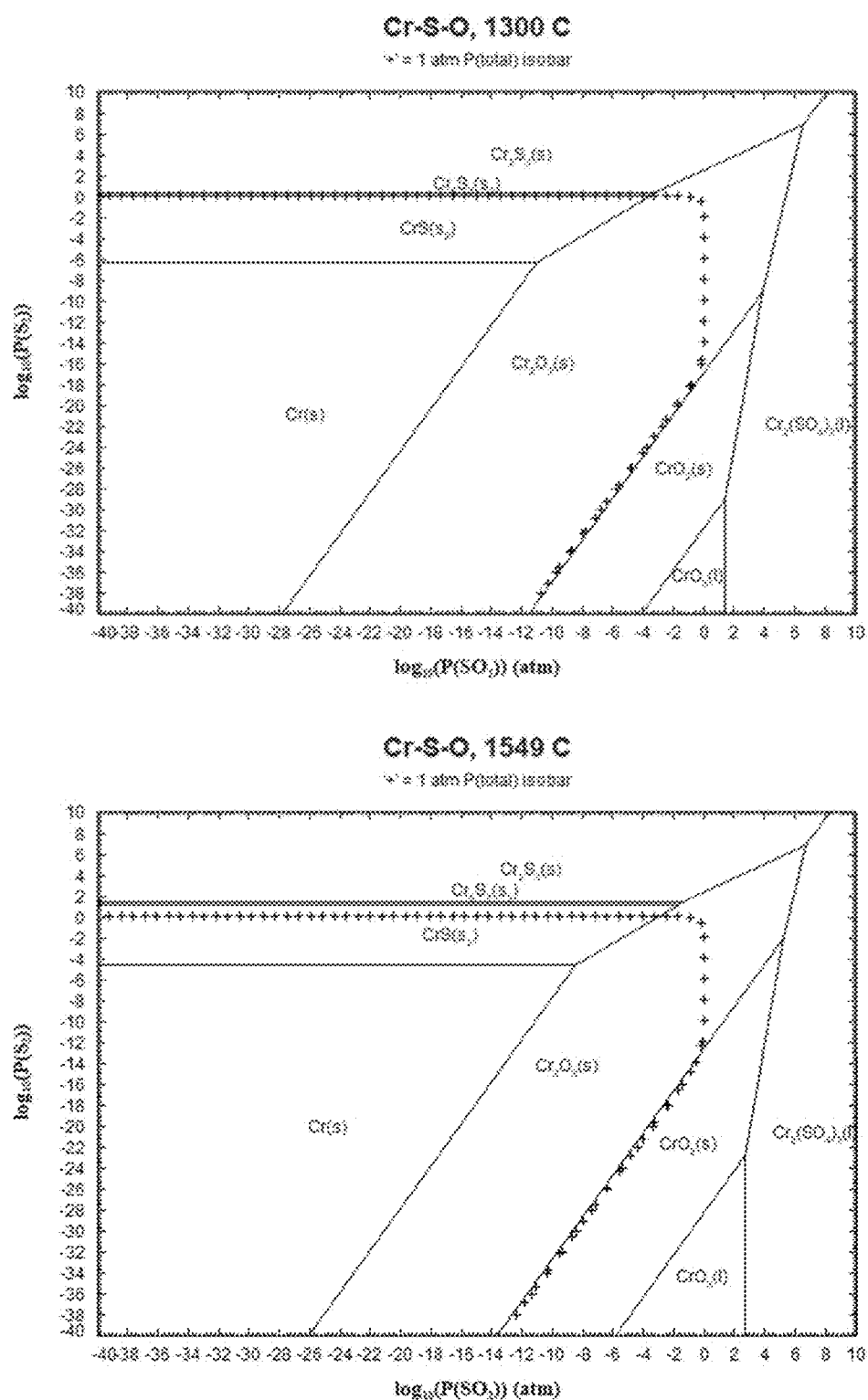
Figure 9J:
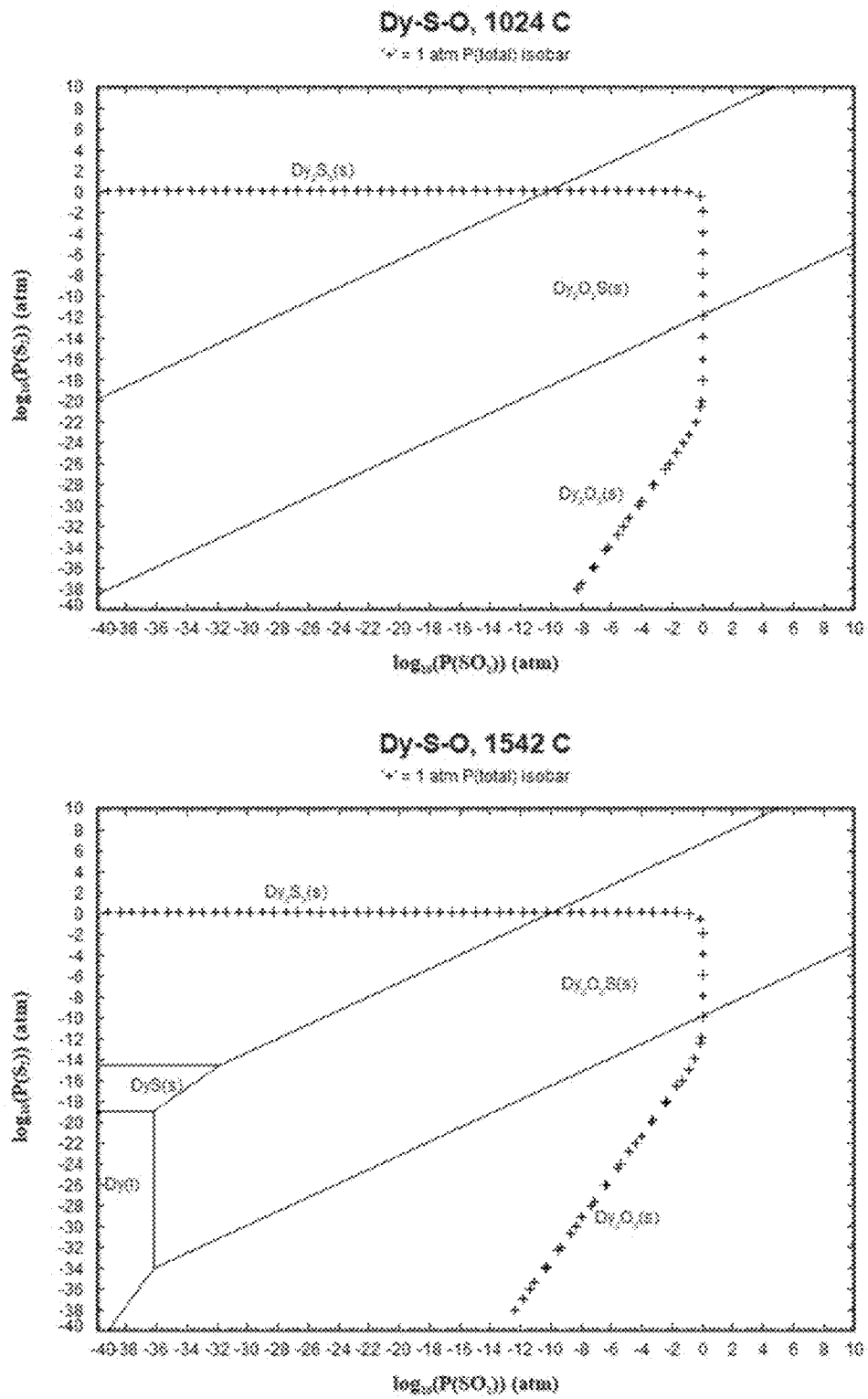
Figure 9K:
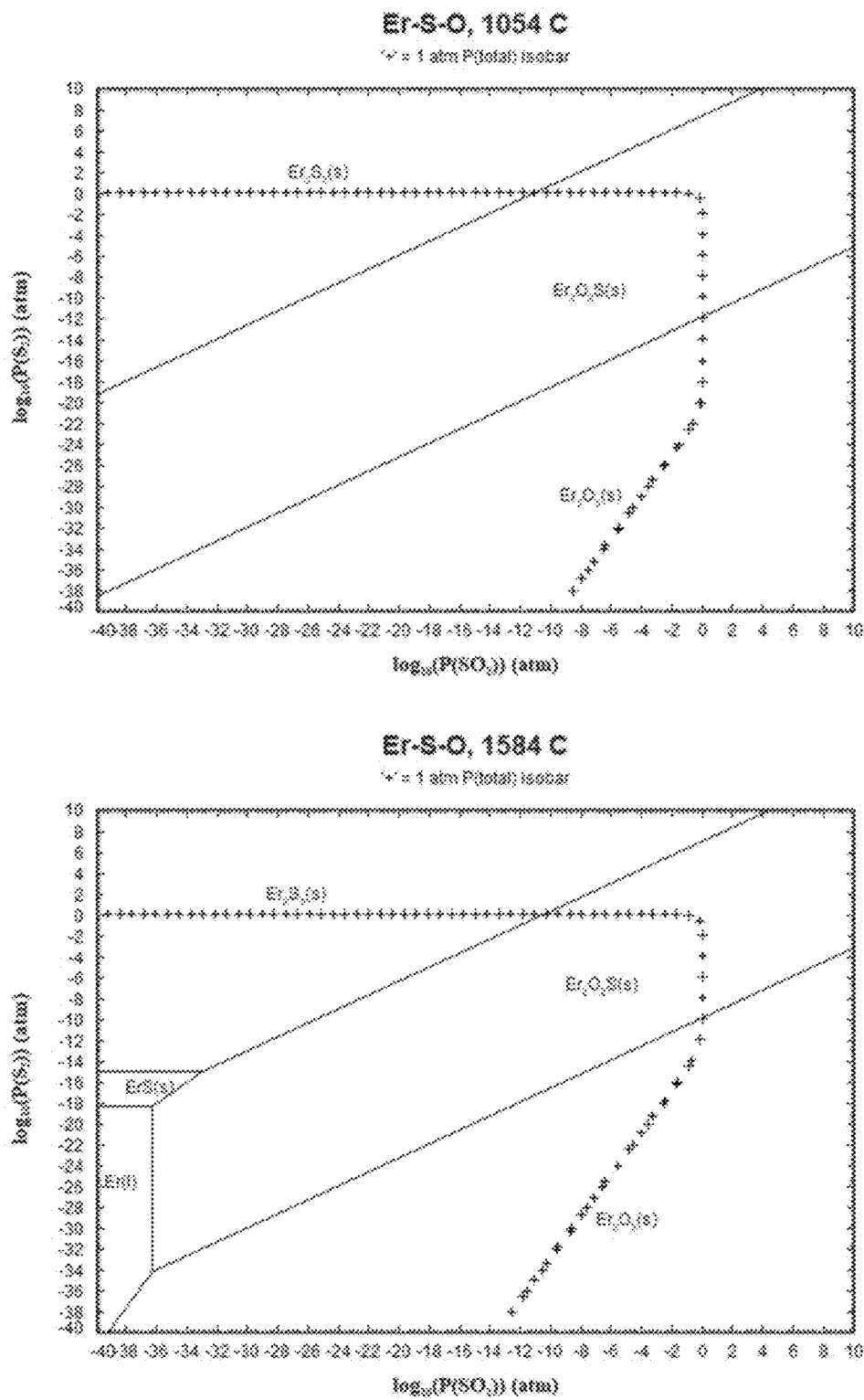
Figure 9L:
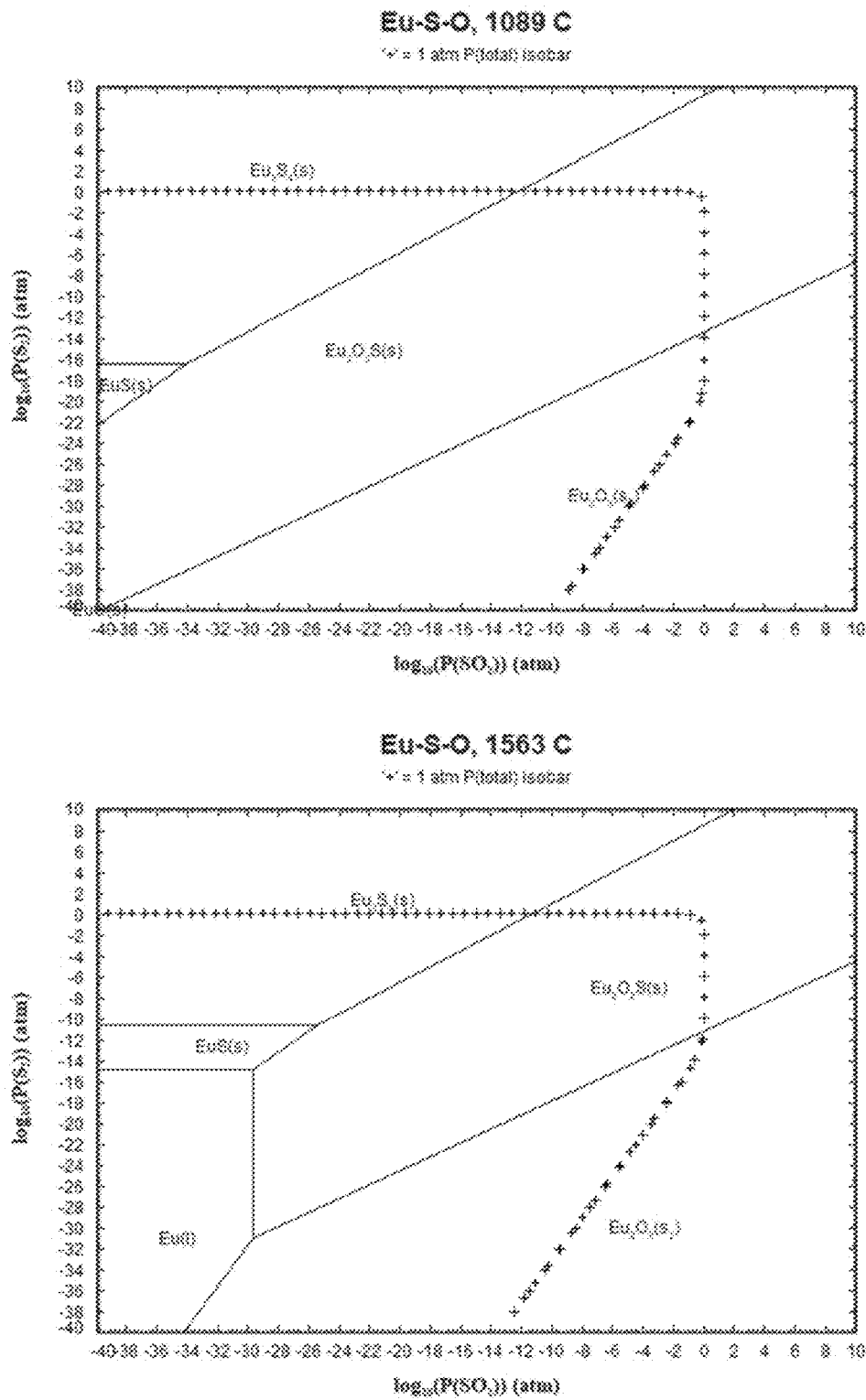
Figure 9M:
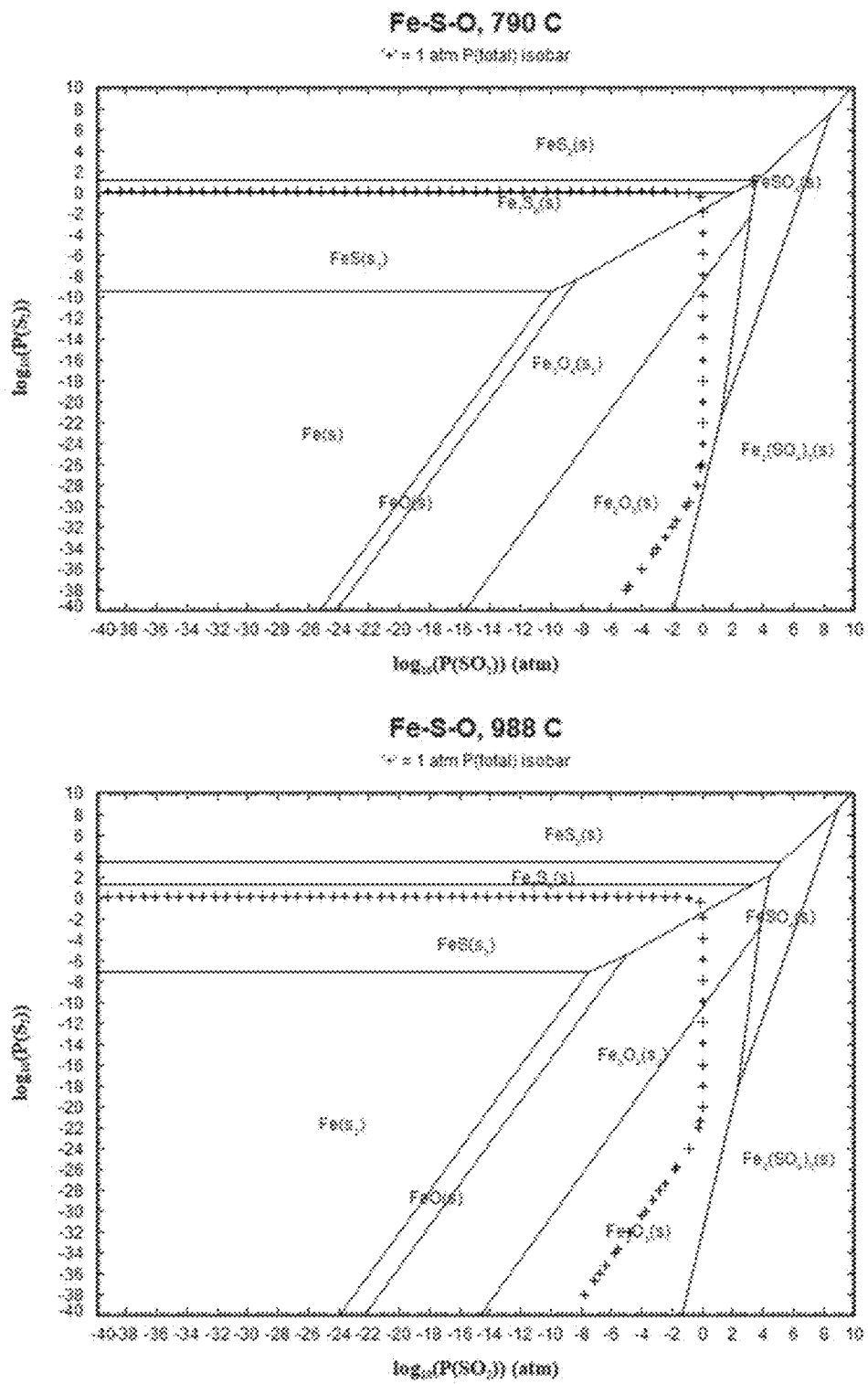
Figure 9N:
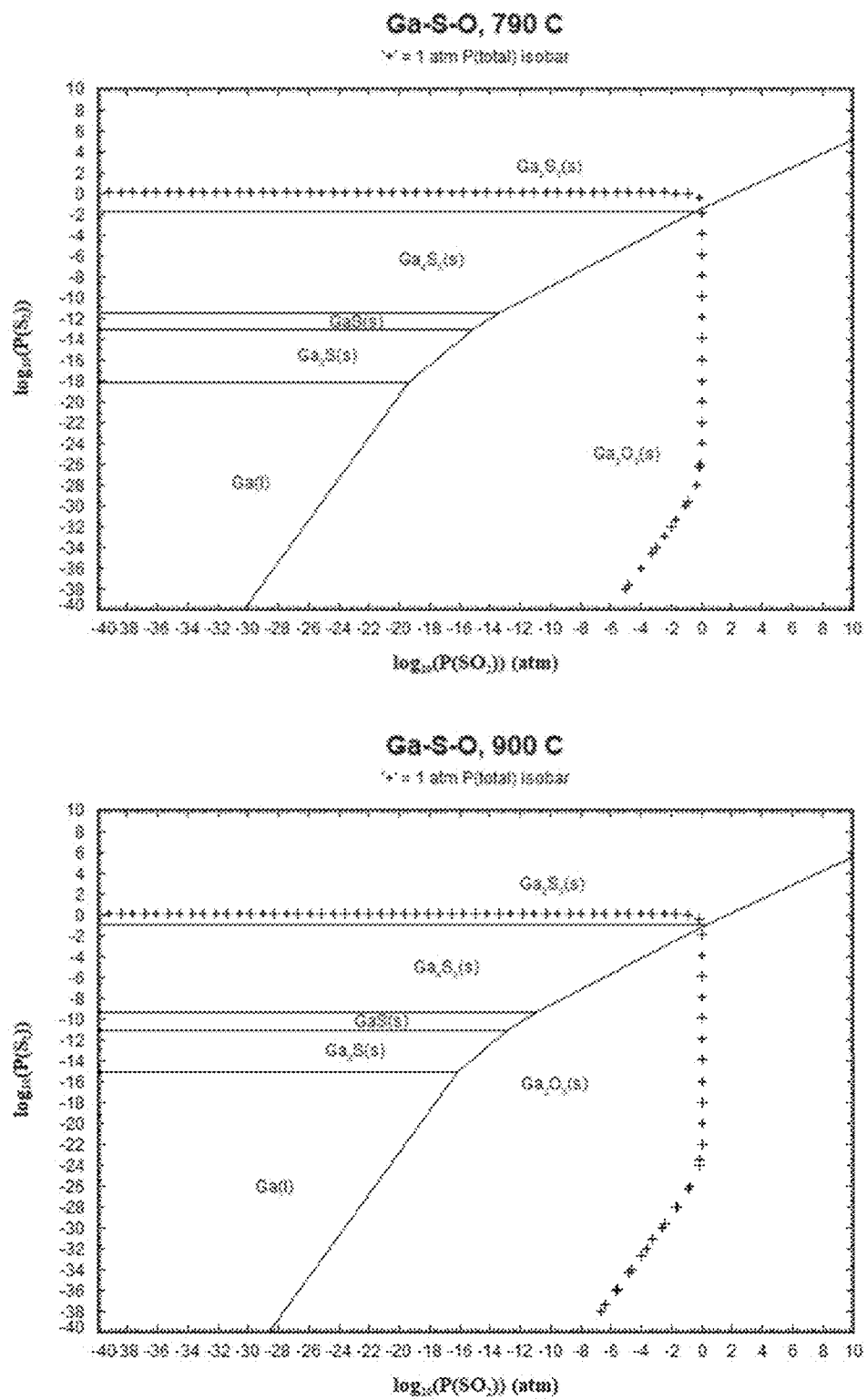
Figure 9O:
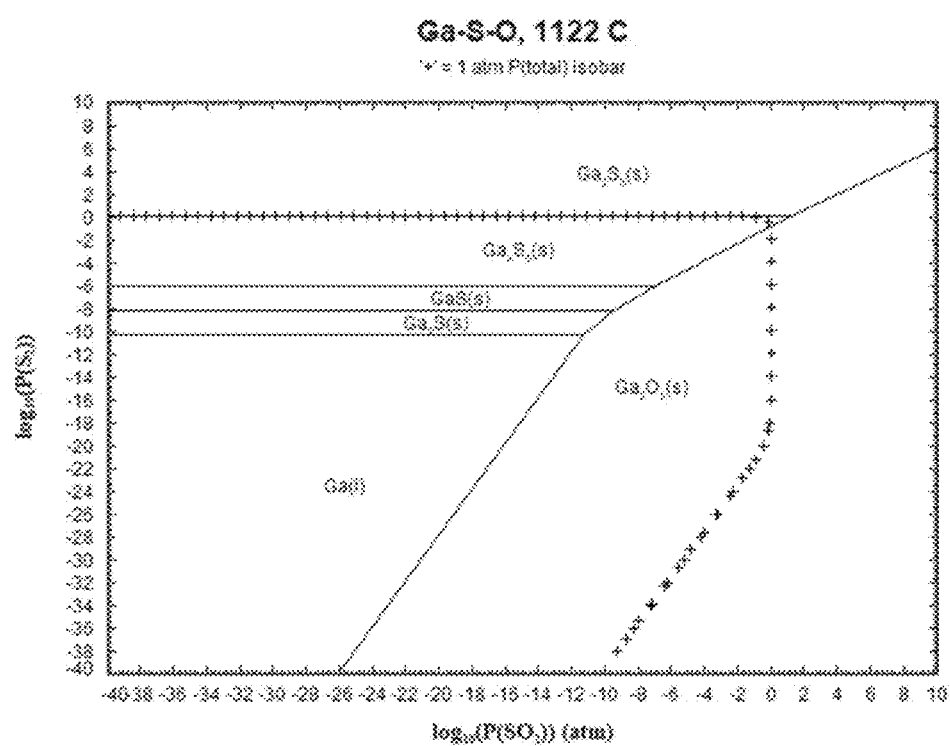
Figure 9P:
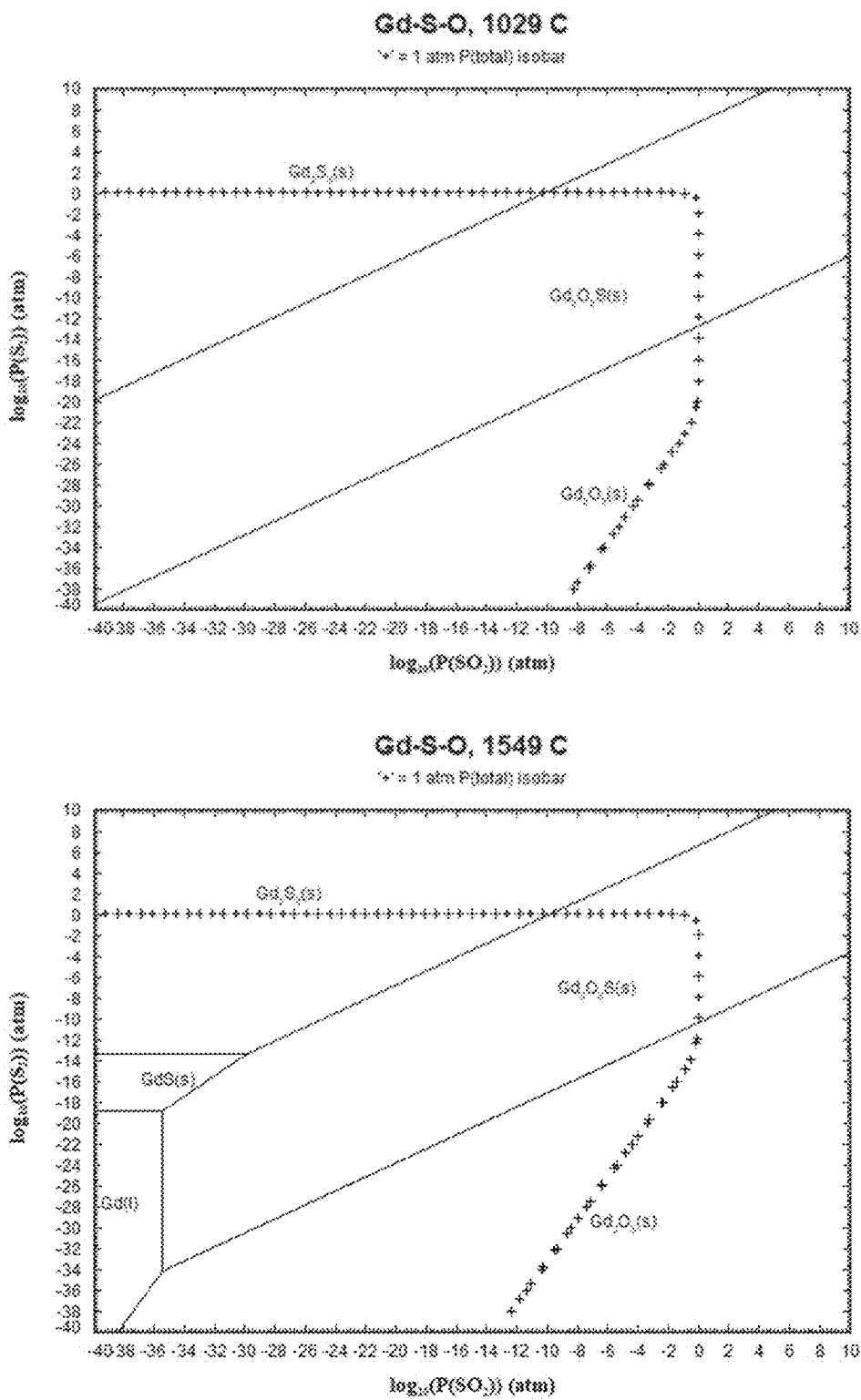
Figure 9Q:
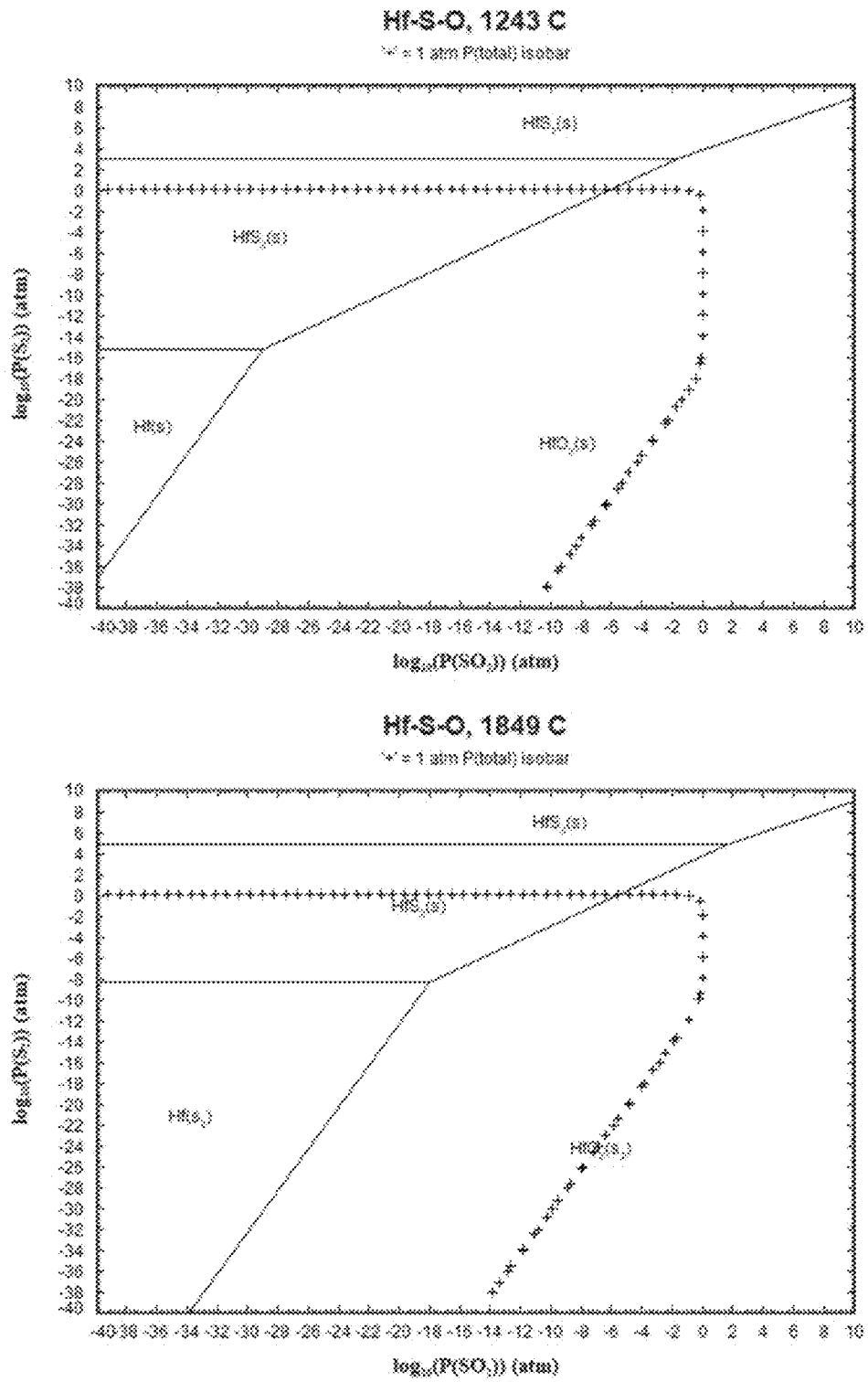
Figure 9R:
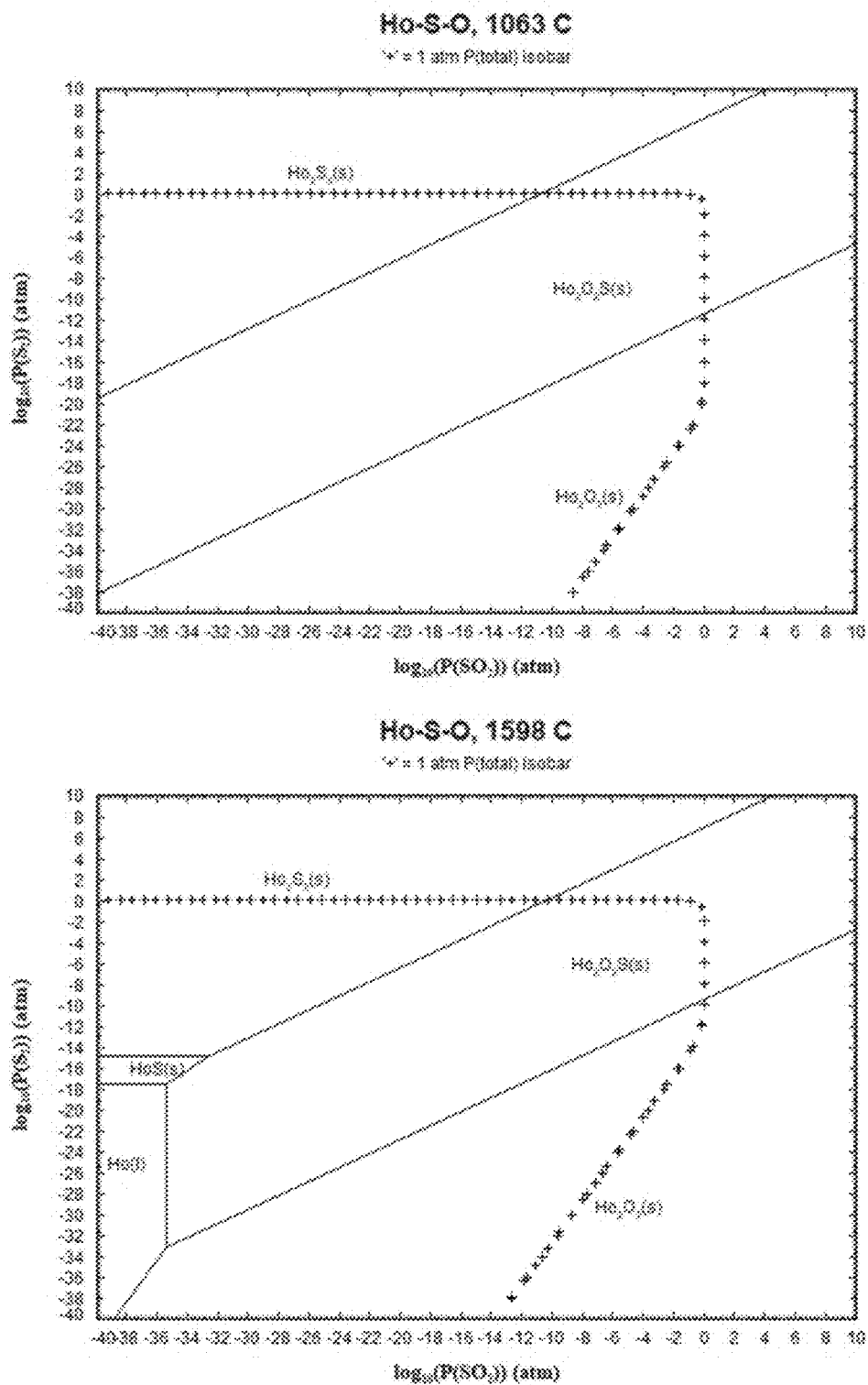
Figure 9S:
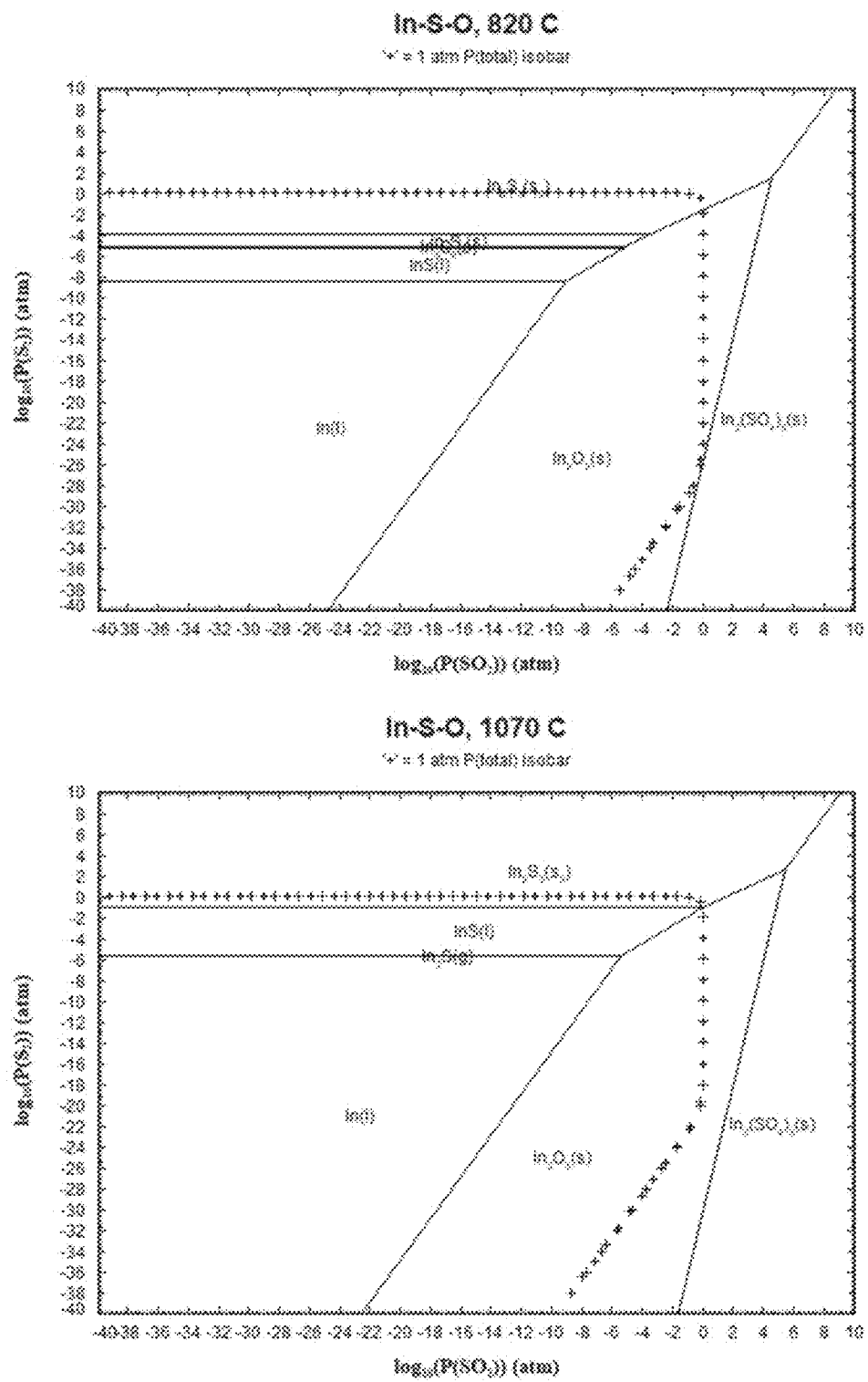
Figure 9T:
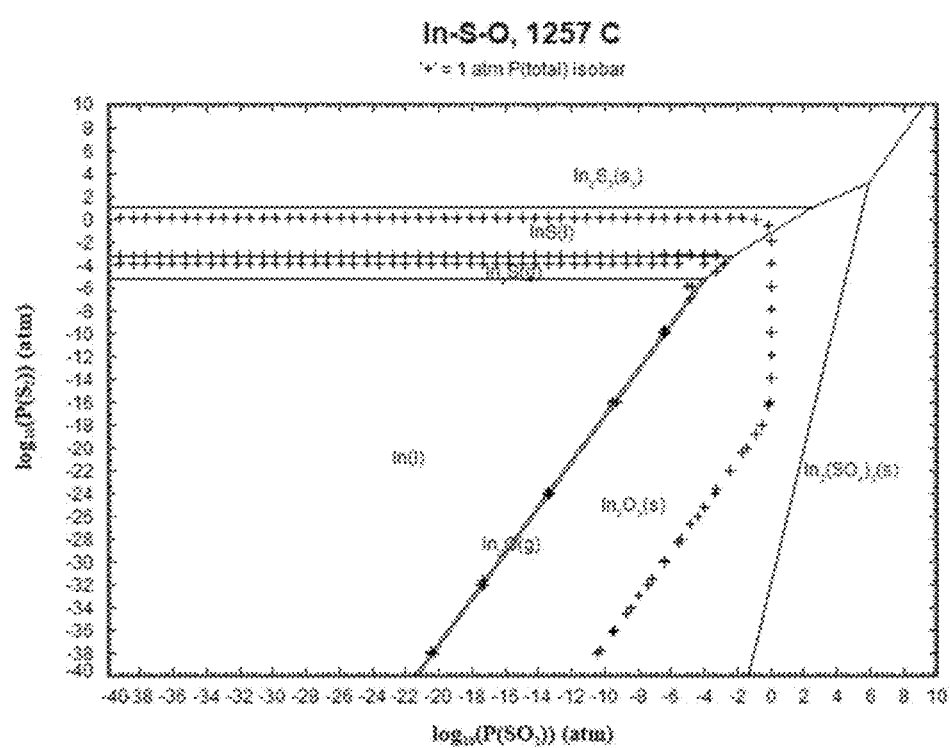
Figure 9U:
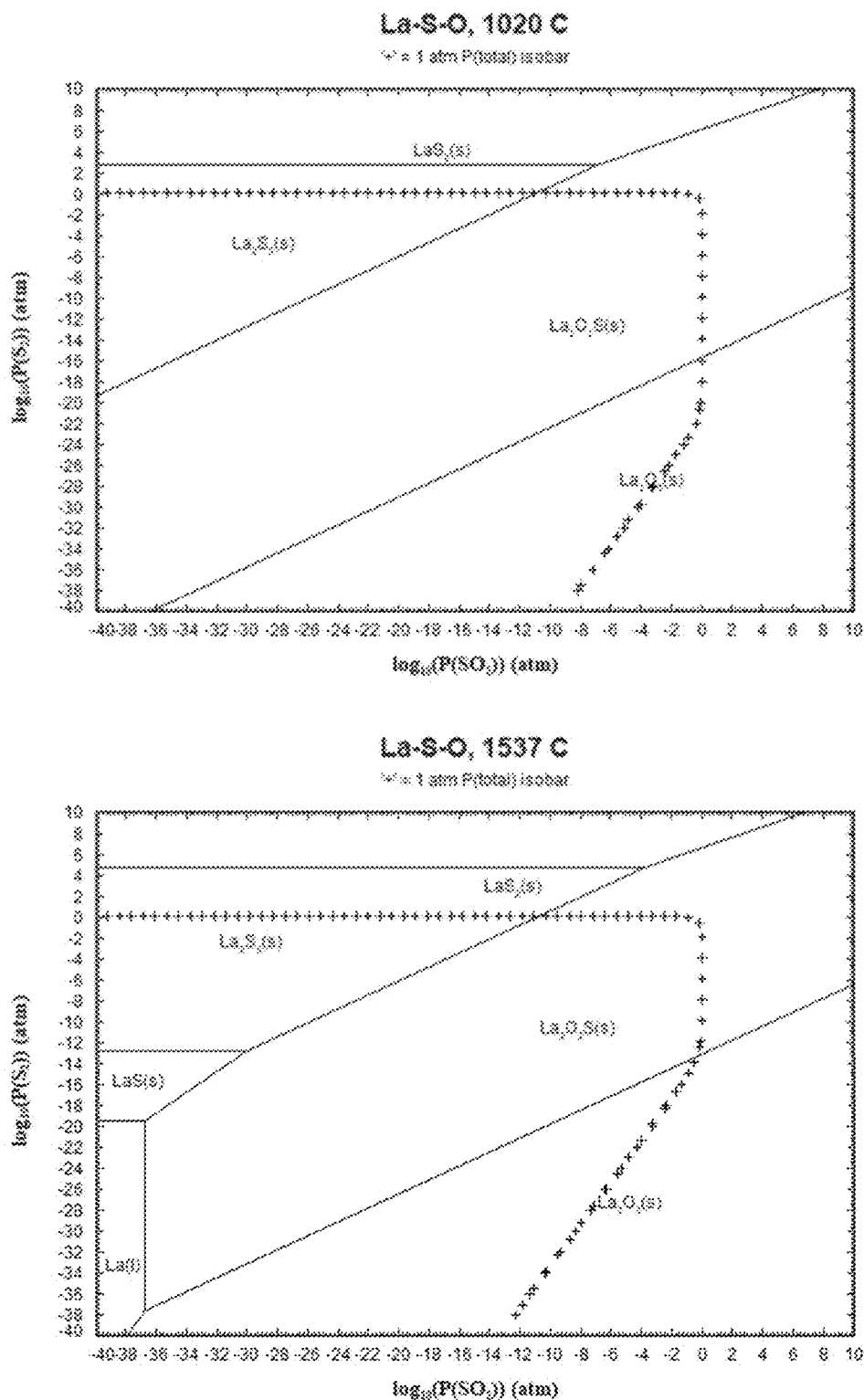
Figure 9V:
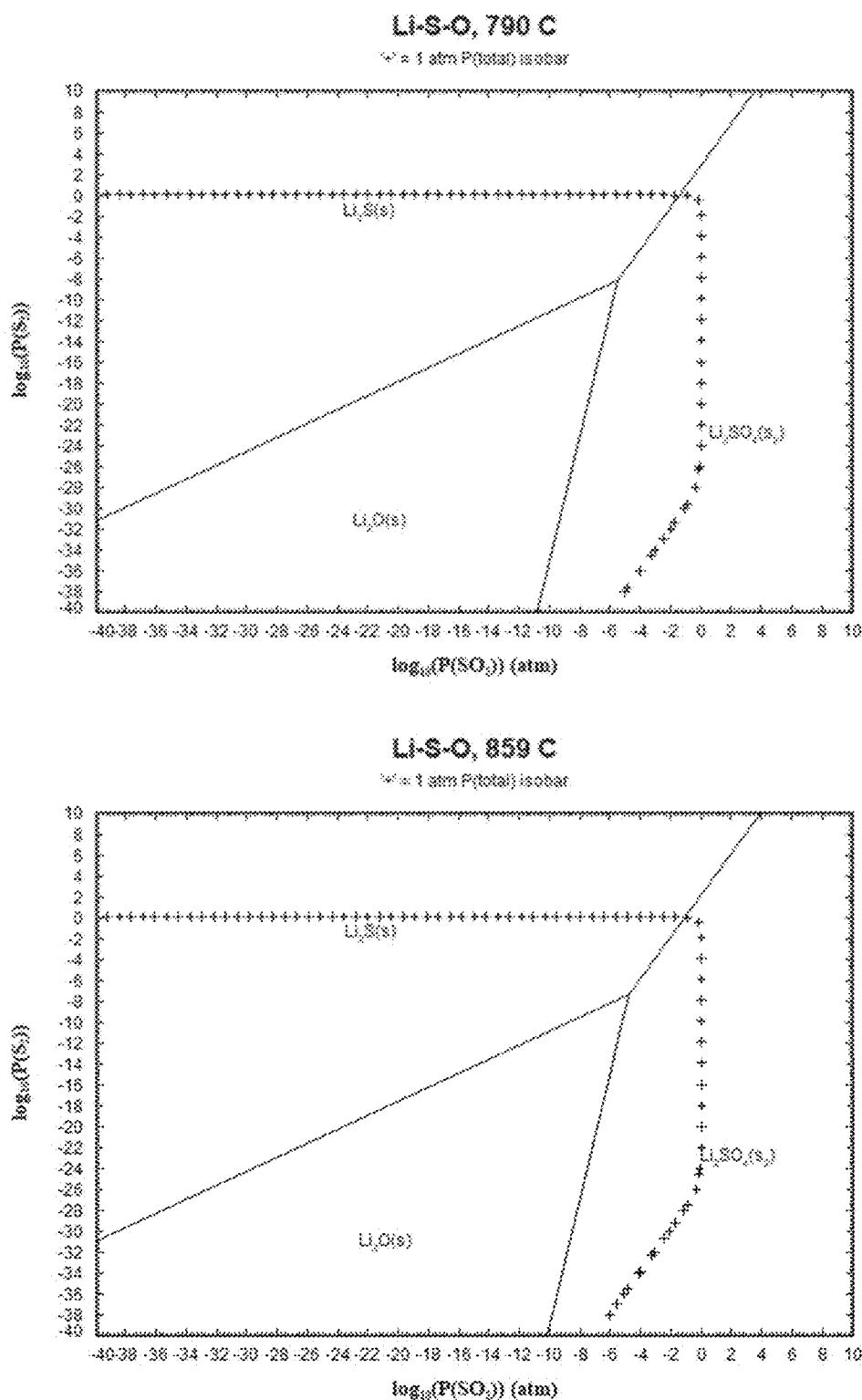
Figure 9W:
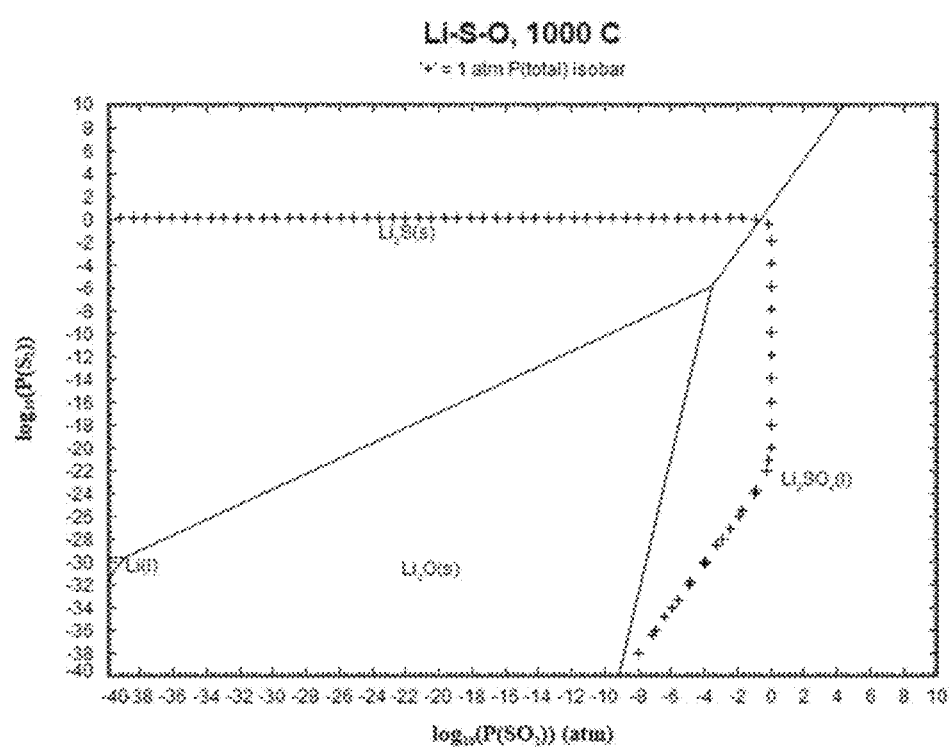
Figure 9X:
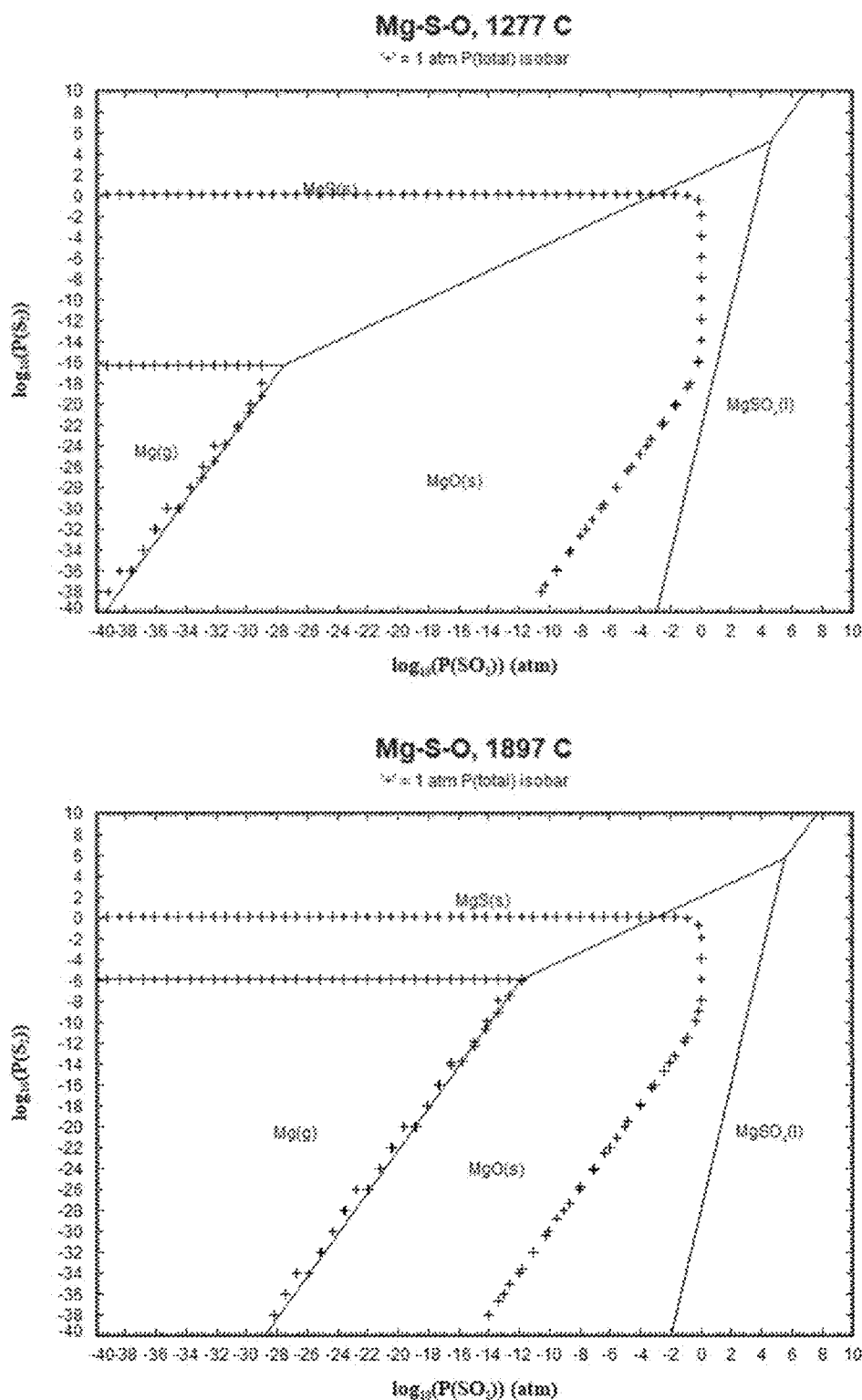
Figure 9Y:
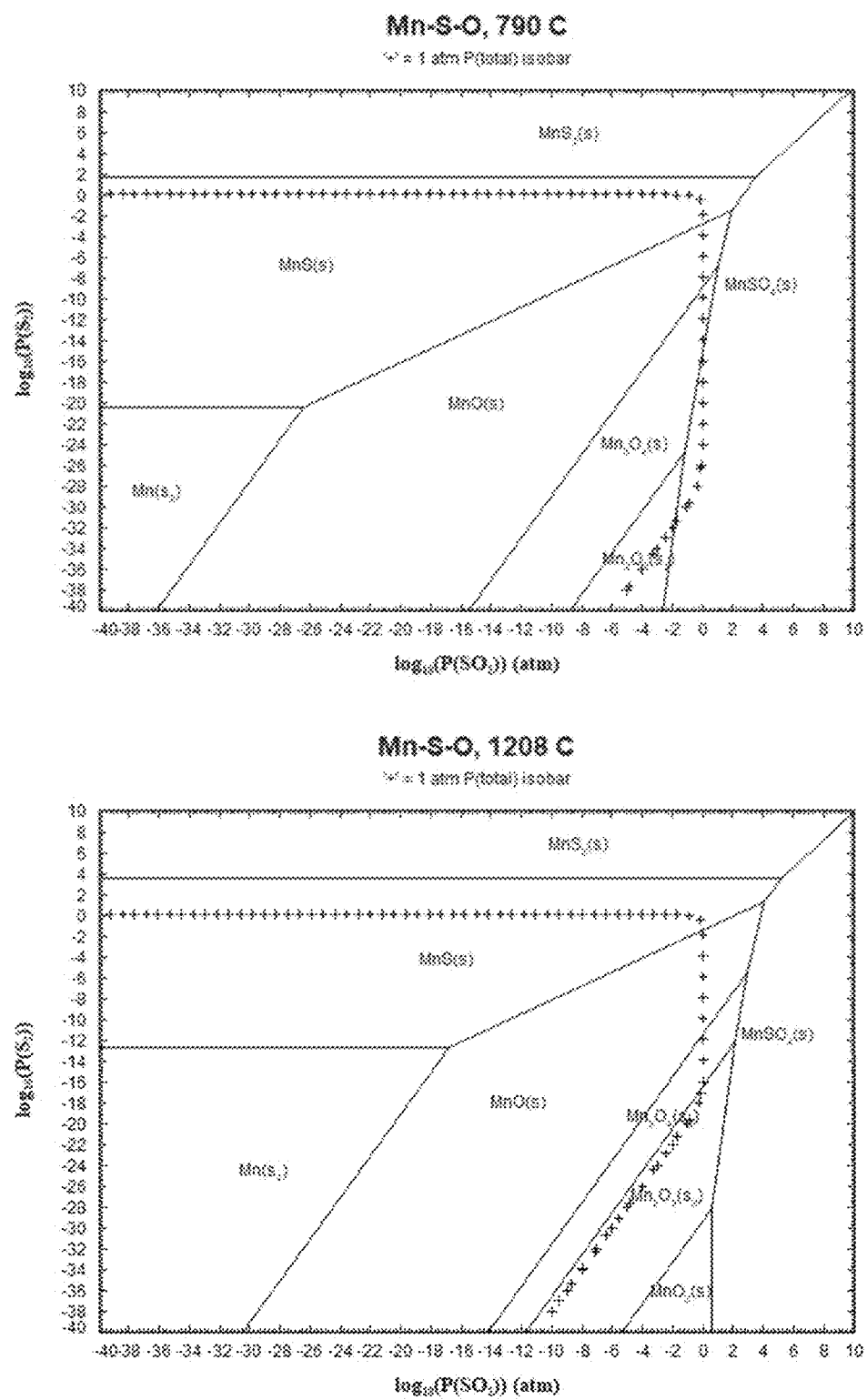
Figure 9Z:
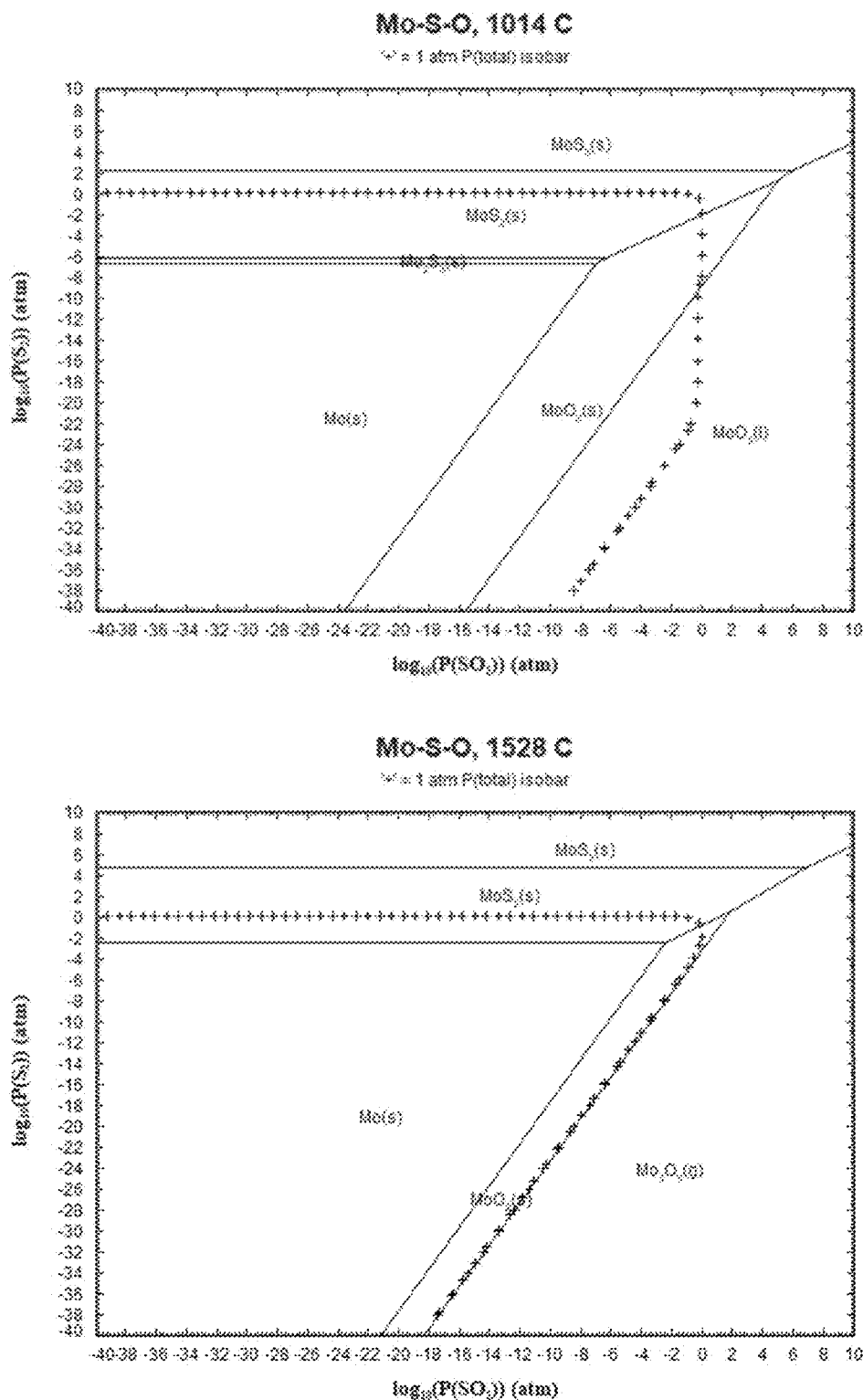
Figure 10A:
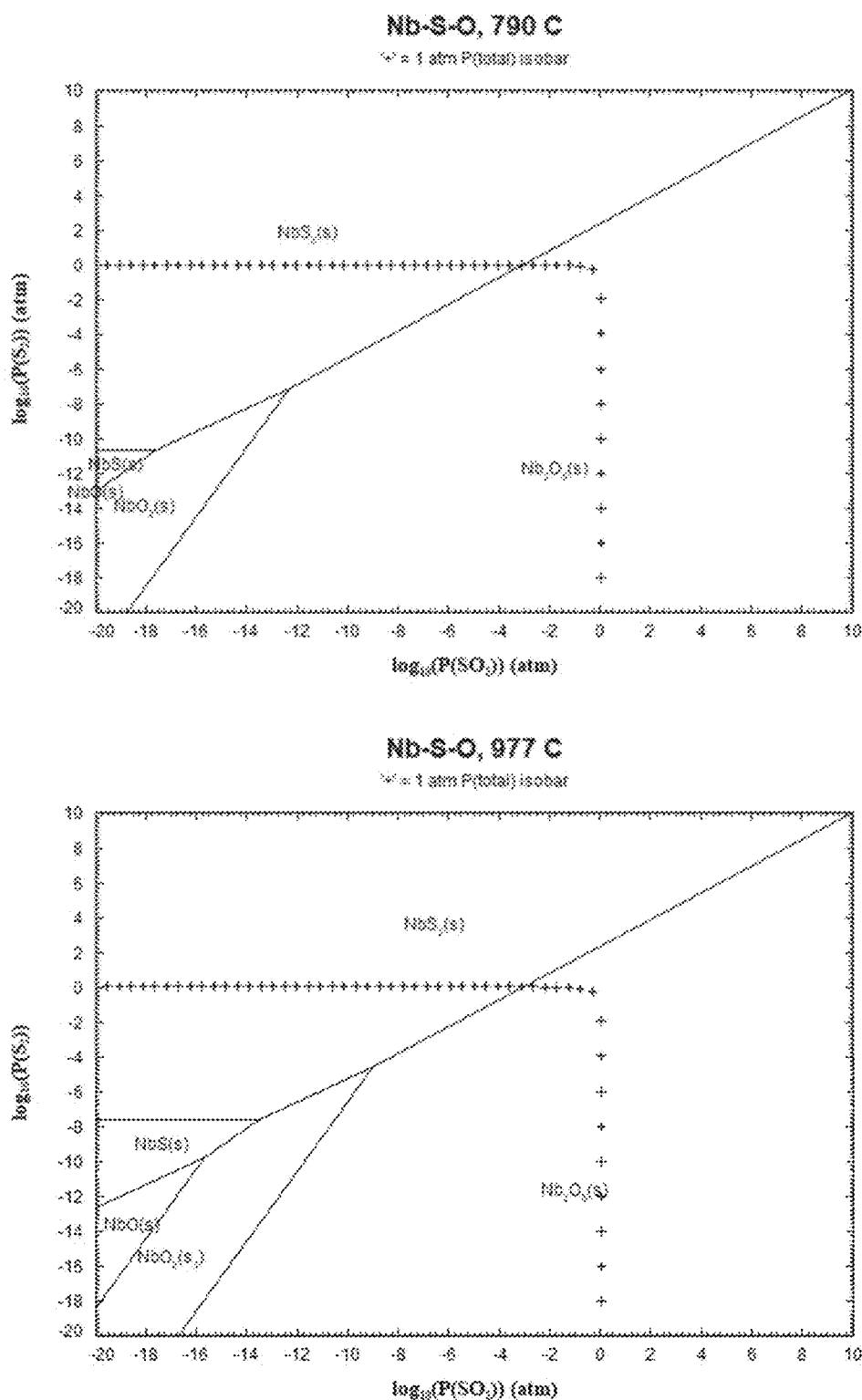
Figure 10B:
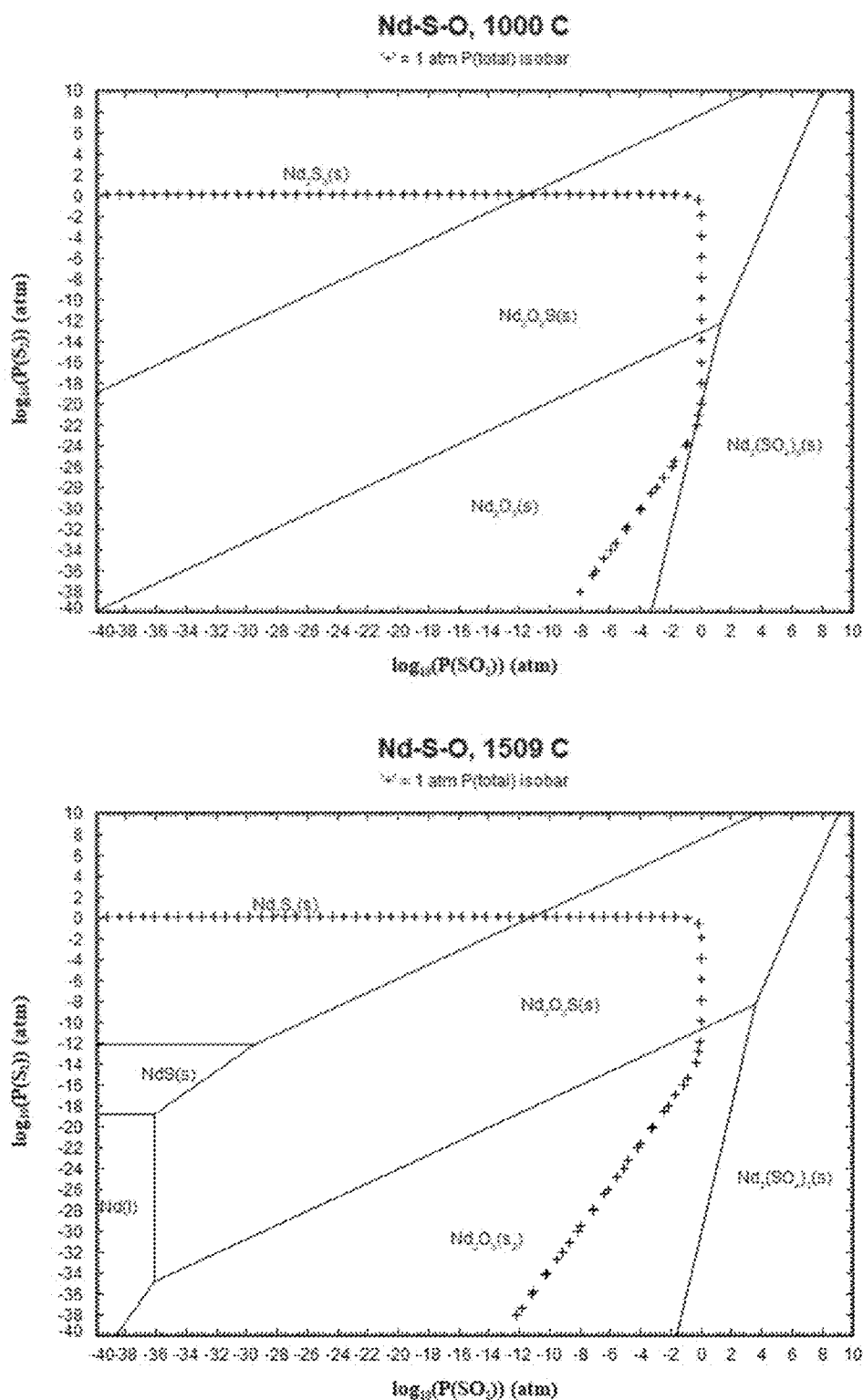
Figure 10C:
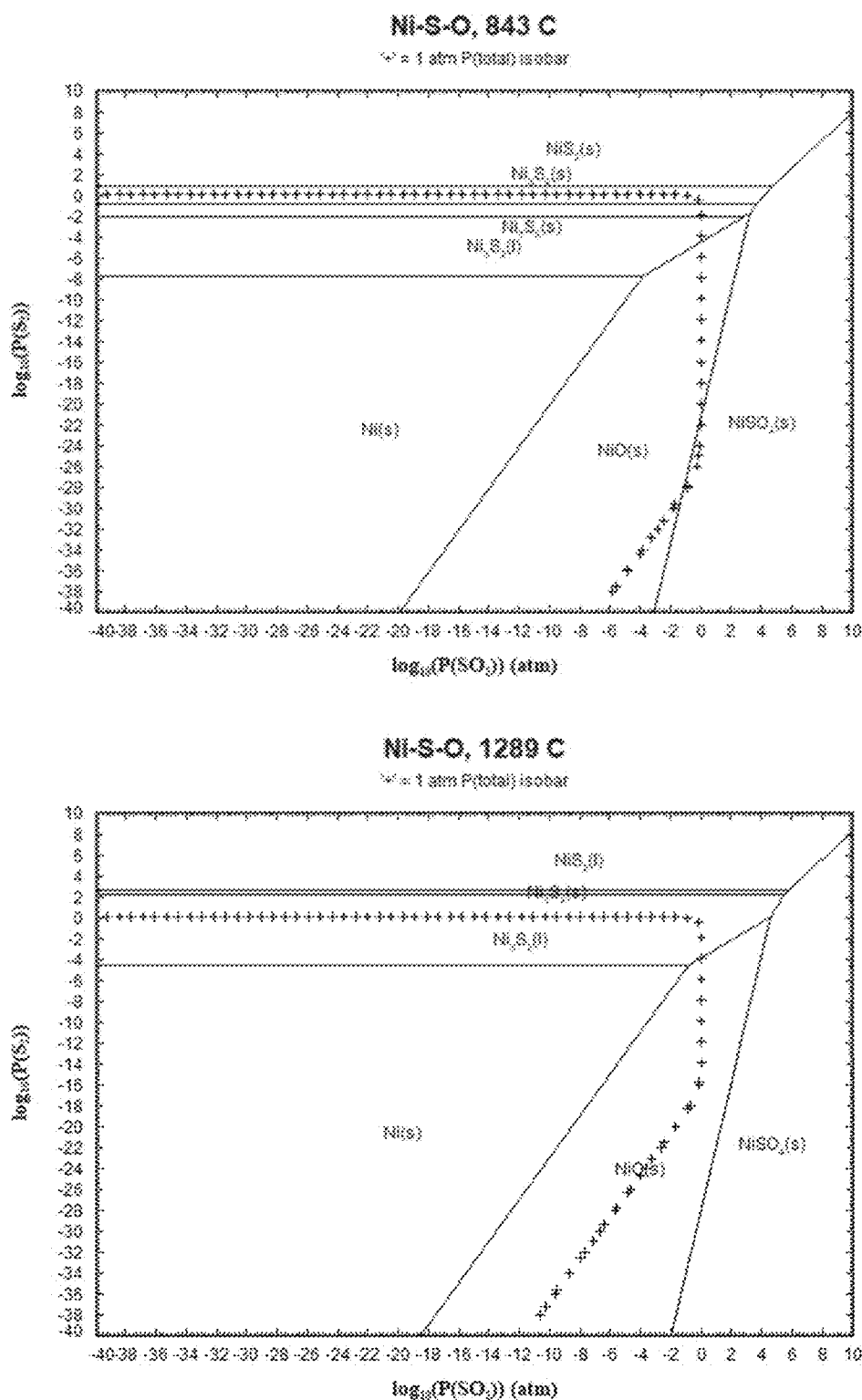
Figure 10D:
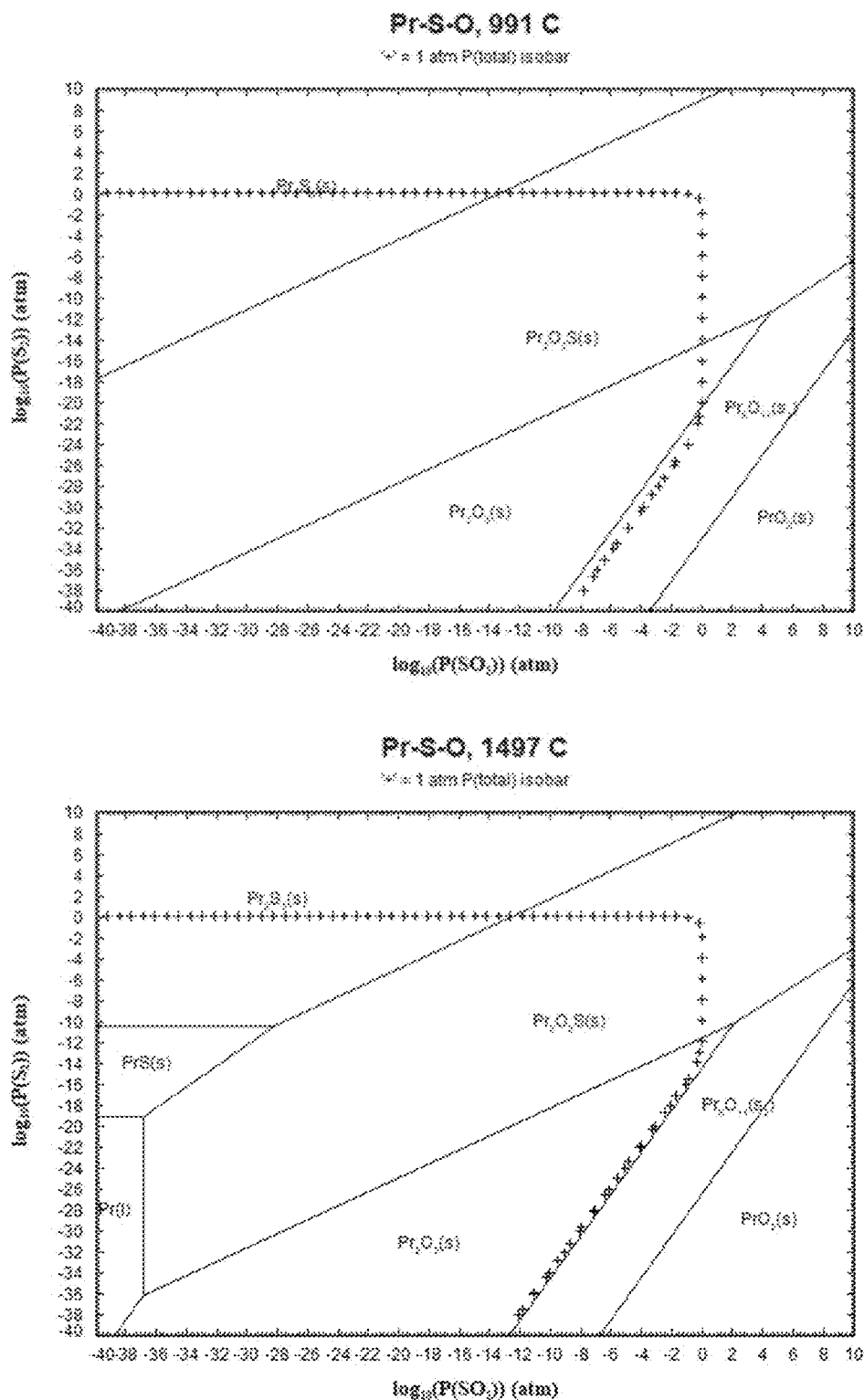
Figure 10E:
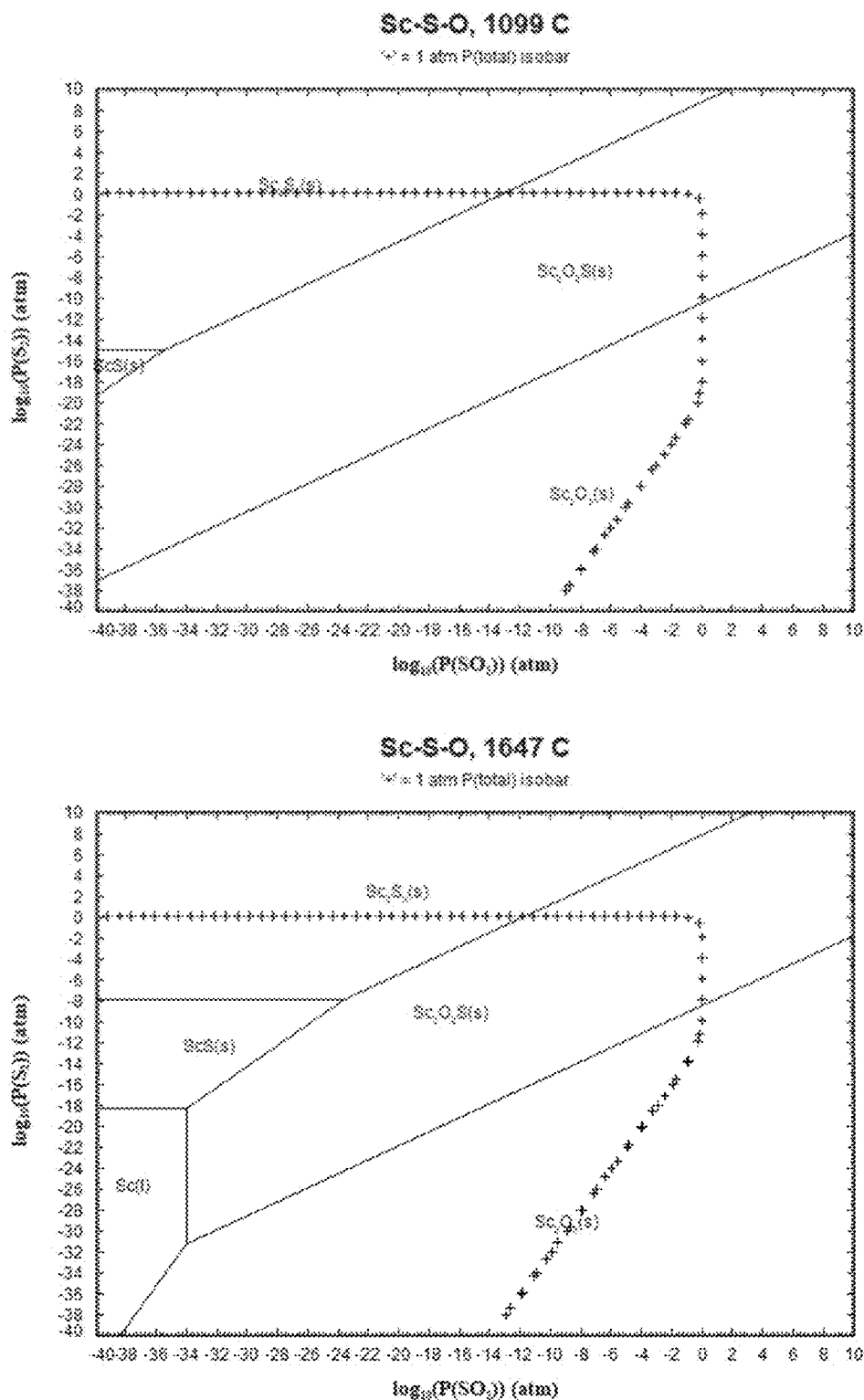
Figure 10F:
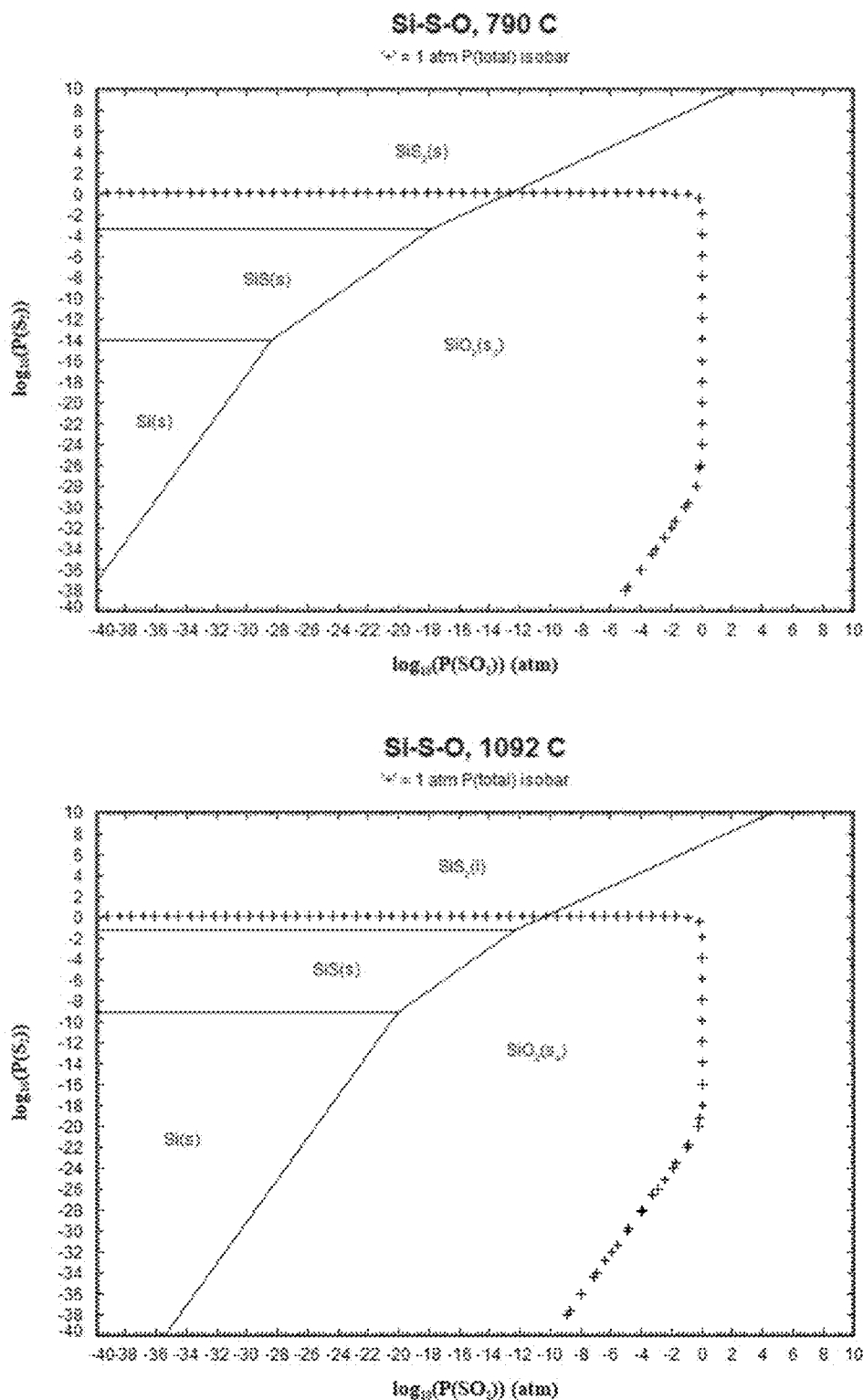
Figure 10G:
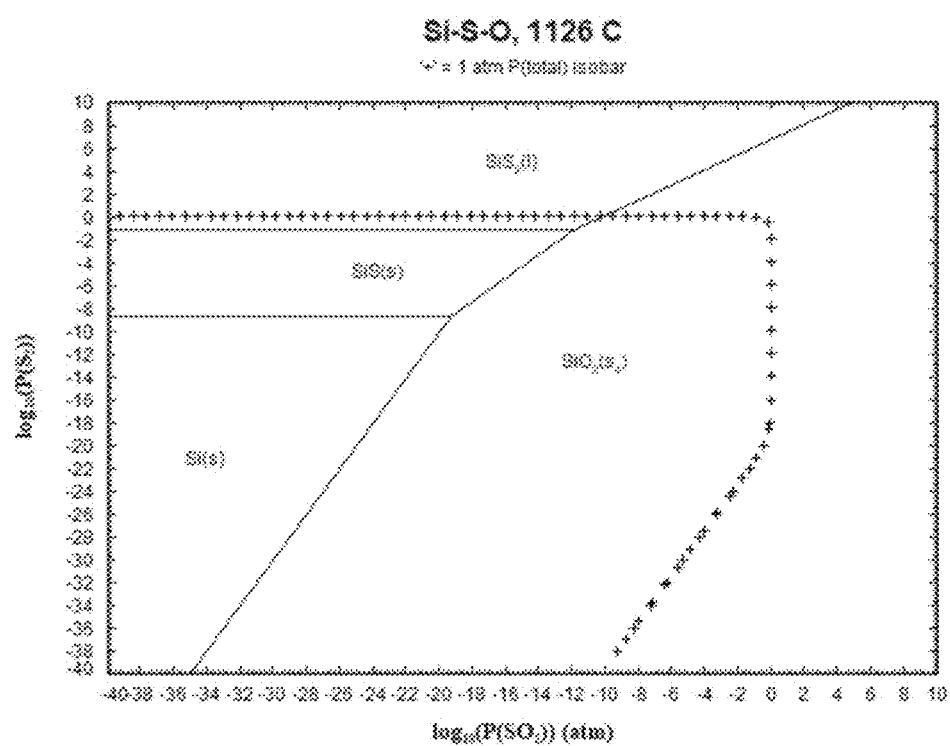
Figure 10H:
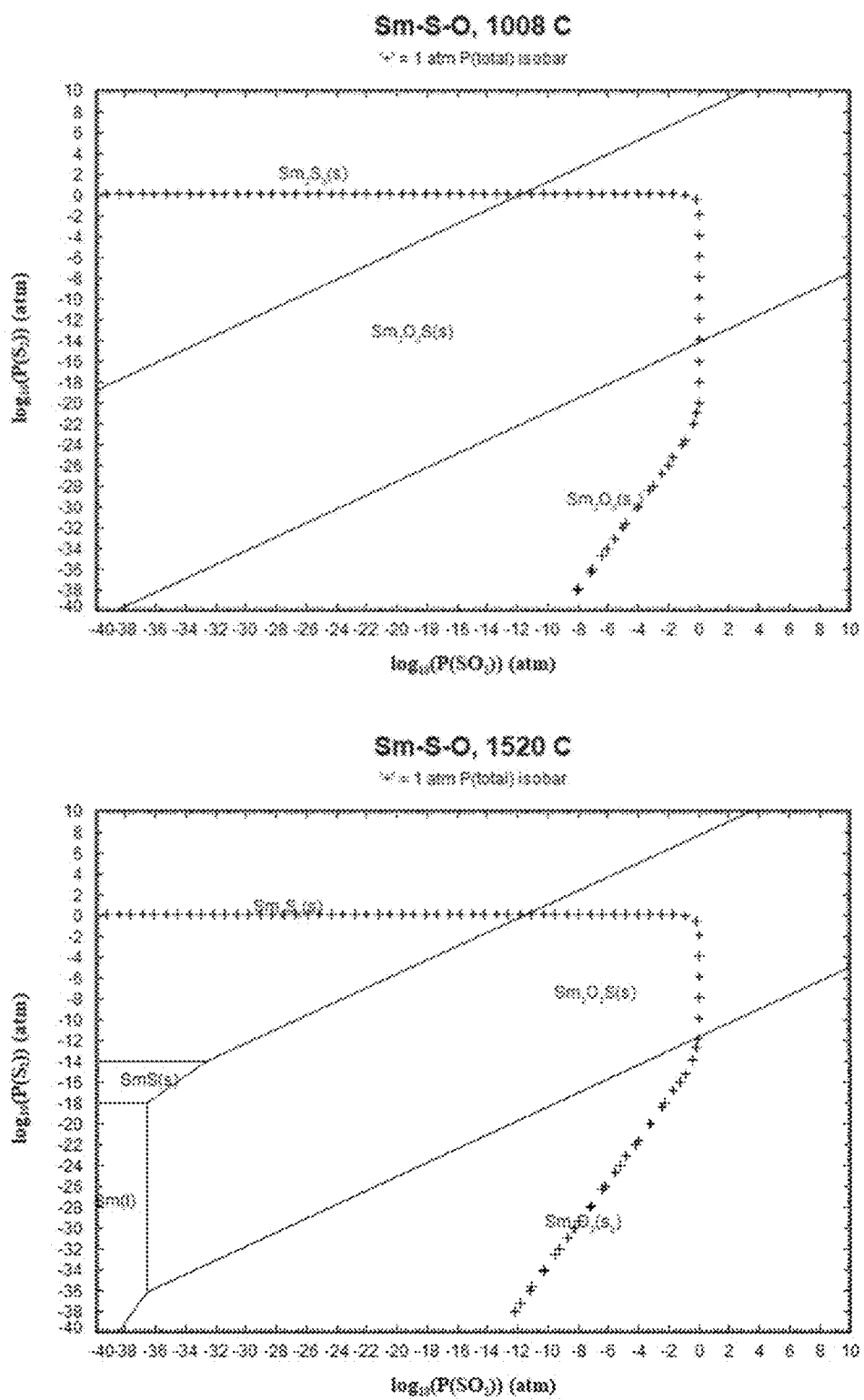
Figure 10I:
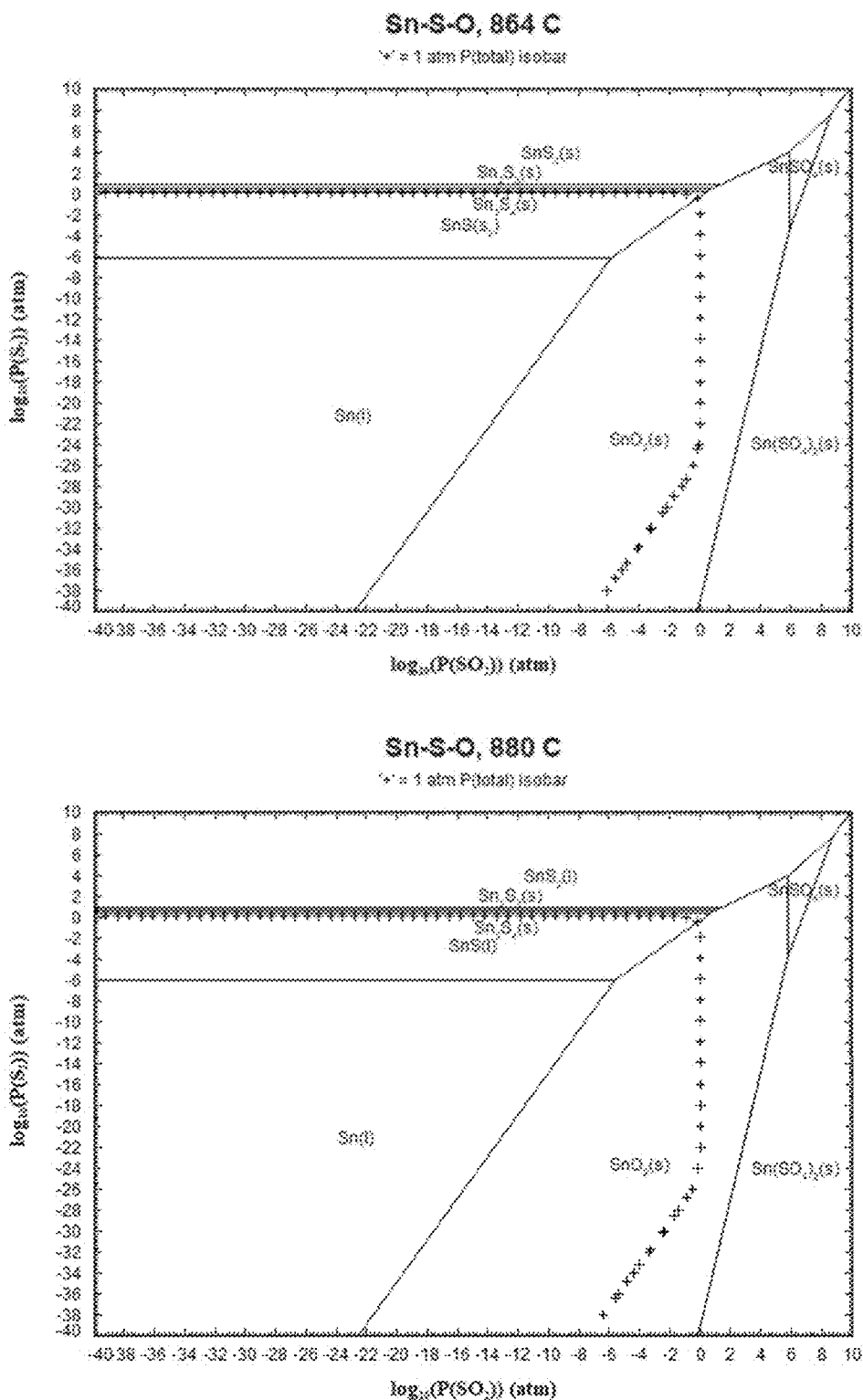
Figure 10J:
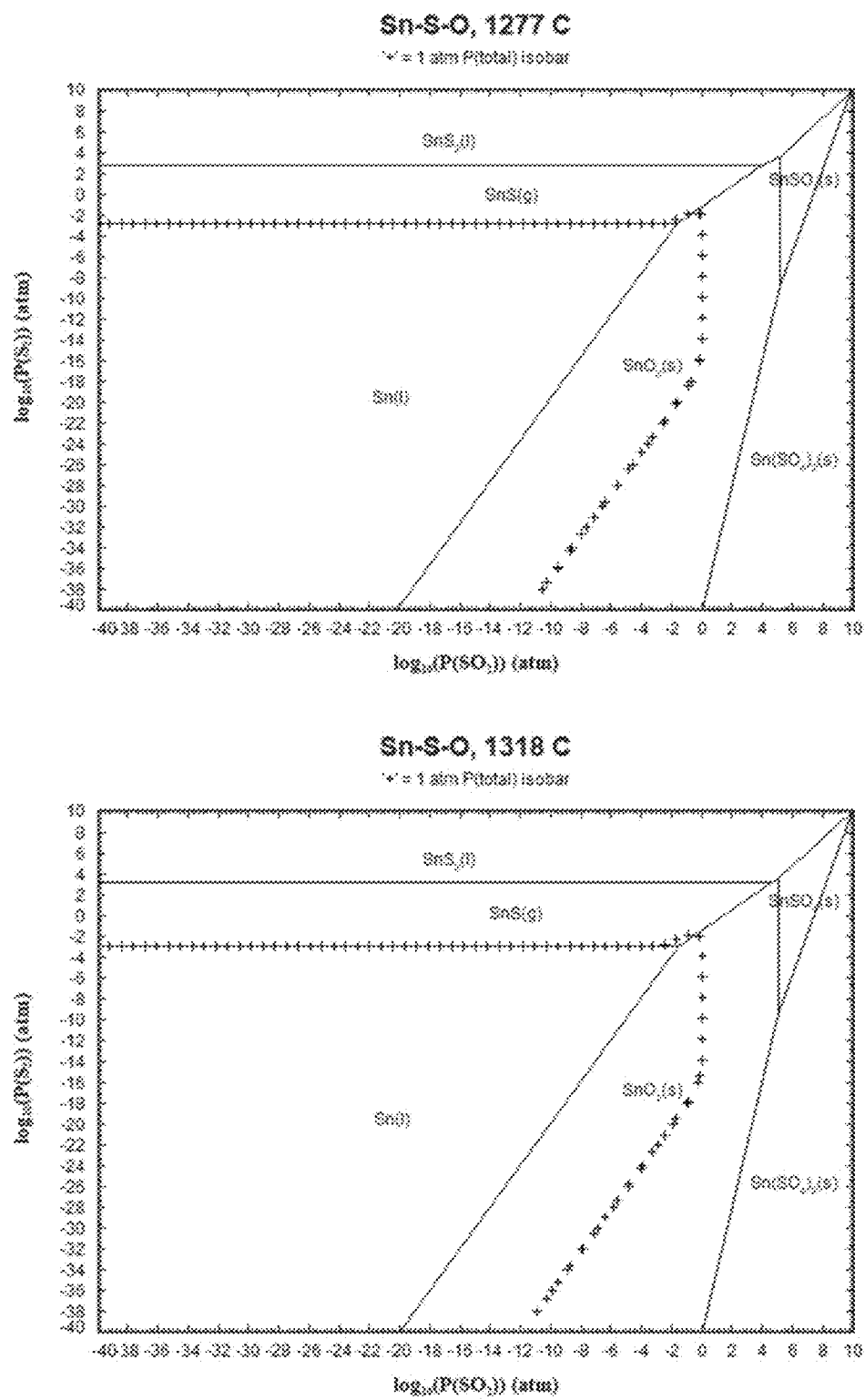
Figure 10K:
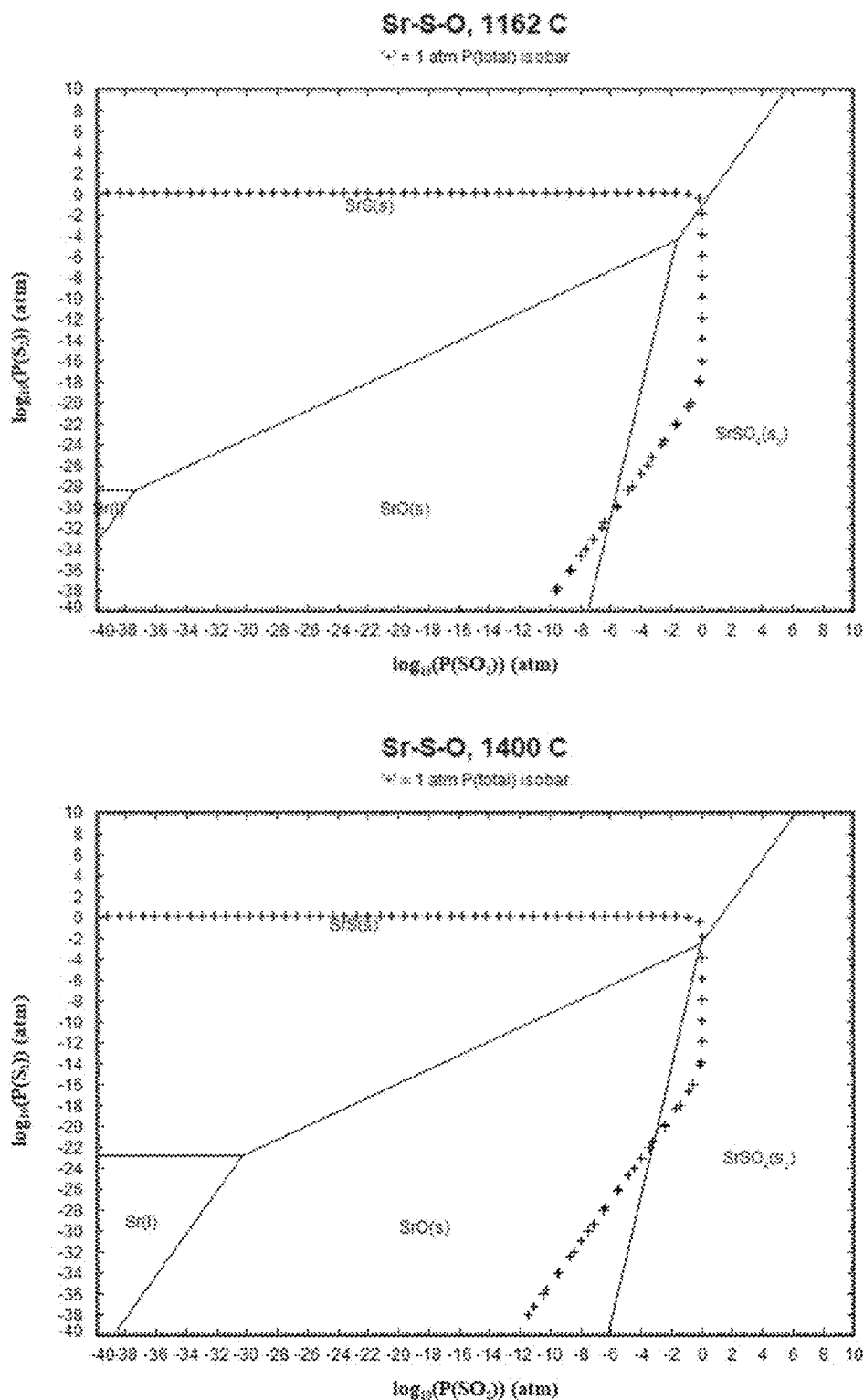
Figure 10L:
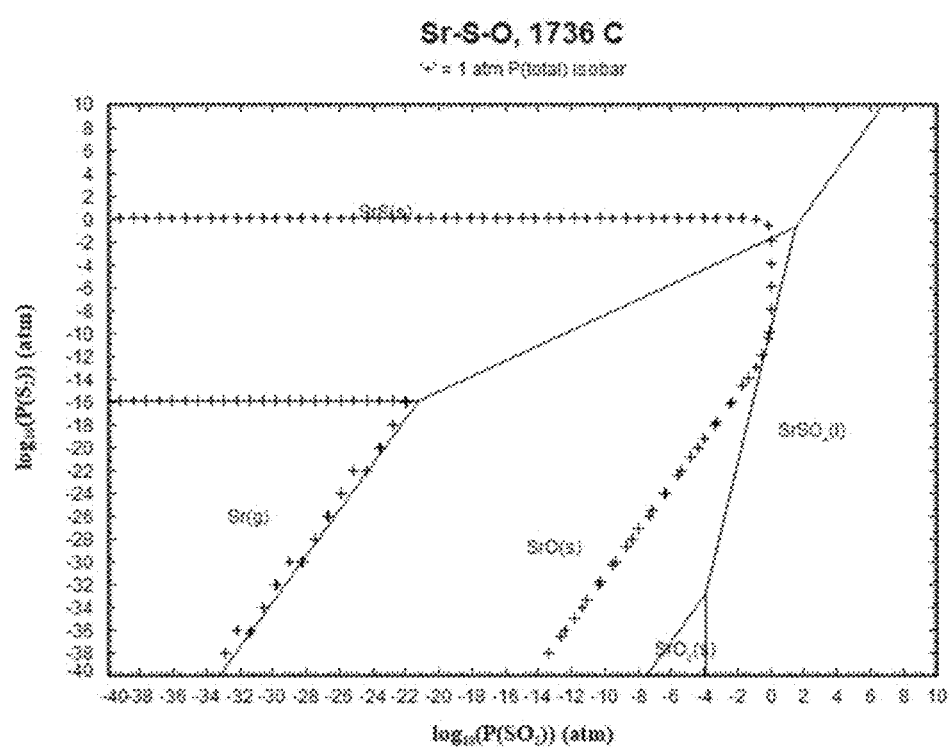
Figure 10M:
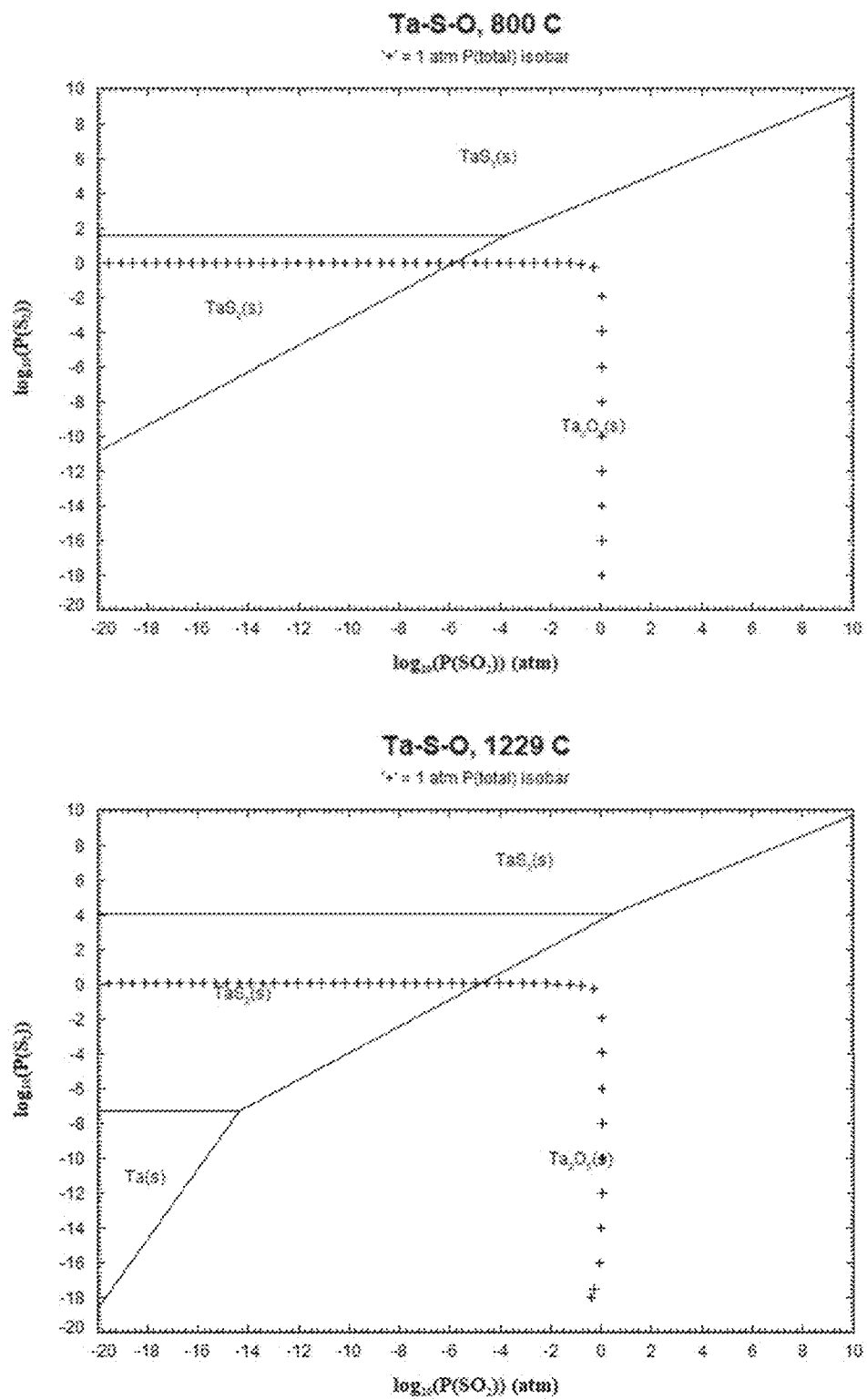
Figure 10N:
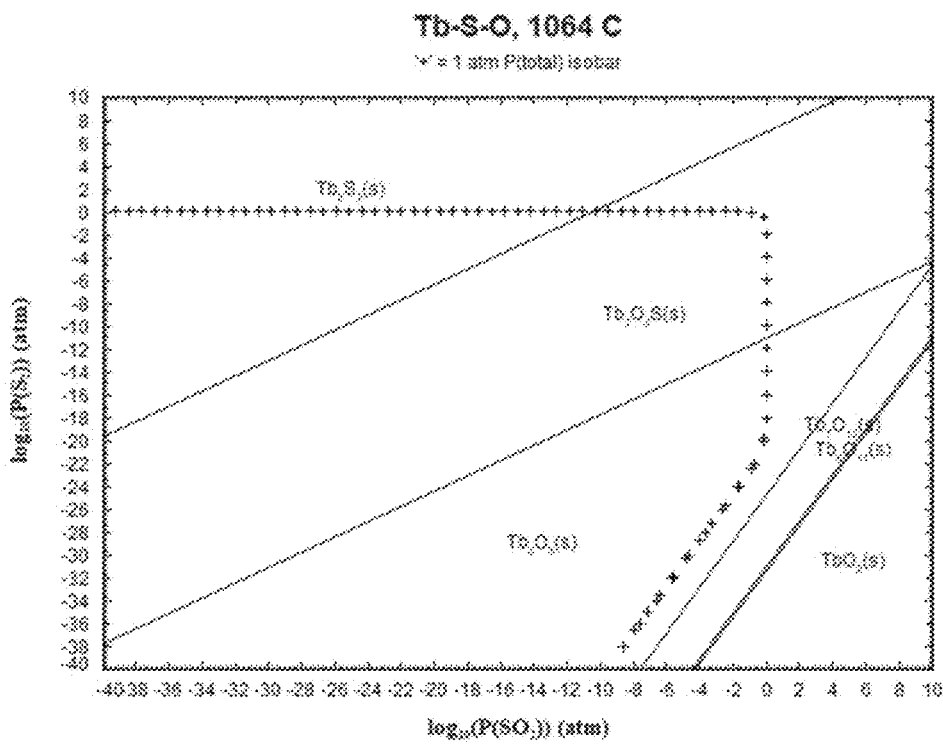
Figure 10N:
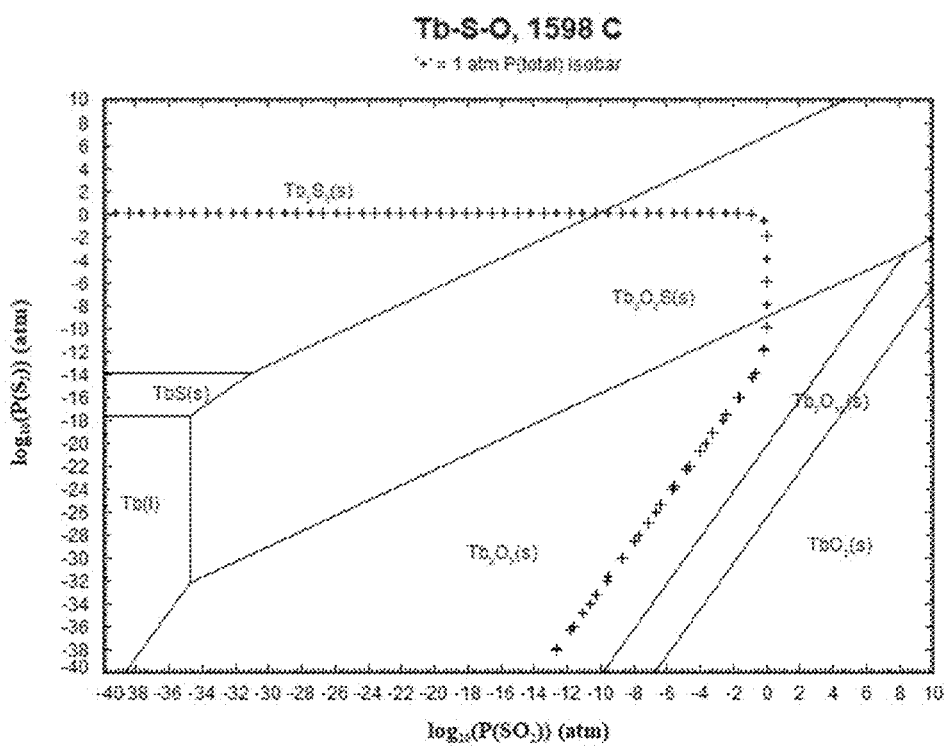
Figure 10O:
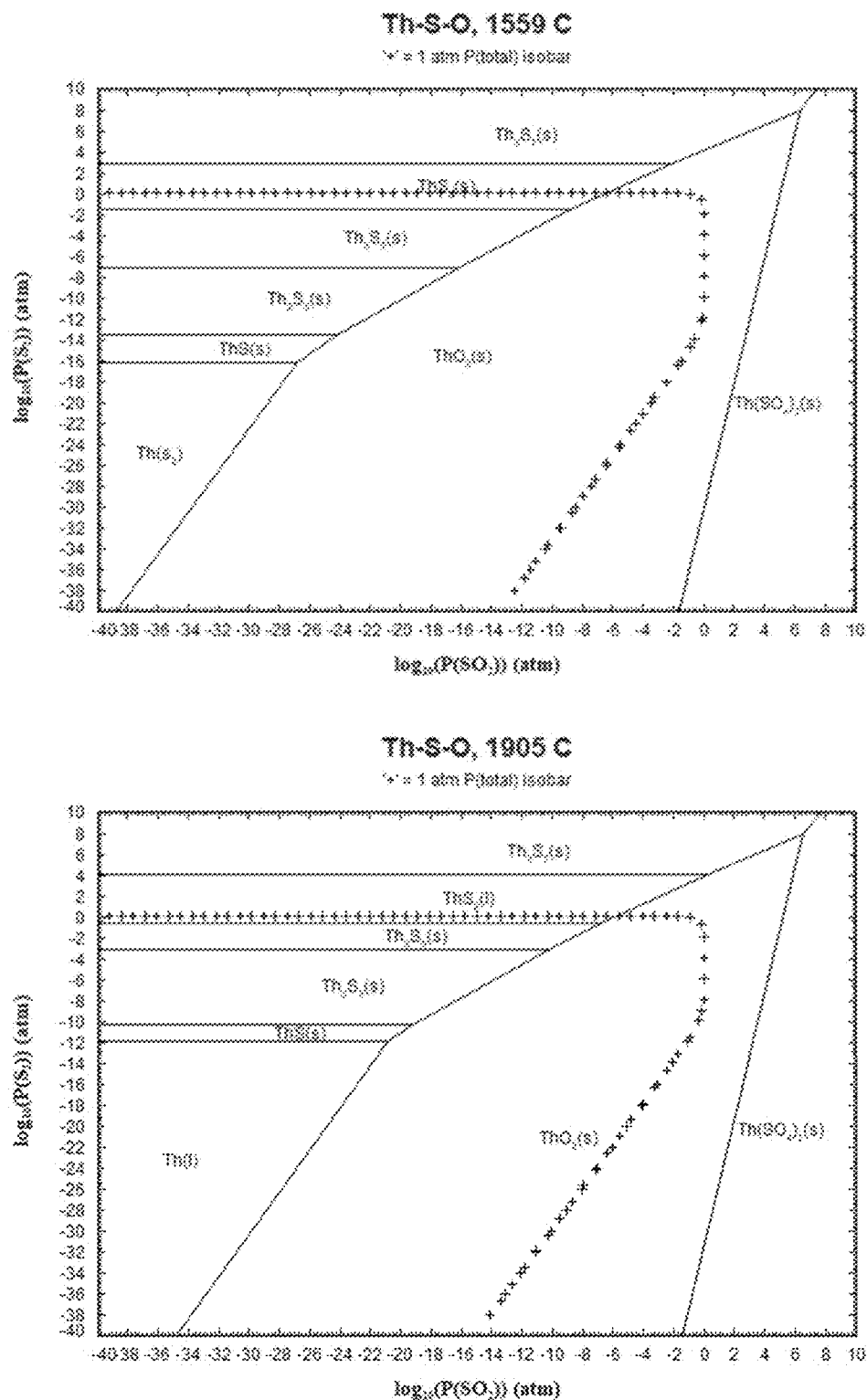
Figure 10P:
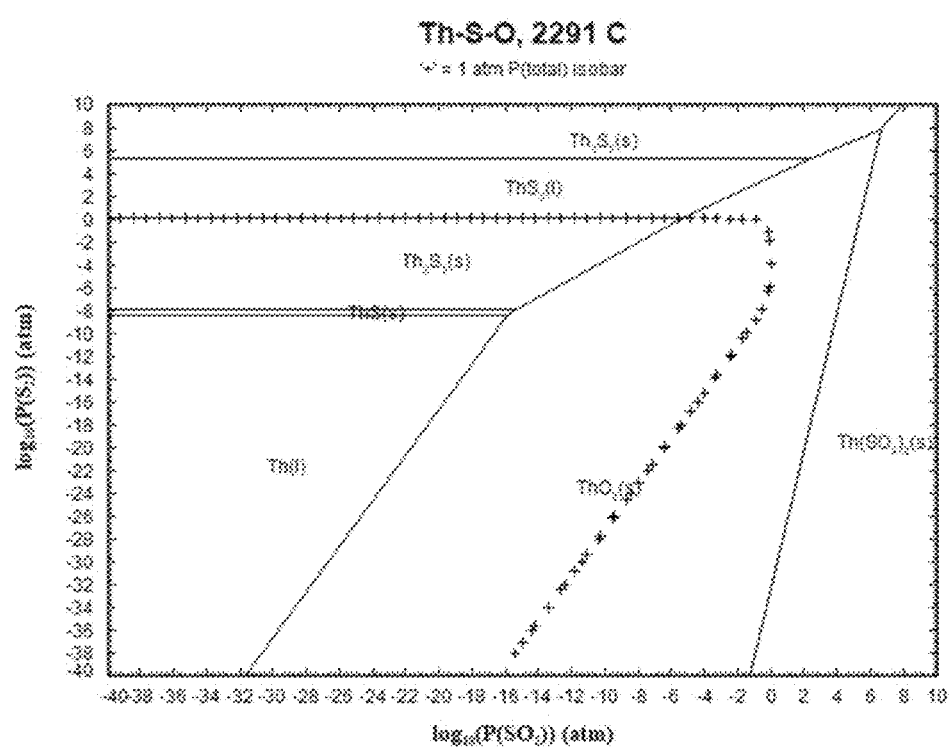
Figure 10Q:
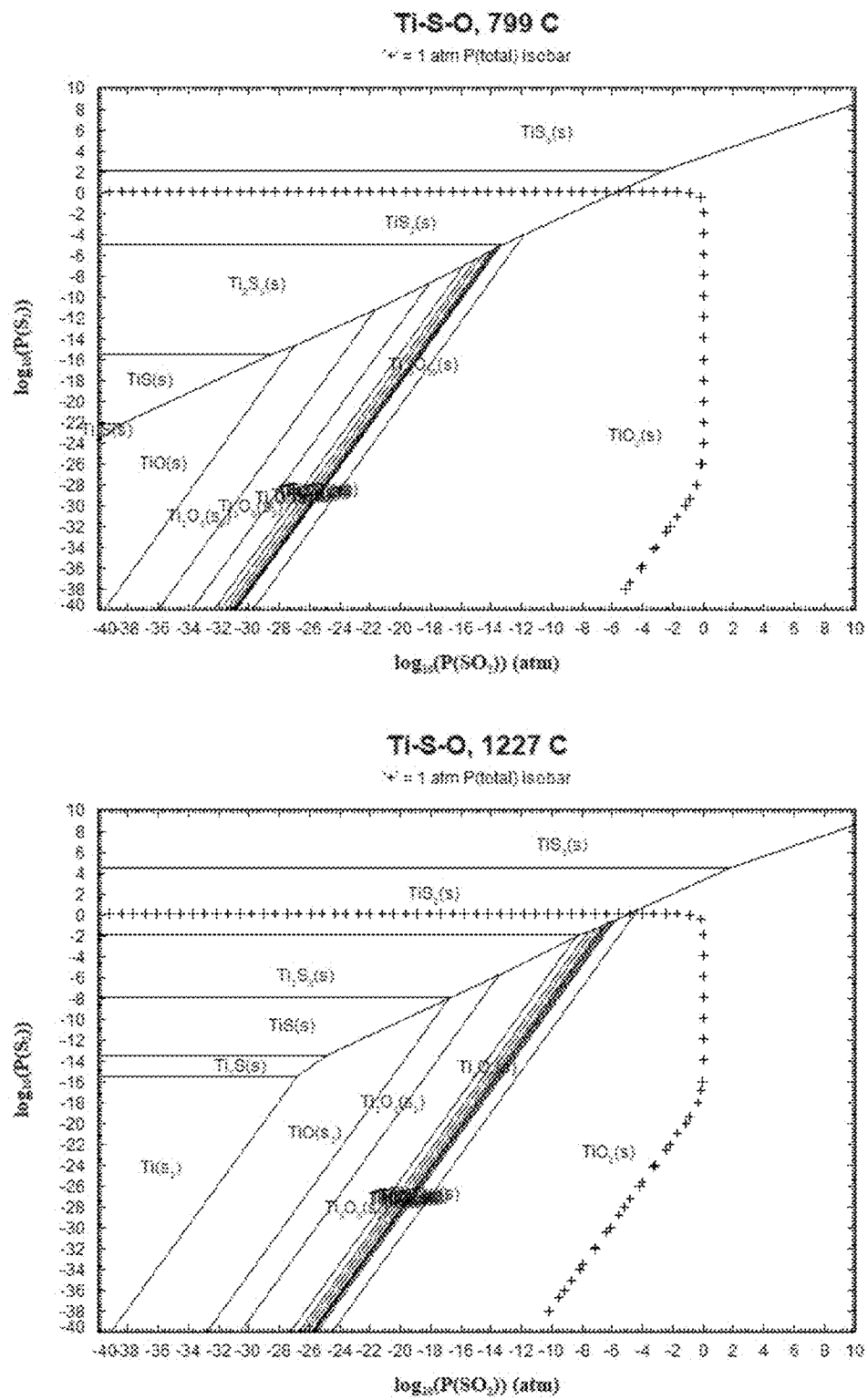
Figure 10R:
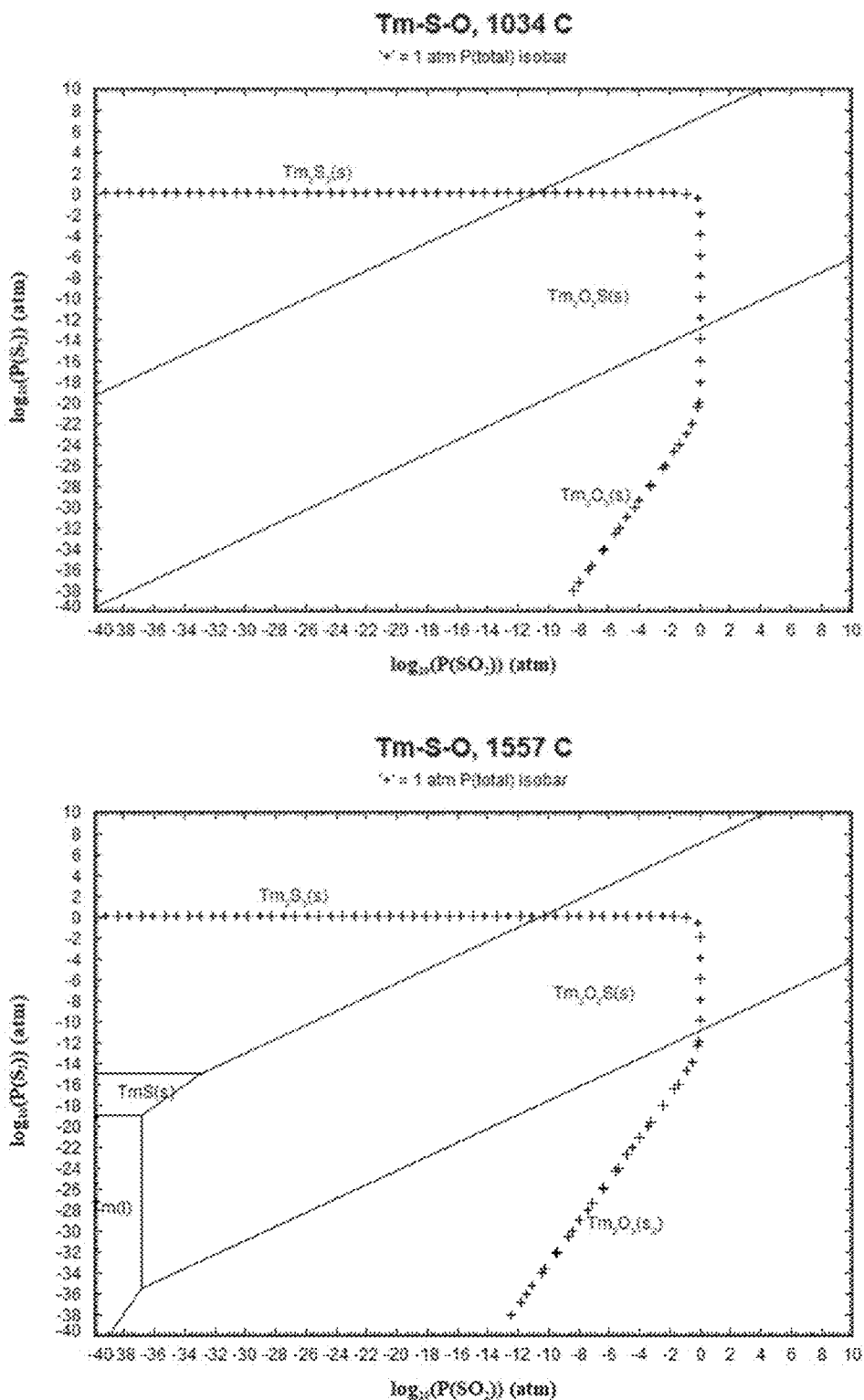
Figure 10S:
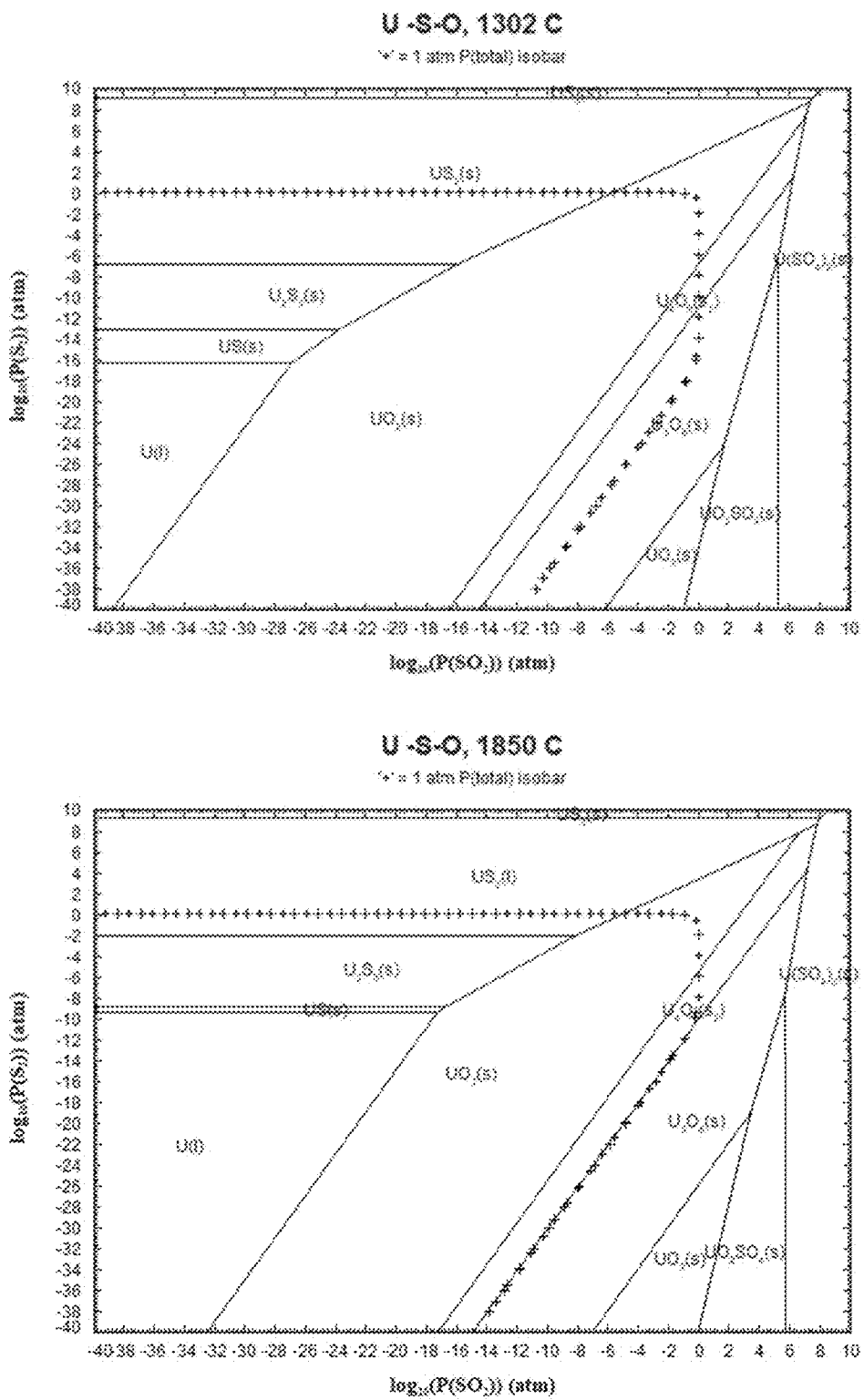
Figure 10T:
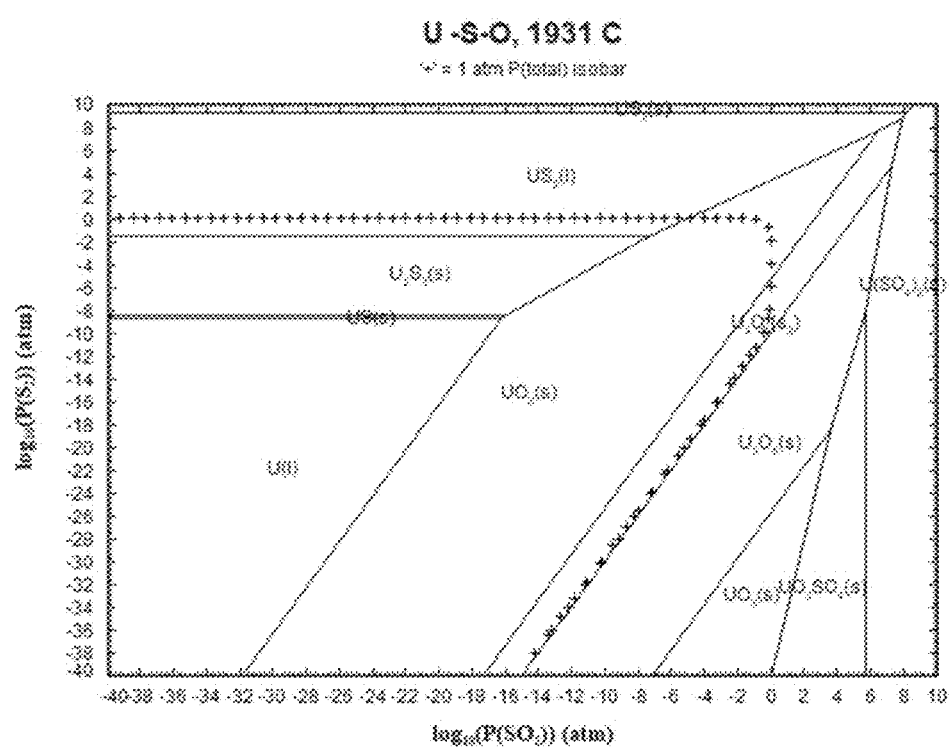
Figure 10U:
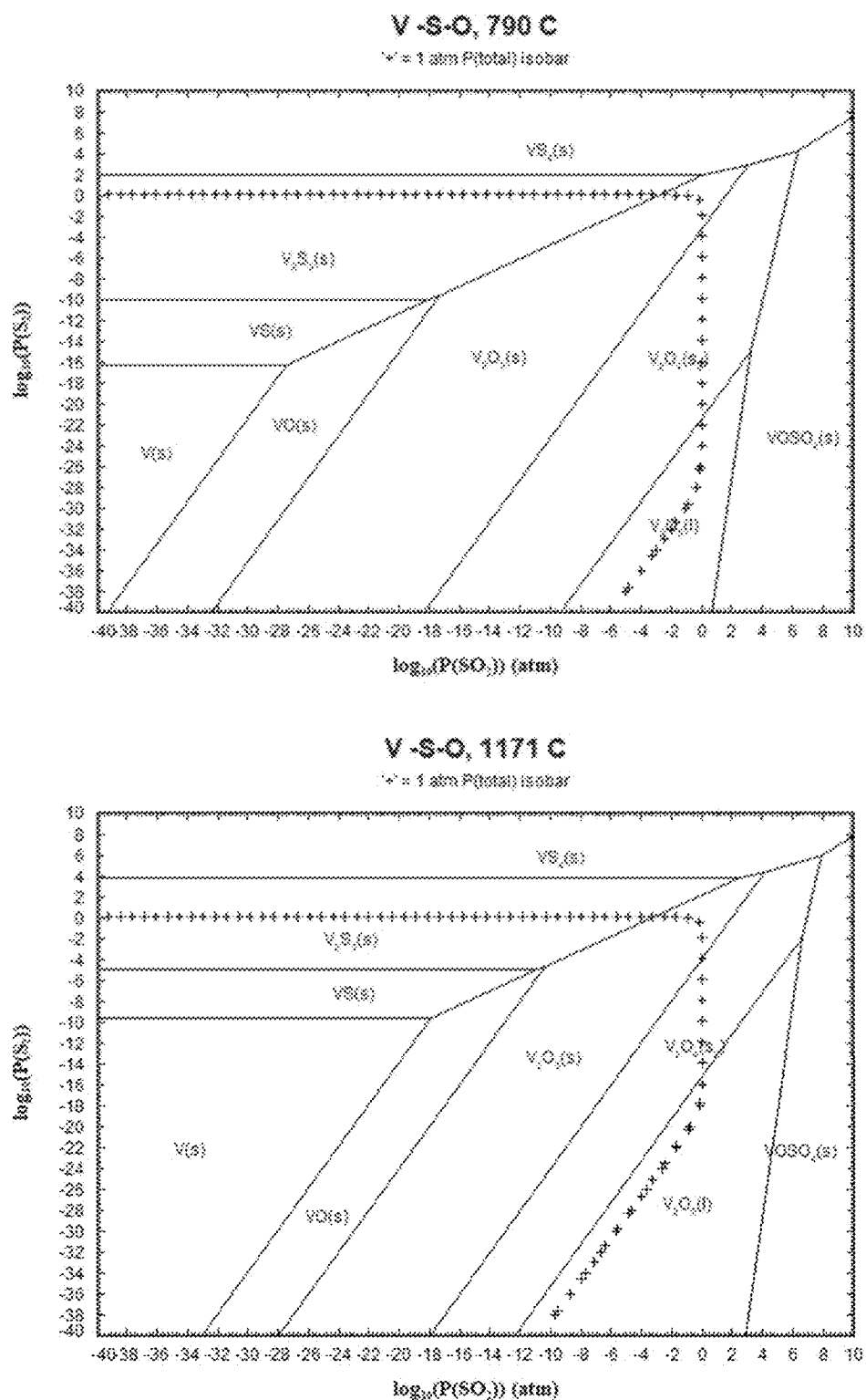
Figure 10V:
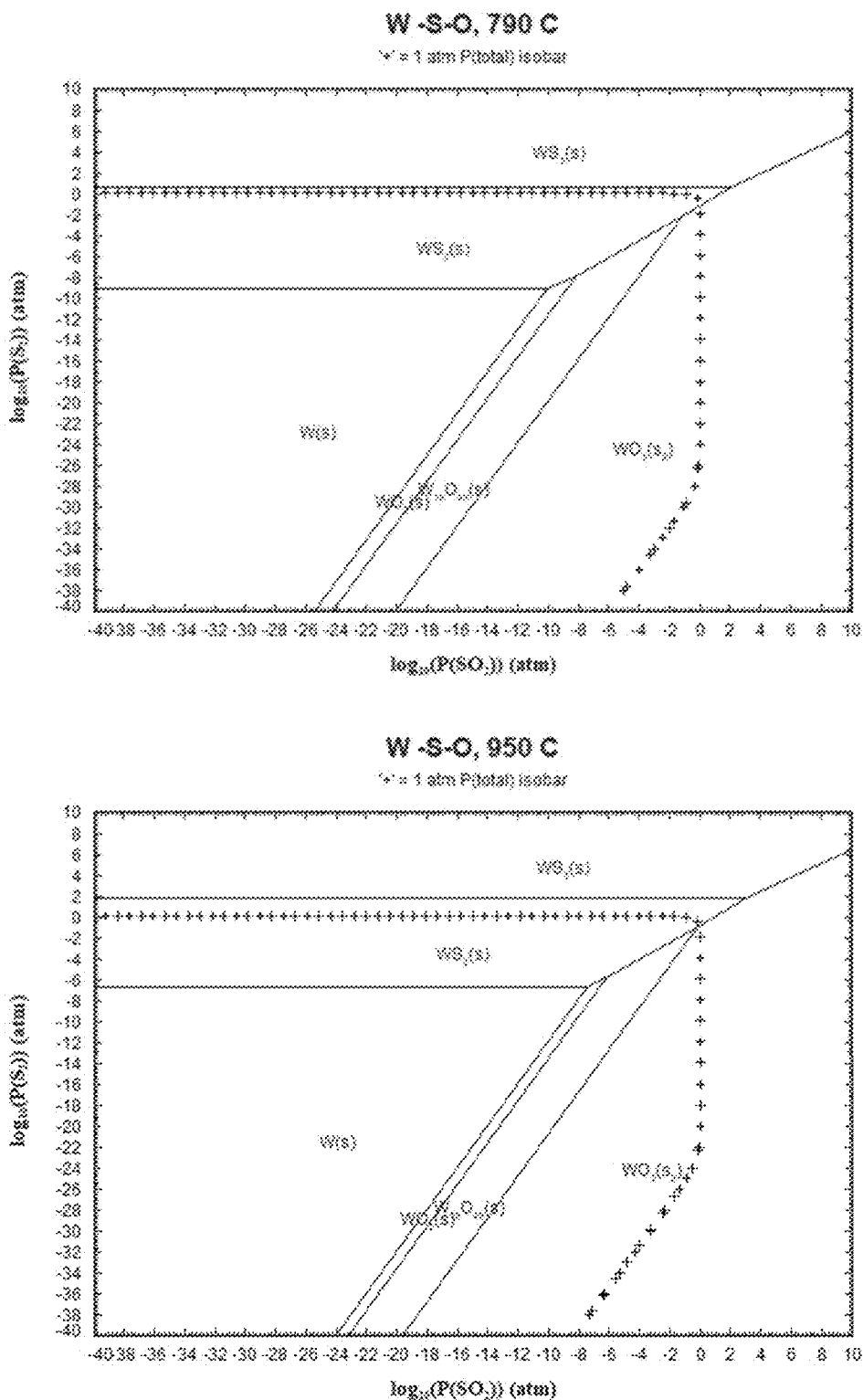
Figure 10W:
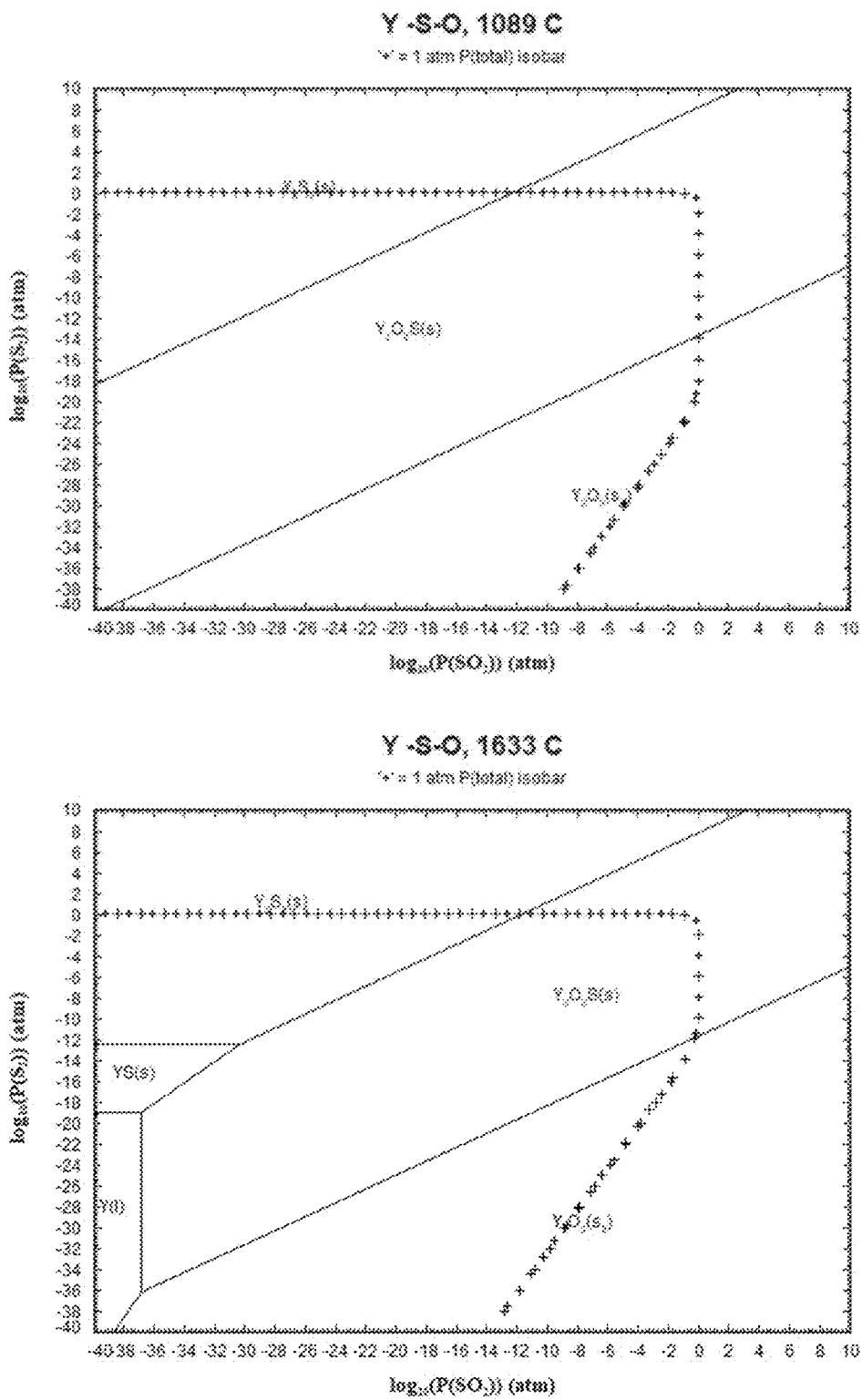
Figure 10X:
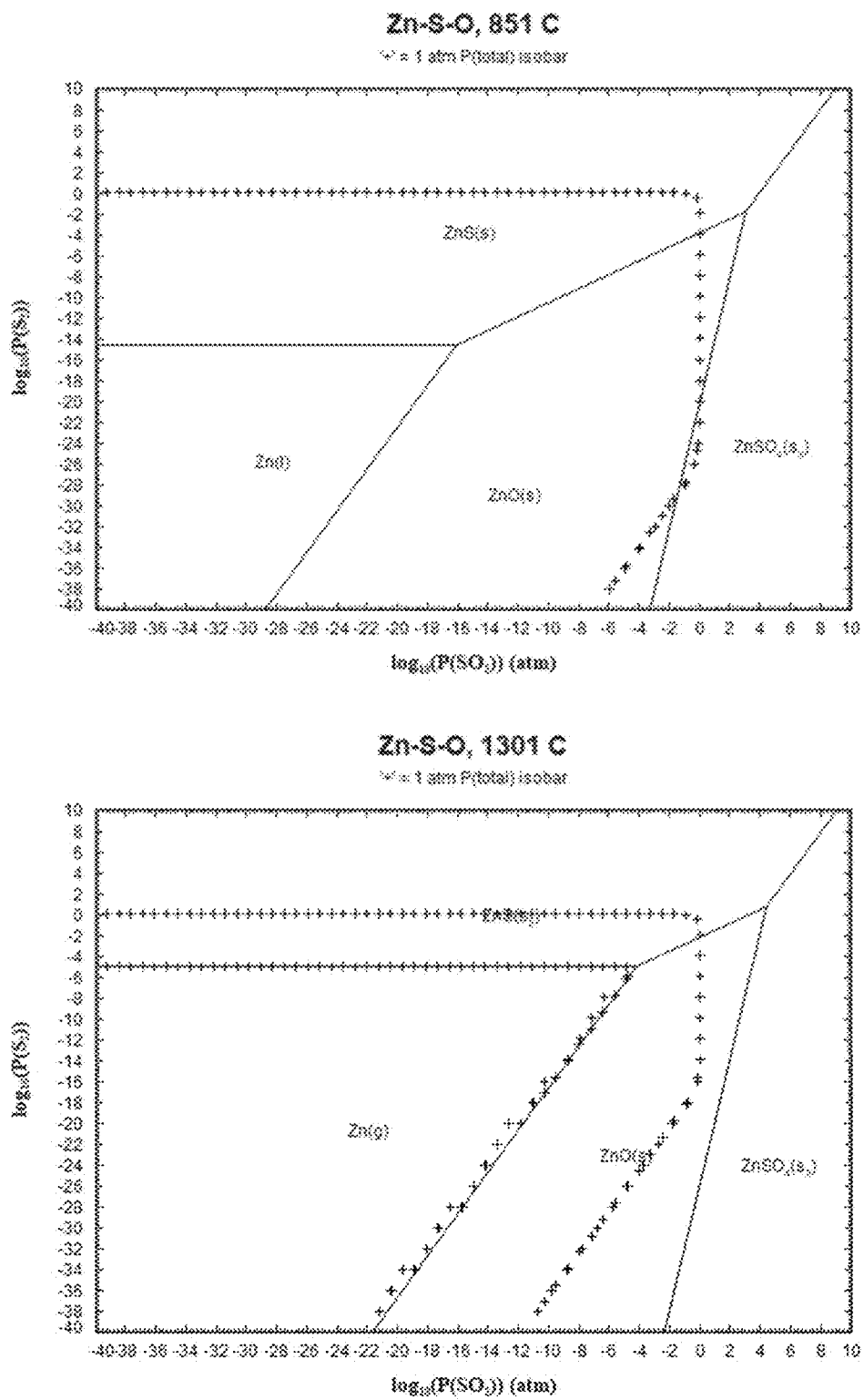
Figure 10Y:
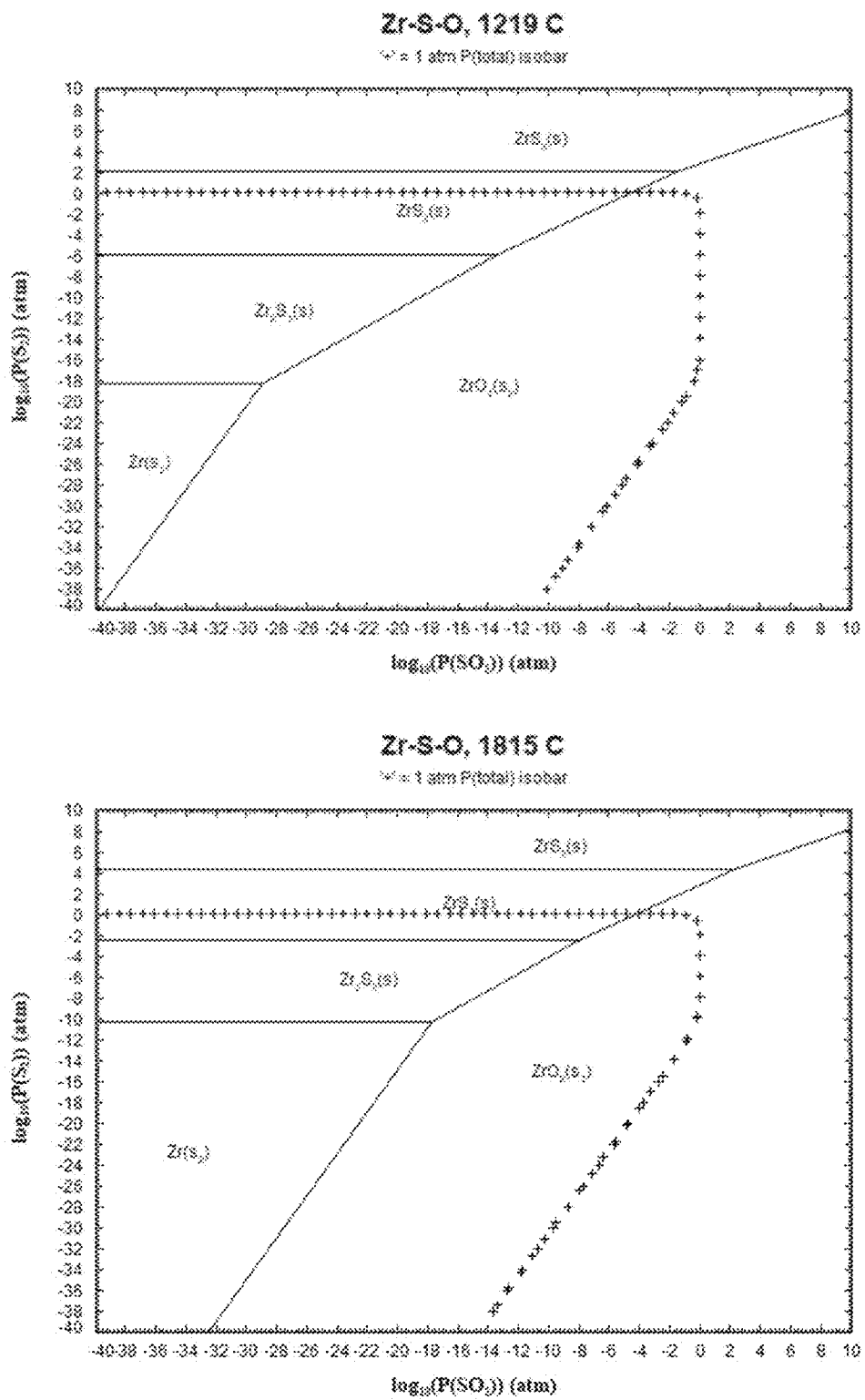
Figure 11A:
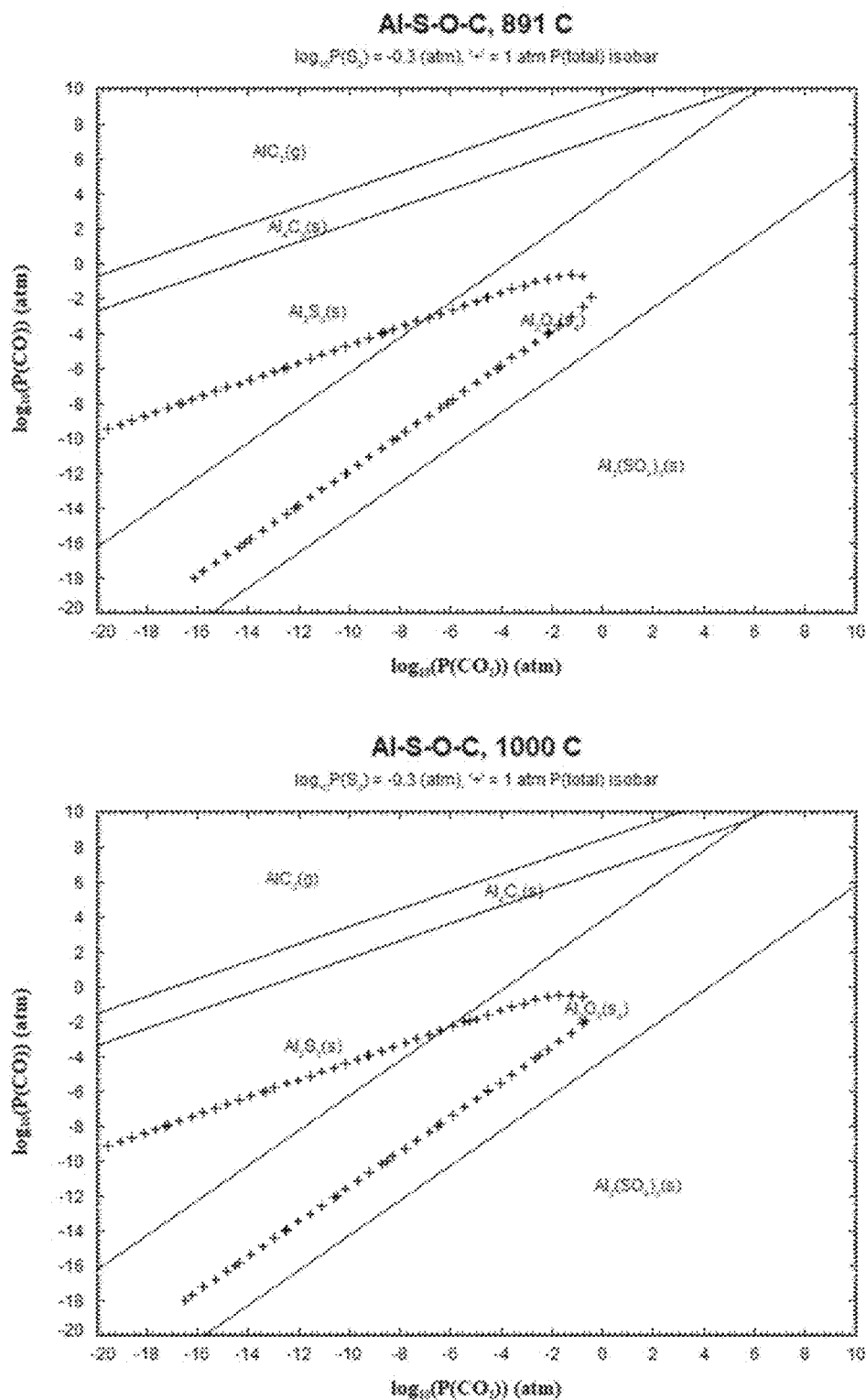
FIGS. 11A-11Z and 12A-12W show sensitivity plots for sulfidation gas ratios in the presence of carbon.
Figure 11B:
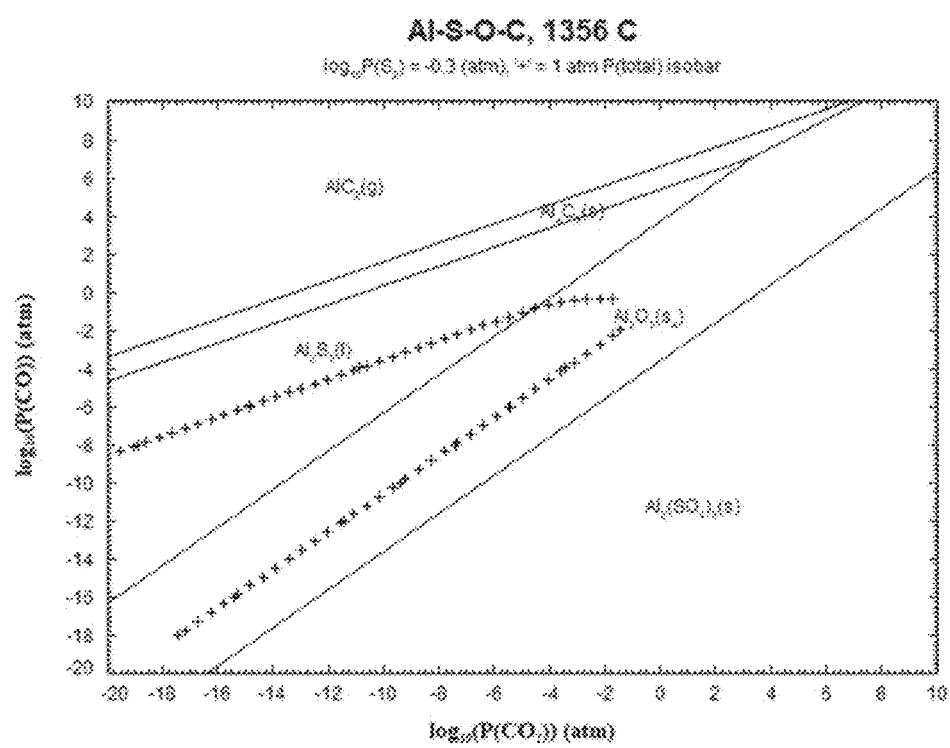
Figure 11C:
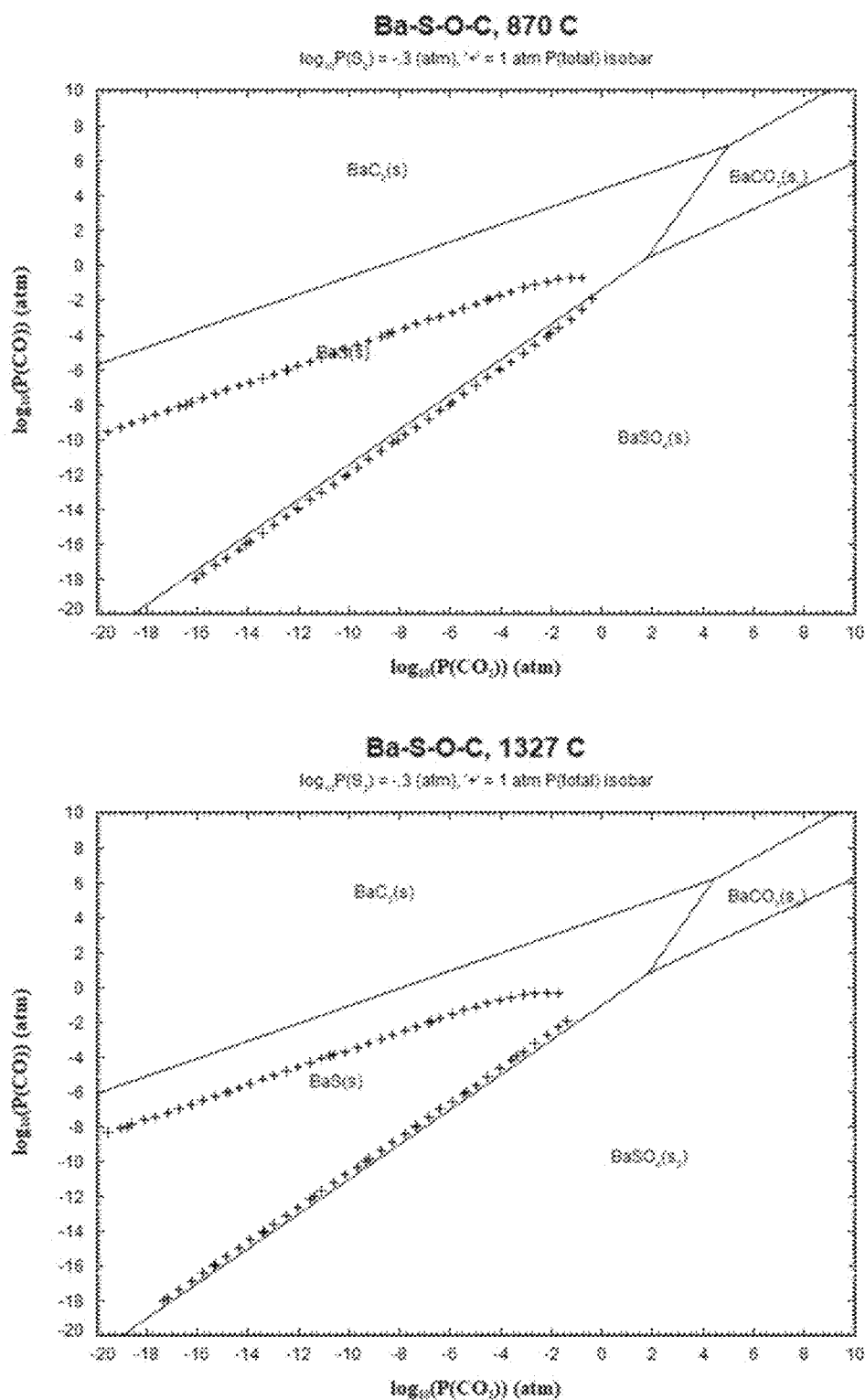
Figure 11D:
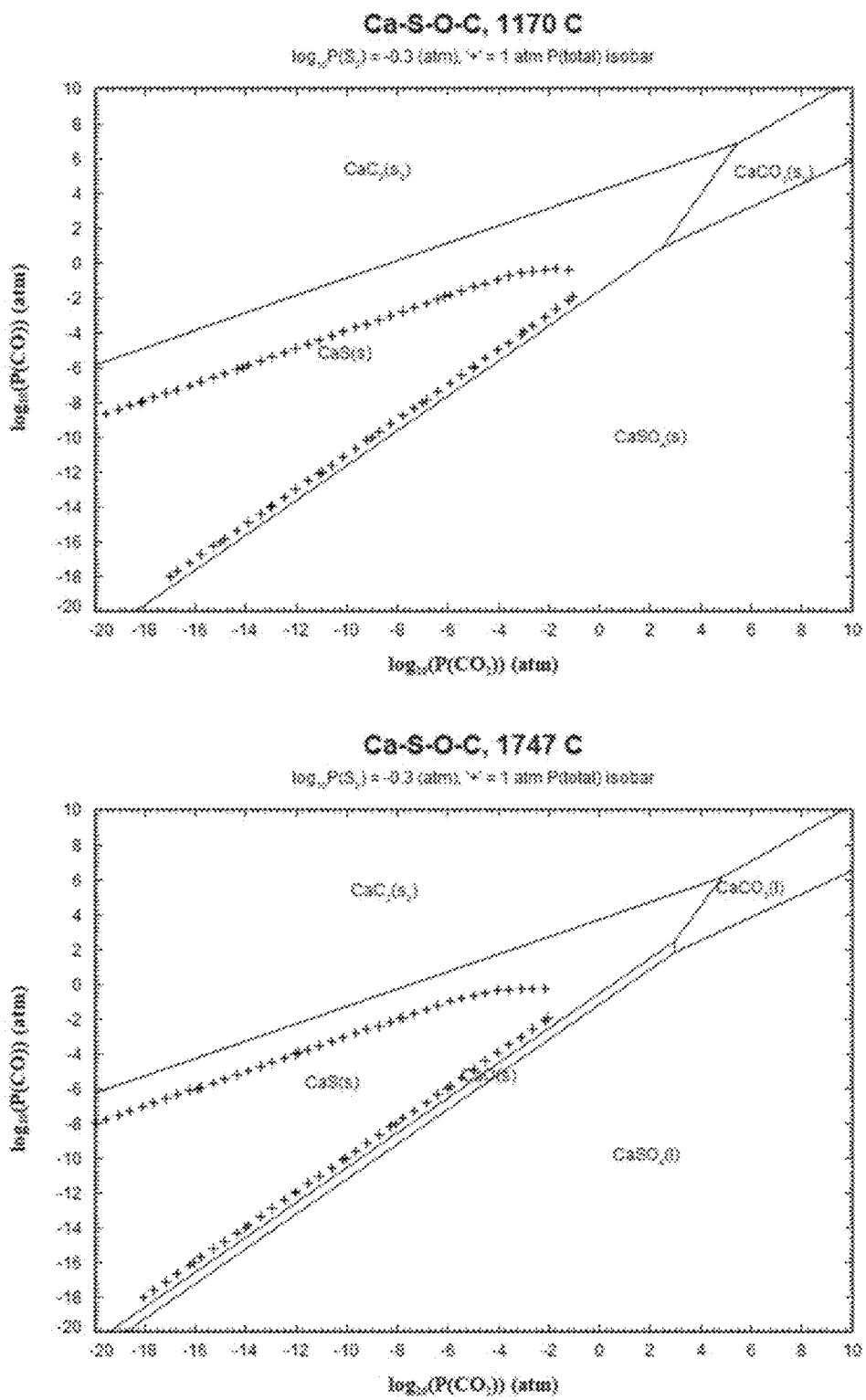
Figure 11E:
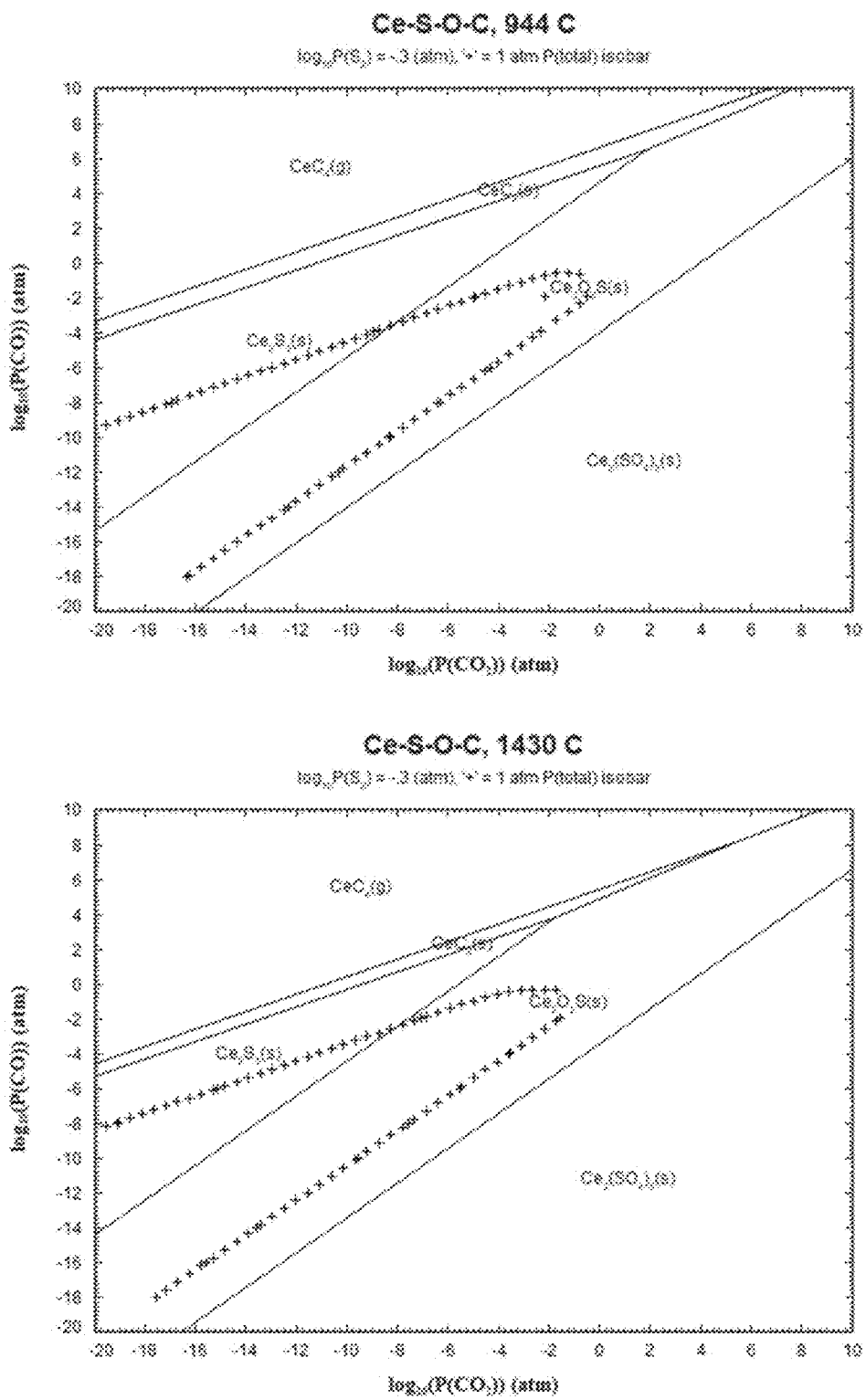
Figure 11F:
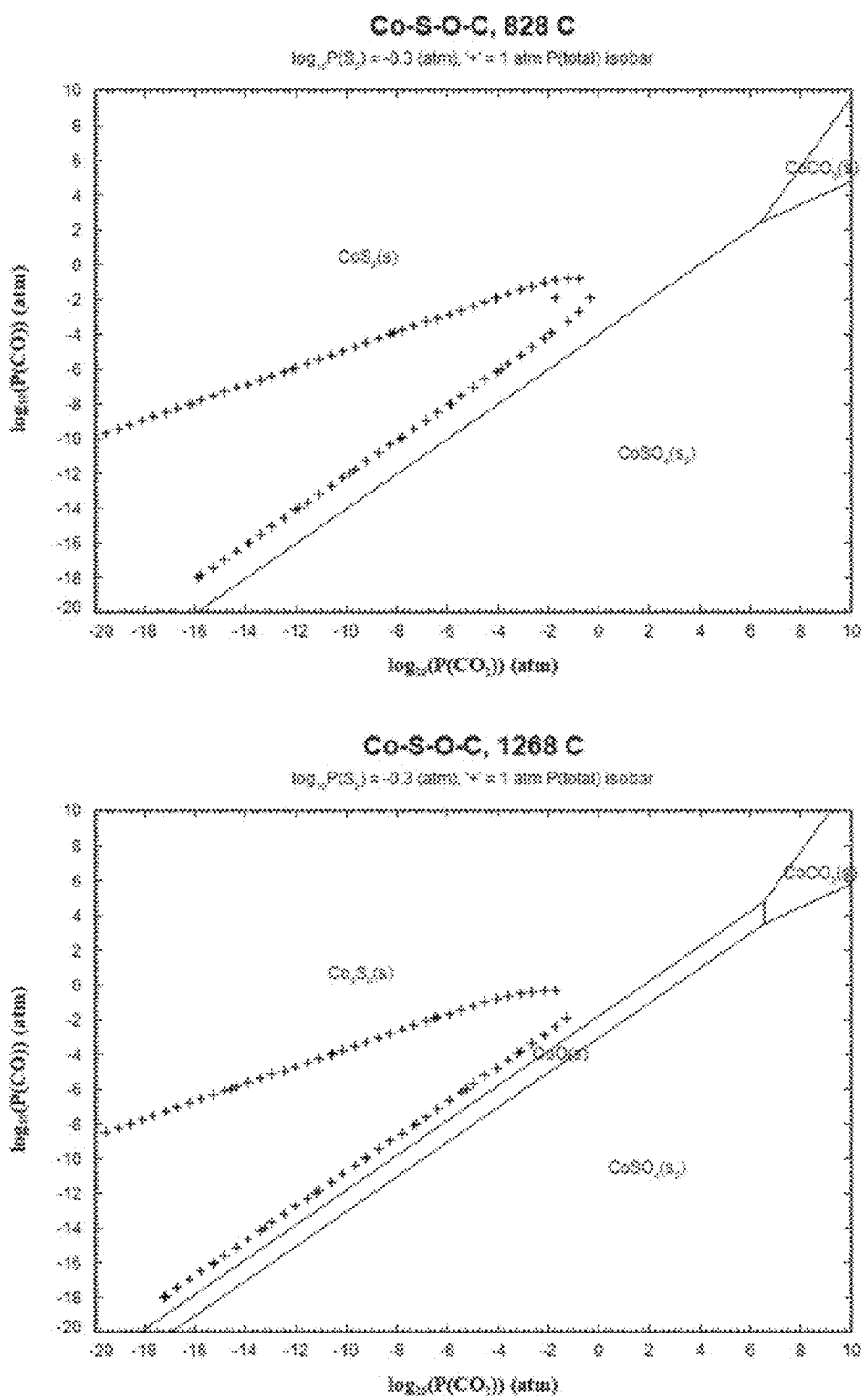
Figure 11G:
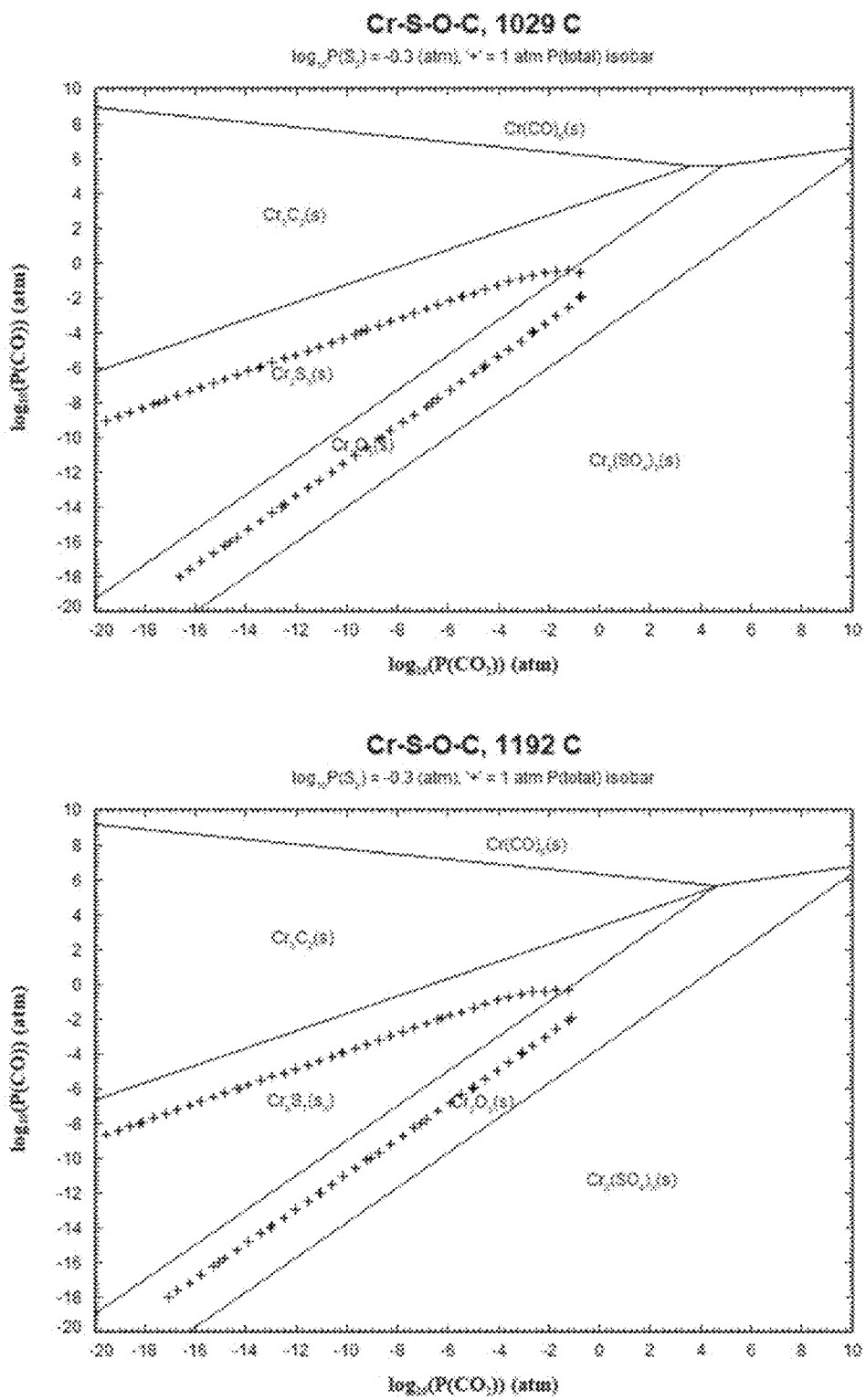
Figure 11H:
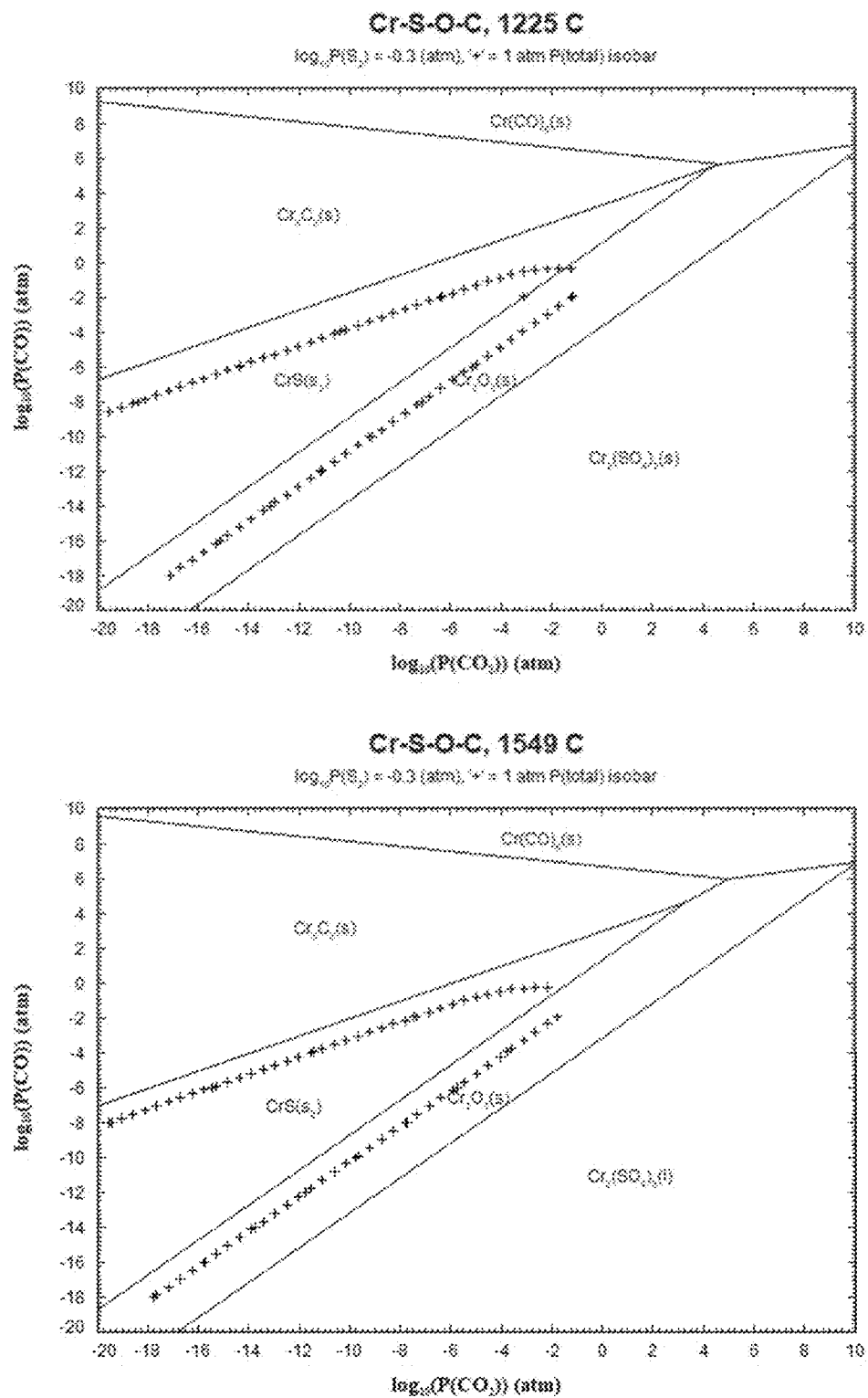
Figure 11I:
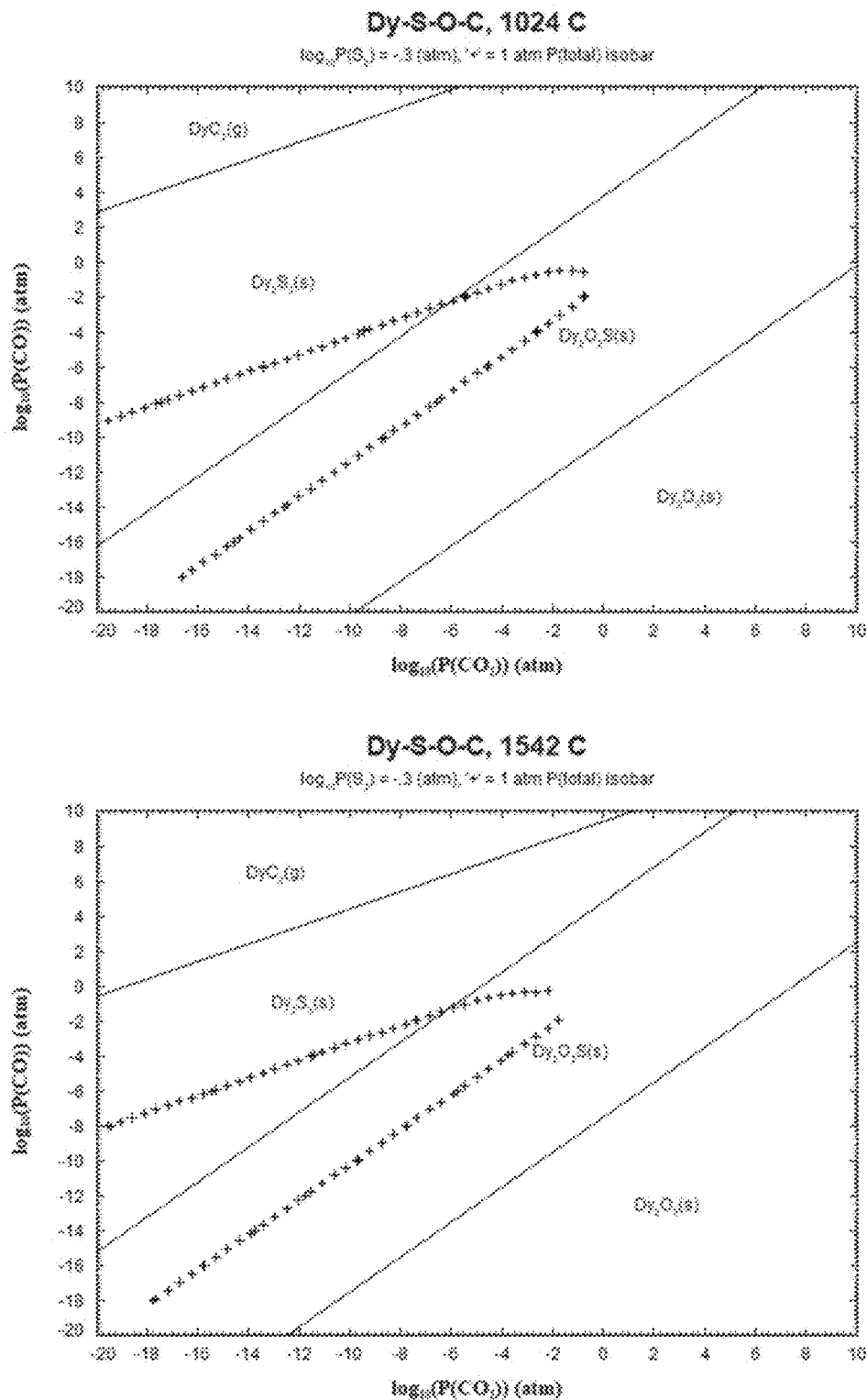
Figure 11J:
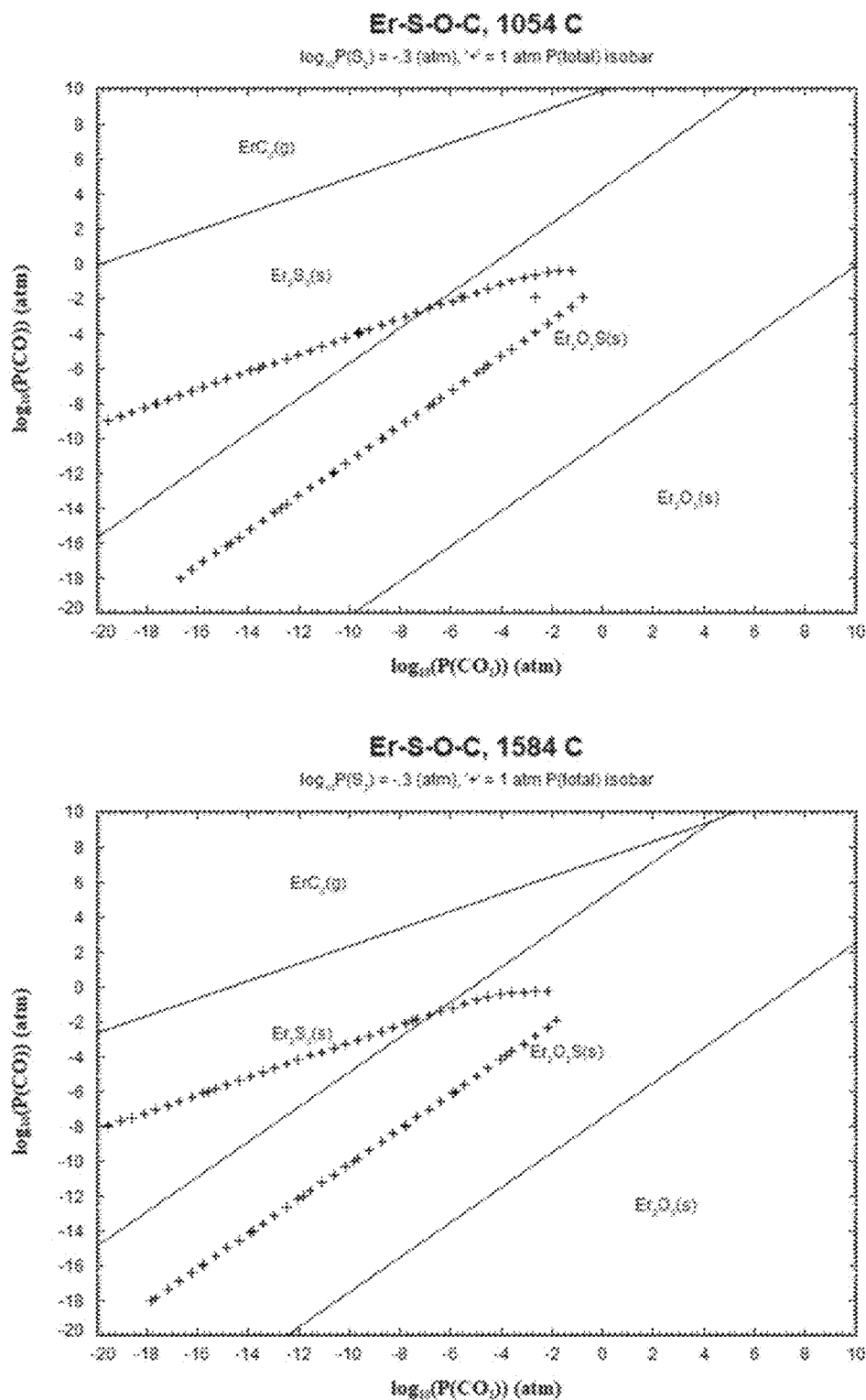
Figure 11K:
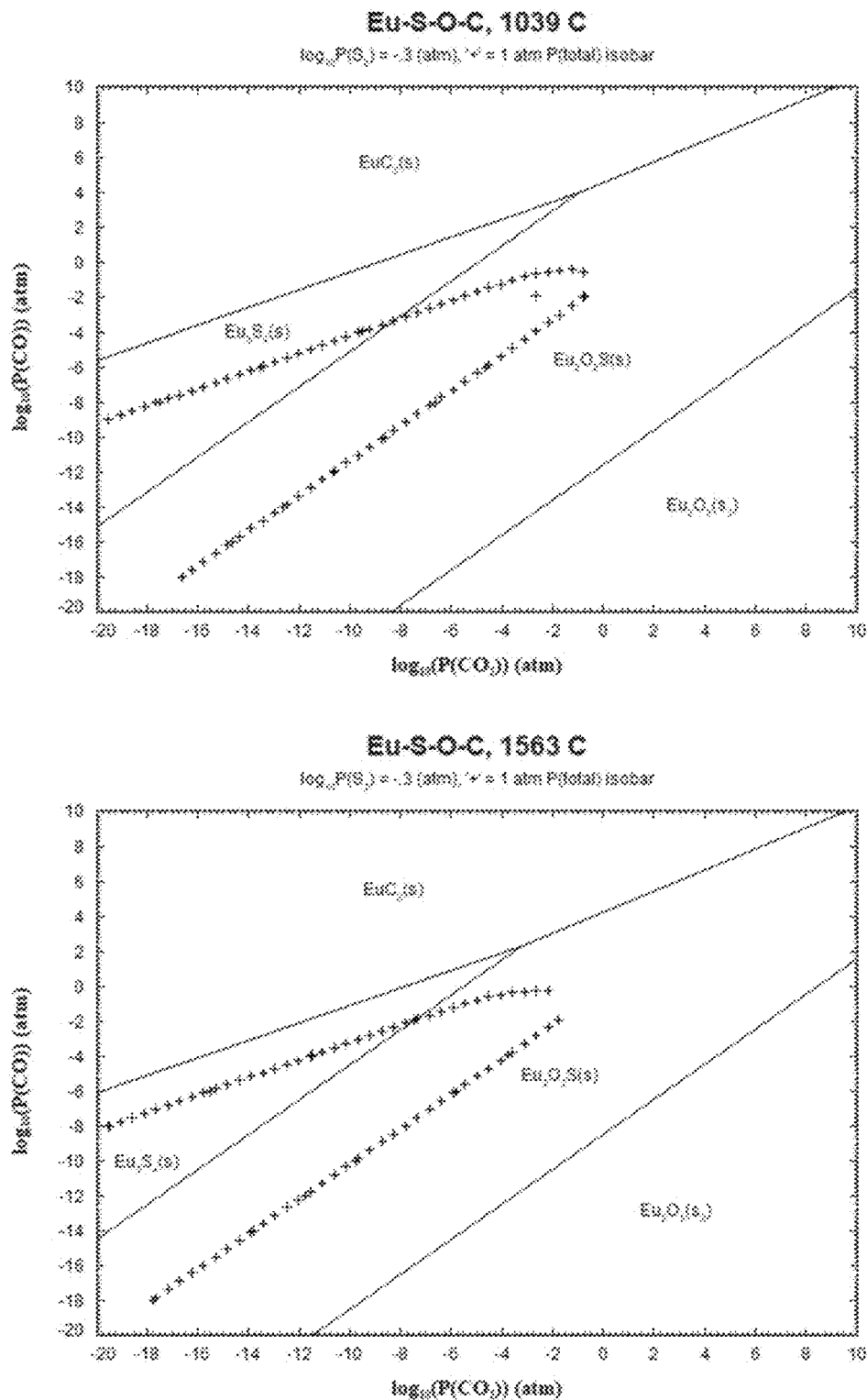
Figure 11L:
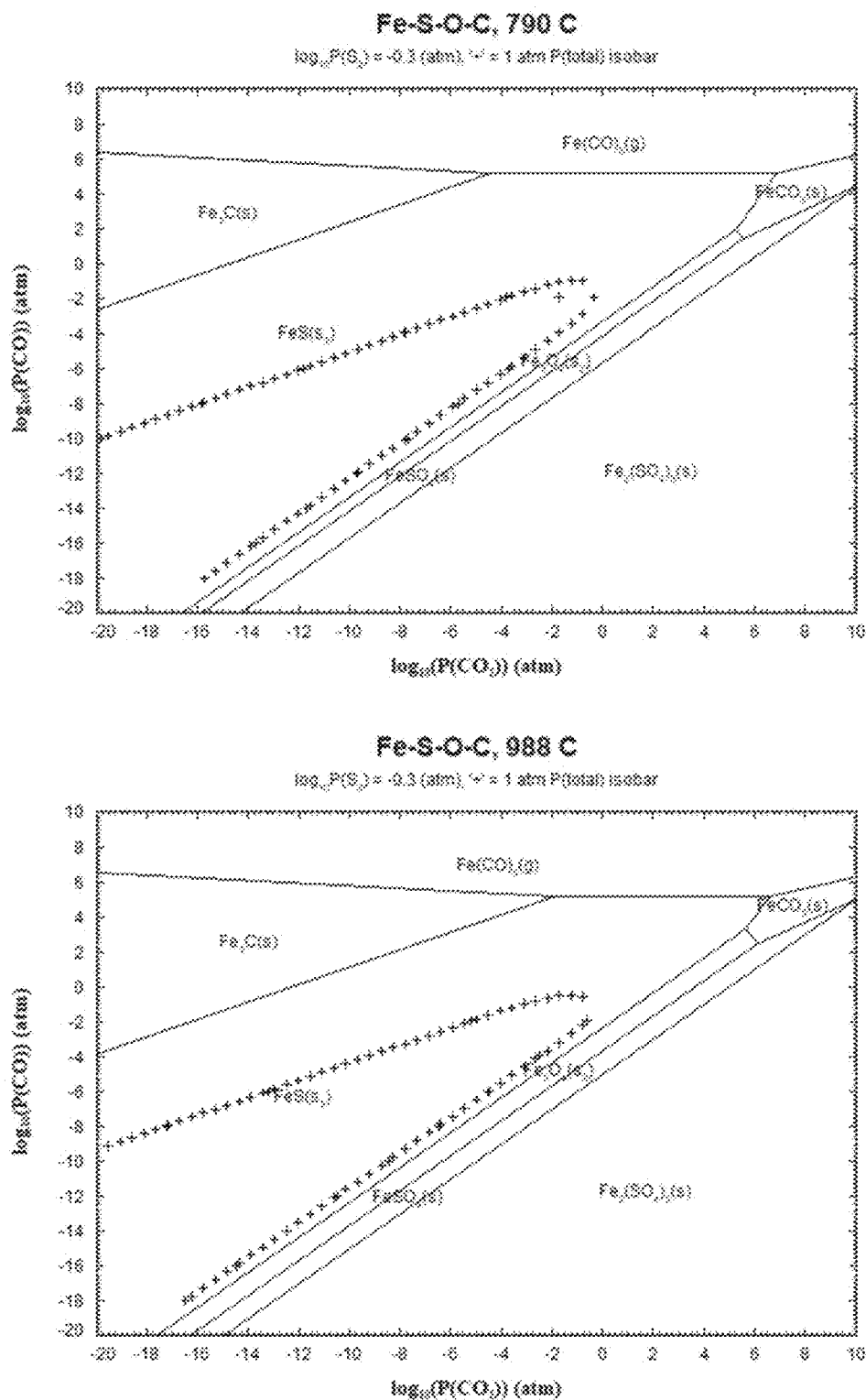
Figure 11M:
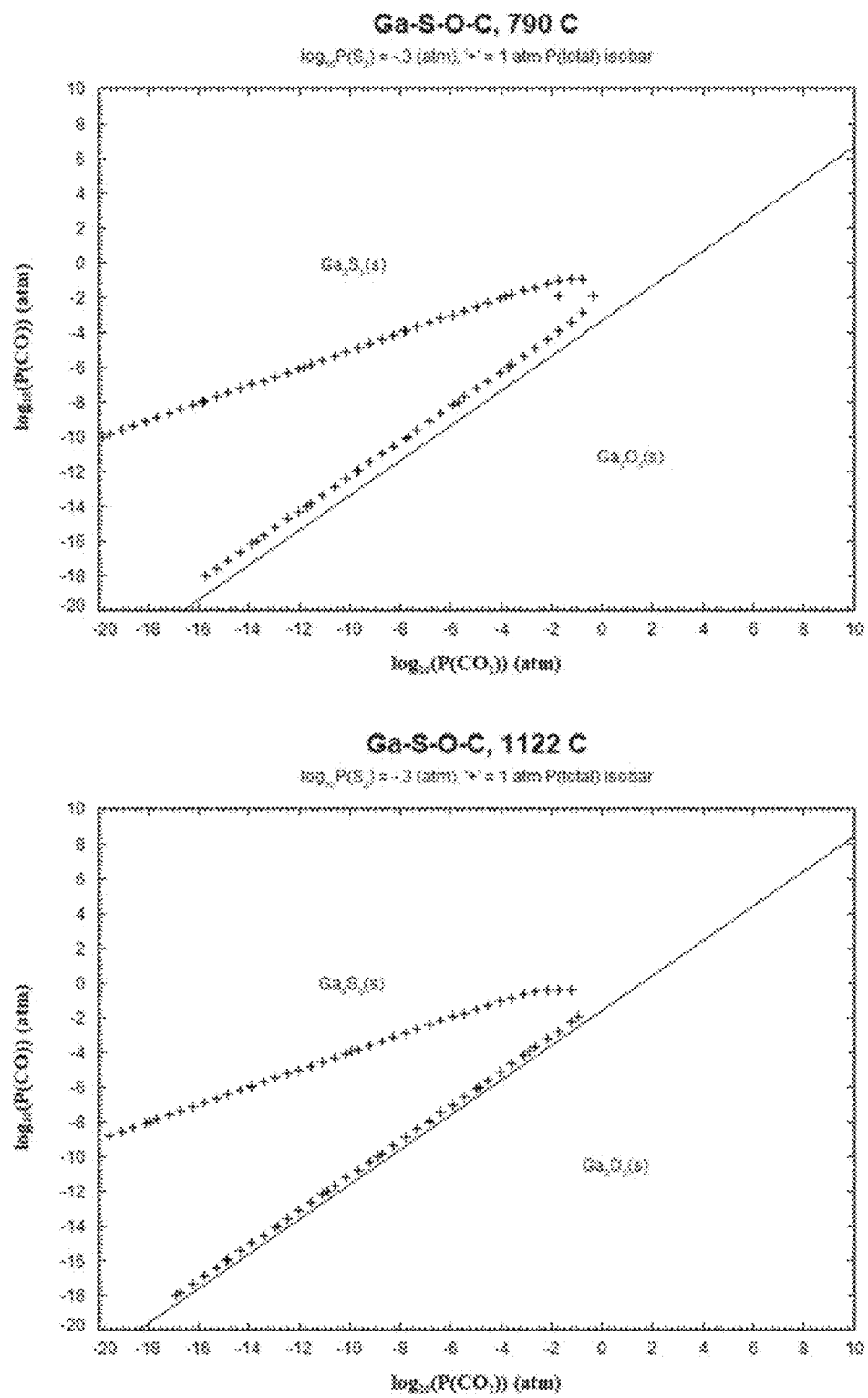
Figure 11N:
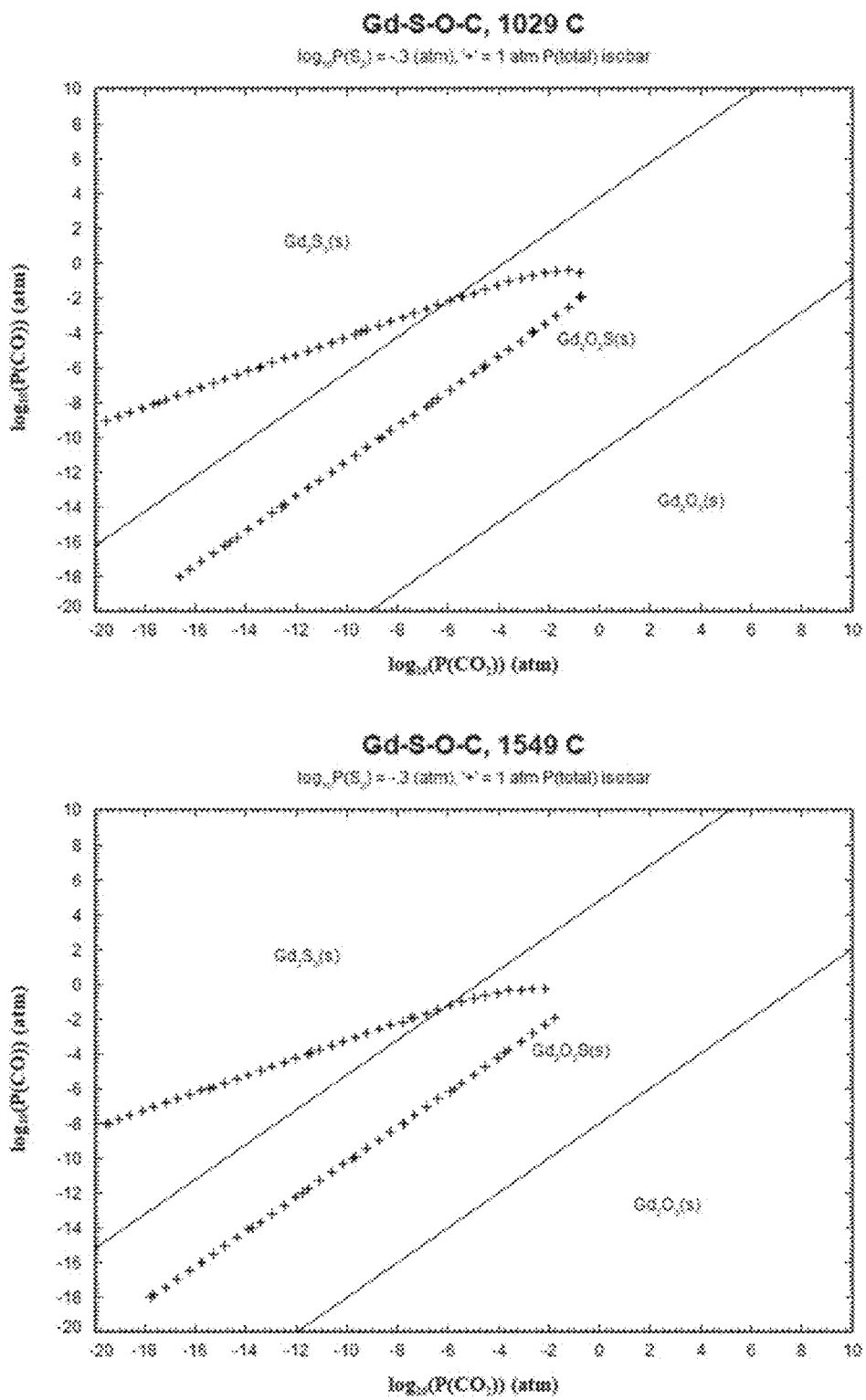
Figure 11O:
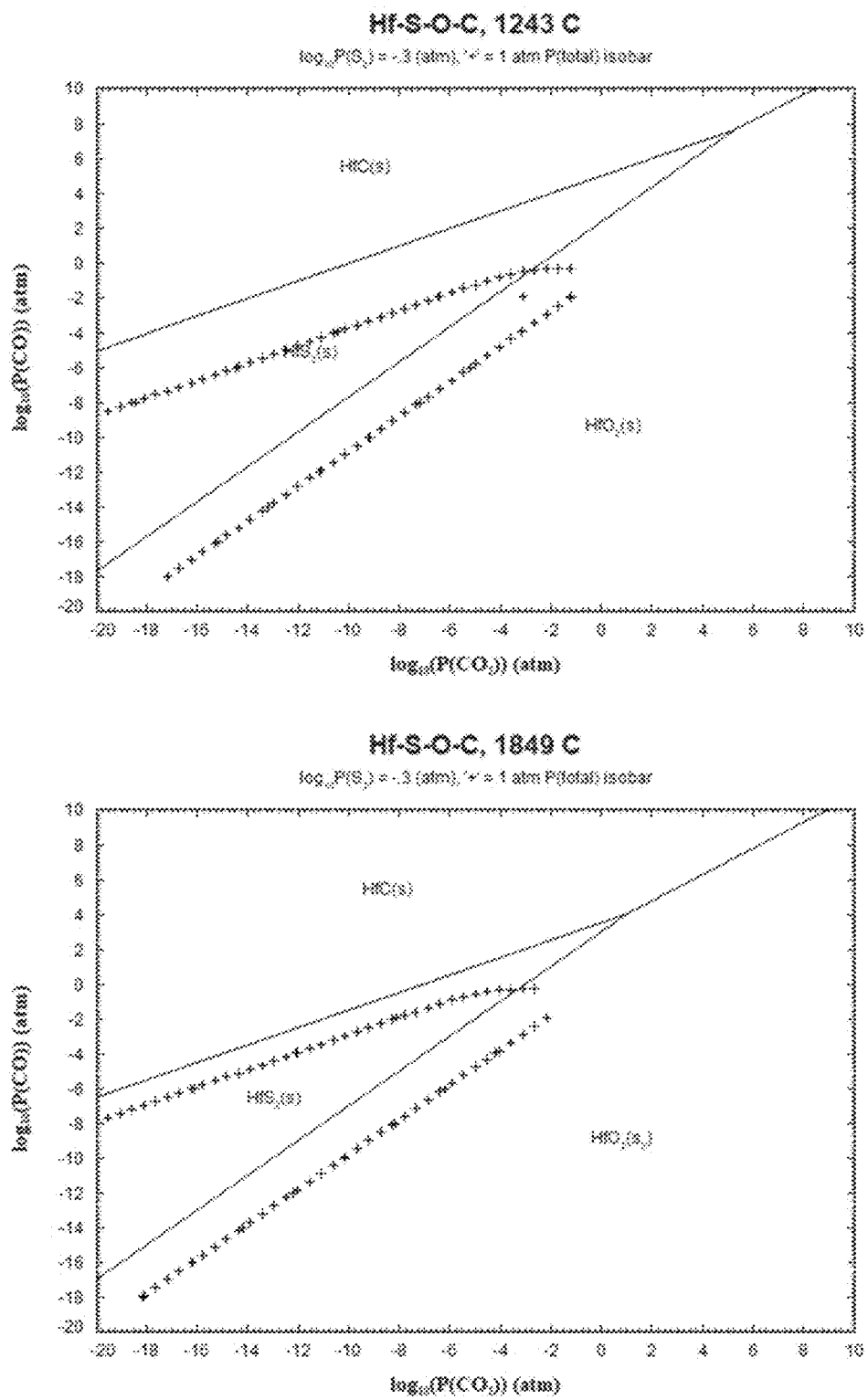
Figure 11P:
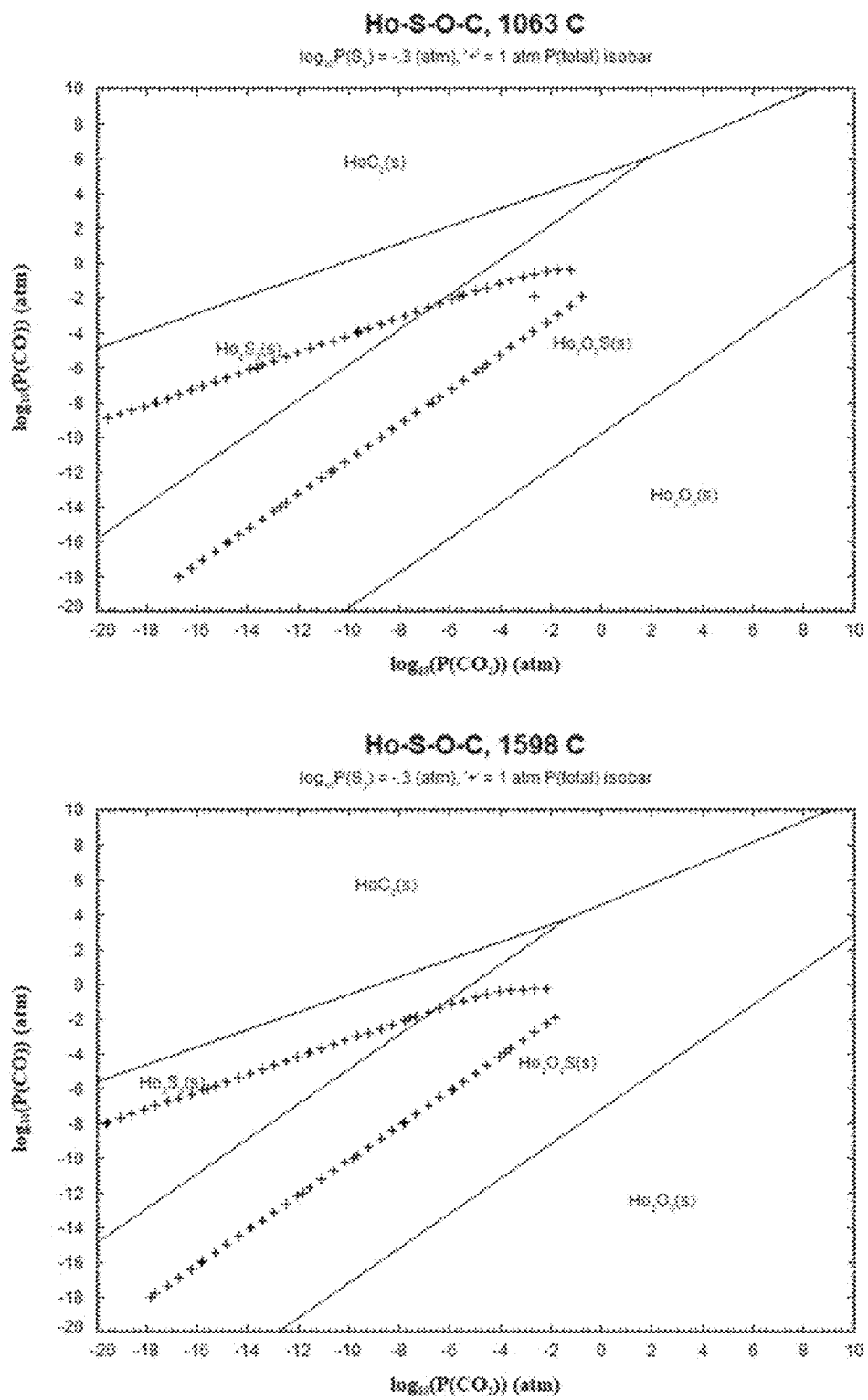
Figure 11Q:
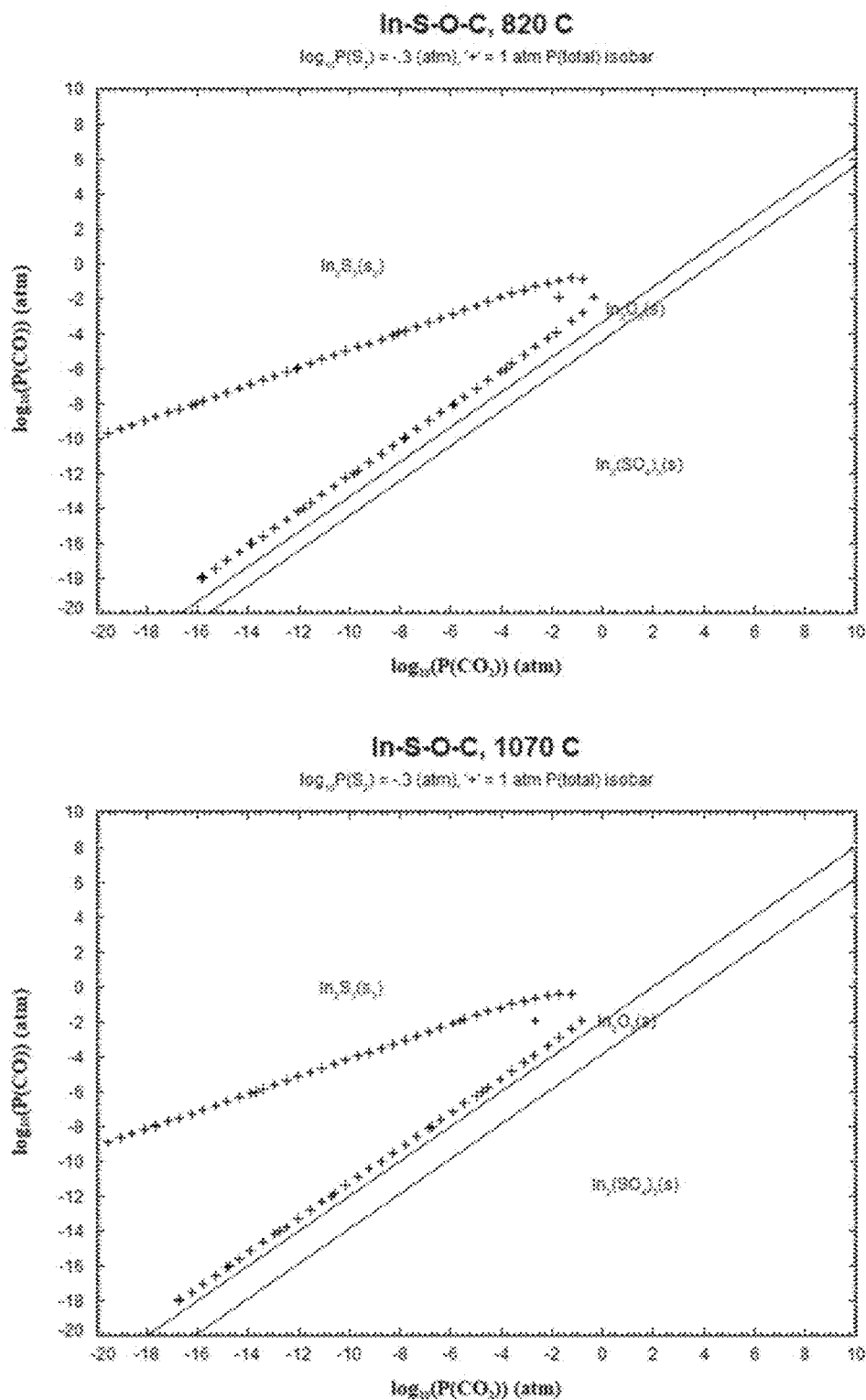
Figure 11R:
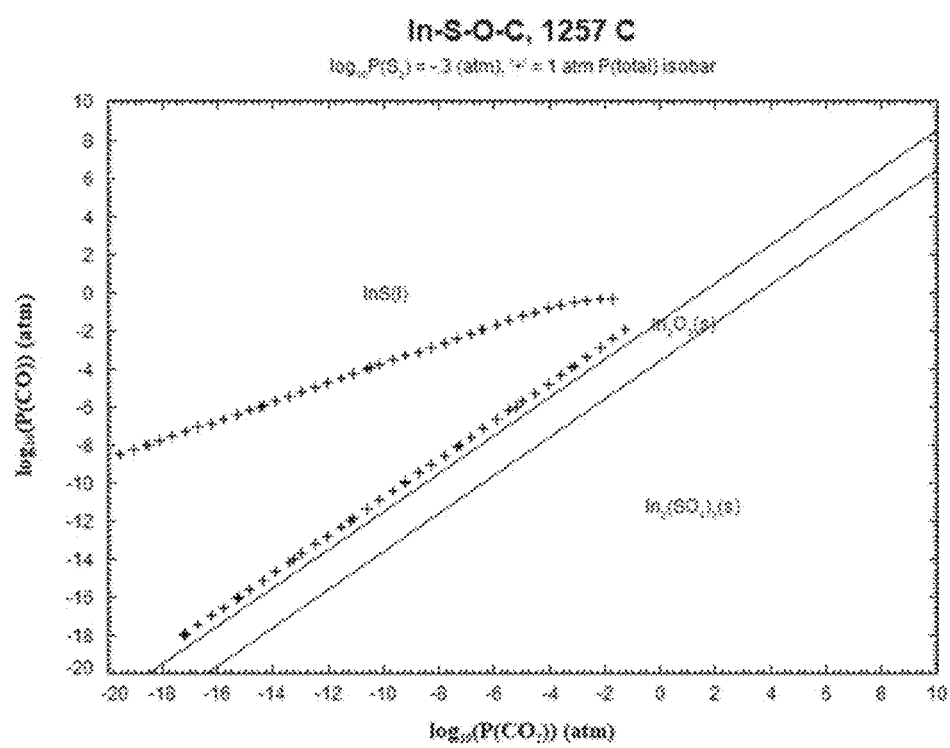
Figure 11S:
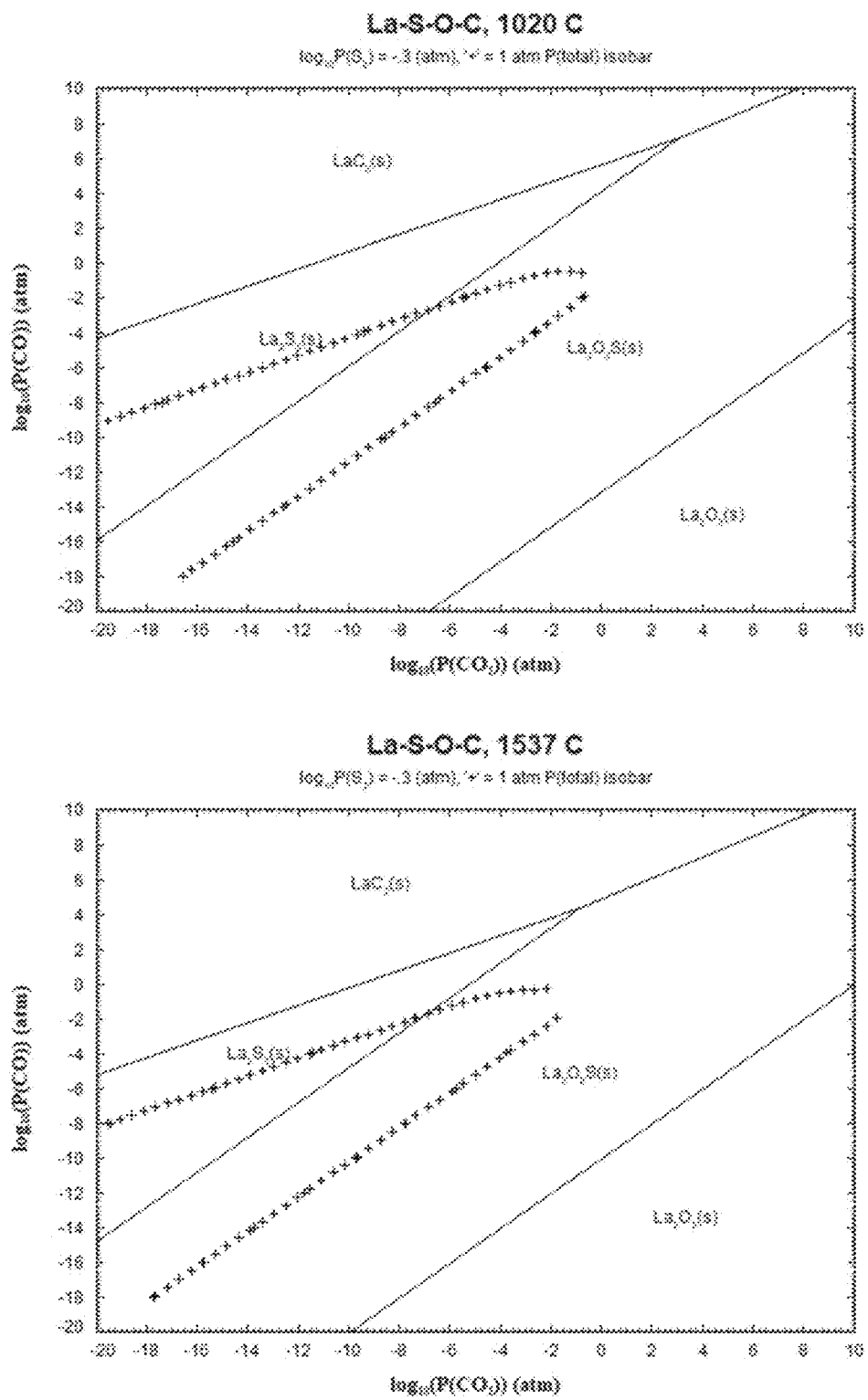
Figure 11T:
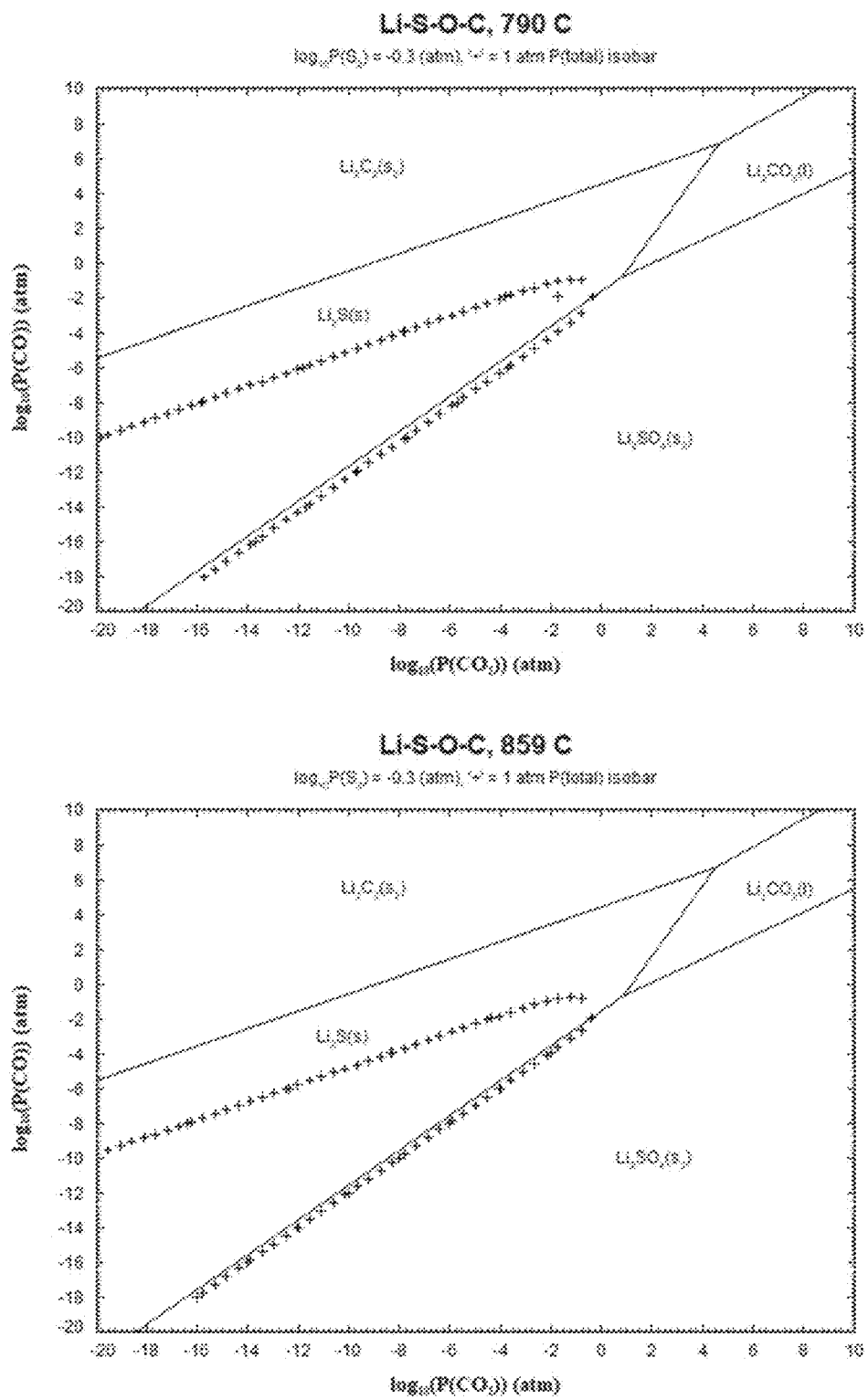
Figure 11U:
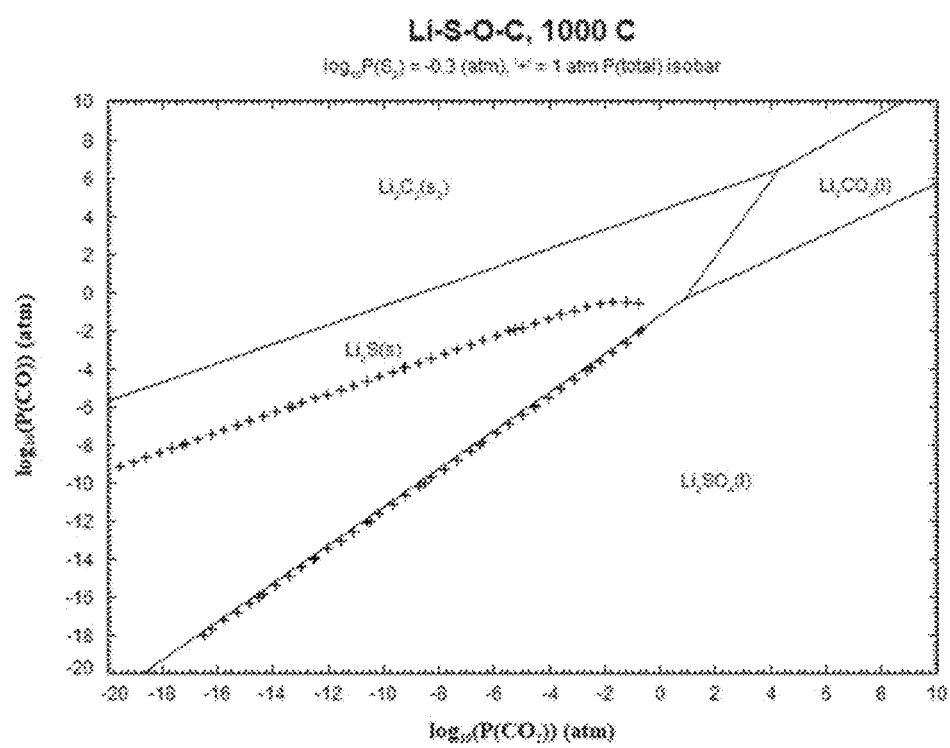
Figure 11V:
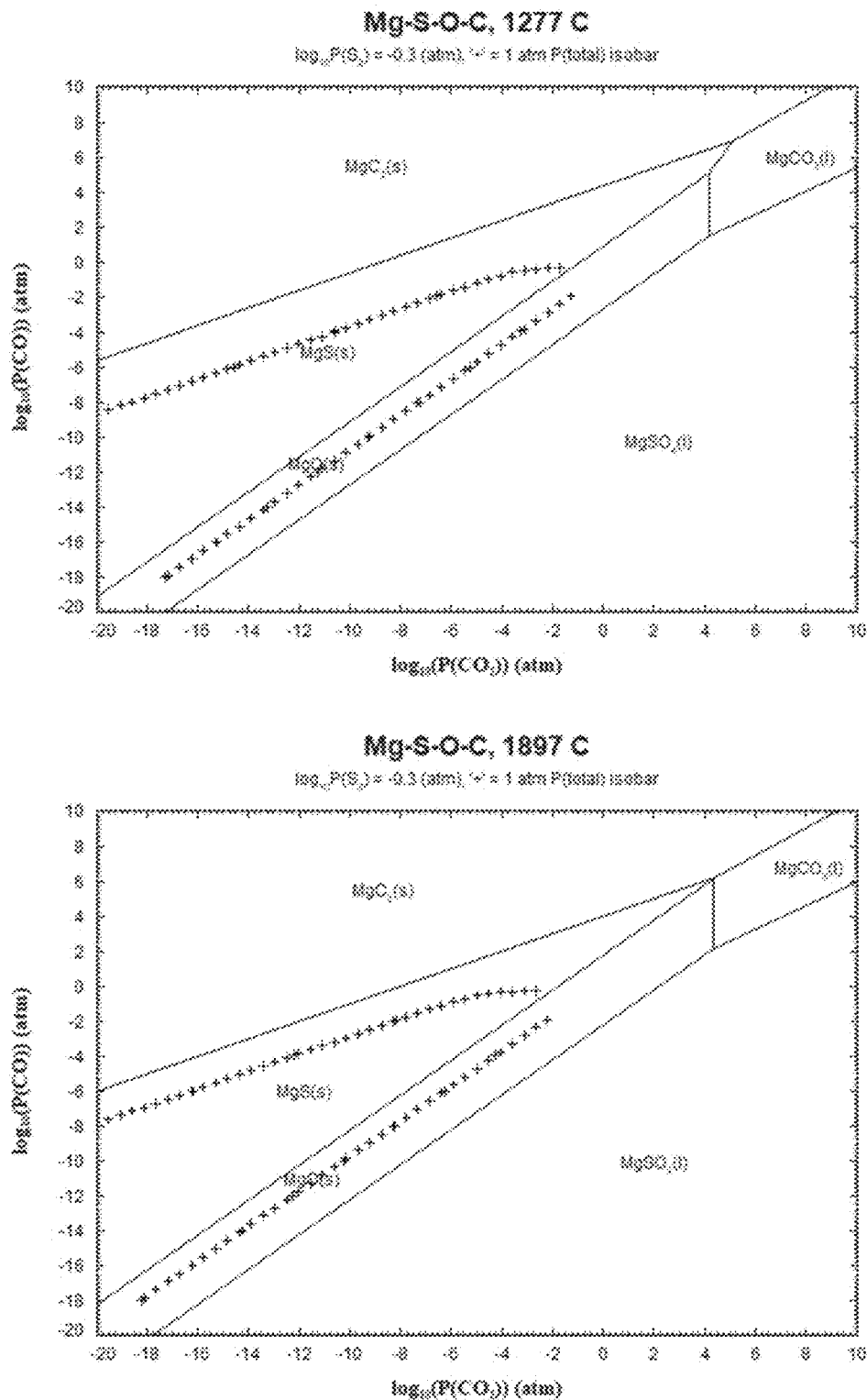
Figure 11W:
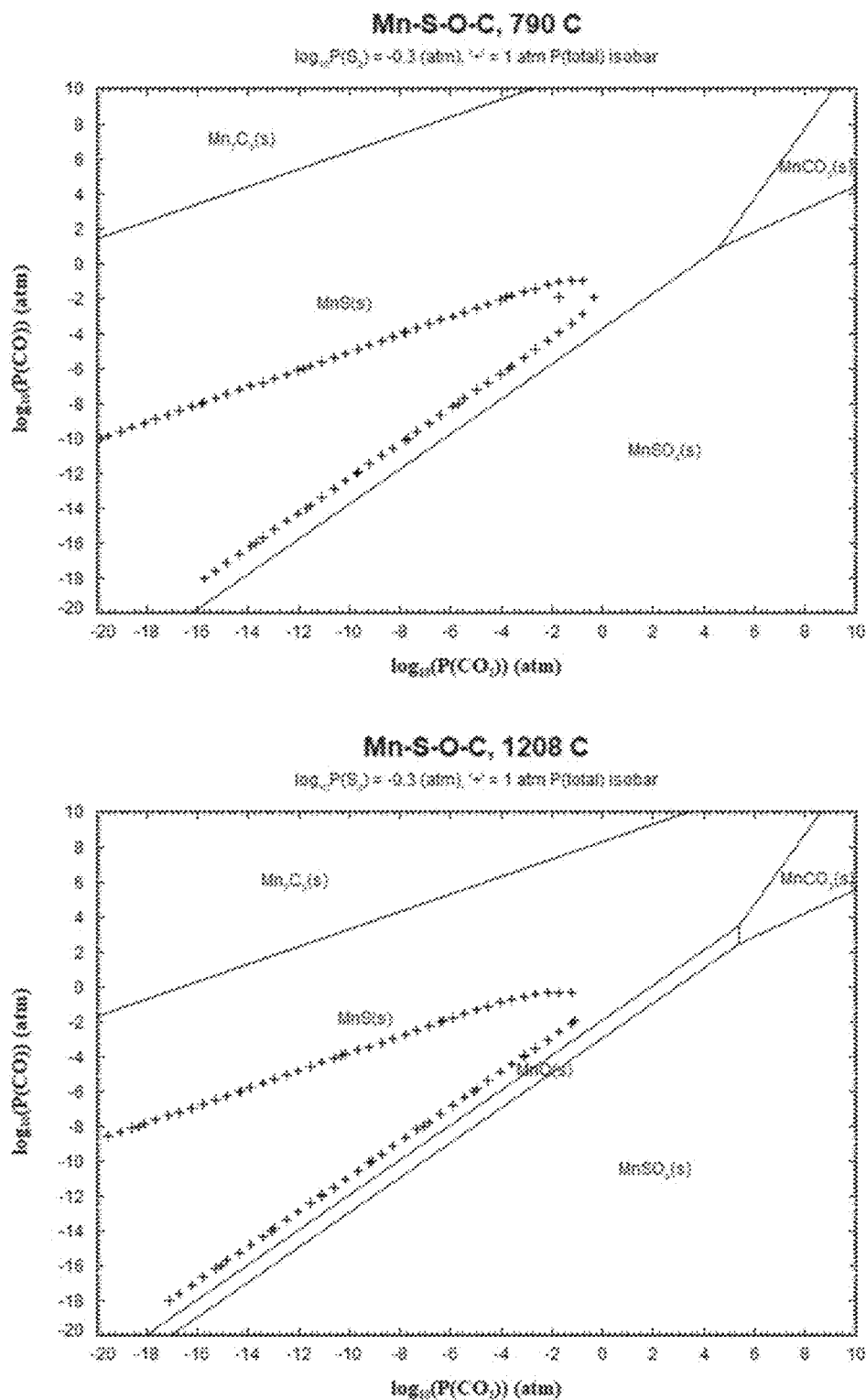
Figure 11X:
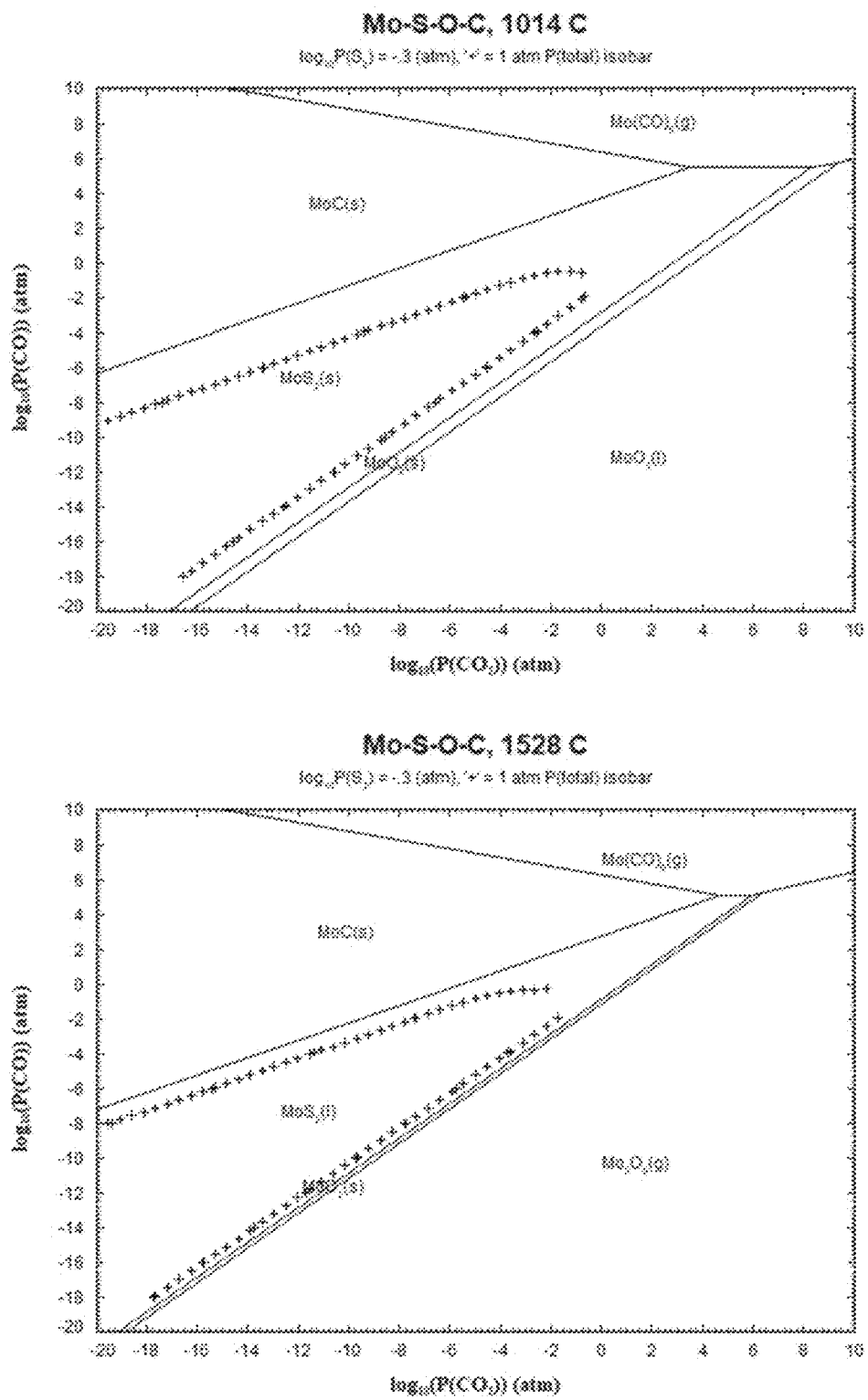
Figure 11Y:
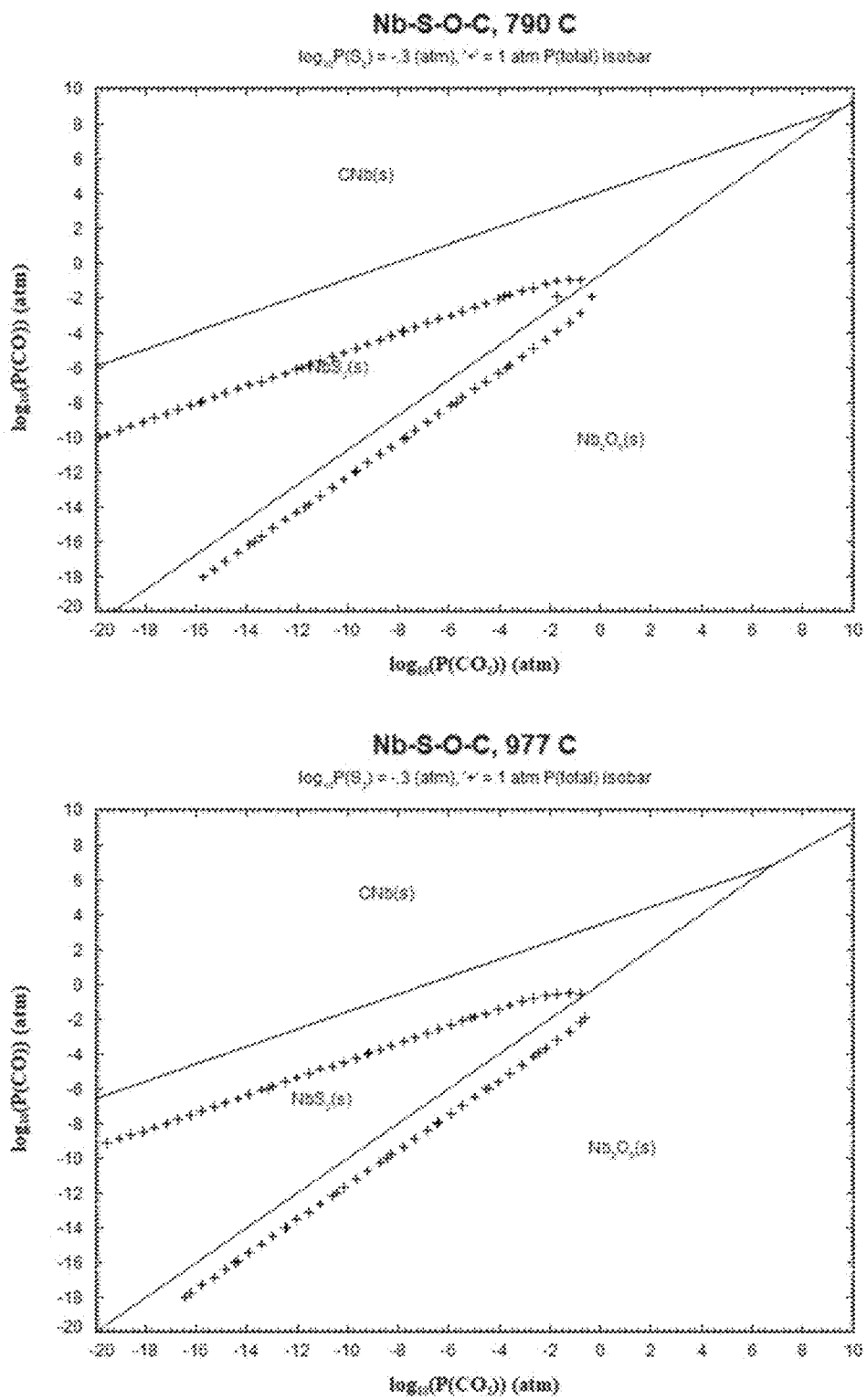
Figure 11Z:
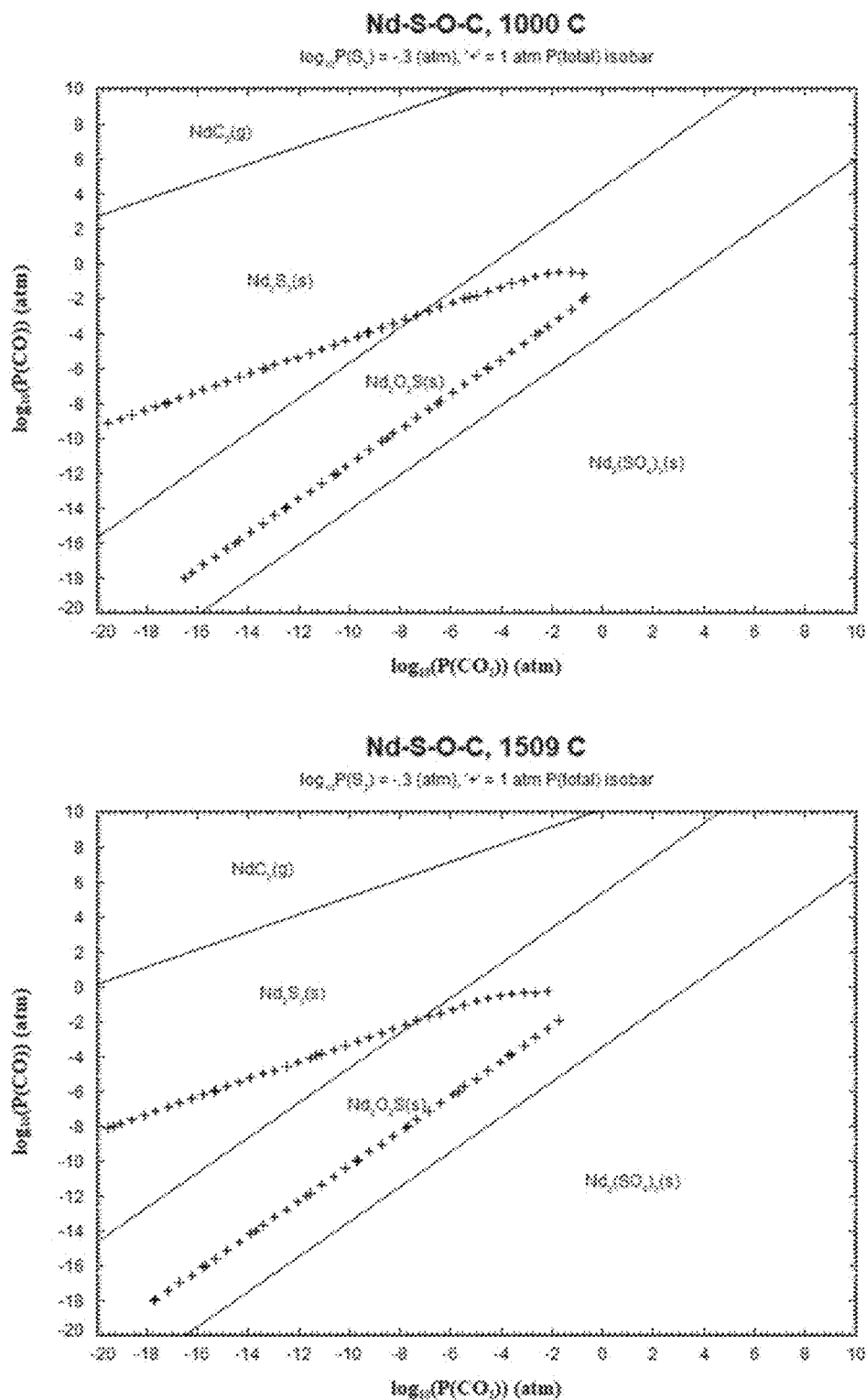
Figure 12A:
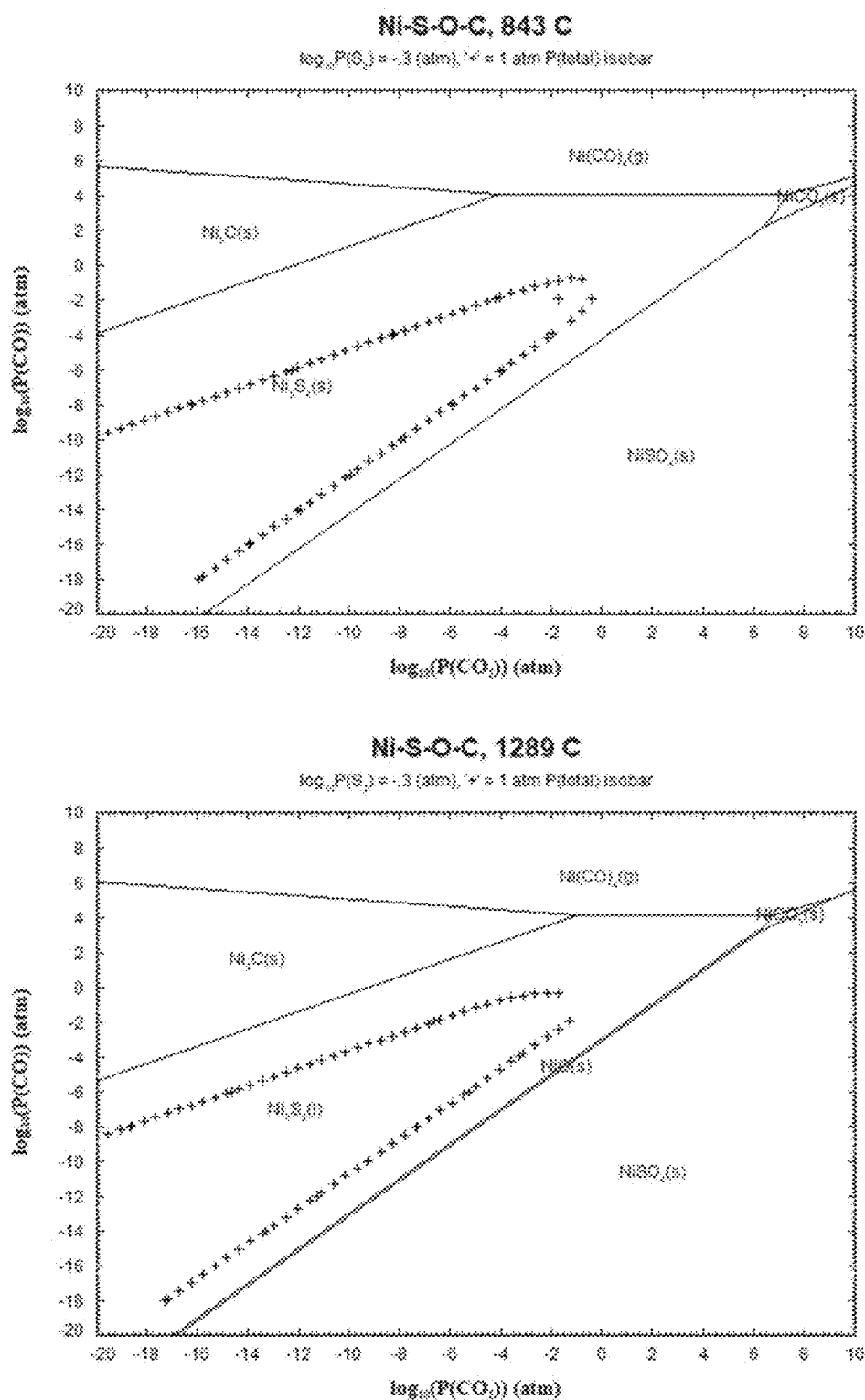
Figure 12B:
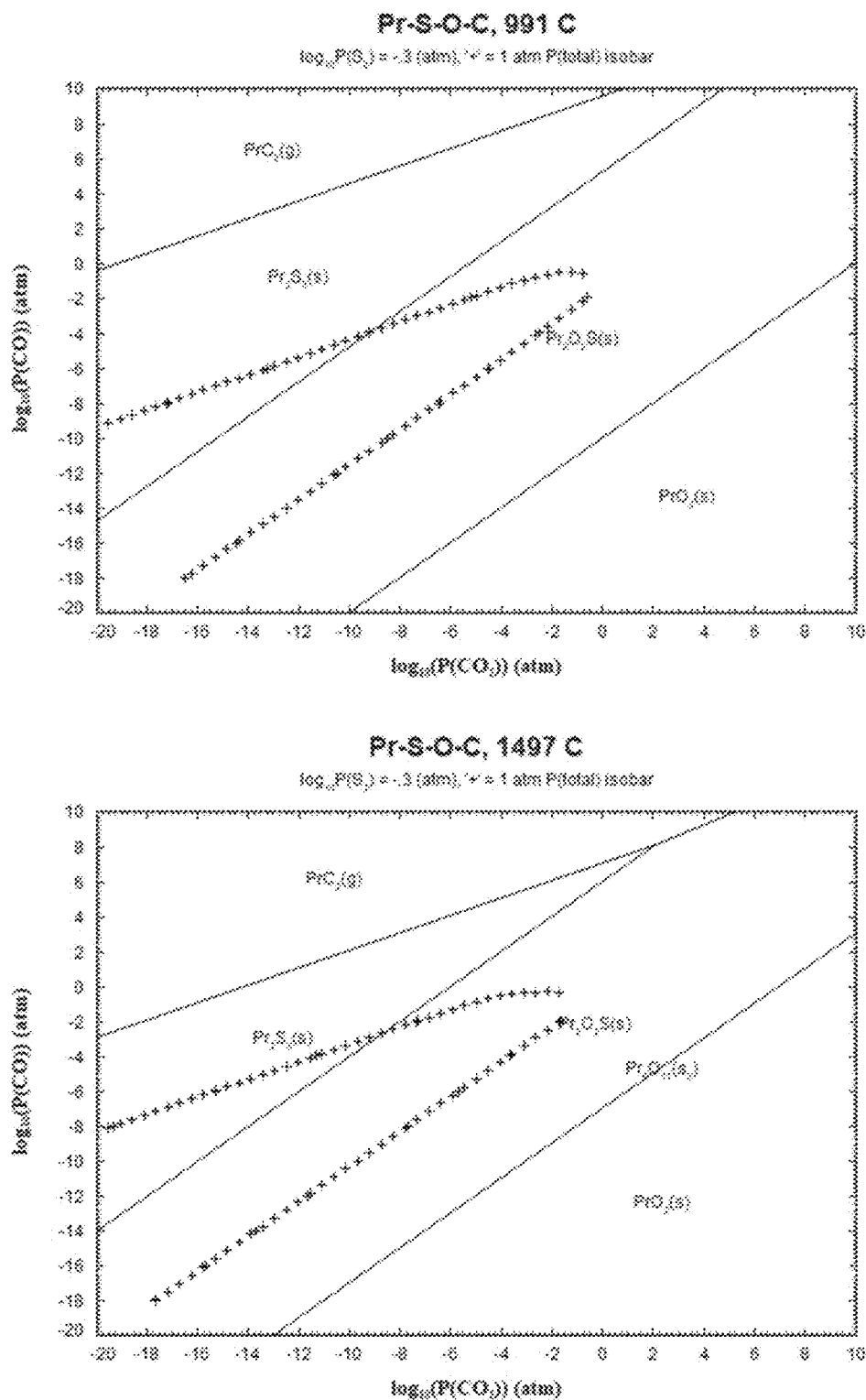
Figure 12C:
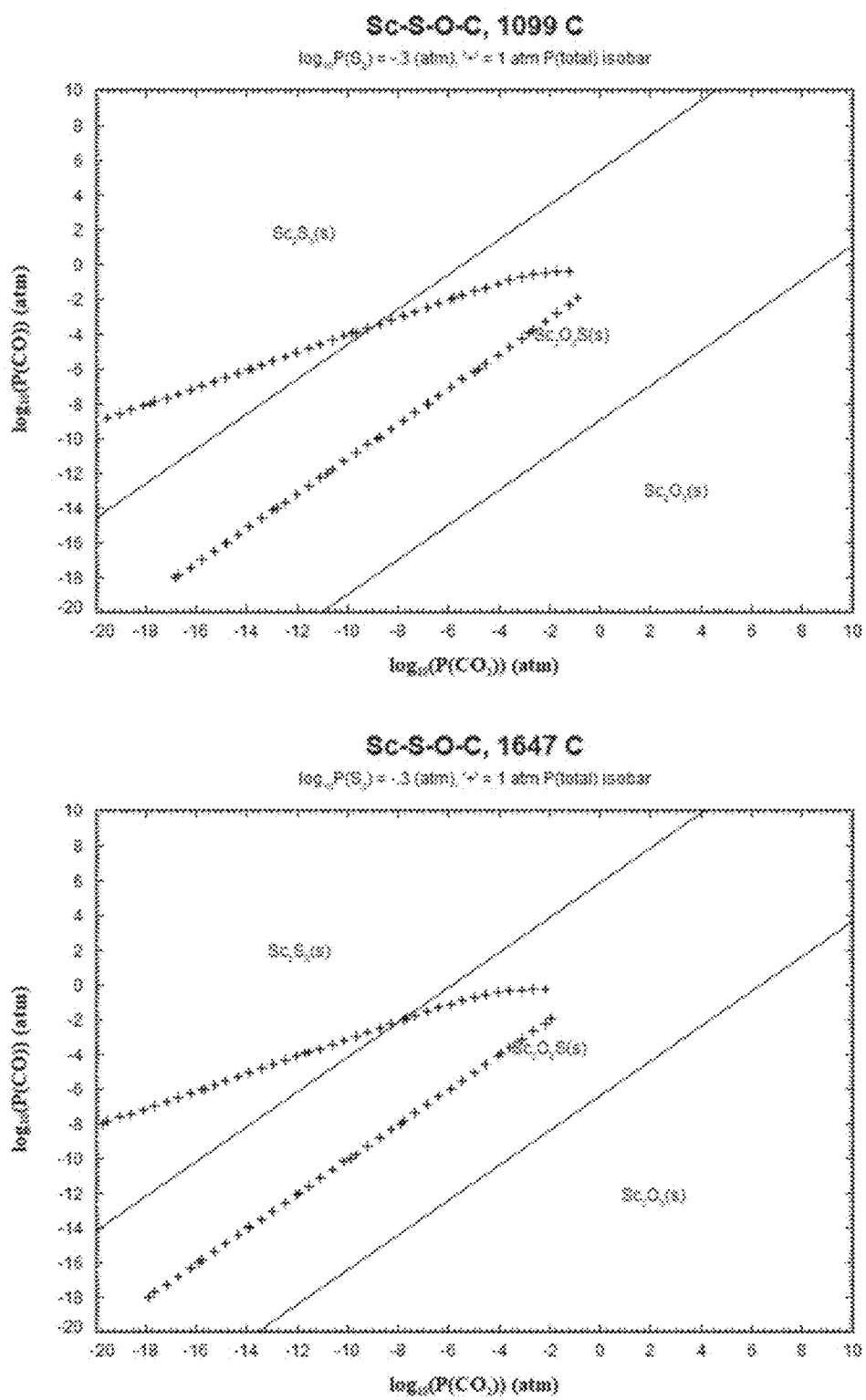
Figure 12D:
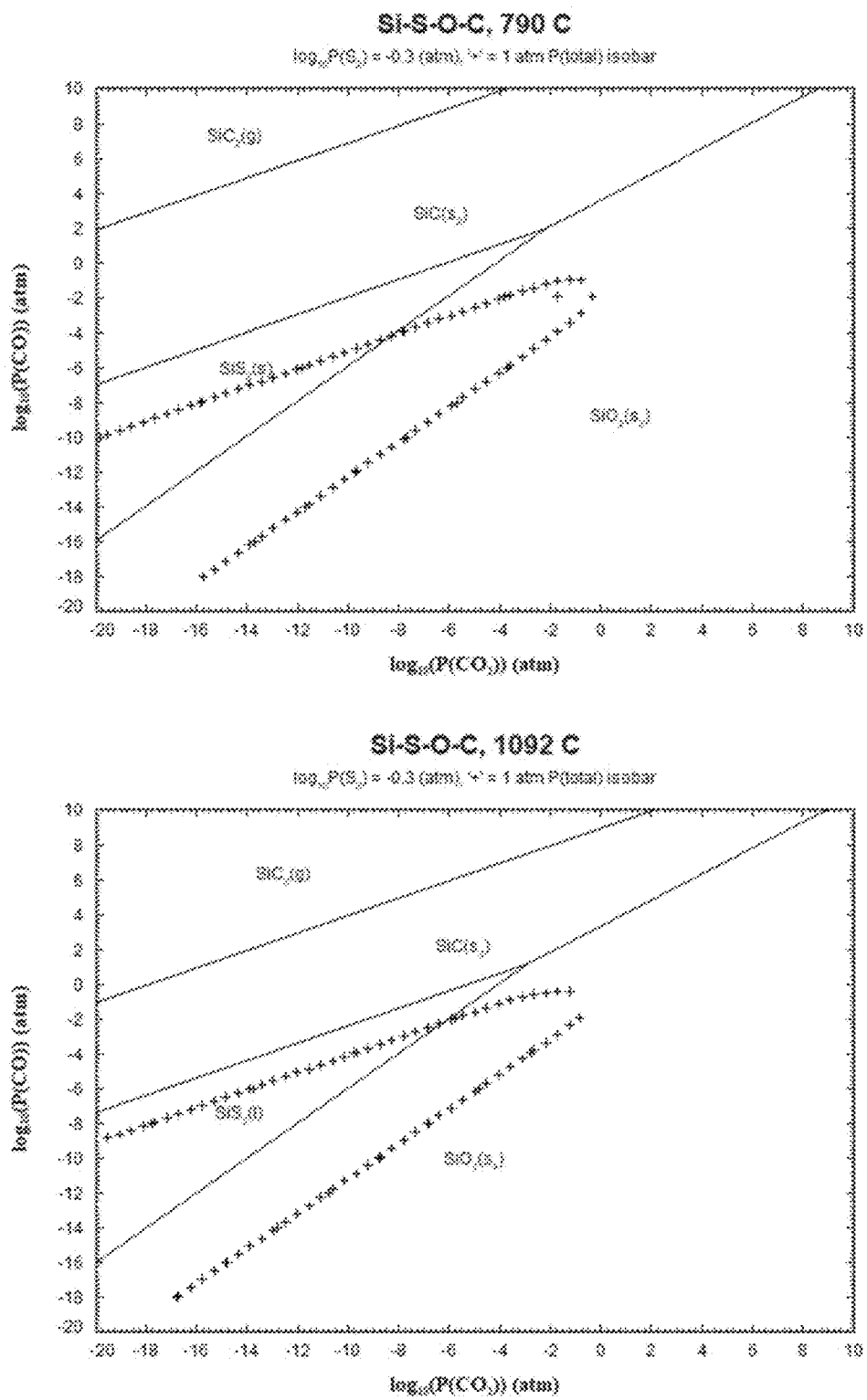
Figure 12E:
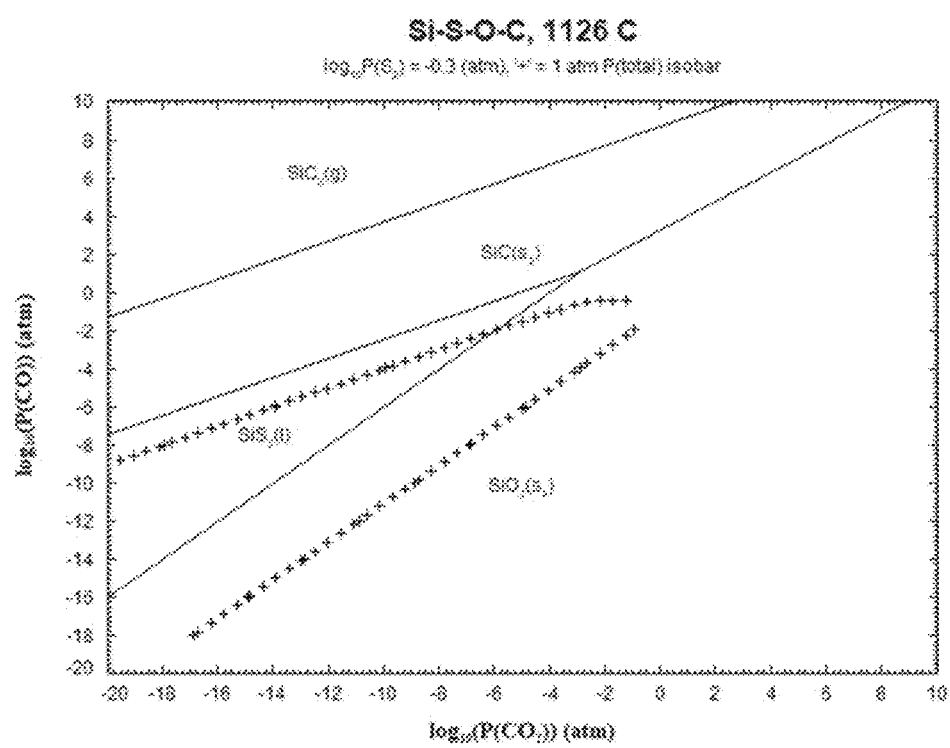
Figure 12F:
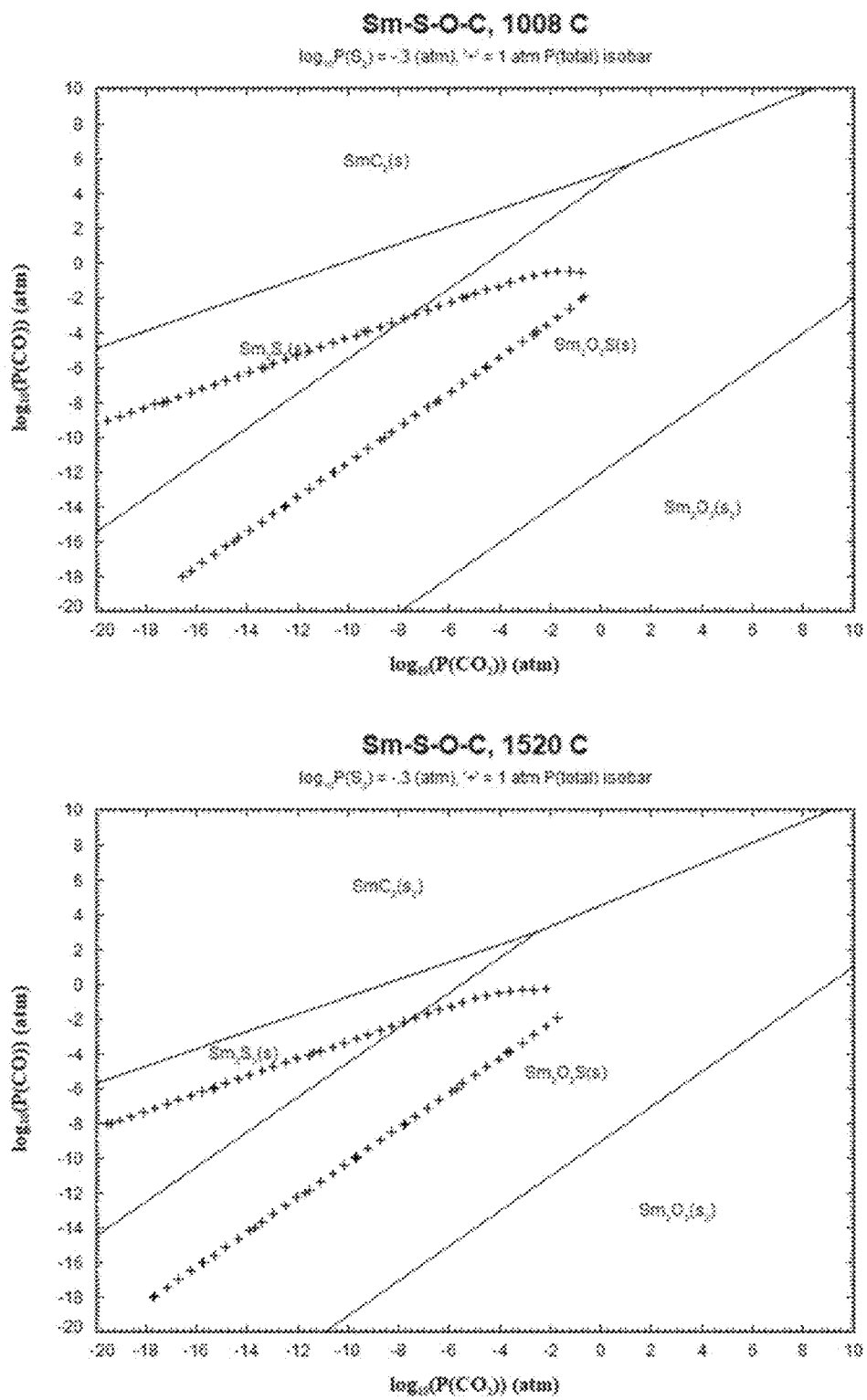
Figure 12G:
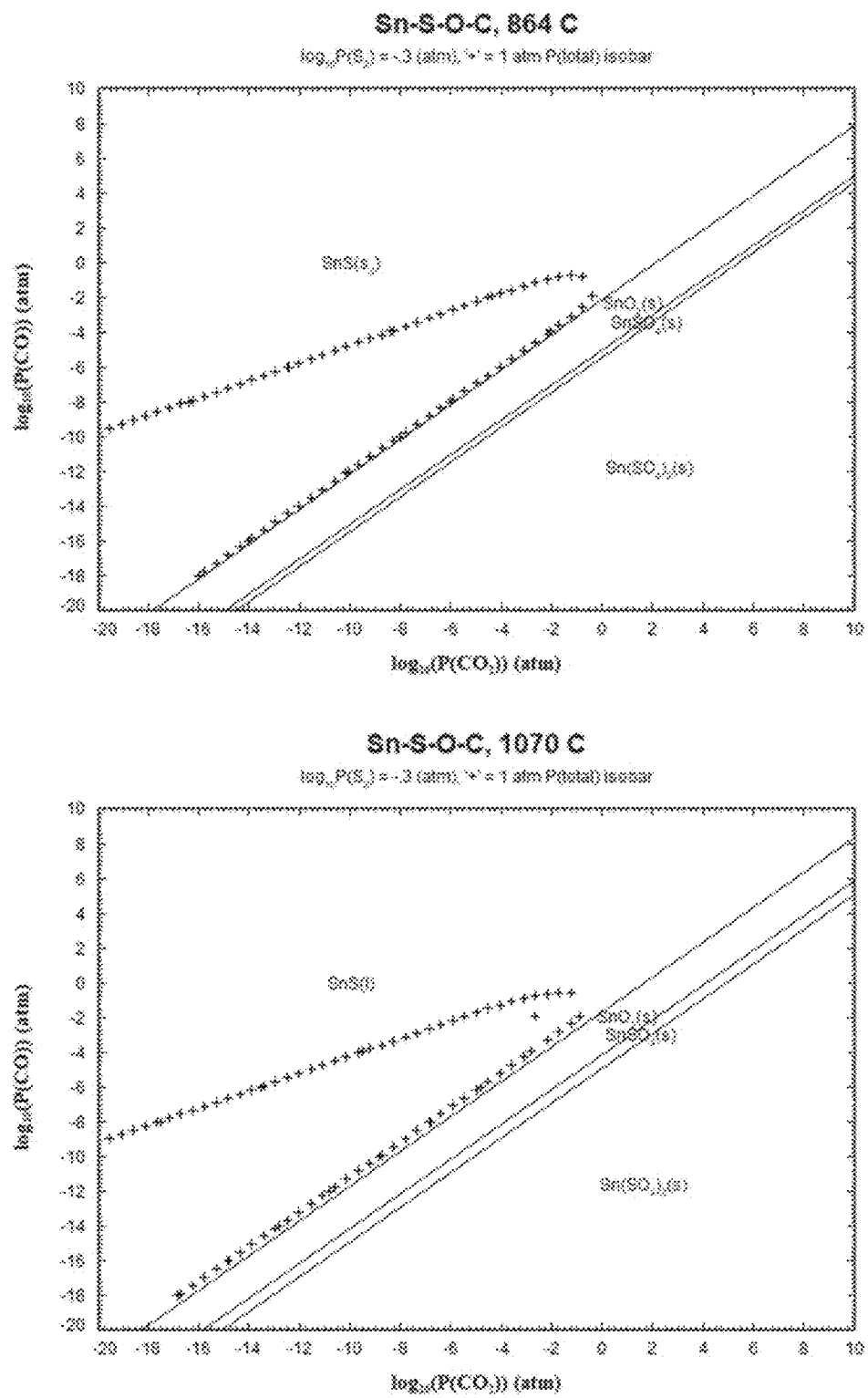
Figure 12H:
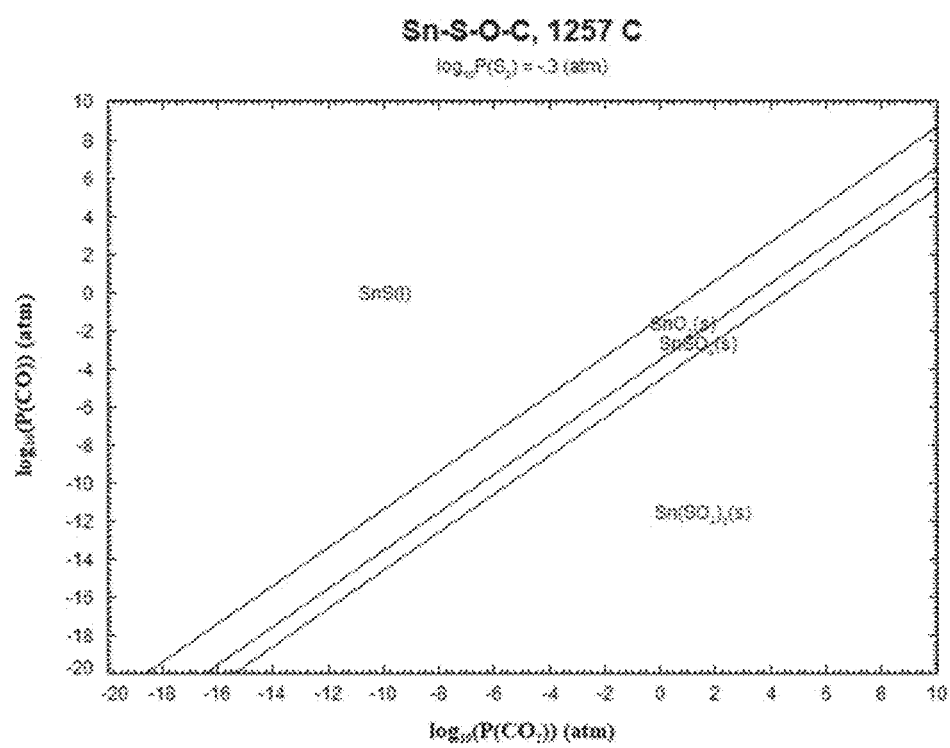
Figure 12I:
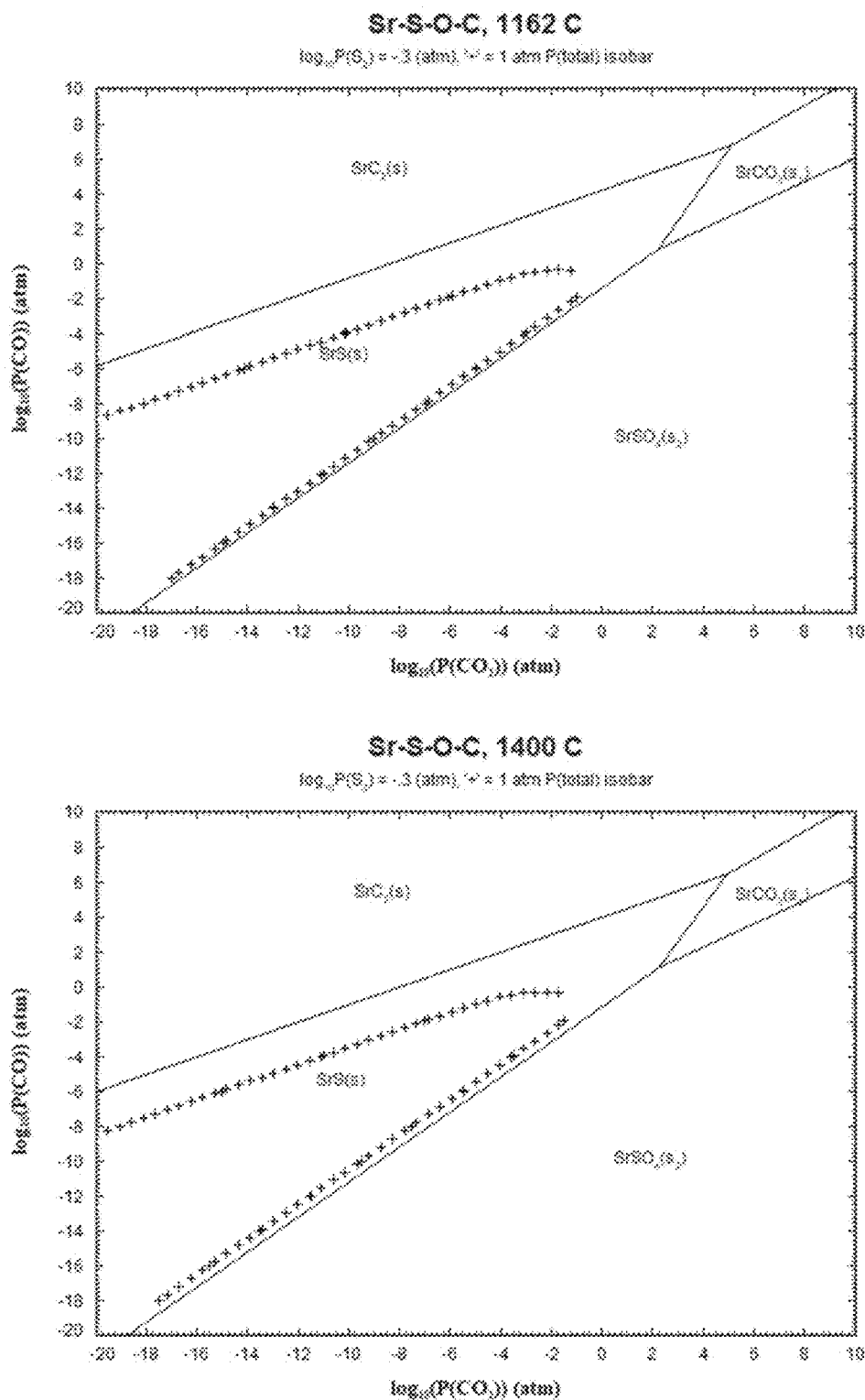
Figure 12J:
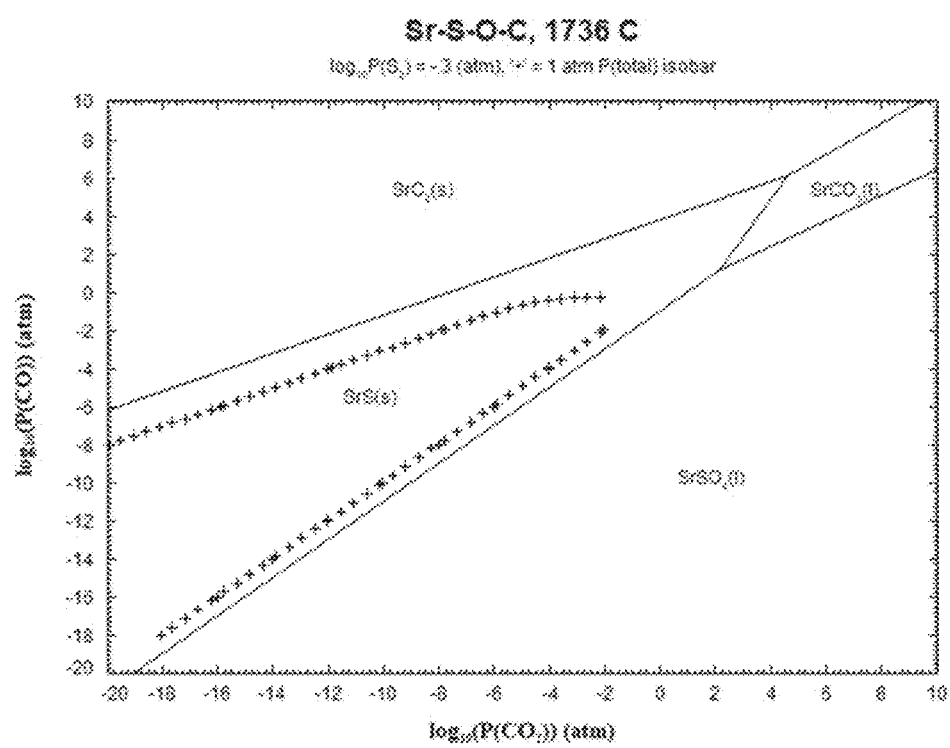
Figure 12K:
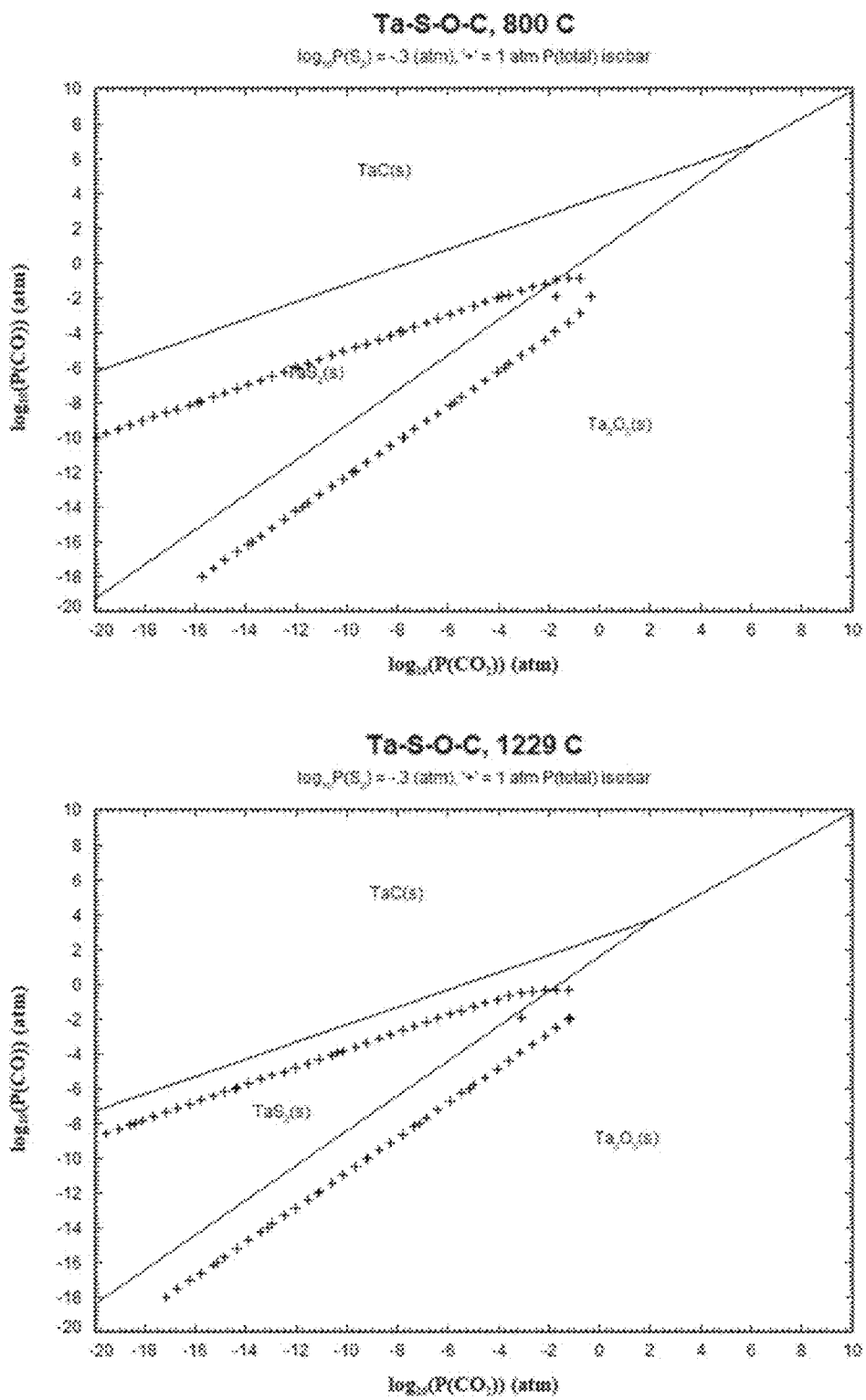
Figure 12L:
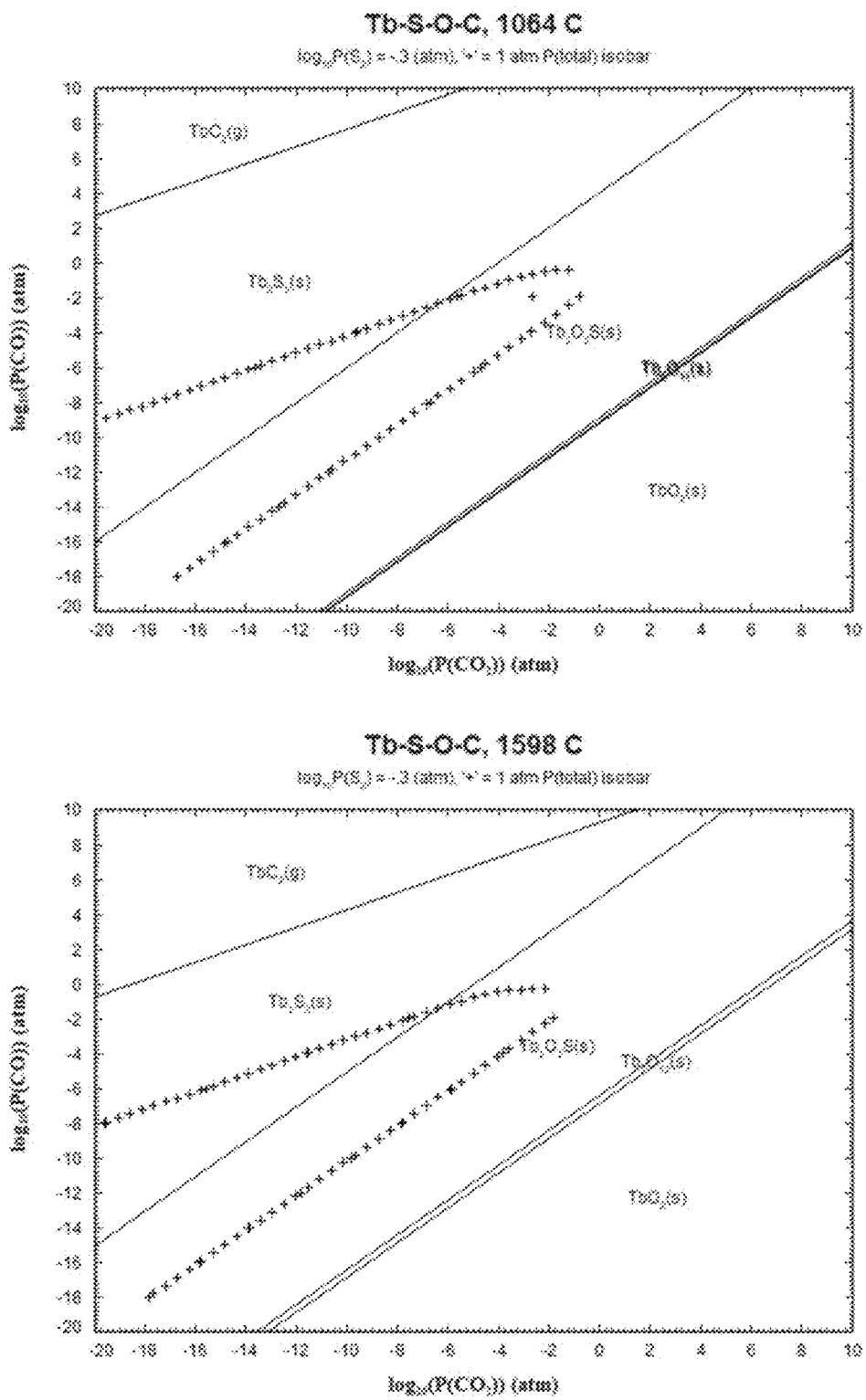
Figure 12M:
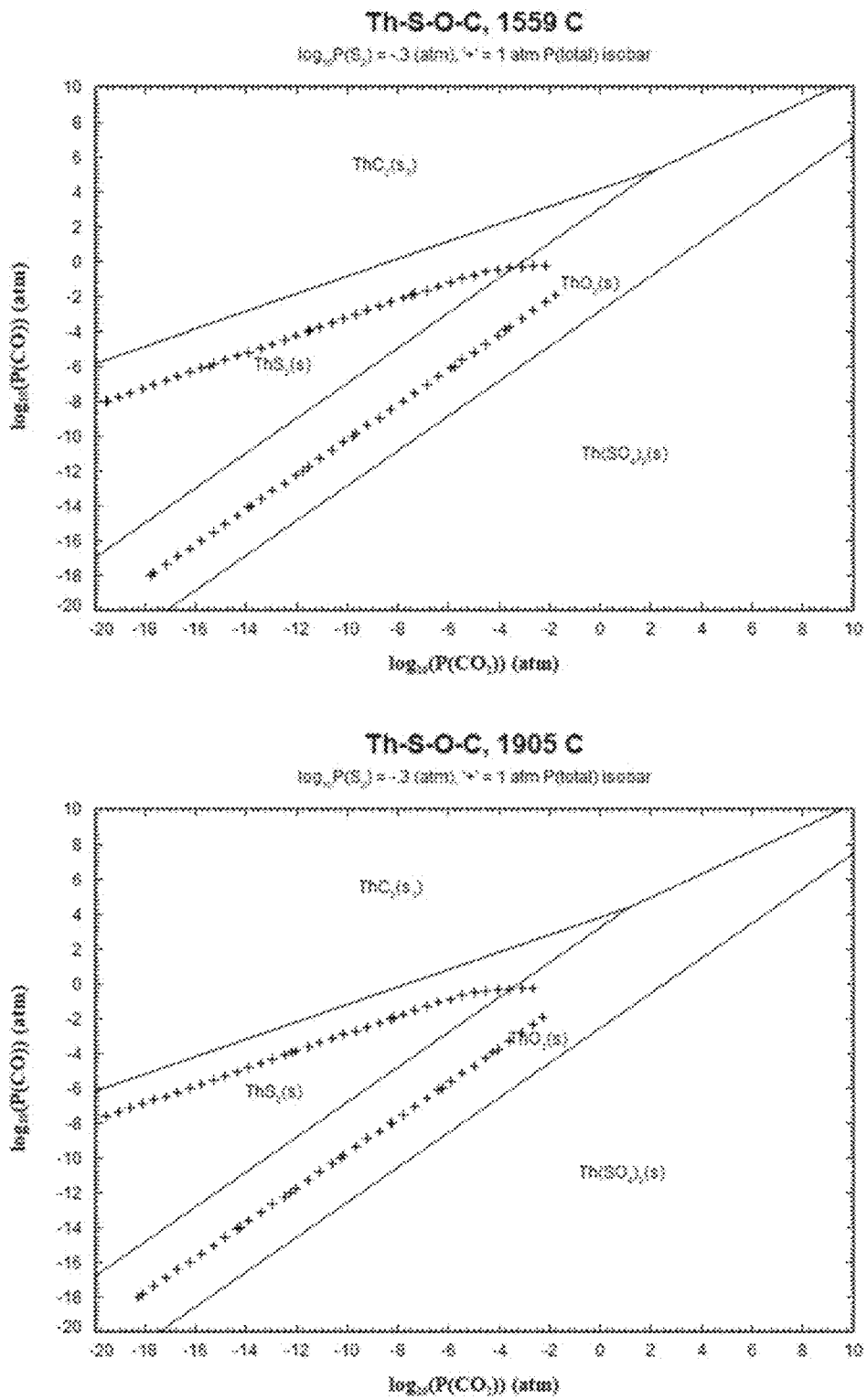
Figure 12N:
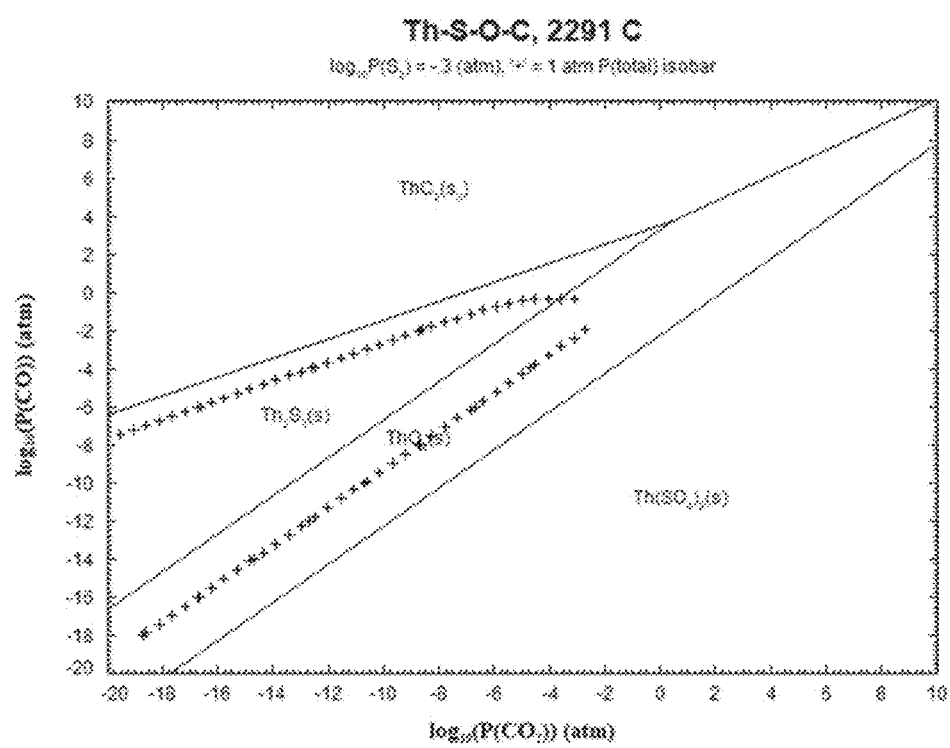
Figure 12O:
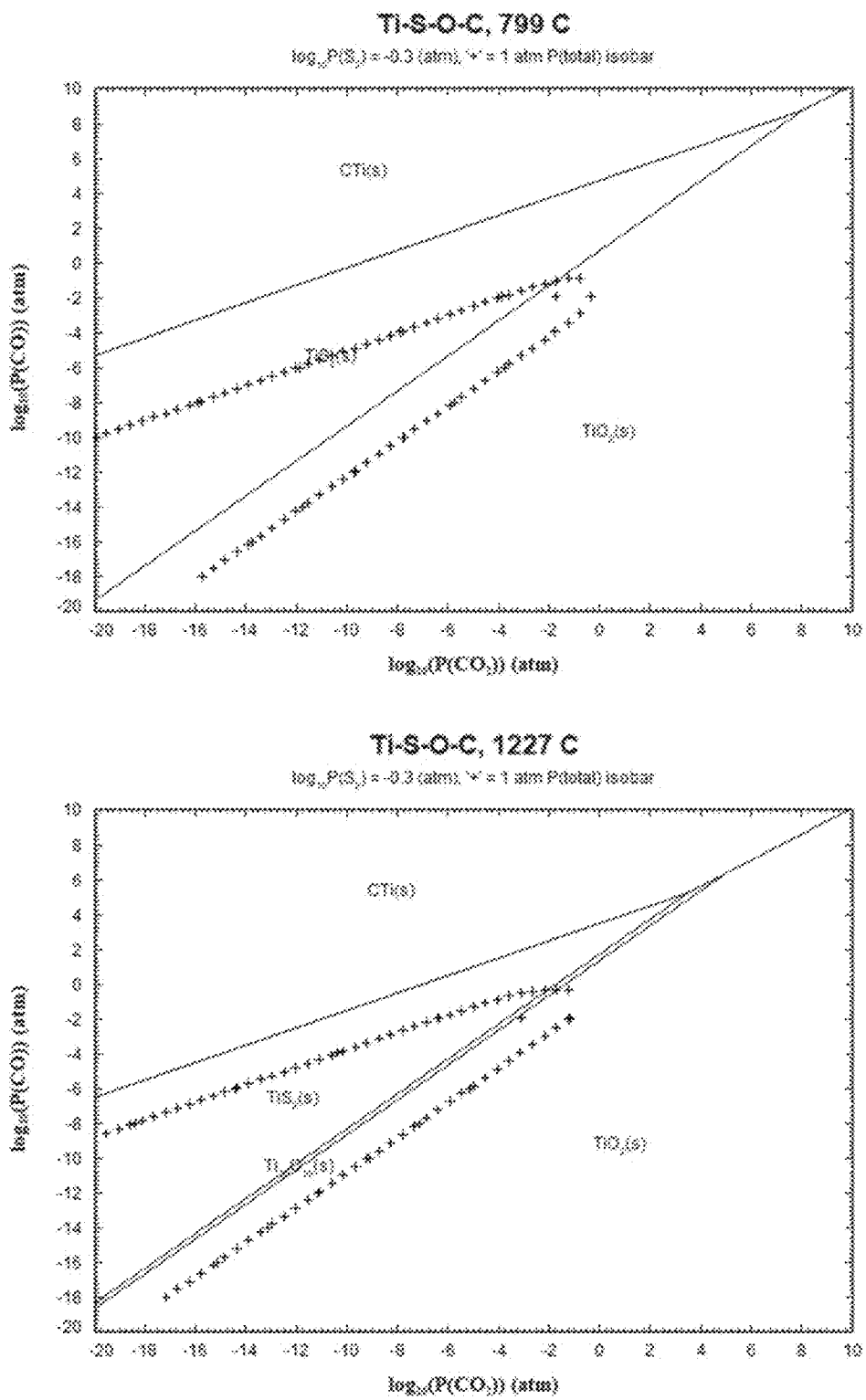
Figure 12P:
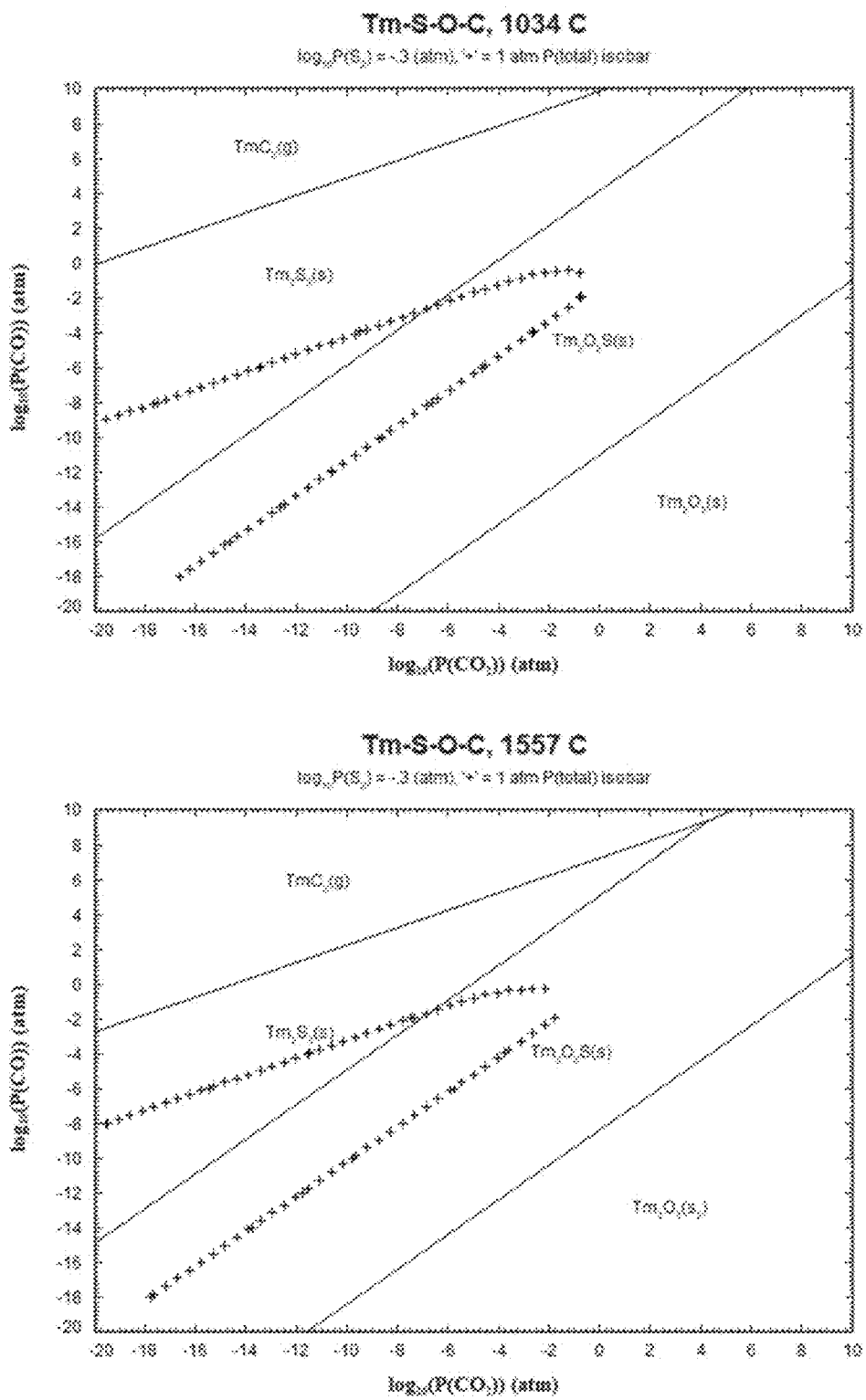
Figure 12Q:
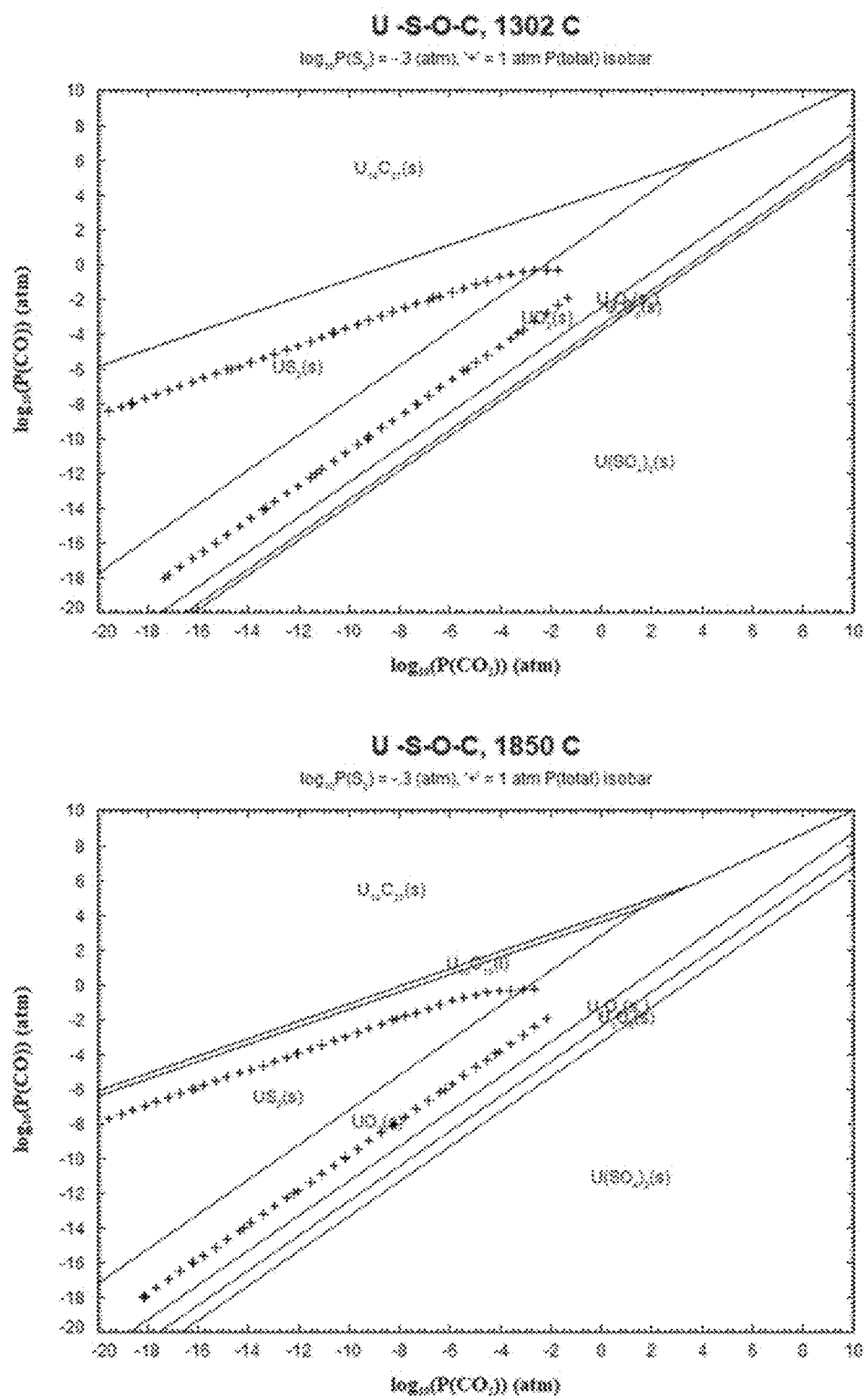
Figure 12R:
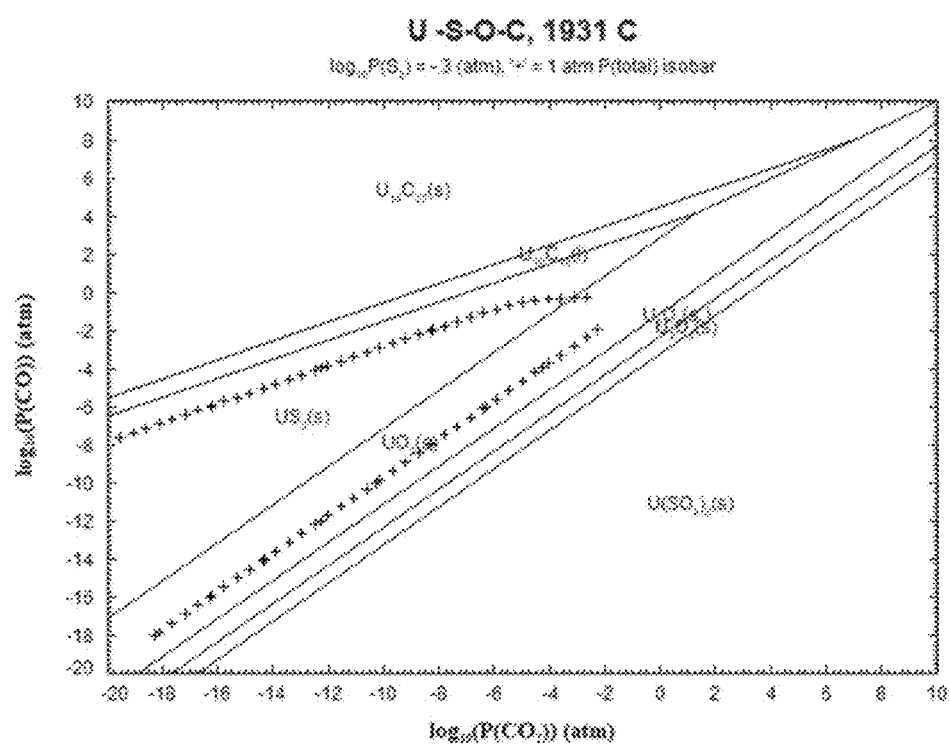
Figure 12S:
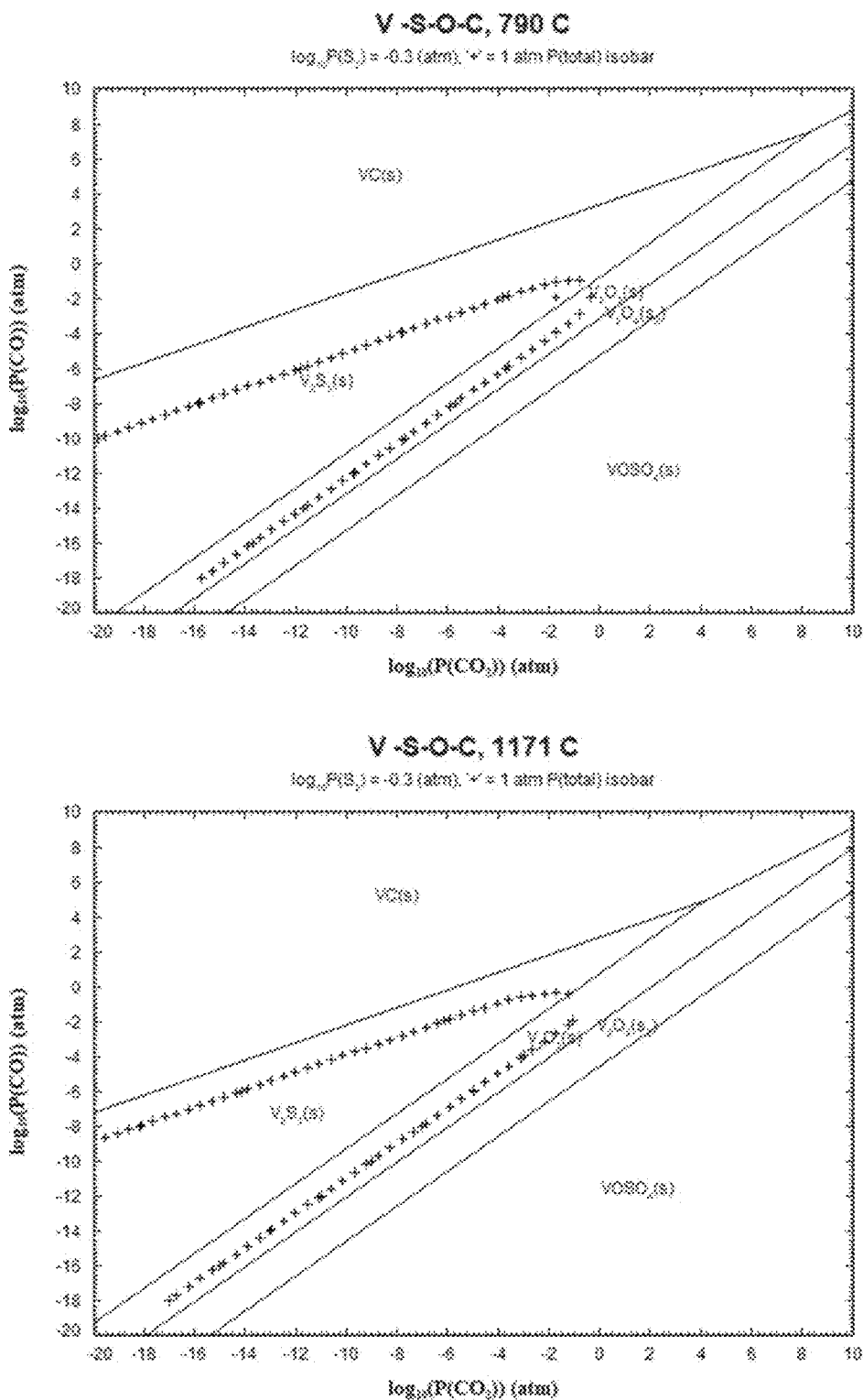
Figure 12T:
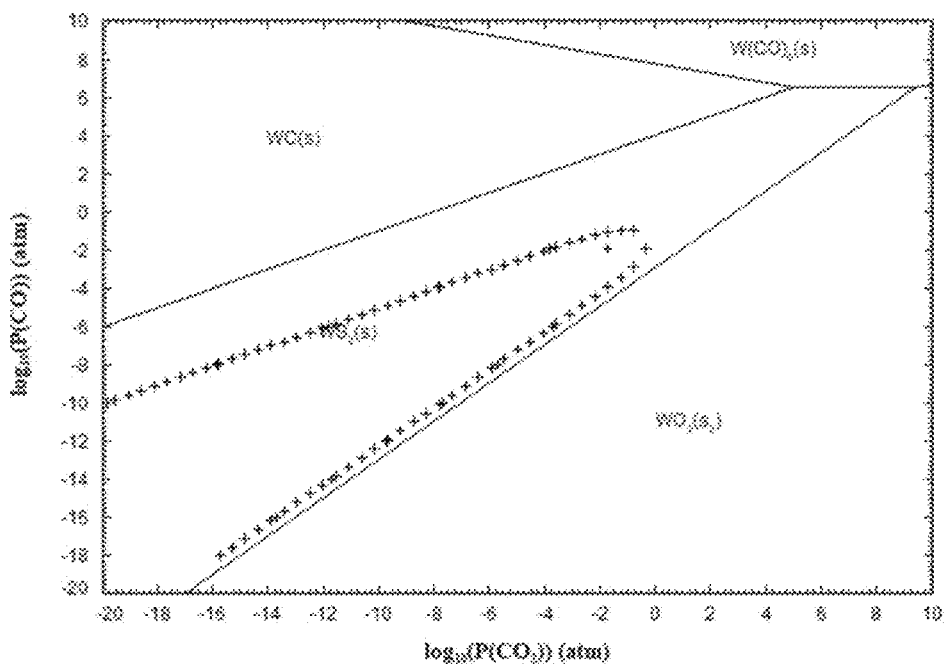
Figure 12T:
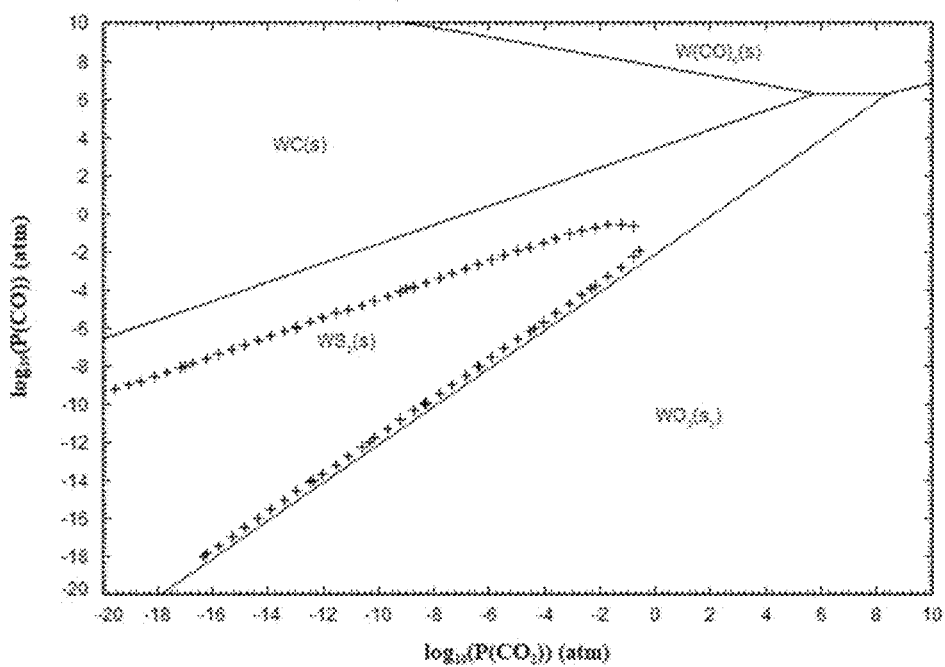
Figure 12U:
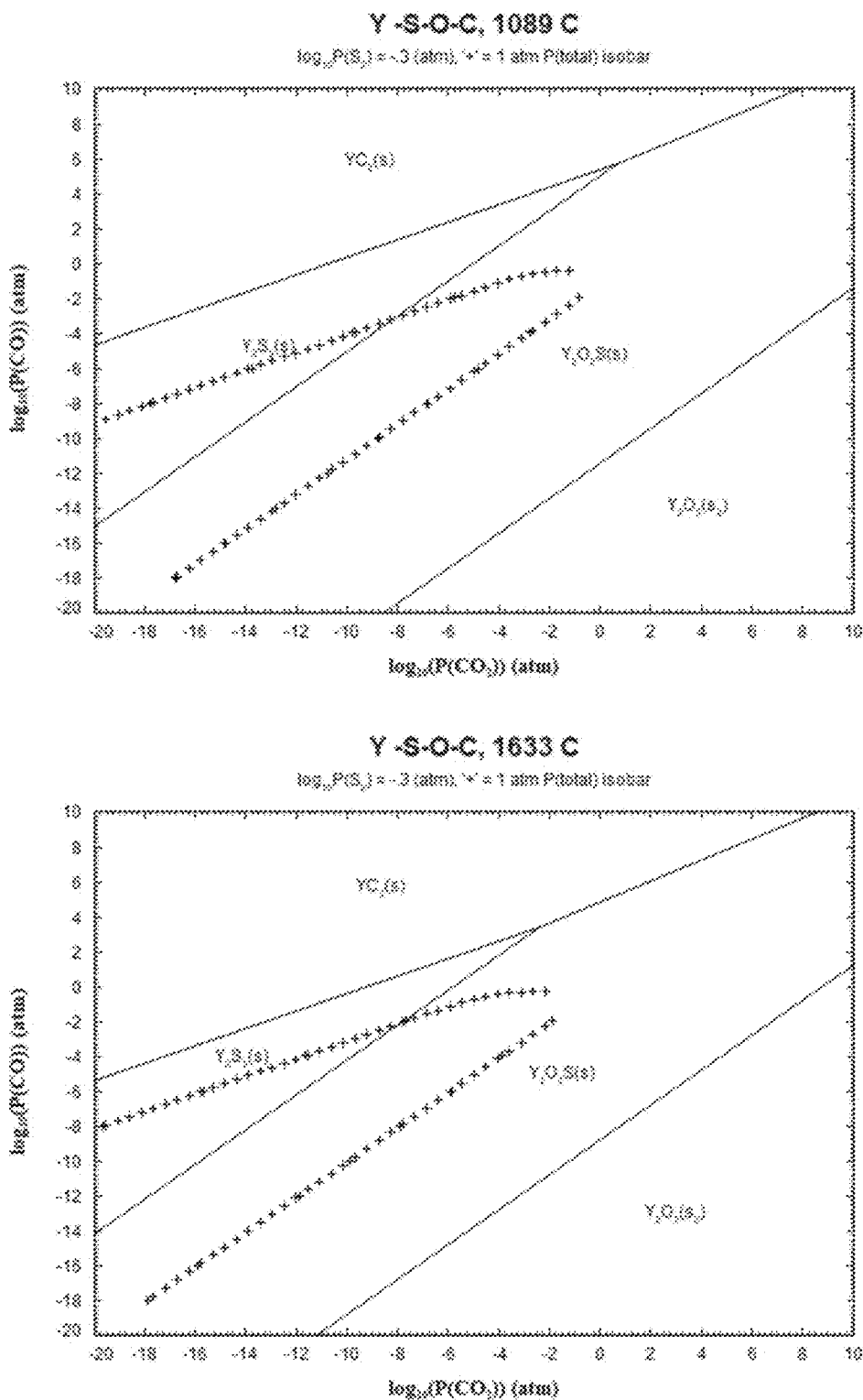
Figure 12V:
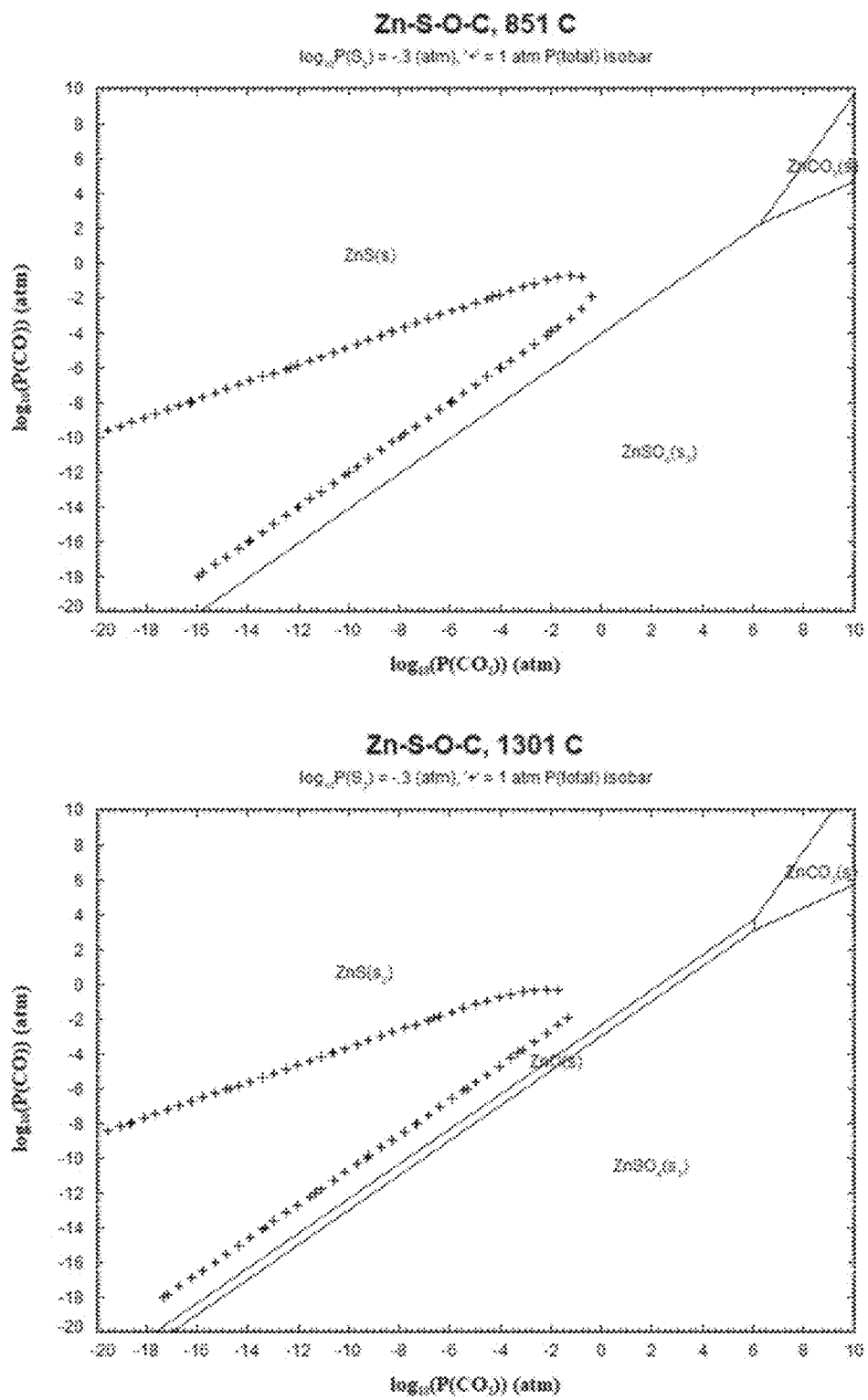
Figure 12W:
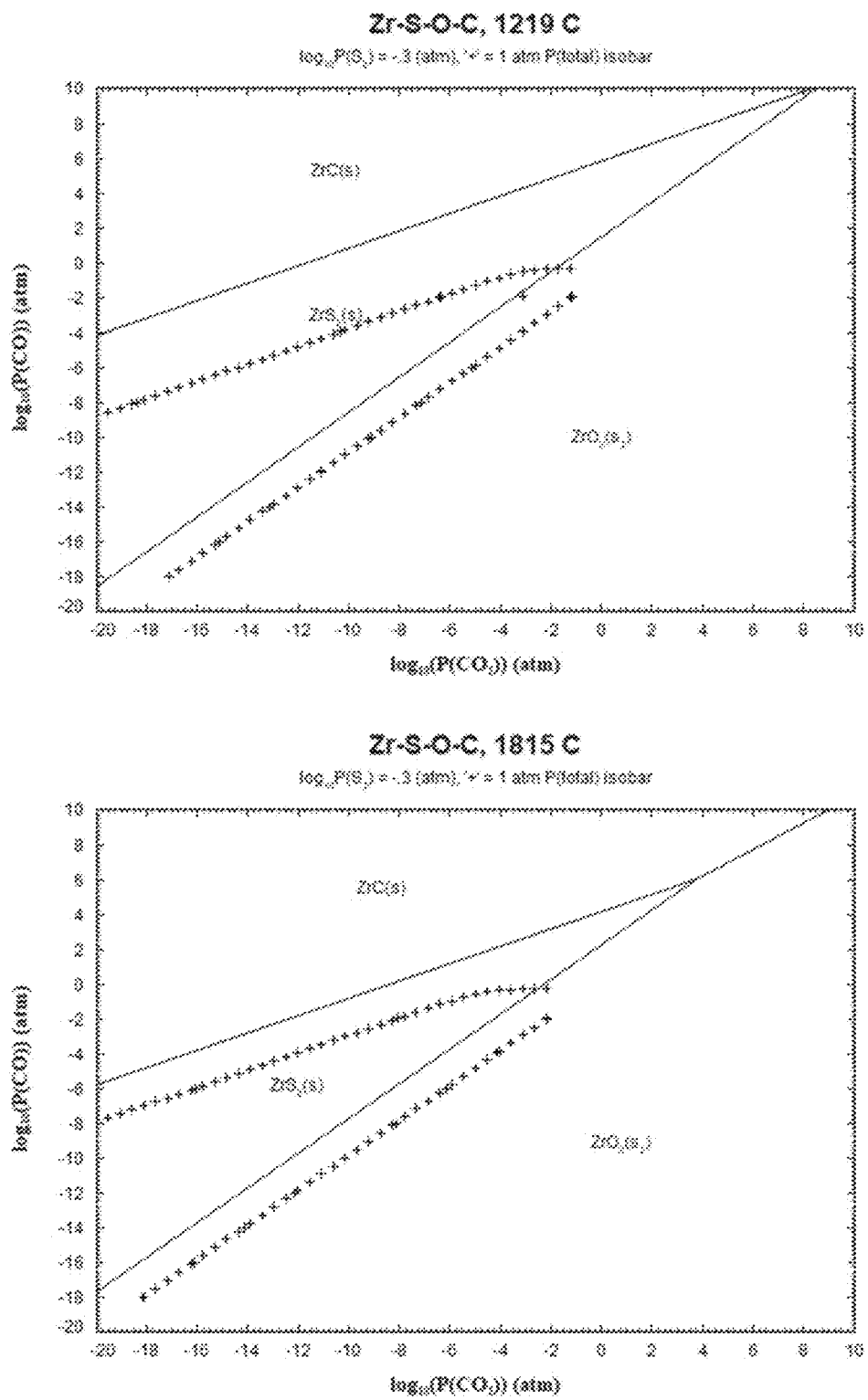
Figure 13A:
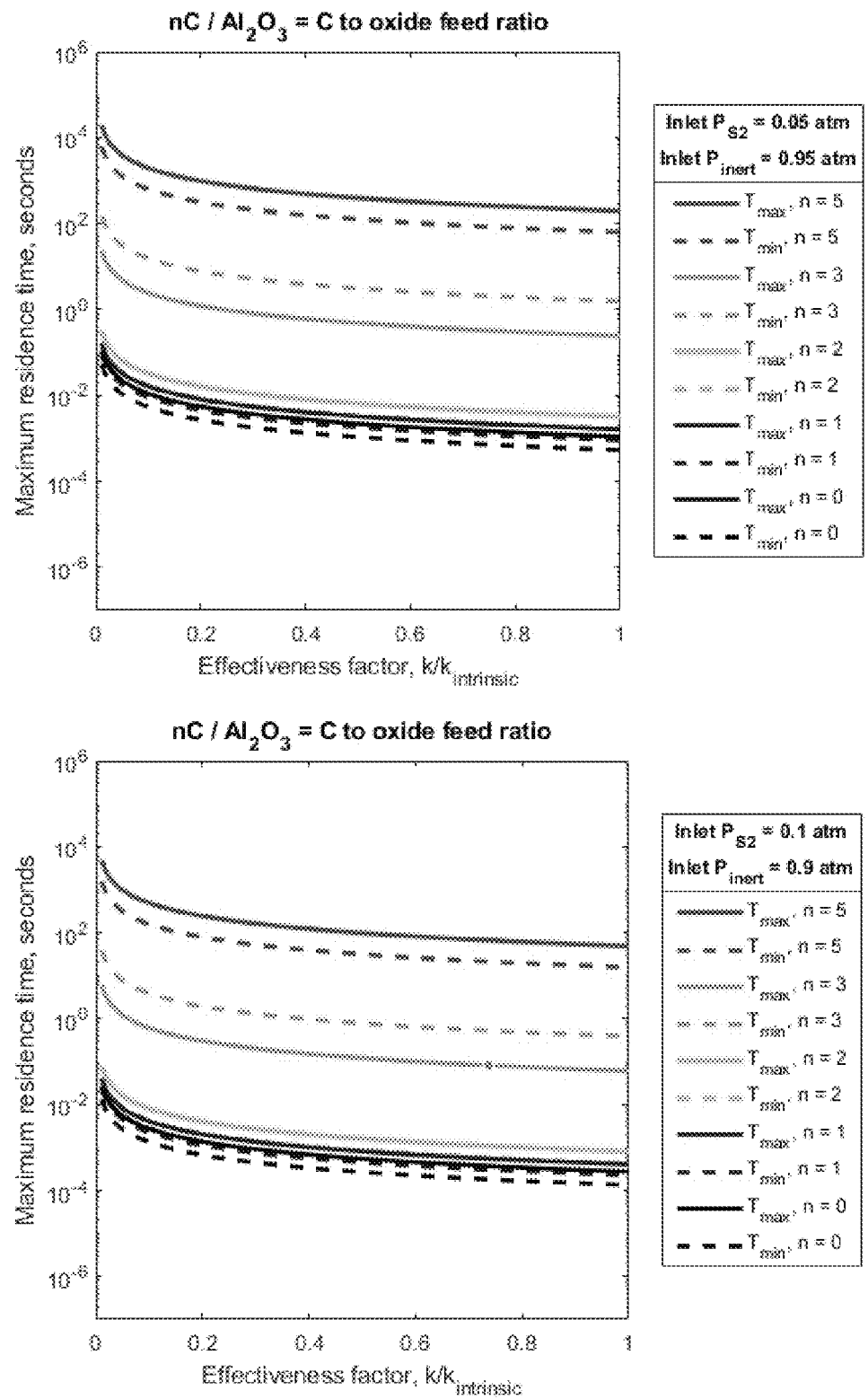
FIGS. 13A-13Z, 14A-14Z, 15A-15Z, and 16A-16B show sensitivity plots for modeled sulfidation reactor residence times in the presence of carbon.
Figure 13B:
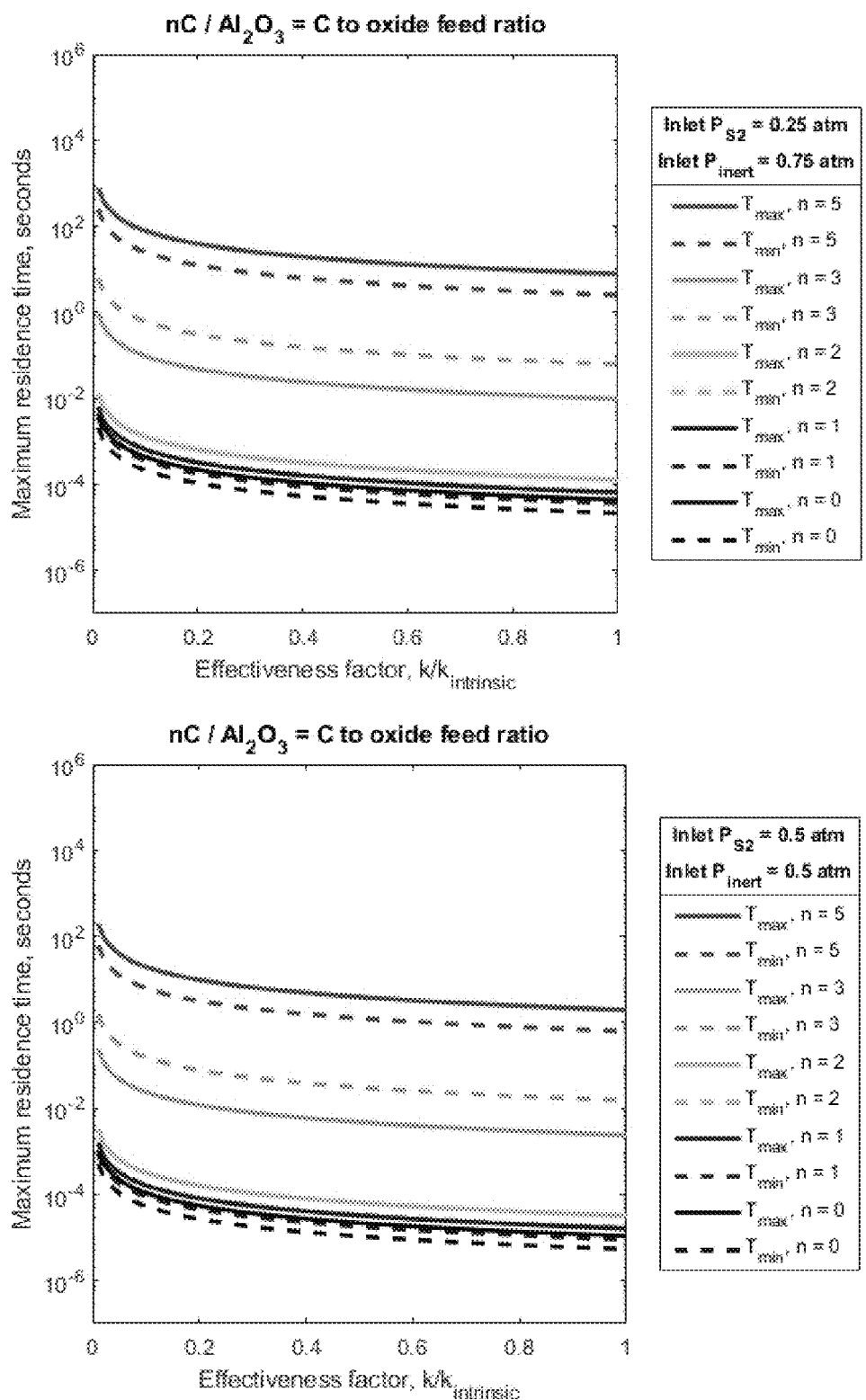
Figure 13C:
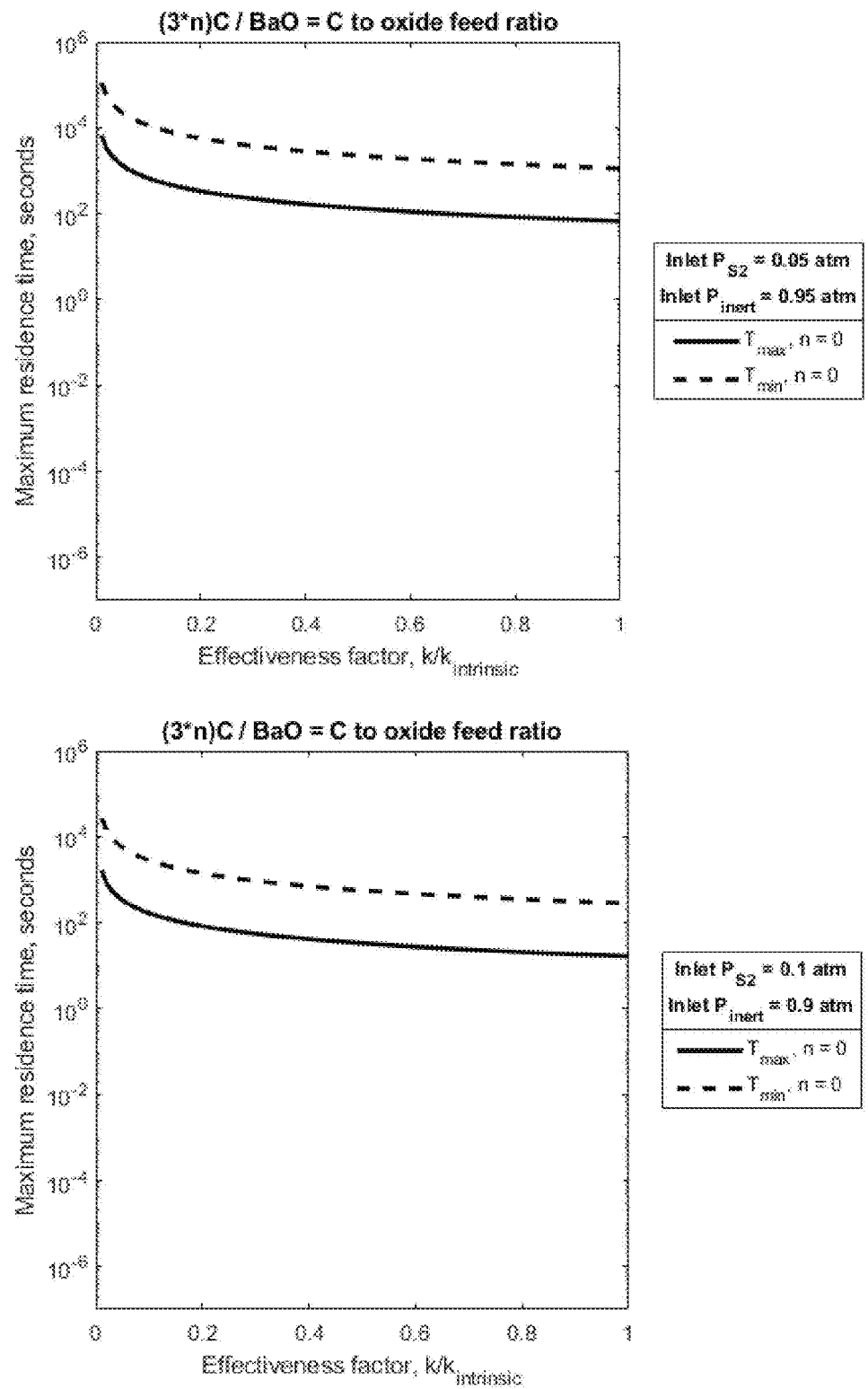
Figure 13D:
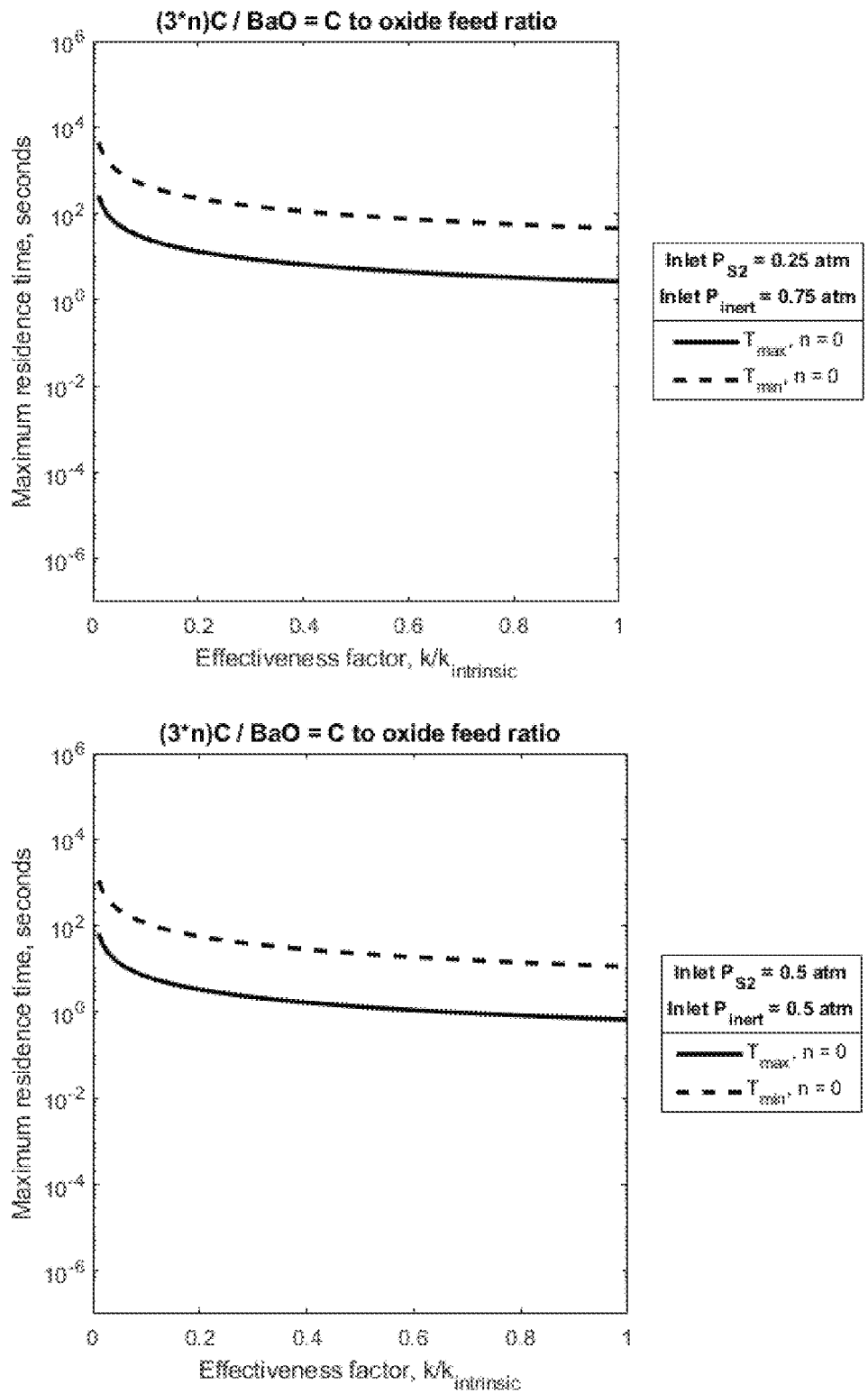
Figure 13E:
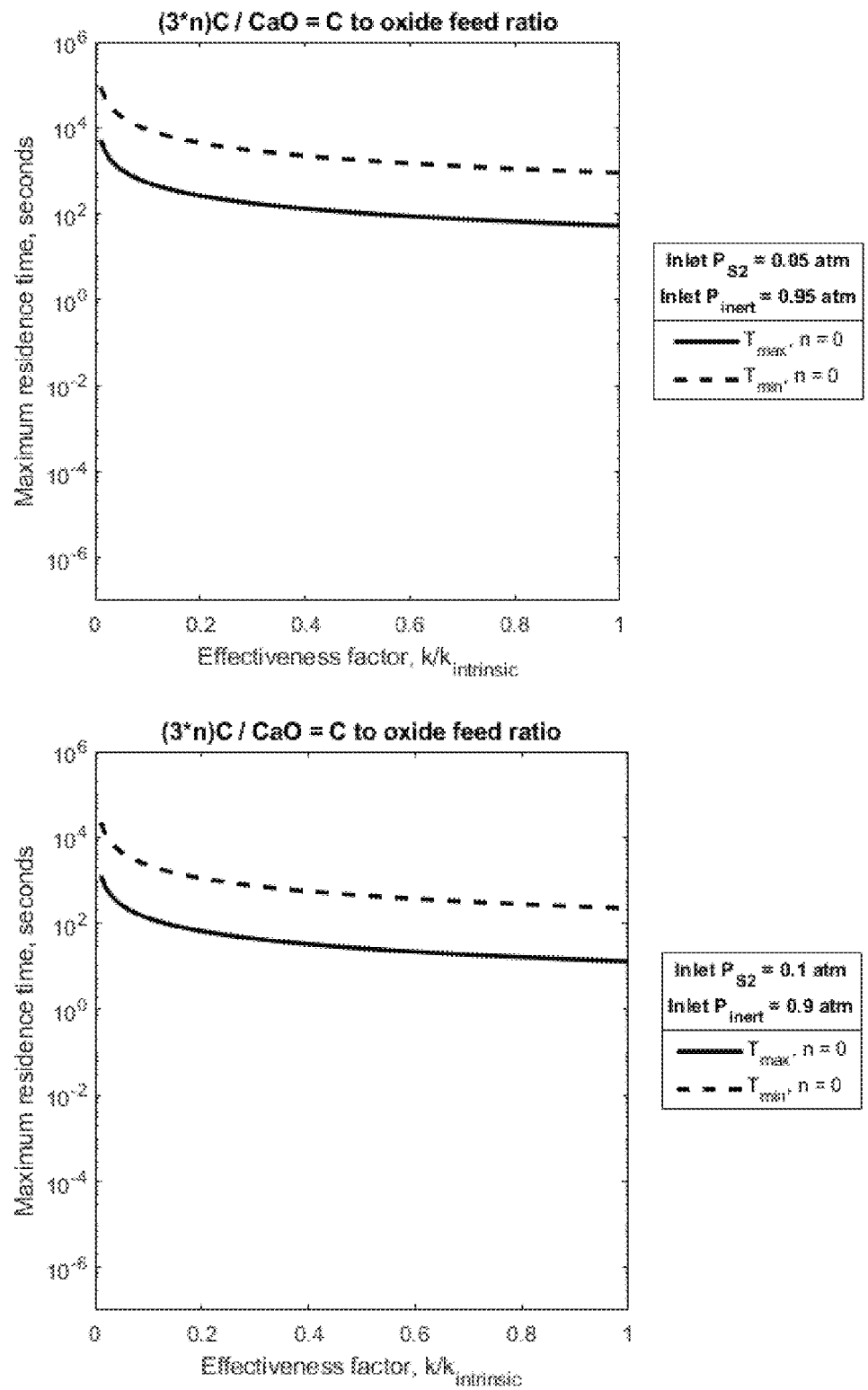
Figure 13F:
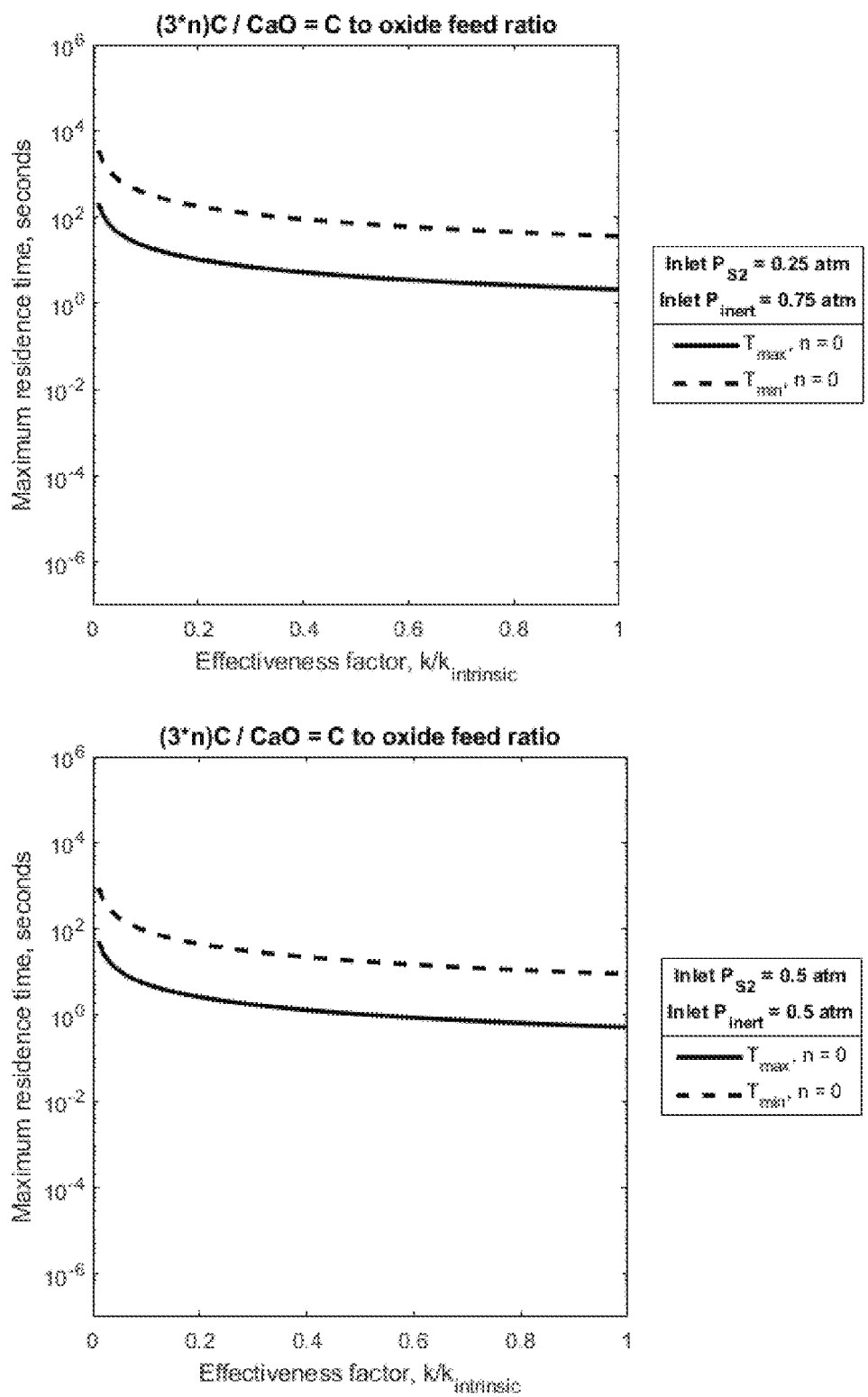
Figure 13G:
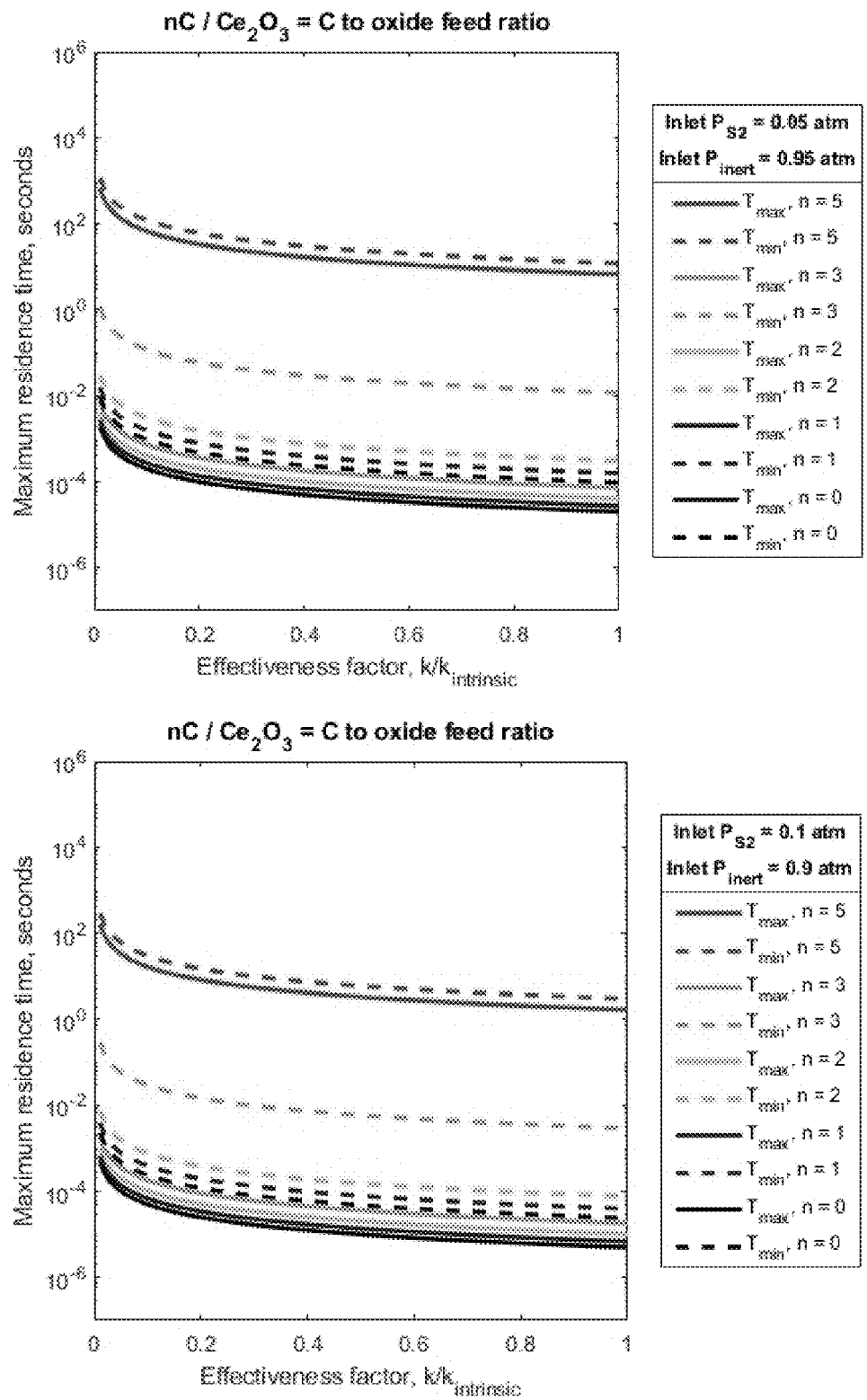
Figure 13H:
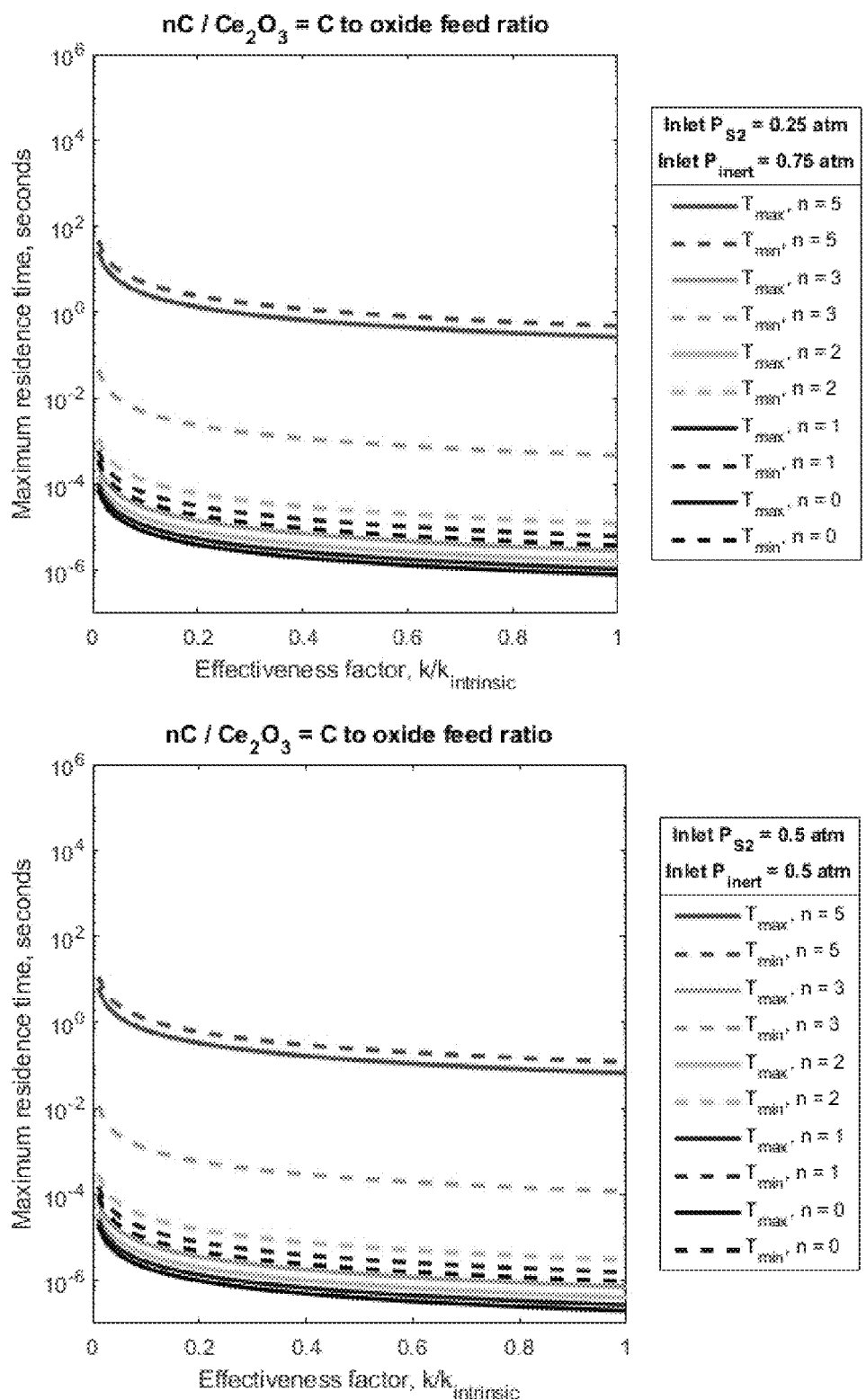
Figure 13I:
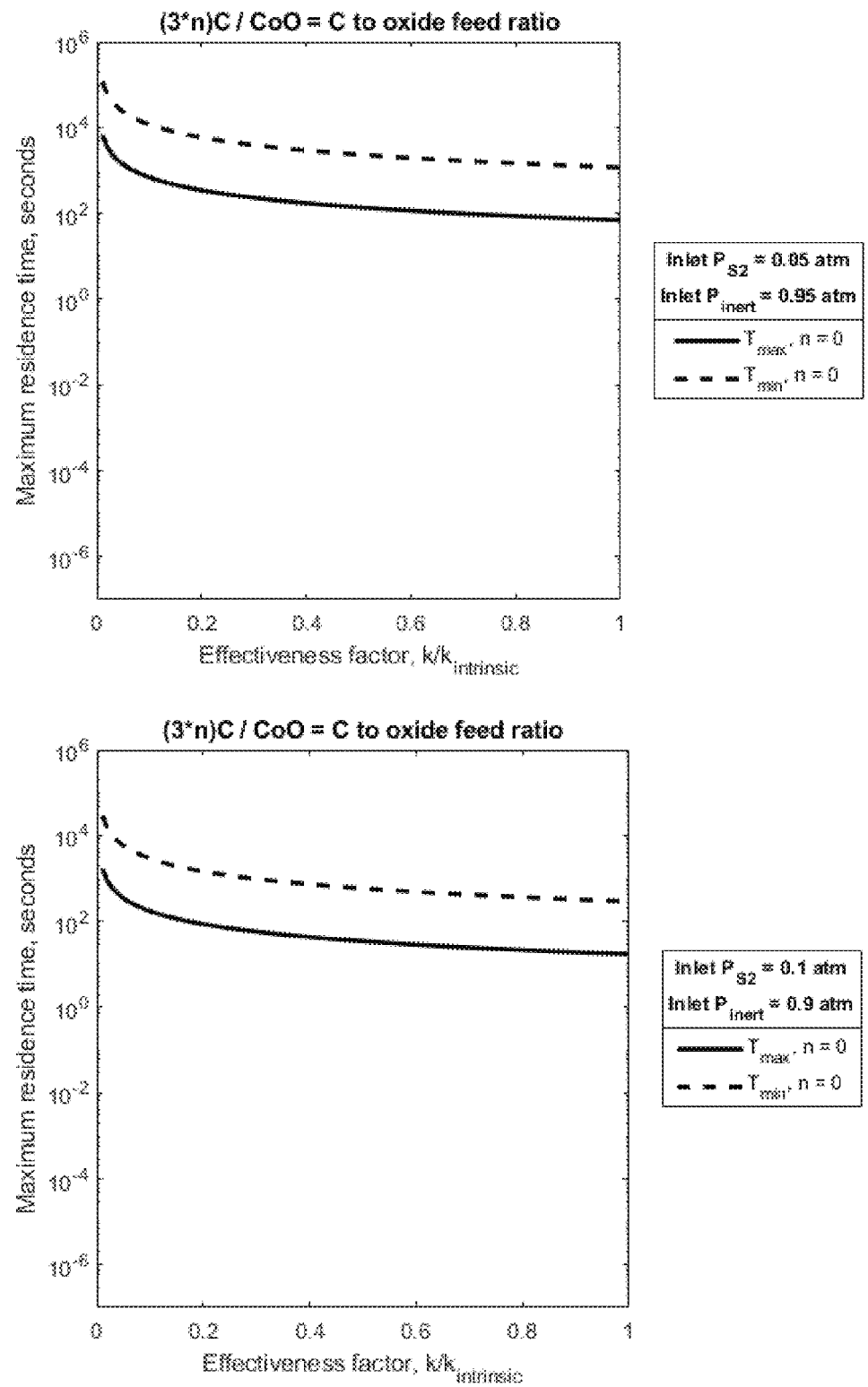
Figure 13J:
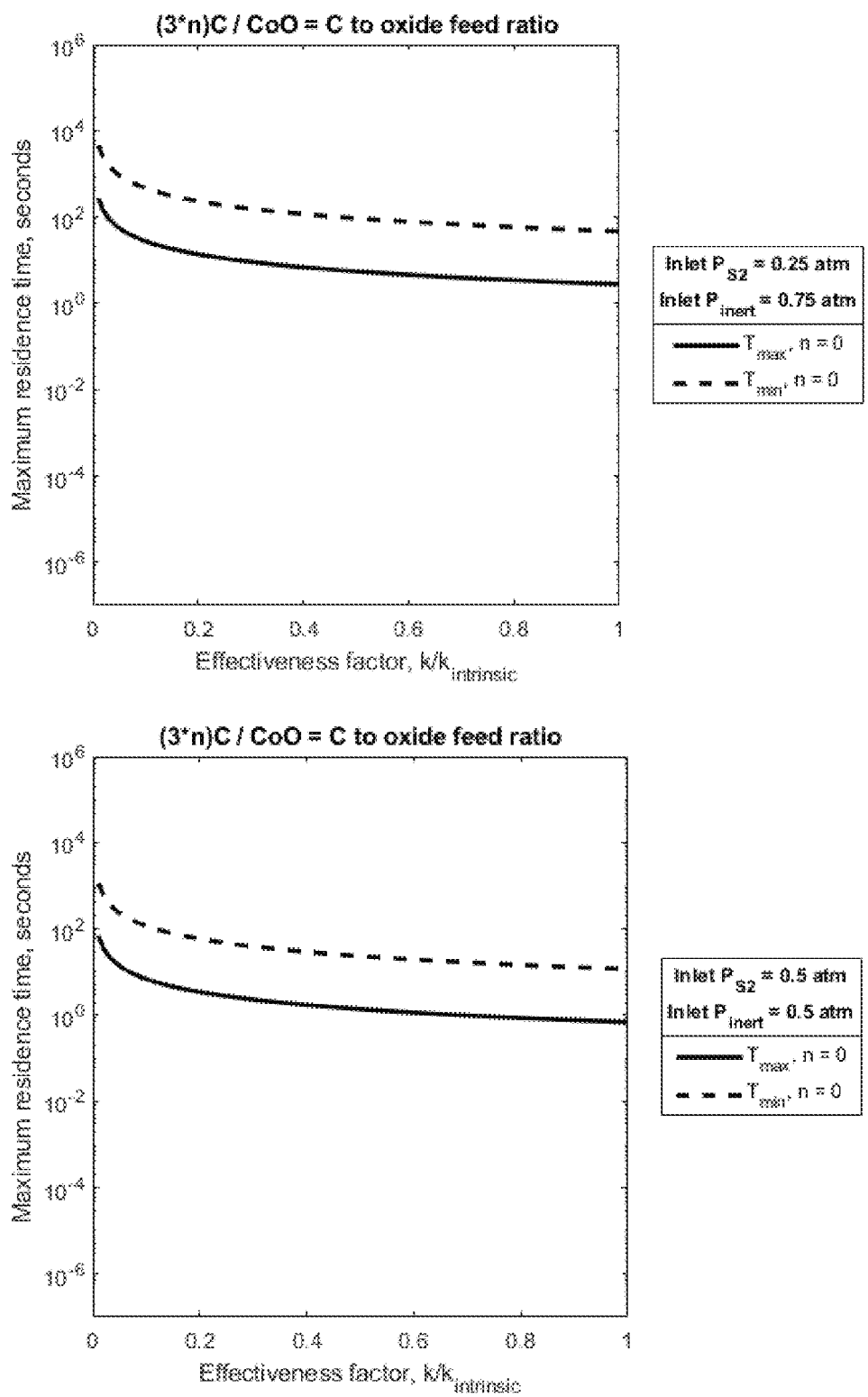
Figure 13K:
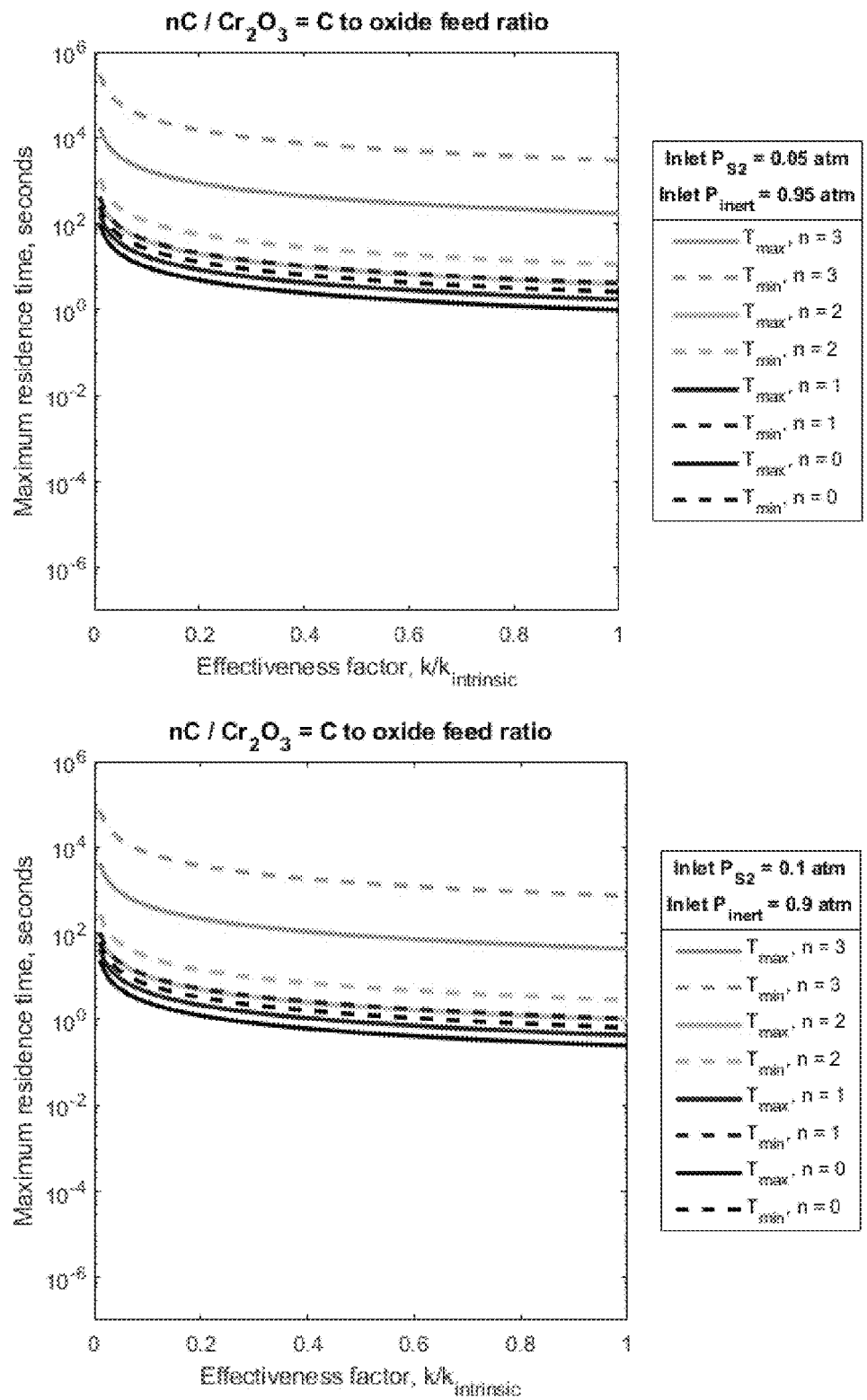
Figure 13L:
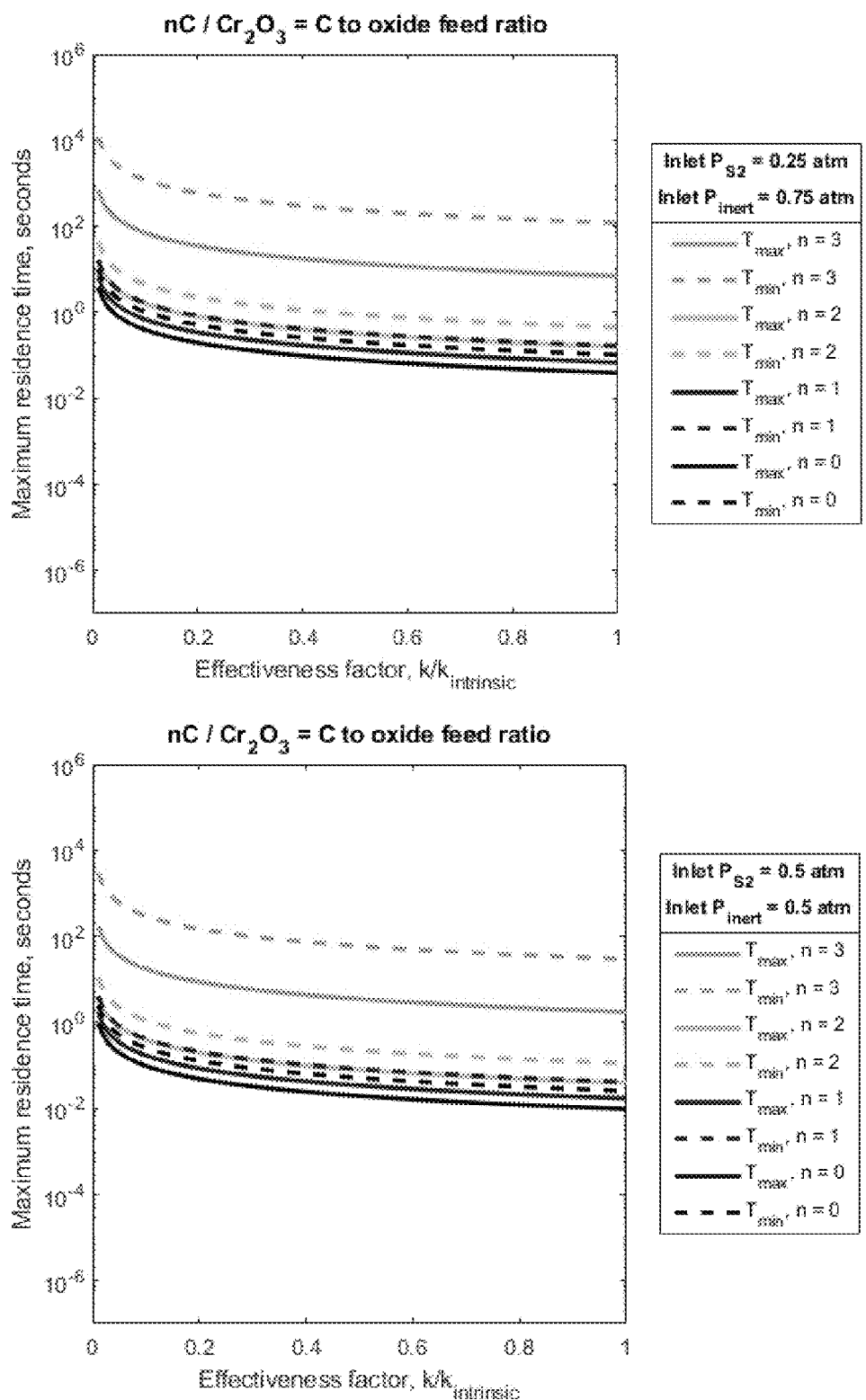
Figure 13M:
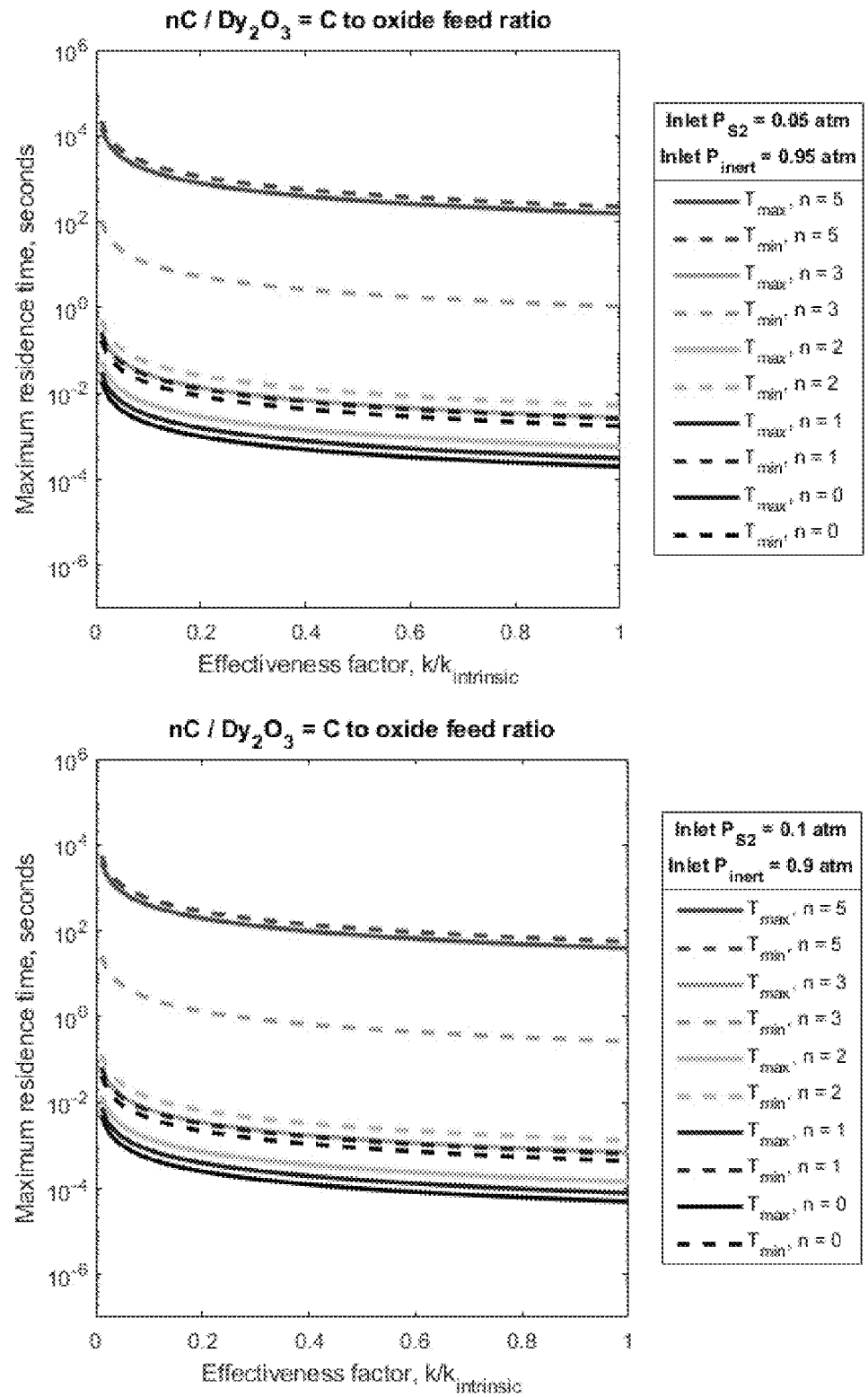
Figure 13N:
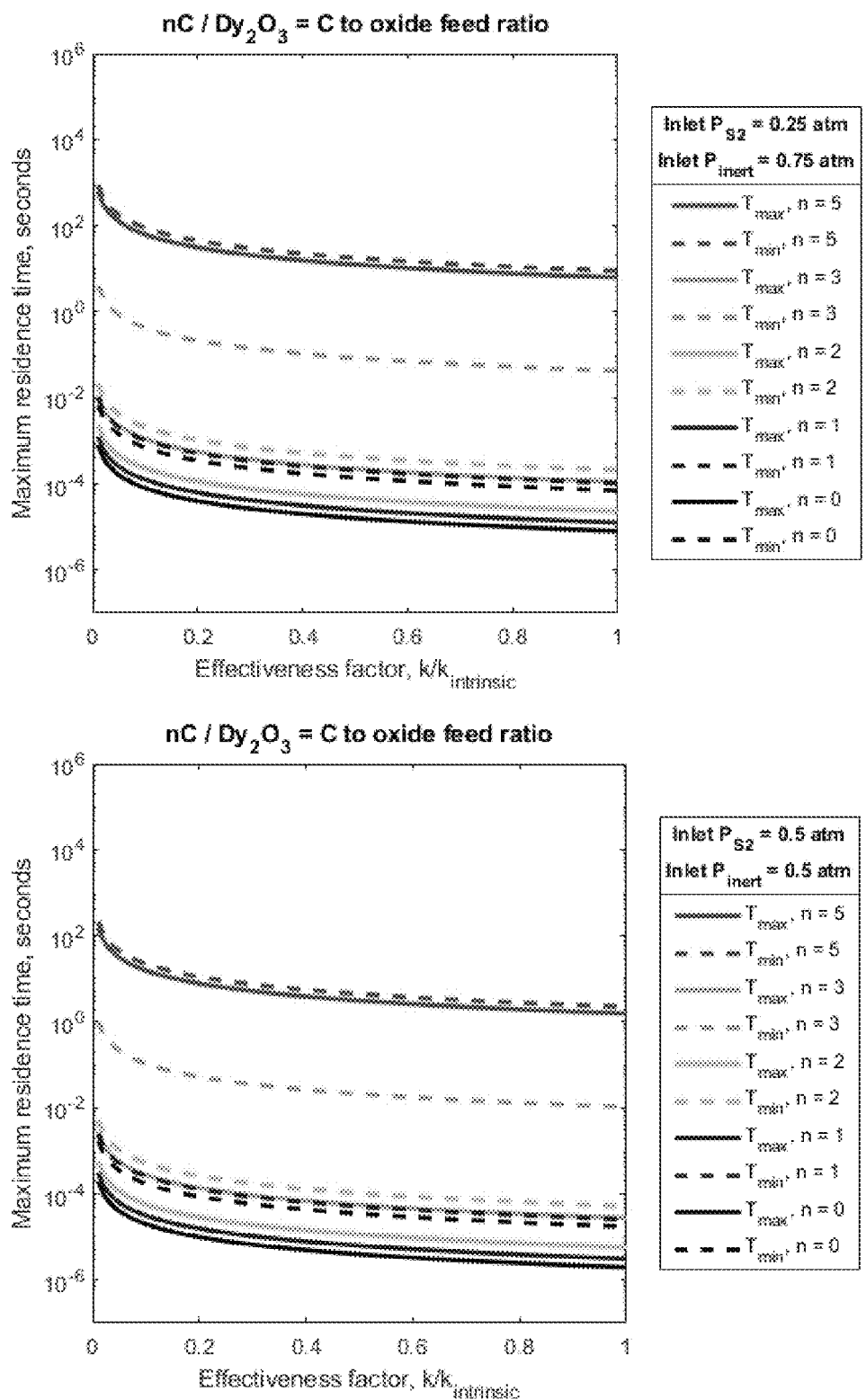
Figure 13O:
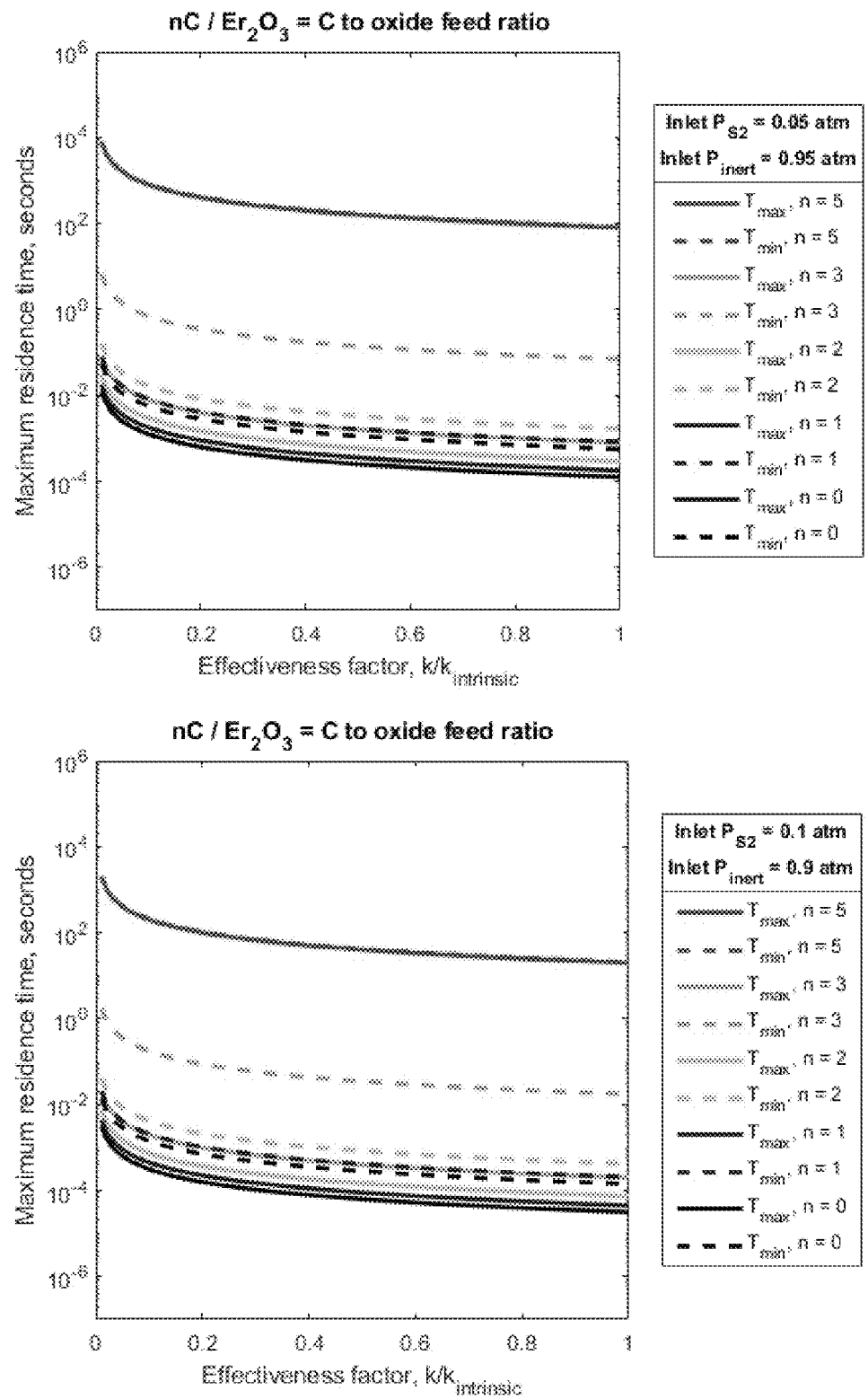
Figure 13P:
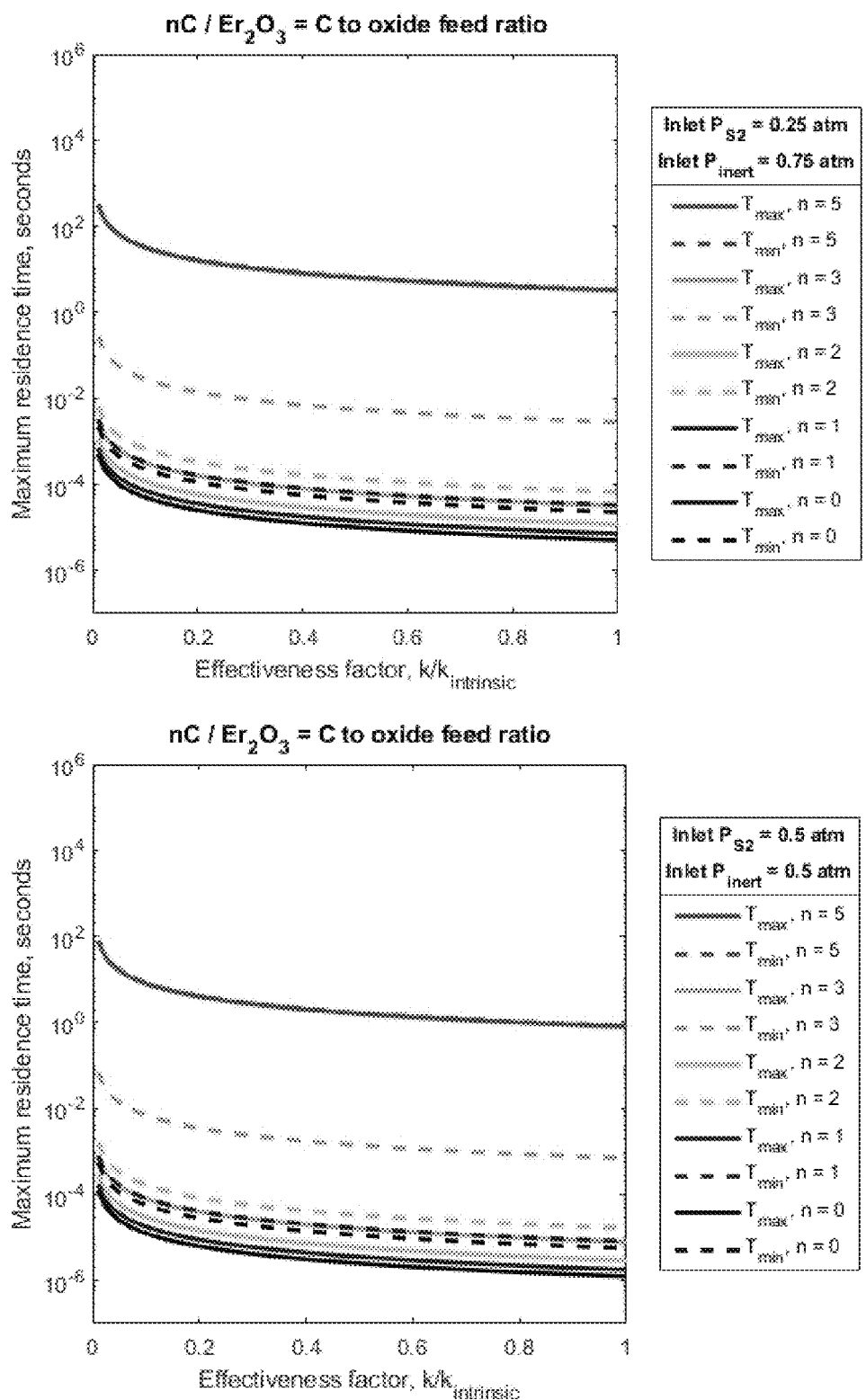
Figure 13Q:
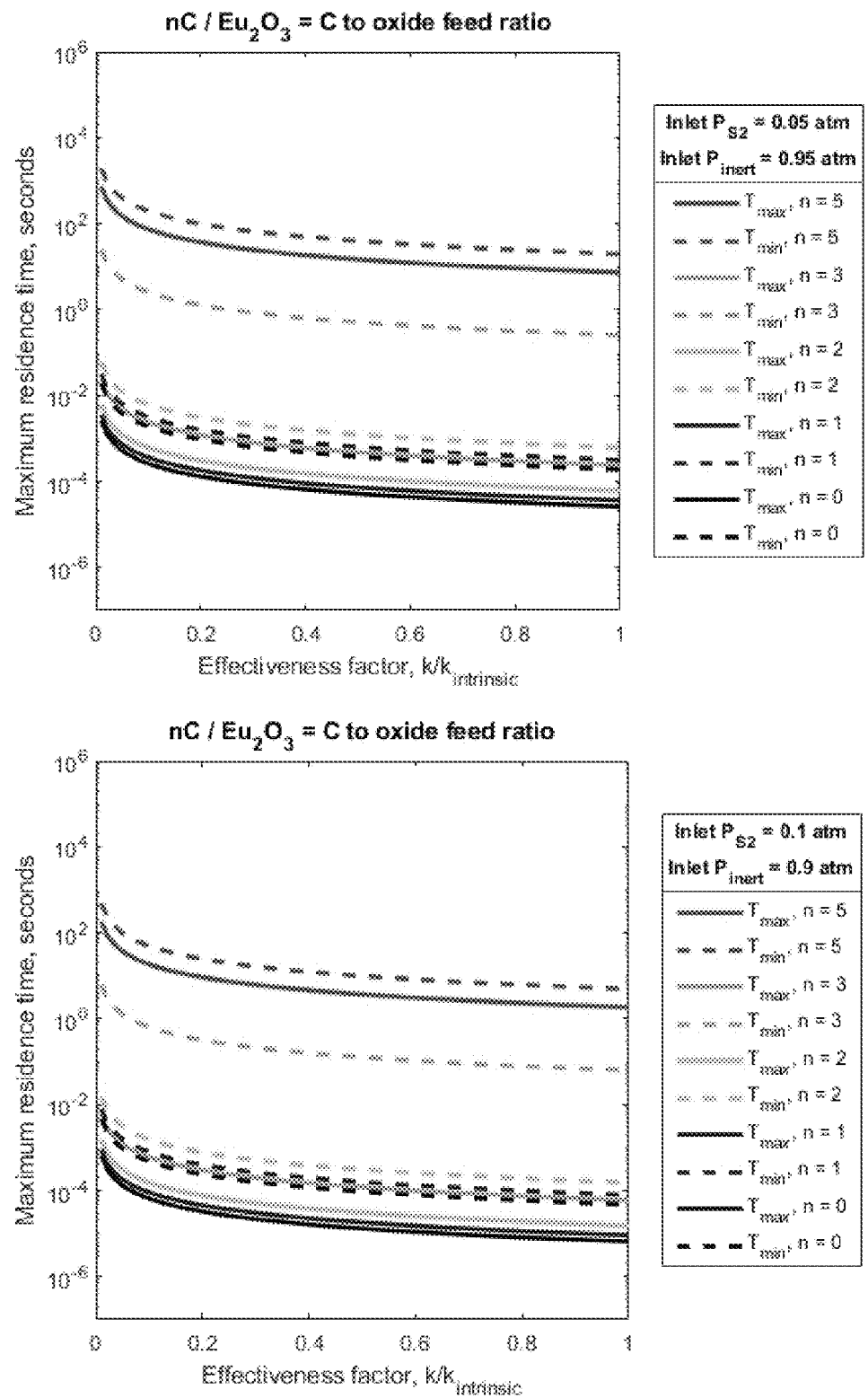
Figure 13R:
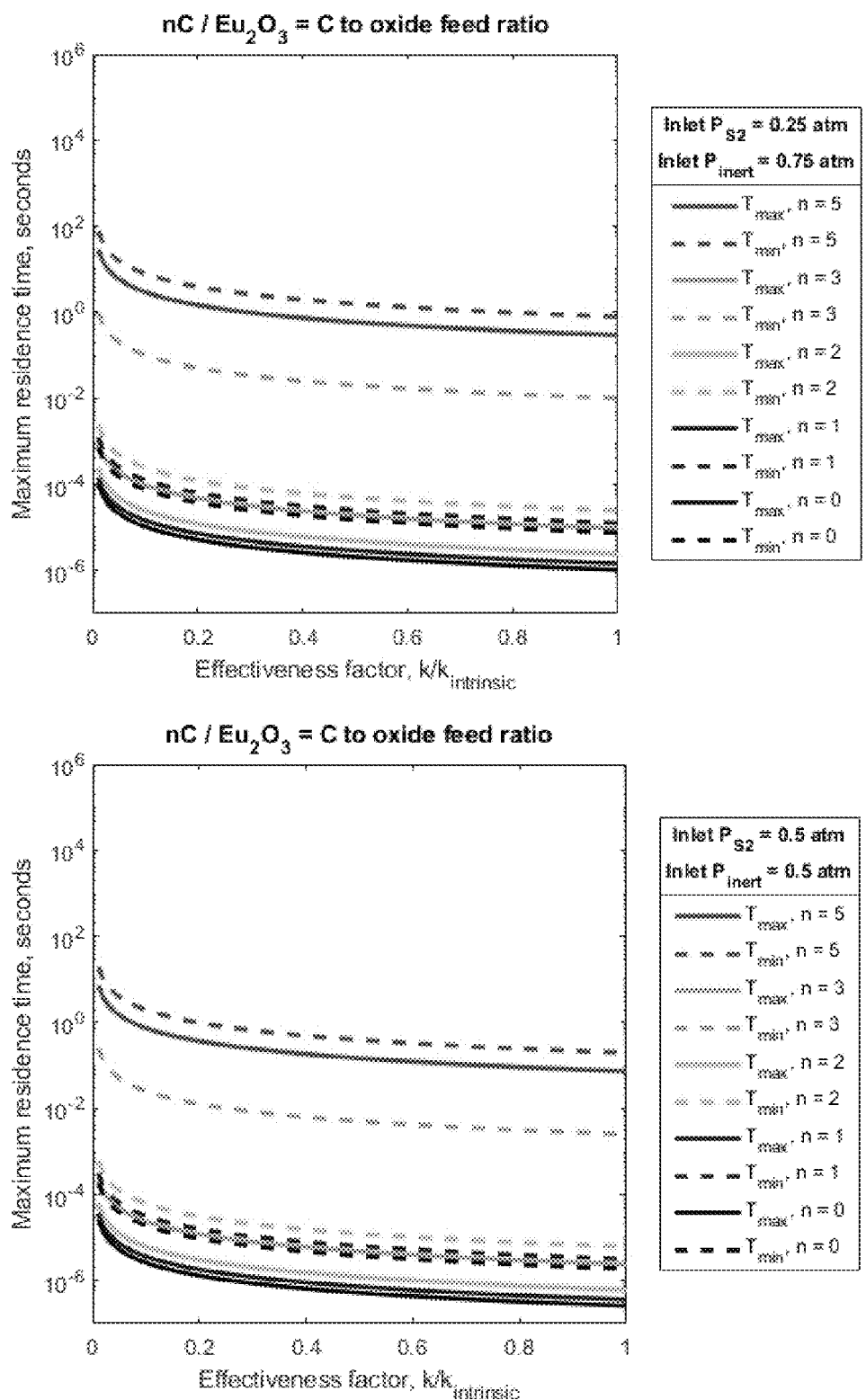
Figure 13S:
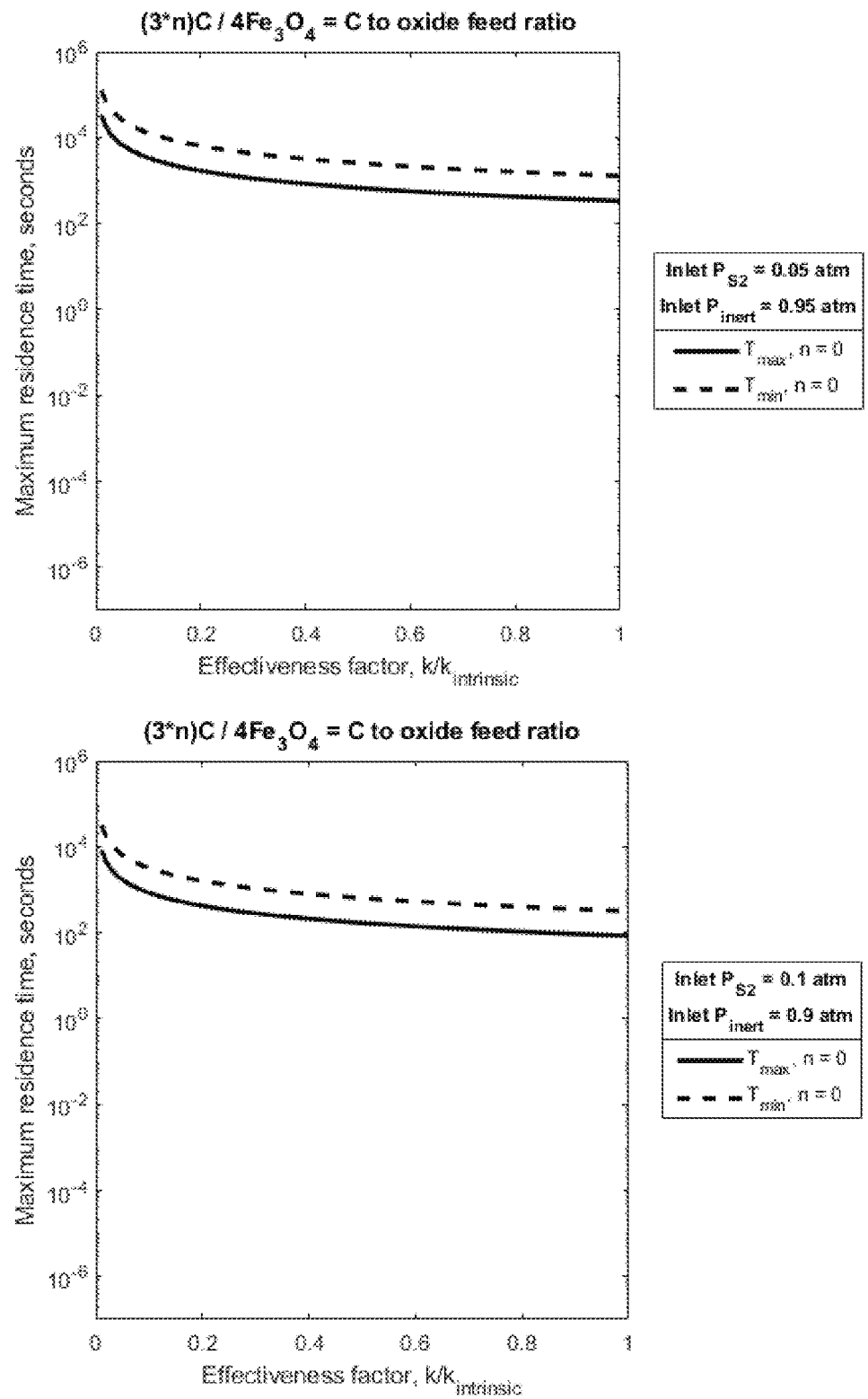
Figure 13T:
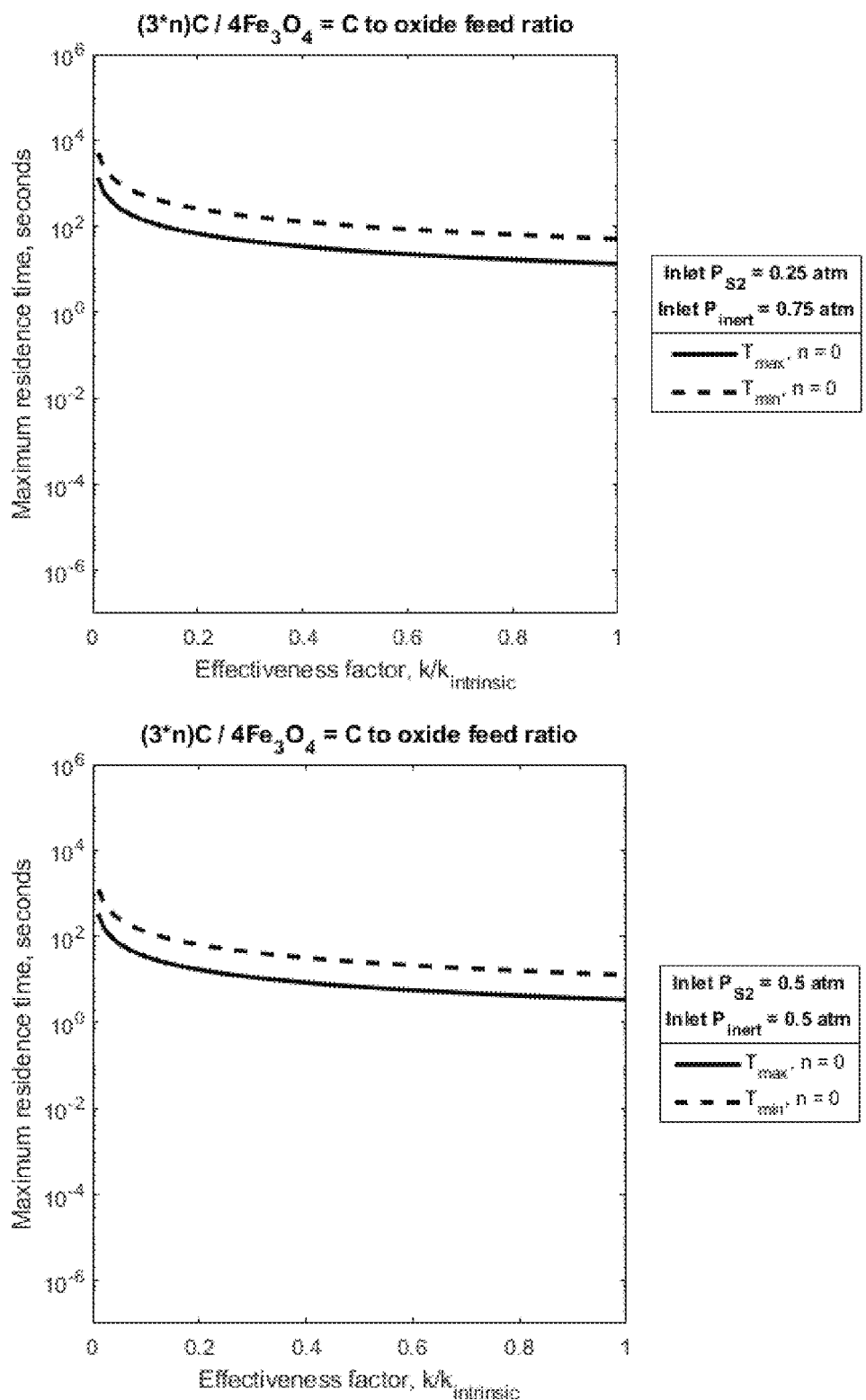
Figure 13U:
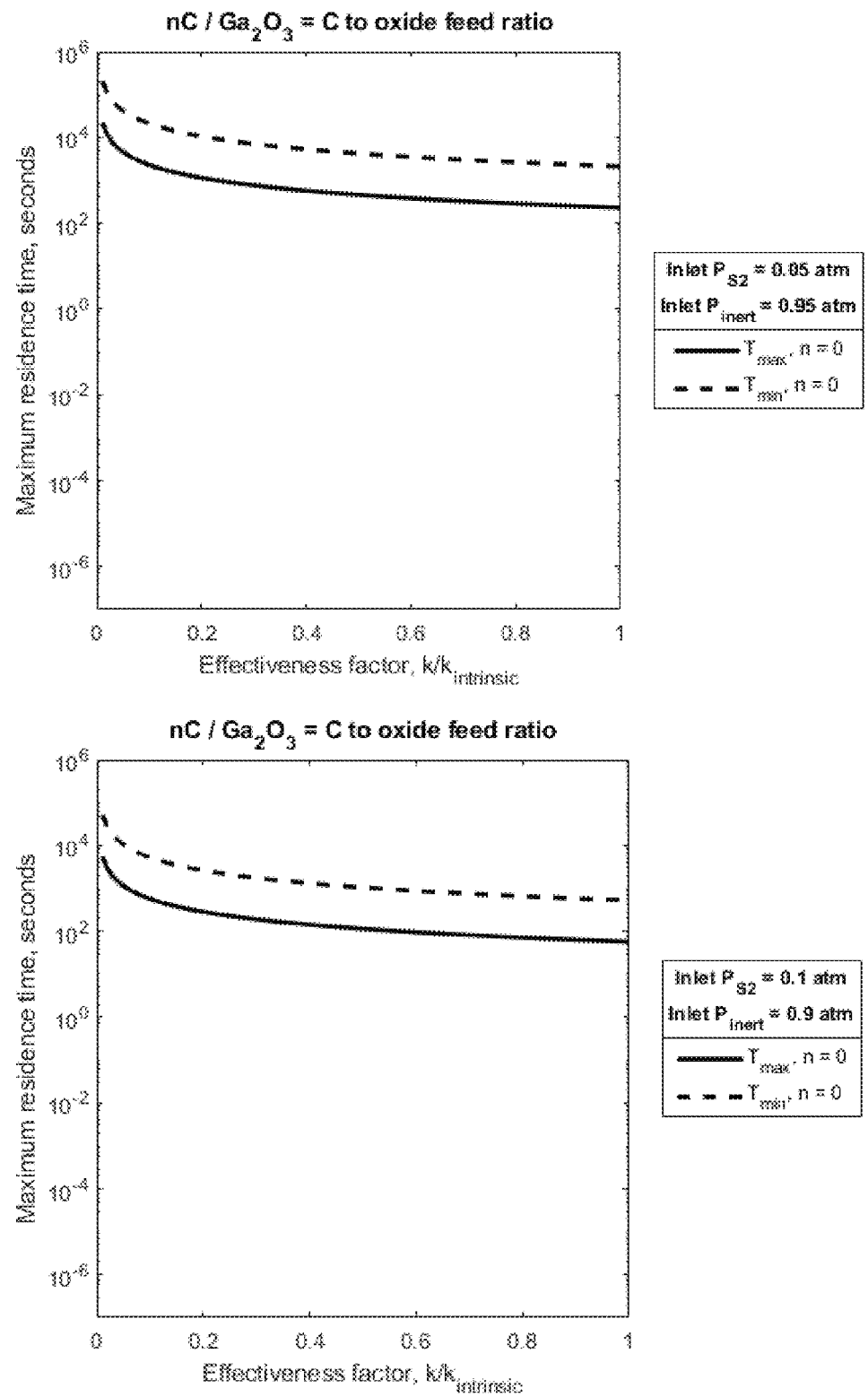
Figure 13V:
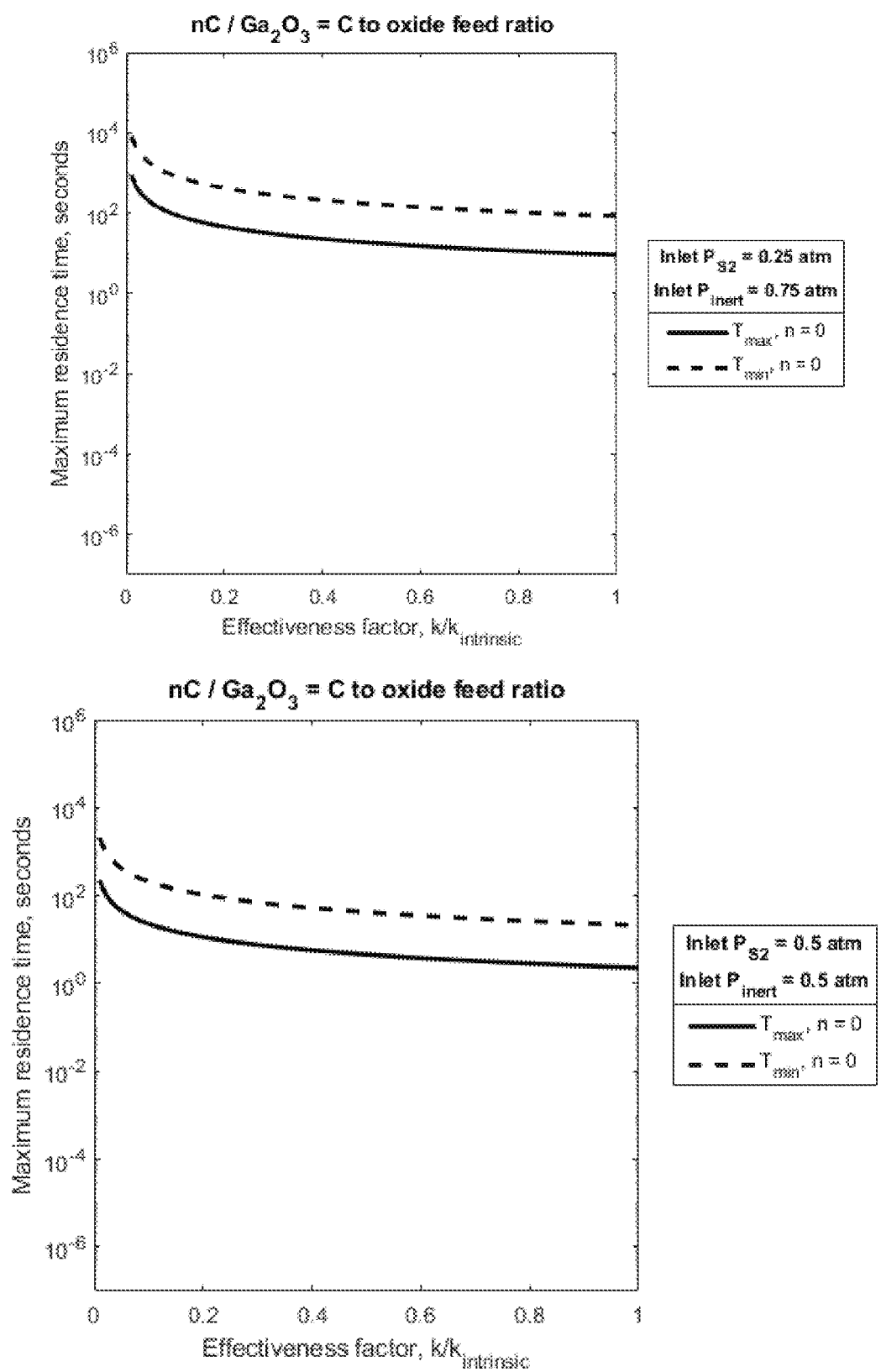
Figure 13W:
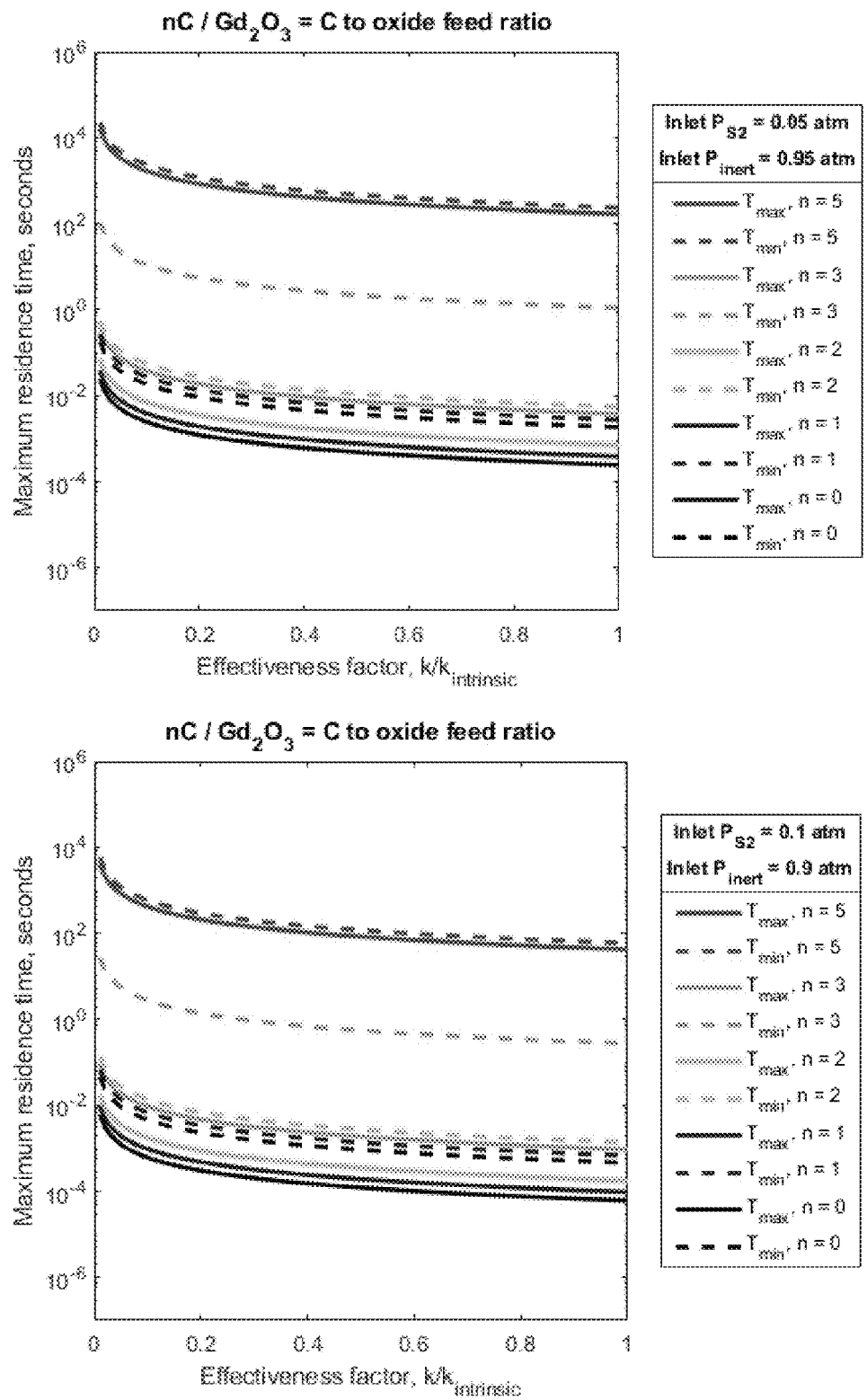
Figure 13X:
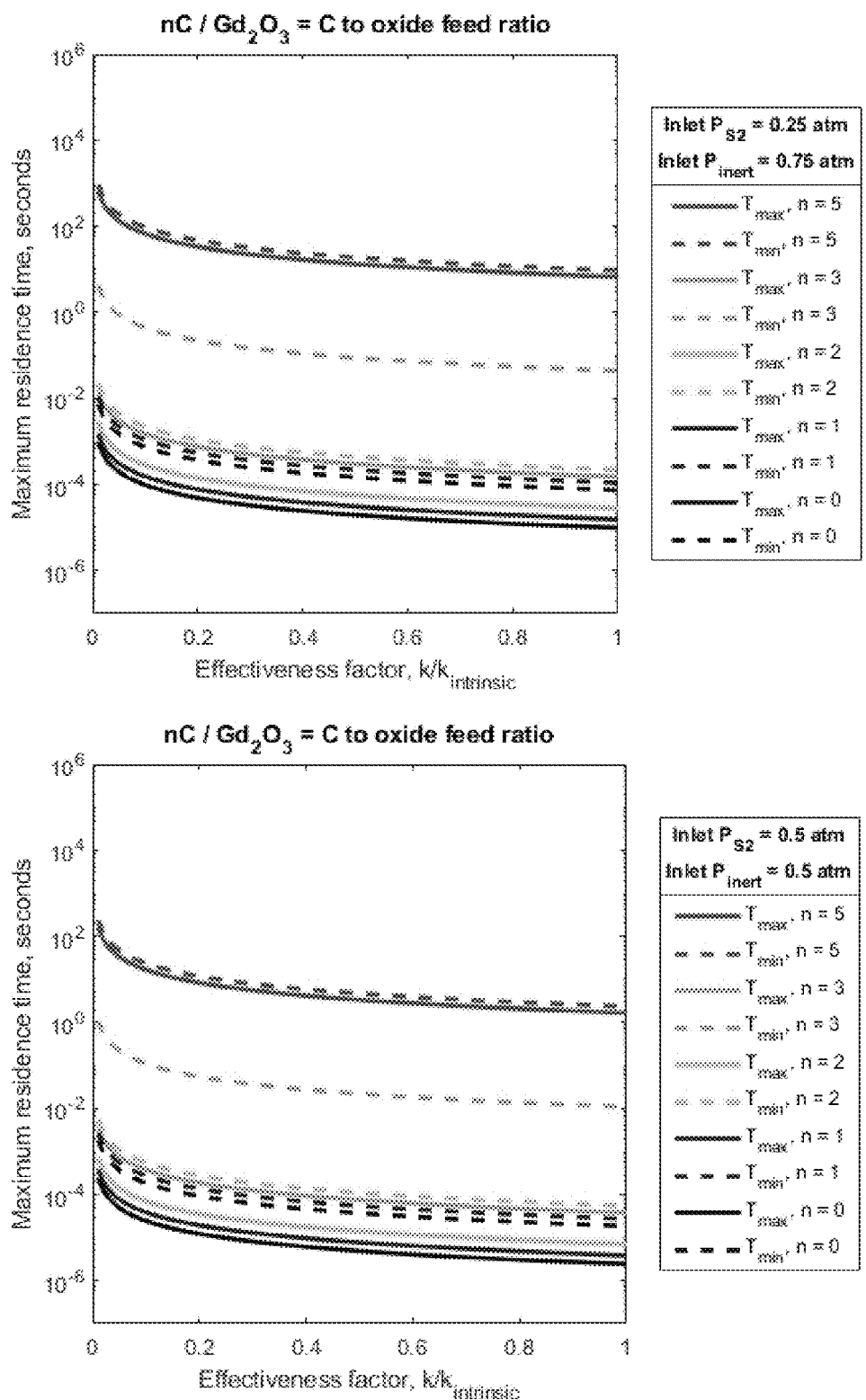
Figure 13Y:
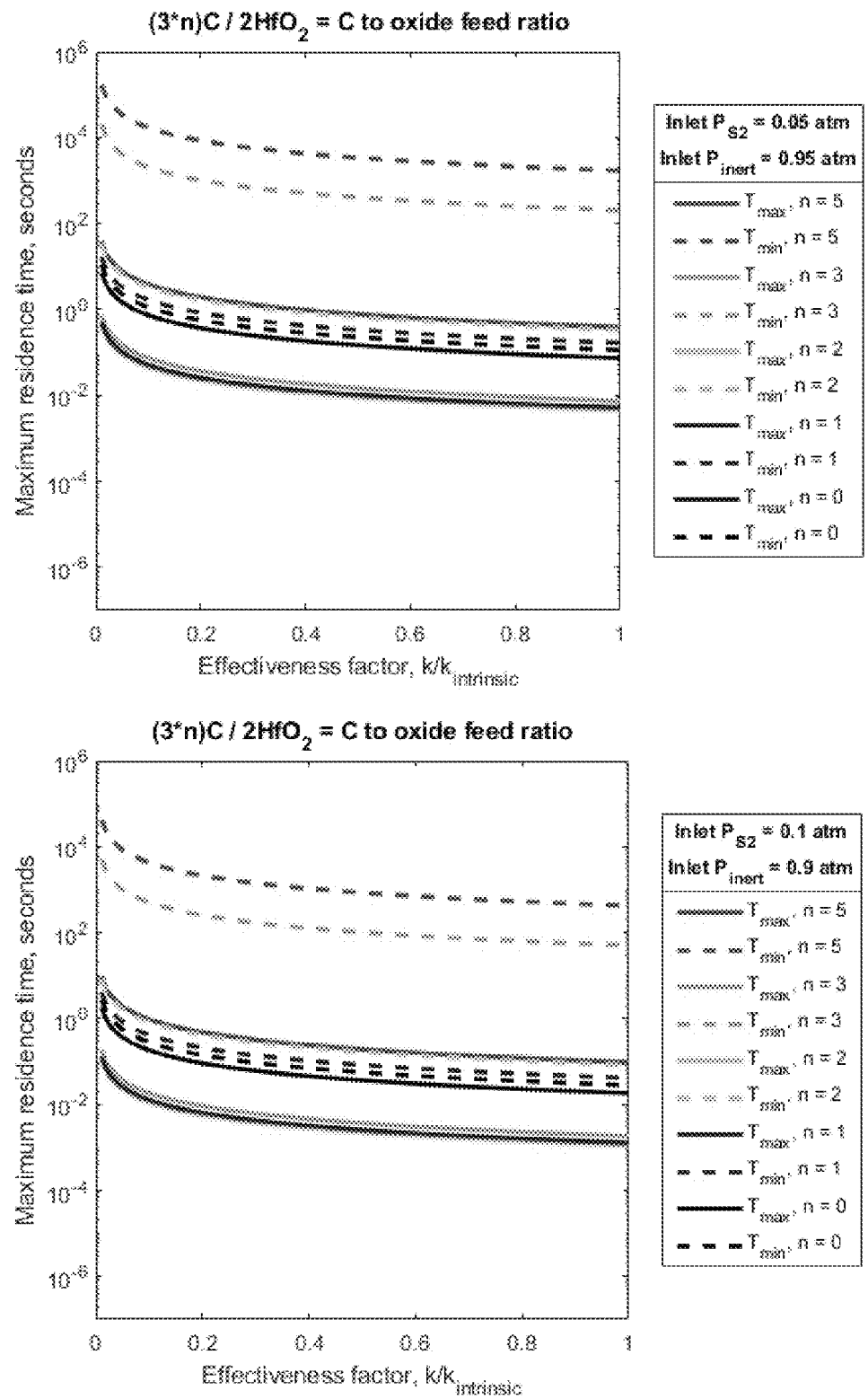
Figure 13Z:
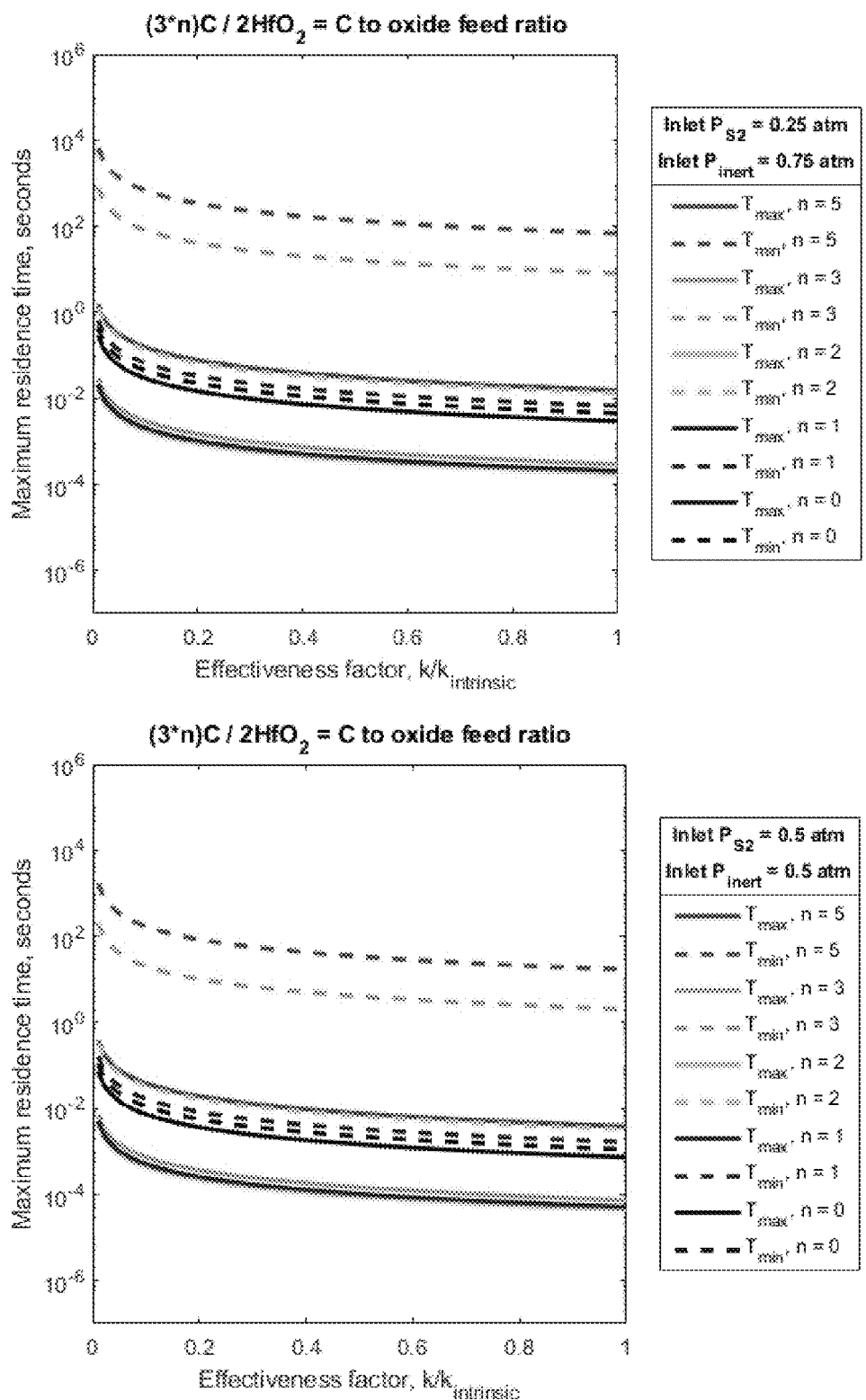
Figure 14A:
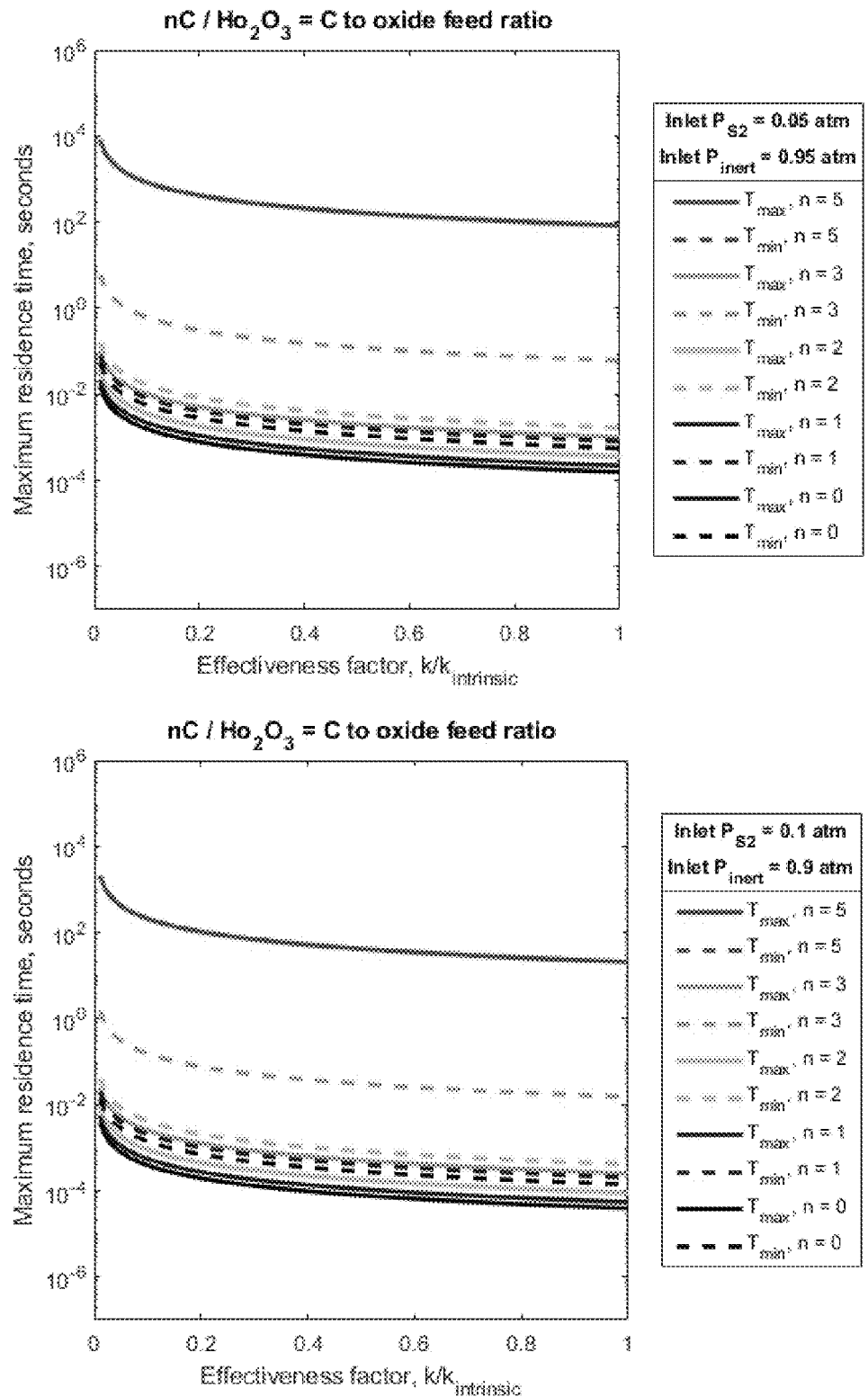
Figure 14B:
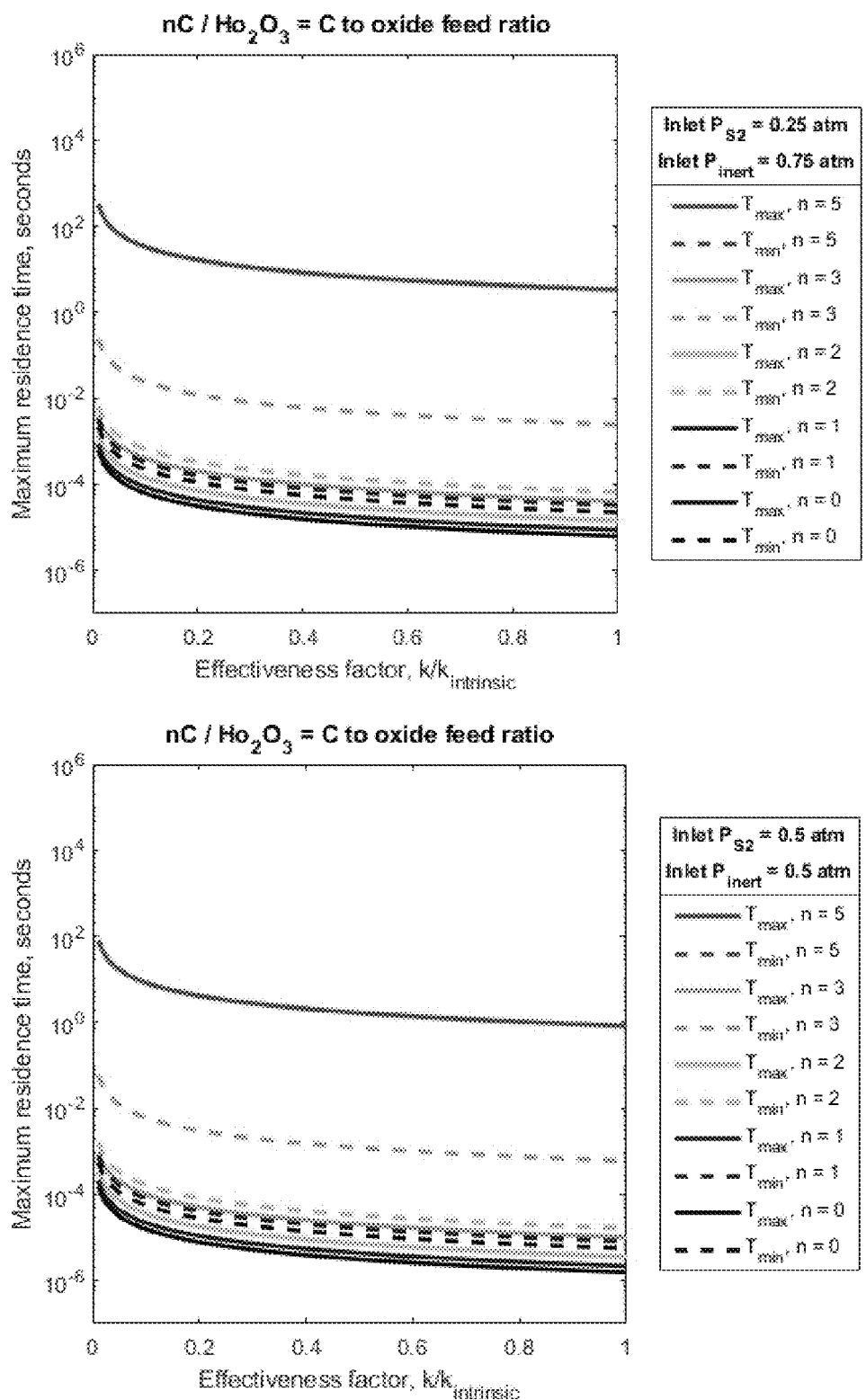
Figure 14C:
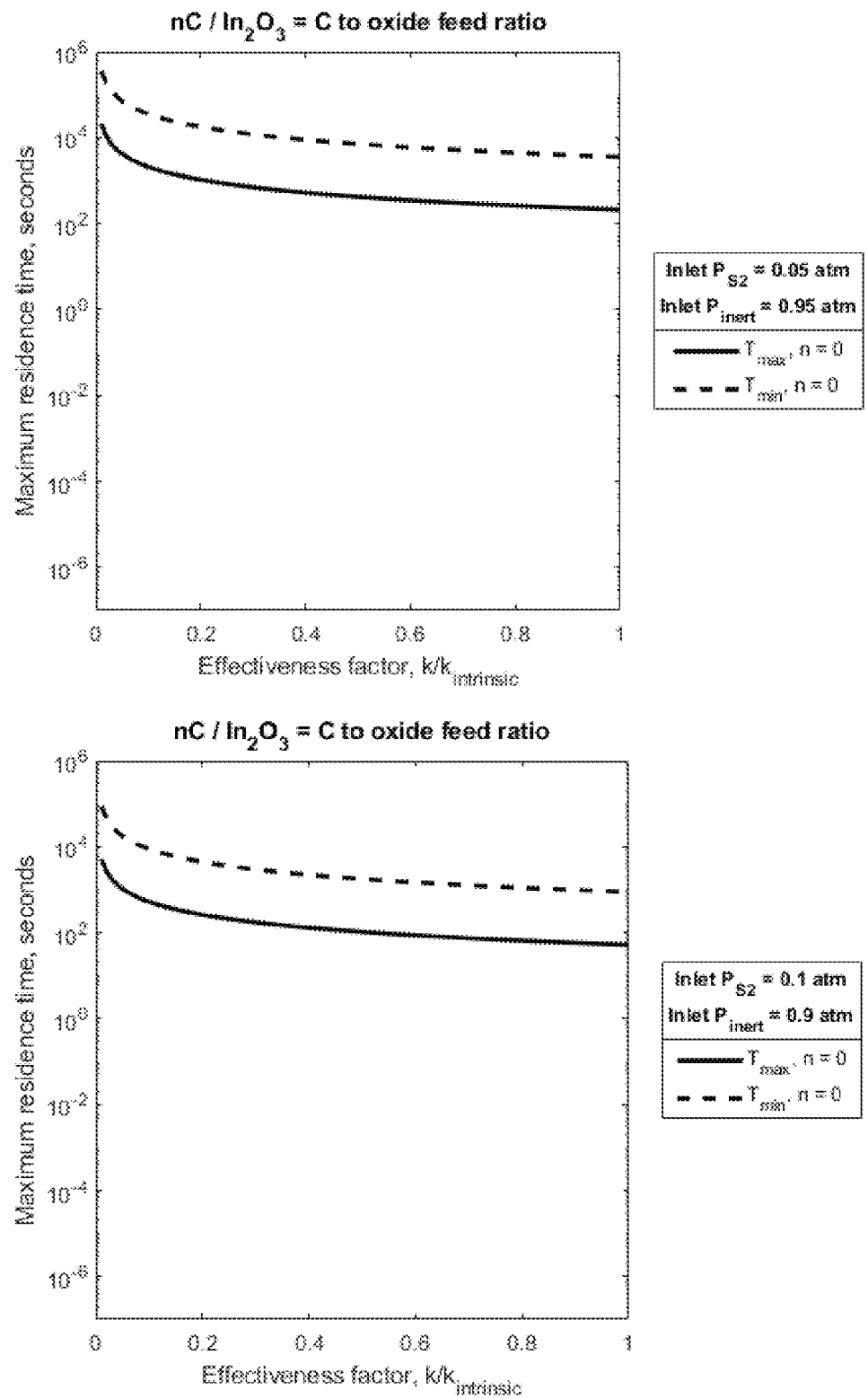
Figure 14D:
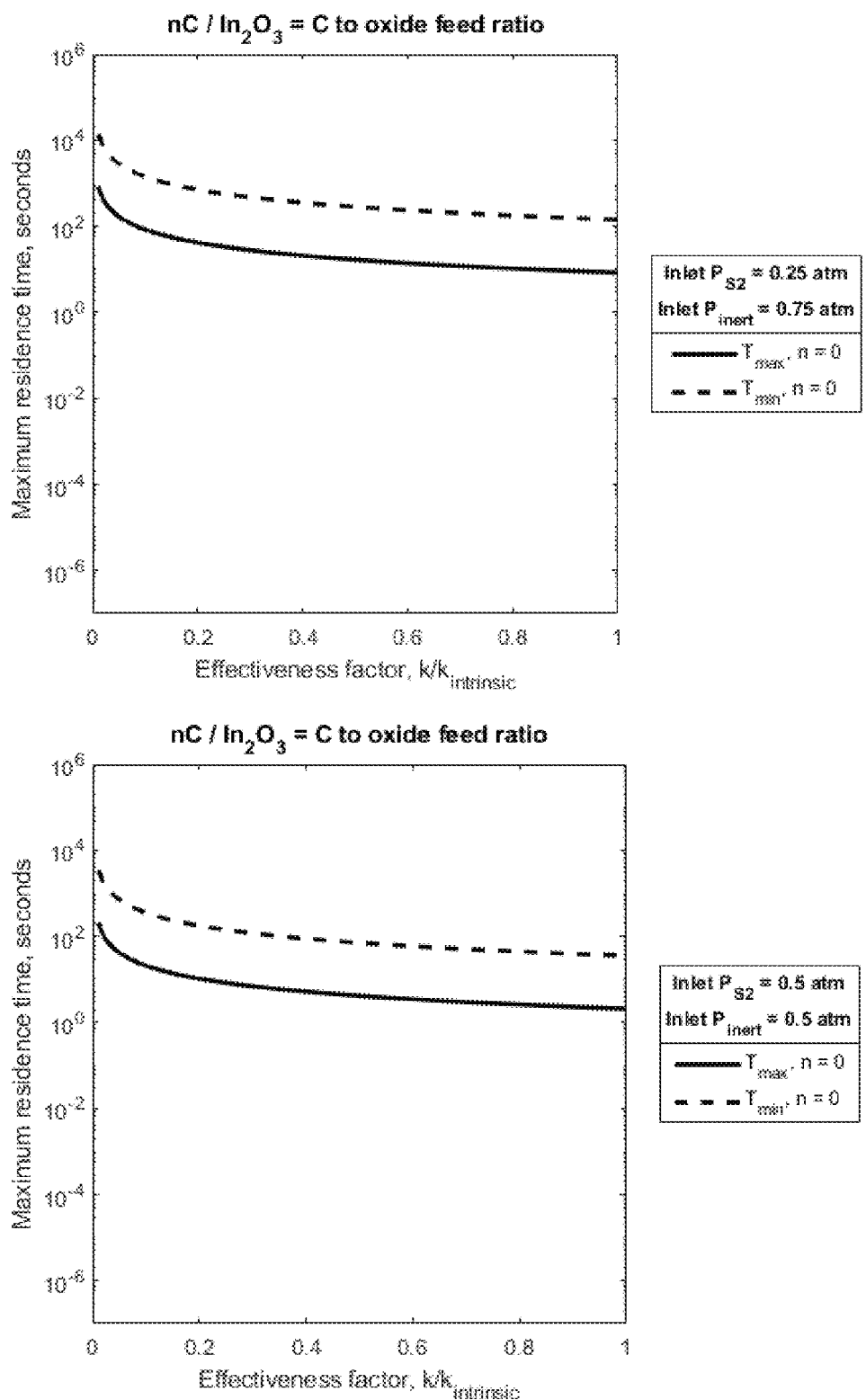
Figure 14E:
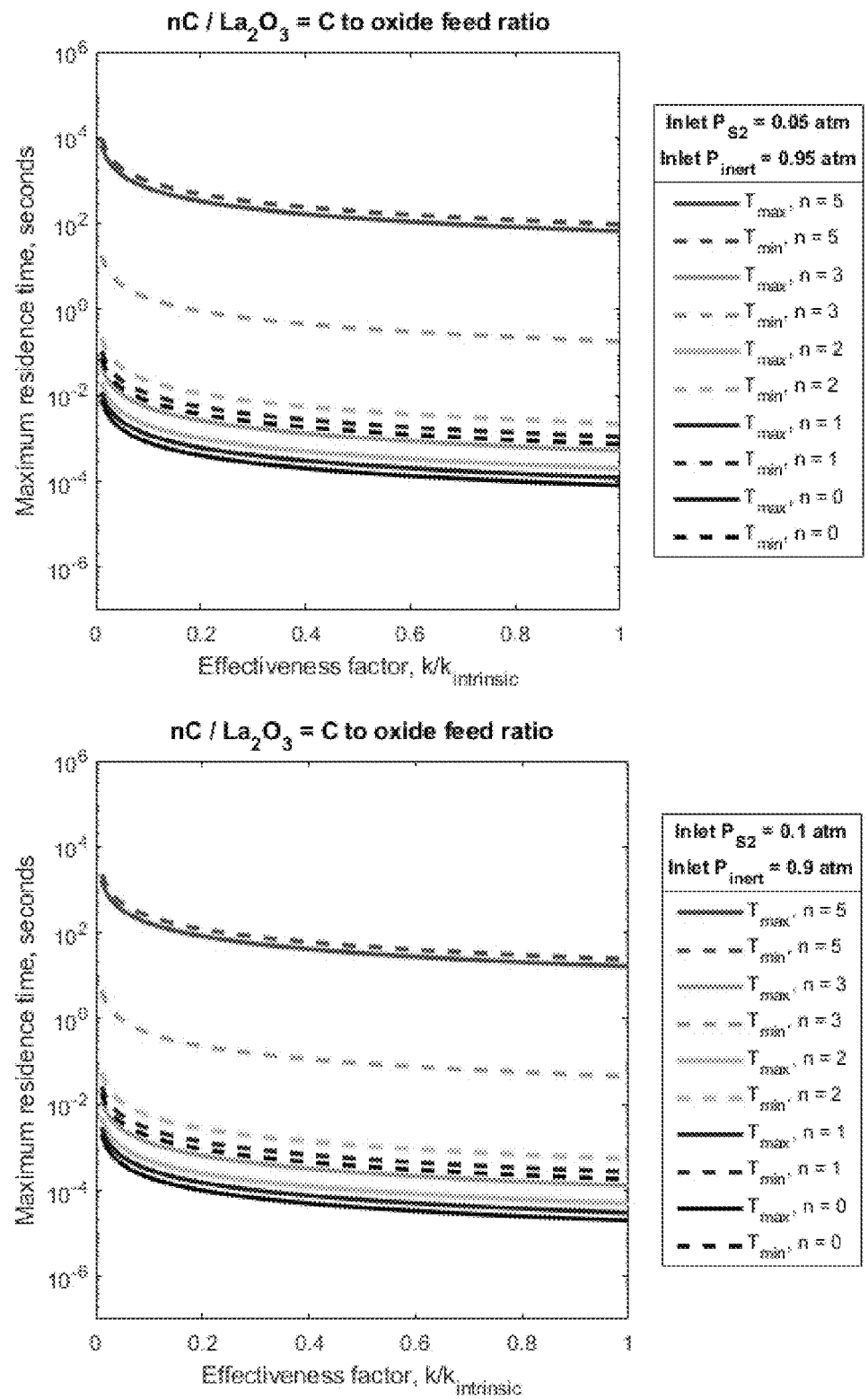
Figure 14F:
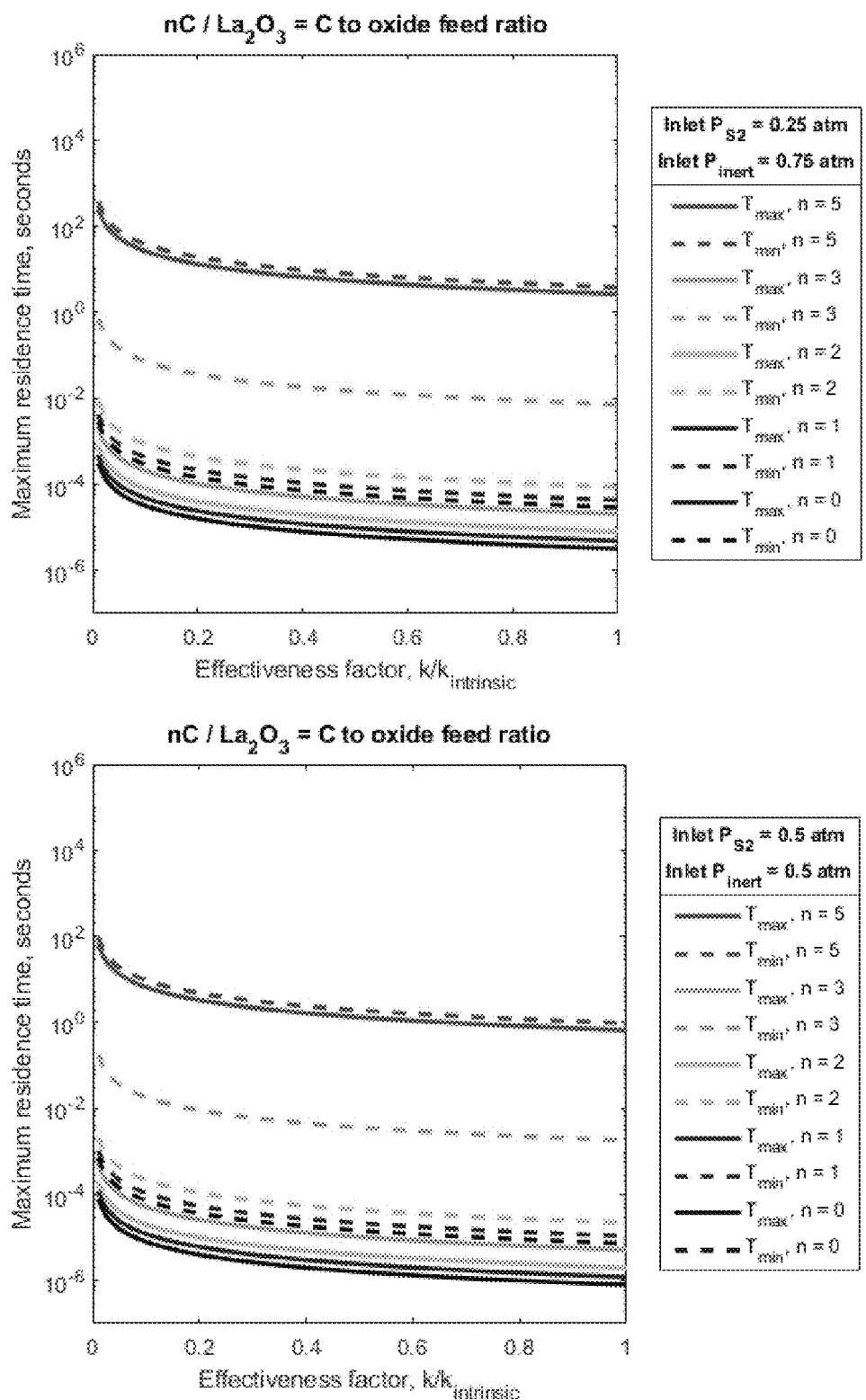
Figure 14G:
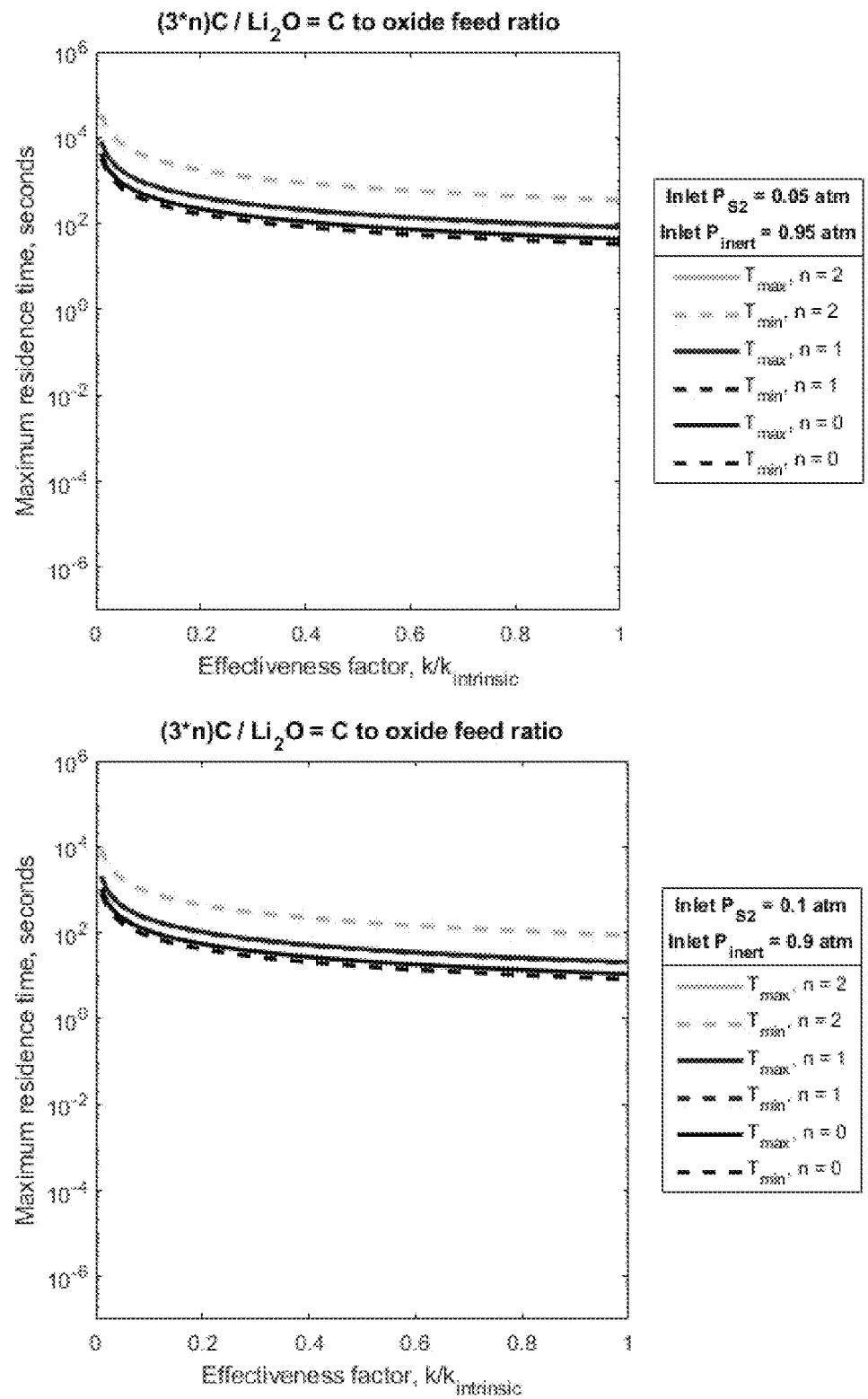
Figure 14H:
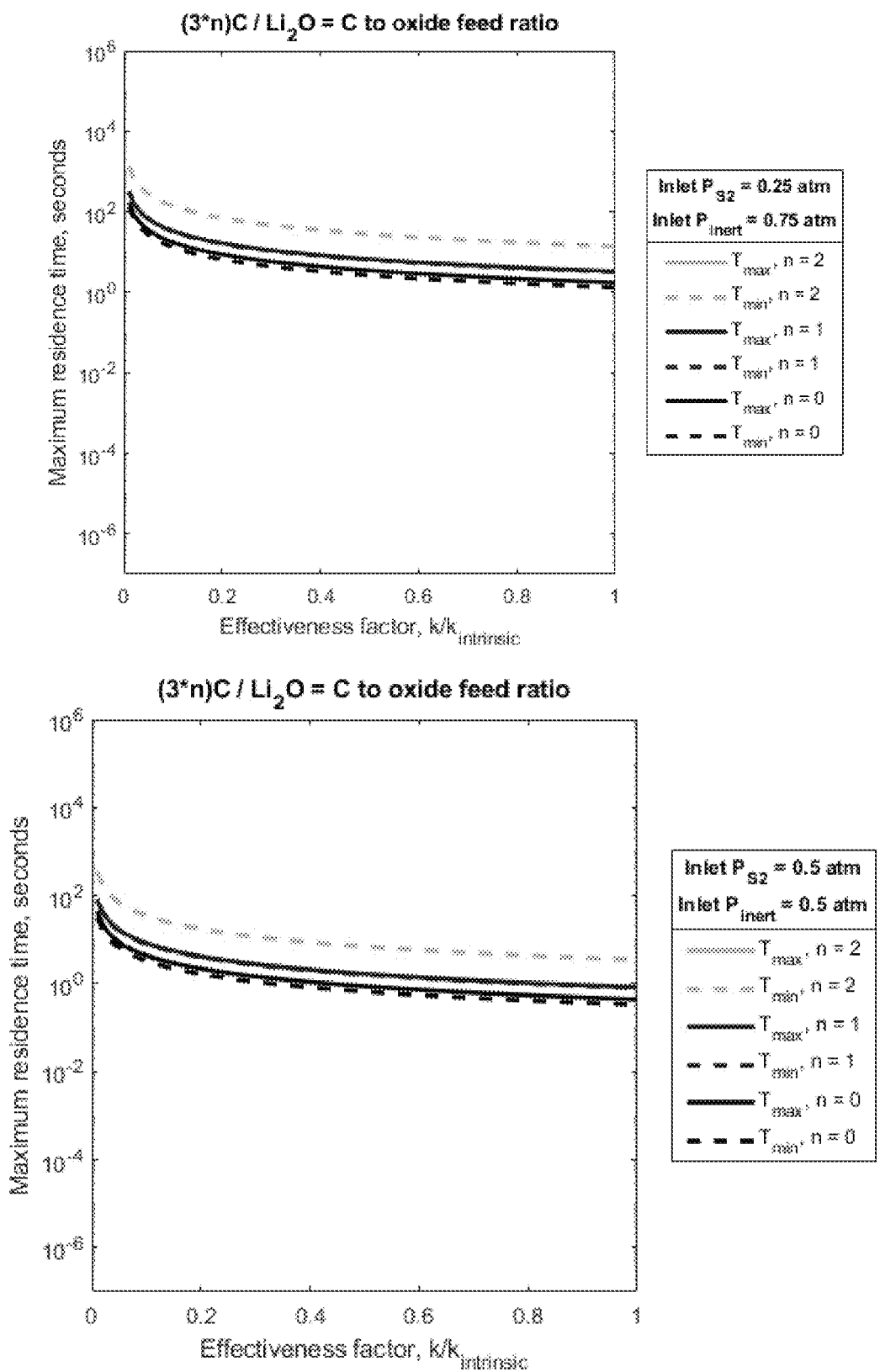
Figure 14I:
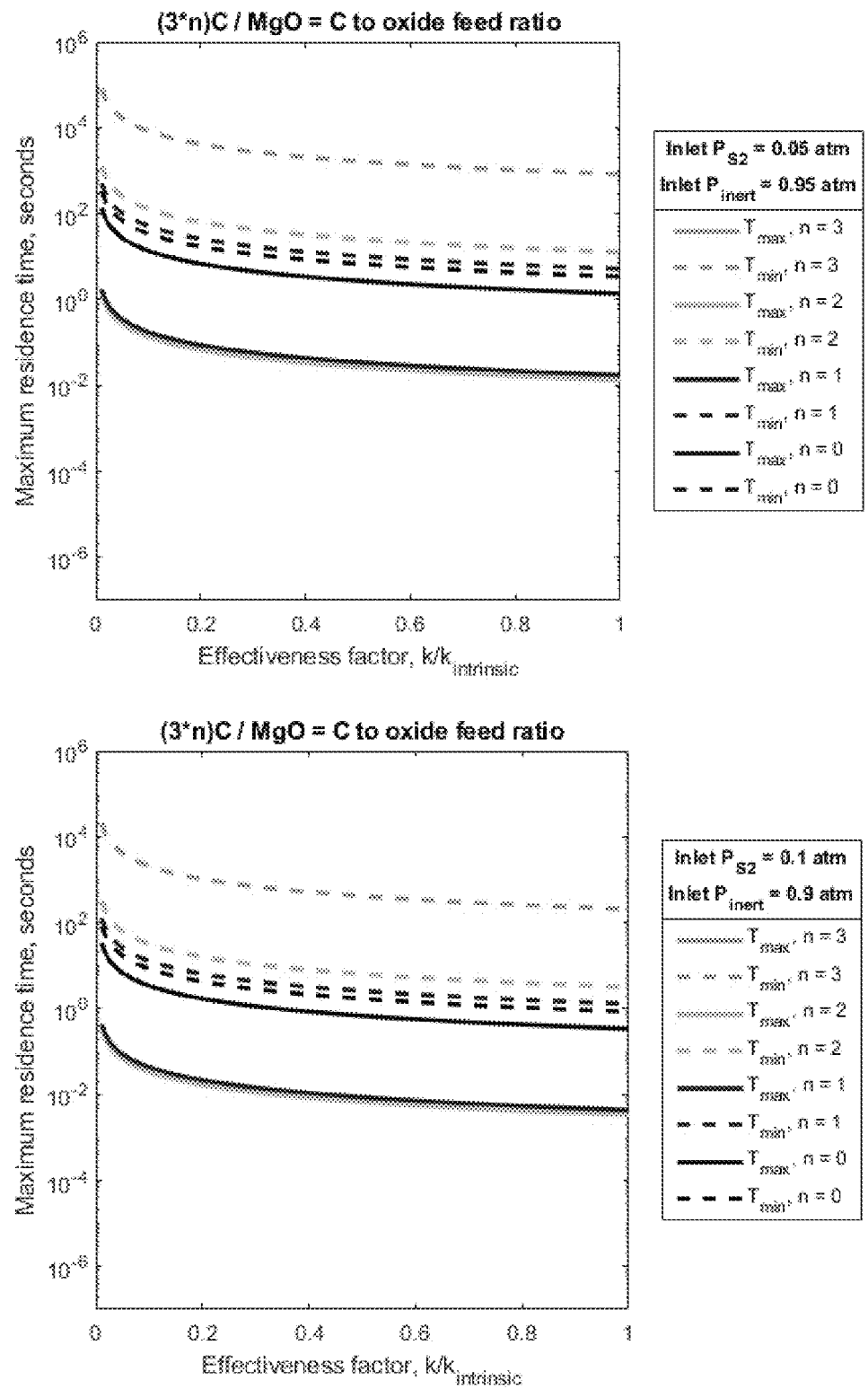
Figure 14J:
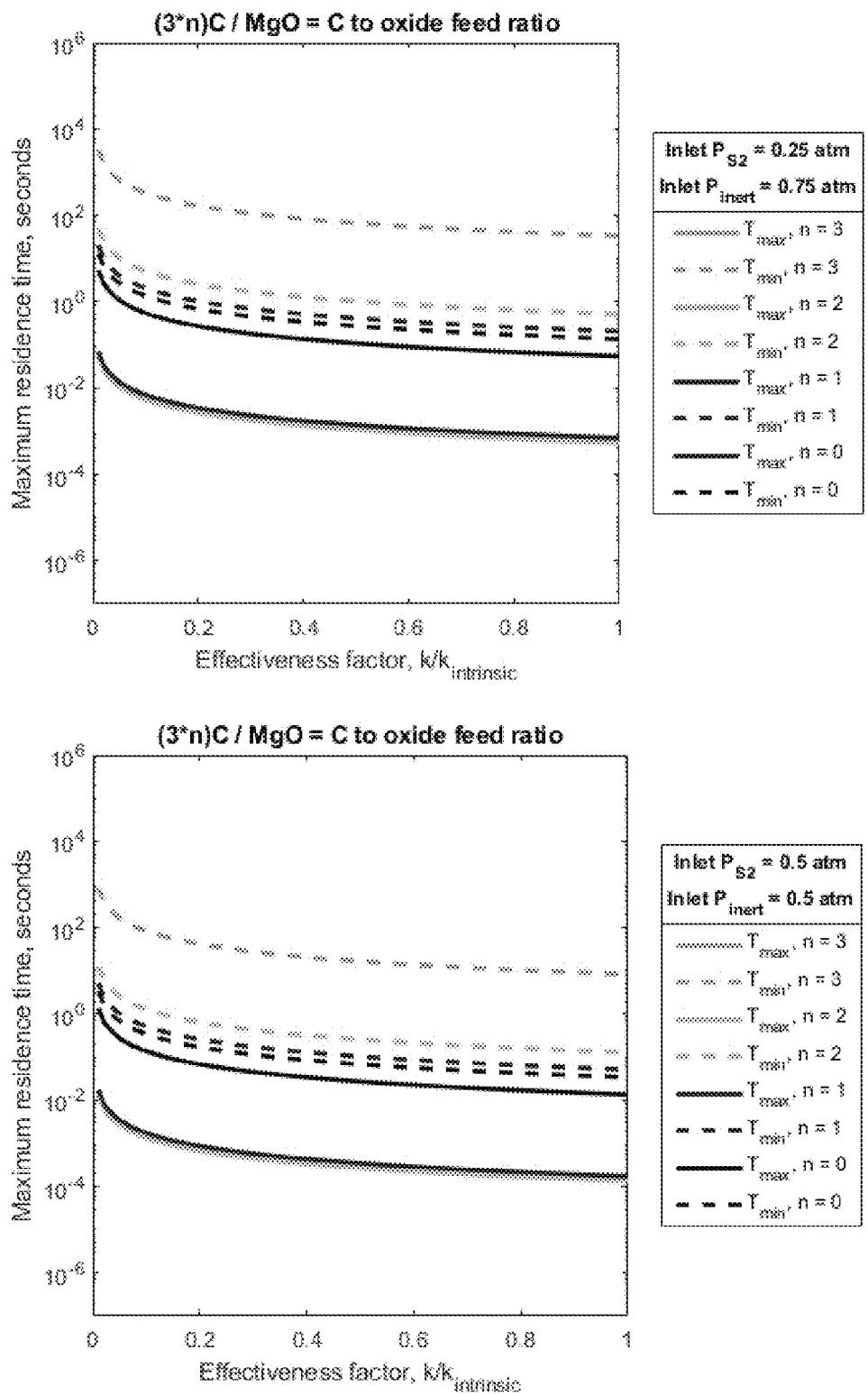
Figure 14K:
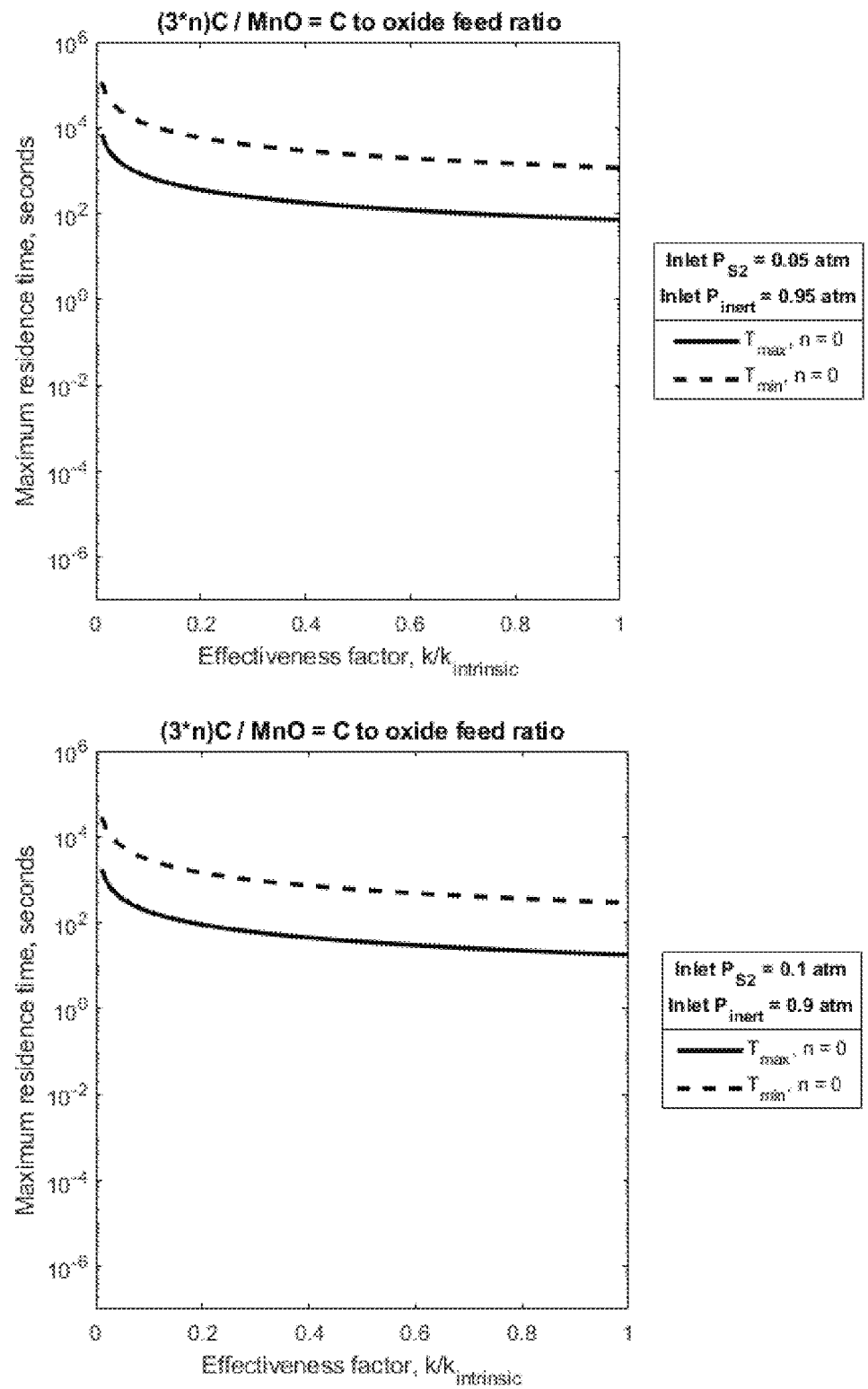
Figure 14L:
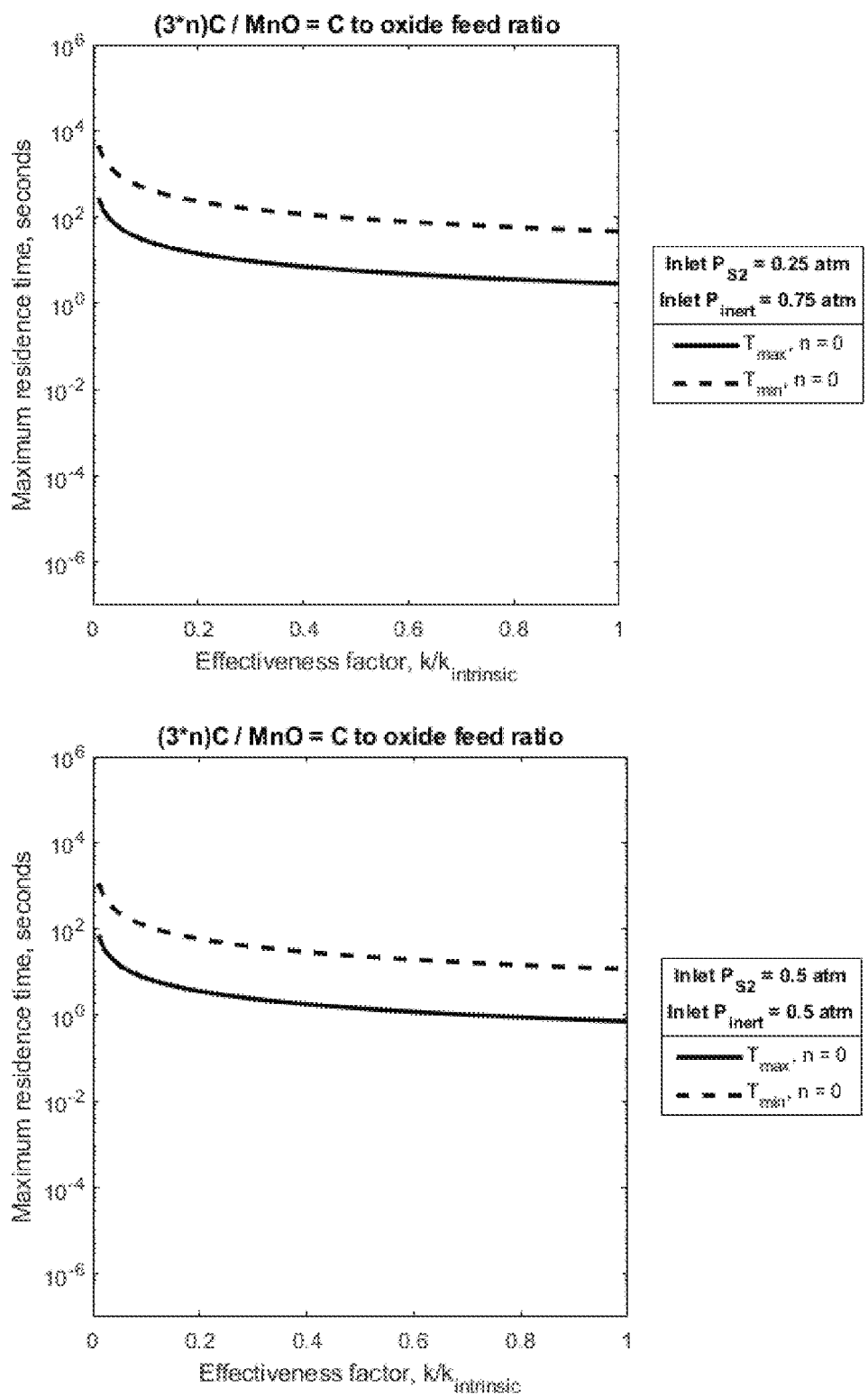
Figure 14M:
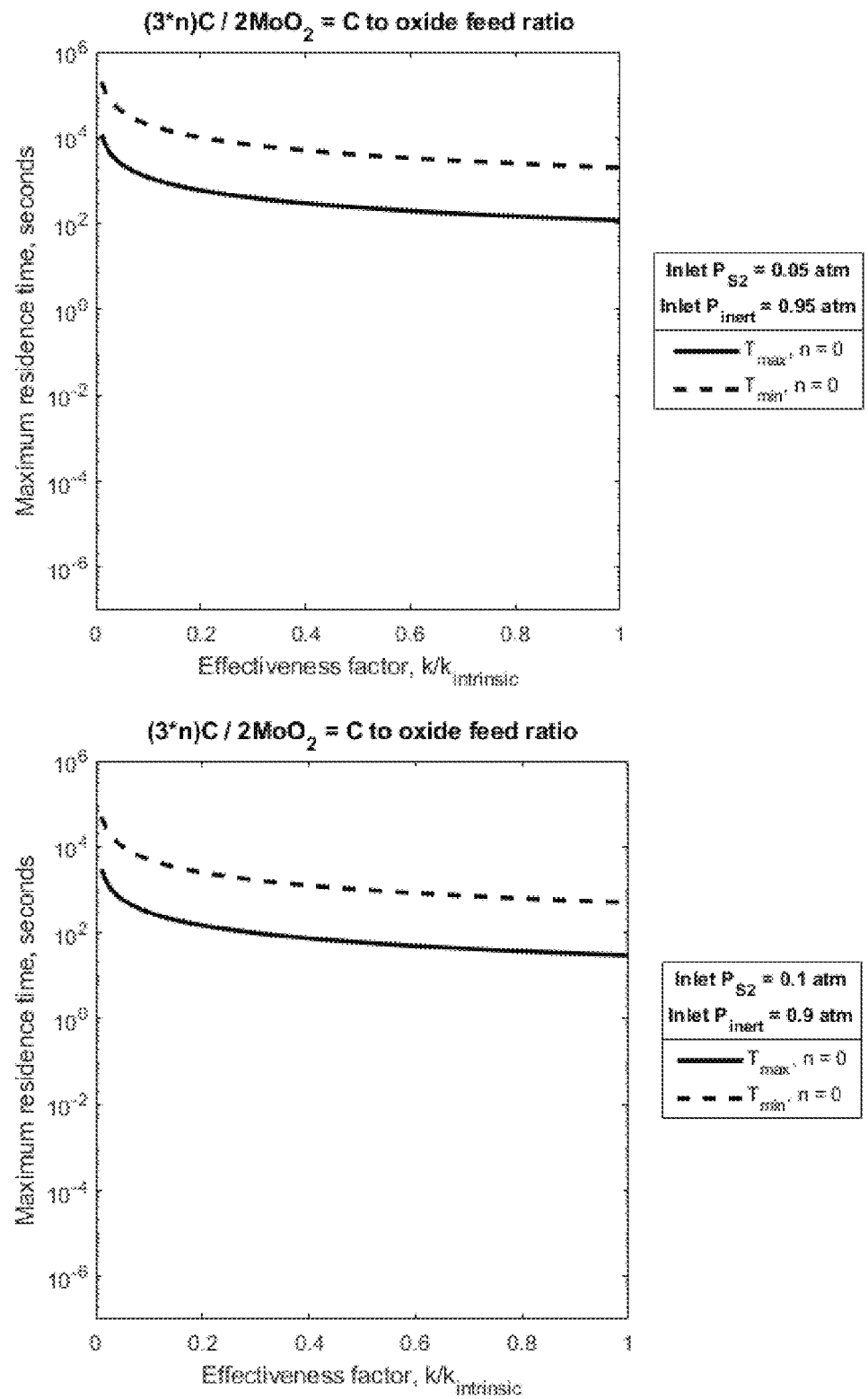
Figure 14N:
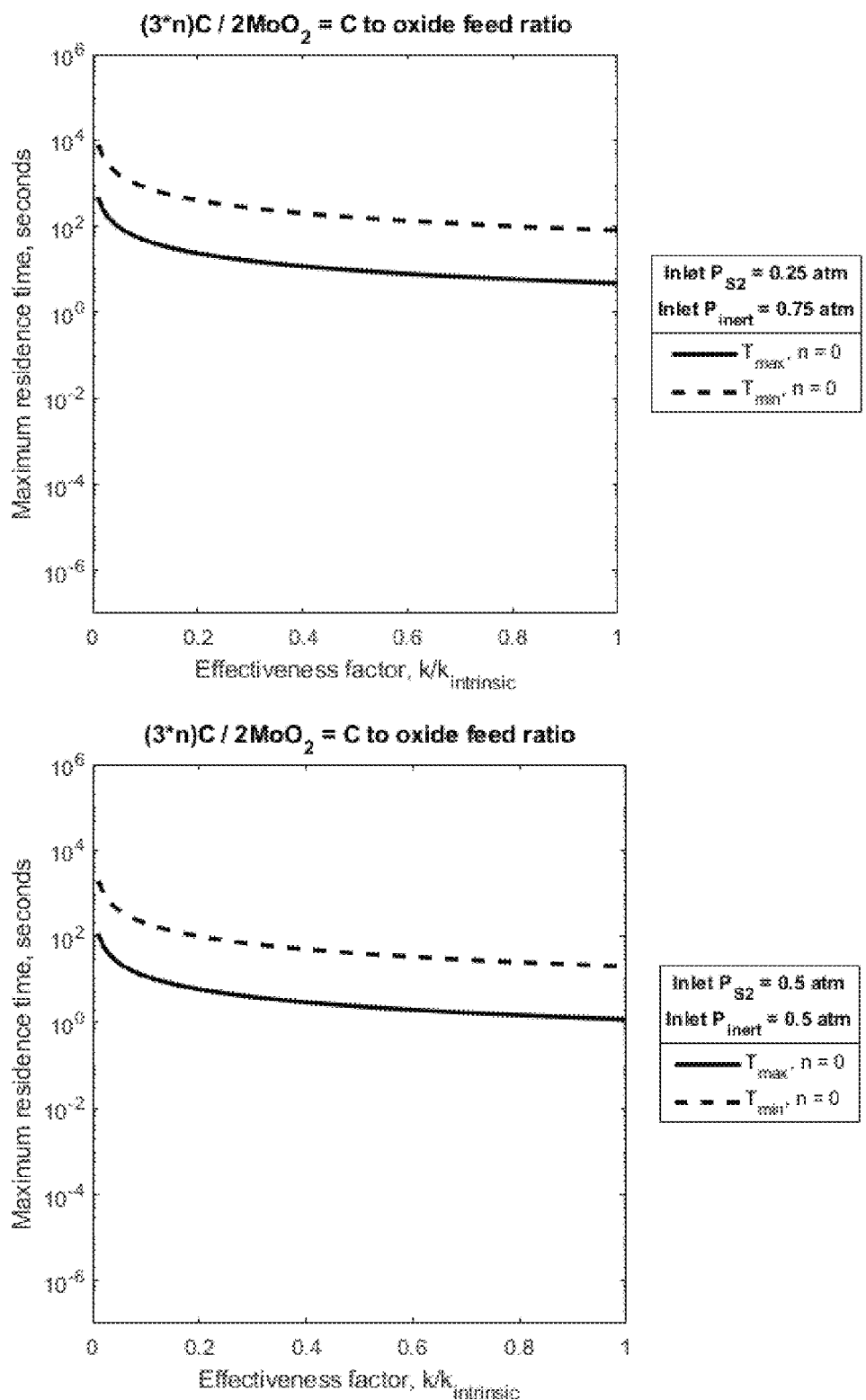
Figure 14O:
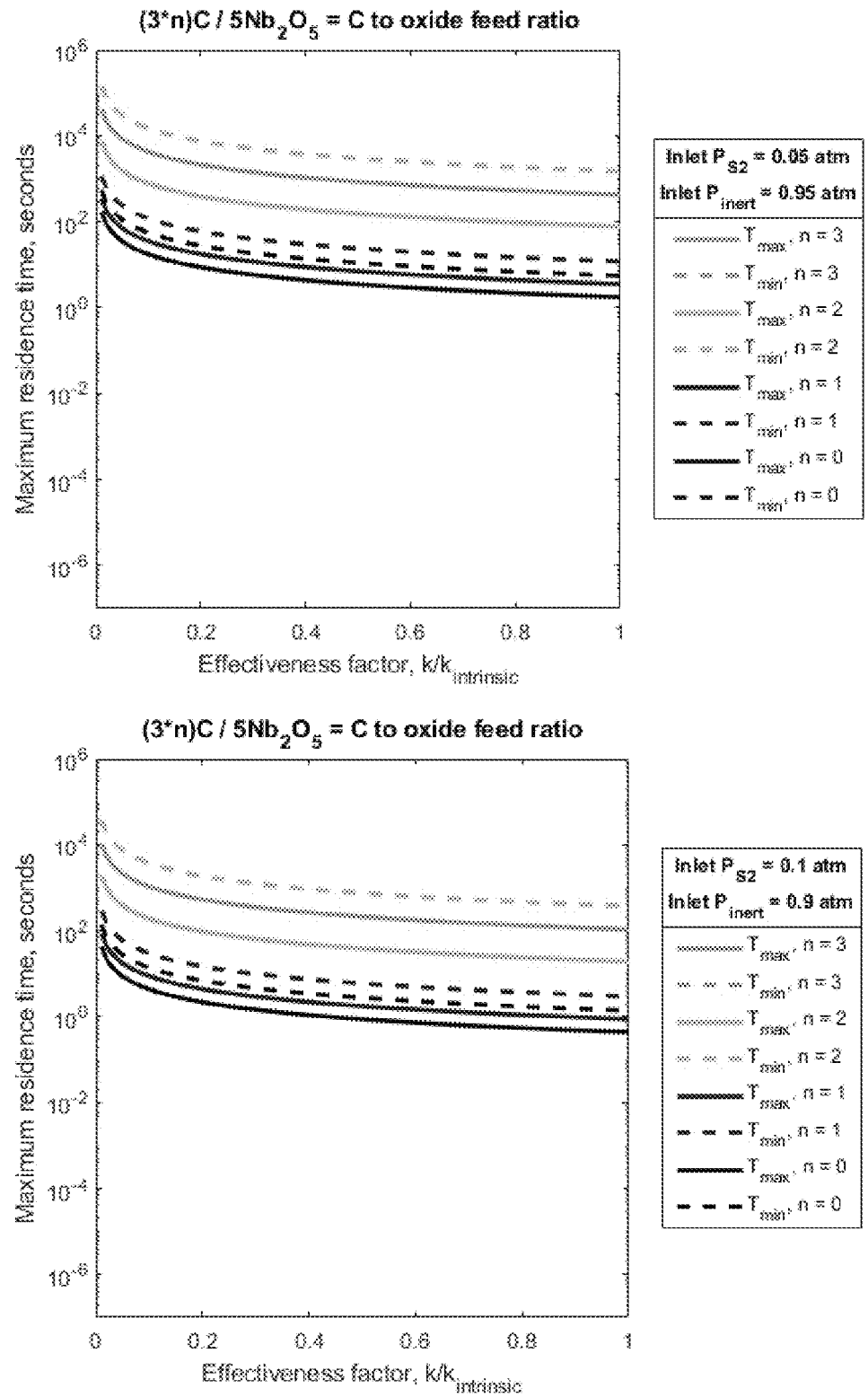
Figure 14P:
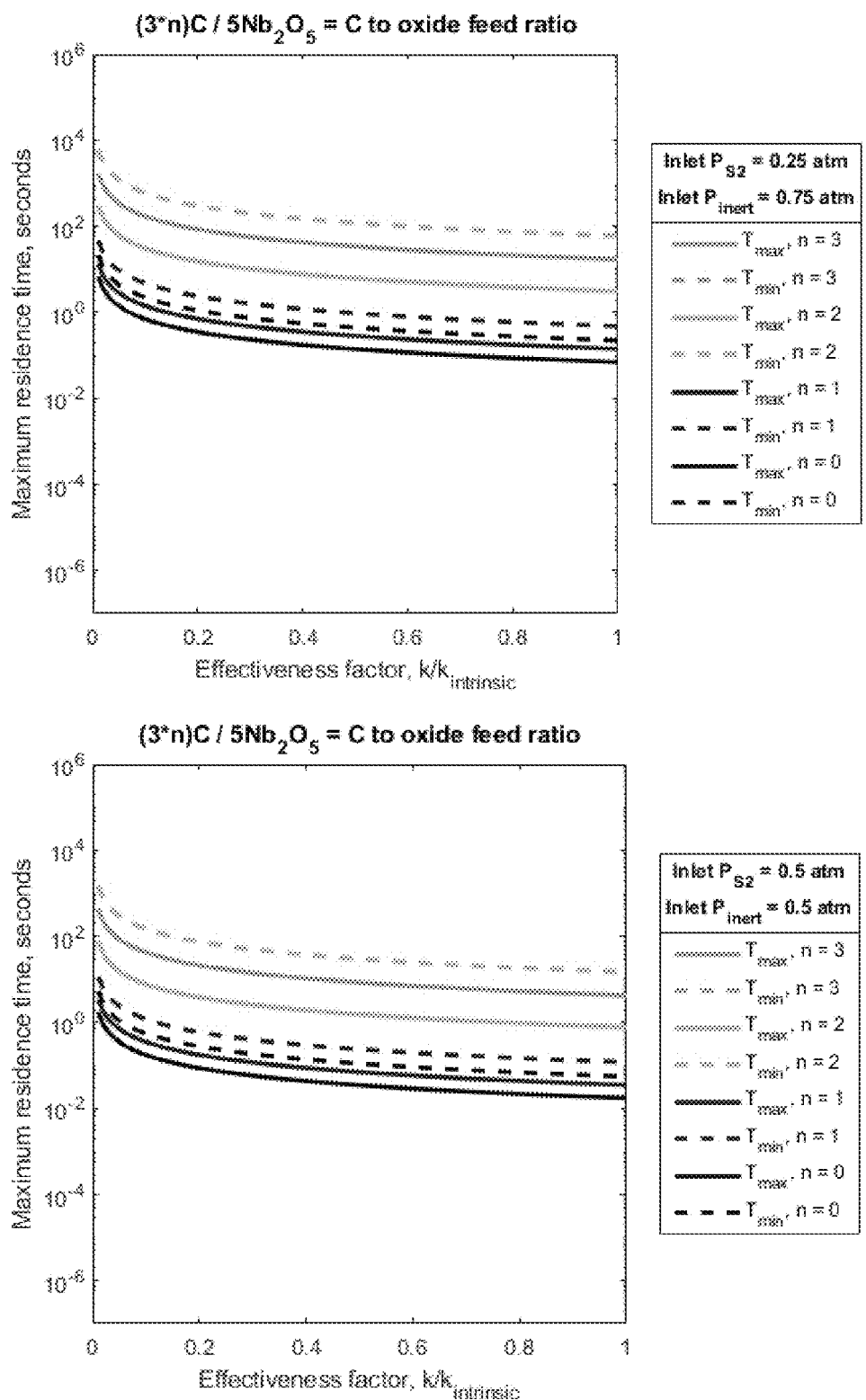
Figure 14Q:
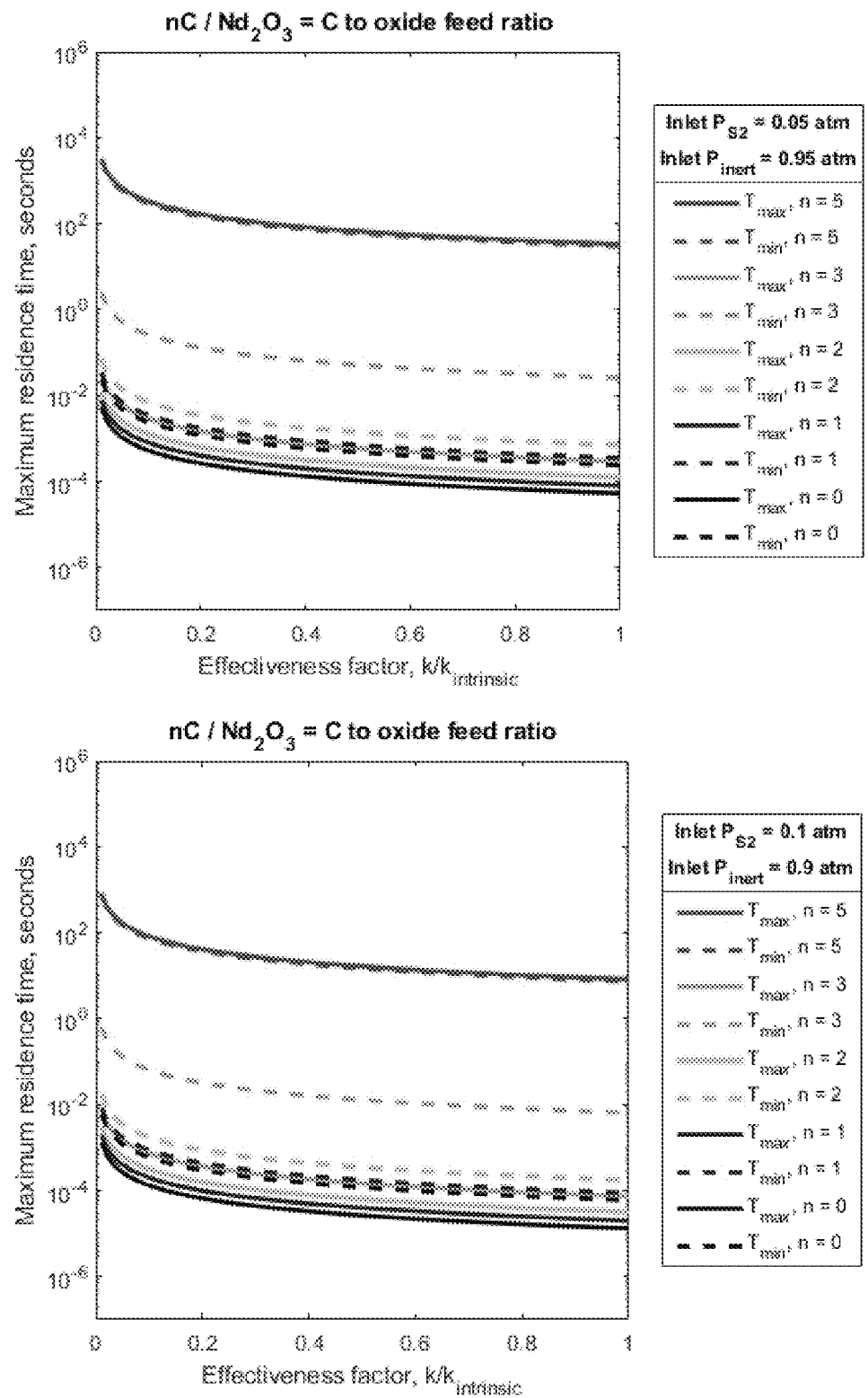
Figure 14R:
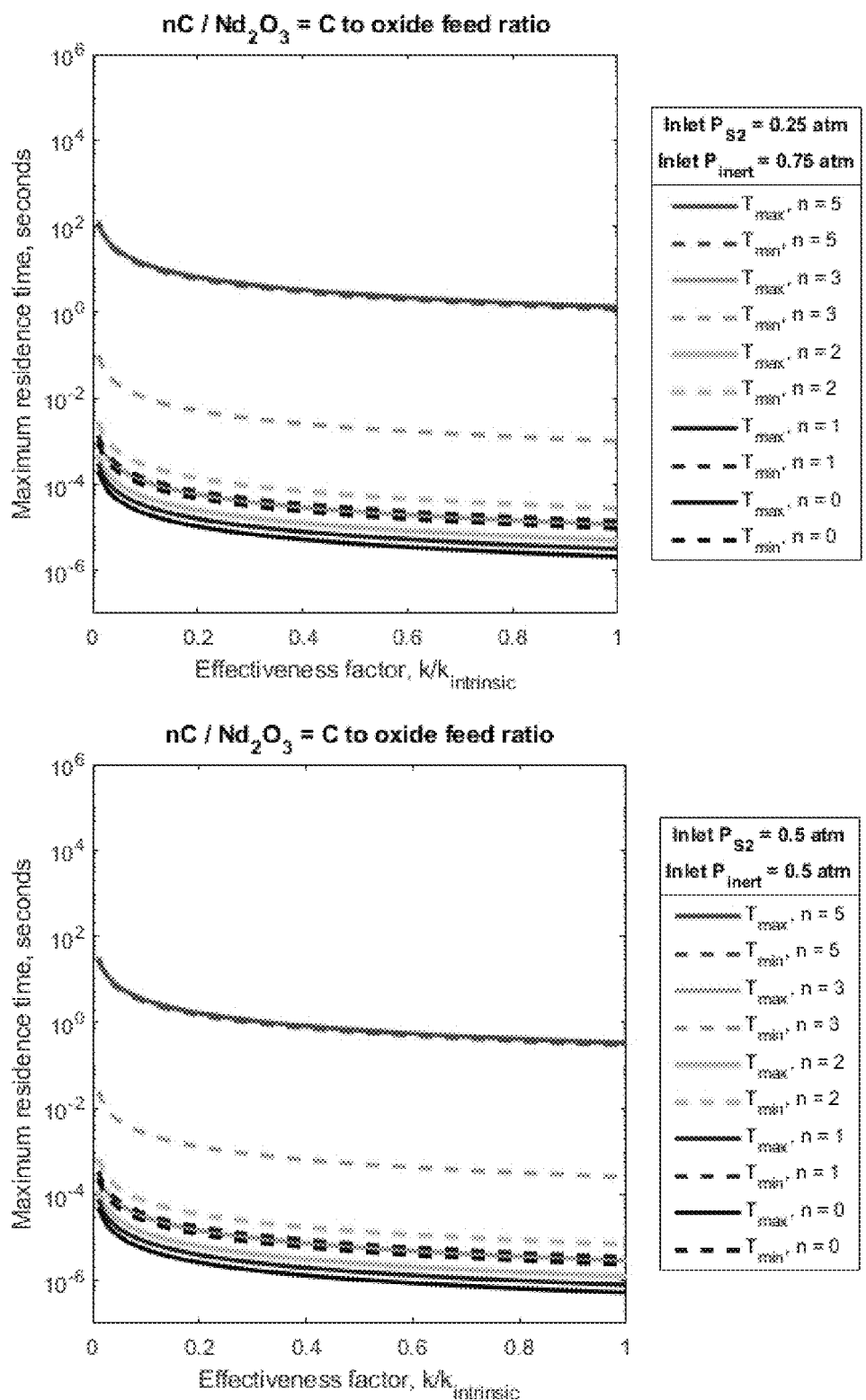
Figure 14S:
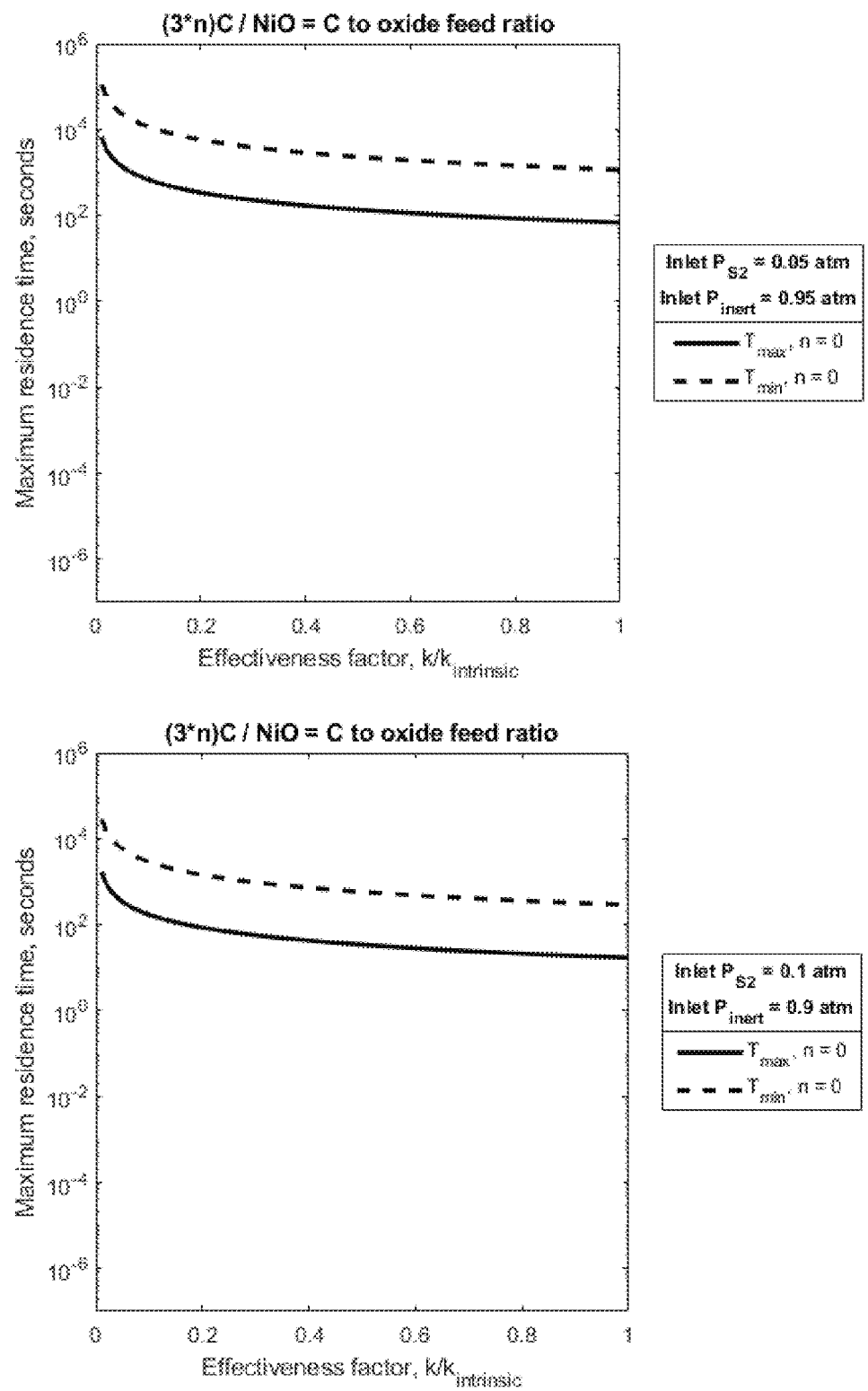
Figure 14T:
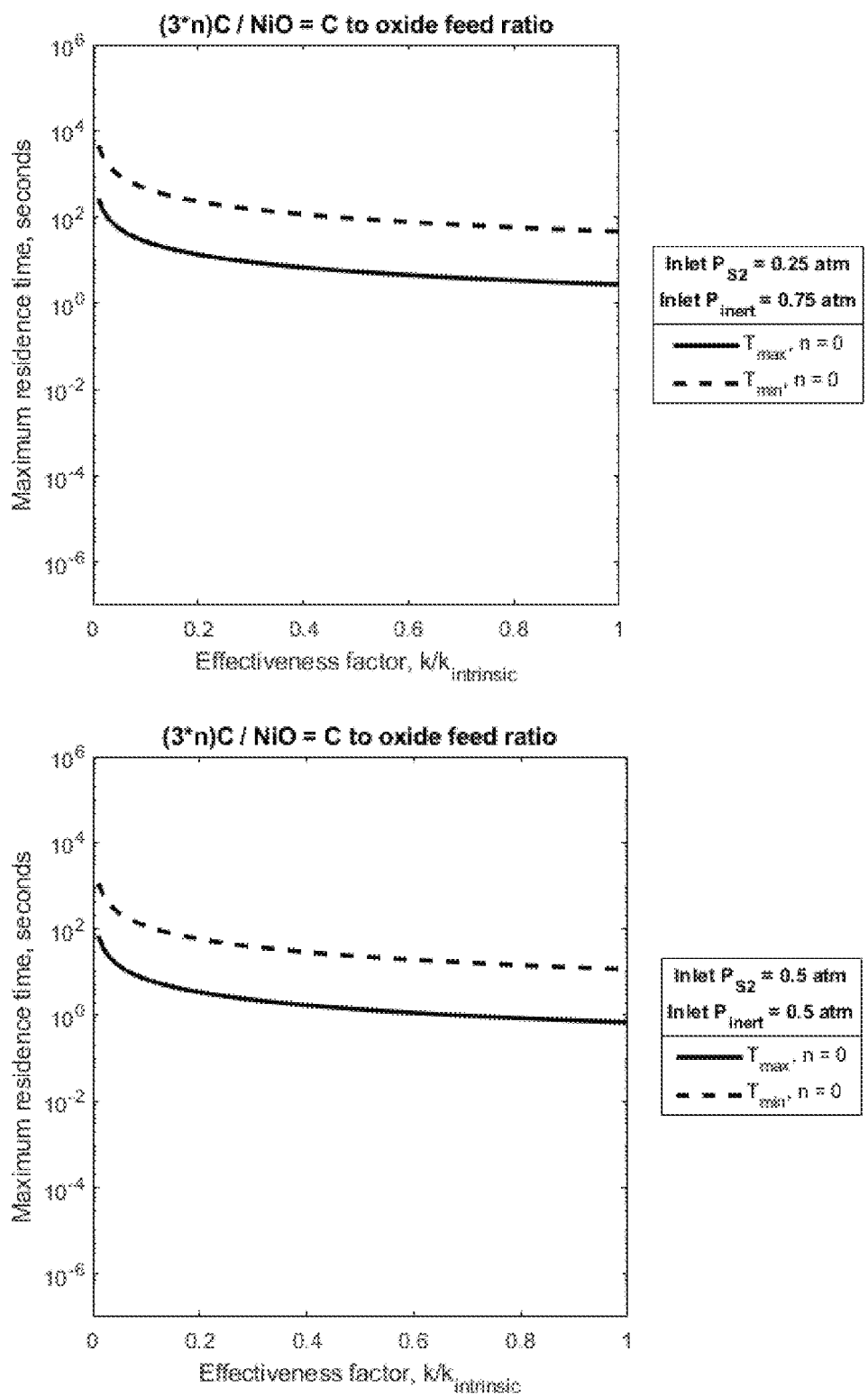
Figure 14U:
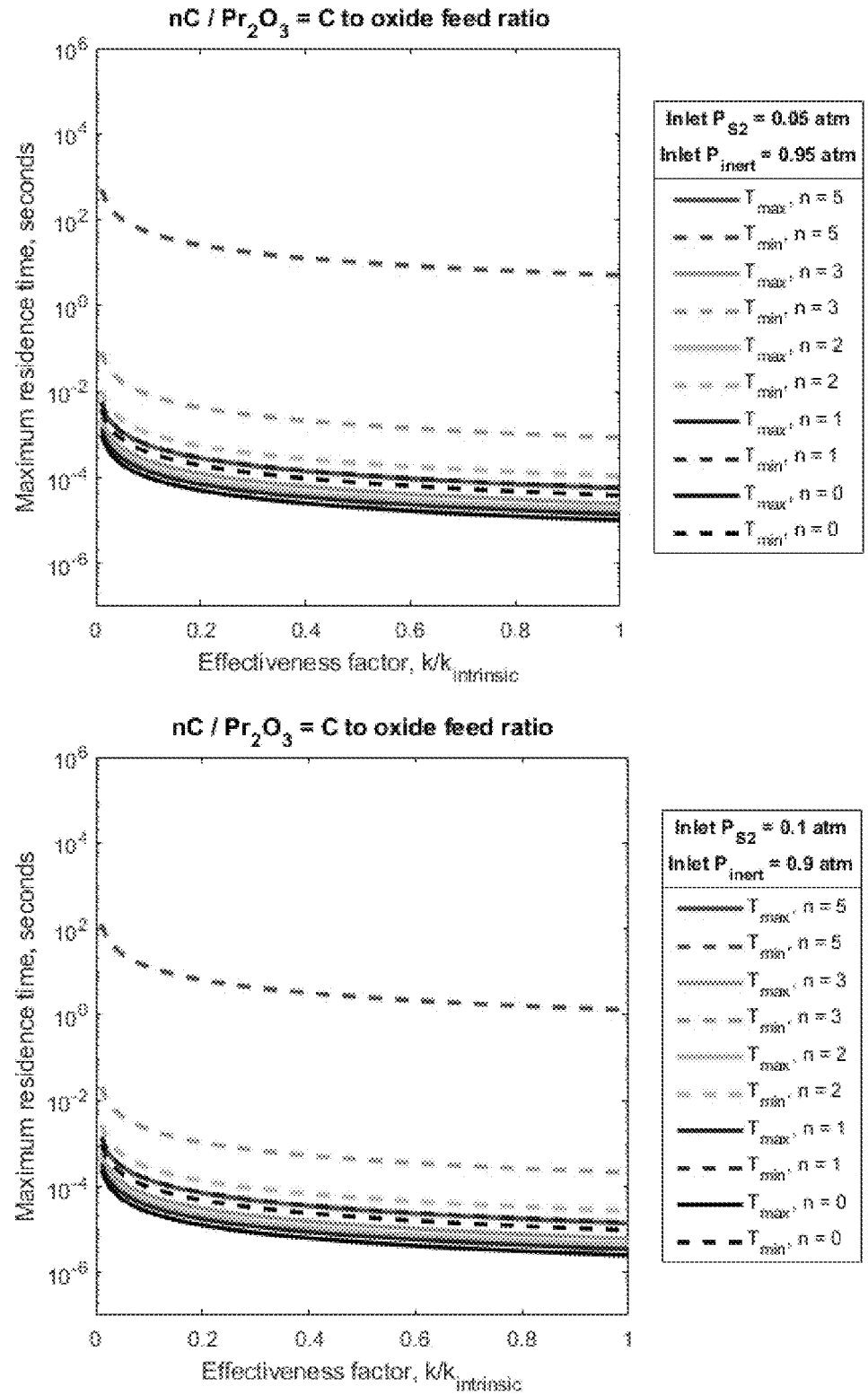
Figure 14V:
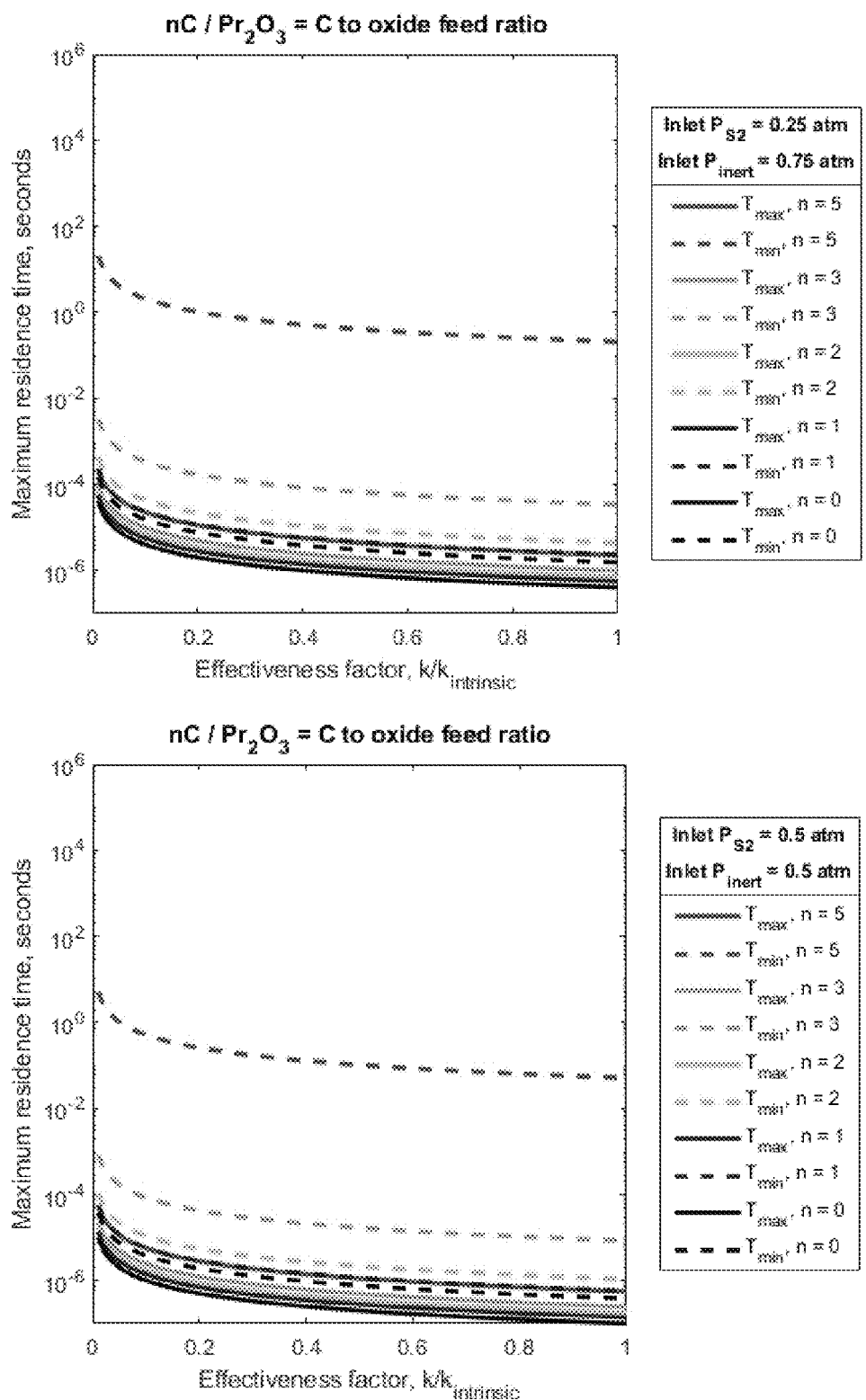
Figure 14W:
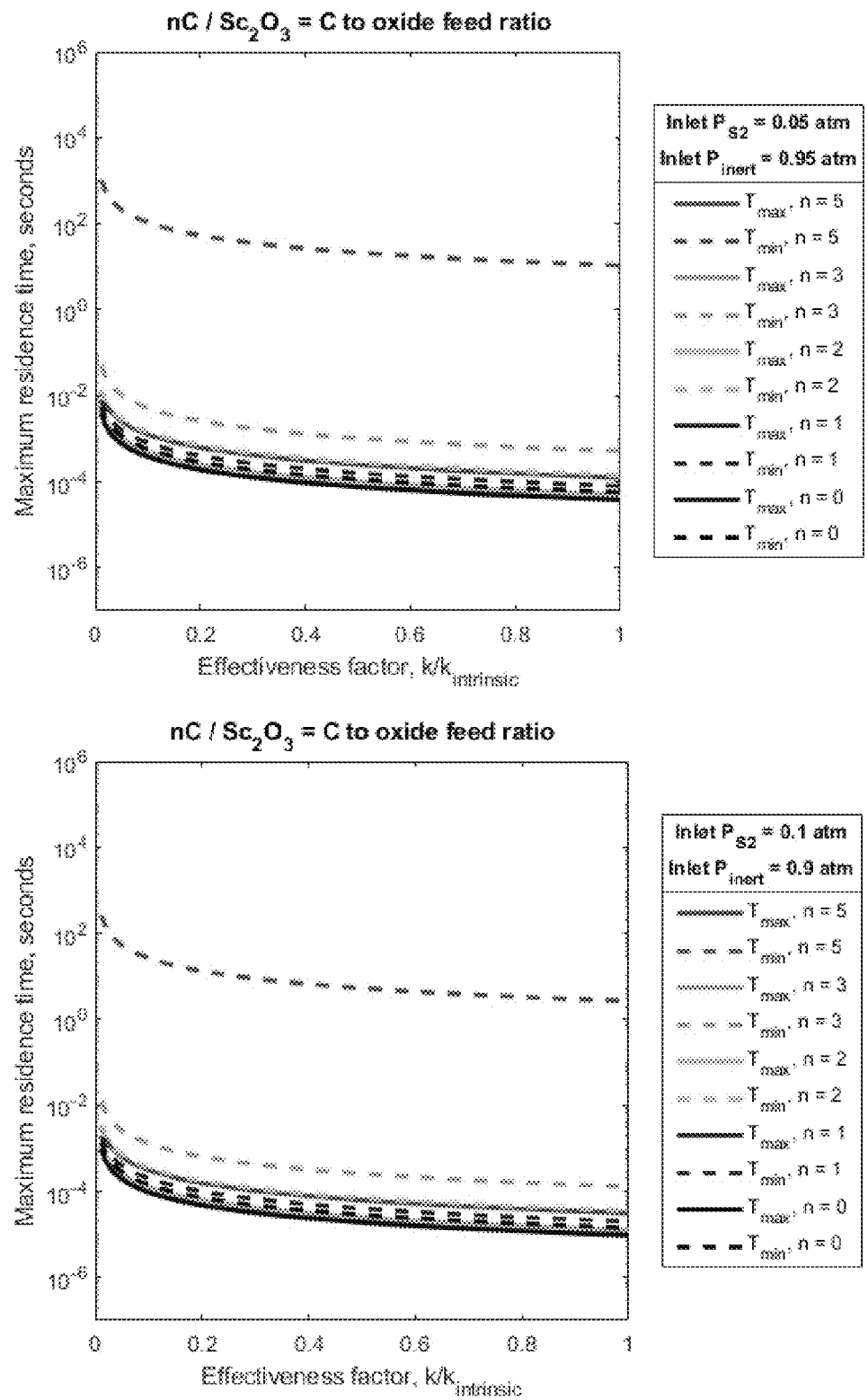
Figure 14X:
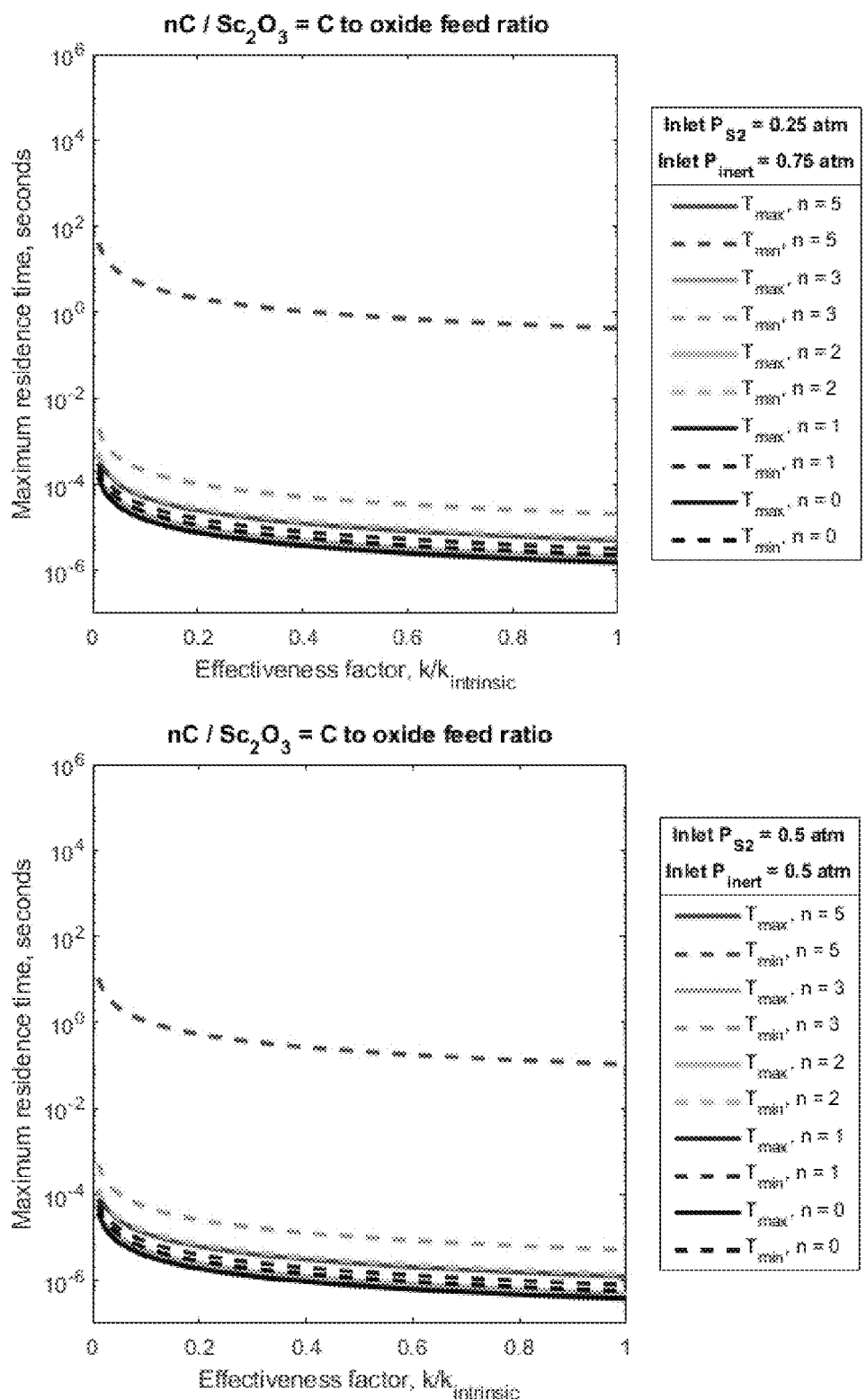
Figure 14Y:
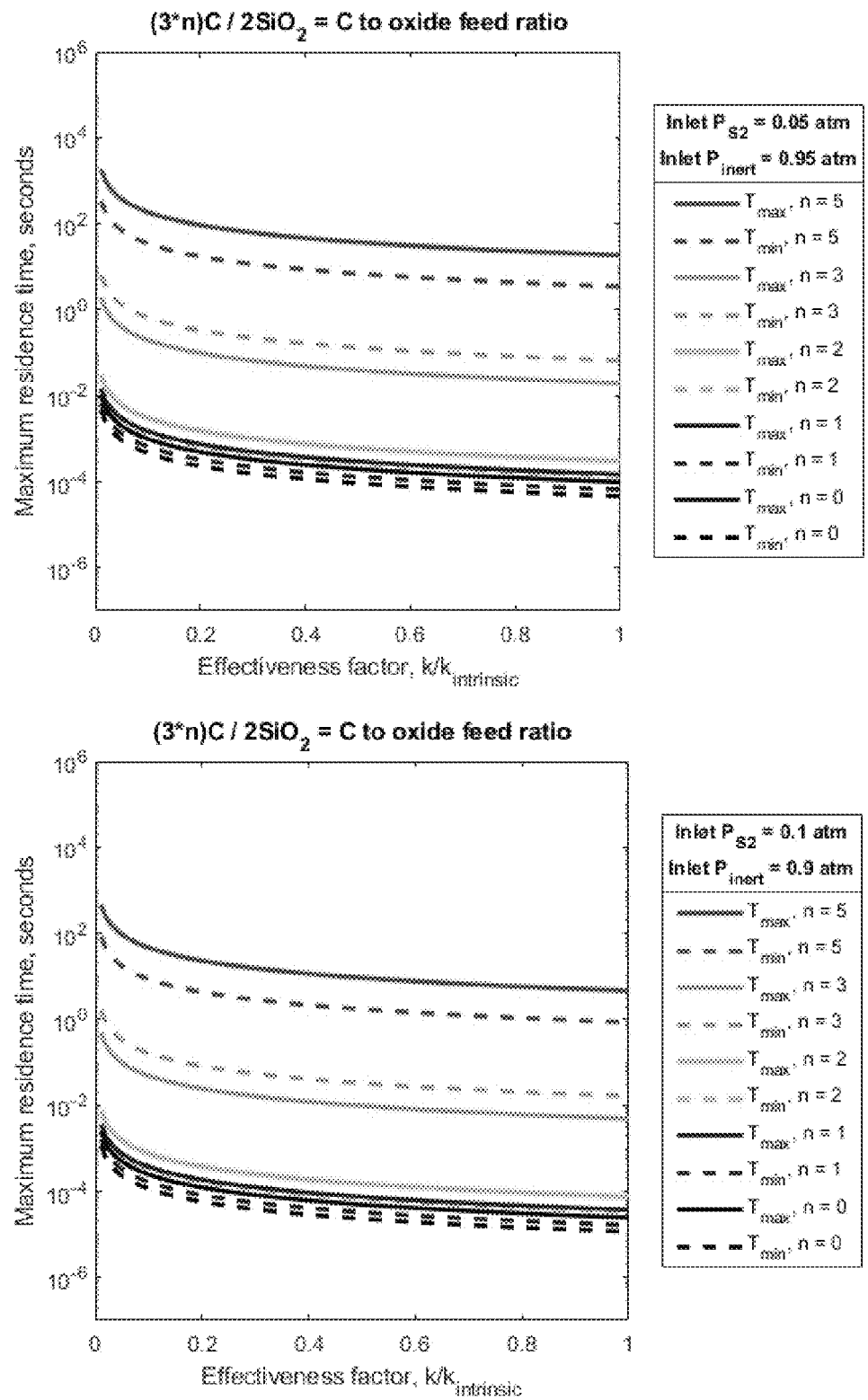
Figure 14Z:
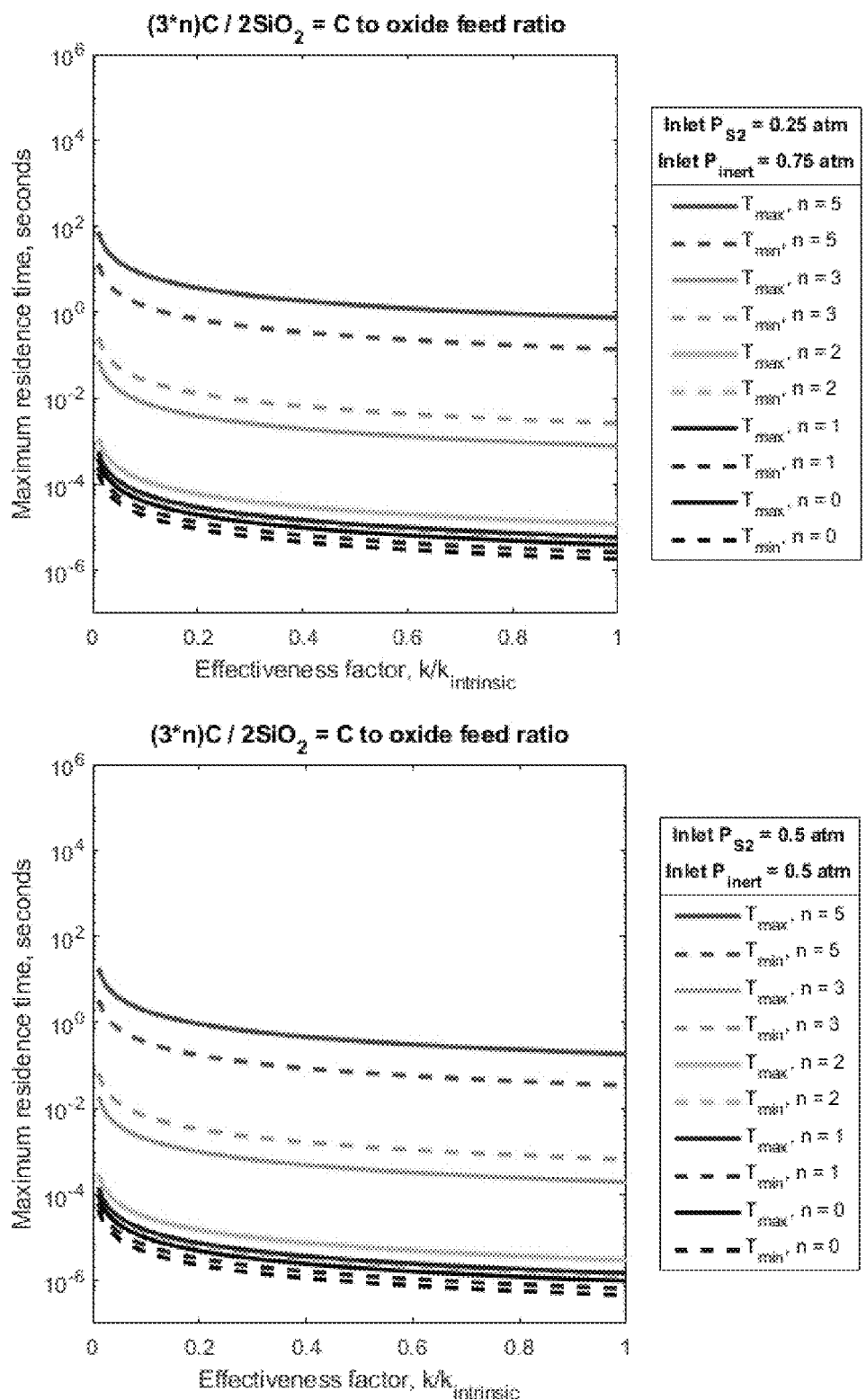
Figure 15A:
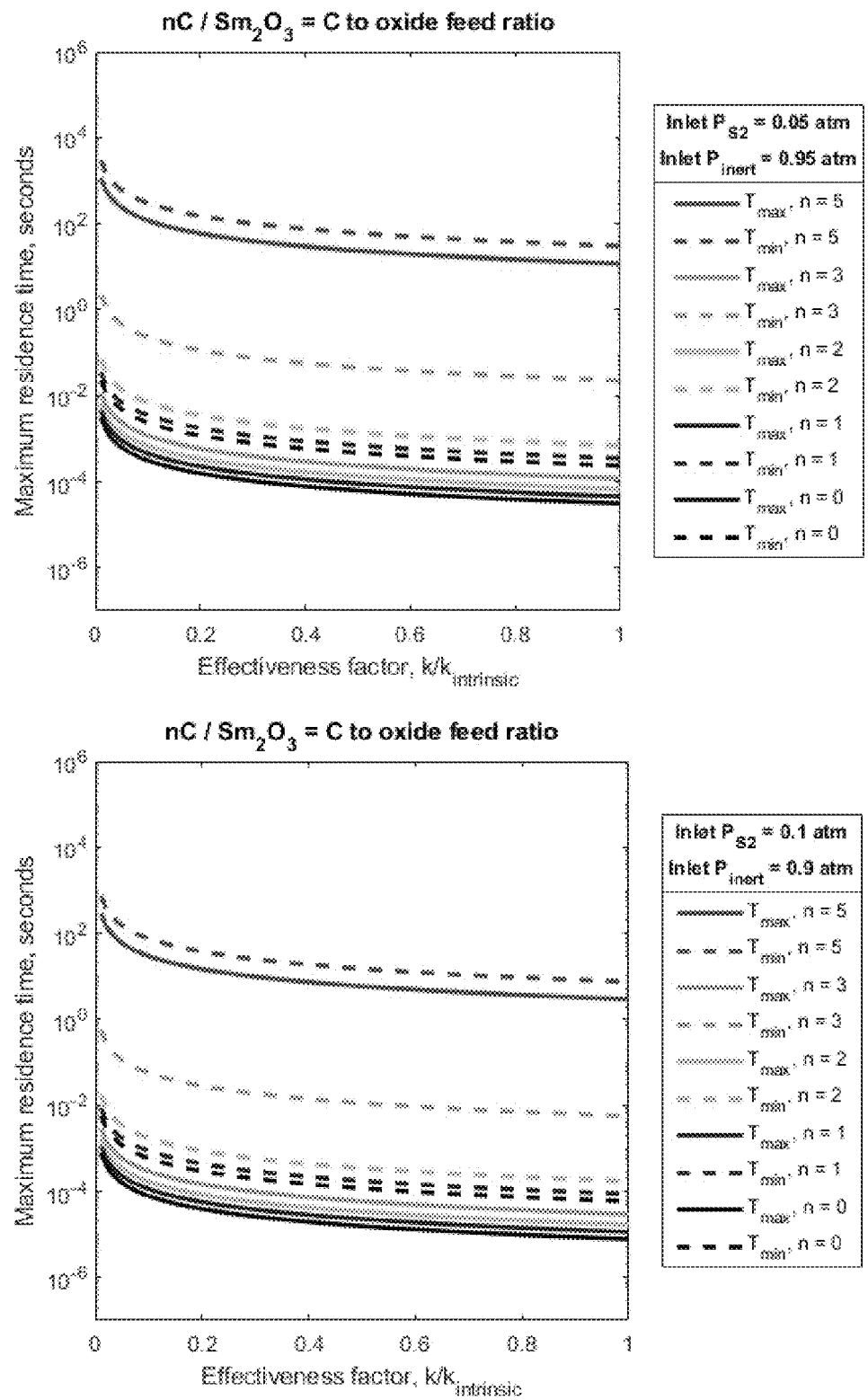
Figure 15B:
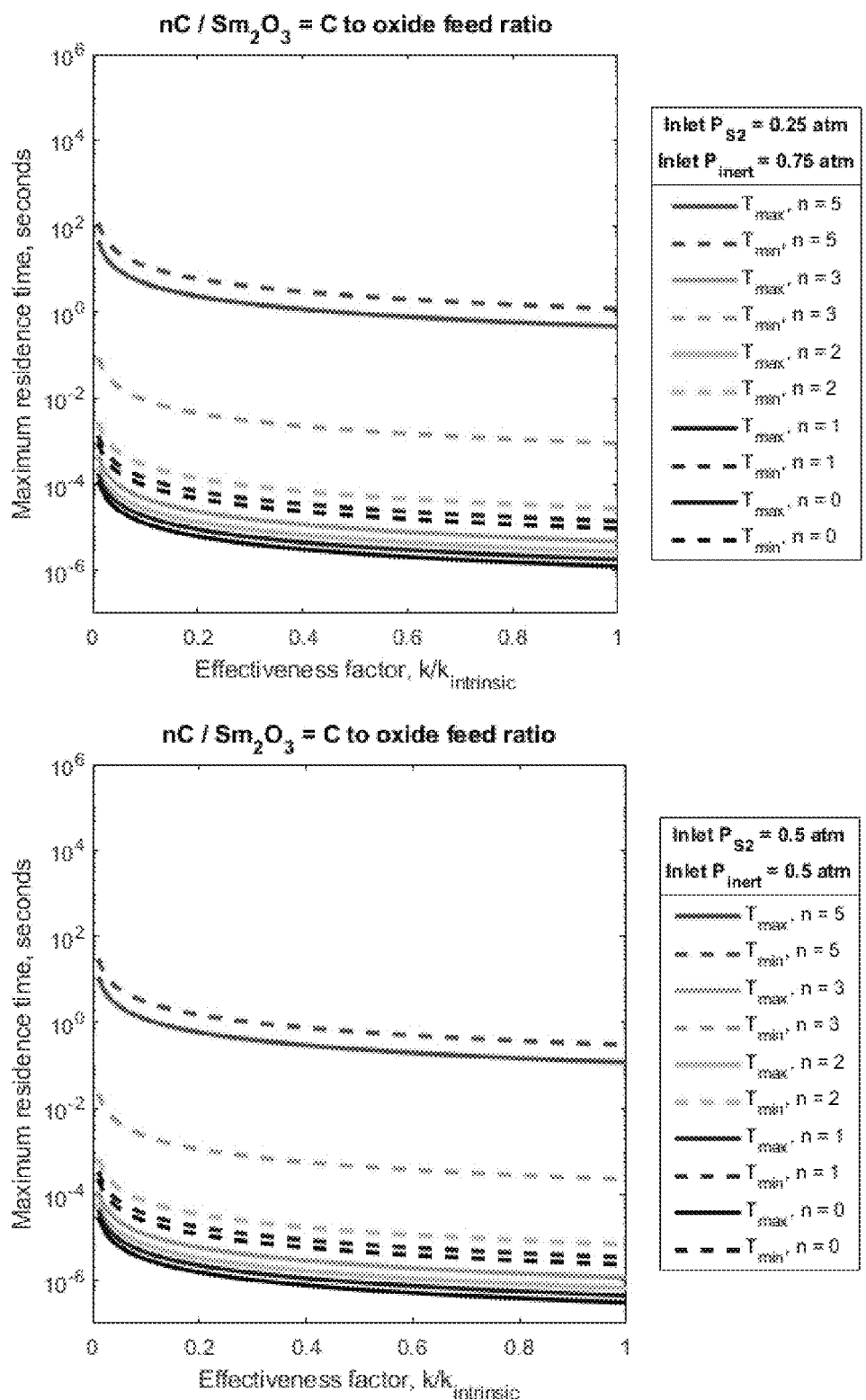
Figure 15C:
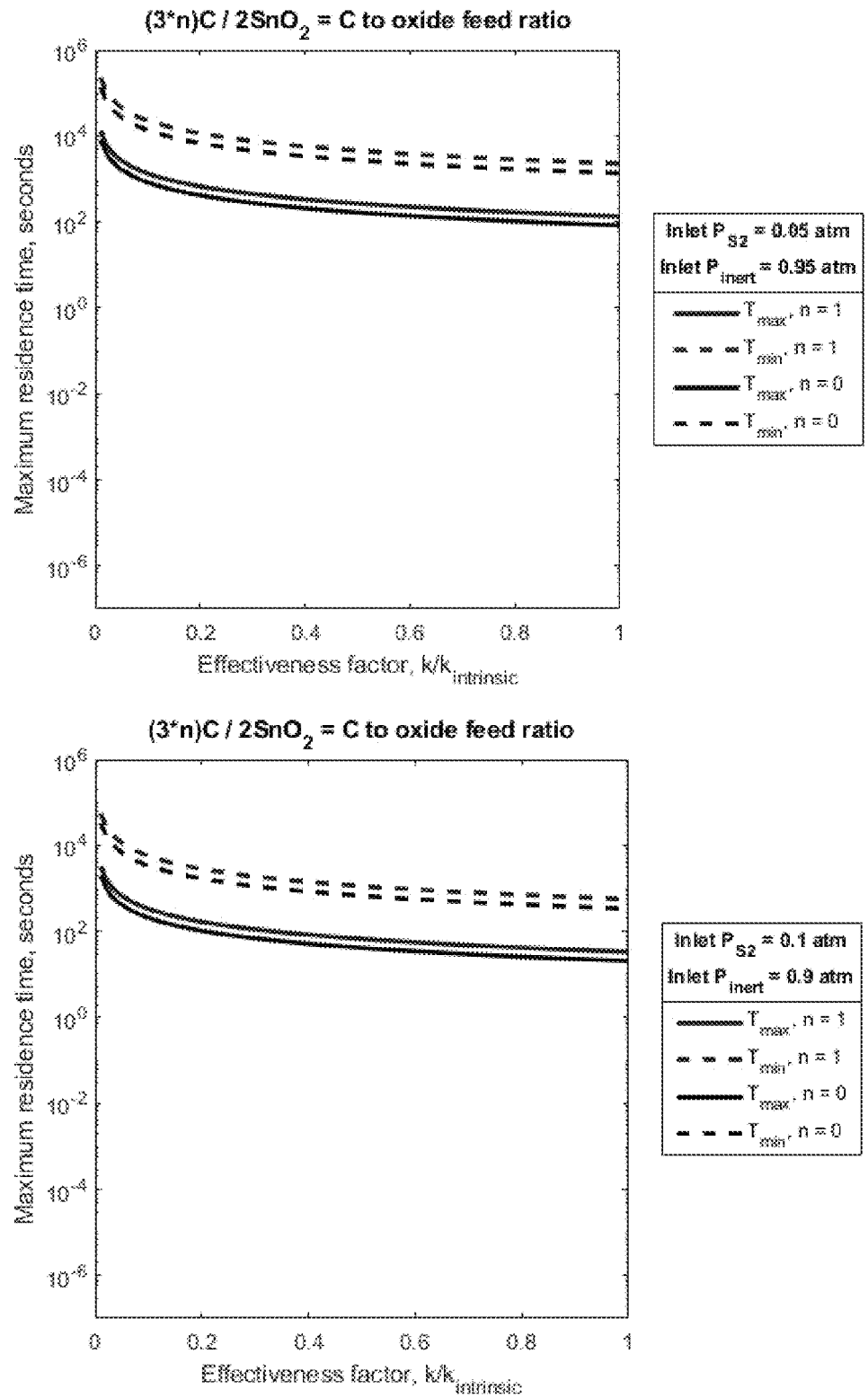
Figure 15D:
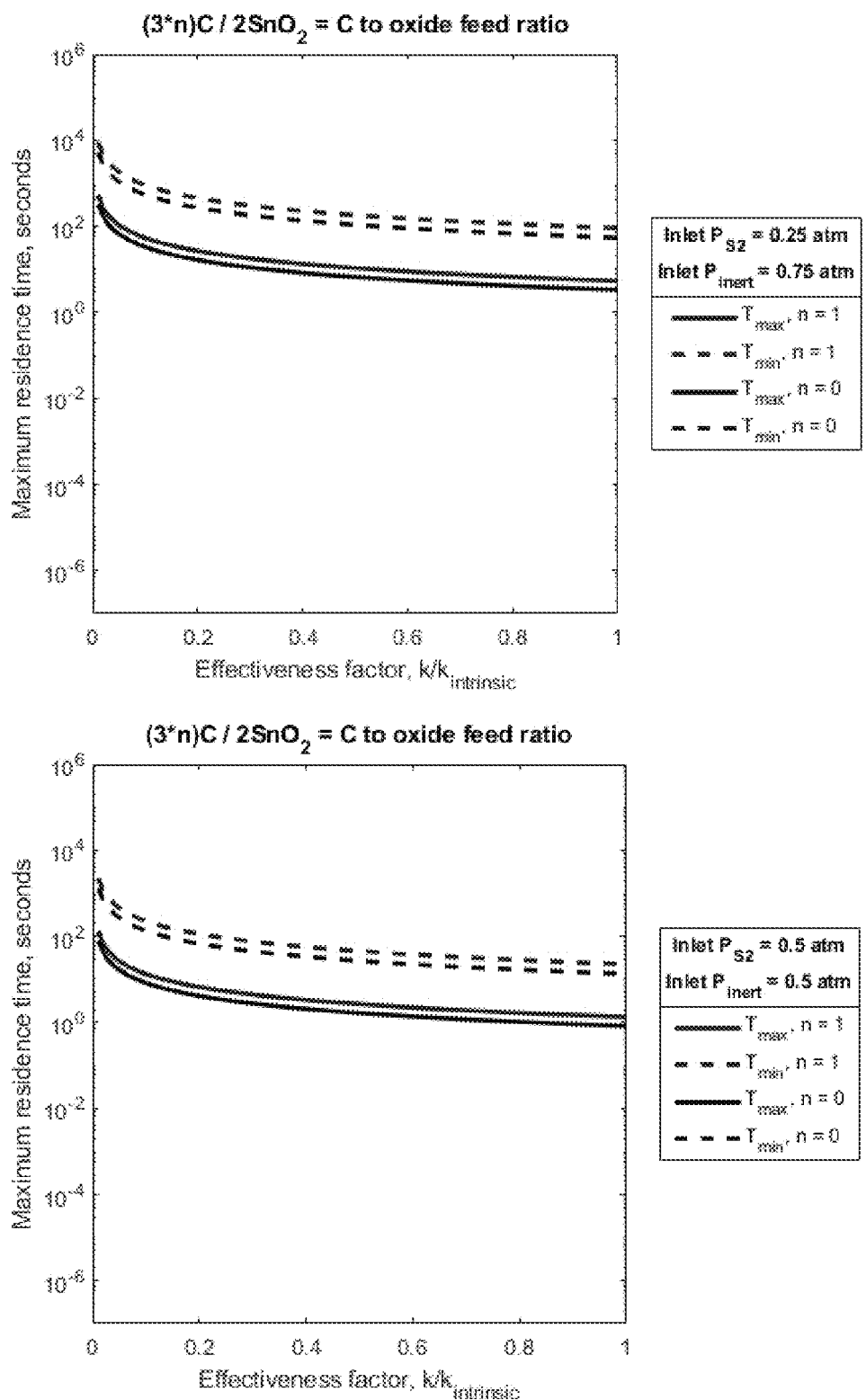
Figure 15E:
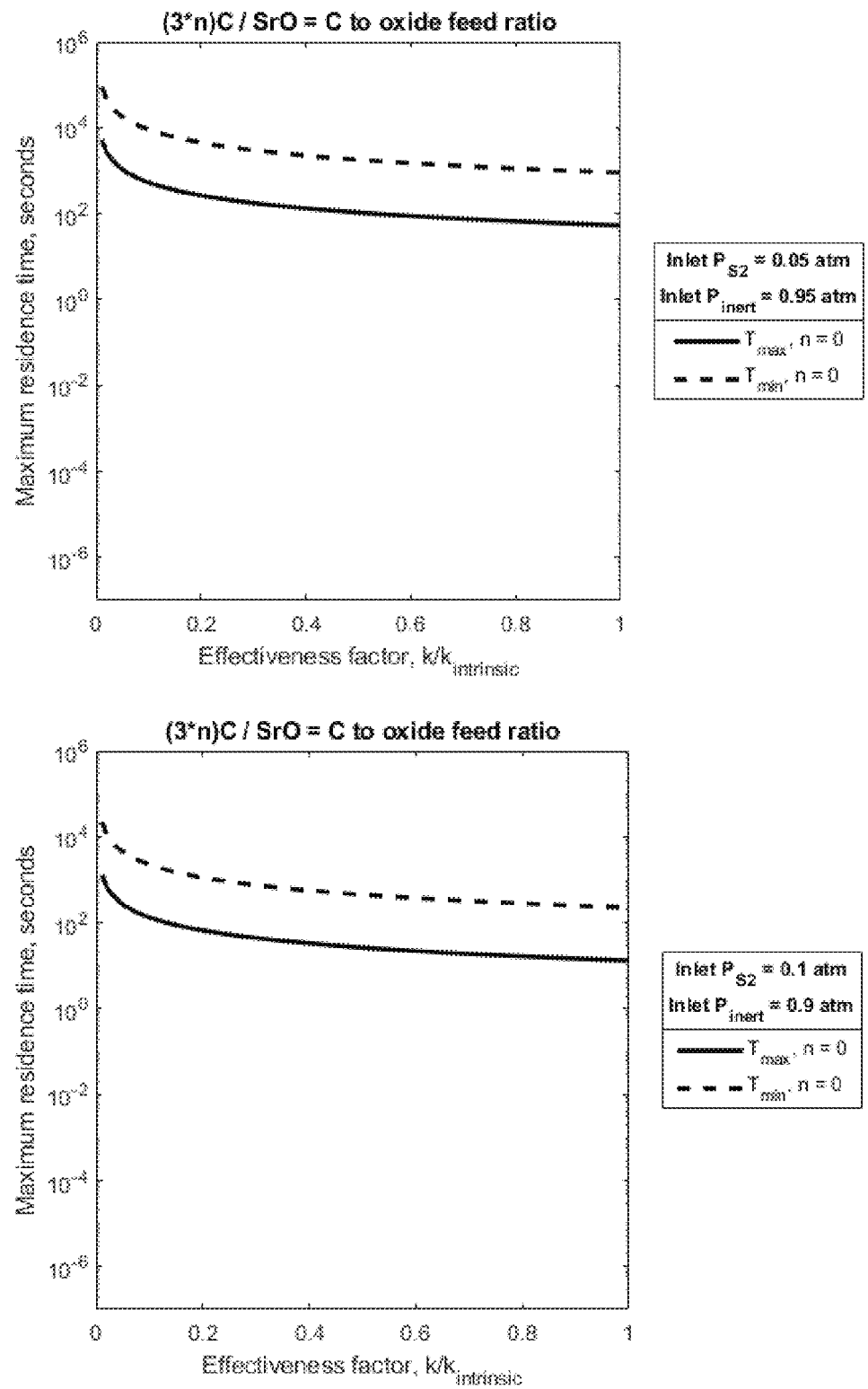
Figure 15F:
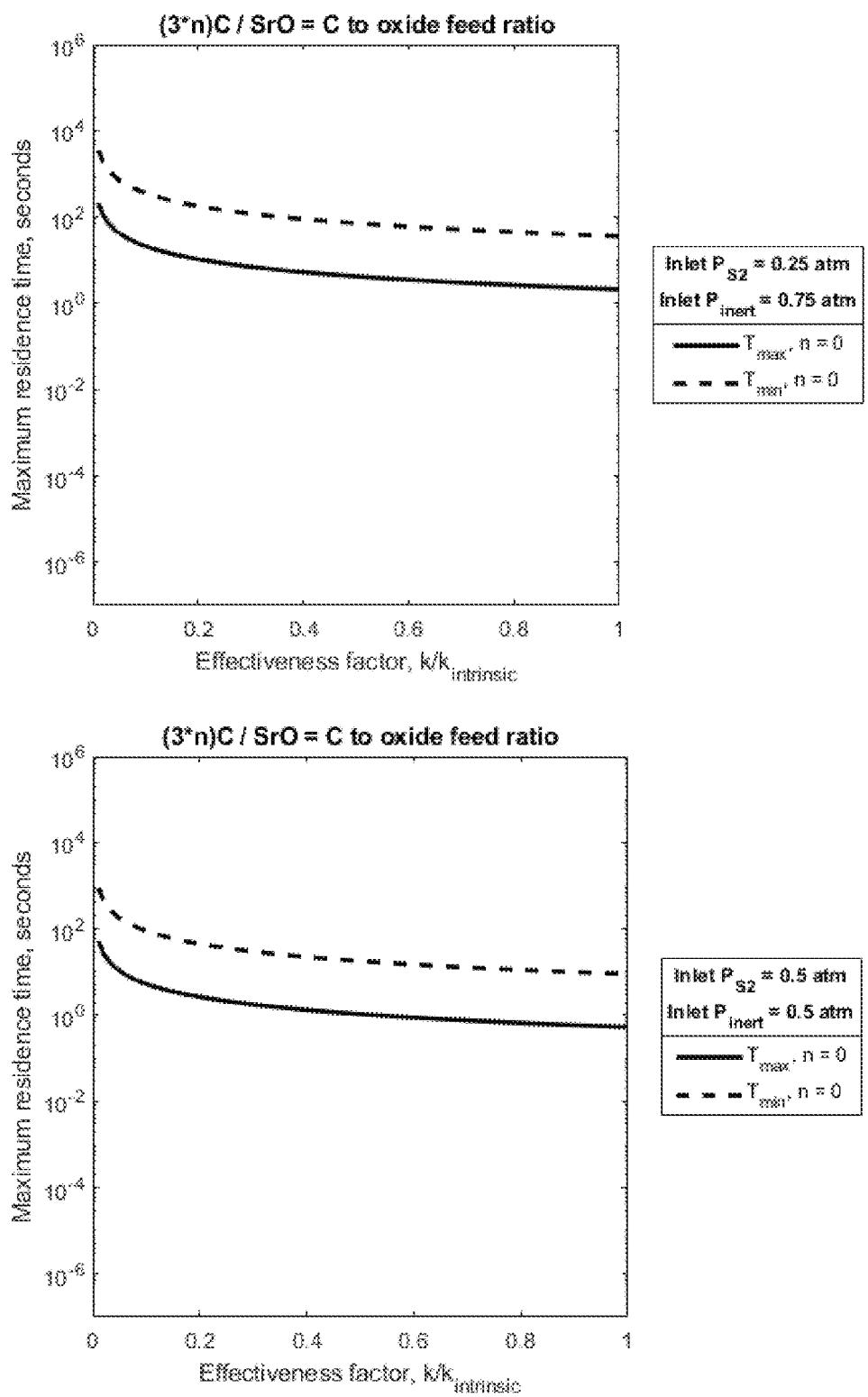
Figure 15G:
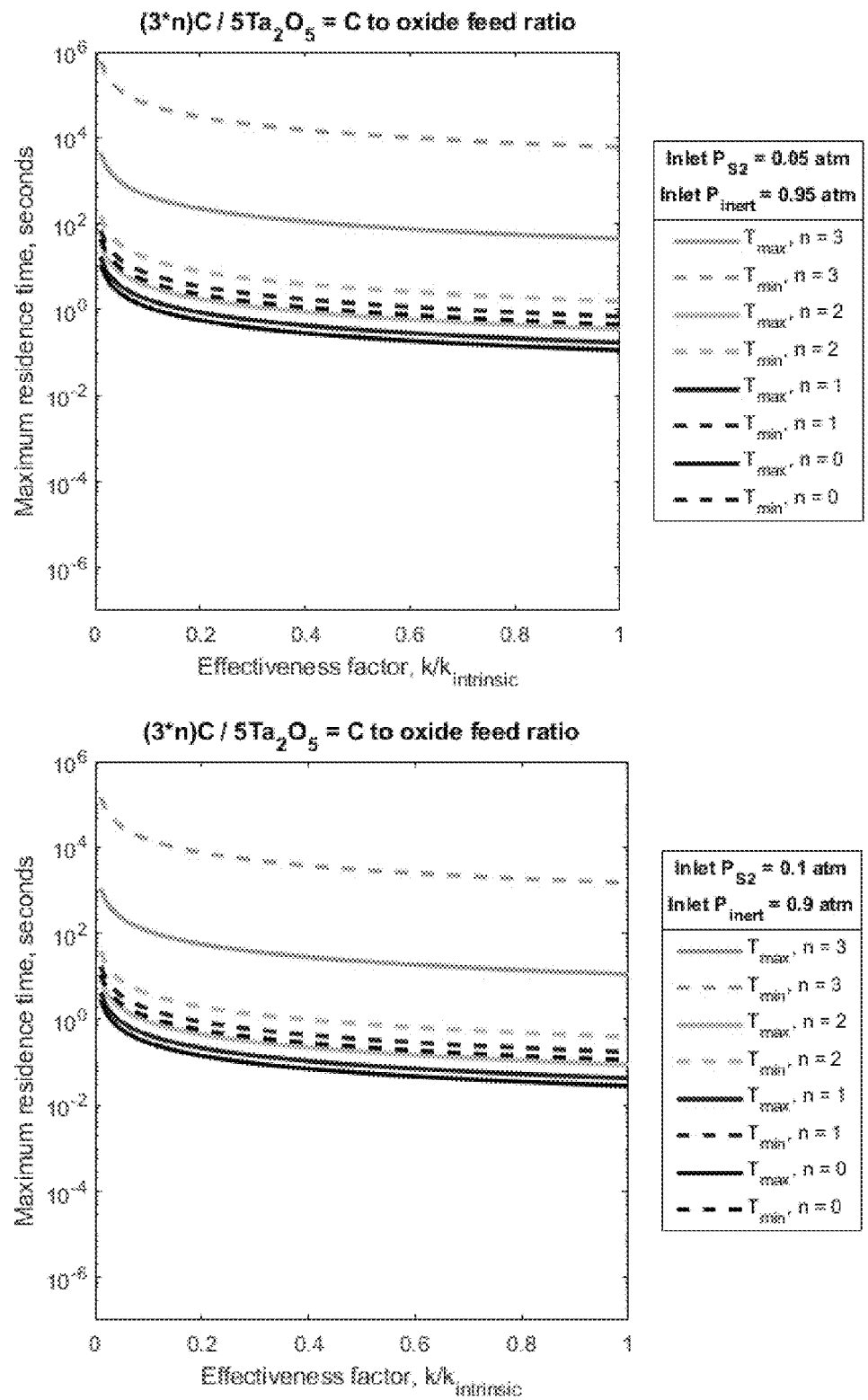
Figure 15H:
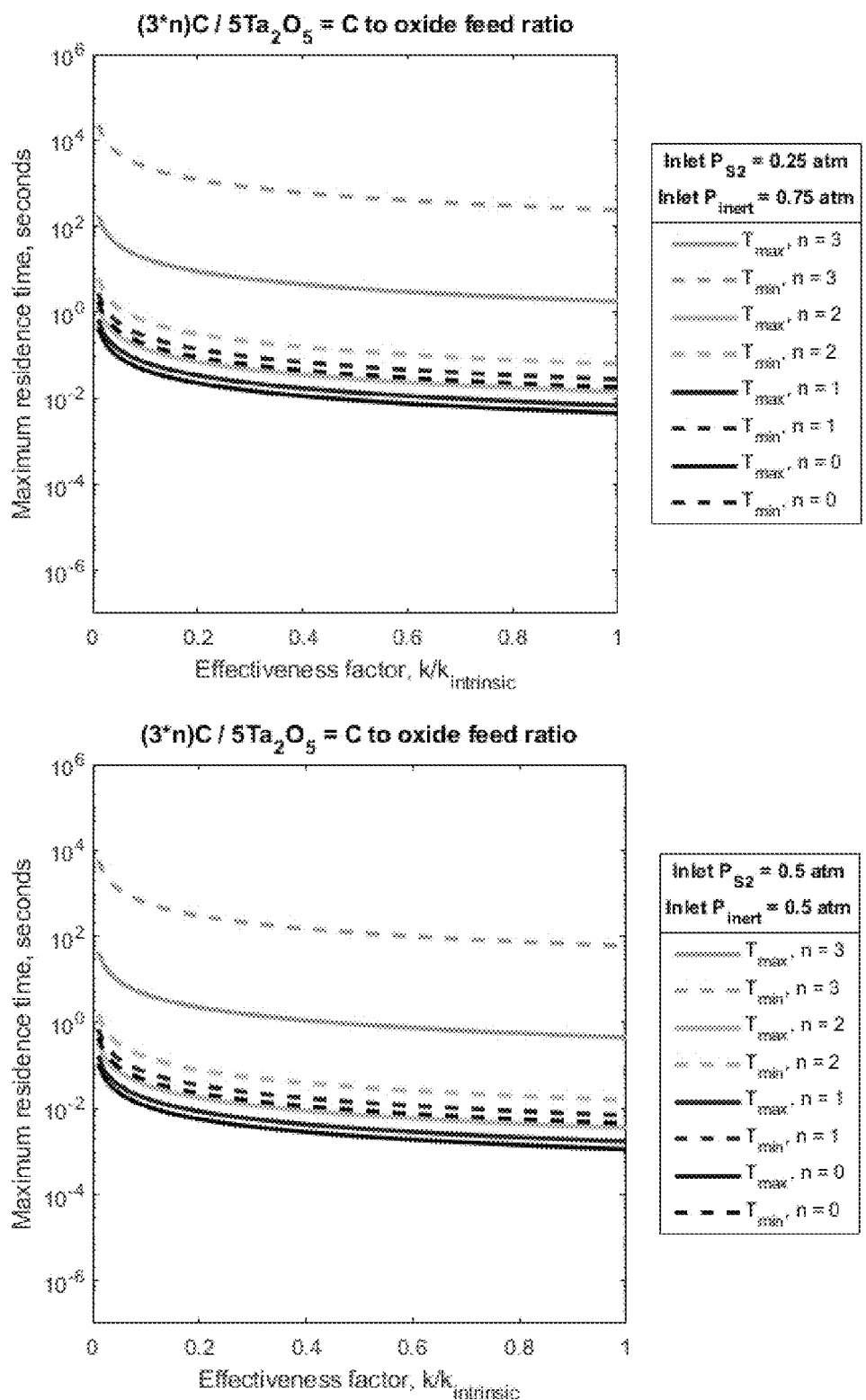
Figure 15I:
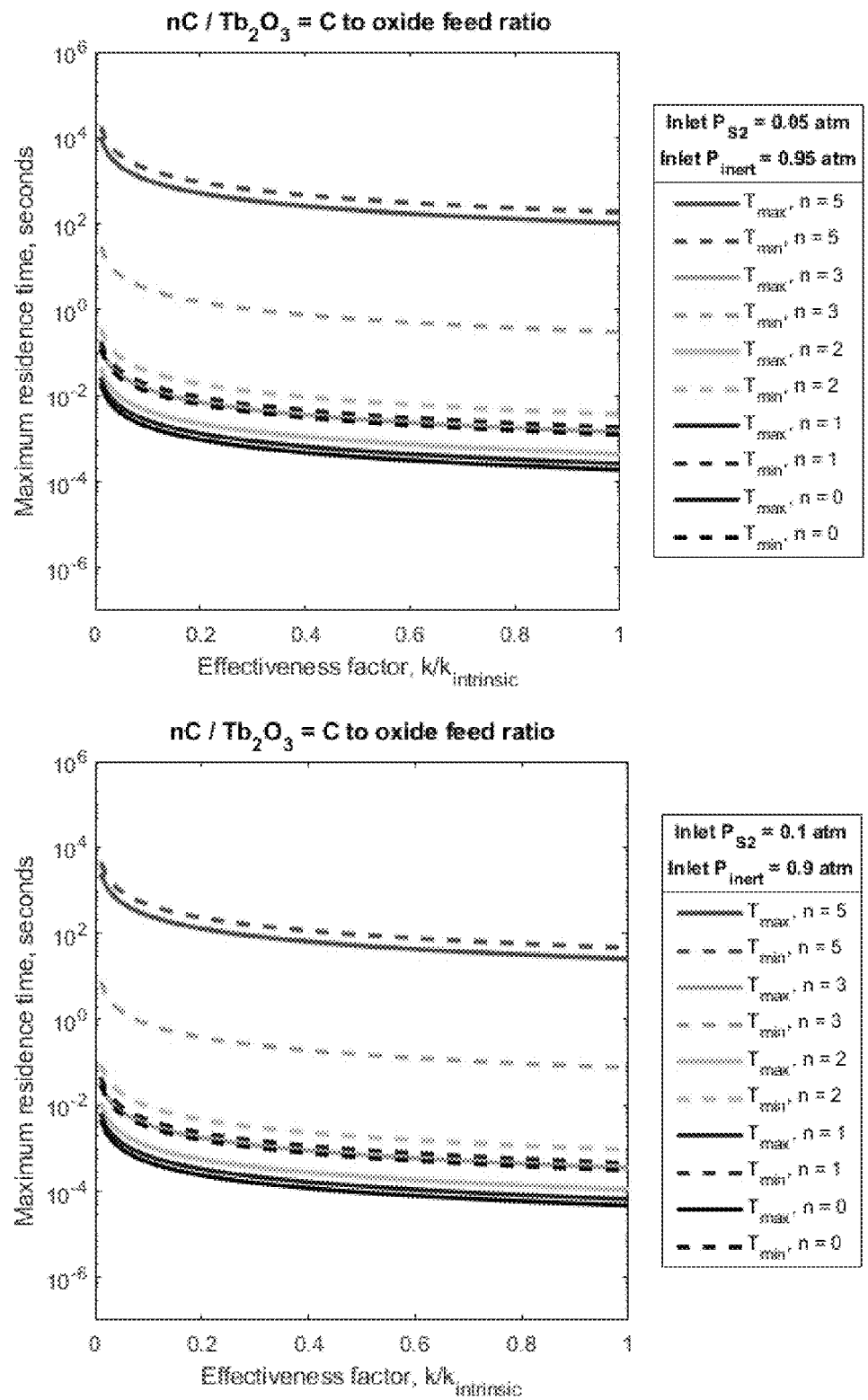
Figure 15J:
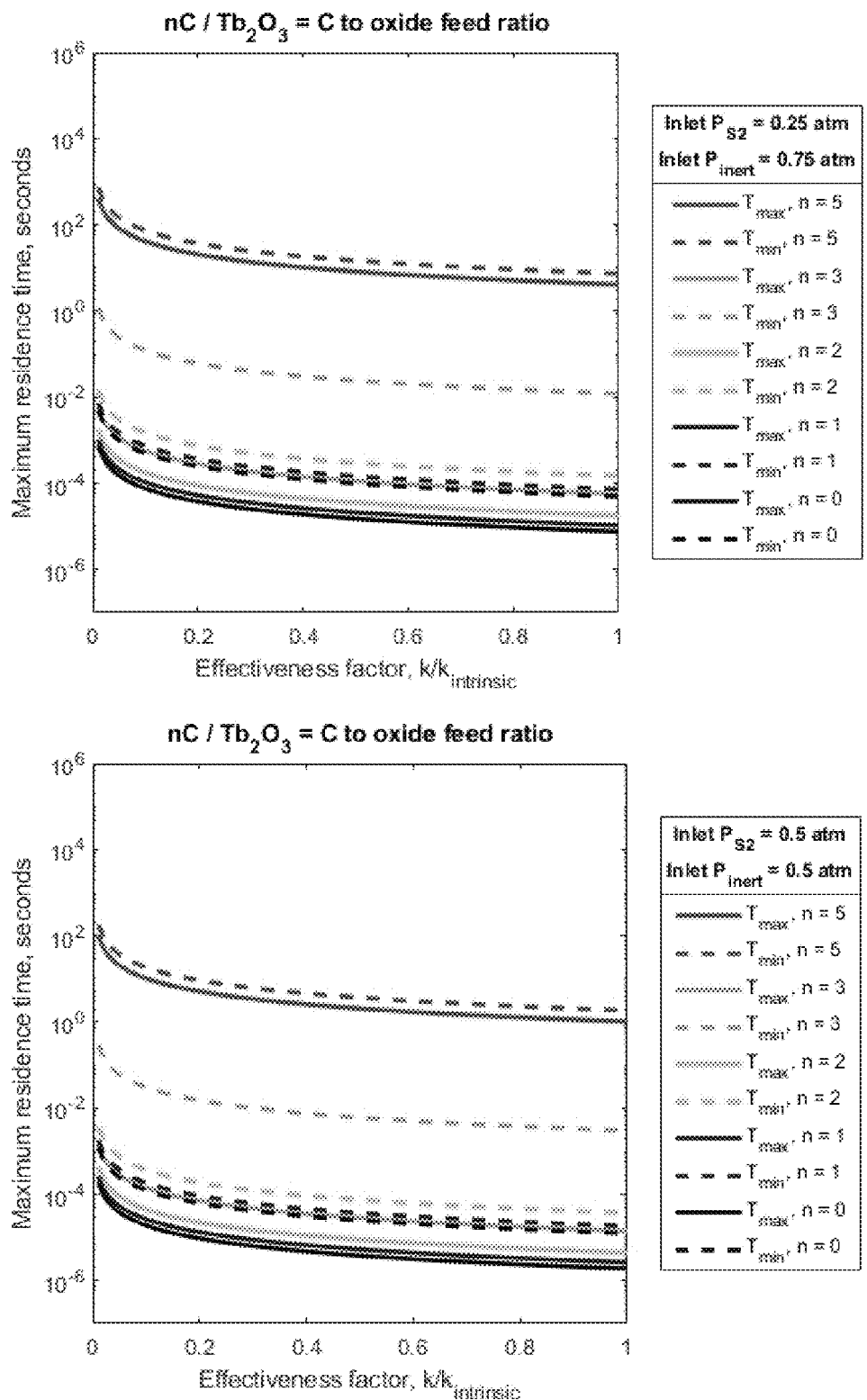
Figure 15K:
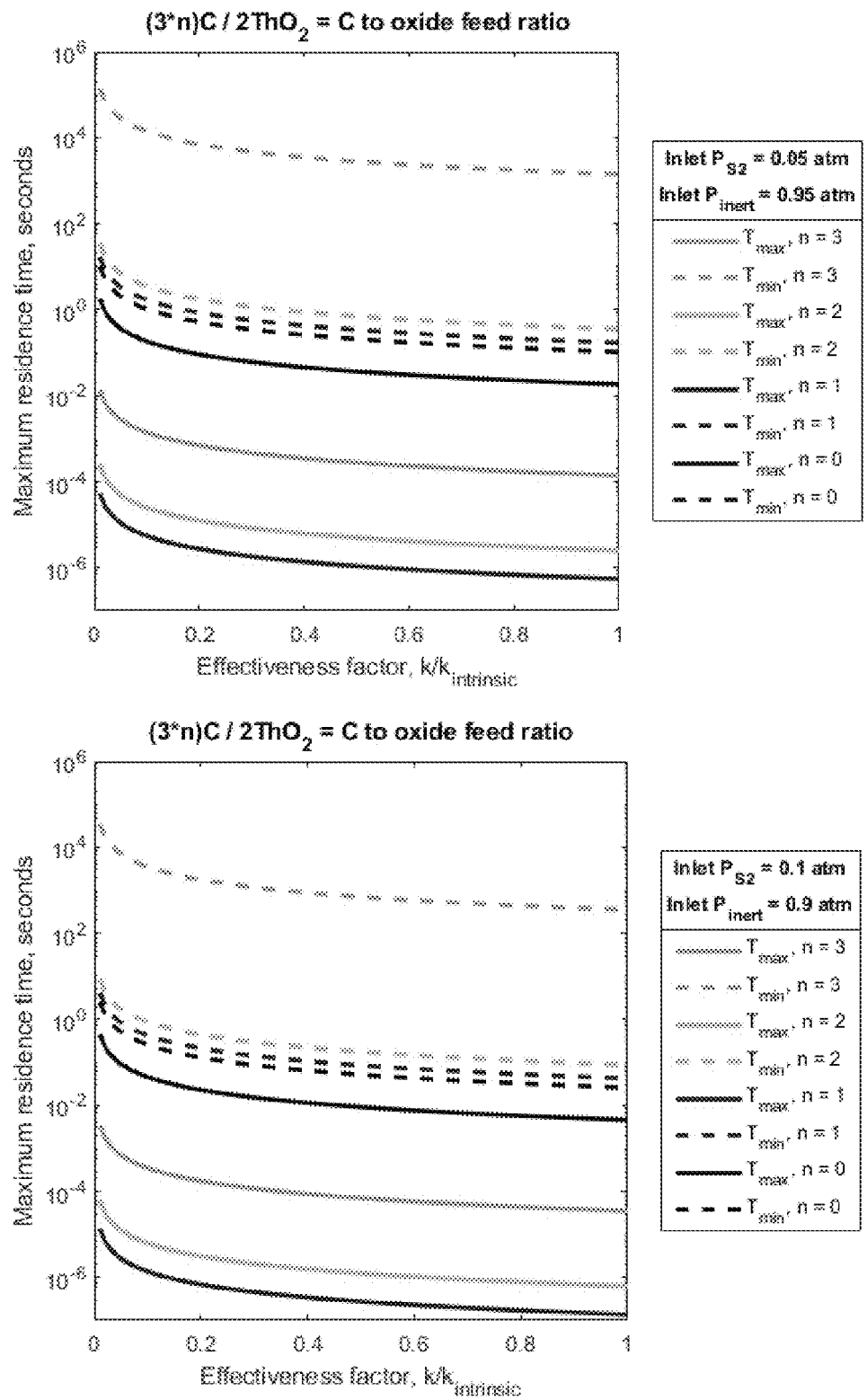
Figure 15L:
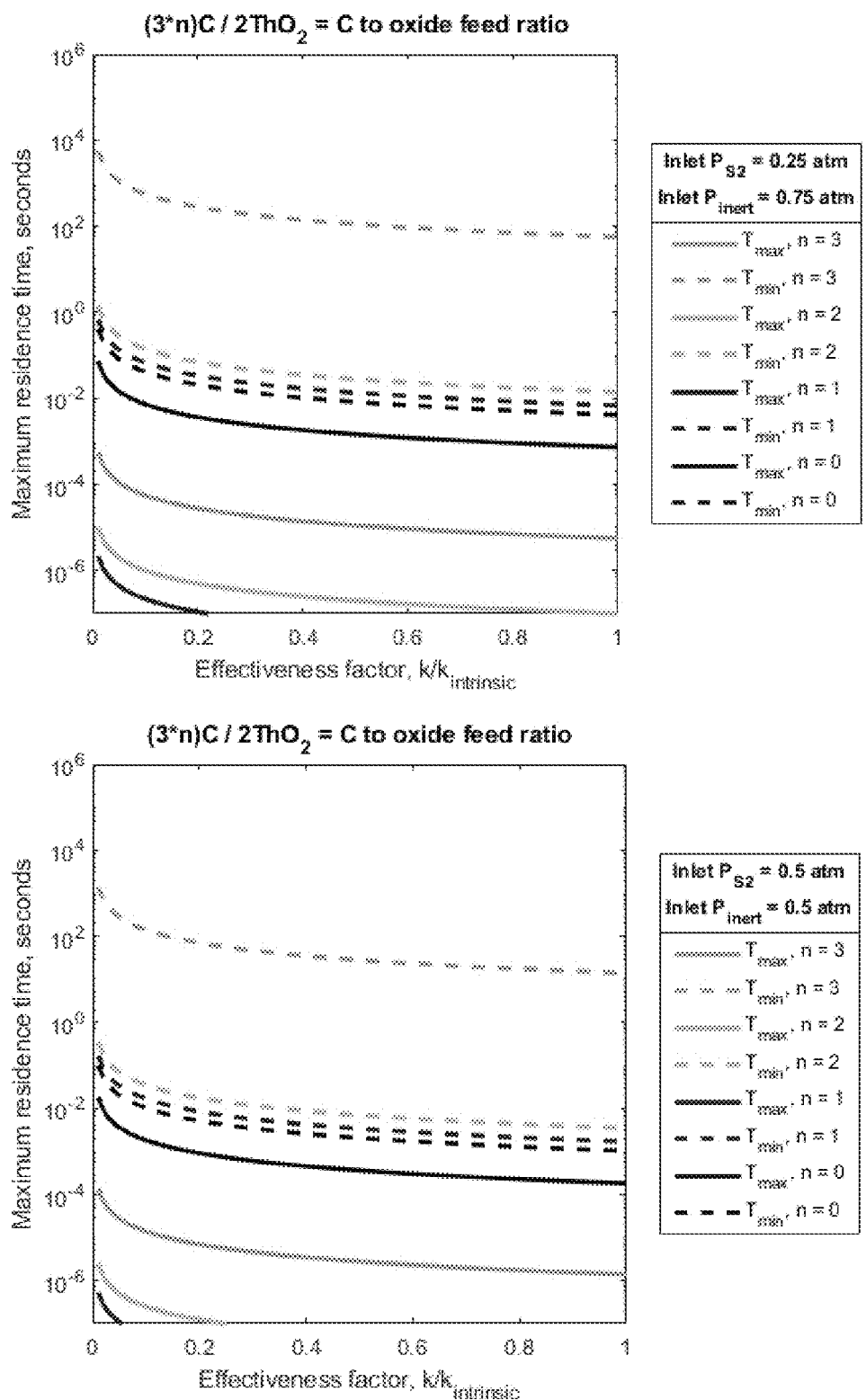
Figure 15M:
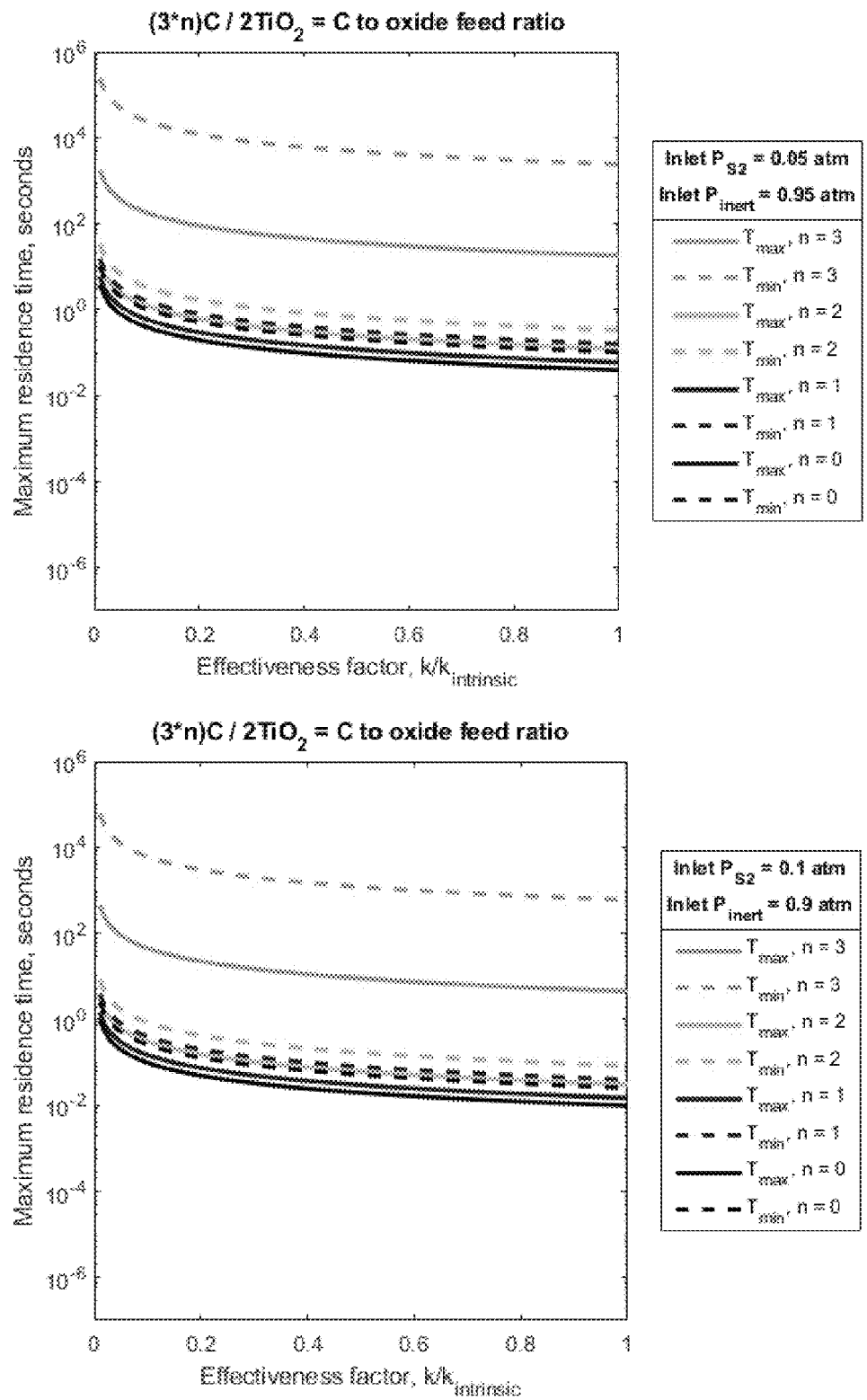
Figure 15N:
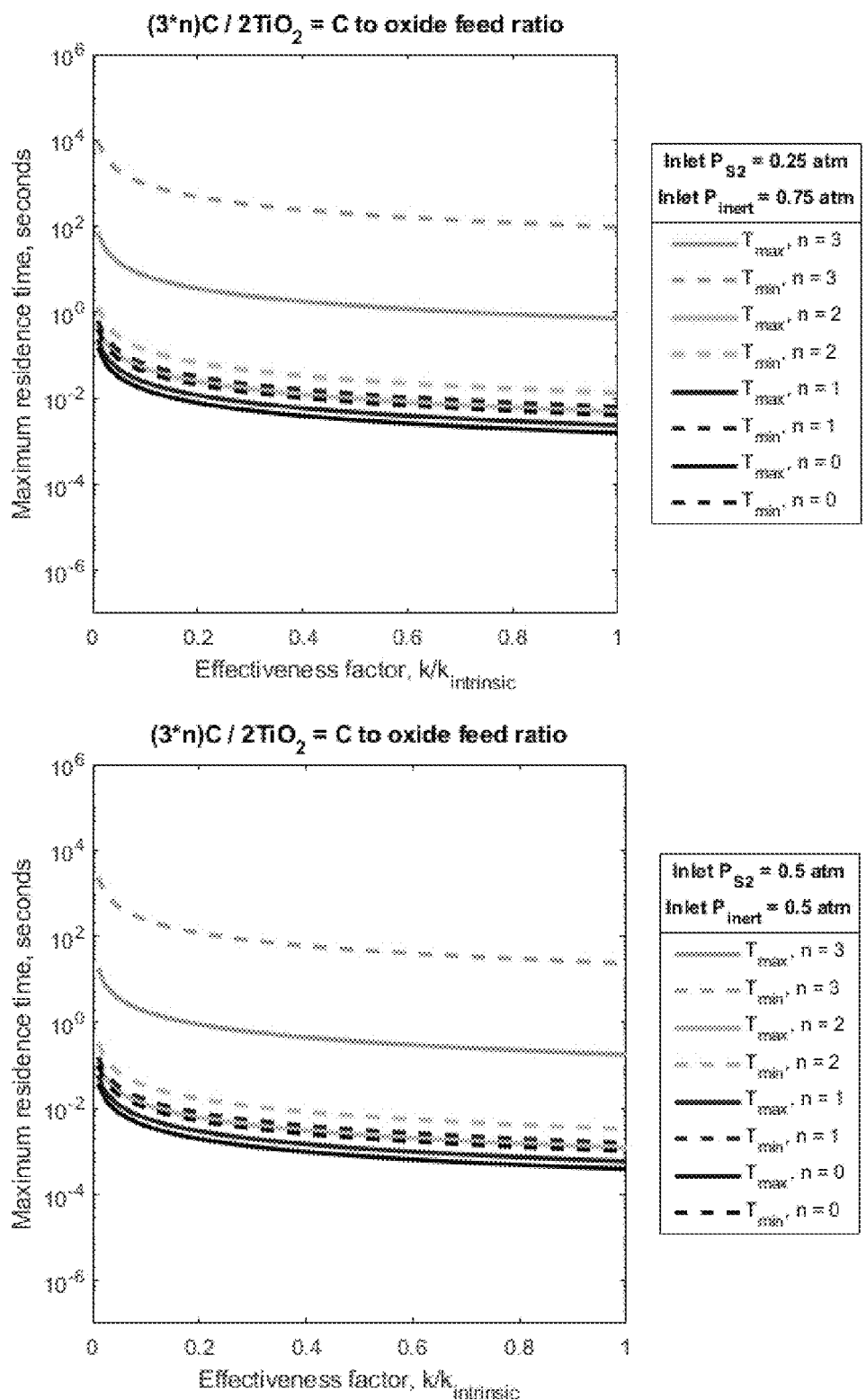
Figure 15O:
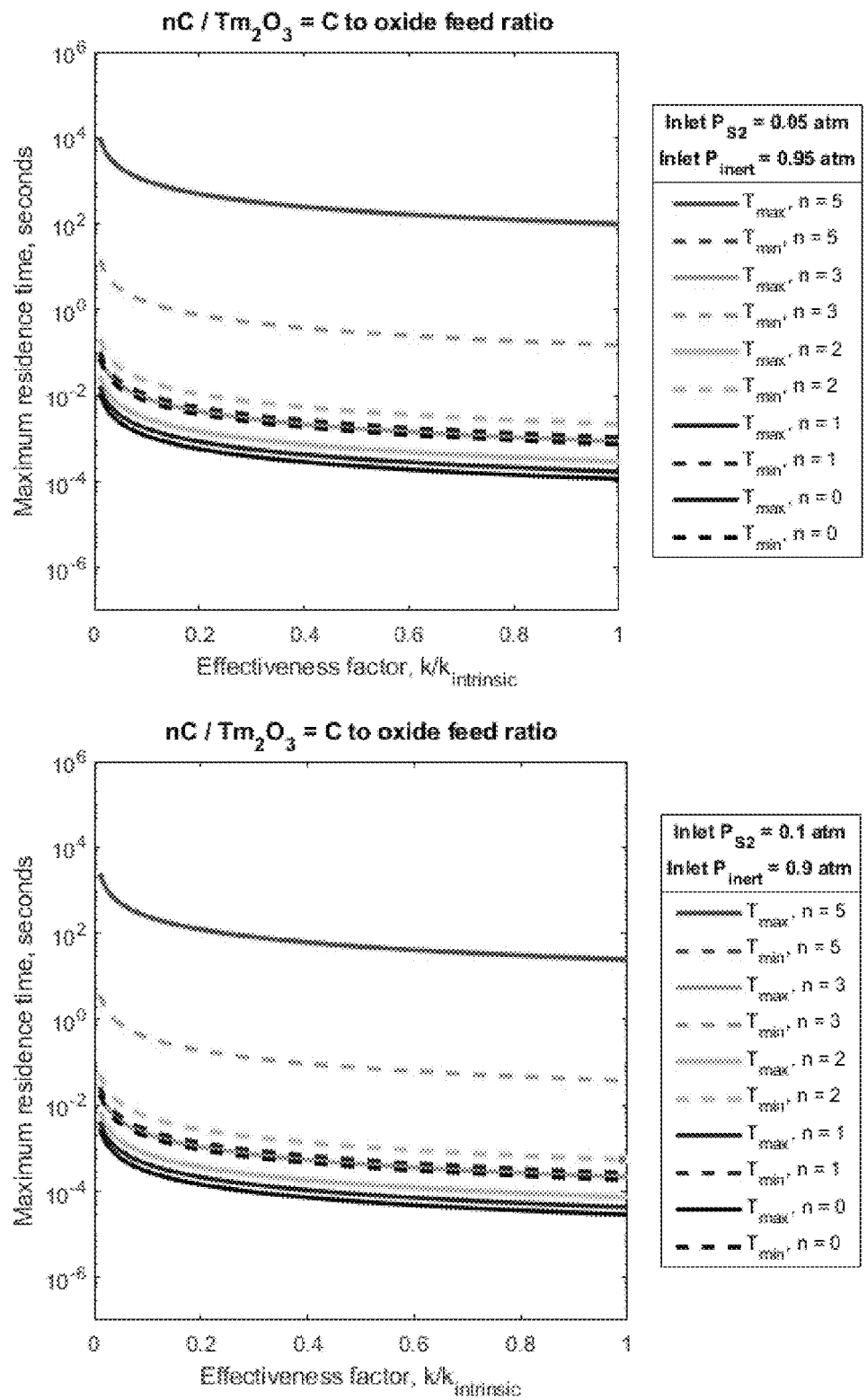
Figure 15P:
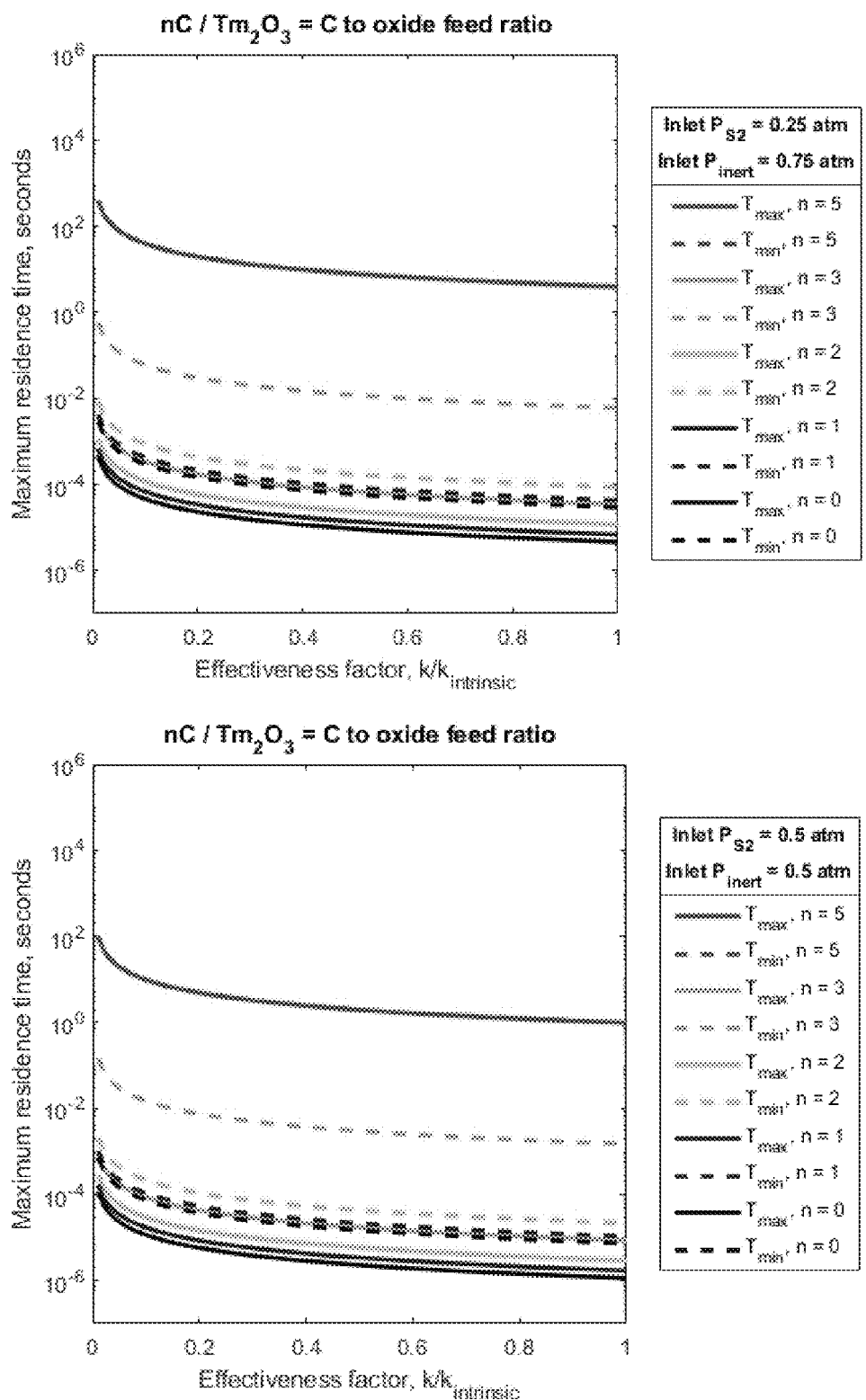
Figure 15Q:
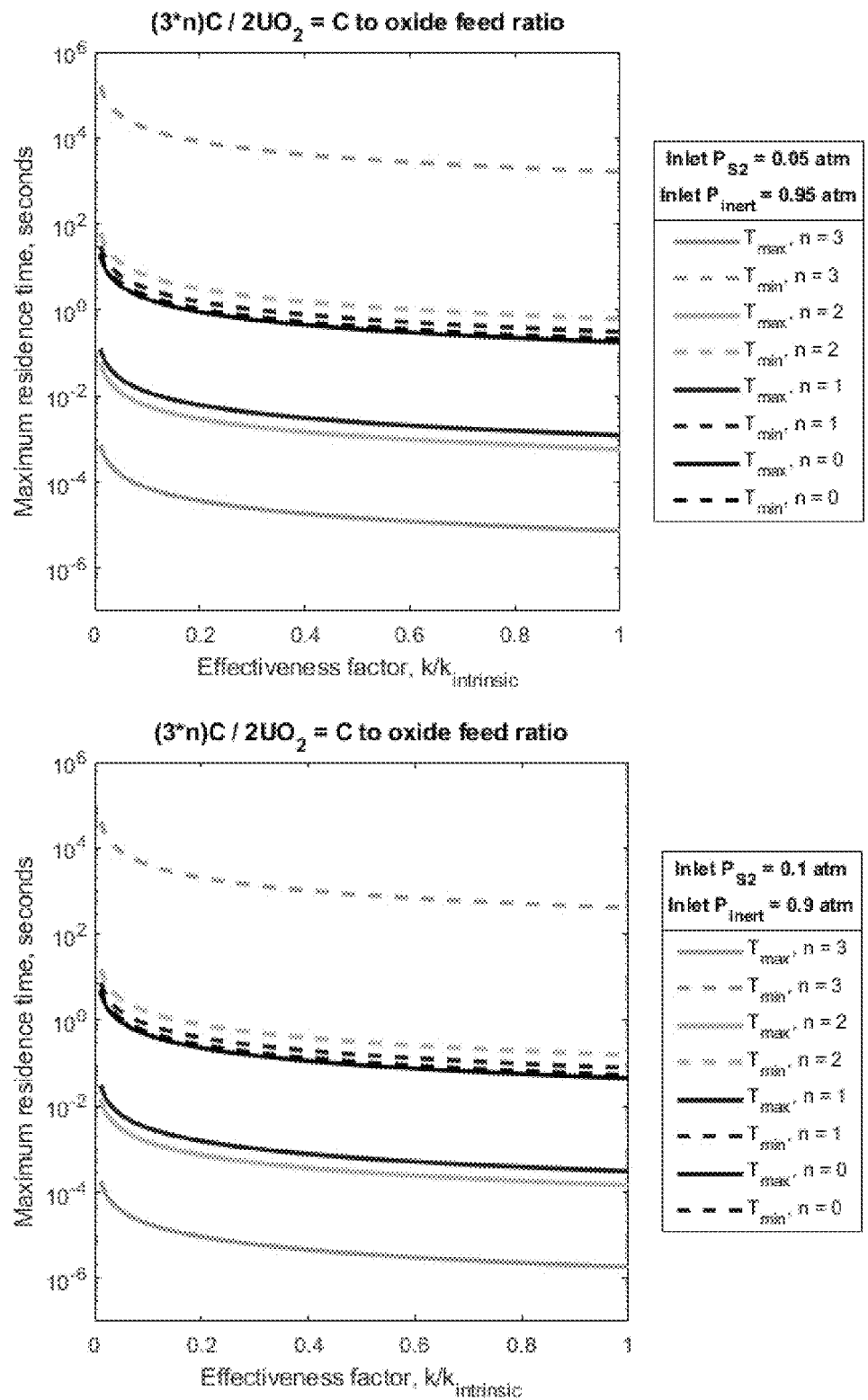
Figure 15R:
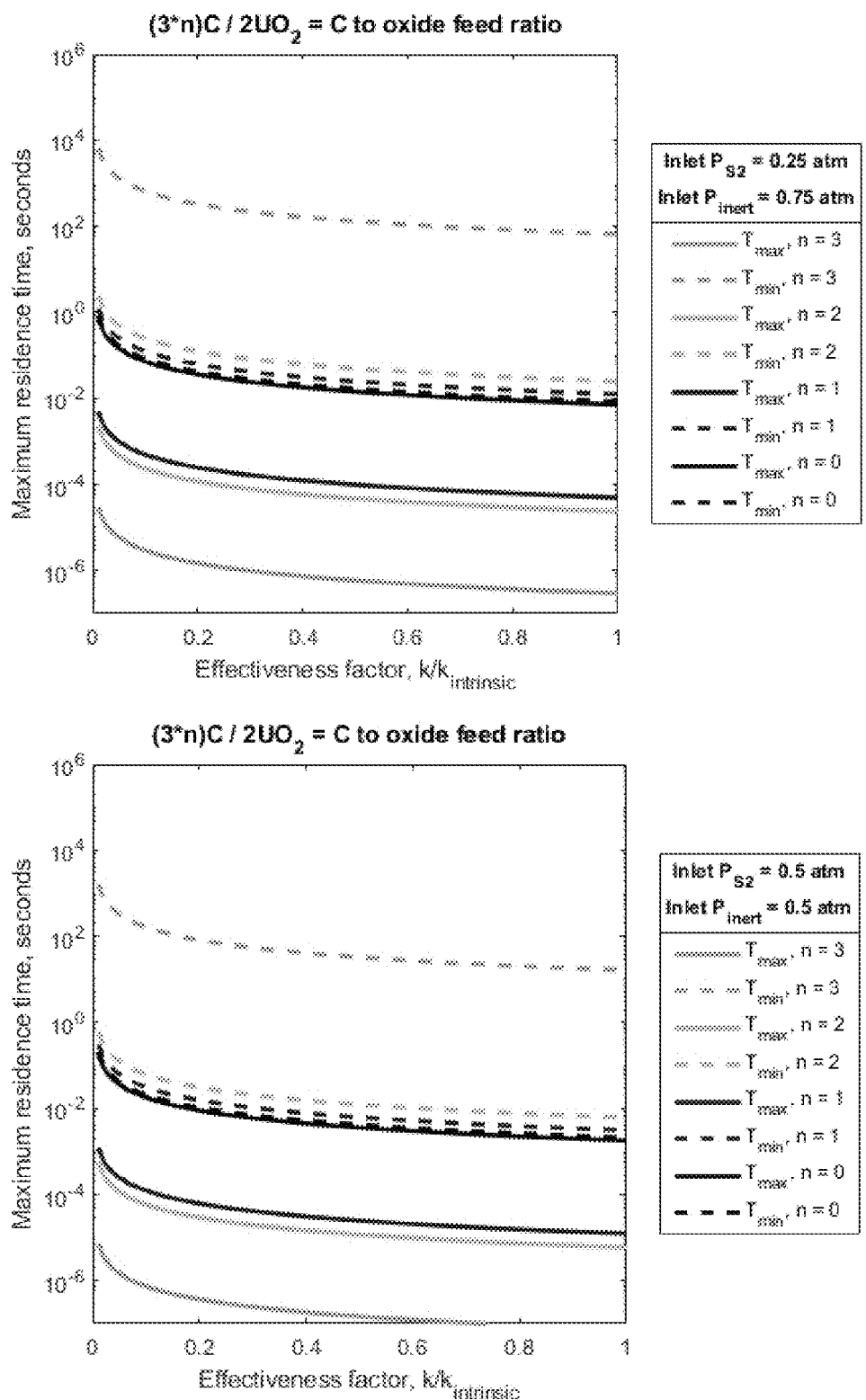
Figure 15S:
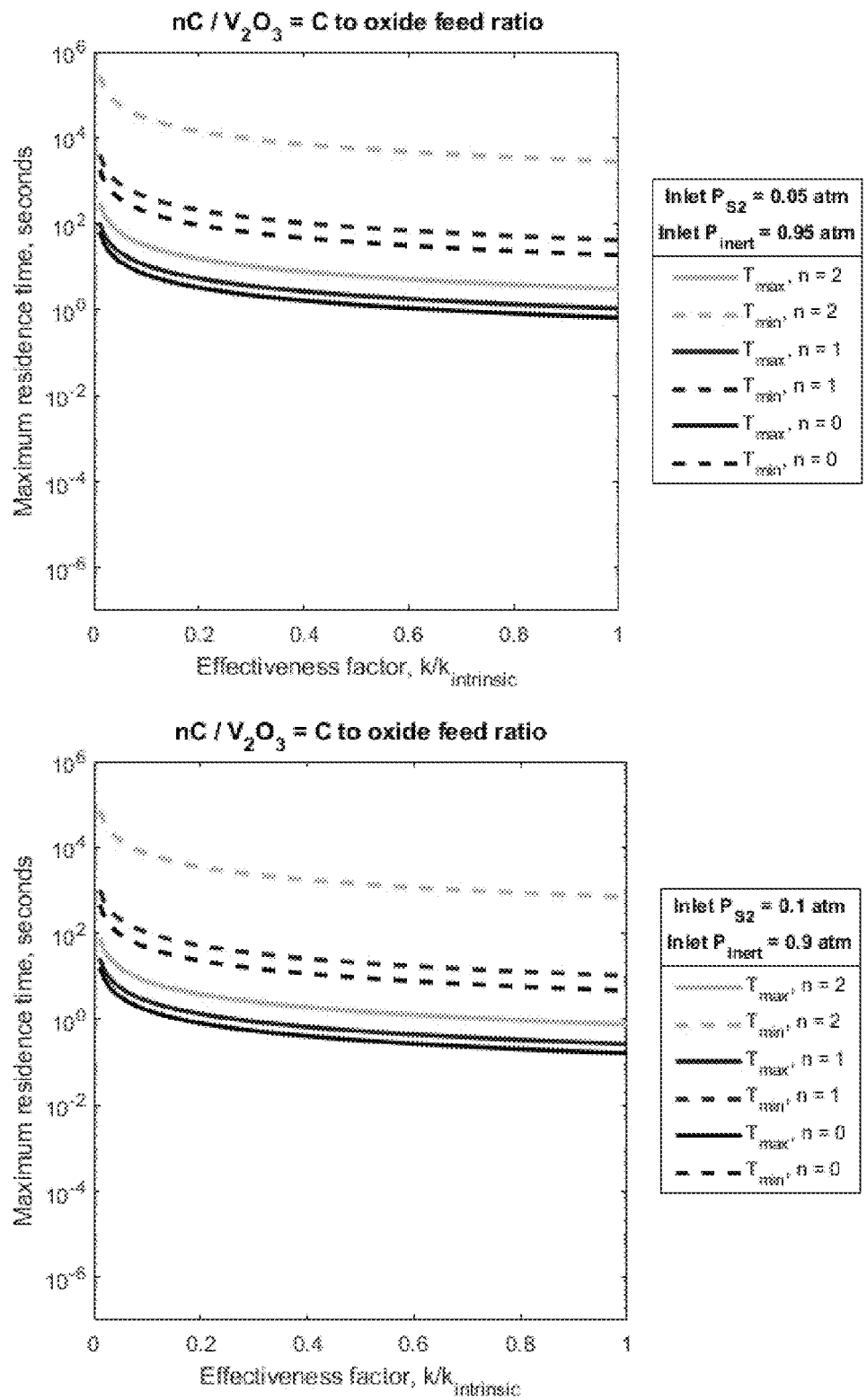
Figure 15T:
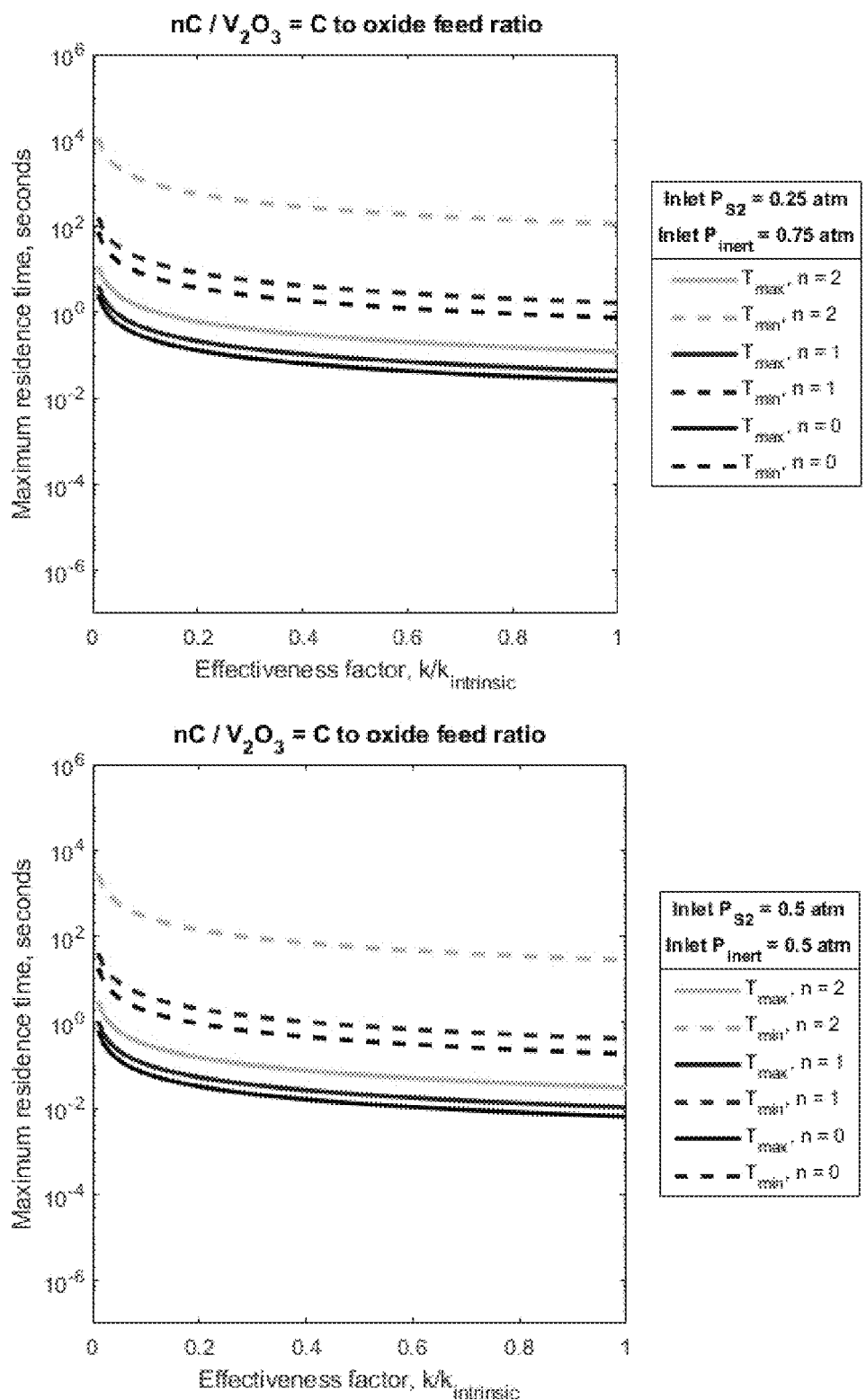
Figure 15U:
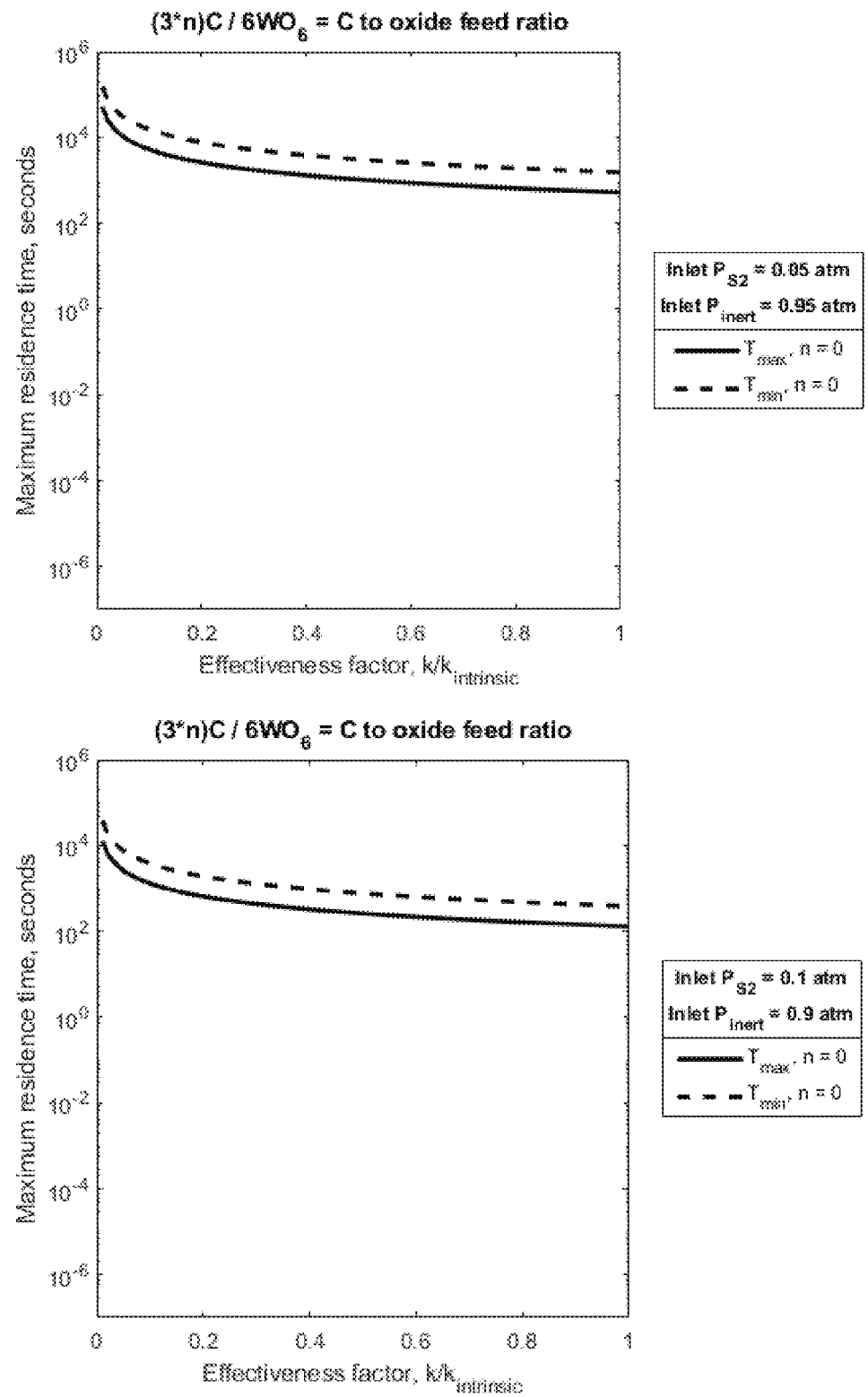
Figure 15V:
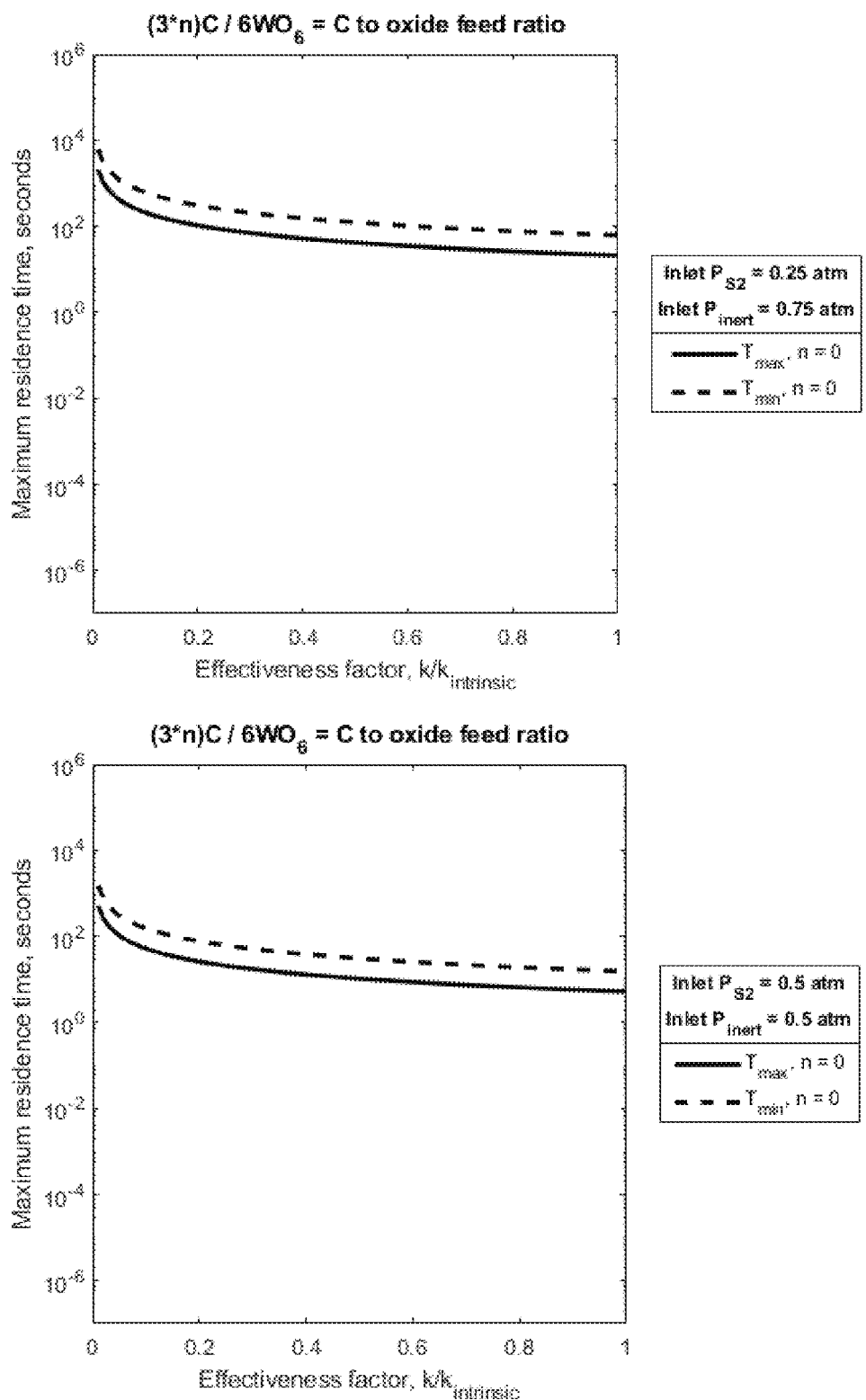
Figure 15W:
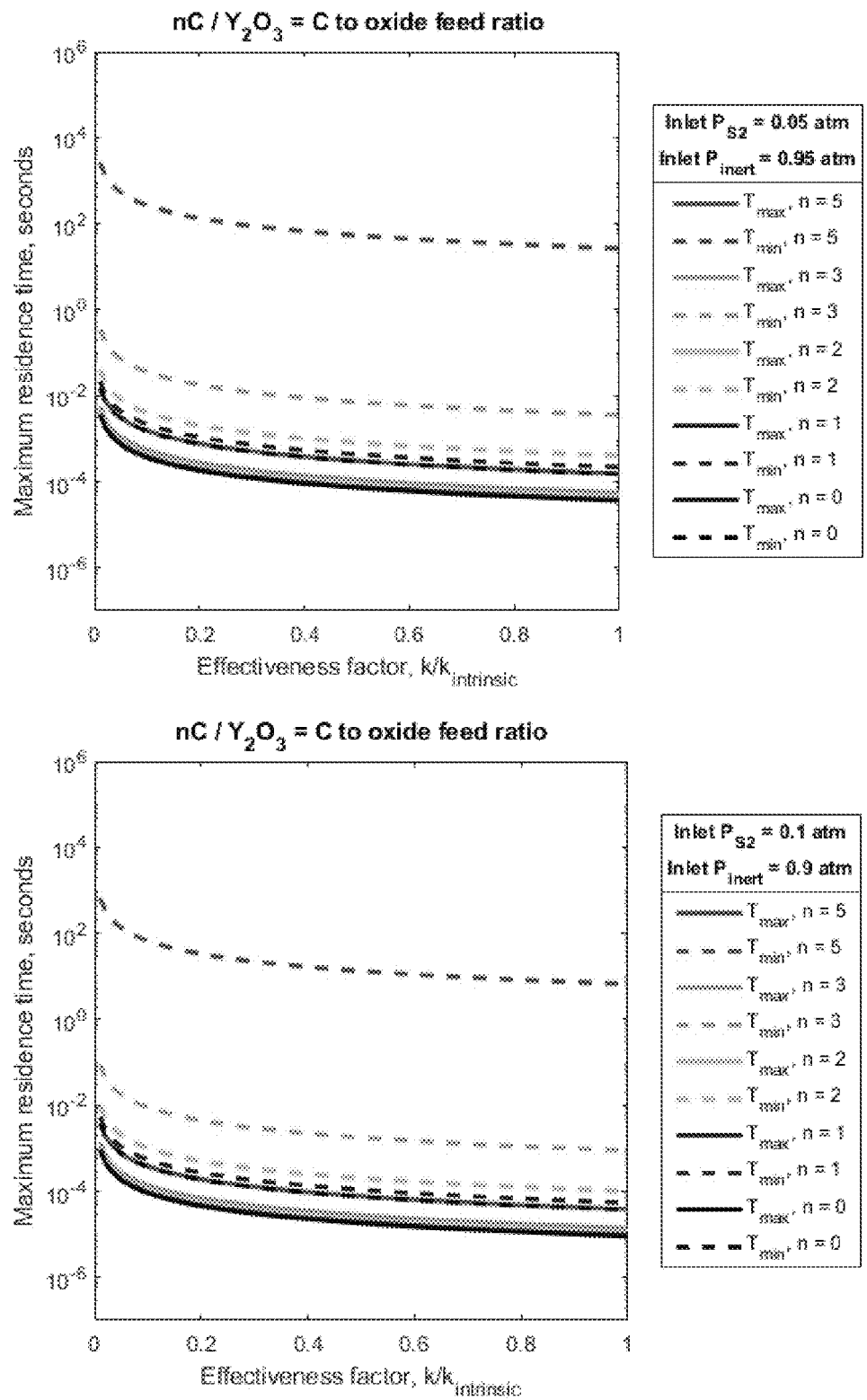
Figure 15X:
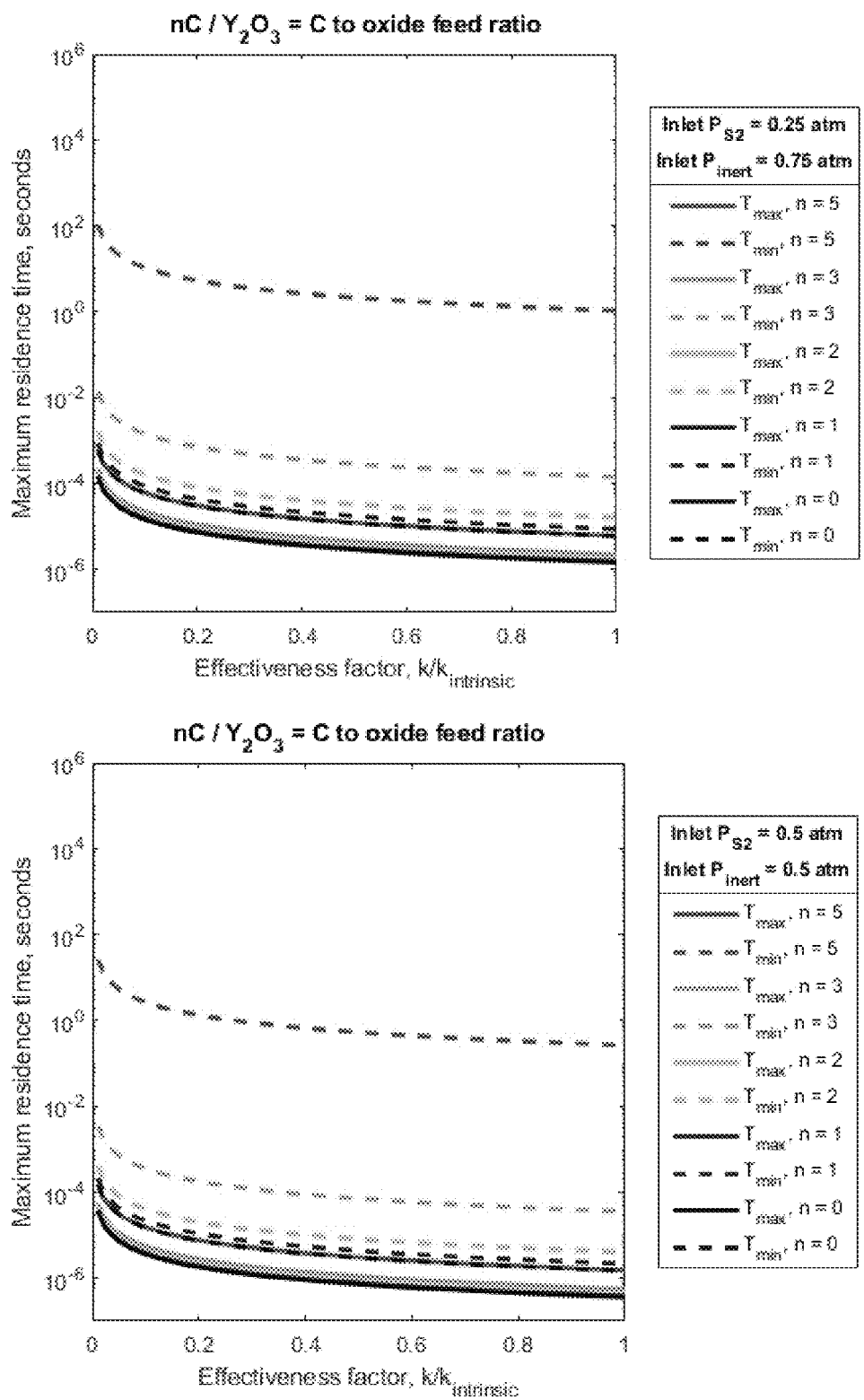
Figure 15Y:
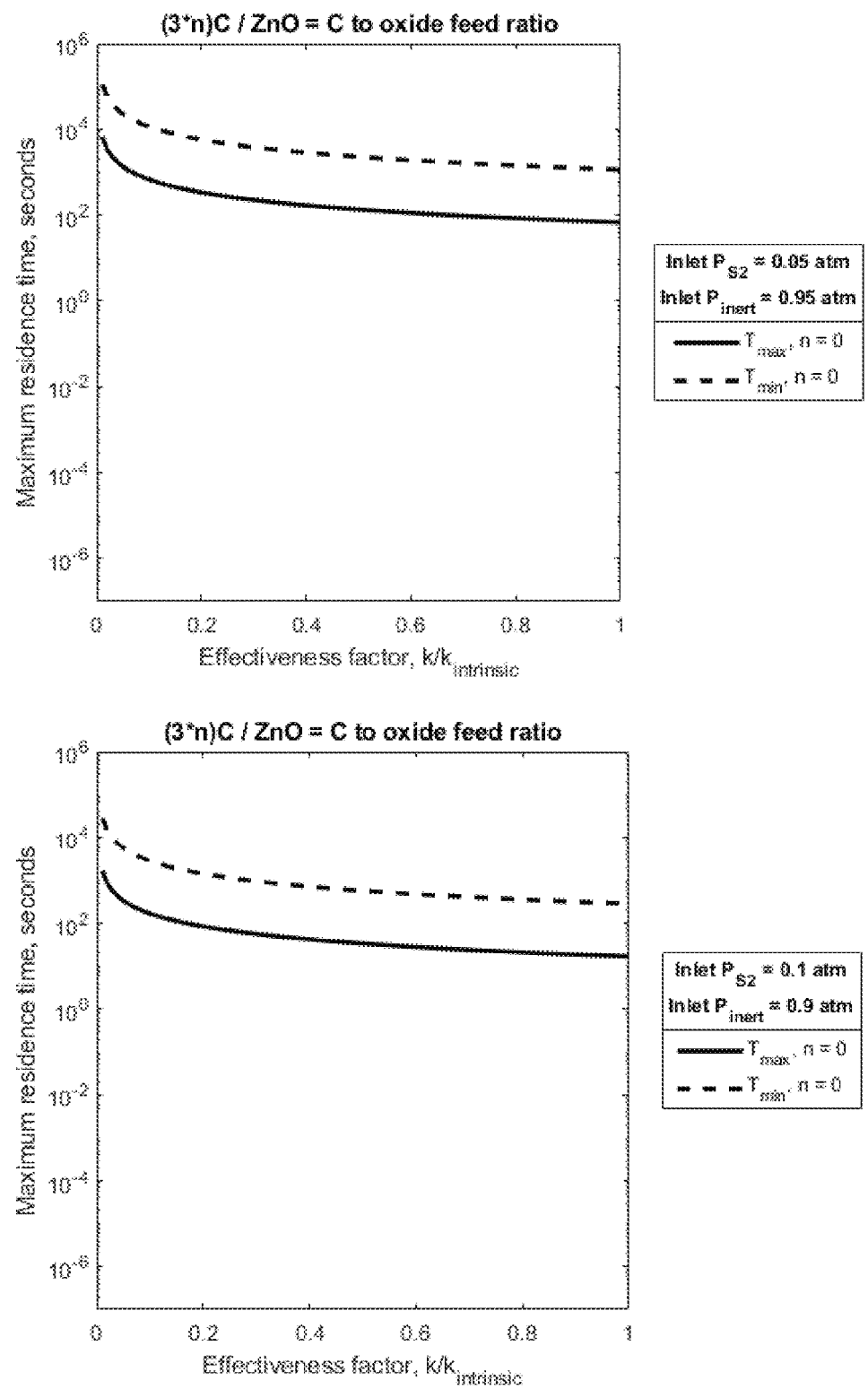
Figure 15Z:
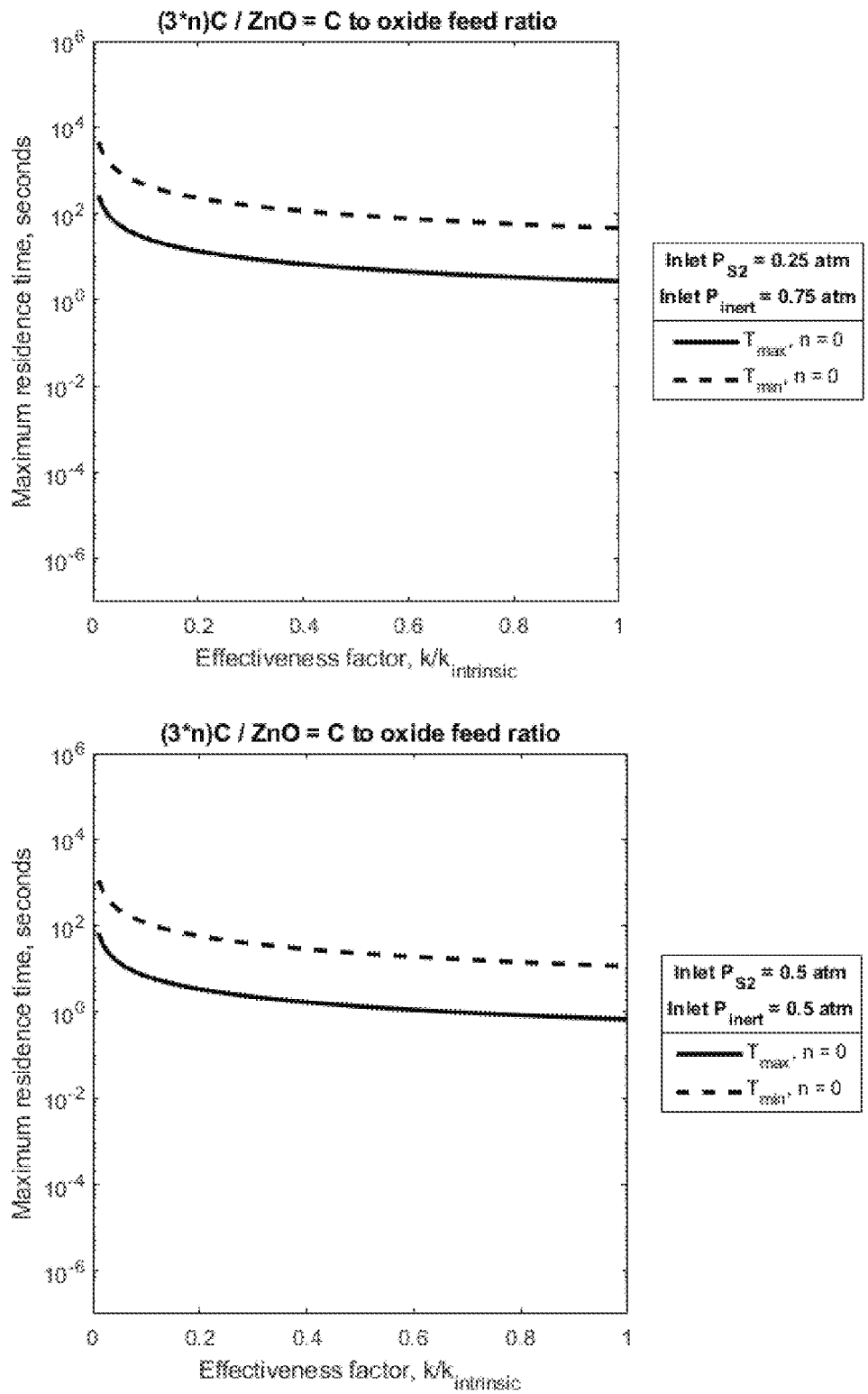
Figure 16A:
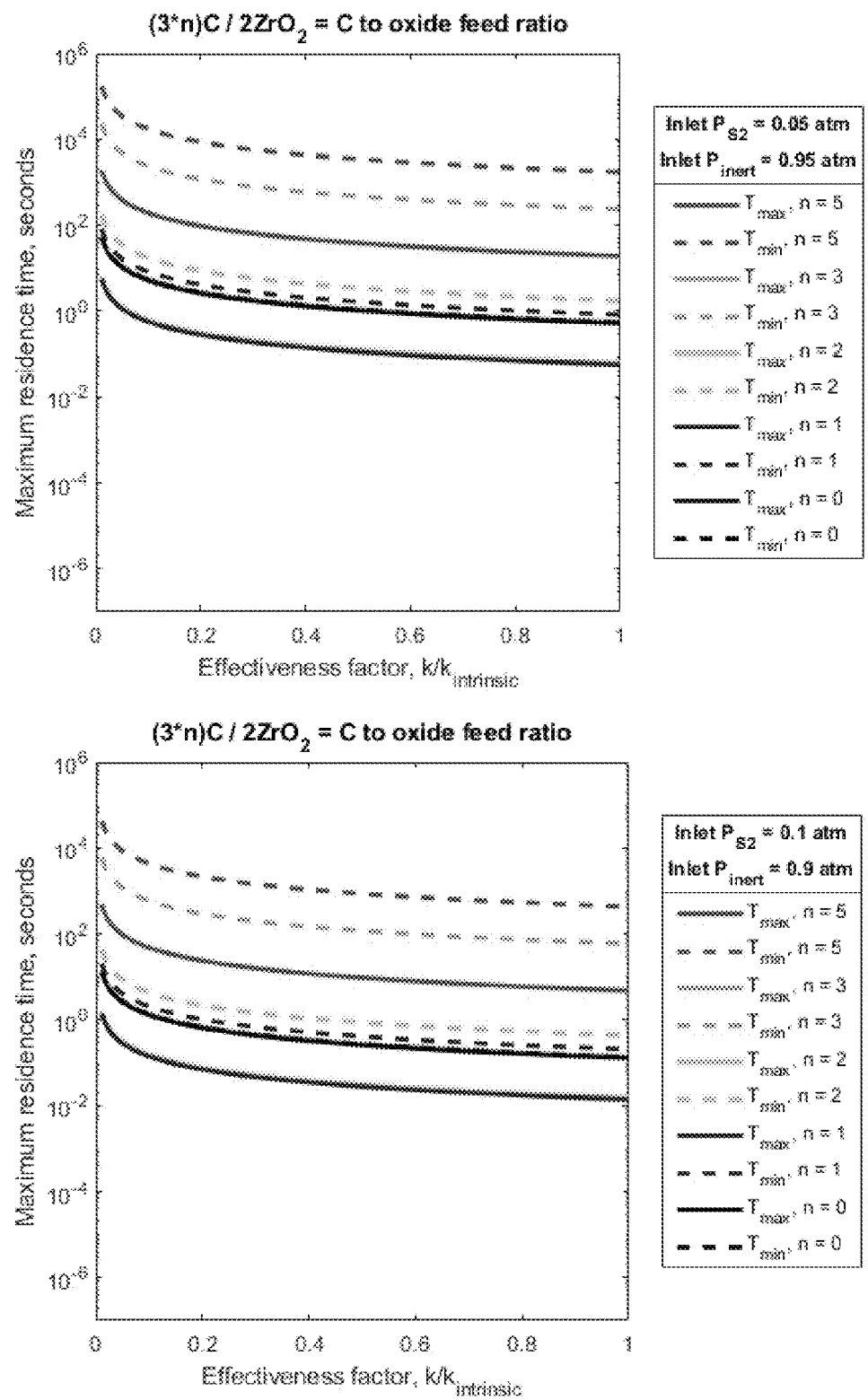
Figure 16B:
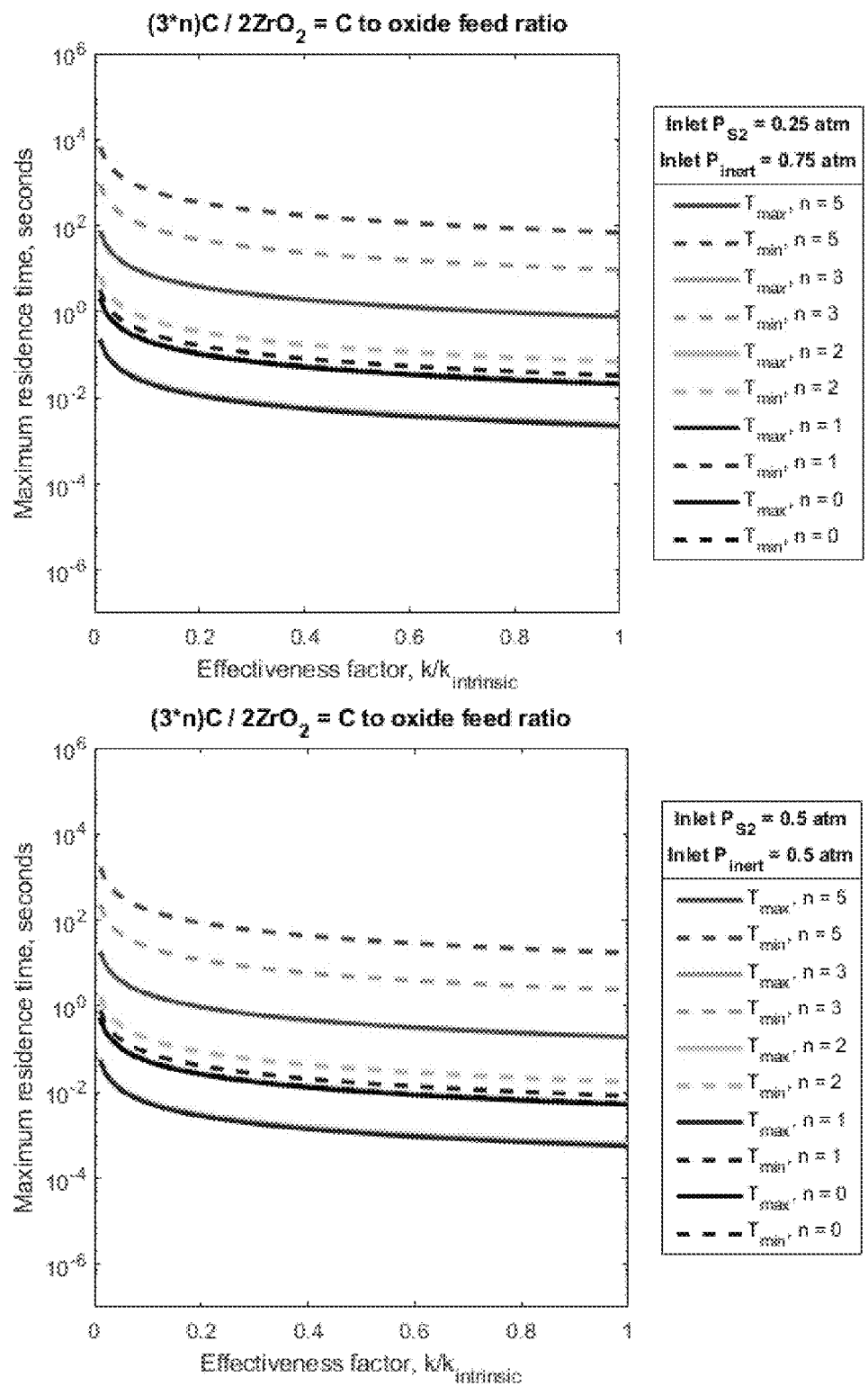

The reactions were carried out at a temperature of 1400° C. with sulfur partial pressures on the order of 0.1 atm and an average gas residence time within the reactor of 1 second. Packing densities of the oxide charge were sufficiently low so as to avoid mass transfer limitations to the reaction. FIG. 8 shows a comparison of gas signals and conversion between mixed rare earth oxide sulfidation with and without added carbon. For the experiment with carbon, carbon was added in a 2:1 mole ratio of C to REO, corresponding to a 1:15 mass ratio (0.2 g C to 3 g REO).

With and without carbon, similar levels of conversion were achieved, 30% and 25% for the experiment with and without carbon respectively, as determined by oxygen balance over the gas stream. In the experiment without carbon, sulfur dioxide was the dominant gaseous product, with an internal sulfur to sulfur dioxide ratio on the order of 20. In the experiment with added carbon, carbon monoxide was the dominant gaseous product, with carbon dioxide and sulfur dioxide below the detectable limit of the IR gas analyzer. Therefore, no gas ratio data was able to be obtained in the case of added carbon.

The resulting sulfidation products were analyzed with quantitative XRD, with results presented in Table VIIIa and Table VIIIb for the absence of carbon and presence of carbon respectively.

TABLE VIIIa

Sulfidation of a mixed rare earth oxide ($La_2O_3$, $Nd_2O_3$, $Pr_6O_{11}$) in the absence of carbon.

| | REO with no added Carbon | | | |
|---|---|---|---|---|
| | Initial | | Final | |
| Mass (g) | 3.03274 | | 3.16000 | |
| | Mass % | REM Mol % | Mass % | REM Mol % |
| $La_2O_3$ | 34% | 34% | — | — |
| $Nd_2O_3$ | 33% | 32% | — | — |
| $Pr_6O_{11}$ | 33% | 34% | — | — |
| $La_2O_2S$ | — | — | 14% | 14% |
| $Nd_2O_2S$ | — | — | 14% | 14% |
| $Pr_2O_2S$ | — | — | 7% | 7% |
| $Pr_{10}OS_{14}$ | — | — | — | — |
| Amorphous | — | — | 65% | 65% |

| | mol % Crystalline | mol % Amorphous | mol % Crystalline | mol % Amorphous |
|---|---|---|---|---|
| La | 100% | — | 41% | 59% |
| Nd | 100% | — | 42% | 58% |
| Pr | 100% | — | 22% | 78% |
| O | 100% | — | 33% | 67% |
| S | 100% | — | 39% | 61% |

TABLE VIIIb

Sulfidation of a mixed rare earth oxide ($La_2O_3$, $Nd_2O_3$, $Pr_6O_{11}$) in the presence of carbon

| | REO with 0.2 g of added Carbon | | | |
|---|---|---|---|---|
| | Initial | | Final | |
| Mass (g) | 3.01850 | | 3.15531 | |
| | Mass % | REM Mol % | Mass % | REM Mol % |
| $La_2O_3$ | 33% | 34% | — | — |
| $Nd_2O_3$ | 34% | 33% | — | — |
| $Pr_6O_{11}$ | 33% | 33% | — | — |
| $La_2O_2S$ | — | — | — | — |
| $Nd_2O_2S$ | — | — | 12% | 12% |
| $Pr_2O_2S$ | — | — | 5% | 5% |
| $Pr_{10}OS_{14}$ | — | — | 19% | 19% |
| Amorphous | — | — | 64% | 64% |

| | mol % Crystalline | mol % Amorphous | mol % Crystalline | mol % Amorphous |
|---|---|---|---|---|
| La | 100% | — | — | 100% |
| Nd | 100% | — | 36% | 64% |
| Pr | 100% | — | 73% | 27% |
| O | 100% | — | 18% | 82% |
| S | 100% | — | 73% | 27% |

For the sulfidation reaction both with and without carbon, the product ended up containing approximately 35% crystalline material and 65% amorphous material. Without the addition of carbon, the mixed rare earth oxide became a mixed rare earth oxysulfide, with a slight preference for praseodymium in the amorphous phase compared to the other metals. Carbon and oxygen existed in the amorphous material at rates consistent with the bulk. The observed formation of a mixed rare earth oxysulfide is consistent with a sulfur to sulfur dioxide ratio of 20 (see FIGS. 5A-5C).

However, in the sulfidation in which carbon was present, the distribution of metals between amorphous and non-amorphous phases was very different than in the carbon-free case. Lanthanum existed entirely in the amorphous phases, whereas praseodymium species were selectively crystallized out of the amorphous phase. Neodymium existed in the amorphous phases in similar rates to that of the carbon free case. Furthermore, sulfur existed preferentially in the crystalline phases compared to oxygen, which existed preferentially in the amorphous phases. In the crystalline phase, $Pr_{10}OS_{14}$ was present, accounting for most of the praseodymium, while a small amount of praseodymium existed as the oxysulfide. Neodymium produced oxysulfides at a similar rate with carbon as in the case without carbon. Lanthanum existed mostly as an oxide entirely in the amorphous phase. These results highlight two strengths of our selective sulfidation technology: a single metal can be selectively sulfidized from a mix of very similar oxides, demonstrated here with rare earth oxides. Furthermore, the product sulfide phase is crystallized out of the oxide. The physical separation of the product sulfide upon sulfidation facilitates removal of the sulfide product from the starting oxide. The selective sulfidation behavior of rare earth oxides was unexpected. The sulfidation of praseodymium (as opposed to lanthanum) was a surprise, as praseodymium is predicted to be one of the most difficult to sulfidize oxysulfides (FIGS. 5A-5C). However, the existence of $Pr_{10}OS_{14}$, a higher praseodymium oxysulfide (or lower sulfide) negated the expected sulfidation series. The thermodynamics of $Pr_{10}OS_{14}$ or rare earths of similar stoichiometry's have never been described, highlighting that our current understanding of thermodynamics cannot be used in isolation to explain selective sulfidation—the behavior of selective sulfidation is inherently non-obvious. Furthermore, the crystallization of the sulfide product was unexpected and not predicted from our current understanding of thermodynamics, again highlighting that the behavior and performance of our selective sulfidation technology is inherently non-obvious.

VIII-III Summary of Selective Sulfidation of a Mixed Rare Earth Oxide

Together, these results show that sulfidation can be performed selectively on a difficult to separate mixed rare earth oxide using carbon as a refluxing agent to tune selectivity. Without carbon, a mixed oxysulfide formed along with a mixed amorphous phase, with minimal selectivity for any one metal. The sulfidation product, a mixed oxysulfide, was consistent with a sulfur to sulfur dioxide ratio of 20. Once carbon was added, a similar conversion was achieved, however praseodymium was selectively sulfidized and pulled out of the amorphous phase. This result makes a strong case for the effectiveness of selective sulfidation as a concentrate cracking and metal separation technology—not only can highly chemically-similar oxides be selectively sulfidized from one another, but also selectively crystallized out of a mixed amorphous phase. The crystallization of the sulfide is a strong, unexpected asset of our selective sulfidation technology; as described in the next section, the crystallization of the sulfide allows for the extension of many conventional metallurgical separation techniques to difficult to separate oxide compounds once they have been treated with selective sulfidation. Due to incomplete thermodynamic data for the many different oxides, sulfides, and oxysulfides that exist however, the exact nature of the sulfidation product and necessary operating conditions are non-obvious and impossible to describe using only our current understanding of thermodynamic or materials phenomena alone.

IX. Metal Separation as Facilitated by Selective Sulfidation

As shown in Section VIII, selective sulfidation shows strong potential in the realms of concentrate cracking and metal separation, with the ability to selectively sulfidize a single oxide from a mix of chemically similar oxides, while encouraging crystallization of the resulting metal sulfide from an amorphous mixture of oxides. This section briefly discusses possible strategies for physically or chemically separating the selectively sulfidized metal from the oxide mixture. Gravity separation, froth floatation, and leaching techniques are discussed. In some cases, the act of selectively sulfidizing a metal oxide may result in spontaneous separation, such as if the sulfide melts or vaporizes at the temperature of the sulfidation reaction.

IX-I. Density Separation of Difficult to Separate Metal Oxides Facilitated by Selective Sulfidation Sulfidation of a metal oxide results in a significant change in that metal compound's density, as shown in Table IXa, which could be leverage in gravity separation techniques. On average, sulfidation results in a decrease in compound density of 24%. Because selective sulfidation also leads to crystallization of the metal sulfide from the surrounding oxides, selective sulfidation followed by comminution could be used to produce a mixed powder of a lighter sulfide with heavier oxides, which can be easily separated using gravity concentration.

IX-II. Floatation Separation of Difficult to Separate Metal Oxides Facilitated by Selective Sulfidation Typically, difficult to separate compounds exhibit very similar surface energies [167], causing floatation methods to be untenable. However, upon anion exchange, the surface energy of a compound becomes drastically different, as shown for the surface energies of different alkali halogens [167]. Therefore, techniques such as floatation are typically not useful in the case of difficult to separate oxides. However, sulfidation leads to a significant change in surface energy of the compound—meaning that the previously difficult to separate oxides are now behaving (from a surface energy standpoint) as an easy to separate sulfide from a mix of oxides. As for the case of density separation, selective sulfidation could be followed by comminution. Following comminution, the selectively-sulfidized species could be easily removed from the oxides using floatation due to the realized different surface energies.

IX-III. Selective Leaching of Difficult to Separate Metal Oxides Facilitate by Selective Sulfidation Sulfidation of a metal oxide results in a significant change in the dissolution behavior of the species. Selective sulfidation can be leveraged to selectively change the solubility of a single metal in a difficult to separate mixed metal oxide feed, allowing for that metal to be selectively leached from the oxide. Alternatively depending on the metal species in question, the oxide, oxysulfide, or sulfate of the other species could be selectively leached, leaving behind the sulfide. Selective sulfidation would enable conventional leaching processes to be significantly more selective to a target metal from a mixed oxide feed.

Selective sulfidation could also be employed with molten sulfide leaching technologies. A high temperature process for sulfide leaching into sodium sulfide is described in (U.S. Pat. No. 4,051,220A) [168]. As described in (U.S. Pat. No. 4,051,220A), such a process can be utilized to separate a soluble sulfide from an insoluble sulfide. Our selective sulfidation process extends this notion in a novel direction; because a single sulfidized species demonstrates very different solubility than the oxides surrounding it, the sulfide can be selectively leached into another sulfide solution from its surrounding oxides. Once in solution, electrolytic techniques can be utilized to reduce the dissolved sulfide into its metal and elemental sulfur. For an electrolyzer running at molten sulfide temperatures, the sulfur product stream is gaseous and can be fed back into the sulfide reactor. Precedence for molten sulfide electrolysis exists in both academic paper and patent literature, for metal production ranging from copper [72] to titanium [9]. Our selective sulfidation process facilitates the combination of these two technologies in a novel way to integrate metal compound leaching and reduction into a single reactor.

IX-IV. Spontaneous Separation as a Result of Selective Sulfidation

Depending on operating temperature and pressure, selective sulfidation could be used to cause spontaneous separation of the sulfide from the metal. Due to the significant change in chemistry upon sulfidation, often the sulfide melting and boiling points are significantly below that of the oxide. Furthermore, liquid sulfides often exhibit high vapor pressures. For some systems, selective sulfidation would result in a liquid sulfide product that could spontaneously density separate from the solid within the sulfidation reactor, or even boil off and be collected downstream. In this way, the selective sulfidation process could be combined with the separation method. A notable application of spontaneous material separation upon sulfidation is in the zirconium hafnium system, where zirconium sulfide is liquid within the operating temperature range. Other sulfides that exist as a liquid within the operating temperature of the solid oxide are aluminum, silicon, manganese, cobalt, nickel, germanium, indium, tin, thorium, and uranium, as shown in FIG. 6J.

IX-V. Summary of Separations Facilitated by Selective Sulfidation

Overall, selective sulfidation results in a significant change in chemistry of the metal compound, due to the very different chemical behavior of sulfides versus oxides. This change in chemical behavior causes once similar oxides to have very different separation behavior between the sulfide and oxide. This change in chemical nature allows for both conventional techniques such as gravity concentration or froth floatation, as well as emerging techniques such as molten sulfide leaching, to be effectively employed in oxide separations conventionally requiring intensive solvent extraction.

TABLE IXa

Density Comparison of Oxides and Sulfides

| Atomic Number | Metal | Oxide Density (g/cm$^3$) | Sulfide Density (g/cm$^3$) | Change Upon Sulfidation |
| --- | --- | --- | --- | --- |
| 3 | Li(I) | 2.01 | 1.66 | −17% |
| 5 | B(III) | 2.46 | 1.55 | −37% |
| 11 | Na(I) | 2.27 | 1.86 | −18% |
| 12 | Mg(II) | 3.58 | 2.68 | −25% |
| 13 | Al(III) | 3.95 | 2.32 | −41% |
| 14 | Si(IV) | 2.65 | 1.85 | −30% |
| 19 | K(I) | 2.35 | 1.8 | −23% |
| 20 | Ca(II) | 3.34 | 2.59 | −22% |
| 21 | Sc(III) | 3.86 | 2.91 | −25% |
| 22 | Ti(IV) | 4.23 | 3.22 | −24% |
| 23 | V(II) | 4.87 | 4.7 | −3% |
| 24 | Cr(III) | 5.22 | 3.77 | −28% |
| 25 | Mn(II) | 5.37 | 3.99 | −26% |
| 26 | Fe(II) | 5.74 | 4.84 | −16% |
| 27 | Co(II) | 6.44 | 5.45 | −15% |
| 28 | Ni(II) | 6.67 | 5.87 | −12% |
| 29 | Cu(I) | 6 | 5.6 | −7% |
| 30 | Zn(II) | 5.61 | 4.09 | −27% |
| 31 | Ga(III) | 6.44 | 3.77 | −41% |
| 32 | Ge(IV) | 4.25 | 2.94 | −31% |
| 33 | As(III) | 3.74 | 3.43 | −8% |
| 37 | Rb(I) | 4 | 3.01 | −25% |
| 38 | Sr(II) | 4.7 | 3.7 | −21% |
| 39 | Y(III) | 5.01 | 3.87 | −23% |
| 40 | Zr(IV) | 5.68 | 3.82 | −33% |
| 41 | Nb(IV) | 5.9 | 4.4 | −25% |
| 42 | Mo(IV) | 6.47 | 5.06 | −22% |
| 49 | In(III) | 7.18 | 4.9 | −32% |
| 50 | Sn(IV) | 6.95 | 4.5 | −35% |
| 51 | Sb(III) | 5.2 | 4.562 | −12% |
| 56 | Ba(II) | 5.72 | 5.22 | −9% |
| 57 | La(III) | 6.51 | 4.911 | −25% |
| 58 | Ce(III) | 6.2 | 5.02 | −19% |
| 59 | Pr(III) | 6.9 | 5.04 | −27% |
| 60 | Nd(III) | 7.24 | 5.179 | −28% |
| 62 | Sm(III) | 8.35 | 5.87 | −30% |
| 63 | Eu(III) | 7.4 | 5.75 | −22% |
| 64 | Gd(III) | 7.41 | 6.11 | −18% |
| 65 | Tb(III) | 7.9 | 6.27 | −21% |
| 66 | Dy(III) | 7.8 | 6.08 | −22% |
| 67 | Ho(III) | 8.41 | 5.92 | −30% |
| 68 | Er(III) | 8.64 | 6.07 | −30% |
| 70 | Yb(III) | 9.17 | 7.06 | −23% |
| 71 | Lu(III) | 9.42 | 6.25 | −34% |
| 72 | Hf(IV) | 9.68 | 6.03 | −38% |
| 73 | Ta(IV) | 10.31 | 6.86 | −33% |
| 74 | W(IV) | 10.8 | 7.5 | −31% |
| 80 | Hg(II) | 11.14 | 8.1 | −27% |
| 81 | Tl(III) | 10.19 | 8.39 | −18% |
| 82 | Pb(II) | 9.53 | 7.6 | −20% |
| 83 | Bi(III) | 8.9 | 6.78 | −24% |
| 90 | Th(IV) | 10 | 7.3 | −27% |
| 92 | Ur(IV) | 10.97 | 7.54 | −31% |

X. Conclusions

Metals such as the rare earths and other strategically-significant metals such as tantalum and niobium remain difficult to separate, requiring extensive hydrometallurgical processing. Hydrometallurgical processing presents techno-economic and environmental challenges due to long residence times, toxic solvents and waste, and large capital investments. We propose that hydrometallurgical operations for difficult to separate metals can be made less intensive via the adoption of selective sulfidation, an innovative ore cracking, metal separation, and compound production technique. We show that sulfidation of a metal oxide with elemental sulfur is thermodynamically feasible, which we demonstrate with lab scale sulfidation of lanthanum oxide. The unmatched product valency control of selective sulfidation is also demonstrated for lanthanum oxide, where the partial pressure of the sulfur gas reactant is shown to allow for selective production of a particular compound stoichiometry. Following, we propose a sulfidation series, detailing operating conditions for the reactor's sulfur to sulfur dioxide ratio and carbon monoxide to carbon dioxide ratio, as well as pressure and temperature constraints. The innovate role of carbon as a refluxing agent to convert product sulfur dioxide back into elemental sulfur is explored, with the role of carbon on selectivity and reactor gas residence time emphasized. We then demonstrate successful lab-scale selective sulfidation of a single rare earth oxide from a mixed rare earth oxide feed, showing that difficult to separate oxides can be sulfidized selectivity, with the act of sulfidation causing crystallization of the resulting sulfide compound. The separation of a selectively sulfidized compound from a mixed oxide is discussed, highlighting that selective sulfidation facilitates the use of conventional separation techniques such as floatation and gravity distribution, as well as new techniques such as molten sulfide leaching and spontaneous separation upon sulfidation, for metal oxides that in the past required extensive hydrometallurgical processing.

CHAPTER 3 REFERENCES

1. B. R. Nakanishi and A. Allanore, J. Electrocehmical Soc. 166, 420 (2019).
2. D. S. Flett, J. Organomet. Chem. 690, 2426 (2005).
3. B. Zhao, J. Zhang, and B. Schreiner, Separation Hydrometallurgy of Rare Earth Elements (Springer International Publishing AG Switzerland, 2016).
4. H. B. Hovland, U.S. Pat. No. 1,159,942A (16 Jul. 1915).
5. T. Yoneyama, H. Mitsui, and M. Enomoto, U.S. Pat. No. 10,125,408B2 (8 Dec. 2015).
6. H. Kobayashi, Y. Ozaki, and M. Imamura, U.S. Pat. No. 7,018,605B2 (24 Feb. 2003).
7. P. Taylor and B. Carlson, US20180237887A1 (21 Feb. 2018).
8. R. O. Suzuki and S. Inoue, Metall. Mater. Trans. B Process Metall. Mater. Process. Sci. 34, 277 (2003).
9. E. Ahmadi, Y. Yashima, R. O. Suzuki, and S. A. Rezan, Metall. Mater. Trans. B Process Metall. Mater. Process. Sci. 49, 1808 (2018).
10. W. Zhang, Y. Zhou, J. Zhu, and Y. Pan, Ind. Eng. Chem. Res. 53, 5646 (2014).
11. R. J. Feuling, U.S. Pat. No. 5,039,336A (30 Dec. 1988).
12. R. J. Feuling, U.S. Pat. No. 5,049,363A (3 Aug. 1989).
13. A. J. Jacobson and P. Samarasekere, US20180202025A1 (11 Jul. 2015).
14. K. Sun, D. R. Baughman, and W. W. Hazen, US20180209015A1 (21 Jul. 2016).
15. H. Yamamoto, K. Furusawa, H. Hoshi, A. Kikugawa, M. Miyata, and H. Murakami, WO2004073021A2 (8 Oct. 2013).
16. M. A. Gimenes and H. P. Oliveira, Metall. Mater. Trans. B Process Metall. Mater. Process. Sci. 32, 1007 (2001).
17. L. Q. Zhang, Z. C. Wang, S. X. Tong, P. X. Lei, and W. Zou, Metall. Mater. Trans. B Process Metall. Mater. Process. Sci. 35, 217 (2004).
18. Y. Mochizuki, N. Tsubouchi, and K. Sugawara, ACS Sustain. Chem. Eng. 1, 655 (2013).
19. K. M. Lyons, J. P. Downey, J. L. Chorney, and K. J. Schumacher, in Miner. Met. Mater. Ser. (Springer International Publishing, 2017), pp. 55-63.
20. Z. C. Wang, L. Q. Zhang, P. X. Lei, and M. Y. Chi, Metall. Mater. Trans. B Process Metall. Mater. Process. Sci. 33, 661 (2002).
21. Y. H. Sun, L. Q. Zhang, P. X. Lei, Z. C. Wang, and L. Guo, J. Alloys Compd. 335, 196 (2002).
22. A. Anderson and B. Mishra, J. Sustain. Metall. 1, 189 (2015).
23. R. J. Feuling, U.S. Pat. No. 4,913,884A (9 Nov. 1988).
24. K. S. Liddell, L. A. Smith, and M. D. Adams, U.S. Pat. No. 9,982,320B2 (24 Nov. 2015).
25. G. Du, C. Fan, H. Yang, and Q. Zhu, J. Clean. Prod. 237, 117765 (2019).
26. N. V. Manukyan and V. H. Martirosyan, J. Mater. Process. Technol. 142, 145 (2003).
27. J. Andrade-Gamboa, J. Andrade-Gamboa, and D. M. Pasquevich, Metall. Mater. Trans. B Process Metall. Mater. Process. Sci. 31, 1439 (2000).
28. D. M. Pasquevich, J. A. Gamboa, and A. Caneiro, Thermochim. Acta 209, 209 (1992).
29. J. Gonzalez, A. Bohé, D. Pasquevich, & M. Del, and C. Ruiz, Can. Metall. Q. 41, 29 (2002).
30. K. I. Rhee and H. Y. Sohn, Metall. Trans. B 21, 341 (1990).
31. I. Gaballah and M. Djona, Metall. Mater. Trans. B 26, 41 (1995).
32. J. Stiksma and R. Berezowsky, US20100199807A1 (4 Feb. 2010).
33. J. L. Burba, U.S. Pat. No. 8,936,770B2 (20 Jan. 2011).
34. S. Elsafty and K. Halada, U.S. Pat. No. 9,267,188B2 (21 Feb. 2012).
35. D. Prodius, C. I. Nlebedim, and A.-V. Murding, US20190160394A1 (22 Jan. 2019).
36. R. S. Bhaduri, L. J. Nordrum, and A. E. Kuperman, US20120039777A1 (9 Jun. 2011).
37. R. S. Bhaduri, U.S. Pat. No. 7,658,895B2 (28 Nov. 2007).
38. R. S. Bhaduri, J. Stiksma, and R. Berezowsky, U.S. Pat. No. 7,837,960B2 (19 Dec. 2008).
39. R. S. Bhaduri, U.S. Pat. No. 8,628,735B2 (25 Mar. 2010).
40. A. Carati, M. F. Gagliardi, M. M. Ferrari, S. Zanardi, M. Marella, and M. Tomaselli, US20140323291A1 (22 Mar. 2012).
41. G. Bellussi, A. Carati, M. F. Gagliardi, S. Zanardi, M. Marella, R. Scattolin, and M. Tomaselle, US20160101410A1 (15 Dec. 2015).
42. T. J. Marks and M. Peter, U.S. Pat. No. 10,227,268B2 (19 Feb. 2016).
43. S. Kasztelan, U.S. Pat. No. 6,562,752B2 (22 Dec. 2000).
44. S. Kasztelan, U.S. Pat. No. 6,316,382B1 (25 Jun. 1999).
45. S. Kasztelan, U.S. Pat. No. 6,432,867B1 (25 Jun. 1999).
46. S. Kasztelan, U.S. Pat. No. 6,242,378B1 (25 Jun. 1999).
47. H. Hui, L. Jin, C. Guohong, and L. Shengli, J. Rare Earths 22, 470 (2004).
48. J. Ma, M. Fang, and N. T. Lau, Appl. Catal. A Gen. 150, 253 (1997).
49. N. T. Lau, M. Fang, and C. K. Chan, J. Mol. Catal. A Chem. 203, 221 (2003).
50. Z. H. Du, Adv. Mater. Res. 955-959, 2173 (2014).
51. J. Ma, M. Fang, and N. T. Lau, J. Catal. 163, 271 (1996).
52. H. Hirata, U.S. Pat. No. 8,011,181B2 (2011).
53. F. C. Palilla, CA1080441A (1976).
54. CN101912721B (2010).
55. S. Paul, A. Sarkar, S. Paul, and A. Sarkar, 020370, (2016).
56. M. Popescu, A. Lorinczi, F. Sava, A. Velea, I. D. Simandan, P. Badica, M. Burdusel, A. C. Galca, G. Socol, F. Jipa, and M. Zamfirescu, Mater. Lett. 142, 229 (2015).
57. K. P. Ananth, P. J. Gielisse, and T. J. Rockett, Mater. Res. Bull. (1974).
58. H. YUAN, J. ZHANG, R. YU, and Q. SU, J. Rare Earths 27, 308 (2009).
59. P. N. Kumta and S. H. Risbud, Mater. Sci. Eng. B (1989).
60. P. J. Walker and R. C. C. Ward, Mater. Res. Bull. 19, 717 (1984).
61. K. Ikeda, K. A. Gschneidner, B. J. Beaudry, and U. Atzmony, Heat Capacity in Superconducting and Normal-State LaS" (1.333~x~1.500) Compounds (1982).
62. T. T. Ghogare, R. B. Pujari, A. C. Lokhande, and C. D. Lokhande, Appl. Phys. A Mater. Sci. Process. 124, (2018).

63. V. S. Kumbhar, A. C. Lokhande, N. S. Gaikwad, and C. D. Lokhande, Mater. Sci. Semicond. Process. 33, 136 (2015).
64. S. Chen, H. Zhang, X. Fu, and Y. Hu, in Appl. Surf. Sci. (2013).
65. I. A. Kariper, Prog. Nat. Sci. Mater. Int. (2014).
66. M. Ohta, H. Yuan, S. Hirai, Y. Uemura, and K. Shimakage, J. Alloys Compd. 374, 112 (2004).
67. T. Mirkovic, M. A. Hines, P. Sreekumari Nair, and G. D. Scholes, Chem. Mater. 17, 3451 (2005).
68. P. N. Kumta and S. H. Risbud, Mater. Sci. Eng. B 18, 260 (1993).
69. K. B. Gibbard, K. N. Allahar, D. Kolman, and D. P. Butt, J. Nucl. Mater. (2008).
70. V. V Sokolov, V. V Bakovetz, S. M. Luguev, and N. V Lugueva, Adv. Mater. Phys. Chem. 2, 25 (2012).
71. T. Amano, B. J. Beaudry, and K. A. Gschneidner, J. Appl. Phys. 59, 3437 (1986).
72. S. K. Sahu, B. Chmielowiec, and A. Allanore, Electrochim. Acta 243, 382 (2017).
73. M. B. Hocking, Handbook of Chemical Technology and Pollution Control, 2nd ed. (Academic Press, 1998).
74. M. Kirschner, ICIS Chem. Profile, 2008/09/07 (2008).
75. X. F. Jiang, H. Huang, Y. F. Chai, T. L. Lohr, S. Y. Yu, W. Lai, Y. J. Pan, M. Delferro, and T. J. Marks, Nat. Chem. 9, 188 (2017).
76. J. Chen, A. Chen, P. Qiu, L. Huang, and Q. Zhou, J. Environ. Chem. Eng. 7, 1 (2019).
77. R. Heindl and J. Loriers, Soc. Chim. Fr. Bull. 3-4, 377 (1974).
78. C. Y. Cheng and Z. Zhu, Hydrometallurgy 107, 1 (2011).
79. J. Sangster and A. D. Pelton, J. Phase Equilibria 18, 97 (1997).
80. O. V. Andreev, T. M. Kislovskaya, and A. V. Kertman, ZHURNAL Neorg. KHIMII 35, 1280 (1990).
81. H. Okamoto, in Bin. Alloy Phase Diagrams, edited by T. B. Massalski, II Ed. (ASM International, 1990), pp. 1762-1765.
82. H. Okamoto, in Bin. Alloy Phase Diagrams, edited by T. B. Massalski, II Ed. (ASM International, 1990), pp. 1993-1994.
83. H. Okamoto, J. Phase Equilibria 18, 404 (1997).
84. P. Touzain and M. Caillet, Rev. Chim. Min. 8, 277 (1971).
85. H. A. Wriedt, in Bin. Alloy Phase Diagrams, edited by T. B. Massalski, II Ed. (ASM International, 1990), pp. 2718-2722.
86. V. L. Volkov, B. G. Golovkin, A. S. Fedyukov, and Y. G. Zainulin, Russ. J. Inorg. Chem. 35, 1660 (1990).
87. C. Stinn, K. Nose, T. Okabe, and A. Allanore, Metall. Mater. Trans. B (2017).
88. A. V. Shevchenko, L. M. Lopato, and S. G. Tresvyatskii, Neorg. Mater. 2, 1240 (1966).
89. H. Okamoto, in Bin. Alloy Phase Diagrams, edited by T. B. Massalski, II Ed. (ASM International, 1990), pp. 3300-3301.
90. H. Okamoto, J. Phase Equilibria 13, 586 (1992).
91. H. A. Jehn, in Ternary Alloy. (VCH Verlagsgesellschaft, Weinheim, Germany, 1991), pp. 91-92.
92. A. V. Kosenko and G. A. Emel'chenko, J. Phase Equilibria 22, 12 (2001).
93. J. F. Smith, in Bin. Alloy Phase Diagrams, edited by T. B. Massalski, II Ed. (ASM International, 1990), pp. 3292-3295.
94. H. A. Wriedt, in Bin. Alloy Phase Diagrams, edited by T. B. Massalski, II Ed. (ASM International, 1990), pp. 185-186.
95. J. P. Abriata, R. Versaci, and J. Garces, in Bin. Alloy Phase Diagrams, edited by T. B. Massalski, II Ed. (ASM International, 1990), pp. 2940-2941.
96. H. Okamoto, in Bin. Alloy Phase Diagrams, edited by T. B. Massalski, II Ed. (ASM International, 1990), pp. 3278-3281.
97. H. Okamoto, in Bin. Alloy Phase Diagrams, edited by T. B. Massalski, II Ed. (ASM International, 1990), pp. 314-315.
98. O. V. Andreev, P. V. Miodushevscy, R. Serlenga, and N. N. Parsukov, J. Phase Equilibria Diffus. 26, 109 (2005).
99. L. Brewer and R. H. Lamoreaux, in Bin. Alloy Phase Diagrams, edited by T. B. Massalski, II Ed. (ASM International, 1990), pp. 2639-2641.
100. H. Okamoto, in Bin. Alloy Phase Diagrams, edited by T. B. Massalski, II Ed. (ASM International, 1990), pp. 2912-2913.
101. W. Fix, H.-E. Wiemer, and H.-J. Tolkemit, Arch. Für Das Eisenhüttenwes. 40, 215 (1969).
102. H. Okamoto, in Bin. Alloy Phase Diagrams, edited by T. B. Massalski, II Ed. (ASM International, 1990), pp. 1976-1977.
103. D. Sajuti, M. Yano, T. Narushima, and Y. Iguchi, Mater. Trans. JIM 34, 1195 (1993).
104. H. Okamoto, in Bin. Alloy Phase Diagrams, edited by T. B. Massalski, II Ed. (ASM International, 1990), pp. 1103-1105.
105. L. Y. Erman, E. L. Galperin, and B. P. Sobolev, ZHURNAL Neorg. KHIMII 16, 490 (1971).
106. H. Okamoto, in Bin. Alloy Phase Diagrams, edited by T. B. Massalski, II Ed. (ASM International, 1990), pp. 2790-2792.
107. H. Okamoto, J. Phase Equilibria 19, 402 (1998).
108. P. R. Subramanian, in Bin. Alloy Phase Diagrams, edited by T. B. Massalski, II Ed. (ASM International, 1990), pp. 2912-2915.
109. A. V. Shevchenko, L. M. Lopato, and L. V. Nazarenko, Inorg. Mater. 20, 1615 (1984).
110. S. Knitter and M. Binnewies, Zeitschrift Fûr Anorg. Und Allg. Chemie 625, 1582 (1999).
111. O. V. Andreev and T. M. Kislovskaya, Russ. J. Inorg. Chem. 35, 1815 (1990).
112. A. Y. Zavrazhnov, D. N. Turchen, E. G. Goncharov, and V. P. Zlomanov, J. Phase Equilibria 22, 482 (2001).
113. R. C. Sharma, in Bin. Alloy Phase Diagrams, edited by T. B. Massalski, II Ed. (ASM International, 1990), pp. 3280-3283.
114. H. Okamoto, in Bin. Alloy Phase Diagrams, edited by T. B. Massalski, II Ed. (ASM International, 1990), pp. 2933-2935.
115. H. F. Franzen, in Bin. Alloy Phase Diagrams, edited by T. B. Massalski, II Ed. (ASM International, 1990), pp. 2593-2597.
116. H. Okamoto, J. Phase Equilibria Diffus. 18, 402 (1997).
117. H. A. Wriedt, in Bin. Alloy Phase Diagrams, edited by T. B. Massalski, II Ed. (ASM International, 1990), pp. 2915-2918.
118. H. A. Wriedt, in Bin. Alloy Phase Diagrams, edited by T. B. Massalski, II Ed. (ASM International, 1990), pp. 2930-2933.
119. I. N. Odin and M. V. Chukichev, Zhurnal Neorg. Khimii 45, 255 (2000).
120. J. Sangster and A. D. Pelton, J. Phase Equilibria 18, 89 (1997).
121. H. Okamoto, J. Phase Equilibria 16, 94 (1995).
122. O. V. Andreev, A. V. Kertman, and N. N. Parshukov, Russ. J. Inorg. Chem. 43, 1127 (1998).

123. H. Okamoto, in Bin. Alloy Phase Diagrams, edited by T. B. Massalski, II Ed. (ASM International, 1990), pp. 2283-2285.
124. L. M. Lopato, L. I. Lugin, and A. V. Shevchenko, Zhurnal Neorg. Khimii 17, 2543 (1972).
125. J.-C. Lin, R. C. Sharma, and Y. A. Chang, J. Phase Equilibria 17, 132 (1996).
126. H. A. Wriedt, in Bin. Alloy Phase Diagrams, edited by T. B. Massalski, II Ed. (ASM International, 1990), pp. 2901-2904.
127. J. C. Lin, R. C. Sharma, and Y. A. Chang, in Bin. Alloy Phase Diagrams, edited by T. B. Massalski, II Ed. (ASM International, 1990), pp. 3005-3009.
128. H. Okamoto, J. Phase Equilibria Diffus. 20, 167 (1999).
129. J. Sangster and A. D. Pelton, J. Phase Equilibria 18, 82 (1997).
130. H. v. Wartenberg and H. J. Reusch, Zeitschrift Für Anorg. Und Allg. Chemie 207, 1 (1932).
131. H. F. Franzen, in Bin. Alloy Phase Diagrams, edited by T. B. Massalski, II Ed. (ASM International, 1990), pp. 2418-2421.
132. E. Schürmann and U. Janhsen, Steel Res. 64, 279 (1993).
133. C. Ronchi and J. P. Hiernaut, J. Alloys Compd. 240, 179 (1996).
134. J. L. Murray, in Bin. Alloy Phase Diagrams, edited by T. B. Massalski, II Ed. (ASM International, 1990), pp. 3286-3288.
135. E. E. Schmid, in Ternary Alloy. (VCH Verlagsgesellschaft, Weinheim, Germany, 1993), pp. 381-387.
136. V. N. Pavlikov, L. M. Lopato, Z. A. Yaremenko, and A. V. Shevchenko, Neorg. Mater. 2, 1055 (1966).
137. I. N. Odin, V. V. Grin'ko, E. V. Safronov, and V. F. Kozlovskij, Zhurnal Neorg. Khimii 46, 1210 (2001).
138. H. Okamoto, in Bin. Alloy Phase Diagrams, edited by T. B. Massalski, II Ed. (ASM International, 1990), pp. 3288-3290.
139. H. Okamoto, J. Phase Equilibria 22, 87 (2001).
140. H. Okamoto, J. Phase Equilibria Diffus. 5, 489 (1997).
141. B. K. Kasenov, E. S. Mustafin, and Z. Sarkulov, Russ. J. Inorg. Chem. 41, 839 (1996).
142. H. Okamoto, in Bin. Alloy Phase Diagrams, edited by T. B. Massalski, II Ed (ASM International, 1990), pp. 1232-1233.
143. H. A. Wriedt, in Bin. Alloy Phase Diagrams, edited by T. B. Massalski, II Ed. (ASM International, 1990), pp. 2531-2532.
144. J. L. Murray and H. A. Wriedt, in Bin. Alloy Phase Diagrams, edited by T. B. Massalski, II Ed. (ASM International, 1990), pp. 2924-2927.
145. A. V. Shevchenko, L. M. Lopato, and I. E. Kir'yakova, Neorg. Mater. 20, 1991 (1984).
146. H. Okamoto, in Bin. Alloy Phase Diagrams, edited by T. B. Massalski, II Ed. (ASM International, 1990), pp. 2919-2920.
147. A. A. Eilseev, G. M. Kuz'micheva, and V. I. Yashnov, Zhurnal Neorg. Khimii 23, 492 (1978).
148. M. Singleton, P. Nash, and K. J. Lee, in Bin. Alloy Phase Diagrams, edited by T. B. Massalski, II Ed. (ASM International, 1990), pp. 2850-2853.
149. H. Okamoto, in Bin. Alloy Phase Diagrams, edited by T. B. Massalski, II Ed. (ASM International, 1990), pp. 3295-3296.
150. P. J. M. GIELISSE and W. R. FOSTER, Nature 195, 69 (1962).
151. T. K. Jondo, R. Abraham, M. T. Cohen-Adad, and J. L. Jorda, J. Alloys Compd. 186, 347 (1992).
152. R. C. Sharma and Y. A. Chang, in Bin. Alloy Phase Diagrams, edited by T. B. Massalski, II Ed. (ASM International, 1990), pp. 203-206.
153. H. Okamoto, in Bin. Alloy Phase Diagrams, edited by T. B. Massalski, II Ed. (ASM International, 1990), pp. 3290-3292.
154. R. W. Porrnn, I. Nnn, and H. L. Bnnnns, Am. Mineral. 63, 143 (1978).
155. H. Okamoto, in Bin. Alloy Phase Diagrams, edited by T. B. Massalski, II Ed. (ASM International, 1990), pp. 1673-1674.
156. G. H. Moh, in Top. Curr. Chem. (Springer-Verlag, Berlin/Heidelberg, 1978), pp. 107-151.
157. H. Okamoto, J. Phase Equilibria 18, 400 (1997).
158. M. W. Shafer, J. B. Torrance, and T. Penney, J. Phys. Chem. Solids 33, 2251 (1972).
159. A. N. Grundy, B. Hallstedt, and L. J. Gauckler, J. Phase Equilibria 22, 105 (2001).
160. H. Okamoto, J. Phase Equilibria 19, 291 (1998).
161. A. El Goresy and G. Kullerud, in Meteor. Res. (Springer, Dordrecht, 1969), pp. 638-656.
162. O. V. Andreev, O. Y. Mitroshin, and I. A. Razumkova, Russ. J. Inorg. Chem. 52, 1161 (2007).
163. H. Okamoto, in Bin. Alloy Phase Diagrams, edited by T. B. Massalski, II Ed. (ASM International, 1990), pp. 3276-3277.
164. K. J. Schulz, N. M. Piatak, and J. F. Papp, in Crit. Miner. Resour. United States—Economic Environ. Geol. Prospect. Futur. Supply (USGS, 2017).
165. I. Gaballah and E. Allain, Resour. Conserv. Recycl. 10, 75 (1994).
166. R. H. Neilsen, in Encycl. Chem. Technol. (2013).
167. D. T. Livey and P. Murray, J. Am. Ceram. Soc. 39, 363 (1956).
168. E. L. Coltrinari, U.S. Pat. No. 4,051,220A (1 Mar. 1976).

CHAPTER 4—ADDITIONAL CASE STUDIES

I—NMC Battery Cathode Recycling

Figure 19:
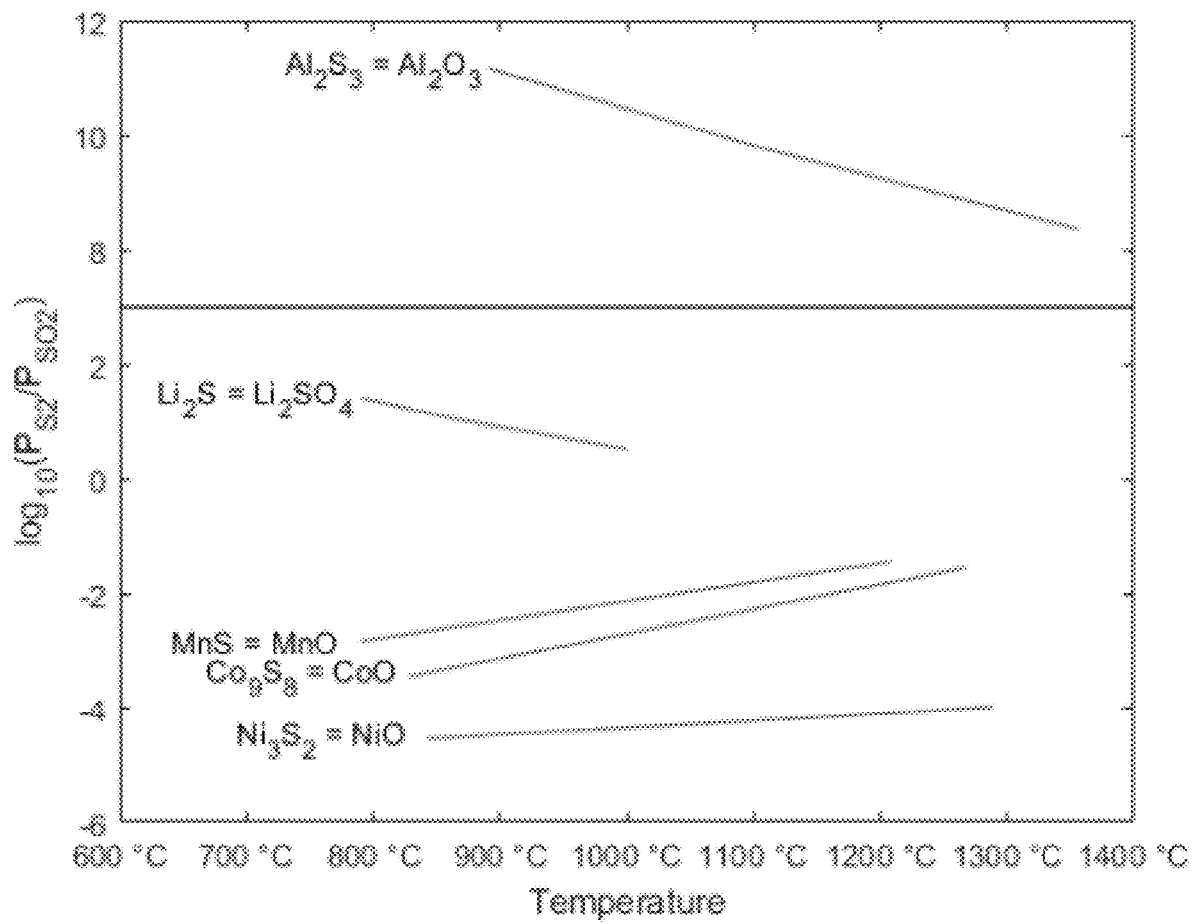
FIG. 19 shows a representation of selective sulfidation-selective desulfidation reactions relating to an exemplary embodiment of NMC battery cathode recycling.

Lithium-ion batteries using cathodes of nickel, manganese, and cobalt oxide (NMC) are an ever-growing source of e-waste with a high metal value. Hydrometallurgical and pyrometallurgical recycling routes exist, however they struggle with materials recovery and separation. Selective sulfidation can isolate nickel and cobalt as sulfides, manganese as an oxysulfide, aluminum as an oxide, and lithium as a sulfate, facilitating easier separation and recovery. For example, upon sulfidation, the cathode melts and phase separates into three immiscible liquids: nickel-rich sulfide, cobalt-rich sulfide, and manganese oxysulfide. Typical recycling impurities such as aluminum, which are typically difficult to separate, and be calcined as an oxide. FIG. 19 shows a representation of selective sulfidation-selective desulfidation reactions relating to an exemplary embodiment of NMC battery cathode recycling. Upon sulfidation at 1050° C., melting of the sulfides occurs and the oxides, oxysulfides, sulfates, and sulfides phase separate, with Energy Dispersive Spectroscopy (EDS) analysis showing phases including $Co_{0.67}Ni_{0.33}S$, $Ni_{0.75}Co_{0.25}S$, and $Mn_{0.8}O_{0.2}$. Cobalt and nickel can be separated from aluminum, manganese, and lithium, for example using magnetic separation.

II—Rare Earth Metal Separation

Figure 20:
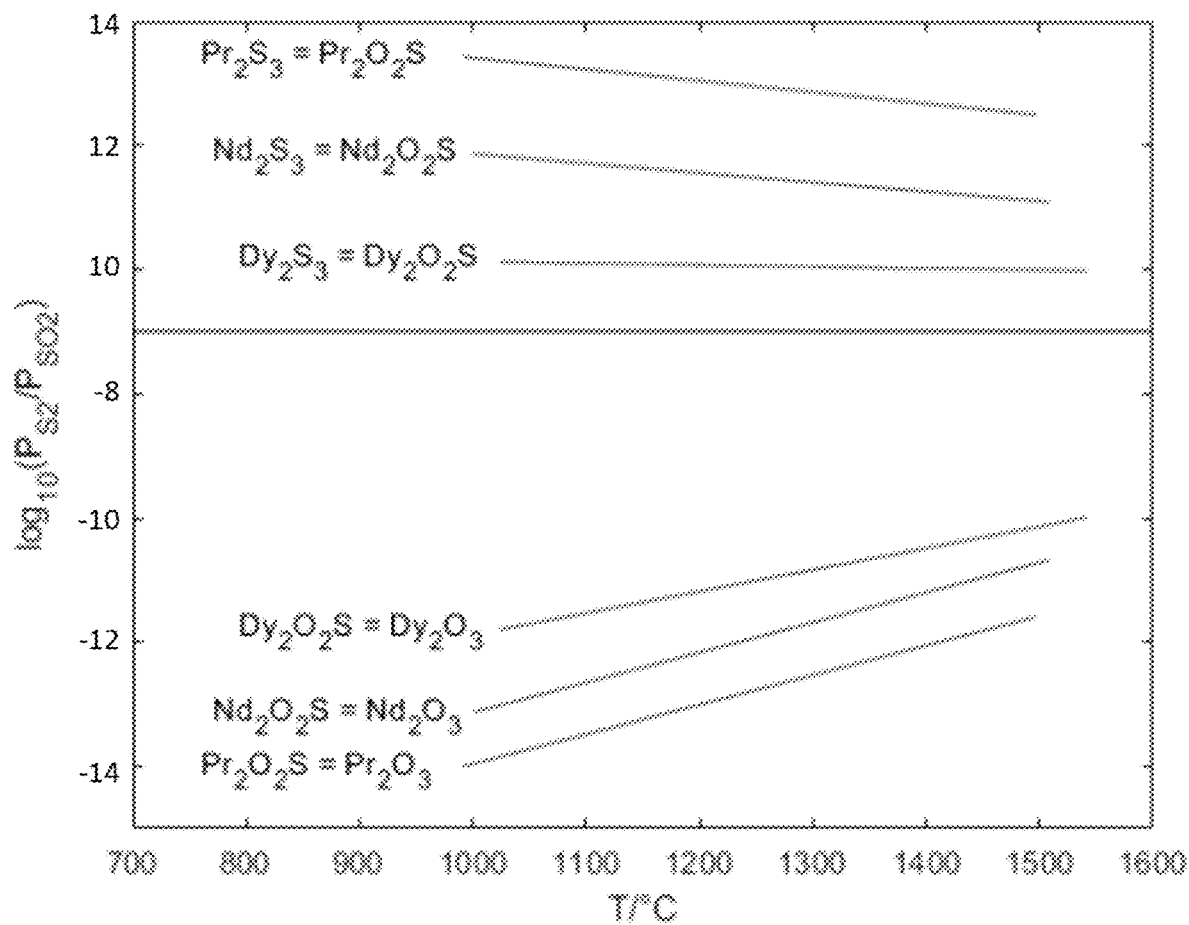
FIG. 20 shows a representation of selective sulfidation-selective desulfidation reactions relating to an exemplary embodiment of rare earth metal separation.

As discussed herein, rare earth separation remains one of the most challenging, capitally-intensive, and environmentally-harmful metal separation challenges. Few rare earths are recycled due to collection and separation difficulties. In this example, neodymium, praseodymium, and dysprosium were chosen due to relevance in primary extraction and in recycling (e.g., magnets). FIG. 20 shows a representation of selective sulfidation-selective desulfidation reactions relating to an exemplary embodiment of rare earth metal separation. Here, carbon can be leveraged to control the $S_2$ to $SO_2$ ratio in the reactor, reducing $SO_2$ to carbon monoxide/dioxide and elemental sulfur. Changes in carbon addition drastically change the sulfidation product, and via control of the carbon addition to the sulfidation system (i.e., the ratio $C/N_{0.62}Pr_{0.62}Dy_{0.62}O_3$, individual rare earths can be stepwise-sulfidized and crystallized at 1400° C., as shown in the following table:

| Product (QXRD mass %) | Initial Feed | Thermal treatment at 1400° C., No sulfidation | Sulfidation at 1400° C., No carbon | Sulfidation at 1400° C., C/REO = 1 | Sulfidation at 1400° C., C/REO = 2 | Sulfidation at 1400° C., C/REO = 3 | Sulfidation at 1400° C., C/REO = 5 |
|---|---|---|---|---|---|---|---|
| $Nd_2O_3$ | 17% | 12% | — | — | — | — | — |
| $Dy_2O_3$ | 27% | 12% | — | — | — | — | — |
| $DyNdO_3$ | — | 15% | — | — | — | — | — |
| $PrO_2$ | 19% | — | — | — | — | — | — |
| $Pr(OH)_3$ | 3% | — | — | — | — | — | — |
| $Pr_2O_3$ | — | — | — | 1% | — | — | — |
| $Nd_2O_3S$ | — | — | 17% | 12% | — | — | — |
| $Nd_{10}OS_{14}$ | — | — | — | — | 25% | — | — |
| $Dy_2O_2S$ | — | — | 27% | 28% | 12% | — | — |
| $Pr_2O_2S$ | — | — | 3% | 1% | — | — | — |
| $Nd_3S_4$ | — | — | — | — | — | 9% | — |
| $Nd_2S_2$ | — | — | — | — | — | 16% | 16% |
| $NdS_2$ | — | — | — | — | — | — | 1% |
| Amorphous | 34% | 61% | 53% | 58% | 63% | 75% | 83% |

The movement of rare earth elements in and out of the amorphous phase upon sulfidation demonstrates the high level of selectivity achievable by sulfidation and illustrates the power of sulfidation as an ore cracking technology. For example, as shown in the following table, at a C/REO molar feed ratio of 3, neodymium sulfide is formed, with 74% of the Nd content crystallized in the sulfide:

| | Initial REO | Sulfidized | | | | |
|---|---|---|---|---|---|---|
| Carbon to REO | 0 | 0 | 1 | 2 | 3 | 5 |
| Pr | | | | | | |
| Total wt % | 27% | 26% | 26% | 26% | 25% | 24% |
| % in oxide | 66% | — | 3% | — | — | — |
| % in oxysulfide | — | 9% | 3% | — | — | — |
| % in sulfide | — | — | — | — | — | — |
| % in amorphous | 34% | 91% | 94% | 100% | 100% | 100% |
| Dy | | | | | | |
| Total wt % | 31% | 30% | 30% | 30% | 29% | 28% |
| % in oxide | 76% | — | — | — | — | — |
| % in oxysulfide | — | 75% | 77% | 34% | — | — |
| % in sulfide | — | — | — | — | — | — |
| % in amorphous | 24% | 25% | 23% | 66% | 100% | 100% |
| Nd | | | | | | |
| Total wt % | 27% | 27% | 27% | 26% | 26% | 25% |
| % in oxide | 53% | — | — | — | — | — |
| % in oxysulfide | — | 52% | 37% | 72% | — | — |
| % in sulfide | — | — | — | — | 74% | 49% |
| % in amorphous | 47% | 48% | 63% | 28% | 26% | 51% |
| O | | | | | | |
| Total wt % | 15% | 11% | 12% | 10% | 8% | 3% |
| % in oxide | 69% | — | 1% | — | — | — |
| % in oxysulfide | — | 36% | 28% | 13% | — | — |
| % in sulfide | — | — | — | — | — | — |
| % in amorphous | 47% | 64% | 70% | 87% | 100% | 100% |
| S | | | | | | |
| Total wt % | — | 6% | 4% | 9% | 12% | 21% |
| % in oxide | — | — | — | — | — | — |
| % in oxysulfide | — | 64% | 81% | 75% | — | — |
| % in sulfide | — | — | — | — | 49% | 21% |
| % in amorphous | — | 36% | 19% | 25% | 51% | 79% |

III—Neodymium, Praseodymium and Dysprosium Recycling from Rare Earth Magnets Leverage of sulfidation kinetics and solution thermodynamics is necessary for effective material separation via selective sulfidation. Ln extraction and separation from (Nd,Pr,Dy)—Fe—B magnets is chosen as a case study for kinetic control of sulfidation selectivity in real systems due to differences between the thermal activation of the sulfidation reaction for Fe and Ln observed in pure mixed oxides and the well-documented oxidation thermodynamics of Fe—Nd—B magnets. The sulfidation separation window between $[P_{S2}/P_{SO2}]_{crit}$ for $Fe_3O_4$ and $Ln_2O_3$ (see FIG. 1B) is broadly reflective of many critical material separations, such as Sc extraction from red mud, recycling of Ln-transition metal catalysts, and Ln recovery from electrowinning slags.

Recycling of (Nd,Pr,Dy)—Fe—B magnets is a promising pathway to confront critical material supply uncertainty by geographically-deconcentrating Ln production, while addressing the Ln balance problem by supplementing primary production with magnet Ln. Many pyrometallurgical and hydrometallurgical processes have been explored for Ln recovery from (Nd,Pr,Dy)—Fe—B, whereas Ln-Ln separation typically follows the conventional hydrometallurgical separation pathway used in primary Ln production. While sulfation has been attempted for Fe/Ln separation with minimal success, to our knowledge sulfidation chemistry has not been previously employed for (Nd,Pr,Dy)—Fe—B magnet recycling.

Following (Nd,Pr,Dy)—Fe—B demagnetization, comminution, Ni coating removal, and calcination, (Nd,Pr,Dy)—Fe—B magnet oxide was selectively sulfidized in an alumina flow-through packed-bed reactor at 1200° C., which separated into iron-rich and rare earth-rich phases with (Nd,Pr,B)$_2$O$_3$ inclusions approximately 20-100 μm in size precipitated from Fe-rich phases, large enough to support comminution and physical separation of oxide and sulfide phases. As for Sc$_2$O$_3$—Fe$_3$O$_4$ selective sulfidation, Ln$_2$O$_2$S formation was thermodynamically predicted to accompany Fe$_3$O$_4$ sulfidation, yet was kinetically suppressed due to insufficient thermal activation. A combined Ln metal purity in the oxide phase of 90.8% was achieved. Surprisingly, Dy was enriched in the sulfide phase by a factor of 10 compared to the oxide phase, even without the carbothermically driven sulfur reflux (CDSR) required for sulfidation of pure Ln$_2$O$_3$. The corresponding distribution ratio of Dy and Nd between oxide and sulfide phases, referred to as the separation factor in hydrometallurgy, was observed to be 306, a 100× improvement to Ln-Ln separation over conventional hydrometallurgical processing. As in the sulfidation of pure, mixed Nd,Pr,Dy oxides, Dy$_2$O$_3$ exhibits similar sulfidation thermodynamics and kinetics to Nd$_2$O3 and Pr$_6$O$_{11}$. The unexpected, highly-effective selective sulfidation of Dy verses Nd/Pr of (Nd,Pr,Dy)—Fe—B magnet oxide is therefore attributed to unknown solution thermodynamics of Ln-B—O—S systems, noting the role of B in accentuating Ln thermodynamic differences for other, sulfur-free Ln-Ln separations via borate crystallization. Herein selective sulfidation for (Nd,Pr,Dy)—Fe—B magnet recycling, in addition to being a promising avenue for stabilizing and diversifying Ln supply, demonstrates the power of an integrated view of solution thermodynamics and reaction kinetics for design of effective selective sulfidation separation systems.

IV—Rare Earth Element Primary Extraction and Separation

For selective sulfidation of rare earth (Ln) oxides and oxysulfides with high $[P_{S2}/P_{SO2}]_{crit}$, $P_{S2}/P_{SO2}$ can be controlled through carbothermically driven sulfur reflux (CDSR), as demonstrated above for pure oxides and here for synthetic rare earth minerals. The most commercially-relevant primary sources of Ln, in addition to ionic clays, are not oxides however, but fluorocarbonate (bastnaesite, LnCO$_3$F) and phosphate (monazite/xenotime, LnPO$_4$) minerals, which classically require unsustainable acid or alkali roasting to decompose mixed-element and polyatomic anions, manage normally-occurring radioactive materials (NORMs) such as thorium, and form soluble compounds, prior to solvent extraction for Ln separation. More sustainable defluorination, dephosphorization, and dethoriation technologies previously less apt for liquid-liquid hydrometallurgy can form Ln$_2$O$_3$ or Ln$_2$O$_2$S feed suitable for selective sulfidation.

Upon heating, LnCO$_3$F decomposes to LnOF and CO$_2$, with sulfidation of LnOF presently untenable for defluorination due to the formation of LnFS. However, defluorination of LnCO$_3$F is readily conducted via roasting with Na$_2$CO$_3$, forming Ln$_2$O$_3$, CO$_2$, and water-soluble NaF that is easily removable via washing. We observed dephosphorylation of LnPO$_4$ via sulfidation to be kinetically-limited, yet proceeded with the addition of CaCO$_3$ to form Ln$_2$O$_2$S, SO2, and Ca$_3$(PO$_4$)$_2$, with Ca$_3$(PO$_4$)$_2$ readily separated from Ln compounds via physical separation. It has been demonstrated that during monazite sulfidation in the presence of Na$_2$CO$_3$, thorium partitions to a separate oxide phase from Ln$_2$O$_2$S, consistent with our sulfidation series (see FIG. 1B), supporting dethioration of Ln$_2$O$_3$ and LnPO$_4$ via sulfidation and physical separation. We also observed that sulfidation followed by calcination of finely-liberated (−45+25 μm particle size) synthetic, defluorinated, dethoriated, bastnaesite results in sintered Ln$_2$O$_3$ particle sizes of up to 200 μm or more.

Following defluoronation, dethoriation, and sulfidative-sintering, CDSR was leveraged for Ln separation via selective sulfidation of synthetic defluorinated, dethoriated, sulfidatively-sintered light rare earth element bastnaesite (Ln$_2$O$_3$) mixed (i.e., sulfidized) with carbon in an alumina flow-through packed-bed reactor at 1400° C. at a mass feed ratio of Ln$_2$O$_3$/C=0.1 (Ln=La, Ce, Pr, Nd), which separates into neodymium-rich and lanthanum-rich phases that support physical separation. Nd-rich Ln$_2$O$_2$S, La-rich Ln$_{10}$OS$_{14}$, and Ln$_2$S$_3$ product phases were observed through EPMA/WDS, demonstrating that selective enrichment of individual Ln from rare earth minerals is feasible via selective sulfidation. Phase separation within sulfidized Ln$_2$O$_3$ particles was determined to contain sulfur-rich and oxygen-rich regions. Ln$_2$O$_2$S and Ln$_{10}$OS$_{14}$ phases were on the order of 20-100 μm in size, large enough for liberation and physical separation, with Ln$_2$S$_3$ phases typically 10-20 μm in size and less-prevalent. EPMA/WDS elemental analysis revealed that sulfidation was selective, with Nd enriched in the oxygen-rich Ln$_2$O$_2$S phase and La enriched in the sulfur-rich Ln$_{10}$OS$_{14}$ phase. A tradeoff exists between sulfidation selectivity, maximized at shorter solid residence times, and growth/coarsening of large phases that support liberation and physical separation, maximized at longer solid residence times. Optimization of sulfidation kinetics for Ln separation is presently hindered by unknown Ln$_2$O$_2$S/Ln$_{10}$OS$_{14}$/Ln$_2$S$_3$ reaction, nucleation, and growth phenomena, in addition to uncharted Ln$_2$O$_2$S/Ln$_{10}$OS$_{14}$ solution thermodynamics. Other opportunities for selectivity exist in the addition of components that accentuate differences in Ln solution behavior, such as observed for boron in Ln separations from (Nd,Pr,Dy)—Fe—B magnets. With continued optimization and understanding of oxysulfide behavior, CDSR is a powerful tool for tuning sulfidation selectivity in systems with high $[P_{S2}/P_{SO2}]_{crit}$, such as for Ln separation.

V—Scandium—Iron Separation

Sulfidation reaction kinetics themselves are a powerful lever to control sulfidation selectivity in absence of carbon. Our results indicate that the sulfidation of rare earth oxides is thermodynamically spontaneous above $[P_{S2}/P_{SO2}]_{crit}$, but is kinetically limited to unpractical rates at sulfidation temperatures lower than approximately 50% the oxide melting point. We propose the use of differences in thermal activation to control the sulfidation of oxides with very different melting temperatures. We demonstrate the selective sulfidation of iron from a mixed iron-scandium oxide (Fe$_2$O$_3$—Sc$_2$O$_3$), a classical metallurgical separation challenge in itself, but also a case study for transition metal and naturally occurring radioactive material (NORM) impurity removal from rare earth metal compounds. Sc$_2$O3 sulfidizes via a stable Sc$_2$O$_2$S intermediate, the formation of Sc$_2$O$_2$S being thermodynamically spontaneous at a $[P_{S2}/P_{SO2}]_{crit}$ of $10^{-11}$ at 1000° C., while Fe$_2$O$_3$ sulfidizes to FeS at a $[P_{S2}/P_{SO2}]_{crit}$ of $10^{-1.4}$ (see FIG. 1B). Therefore, Sc$_2$O$_2$S formation is thermodynamically predicted to accompany FeS formation upon selective sulfidation of iron-scandium oxide. The drastically different melting temperatures of Fe$_2$O$_3$ (1597° C.) and Sc$_2$O$_3$ (2470° C.) however suggest that only the sulfidation of iron oxide will progress, with Sc$_2$O$_3$ sulfidation being kinetically limited at 1000° C. We performed sulfidation of an equimolar mixture of Sc$_2$O$_3$ and Fe$_2$O3 at 800° C., 1000° C., and 1350° C. in the absence of carbon. An equimolar feed was chosen to better explore the effects of co-sulfidation as scandium content is enriched during processing. At both 800° C. and 1000° C., FeS was formed, yet no $Sc_2O_2S$ was observed in QXRD (i.e., formation of oxysulfide was observed to be kinetically suppressed at these temperatures due to insufficient thermal activation), with all of the scandium remaining as oxide. We demonstrate the utility of such sulfidation with crude reverse flotation, isolating scandium at a metal purity of 90.4% from FeS—$Sc_2O_3$. The following table summarizes the sulfidation products of equimolar mixed iron and scandium oxides:

| Sulfidation Conditions | FeS | $Sc_2O_2S$ | $Sc_2O_3$ | Amorphous |
|---|---|---|---|---|
| 800° C. (QXRD mass %) | 29% | — | 38% | 33% |
| 1000° C. (QXRD mass %) | 28% | — | 30% | 42% |

At 1350° C., $Sc_2O_2S$ was observed to form in addition to iron sulfide as measured by IR product gas analysis (i.e., at this temperature, a mass balance over oxygen liberation reveals scandium oxide has sulfidized to form oxysulfide), consistent with our hypothesis regarding the thermal activation of sulfidation kinetics. Chemical kinetics provide a powerful means of controlling sulfidation selectivity, facilitating green methods of materials physical processing where environmentally degrading and toxic chemical methods were previously required.

VI—Mixed Rare Earth Metal Separation

While $Sc_2O_3$ can be sulfidized in the absence of carbon to form $Sc_2O_2S$ with sufficient thermal activation, the formation of $Sc_2S_3$ requires $P_{S2}/P_{SO2}$ on the order of $10^{13}$. Practically, even with sufficient thermal activation, oxides exhibiting high $[P_{S2}/P_{SO2}]_{crit}$ such as rare earths do not sulfidize at an appreciable rate due to $SO_2$ accumulation within the reactor. Most industrial packed and fluidized bed reactors exhibit fluid space times longer than $10^{-3}$ seconds, suggesting a practical upper bound for $SO_2$ removal via gas flowrate. To reach higher $[P_{S2}/P_{SO2}]_{crit}$, a carbothermically-driven sulfur reflux is required to purge $SO_2$. We modelled the role of solid carbon for carbothermically-driven sulfur reflux on the $P_{S2}/P_{SO2}$ ratio in a fixed reactor bed ($[P_{S2}/P_{SO2}]_{reactor}$) under the assumption of steady-state reactor conditions and a well-mixed gas phase with C—S—O reactions existing at quasi-equilibrium. Practical rates of gas flow through the reactor in the presence of carbon can be defined in order for $[P_{S2}/P_{SO2}]_{reactor}$ to exceed the $[P_{S2}/P_{SO2}]_{crit}$. Normalizing volumetric gas flowrates by reactor free volume, critical gaseous space times ($\tau^{max}_{space}$) and space velocities ($v^{min}_{space}$) are computed for sulfidation to occur. They are explicit functions of the reaction temperature, $P_{S2}$ in the gas feed, carbon to oxide feed ratio, $(P_{S2}/P_{SO2})_{crit}$, sulfidation kinetics, and reactor bed mass transfer parameters including porosity, tortuosity, feed surface area. Phenomenological variations of diffusion coefficients and sintering effects are also included.

We applied the model to the selective sulfidation of neodymium from an equimolar mixed rare earth oxide of neodymium, praseodymium, and dysprosium. An equimolar feed, while not stoichiometrically representative of primary or secondary production, is selected to demonstrate the effects of co-sulfidation at a scale that is compatible with analytical limitations from relatively small-scale operations.

We modeled the space times and space velocities for sulfidation of neodymium, praseodymium, and dysprosium oxides ($Ln_2O_3$) to their respective sulfides. For each sulfidation reaction, three regimes in space time and velocity are found depending on the $C/Ln_2O_3$ feed ratio. For low carbon contents, carbothermically-driven sulfur refluxing of $SO_2$ is insufficient to reach the critical $S_2/S_{O2}$ ratio for rare earth oxide sulfidation, and $SO_2$ removal from the reactor must be accomplished via an impractically-short gas residence time in the reactor. As the carbon content increases, significant carbothermic refluxing of $SO_2$ occurs, and the reactor enters a transition regime where longer gas residence times are possible, with the maximum space time and minimum space velocity for sulfidation highly dependent on the carbon content. For higher carbon content, a third regime is reached where sulfidation occurs with longer residence times, essentially independent of further carbon addition. The $C/Ln_2O_3$ boundaries for each regime suggest that neodymium can be isolated from the mixed rare-earth using selective sulfidation aided by a carbothermically-driven sulfur reflux of $SO_2$. Experiment results of the selective sulfidation of mixed neodymium, dysprosium, and praseodymium oxide showed that the distribution of the elements between oxide, oxysulfide, sulfide, and amorphous phases in the sulfidized product shifts with the carbon content of the starting feed, in agreement with the model findings. At a molar $C/Ln_2O_3$ feed ratio of 3, neodymium alone forms a sulfide at a recovery of 76%, with Dy and Pr below the detectable limit of QXRD (0.5 wt %) in the sulfide.

As demonstrated, through the selective formation of metal sulfide compounds out of both amorphous and crystalline mixed metal oxide phases, selective sulfidation is a materials-agnostic separation technology capable of handling complex feed streams. The solubility of rare earth oxides, oxysulfides, and sulfides within one another remain largely unknown, yet will be of interest to inform the expected purity of sulfidized products and support the design of a subsequent physical separation step.

VII—Nickel, Cobalt, and Lithium Recycling from Lithium-Ion Batteries

Figure 1B:
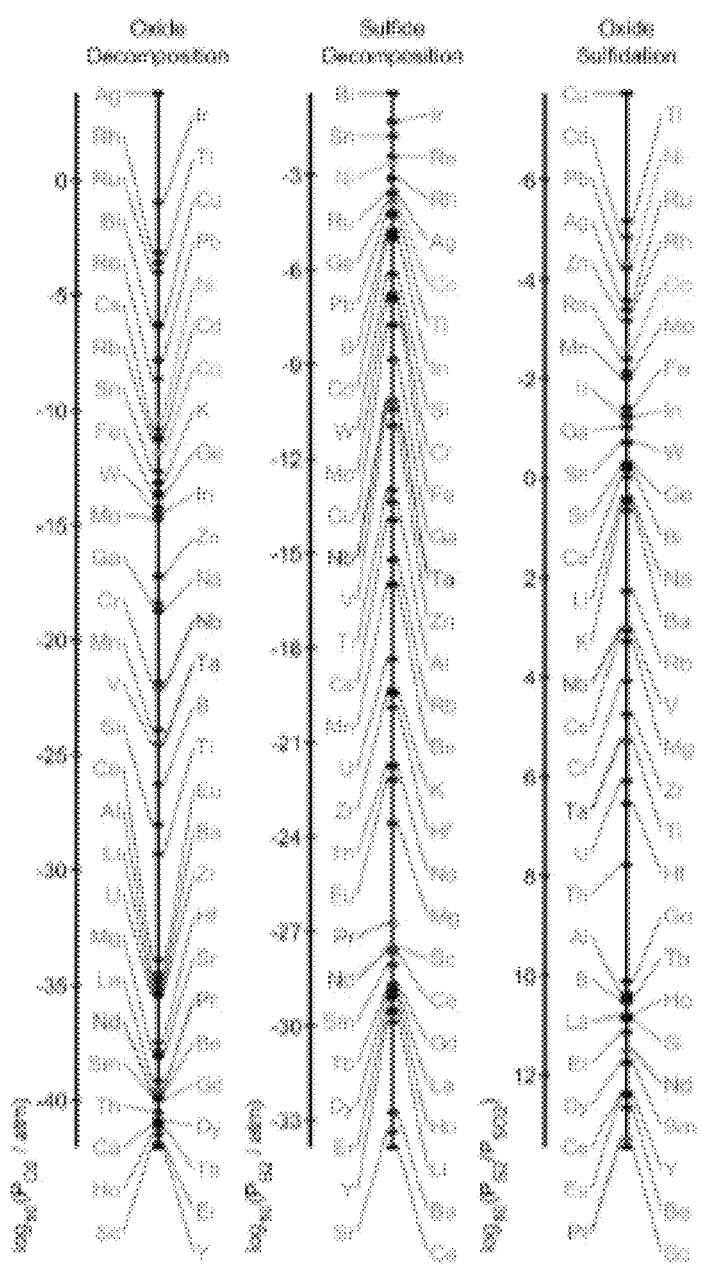
FIG. 1B shows metal rankings according to their oxide decomposition partial pressure ($P_{O2}$), sulfide decomposition ($P_{S2}$), and critical $P_{S2}/P_{SO2}$ (i.e., $[P_{S2}/P_{SO2}]$crit) for sulfidation, with respective differences larger than that for $[P_{O2}]$crit and $[P_{S2}]$crit.

While carbothermically driven sulfur reflux (CDSR) is useful for controlling sulfidation selectivity at high $[P_{S2}/P_{SO2}]_{crit}$ for Ln and refractory metal oxides, many transition metal oxides support sulfidation without the addition of carbon (See FIG. 1B). Previously reported carbon contamination in transition metal oxide sulfidation from $CS_2$ then comes as no surprise, as the carbon content provided by $CS_2$ far exceeds that necessary for sulfidation in most transition metals. In fact, limited selectivity for many transition metals such as nickel, manganese, and cobalt is thermodynamically expected in the presence of carbon due to co-sulfidation. We therefore demonstrate carbon-free selective sulfidation of nickel-manganese-cobalt oxide (NMC) cathode material for recycling of lithium ion batteries (LIBs) as a case study in selective sulfidation and separation of mixed metals with $[P_{S2}/P_{SO2}]_{crit}$ near unity, generally applicable for transition metal separations. Additionally, we illustrate that selective sulfidation has the potential to mitigate economic, sustainability, and logistical challenges associate with conventional hydrometallurgical, pyrometallurgical, and direct LIB recycling.

Similar to Ln, Co and Li for LIBs have faced periods of supply uncertainty characteristic of biproduct metals, motivating recycling efforts to geographically diversify supply while lowering emissions associated with primary production. While conventional hydrometallurgical, pyrometallurgical, and physical processes for LIB recycling face hurdles associate with convoluted chemistries streams and high costs, selective sulfidation is a robust technology capable of efficiently handling mixed-element feeds. Upon sulfidation of LiNi$_{1/3}$Mn$_{1/3}$Co$_{1/3}$O$_2$ (abbr. NMC111 or NMC333) in an alumina flow-through packed-bed reactor at 1000° C. via control of gas flowrates, the LIB cathode melts and phase separates into three immiscible liquids: nickel-rich sulfide, cobalt-rich sulfide, and manganese oxysulfide phases. Observations showed that the Ni, Co, and Mn-rich phases coalesced to approximately 200 μm in size and revealed distinct Ni-rich sulfide (Ni$_{0.75}$Co$_{0.25}$S), Co-rich sulfide (Ni$_{0.33}$Co$_{0.67}$S), and Mn oxysulfide (MnO$_{0.2}$S$_{0.8}$) phases, with minimal Mn inclusion in Ni—Co phases and vice versa post-sulfidation. The clear macroscopic phase separation of nickel and cobalt from manganese highlights the prospect of selective sulfidation for separation. Meanwhile typical, difficult to separate recycling impurities, such as aluminum, can be calcined as an oxide. When included in the sulfidation charge, with additional SO$_2$ fed into the reactor, aluminum remains as an oxide. The following table shows experimental results for nickel-manganese-cobalt oxide (NMC111/NMC333 including equal parts of Ni, Mn, and Co with a composition of LiNi$_{1/3}$Mn$_{1/3}$Co$_{1/3}$O$_2$) lithium ion battery cathode selective sulfidation with and without aluminum oxide:

| Product (QXRD mass %) | Initial NMC111 | Sulfidized at 1000° C. PS$_2$/PSO$_2$ = 3 × 10$^4$, Nu Al$_2$O$_3$ | Sulfidized at 1000° C. PS$_2$/PSO$_2$ = 3 × 10$^4$, 50 wt % Al$_2$O$_3$ | Sulfidized at 1000° C. PS$_2$/PSO$_2$ = 15, 50 wt % Al$_2$O$_2$ | Sulfidized at 1000° C. PS$_2$/PSO$_2$ = 3, 50 wt % Al$_2$O$_2$ |
|---|---|---|---|---|---|
| Li(Mn,Ni)O$_2$ | 35% | — | — | — | — |
| Li(Mn,Ni,Co)O$_2$ | 2 | — | — | — | — |
| (Ni,Mn)O | — | 3 | — | — | — |
| Al$_2$O$_2$ | — | — | 4% | 2% | 2% |
| (Li,Mn)Al$_2$O$_4$ | — | — | — | — | 10% |
| LiAlO2 | — | — | 11% | 9% | 11% |
| LiAl$_2$O$_3$ | — | — | 28% | 36% | 21% |
| MnS | — | 9% | 11% | 10% | 10% |
| Co$_2$S$_3$ | — | — | 11% | 10% | 9% |
| NiS$_2$ | — | 2% | 2% | 3% | 4% |
| Co$_5$Ni$_2$S$_2$ | — | 7% | — | — | — |
| Li$_2$SO$_4$ | — | 5% | — | — | — |
| Amurphos | 63% | 74% | 33% | 30% | 33% |

Crude flotation of the crushed sulfidized solid showed selective separation of nickel and cobalt from aluminum, lithium, and manganese at 82.8% purity, 52.8% recovery. The distribution of lithium post sulfidation was shown to exist largely as water-soluble sulfate and was leached prior to flotation at 83% recovery from all phases. Meanwhile, magnetic separation of cobalt and nickel from aluminum, manganese, and lithium was demonstrated at 82.1% product purity, 84.8% recovery. Our findings indicate that difficult to separate elements throughout the d and f blocks, previously requiring a series of harsh pyrometallurgical and hydrometallurgical separations, can now be isolated thanks to a single, novel pyrometallurgical step that supports simple physical separation.

VIII—Sulfidation of Barium Sulfate

The effectiveness of the packed-bed reactor design for sulfidation was confirmed with the complete sulfidation of barium sulfate (BaSO$_4$) to barium sulfide (BaS) at 1200° C., at scales up to 80 g of BaS, bringing emerging alkali earth sulfide-dependent technologies such as microelectronics, magneto-optics, SO$_2$ capture, and sustainable electrolytic metallurgical processing closer to fruition.

IX—Additional Innovations

We have discovered additional, novel processing strategies that are useful for the successful application of selective sulfidation to a wider array of materials separation challenges. In particular, we have discovered several pretreatments that facilitate the application of selective sulfidation to a wider variety of system chemistries. While the pretreatments themselves have been previously utilized in other applications, to our knowledge they have never been utilized in preparation for selective sulfidation as we envision in the patent.

For example, to apply selective sulfidation to metal separations from a mixed metal alloy (e.g., with regard to selective sulfidation for rare earth metal separation in rare earth magnets in which the rare earth magnets exist as a mixed metal-boron alloy), we propose calcination as a selective sulfidation pretreatment. While oxidation of materials via calcination is not new in itself, it is a novel, non-obvious pretreatment for selective sulfidation as envisioned herein. Oxidation of metal alloys prior to sulfidation is counterintuitive, as the goal of our processes is to selectively form sulfides, and oxidative roasting is classically used as a treatment to remove sulfur and move away from sulfur chemistry. However, conversion of the metal alloy to oxide allows use of our methods of selective sulfidation control via reaction kinetics and gas residence time. These findings, while demonstrated for rare earth magnet recycling, are broadly relevant for applying our selective sulfidation technology to recycling of metals and general de-alloying.

We also expand the application of selective sulfidation to the processing of additional classes of natural materials, which in general exhibit more convoluted chemistries than the pure oxides we have discussed herein. In particular, we explore necessary pretreatments for minerals containing halogens and phosphorous, two of the most commonly occurring anionic impurities in commercially-relevant ore bodies. Our pretreatment methods are also applicable to selective sulfidation of waste materials containing halogens and phosphorous, such as for battery recycling. To dehalogenate materials for selective sulfidation, calcination in the presence of alkali or alkaline earth oxides, hydroxides, or carbonates can be performed. However, we demonstrate that selective sulfidation can still tolerate up to approximately 50% halide anions in material feeds, as we illustrate that oxyfluorides are still sulfidizable to fluorosulfides.

Meanwhile, to dephosphorize materials for selective sulfidation, sulfidation in the presence of alkali or alkaline earth oxides, hydroxides, or carbonates can be performed. Unlike halides, minimal amounts of phosphate impurities chemically bound to the metal of interest can be tolerated, as we observe sulfidation of phosphate minerals without the presence of alkali or alkaline earth oxides, hydroxides, or carbonates to be impractically slow. Conventionally, halide, oxide, and phosphate minerals of the same metal still require separate processing routes due to differences in halogen and pnictogen chemistry. However, the pretreatments described here create chemically-compatible feeds for selective sulfidation from halide and pnictogen minerals, meaning that with appropriate pretreatments, selective sulfidation can be applied for simultaneous material separation and recovery from mixtures of ores that previously required entirely different processing pathways.

Overall, dehalogenation and dephosphorization, while often applied for processing of materials via other hydrometallurgical and pyrometallurgical methods, is a novel, non-obvious pretreatment for selective sulfidation. Simplifying the anion chemistry by removing halides or phosphates is counterintuitive as a pretreatment for sulfidation, as conventional wisdom would suggest subsequent selective sulfidation, and thereby re-complication of the anion chemistry (removing halides or phosphorous, but adding sulfur), would be a step backwards or sideways from the goal of producing pure metals or pure metal compounds from dehalogenated or dephosphorized feeds. However, our novel use of oxygen-sulfur chemistry is what facilitates previously unrealized material separation opportunities.

In the extraction of minerals for material separation and recovery, feeds must often be ground very finely (<100 μm particle size) for initial beneficiation and mineral concentrate production. These feeds potentially may be too finely ground to support separation of phases downstream of selective sulfidation. Therefore, we also developed a method to sinter/coarsen material feeds for sulfidation. Through sulfidation and subsequent calcination, we observe up to a 10× or more increase in particle size. Therefore, sulfidation and calcination cycling prior to selective sulfidation can be used to facilitate material separation from a wider range of particle sizes. While sintering/coarsening of feed is often used as a pretreatment for pyrometallurgical smelting processes, to our knowledge sulfidation/calcination cycling, which we term "sulfidative sintering," has never been used for the purpose of material sintering/coarsening, let alone as a pretreatment for selective sulfidation.

In summary, we present some additional considerations for expanding the usefulness of selective sulfidation to a broader array of feed chemistries. We include technologies that establish selective sulfidation as suitable for separation of metals from metal alloys, treatment of halide and phosphorous-containing minerals, and very finely-ground feeds. These are critical technologies for establishing selective sulfidation as a game-changing processing method throughout the materials processing world and are vital to protect in the context of use as a pretreatment step for selective sulfidation. Summarized, these findings include:

- Selective sulfidation, where a mixed-metal alloy is made suitable for selective sulfidation via oxidation/calcination of the alloy
- Selective sulfidation, where a halide containing material is made suitable for selective sulfidation via oxidation/calcination of the material of in the presence of alkali or alkaline earth oxides, hydroxides, or carbonates, followed by removal of alkali or alkaline earth halides via physical separation, washing, or leaching
  - Our selective sulfidation process tolerates up to 50% halide anion still present and chemically bound to the target metal(s)
- Selective sulfidation, where a phosphorous or other pnictogen-containing material is made suitable for selective sulfidation via sulfidation of the material of in the presence of alkali or alkaline earth oxides, hydroxides, or carbonates, followed by removal of alkali or alkaline earth phosphates via physical separation, washing, or leaching
  - Phosphate anions may remain in the system, so long as they are not chemically bound to the target metal(s)
- Selective sulfidation, where pretreatments as described above facilitate co-processing of halogen-containing and pnictogen-containing minerals via selective sulfidation
- Selective sulfidation, where sintering/coarsening of the selective sulfidation feed is conducted through sulfidation and subsequent calcination ("sulfidative sintering")

CHAPTER 5—RELEVANT OPERATION PARAMETERS USED IN SELECTIVE SULFIDATION FOR ORE CRACKING, METAL SEPARATION, AND RECYCLING

This chapter describes some types of relevant operation parameters and constraints for our selective sulfidation process, which we understand to be novel, useful, and non-obvious in our application of the technology. We begin with operating parameters that are applicable to all system chemistries, including feed particle size, surface area, moisture content, and chemical makeup, reactor gas constraints, carbon usage, and product oxide and sulfide solubilities and element separation factors. We then describe operating parameters that are relevant to all chemistries, yet have values that are dependent on individual chemistries, including operation temperature, reactor gas ratios, and feed-stock porosity change upon sulfidation or desulfidation.

Feed-Stock Particle Size and Surface Area

In various exemplary embodiments, we propose an average feed-stock particle size (in the event of packed particles) ranging from about 2 μm to about 2 mm or average grain size (in the event of sintered pellets) ranging from about 2 μm to about 2 mm. In various exemplary embodiments, we propose an average feed-stock particle surface area ranging from about 0.01 $m^2/g$ to about 100 $m^2/g$ as measured with BET, a common technique for someone familiar with the relevant art.

Feed-Stock Moisture and Hydrate Content

In various exemplary embodiments, we propose a feedstock moisture content, defined as the mass ratio of volatile components to dried feedstock, between about 0% and about 30%. In various exemplary embodiments, we propose a feed hydrate content, defined as mass of water held in the crystal structure of the feed to the mass of dehydrated feed, between about 0% and about 50%.

Feed-Stock Gangue, Oxide, Sulfide, Oxysulfide, Carbonate, and Sulfate Content

In various exemplary embodiments, we propose a feed gangue content, including but not limited to compounds containing one or more of aluminum, silicon, calcium, magnesium, iron, and/or chromium, between about 1% and about 99% by mass. In various exemplary embodiments, we propose a feed carbonate content between about 1% and about 90% by mass. In various exemplary embodiments, we propose a feed oxide content between about 1% and about 99% by mass. In various exemplary embodiments, we propose a feed sulfide content between about 1% and about 99% by mass. In various exemplary embodiments, we propose a feed sulfate content between about 1% and about 80% by mass. In various exemplary embodiments, we propose a feed oxysulfide content between about 1% and about 99% by mass.

Reactor Gas Constraints

In various exemplary embodiments, we propose an average number of sulfur atoms per sulfur molecule of 3 or less within the reactor near where sulfidation occurs. In various exemplary embodiments, we propose a ratio of carrier gas to sulfur-containing gas between about 0.1 and about 1000. In various exemplary embodiments, we propose an inlet gas consumption, defined as the mole fraction of inlet gas (including carrier gas) that undergoes chemical reaction during a single pass through solids within the reactor, between about 0.001% and about 50%.

Solid Carbon Conversion to $CO/CO_2$

In various exemplary embodiments, we propose a conversion of solid carbon (including but not limited to graphite, coal, coke, carbon black, and/or activated carbon) to carbon monoxide or dioxide within the reactor between about 10% and about 80%.

Sulfur/Sulfide and Oxygen/Oxide Solubility within Selective Sulfidation/Desulfidation Product In various exemplary embodiments, we propose a solubility of sulfur or sulfur compounds in selectively sulfidized/desulfidized products between about 0% and about 20% by mass, defined as the mass percentage of sulfur or sulfide compounds dissolved into a different compound. In various exemplary embodiments, we propose a solubility of oxygen or oxide compounds in selectively sulfidized/desulfidized products between about 0% and about 20% by mass, defined as the mass percentage of oxygen or oxide compounds dissolved into a different compound. In various exemplary embodiments, we propose a solubility of oxysulfide compounds in selectively sulfidized/desulfidized products between about 0% and about 20% by mass, defined as the mass percentage of oxysulfide compound dissolved into a different compound.

Separation Factor in Sulfidation or Desulfidation Products

In various exemplary embodiments, we propose separation factors upon selective sulfidation or desulfidation on the order of about 10 to about 1000. We define separation factor as the ratio of the fraction of one or more elements in one product phase including but not limited to crystalline or amorphous oxides, carbonates, sulfides, sulfates, and/or oxysulfides to the fraction of the same element(s) in a different product phase including but not limited to crystalline or amorphous oxides, carbonates, sulfides, sulfates, and/or oxysulfides.

Operating Conditions for Individual Elements

These operating parameters are relevant for all chemistries, yet the range of values are dependent on individual chemistries. Herein, we include operation temperature within the reactor, gas ratios within the reactor, and porosity change upon sulfidation or desulfidation.

| | Reactor Temperature | |
|---|---|---|
| | Sulfidation/Desulfidation Temperature | |
| Metal | Lower Bound, ° C. | Upper Bound, ° C. |
| Li | 790 | 1458 |
| B | 790 | 598 |
| Na | 790 | 1126 |
| Mg | 1240 | 2480 |
| Al | 931 | 1862 |
| Si | 800 | 1599 |
| K | 790 | 735 |
| Ca | 1154 | 2309 |
| Sc | 1097 | 2194 |
| Ti | 857 | 1714 |
| V | 825 | 1650 |
| Cr | 1041 | 2082 |
| Mn | 846 | 1693 |
| Fe | 790 | 1441 |
| Co | 880 | 1761 |
| Ni | 892 | 1785 |
| Cu | 790 | 1201 |
| Zn | 899 | 1798 |
| Ga | 797 | 1594 |
| Ge | 790 | 1111 |
| As | 790 | 806 |
| Rb | 790 | 626 |
| Sr | 1148 | 2296 |
| Y | 1089 | 2178 |
| Zr | 1193 | 2386 |
| Nb | 790 | 1428 |
| Mo | 1029 | 2058 |
| In | 874 | 1748 |
| Sn | 909 | 1818 |
| Sb | 790 | 738 |
| Ba | 914 | 1829 |
| La | 1034 | 2069 |
| Ce | 973 | 1946 |
| Pr | 1011 | 2022 |
| Nd | 1018 | 2036 |
| Sm | 1024 | 2049 |
| Eu | 897 | 1794 |
| Gd | 1041 | 2082 |
| Tb | 1069 | 2138 |
| Dy | 1037 | 2074 |
| Ho | 1069 | 2138 |
| Er | 1061 | 2122 |
| Yb | 1095 | 2190 |
| Lu | 1098 | 2196 |
| Hf | 1212 | 2425 |
| Ta | 858 | 1716 |
| W | 790 | 1398 |
| Hg | 790 | 578 |
| Tl | 790 | 822 |
| Pb | 790 | 928 |
| Bi | 790 | 886 |
| Th | 1465 | 2930 |
| Ur | 1260 | 2519 |

| | Porosity Change, Solid Reactants and Products | |
|---|---|---|
| | Porosity Change Upon Sulfidation, solid-solid | |
| Metal | Lower Bound | Upper Bound |
| Li | −2% | −27% |
| B | −2% | −22% |
| Na | −2% | −23% |
| Mg | −3% | −34% |
| Al | −3% | −41% |
| Si | −3% | −35% |
| K | −2% | −18% |
| Ca | −2% | −26% |
| Sc | −2% | −29% |
| Ti | −2% | −25% |
| V | −2% | −24% |

Porosity Change, Solid Reactants and Products

Porosity Change Upon Sulfidation, solid-solid

| Metal | Lower Bound | Upper Bound |
|---|---|---|
| Cr | −3% | −35% |
| Mn | −2% | −26% |
| Fe | −2% | −30% |
| Co | −3% | −36% |
| Ni | −4% | −42% |
| Cu | −2% | −26% |
| Zn | −2% | −28% |
| Ga | −3% | −35% |
| Ge | −2% | −30% |
| As | −3% | −41% |
| Rb | −4% | −43% |
| Sr | −2% | −27% |
| Y | −3% | −33% |
| Zr | −3% | −42% |
| Nb | −1% | −16% |
| Mo | −2% | −23% |
| In | −3% | −38% |
| Sn | −4% | −48% |
| Sb | −2% | −27% |
| Ba | −2% | −22% |
| La | −2% | −26% |
| Ce | −2% | −27% |
| Pr | −2% | −26% |
| Nd | −2% | −28% |
| Sm | −3% | −31% |
| Eu | −2% | −21% |
| Gd | −2% | −30% |
| Tb | −3% | −31% |
| Dy | −2% | −30% |
| Ho | −3% | −32% |
| Er | −3% | −32% |
| Yb | −3% | −31% |
| Lu | −3% | −33% |
| Hf | −3% | −42% |
| Ta | −1% | −16% |
| W | −2% | −19% |
| Hg | −1% | −16% |
| Tl | −4% | −49% |
| Pb | −2% | −20% |
| Bi | −2% | −25% |
| Th | −3% | −40% |
| Ur | −3% | −36% |

Porosity Change, Solid Reactants and Liquid Products

Porosity Change Upon Sulfidation, solid-liquid

| Metal | Lower Bound | Upper Bound |
|---|---|---|
| Li | −22% | −89% |
| B | −18% | −72% |
| Na | −20% | −78% |
| Mg | −28% | −114% |
| Al | −34% | −136% |
| Si | −29% | −117% |
| K | −15% | −60% |
| Ca | −22% | −88% |
| Sc | −24% | −96% |
| Ti | −21% | −84% |
| V | −20% | −82% |
| Cr | −29% | −115% |
| Mn | −22% | −88% |
| Fe | −25% | −99% |
| Co | −30% | −121% |
| Ni | −35% | −140% |
| Cu | −21% | −86% |
| Zn | −23% | −93% |
| Ga | −29% | −117% |
| Ge | −25% | −100% |
| As | −35% | −138% |
| Rb | −36% | −145% |
| Sr | −22% | −89% |
| Y | −27% | −109% |
| Zr | −35% | −139% |
| Nb | −13% | −52% |
| Mo | −19% | −78% |
| In | −32% | −128% |
| Sn | −40% | −160% |
| Sb | −22% | −90% |
| Ba | −18% | −73% |
| La | −22% | −87% |
| Ce | −22% | −90% |
| Pr | −22% | −88% |
| Nd | −23% | −93% |
| Sm | −26% | −103% |
| Eu | −17% | −70% |
| Gd | −25% | −99% |
| Tb | −26% | −103% |
| Dy | −25% | −100% |
| Ho | −27% | −106% |
| Er | −26% | −106% |
| Yb | −26% | −105% |
| Lu | −27% | −110% |
| Hf | −35% | −139% |
| Ta | −13% | −52% |
| W | −16% | −64% |
| Hg | −13% | −53% |
| Tl | −41% | −165% |
| Pb | −17% | −67% |
| Bi | −21% | −85% |
| Th | −34% | −135% |
| Ur | −30% | −119% |

Gas Ratios

| Metal | Minimum $\log_{10}(P_{S2}/P_{SO2})$ for Sulfidation | Maximum $\log_{10}(P_{S2}/P_{SO2})$ for Desulfidation |
|---|---|---|
| Li | 0 | 2 |
| B | | |
| Na | | |
| Mg | | 2 |
| Al | 8 | 12 |
| Si | 9 | 13 |
| K | | |
| Ca | −3 | −1 |
| Sc | 10 | 14 |
| Ti | 4 | 7 |
| V | 2 | 4 |
| Cr | 2 | 5 |
| Mn | −3 | −1 |
| Fe | −2 | 0 |
| Co | −4 | 0 |
| Ni | −6 | −2 |
| Cu | | |
| Zn | −5 | −1 |
| Ga | −2 | 0 |
| Ge | | |
| As | | |
| Rb | | |
| Sr | −3 | 0 |
| Y | 10 | 13 |
| Zr | 3 | 5 |
| Nb | 2 | 4 |
| Mo | −3 | 0 |
| In | −2 | 0 |
| Sn | −2 | 2 |
| Sb | | |
| Ba | −2 | 0 |

| Metal | Gas Ratios Minimum $\log_{10}(P_{S2}/P_{SO2})$ for Sulfidation | Gas Ratios Maximum $\log_{10}(P_{S2}/P_{SO2})$ for Desulfidation |
|---|---|---|
| La | 9 | 12 |
| Ce | 10 | 13 |
| Pr | 11 | 15 |
| Nd | 10 | 13 |
| Sm | 10 | 13 |
| Eu | 10 | 13 |
| Gd | 8 | 12 |
| Tb | 9 | 12 |
| Dy | 8 | 12 |
| Ho | 9 | 12 |
| Er | 10 | 12 |
| Yb | | |
| Lu | | |
| Hf | 5 | 7 |
| Ta | 4 | 7 |
| W | −2 | 0 |
| Hg | | |
| Tl | | |
| Pb | | |
| Bi | | |
| Th | 5 | 8 |
| Ur | 4 | 6 |
| Li | −3 | 3 |
| B | | |
| Na | | |
| Mg | 1 | 6 |
| Al | 3 | 8 |
| Si | 3 | 5 |
| K | | |
| Ca | −1 | 2 |
| Sc | 5 | 11 |
| Ti | 1 | 4 |
| V | 0 | 3 |
| Cr | 1 | 3 |
| Mn | −4 | 4 |
| Fe | −2 | 1 |
| Co | −4 | 0 |
| Ni | −4 | −1 |
| Cu | | |
| Zn | −2 | 0 |
| Ga | −3 | 2 |
| Ge | | |
| As | | |
| Rb | | |
| Sr | −1 | 1 |
| Y | 5 | 9 |
| Zr | 1 | 5 |
| Nb | 0 | 2 |
| Mo | −1 | 1 |
| In | −2 | 1 |
| Sn | −1 | 0 |
| Sb | | |
| Ba | −1 | 1 |
| La | 4 | 10 |
| Ce | 5 | 11 |
| Pr | 5 | 11 |
| Nd | 5 | 10 |
| Sm | 5 | 9 |
| Eu | 5 | 8 |
| Gd | 4 | 9 |
| Tb | 4 | 9 |
| Dy | 4 | 9 |
| Ho | 5 | 8 |
| Er | 4 | 10 |
| Yb | | |
| Lu | | |
| Hf | 2 | 6 |
| Ta | 1 | 3 |
| W | −1 | 0 |
| Hg | | |
| Tl | | |
| Pb | | |
| Bi | | |
| Th | 2 | 7 |
| Ur | 2 | 5 |

CHAPTER 6—CHEMICAL SYSTEMS OF PARTICULAR INTEREST FOR SELECTIVE SULFIDATION/DESULFIDATION

This chapter describes some exemplary chemical systems of particular interest for selective sulfidation/desulfidation, including rare earth compounds, NORM compounds, nickel-cobalt compounds, carbide formers, and precious and semi-precious chalcogenides. Of course, embodiments of the present invention can apply similarly to other chemical systems that are not expressly disclosed herein, as it would be virtually impossible to list all types of feedstock and all possible chemistries to which embodiments of the present invention might apply. Reactors and processes disclosed herein may be applied more generally to other chemistries for the purposes of sulfidation or desulfidation. While this chapter presents definitions for the terms "sulfidation," "desulfidation," and "selective" that apply to the exemplary embodiments disclosed in this chapter, and these definitions may apply more generally to other exemplary embodiments disclosed in this patent application, it should be noted that these definitions do not necessarily apply to all possible embodiments of the invention. For example, in some cases, sulfidation may involve production of a sulfate or other sulfur compound, and desulfidation may involve conversion of a sulfate or other sulfur compound.

For the purposes of this chapter, "sulfidation" refers to the production of an oxysulfide or sulfide from an oxide, oxysulfide, carbonate, sulfate, or sulfide, whereas "desulfidation" refers to the production of an oxide, oxysulfide, carbonate, sulfate or sulfide from a sulfide or oxysulfide. "Selective" refers to the principle that from a feed containing multiple metal compounds, one or more metal compounds can be preferentially sulfidized or desulfidized from the others.

For groupings presented in this chapter, operating conditions span the range in which compounds within the grouping can be selectively sulfidized or desulfidized from one another. Performing sulfidation or desulfidation in conditions outside of the ranges reported below will cause the entire group to sulfidize or desulfidize, a result that is still useful in a variety of applications.

Rare Earth Compounds

For the purposes of selective sulfidation or desulfidation, rare earth compounds include those of the lanthanide group, scandium, and yttrium in both primary production and recycling feed streams. For selective sulfidation or desulfidation of rare earth compounds to rare earth sulfides, reaction temperatures between about 1000° C. and about 1600° C., $\log_{10}(P_{S2}/P_{SO2})$ values between about 9 and about 14, and $\log_{10}(P_{CO}/P_{CO2})$ values between about 4 and about 11 are used in our process. For selective sulfidation or desulfidation of rare earth compounds to rare earth oxysulfides, reaction temperatures between about 1000° C. and about 1600° C. and $\log_{10}(P_{S2}/P_{SO2})$ values between about −16 and −8 are used in our process.

NORM Compounds

For the purposes of selective sulfidation or desulfidation, normally occurring radioactive material (NORM) compounds constitute compounds of uranium and thorium in primary production feed streams. For selective sulfidation of NORM compounds to NORM sulfides, reaction temperatures between about 1000° C. and about 1600° C., $\log_{10}(P_{S2}/P_{SO2})$ values between about 5 and about 10, and $\log_{10}(P_{CO}/P_{CO2})$ values between about 2 and about 7 are used in our process. For selective sulfidation of NORM compounds in the presence of rare earth compounds, reaction temperatures between about 1000° C. and about 1600° C., $\log_{10}(P_{S2}/P_{SO2})$ values between about 5 and about 9, and $\log_{10}(P_{CO}/P_{CO2})$ values between about 2 and about 4 are used in our process.

Nickel-Cobalt Compounds

For the purpose of selective sulfidation or desulfidation, nickel and cobalt compounds include both primary production feed streams such as laterite and recycling streams such as lithium ion batteries. For selective sulfidation or desulfidation of nickel and cobalt compounds, reaction temperatures between about 800° C. and about 1400° C., $\log_{10}(P_{S2}/P_{SO2})$ values between about −6 and about 0, and $\log_{10}(P_{CO}/P_{CO2})$ values between about −4 and about 0 are used in our process.

Carbide Formers

For the purpose of selective sulfidation or desulfidation, carbide formers include tungsten, molybdenum, chromium, vanadium, titanium, niobium, tantalum, zirconium, and hafnium in both primary production and recycling feed streams. For selective sulfidation of iron from the above-mentioned carbide formers, reaction temperatures between about 800° C. and about 1400° C., $\log_{10}(P_{S2}/P_{SO2})$ values between about −2 and about 0, and $\log_{10}(P_{CO}/P_{CO2})$ values between about −2 and about 1 are used in our process. For selective sulfidation or desulfidation of the above-mentioned carbide formers excluding tungsten and molybdenum, reaction temperatures between about 800° C. and about 1600° C., $\log_{10}(P_{S2}/P_{SO2})$ values between about 2 and about 7, and $\log_{10}(P_{CO}/P_{CO2})$ values between about 0 and about 6 are used in our process.

Precious and Semi-Precious Chalcogenides

For the purpose of selective sulfidation or desulfidation, precious and semi-precious chalcogenides are defined as natural ores, minerals, and concentrates that contain copper, gold, silver, platinum, rhodium, palladium, iridium, ruthenium, osmium, and/or rhenium sulfides. For the selective sulfidation or desulfidation of precious and semi-precious chalcogenides, reaction temperatures between about 800° C. and about 1200° C. and $\log_{10}(P_{S2}/P_{SO2})$ values between about −6 and 0 are used in our process.

The following table lists approximate composition ranges for precious and semi-precious chalcogenides:

| Metal | Approximate lower bound $\log10(P_{S2}/P_{SO2})$ for sulfidation/desulfidation | Approximate upper bound $\log10(P_{S2}/P_{SO2})$ for sulfidation/desulfidation |
|---|---|---|
| Cu | −12 | −2 |
| Ag | −6 | 0 |
| Au | −10 | 0 |
| Pd | −5 | 1 |
| Pt | −5 | 0 |
| Rh | −8 | 0 |
| Ir | −4 | 1 |
| Ru | −6 | 0 |
| Os | −4 | 2 |
| Re | −6 | 0 |

CHAPTER 7—SOME ALTERNATIVE PROCESSES

In many cases, exemplary embodiments enable commercially-viable processes that otherwise would be impossible or prohibitive. It should be noted that viability of a commercial process is generally based at least in part on the rate at which the feedstock material can be processed. Certain exemplary embodiments allow for continuous feedstock processing, thereby making the process more economically feasible in many cases. For example, using a packed bed reactor similar to the one shown in FIG. 4A and FIG. 4B, an inlet can be included to add sulfur to the stainless steel crucible (i.e., a sulfur reservoir) as needed, while feedstock can be made to flow through the graphite crucible (i.e., a reactor core), e.g., adding new feedstock at an inlet and removing processed feedstock at an outlet while controlling the process parameters as appropriate for the target feedstock material being converted. Similar continuous processes can be realized using other types of reactors.

It should be noted that, in some cases, processed feedstock generated by one reactor (e.g., after extracting or separating the converted material such as by flotation, magnetic separation, gravity separation/enrichment, distillation, leaching, direct conversion to metal, or other appropriate technique which may be different for different materials or phases) can be re-processed using different process parameters to target a different feedstock material.

In some cases, selective sulfidation can be used as a pre-treatment for electrolytic processes, for example, to produce sulfides such as for use in a molten sulfide electrolysis process, for example, as described in U.S. patent application Ser. No. 16/302,684 filed Nov. 19, 2018 corresponding to U.S. Patent Application Publication No. US 2019/0127221 published May 2, 2019 and in U.S. patent application Ser. No. 16/726,137 filed Dec. 23, 2019 corresponding to U.S. Patent Application Publication No. US 2020/0247670 published Aug. 6, 2020 (with is a continuation of U.S. patent application Ser. No. 16/302,684), each of which is hereby incorporated herein by reference in its entirety. Here, we propose selective sulfidation for chalcopyrite ore/concentrate upgrading. Generally speaking, prior to molten sulfide electrolysis to produce iron and copper, the chalcopyrite ore/concentrate would be melted. Any oxides (slag) then physically separate from the valuable sulfide, with the sulfide being the electrolysis precursor. This "slagging" can result in the loss of any iron or copper existing as an oxide or sulfate to the slag phase. Any oxide that does enter a molten sulfide electrolysis reactor can result in poisoning of the sulfide electrolyte or undesirable sulfur dioxide or carbon monoxide emissions. Prior to sulfidation, there are significant amounts of iron and copper existing as oxides or sulfates that would be lost to this "slagging" phenomenon. Our selective sulfidation creates a better feedstock for molten sulfide electrolysis by allowing for metals of interest for electrolytic extraction to be converted into sulfides for electrolytic processing, instead of them being lost to the slag phase. For example, for chalcopyrite ore/ concentrate upgrading, after sulfidation at a temperature of 800° C. and a sulfur partial pressure of 0.1-0.5 atm, the crystalline iron and copper sulfates are converted to sulfides. As shown in the following table, the crystalline chalcopyrite fraction nearly doubles upon sulfidation treatment:

| Quantitative Srystalline Phase Analysis (wt. %) | | |
|---|---|---|
| | Chalcopyrite Concentrate | Post Sulfidation |
| $CuFeS_2$ (Chalcopyrite) | 49.0% | 87.9% |
| $FeS_2$ (Pyrite) | 11.8% | 4.8% |
| $(Cu_{20}Fe_2)S_2$ (Nukundamite) | — | 3.2% |
| $Cu(SO_4)(H_2O)_5$ (Chalcanthite) | 26.3% | — |
| $Cu_4(SO_4)(OH)_6$ (Brochantite) | 5.3% | — |
| FeO(OH) (Lepidocrocite | — | 2.5% |
| $SiO_2$ (Quartz) | 5.6% | 1.6% |
| Unknown | 2% | — |

The inventors also anticipate such selective sulfidation pre-treatment to prepare barium sulfide (BaS) and rare-earth sulfides (RES) for use in molten sulfide electrolysis. Currently, BaS and RES are very expensive to be used as an electrolyte, and, in any case, feedstock containing barium or rare-earth compounds generally needs to be prepared for such electrolysis. Selective sulfidation provides a novel and advantageous way to prepare BaS and RES for subsequent molten sulfide electrolysis or other processes, and the inventors consider a process of selective sulfidation to produce BaS, RES, or other sulfides and subsequent use of such selectively sulfidized materials in a molten sulfide electrolysis or other process to be a novel application of the described technology.

As discussed above, in some cases, the material produced by selective sulfidation/desulfidation of the feedstock can itself be novel and/or commercially valuable. The discussion above relating to Table IVa provides an example of such selective sulfidation for lanthanum oxide conversion to lanthanum sulfide. As demonstrated, by carefully controlling process temperature, the selective sulfidation process can convert all or substantially all of the lanthanum oxide to lanthanum sulfide, which is valuable unto itself. Furthermore, by carefully controlling process temperature, lanthanum sulfide can be produced to different purity levels.

CHAPTER 8—SELECTIVE DESULFIDATION

The disclosure above focuses largely on selective sulfidation, with limited discussion of selective desulfidation. This section provides additional details of selective sulfidation and desulfidation. In particular, we now show that selective desulfidation is underpinned by the same phenomena and principles as selective sulfidation, and describe how they constitute a single, novel materials separation, production, and refining technology. We also describe the distinction between selective desulfidation and other, established, oxidative or thermal decomposition technologies such as calcination or conventional roasting.

In exemplary embodiments, sulfidation involves the conversion of an oxide, oxysulfide, sulfate, or sulfide to a "higher" oxysulfide, sulfate, or sulfide. In this case, "higher" means that the oxysulfide, sulfate, or sulfide product compound has a higher sulfur to oxygen ratio or sulfur to metal ratio than in the starting compound. Meanwhile, in exemplary embodiments, desulfidation involves the conversion of an oxysulfide, sulfate, or sulfide to a "lower" oxide, oxysulfide, sulfate, or sulfide. In this case, "lower" means that the oxide, oxysulfide, sulfate, or sulfide product compound has a lower sulfur to oxygen ratio or sulfur to metal ratio than in the starting compound. Therefore, if sulfidation is the movement from "lower" to "higher" oxide, oxysulfide, sulfate, or sulfide product compounds, desulfidation is the movement from "higher" to "lower" oxide, oxysulfide, sulfate, or sulfide product compounds. Therefore, sulfidation and desulfidation refer to the direction our process is moving, as both are embodiments of same process.

For both selective sulfidation and selective desulfidation, "selective" refers to the fact that using our technology, we preferentially sulfidize or desulfidize one or more components of a highly-similar feed, with the degree of selectivity being significantly higher over existing controlled-atmosphere roasting processes. This high degree of selectivity stems from careful control of operating parameters including but not limited to $S_2$ to $SO_2$ ratio, CO to $CO_2$ ratio, porosity change, temperature, etc. Example systems—include but are not limited to rare earth compounds, nickel-cobalt compounds, niobium-tantalum compounds, zirconium-hafnium compounds, uranium-thorium compounds, etc. Selectivity exists in the same spirit in both selective sulfidation and selective desulfidation.

Desulfidation should not be confused with calcination, reductive roasting, or conventional roasting. In calcination and conventional roasting, a metal compound is heated up under air, vacuum, or partial vacuum to convert a feed of metal compounds to oxides via oxidation or thermal decomposition. This differs from selective desulfidation in both execution and intent, as desulfidation utilizes a $S_2/SO_2$ ratio to control the selectivity and extent of conversion to "lower" oxide, sulfate, or oxysulfide products.

While reductive roasting may also employ a $CO/CO_2$ ratio like selective sulfidation and desulfidation, in reductive roasting, this ratio serves to reduce feed compounds themselves. However, the role of the $CO/CO_2$ ratio in selective sulfidation and desulfidation is far more complicated, as the $CO/CO_2$ ratio in selective sulfidation and desulfidation is for control of the carbothermically-driven sulfur reflux, not just compound reduction.

Thus, Selective sulfidation and desulfidation can be considered part of the same inventive concept. Selective sulfidation and selective desulfidation essentially refer to the direction the process is moving, not to different processes themselves. Both selective sulfidation and selective desulfidation are underpinned by the same process phenomena and control. Both selective sulfidation and selective desulfidation utilize careful control operating parameters such as $S_2$ to $SO_2$ ratio, CO to $CO_2$ ratio, temperature, porosity change, etc. Depending on the starting material, selective sulfidation or selective desulfidation may be utilized. Furthermore, these steps may be used in series to accomplish a separation goal.

The following is an example of the use of selective sulfidation-selective desulfidation to separate rare earths from iron. In rare earth recovery from bauxite tailings, isolation of rare earth from iron remains the most challenging separation. In this example, the goal is to have iron as a sulfide and rare earth as an oxide or oxysulfide. Two approaches can be used to achieve this goal, e.g., from a mixed oxide, iron can be selectively sulfidized, or, alternative, from a mixed sulfide, rare earth can be selectively desulfidized—both directions use the same technology. Lanthanum and scandium are utilized as rare earths in this example, although both can be considered to be representative of each other and of the rare earths as a whole.

In one experiment, iron was selectively sulfidized from mixed scandium-iron oxide. Thermodynamics suggest that iron can be selectively sulfidized from scandium. Kinetics suggest that oxysulfide formation can be suppressed due to large differences in oxide melting temperatures. At 1000° C., $Fe_3O_4$ sulfidation to FeS occurs at $\log_{10}(P_{S2}/P_{SO2})=-2$, whereas $Sc_2O_2S$ sulfidation to $Sc_2S_3$ at $\log_{10}(P_{S2}/P_{SO2})=12$. Mixed oxide was subjected to sulfur feed via evaporation from crucible in 1000 sccm of argon at 1000° C. $S_2$ partial pressure: 0.1-0.2 atm. $SO_2$ partial pressure: 0.02 atm. Atmosphere in mixed sulfide pellet in reactor: $\log_{10}(P_{S2}/P_{SO2})=1$. Under these experimental conditions, $Fe_3O_4$ was sulfidized to FeS, whereas $Sc_2O_3$ remained stable as an oxide or oxysulfide. These results were confirmed by chemical XRD analysis, i.e., that iron was sulfidized selectively and no scandium sulfide was formed:

|  | Temperature | | |
| --- | --- | --- | --- |
|  | 1000° C. | 1000° C. | 800° C. |
| Particle Size | 210 μm | 60 μm | 210 μm |
| O liberation | 32% | 40% | 44% |
| Sc2O3 (mass %) | 30% | 37% | 38% |
| Sc2O2S (mass %) | — | — | — |
| FeS (mass %) | 28% | 25% | 29% |
| Amorphous (mass %) | 42% | 38% | 33% |

Figure 17A:
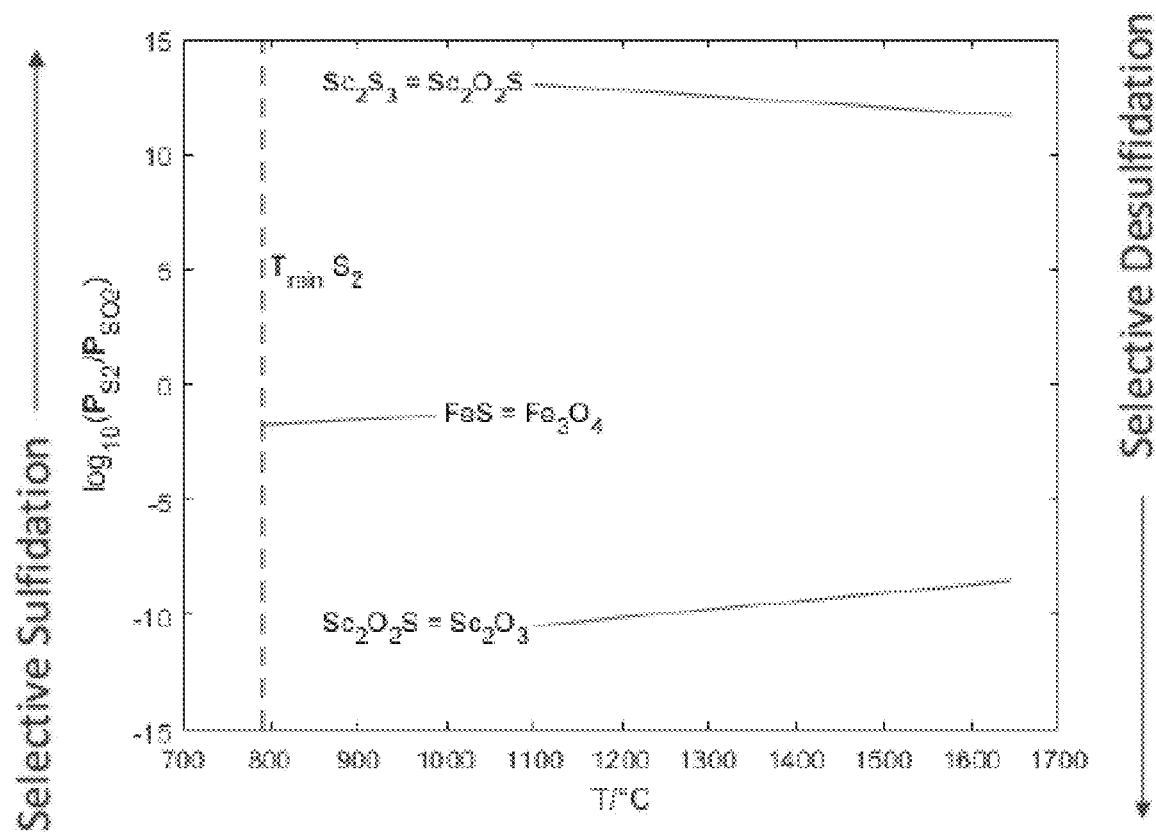
FIG. 17A shows a representation of selective sulfidation-selective desulfidation reactions relating to separation of scandium from iron from mixed scandium-iron oxide.
Figure 17B:
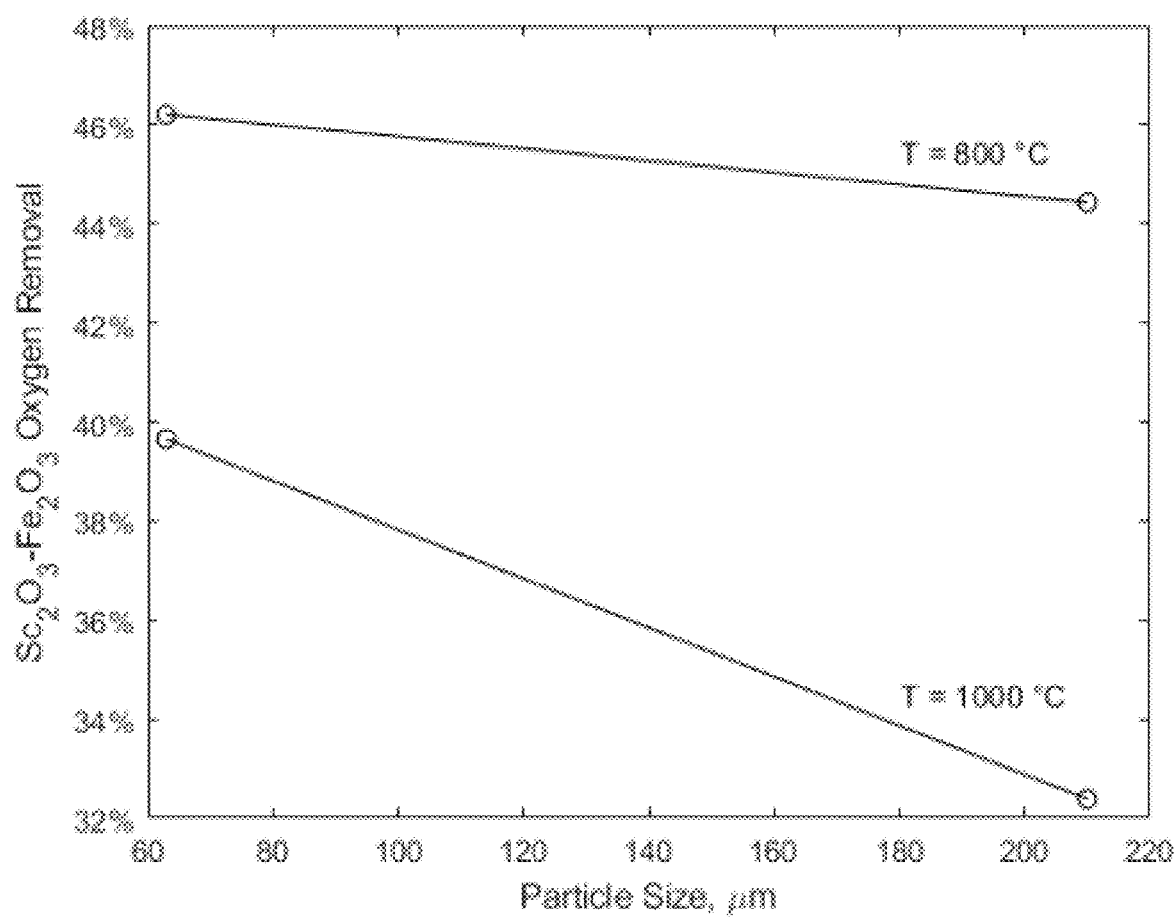
FIG. 17B shows how particle size and reaction temperature can have an effect on selectivity due to the interplay between reaction kinetics and thermodynamics in selective sulfidation.

FIG. 17A shows a representation of selective sulfidation-selective desulfidation reactions relating to separation of scandium from iron from mixed scandium-iron oxide. Furthermore, as shown in FIG. 17B, particle size and reaction temperature effects on selectivity highlight the interplay between reaction kinetics and thermodynamics in selective sulfidation. At 800° C., iron oxide easily sulfidizes while the sulfidation of scandium oxide to oxysulfide is chemically-kinetically limited, even though it is thermodynamically possible. At 1000° C., the iron oxide sinters, lowering reaction conversion due to transport limitations. Temperature and particle size are process parameters that can be used to tune selectivity in sulfidation. Movement of iron between amorphous and crystalline phases upon sulfidation highlights the selective sulfidation as a tenable means of ore cracking for iron-scandium separation.

Figure 18:
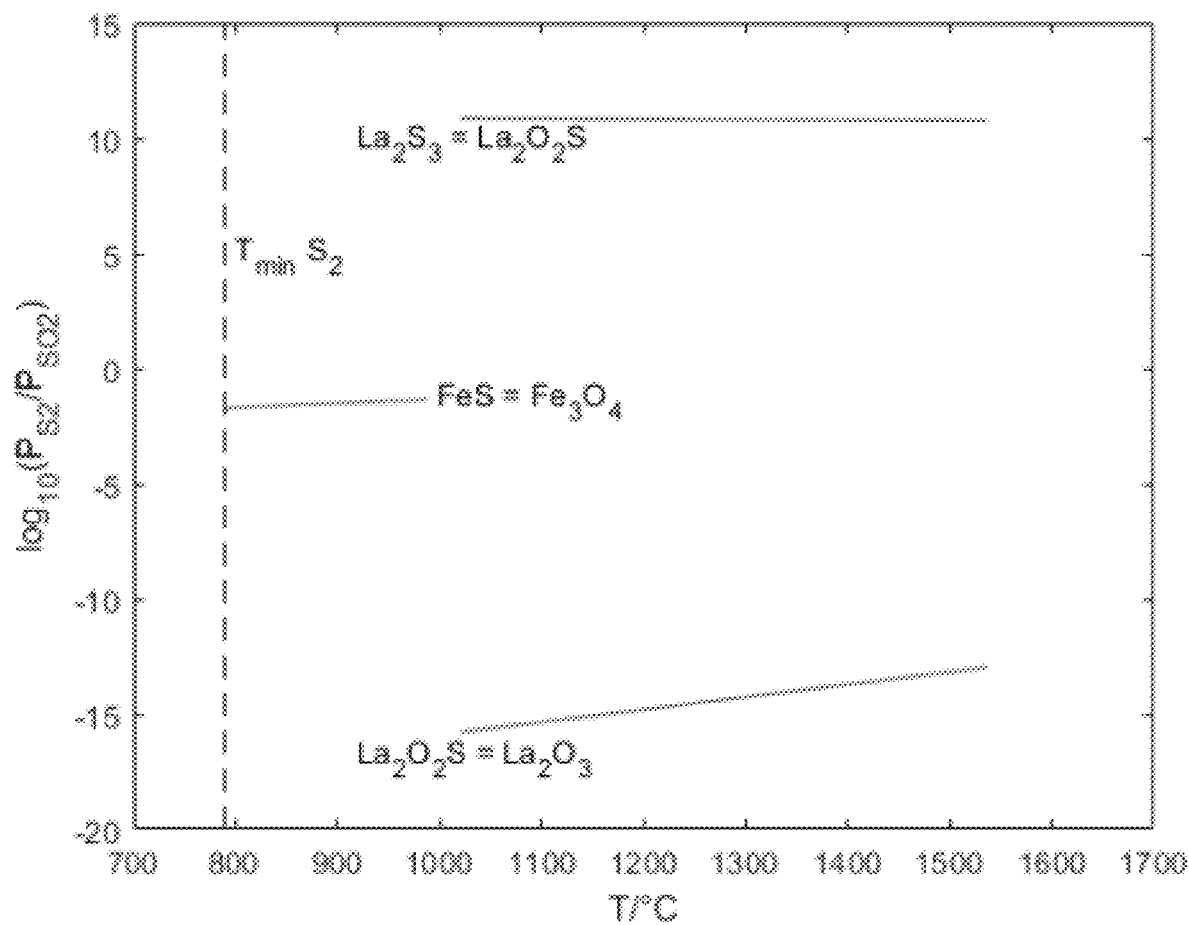
FIG. 18 shows a representation of selective sulfidation-selective desulfidation reactions relating to separation of lanthanum from iron from mixed lanthanum-iron oxide.

In another experiment, a mixed lanthanum-iron oxide was sulfidized and then the lanthanum sulfide was selectively desulfidized. At 1000° C., $Fe_3O_4$ sulfidation to FeS occurs at $\log_{10}(P_{S2}/P_{SO2})=-2$, whereas $La_2O_2S$ sulfidation to $La_2S_3$ at $\log_{10}(P_{S2}/P_{SO2})=11$. Mixed sulfide was subjected to sulfur feed via evaporation from crucible and an $O_2$ feed of 20 sccm in 1000 sccm of argon at 1000° C. $S_2$ partial pressure: 0.1-0.2 atm. $SO_2$ partial pressure: 0.02 atm. Atmosphere in mixed sulfide pellet in reactor: $\log_{10}(P_{S2}/P_{SO2})=1$. Under these experimental conditions, $La_2S_3$ oxidized to form an oxysulfide $La_2O_2S$, whereas FeS remained stable as a sulfide. Without being limiting to any theory, the FeS—$La_2S_3$ mixture melts at the temperature of the experiment (1000° C.), and the $La_2S_3$ is selectively desulfidized from solution to $La_2O_2S$ at log 10(PS2/PSO2)=1 and phase separates from the FeS, stable at log 10(PS2/PSO2)=1. FIG. 18 shows a representation of selective sulfidation-selective desulfidation reactions relating to separation of lanthanum from iron from mixed lanthanum-iron oxide.

In both approaches, the sulfidation and desulfidation employed the same reactor conditions, e.g., Gas Atmosphere ($S_2$ partial pressure: 0.1-0.2 atm; $SO_2$ partial pressure: 0.02 atm; Atmosphere in mixed sulfide pellet in reactor: log 10(PS2/PSO2)=1), and Temperature (1000° C.), and accomplished the same goal, i.e., separate iron as a sulfide from rare earths as oxides or oxysulfides. Both selective sulfidation and selective desulfidation process directions achieve this goal chemically, although one direction may remain favorable in some situations depending on downstream processing.

In conclusion, selective sulfidation and desulfidation can be seen as two sides of the same technology. Depending on the starting material, selective sulfidation or selective desulfidation can be employed for materials separation. Both selective sulfidation and selective desulfidation to produce a product require similar reactor conditions—whether the process is termed a sulfidation or desulfidation depends more on the starting material and less on the final product. Selective sulfidation and selective desulfidation can be utilized in series depending on other processing constraints.

Thus, throughout this patent application, any reference to "selective sulfidation" can generally apply equally to "selective desulfidation," and vice versa.

CHAPTER 9—CONCLUSION

It should be noted that headings are used above for convenience and are not to be construed as limiting the present invention in any way.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described to and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A process for selective sulfidation of a target metal compound of a feedstock material within a reactor, the target metal compound consisting of a metal oxide, oxysulfide, carbonate, sulfate, or sulfide, the process comprising:
    introducing a flow of sulfur-containing gas into the reactor through a gas inlet of the reactor; and
    passing the flow of sulfur-containing gas through the feedstock material within the reactor while controlling a roasting atmosphere in the reactor about the feedstock material including at least a process temperature and a ratio of sulfur to sulfur dioxide chosen for selective sulfidation of the target component to produce a selectively sulfidized compound including a sulfate, oxysulfide, or sulfide of the target metal, the ratio of sulfur to sulfur dioxide being maintained above a predetermined critical ratio for such selective sulfidation of the target metal compound.

2. A process according to claim 1, wherein the selective sulfidation is run as a continuous or semi-continuous process.

3. A process according to claim 1, wherein the selective sulfidation includes high temperature selective sulfidation of an individual metal oxide, sulfate, carbonate, oxysulfide, or sulfide from a mixture of highly chemically-similar metal compounds in the feedstock material.

4. A process according to claim 1, wherein controlling the roasting atmosphere further includes implementation of a carbothermically-driven sulfur reflux system by back-reacting product sulfur dioxide to control sulfide product selectivity and valency.

5. A process according to claim 4, wherein implementing the carbothermically-driven sulfur reflux system comprises:
    introducing a carbon species into the reactor during selective sulfidation to remove sulfur dioxide from the reactor and reflux it back into sulfur while producing carbon monoxide or carbon dioxide.

6. A process according to claim 1, wherein the selective sulfidation includes at least one of:
    crystallization of the target metal compound from a mixed amorphous or semi-amorphous metal compound; or
    spontaneous separation of the selectively sulfidized compound upon sulfidation from a mixed metal compound due to differences in phase stability of the selectively sulfidized compound compared to the original target metal compound.

7. A process according to claim 1, further comprising:
    extracting the selectively sulfidized compound from the feedstock material.

8. A process according to claim 1, further comprising:
    using at least the selectively sulfidized compound in a subsequent molten sulfide electrolysis process.

9. A process according to claim 8, wherein the selectively sulfidized compound includes at least one of barium sulfide or a rare earth sulfide.

10. A process according to claim 1, wherein controlling the roasting atmosphere further includes controlling a ratio of carbon monoxide to carbon dioxide within the reactor to stabilize or react the target metal compound.

11. A process according to claim 1, wherein controlling the roasting atmosphere further includes controlling porosity change of the feedstock material within the reactor to stabilize or react the target metal compound.

12. A process according to claim 1, further comprising:
pre-treating the feedstock material prior to introducing the feedstock material into the reactor including at least one of calcination, dehalogenation, dephosphorization, or sulfidative sintering.

13. A system for selective sulfidation of a target metal compound of a feedstock material, the system comprising:
a reactor comprising a gas inlet and a receptacle for receiving a feedstock material containing a target metal compound consisting of a metal oxide, oxysulfide, carbonate, sulfate, or sulfide;
a source of sulfur-containing gas; and
a process controller configured to control introduction of a flow of sulfur-containing gas from the source of sulfur-containing gas into the reactor through the gas inlet of the reactor and passing of the flow of sulfur-containing gas through the feedstock material within the reactor while controlling a roasting atmosphere in the reactor about the feedstock material including at least a process temperature and a ratio of sulfur to sulfur dioxide chosen for selective sulfidation of the target component to produce a selectively sulfidized compound including a sulfate, oxysulfide, or sulfide of the target metal, the ratio of sulfur to sulfur dioxide being maintained above a predetermined critical ratio for such selective sulfidation of the target metal compound.

14. A system according to claim 13, wherein the reactor is configured to run selective sulfidation as a continuous or semi-continuous process.

15. A system according to claim 13, wherein the selective sulfidation includes high temperature selective sulfidation of an individual metal oxide, sulfate, carbonate, oxysulfide, or sulfide from a mixture of highly chemically-similar metal compounds in the feedstock material.

16. A system according to claim 13, wherein controlling the roasting atmosphere further includes implementation of a carbothermically-driven sulfur reflux system that back-reacts product sulfur dioxide to control sulfide product selectivity and valency.

17. A system according to claim 16, further comprising:
a carbon source that introduces a carbon species into the reactor during selective sulfidation to remove sulfur dioxide from the reactor and reflux it back into sulfur while producing carbon monoxide or carbon dioxide.

18. A system according to claim 13, wherein the selective sulfidation includes at least one of:
crystallization of the target metal compound from a mixed amorphous or semi-amorphous metal compound; or
spontaneous separation of the selectively sulfidized compound upon sulfidation from a mixed metal compound due to differences in phase stability of the selectively sulfidized compound compared to the original target metal compound.

19. A system according to claim 13, wherein controlling the roasting atmosphere further includes controlling a ratio of carbon monoxide to carbon dioxide within the reactor to stabilize or react the target metal compound.

20. A system according to claim 13, wherein controlling the roasting atmosphere further includes controlling porosity change of the feedstock material within the reactor to stabilize or react the target metal compound.

* * * * *